US012488079B2

(12) United States Patent
Shear et al.

(10) Patent No.: US 12,488,079 B2
(45) **Date of Patent: *Dec. 2, 2025**

(54) SYSTEMS AND METHODS FOR A CONNECTED COMPUTING RESOURCE AND EVENT/ACTIVITY IDENTIFICATION INFORMATION INFRASTRUCTURE USING NEAR EXISTENTIAL OR EXISTENTIAL BIOMETRIC IDENTIFICATION OF HUMANS

(71) Applicant: Advanced Elemental Technologies, Inc., Atherton, CA (US)

(72) Inventors: Victor Henry Shear, Atherton, CA (US); Timothy St. John Redmond, Walnut Creek, CA (US); Jaisook Rho, Palo Alto, CA (US); Jason Ben Shear, Austin, TX (US); Bruce Jason Tromberg, Bethesda, MD (US); Robert George Wong, San Francisco, CA (US)

(73) Assignee: Advanced Elemental Technologies, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/057,964

(22) Filed: Feb. 19, 2025

(65) Prior Publication Data

US 2025/0232021 A1 Jul. 17, 2025

Related U.S. Application Data

(60) Continuation of application No. 18/525,832, filed on Nov. 30, 2023, now Pat. No. 12,259,958, which is a (Continued)

(51) Int. Cl.
*G06F 21/32* (2013.01)
*G06F 21/86* (2013.01)

(52) U.S. Cl.
CPC .............. *G06F 21/32* (2013.01); *G06F 21/86* (2013.01)

(58) Field of Classification Search
None
See application file for complete search history.

(56) References Cited

U.S. PATENT DOCUMENTS 11,184,766 B1 * 11/2021 Lord ...................... G06V 10/75
11,367,323 B1 * 6/2022 Shahidzadeh .......... G07C 9/215
(Continued)

*Primary Examiner* — Christopher C Harris
(74) *Attorney, Agent, or Firm* — Nixon & Vanderhye P.C.

(57) ABSTRACT

Connected computing enables the use of highly diverse environments that support operating frameworks for contemporary civilization. But computing productivity and trustworthiness are undermined by such environments' largely inchoate organization. These environments and their identity infrastructures are fragmented, and unnecessarily unreliable, insecure, and insufficiently informative due to current computing entity (e.g., resource) identification infrastructure design, which lacks root identification reliability. Such reliability is enabled herein by a fundamentally accurate and authenticity ensuring, near-existential or existential quality, biometrically and liveness based, portable identification and provenance infrastructure. Such an infrastructure provides ubiquitously available identification information that can be used universally for identification processes. Such biometrically and liveness-based identification information can be contemporaneously acquired and securely fused with or otherwise bound to associated entity identification information sets. Such sets are used to identify and assess entity suitability and/or authenticity, and/or establish user identity (specific human entity) for personal, societal, and organizational activities.

23 Claims, 106 Drawing Sheets

Related U.S. Application Data division of application No. 18/198,540, filed on May 17, 2023, now Pat. No. 12,111,902.

(60) Provisional application No. 63/365,067, filed on May 20, 2022.

(56) References Cited

U.S. PATENT DOCUMENTS

| | | | | |
|---|---|---|---|---|
| 2019/0356491 | A1* | 11/2019 | Herder, III | H04L 9/3242 |
| 2020/0366671 | A1* | 11/2020 | Larson | G06F 9/451 |
| 2021/0287469 | A1* | 9/2021 | Ryhorchuk | G06V 40/172 |
| 2023/0091318 | A1* | 3/2023 | Lindemann | H04L 63/0861<br>726/4 |
| 2023/0134651 | A1* | 5/2023 | Agbamu | G06V 40/172<br>705/325 |

* cited by examiner

Figure 1A: Acronyms

| | |
|---|---|
| AA | Anomaly analyzer |
| ACFSD | Acquisition, carrying and forwarding station device arrangment |
| ACUFSD | Acquisition, carrying, using, and forwarding station device arrangement |
| AFD | Acquisition and forwarding device arrangement |
| AFSD | Acquisition and forwarding station device arrangement |
| AM | Awareness Manager arrangement |
| arr | arrangement |
| ATMUM | anti-theft, anti-misuse, and anti-unauthorized identification information modification |
| BIPS | Biometric identity processing services that operate in a tamper resistant, secure special purpose protected processing environment (such as a BPU) |
| BPU | Biometric processing unit (which may dedicated, be a consistuent component of an IIPU (such as, for example, NIIPU), and/or the like) |
| CBEIIS | Contemporaneous at least in part biometrically based, nearly existential or existential quality, identification information set |
| CertPer | Certifier person (such as any SVCC and/or social chain event/activity certifier), such as production/manufacturing certifier person, distribution certifier person, vendor certifier person, modification certifier person, certifier person certifying transiting of goods, owner/owner agent CertPer, and/or other certifier person certifying authenticity, attribute(s), and/or suitability of an REAI. |
| CESEA | Contained-environment sensor/emitter arrangement |
| CIIS of a resource, such as a device | A composite IIS of an object/person(s) fused-identity entity, comprising:<br>(a) Object portion comprising identification information regarding the owned/used object, such as, one or more identification attributes characterizing the object, including identification information related to the object's creation (e.g., provenance information), object's identity (e.g., securely embedded secret(s) embedded by manufacturer), object's distribution and/or other SVCC related information, object's one or more locations, and/or the like, where such information may include the object's one or more non-owner CertPers' and/or provenance persons' respective near existential and/or existential quality, at least in part, biometrically based IIS information sets and associated EBInet device arrangements (such as AFDs) that acquired such biometrically based identification information; and<br>(b) Person portion comprising: (i) owner(s)' and/or user person(s)' respective near existential and/or existential quality at least in part biometrically based identification information; and may include (ii) provenance information of EBInet device arrangements that acquired such near existential and/or existential quality at least in part biometrically based identification information. |
| Cred | A standardized and interoperably interpretable CPE with associated value quantizing an identified one or more persons' (may be representing an organization) assertion regarding a subject matter's value related to fulfilling or contributing to fulfilling such CPE's specified purpose. A Cred may employ an IIS to represent such one or more persons' identity, and such IIS may comprise an EBICert or other IIT used in crptographicaly signing such Cred. |
| CS | Cryptographic services |
| CW-NIRS | continuous-wave near-IR spectroscopy |
| DIIS | Device identification information set |
| DOSI | diffuse optical spectroscopic imaging |

Figure 1B: Acronyms continued

| | |
|---|---|
| E/A | Event/Activity (E/A) subject matter instance, including a relevant resource and process set (e.g., an EBINet IIS publishing event/activity, or a rights managed decrypting and opening of a securely stored document event/activity). |
| EBIBlock | a secure data block containing hashed transaction related identification information of an E/A instance that includes such E/A instance's one or more CertPers' respective one or more portions of near existential and/or existential quality at least in part biometrically based identification information, time, date, location, and/or other such E/A instance transaction related identification information. |
| EBIBlockChain | A sequence of EBIBlocks cryptographically linked to ensure non-refutability of transaction related identification information. |
| EBIbox | a secure policy governed container comprising one or more information resources (such as one or more documents, digital coins, and/or the like digital items), such resources' respective near existential and/or existential quality at least in part biometrically based stakeholder/CertPer identification information (e.g., one or more IISs such as one or more relevant EBICerts), and/or the like, (and where such an EBIbox may comprise one or more EBICoins). An EBIbox is signed /certified by one or more CertPers to enable independent parties to validate/evaluate such EBIBoxes' respective contents. In some embodiments, an EBIbox can further include transaction identification information of E/A instances involving such EBIbox. |
| EBICert | EBInet certificate |
| EBICoin | An EBInet digital coin representing at least both a "contained", or securely associated, persistant minted or mined uniquely identified digital coin set and an at least in part near existential or existential quality, biometrically based identification information identifying/regarding such coin set's owner set. An EBIbox may comprise an EBICoin. |
| EBInet | Existential biometric identification information network |
| EBISeal | An arrangement for EBInet container governance for one or more objects, such as digital and/or physical entities. Such an arrangement comprises a seal that controls access to, and/or modification, and/or movements of, such object content, such seal managing, for example, physical shipping arrangement (such as SIMCs, crates, and/or the like), a medical pharmaceutical dispensing arrangement, and/or digital information (e.g., software, data, and/or the like) control mechanisms. Such an EBIseal employs identification information (e.g., CIIS and/or CBEIIS information) to monitor and manage event/activity instances associated with such arrangement. EBISeals operate using secure, tamper resistant hardware, such as EBISeals' respective modular component NIIPUs. An EBISeal may further include one or more tamper-resistant physical locking and/or other sealing (such as tamper-resistant taping and/or software based virtual locking) mechanisms. Such physical and/or virtual locking mechanisms may be governed through use of CIIS informed rights management and may futher use additional security factor conventional physical key and/or password-based locking and unlocking mechanisms. |
| EBIWall | a security/integrity governance barrier established through the use of a distributed EBISeal fabric arrangement to manage EBInet arrangement compliance of components of an operating computing arrangement in accordance with specifications, for example, for object creation, modification, and access/interoperation. An EBIWall can employ one or more RUSs operating in conjunction with such distributed EBISeal fabric arrangement. |

Figure 1C: Acronyms continued

| | |
|---|---|
| EF | Effective Fact. A fact-related-authority stipulated fact that is testable/verifiable using a standardized, secure test method, such effective fact securely including, and/or securely referencing, its test method. |
| EFTM | Effective Fact test method process set |
| EIFF | Existential Identity Face Forward |
| ESAM | Existentially signed anticipatory/auditing manifest arrangement for, for example, managing an SVCC intermodal container. An ESAM may have a securely bound EBIBlockChain comprising EBIBlock provenance event/activity audit information. |
| EXID | near existential or existential quality, identity information |
| FDPM | frequency domain photon migration |
| GPS | Global positioning system |
| IF | Identity Firewall arrangement |
| IGF | Identity governed fabric comprising a set of operating resources and other resources that are governed by, for example, an EBISeal arrangement |
| IIMS | Identification information management services that employ for example, PERCos information management system that manages information such as, for example, identity related information. In some embodiments, instances of IIMS inclde child IIS filtering and management services. |
| IIPU | Identification information processing unit (e.g., RIIPU, NIIPU) |
| IIS | Identification information set |
| IIT | Identification information token |
| IMC | InterModal container |
| IRGS | Identity related governance services |
| MasterEBISeal | In some embodiments, an EBISeal arrangement can be organized hierarchically, where an MasterEBISeal of such EBISeal arrangement manages other EBISeals (e.g., lower layer EBISeals) in the arrangement. |
| MasterIGF | In some embodiments, IGFs can be organized hierarchially, where a Master IGF comprises its lower layer IGFs. |
| NIIPU | Networking identification information processing unit |
| Non-SSID | non-societally specifically identifying information |
| O"x" | O"x" is a space saving short form for O-Per"x", where x is an integer and the combination O"x" represents (stands in for) a specific owner person, an "O-Per", such as an acutal human owner, or an owner human agent. For example, O1, O2, ..., On, are specific owner persons and may be represented as O-Pers. |
| OCT | optical coherence tomography |
| pBIDE | pervasive biometric ID environment |
| PD | Parent device |
| P-IIS | Provenance identification information set |
| PPE | Protected processing environment |
| PPE IPS | Instances of identity processing services that operate isolated from other elements by operating in a separate PPE |
| PPG | photoplethysmogram |
| PPSA | Protected processing service arrangement |
| PRIG | Pseudo random instruction generator |
| RBI | root biometric identity |

Figure 1D: Acronyms continued

| | |
|---|---|
| RCFUD | Receiving, carrying, forwarding, and using device arr. |
| RD | receiving device arr. |
| REAI | Resource and event/activity instance (resource being any identifiable object, e.g., a text set, a person, a device, a program, a video, and/or the like, instance, and event/activity being a resource set/process set instance) |
| RIIPU | Root (identy acquiring) IIPU |
| RIOS | resource input/output services |
| ROI | Region of interest |
| RUD | Receiving and using device arr. |
| RUS | Receiving and using service arrangement, comprising hardware and software components, that securely supports/governs receiving and using identification information sets and/or associated event/activity instances. |
| RVSP | registration, validation/analysis/governance service processing |
| SAnony-IIS, SAnony-IIT | Societally anonymous (i.e. non-person-specific) identification information |
| SANSA | SVCC administrative network service arrangement |
| SC | Secure communications |
| SCOM | Secure communications |
| SFDI | spatial frequency domain imaging |
| SIIPS | Secure identification information processing services |
| SIMC | An SVCC EBISeal secured and governed intermodal container |
| SPG | Speckle plethysmogram |
| SSId | Societally person specific identification information set |
| SubPer | REAI's subject matter identification component of a subject matter person's (e.g., owner and/or user) identification information, such as the subject matter person component information of a CIIS |
| SVCC | supply, value, and/or other commercial chain (SVCC) |
| TIIDB | Trusted identification information database |
| TOF | Time of flight |
| TOF CMOS | Time of flight CMOS (complementary metal-oxide-semiconductor) |
| TOS | Tissue optical spectroscopy |

Figure 2: Notation

Notation: a symbol, +, following a subject matter one or more names, such as RCFD1+, indicates a described identification information set naming has been shortened for practical space reasons, but contains further identifying information, such as, identifiers for certifying arrangements, provenance information, and/or the like. For example, RCFD1+ indicates a fused-identity entity, such as (RCFD1/O1, #Bank1CertPer1), where O1 is RCFD1's owner person and Bank1CertPer1 a human person, who certified RCFD1. An owner person is an individual human that comprises or represents an owner party, and where such a representation may be stipulated in a form of securely verifiable one or more PERCos Effective Facts.

In these Figures, thick lines that border elements (such as devices) denote that such elements are tamper and inspection resistant. However, absence of such thick lines does not mean that an element is not secure.

In these Figures, Ox, where "x" is an integer (such as O1, O2, O3, ...), a space saving short form for O-Per"x", where x is an integer and the combination O"x" represents a specific owner person, an "O-Per", such as an actual human owner, or an owner human agent.

Figure 3: Non-limiting example of a tamper and inspection resistant acquiring and forwarding station device at least for acquiring near existential, or existential quality, biometric identification information sets of human individuals for contemporaneous use.
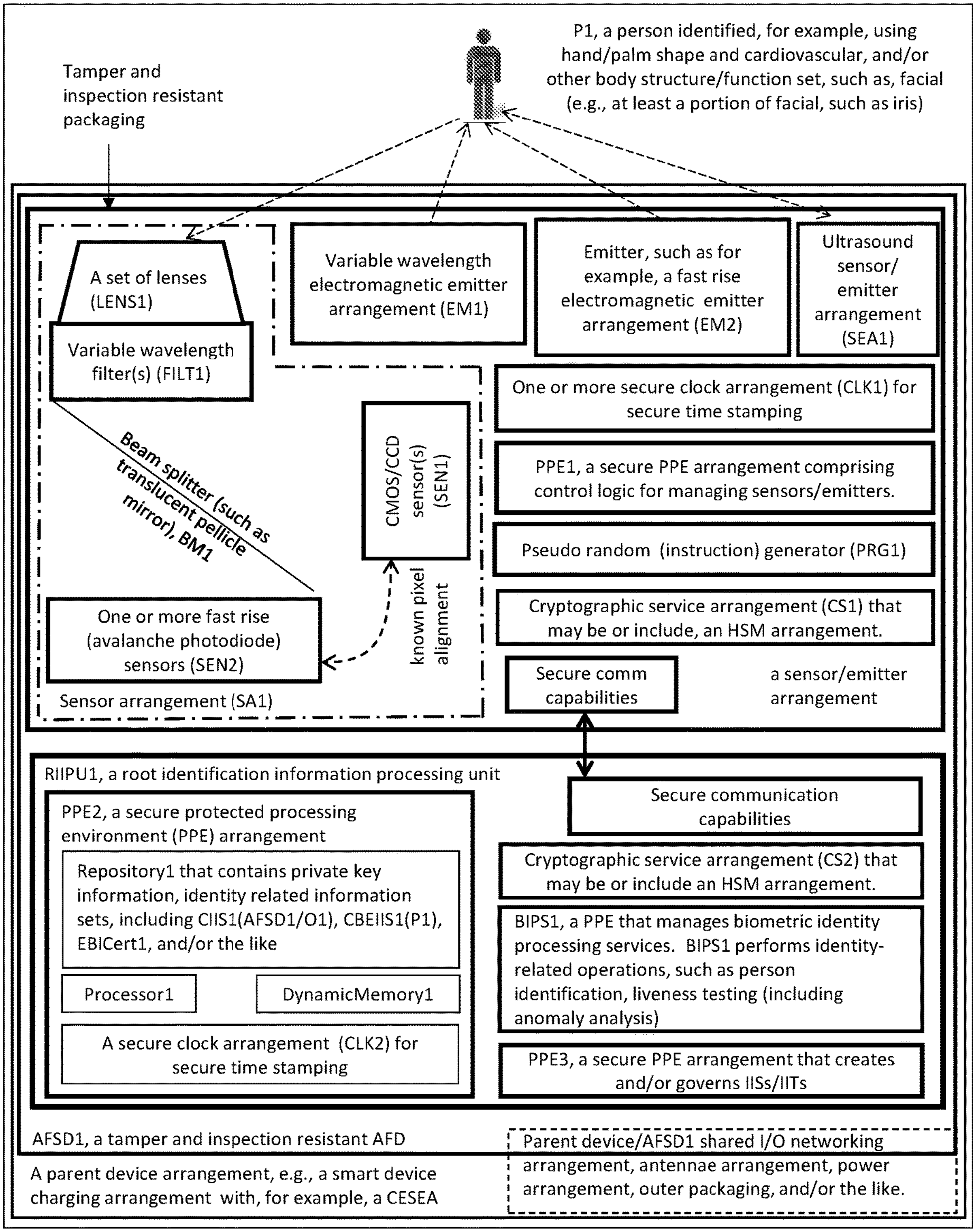

Figure 4: Non-limiting example of steps a time-delay anomaly system takes in respond to emissions of an unpredictable emission signal set

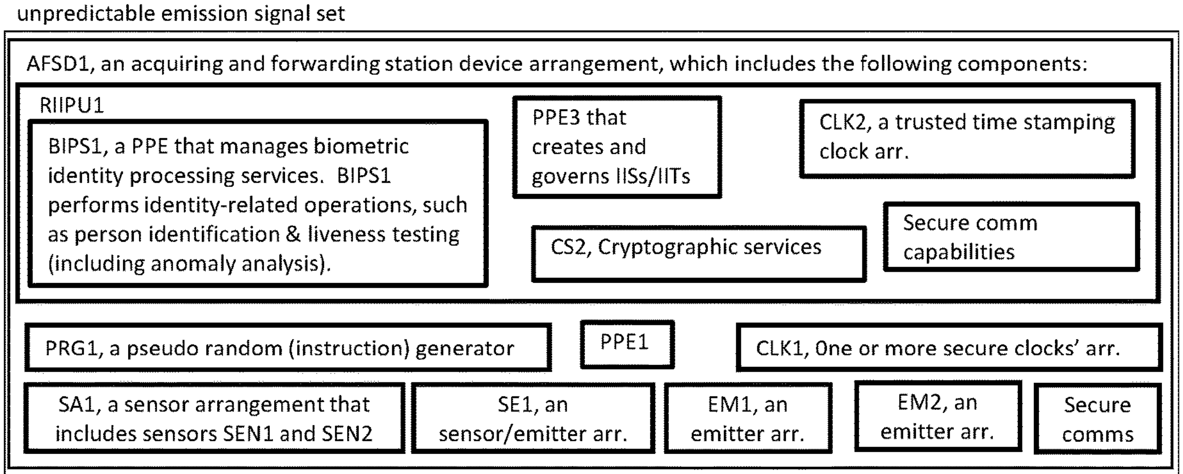

Step 1. Sensors in SEN1 and SEN2 sense a target subject and notify BIPS1. BIPS1 instructs PRG1 to generate a pseudo random emission set. Emitters in EM1 and EM2 emit one or more time-stamped, operatively unpredictable emissions to elicit corresponding human interaction responses from the target subject.

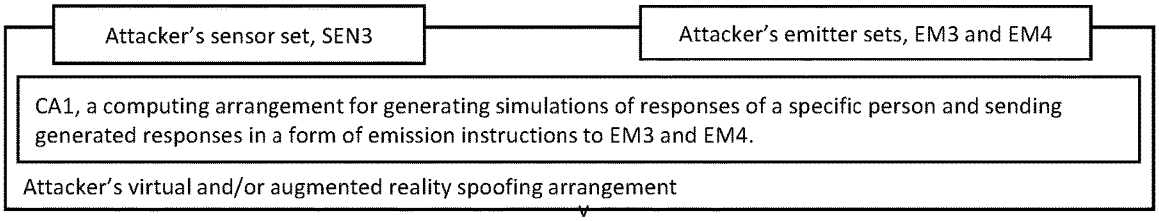

Step 2: SEN3 acquires signal information (e.g., electromagnetic) at least in part resulting from EM1 and EM2 emitted emissions, and forwards them to CA1

Step 3: CA1 processes the signal information SEN3 acquired to simulate an appropriate signal set response and attempts to demonstrate the presence of such specific person by sending spoofing emission instructions to EM3 and EM4, respectively.

Step 4: EM3 and EM4 emit emissions in accordance with CA1 generated emission instructions.

Step 5: SEN1 and SEN2 acquire spoofed response information emitted by EM3 and EM4. SEN1 and SEN2 time stamp one or more portions of their respective acquired response information and forward such information to BIPS1.

Step 6: BIPS1 performs timing anomaly analysis to detect an attacker's impersonation by determining whether ΔT (ΔT1 + ΔT2 + ΔT3 + ΔT4 + ΔT5) is a time duration greater than expected, where:

ΔT1 = time between the time of EM1's emission and the time of SEN3's acquisition of such emission ΔT2 = time between the time when SEN3 sends CA1 the acquired signals and the time CA1 receives the signal set sent by SEN3

ΔT3 = time CA1 takes to process SEN3 acquired signal set, generate responses that simulate the responses of a valid person that the attacker is impersonating and send the responses in a form of emission instructions to EM3 and EM4.

ΔT4 = time(s) between the time(s) EM3 and EM4 receive CA1's emission instructions and the time(s) they respectively emit emissions containing simulated responses.

ΔT5 = time it takes for SEN1 and SEN2 to acquire responses emitted by EM3 and EM4

Step 7: BIPS1 takes corrective &/or audit/notification action(s), in accordance with its policy specification, where such action(s) can include not generating an IIS/IIT, notifying an RUS administrative service arrangement, &/or not authorizing an E/A process/request associated with such biometric identification acquisition.

Figure 5: Non-limiting example of a tamper and inspection resistant acquiring and forwarding station device at least one of: (a) employing acquired near existential and/or existential quality biometric identification information to create one or more IISs (e.g., IITs that may be EBICerts and/or CIISs); and (b) forwarding such acquired biometric identification information and/or such one or more IISs to one or more EBInet arrangement compliant identification information registration and/or publishing services. Such acquired biometric identification information, and/or IISs, may alternatively and/or in addition-be respectively forwarded to one or more RCFDs and/or RUSs.

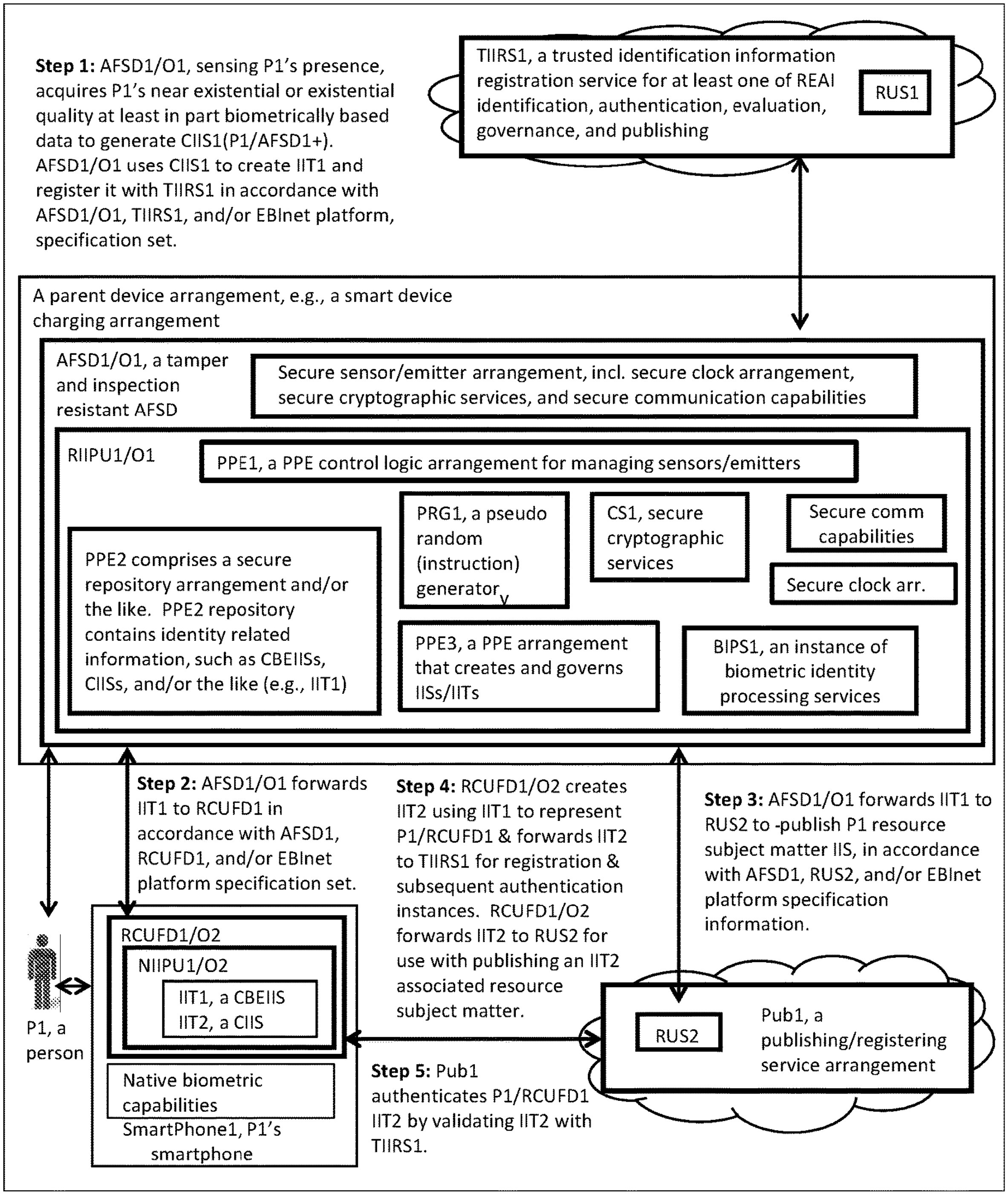

Figure 6: Non-limiting example of a distributed AFD arrangement used by an organization for provisioning highly reliable, fault tolerant, (near) existential quality IISs (such as CBEIISs of the organization's employees, CIISs of AFDA1/Owner components, & CIISs of employees & their respective RCFDs).

Step 1: As Emp1 enters Emp1's office hallway, SE1 detects Emp1's presence & acquires Emp1's at least in part biometric data (such as Emp1's gait & other movement dynamics, facial images, body proportions). SE1, in accordance with its policy set, securely forwards the acquired biometric data to RIIPU1. RIIPU1 processes SE1 acquired data to generate an IIS(s) (or plural IISs) that is at rigor level 6 & Emp1/RIIPU1 then certifies it by signing it, in accordance with AFDA1 policy set. RIIPU1 forwards such certified IIS(s) to AFSD1. SE2 acquires (e.g., periodically or persistently in accordance with its policy set) Emp1 biometric data to, in part, establish/confirm Emp1's identity. PPE1's policy set may specify guiding/instructing/initiating Emp1 to act to obtain a response (such as a response to an instruction to raise hand). PPE1/O1 signs SE2 acquired data & forwards the signed data to AFSD1's BIPS1 in accordance with AFDA policy set.

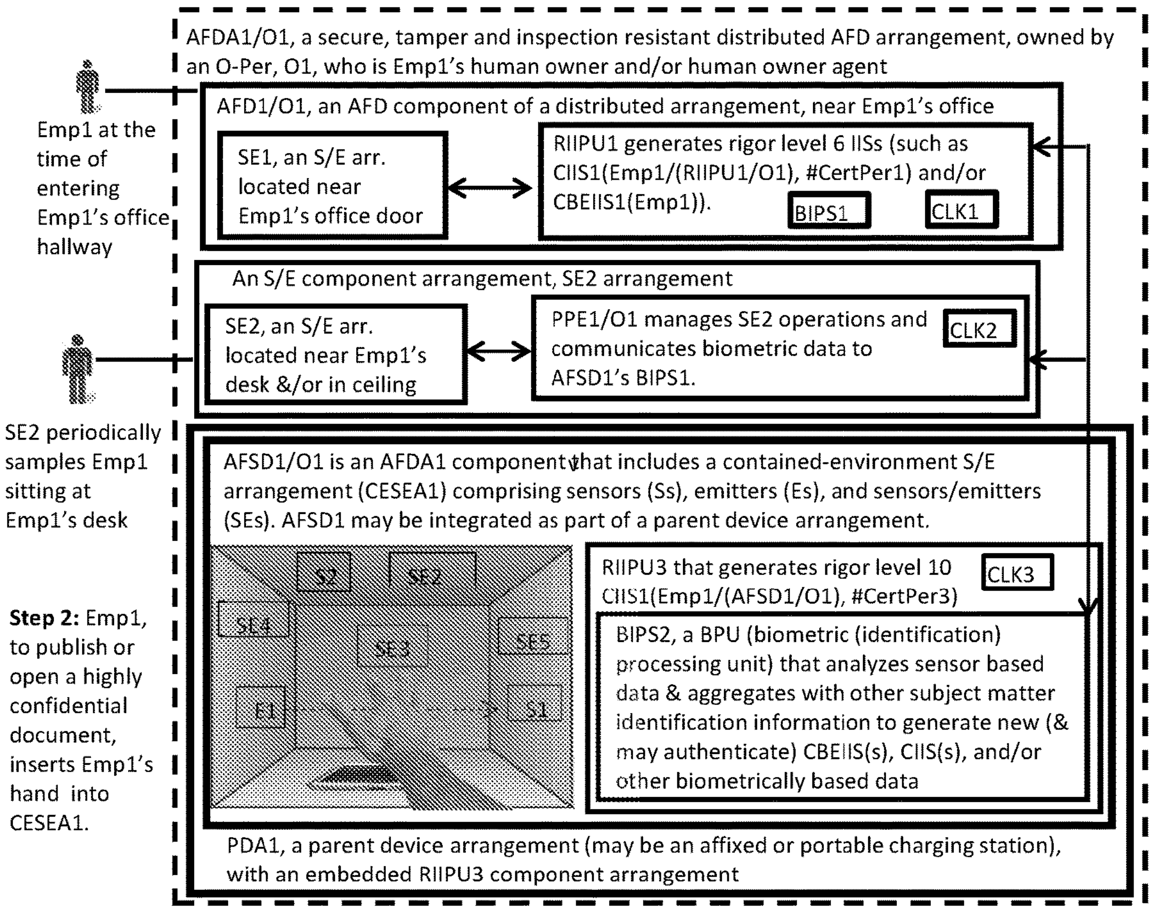

Step 3: BIPS2 acquires from CESEA1 emitter(s) and associated sensor(s), Emp1's near existential, or existential, quality biometric data, & performs for example, at least in part spatial, spectral, &/or temporal related (e.g., timing anomaly, TOF) control &/or analysis (e.g., of patterns, dynamics, such as flow &/or matter interactions, &/or other identification &/or liveness analysis). BIPS1 processes received biometric data & generates CIIS1(Emp1/(AFSD1/O1)) (may also use RIIPU1 generated IISs &/or PPE1/O1 acquired data) at a rigor level of 10. In some embodiments, BIPSs, such as BIPS2, may (i) acquire pBIDE IISs from one or more persons', such as an organization's employees', respective AFDs &/or their carried RCFDs, such as their CBEIISs, CIISs, &/or other IIS info; & (ii) evaluate/match such IISs with such employees' respective organization registered IIS info at least in part describing operatively current AFDA1/O1 acquired respective employee biometric identification info.

Figure 7: Non-limiting example of an employee using an AFSD at home to obtain existential quality (operatively irrefutable) at least in part biometrically based IISs (such as CIISs &/or CBEIISs) that the employee can use contemporaneously to perform E/A instances (such as gaining access to the employee's restricted access facilities, accessing-highly confidential (such as research) corporate documents &/or the like).

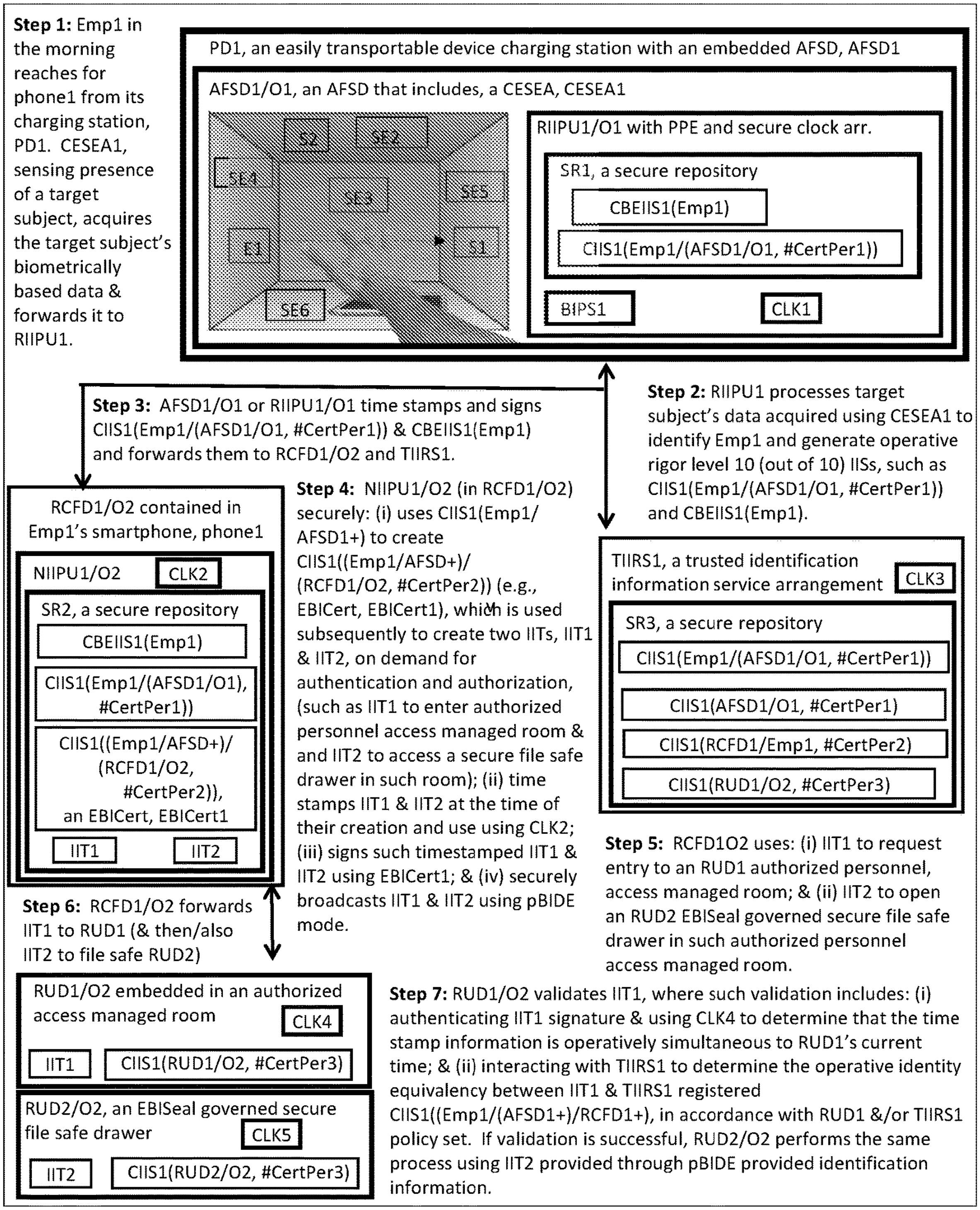

Figure 8: Non-limiting example of an EBInet embodiment that supports RUD and RUS arrangements receiving IISs, such IISs used to respectively detect and prevent replay attacks.
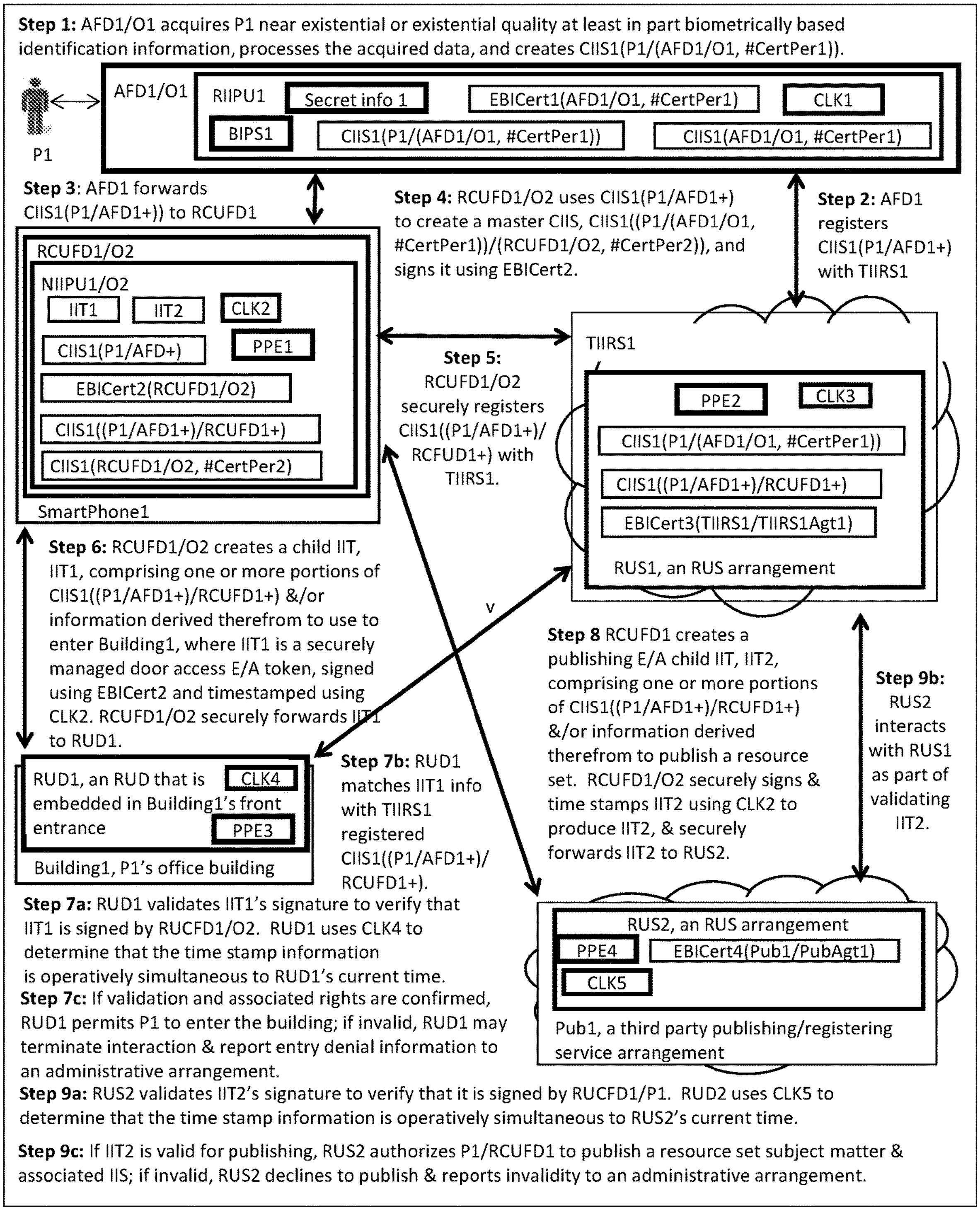

Figure 9: Non-limiting example of an AFD creating contemporaneous at least in part biometrically based identification information sets for different family members (parents P1 and P2, and a child, C1) RCUFDs, for their respective identity purposes, using respective CIISs and/or CBEIISs.
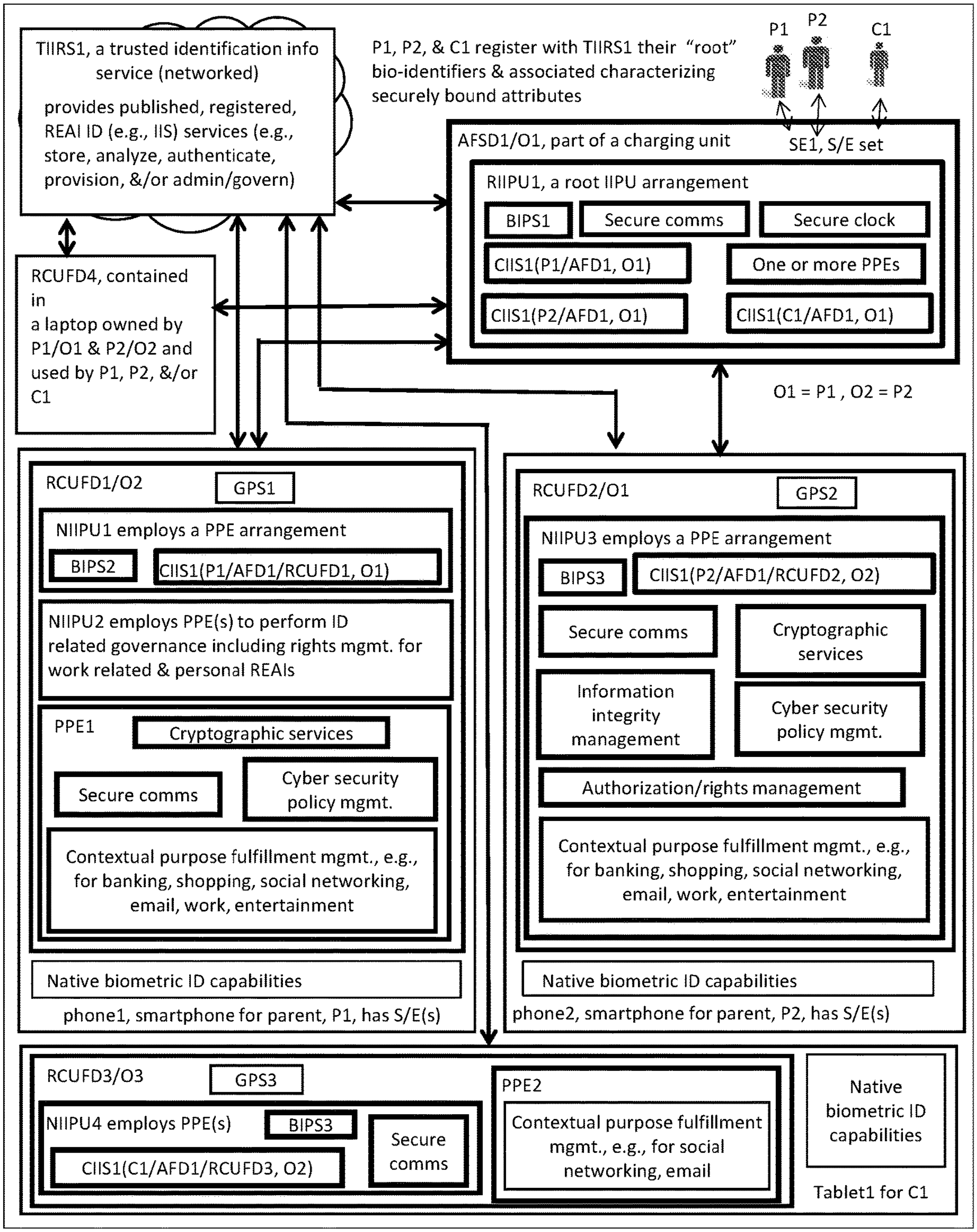

Figure 10: Non-limiting example embodiment of a corporation employing a plurality of AFDs to enable its employees to acquire near existential, and/or existential biometric information sets that third parties may use to authenticate them at higher rigor levels.
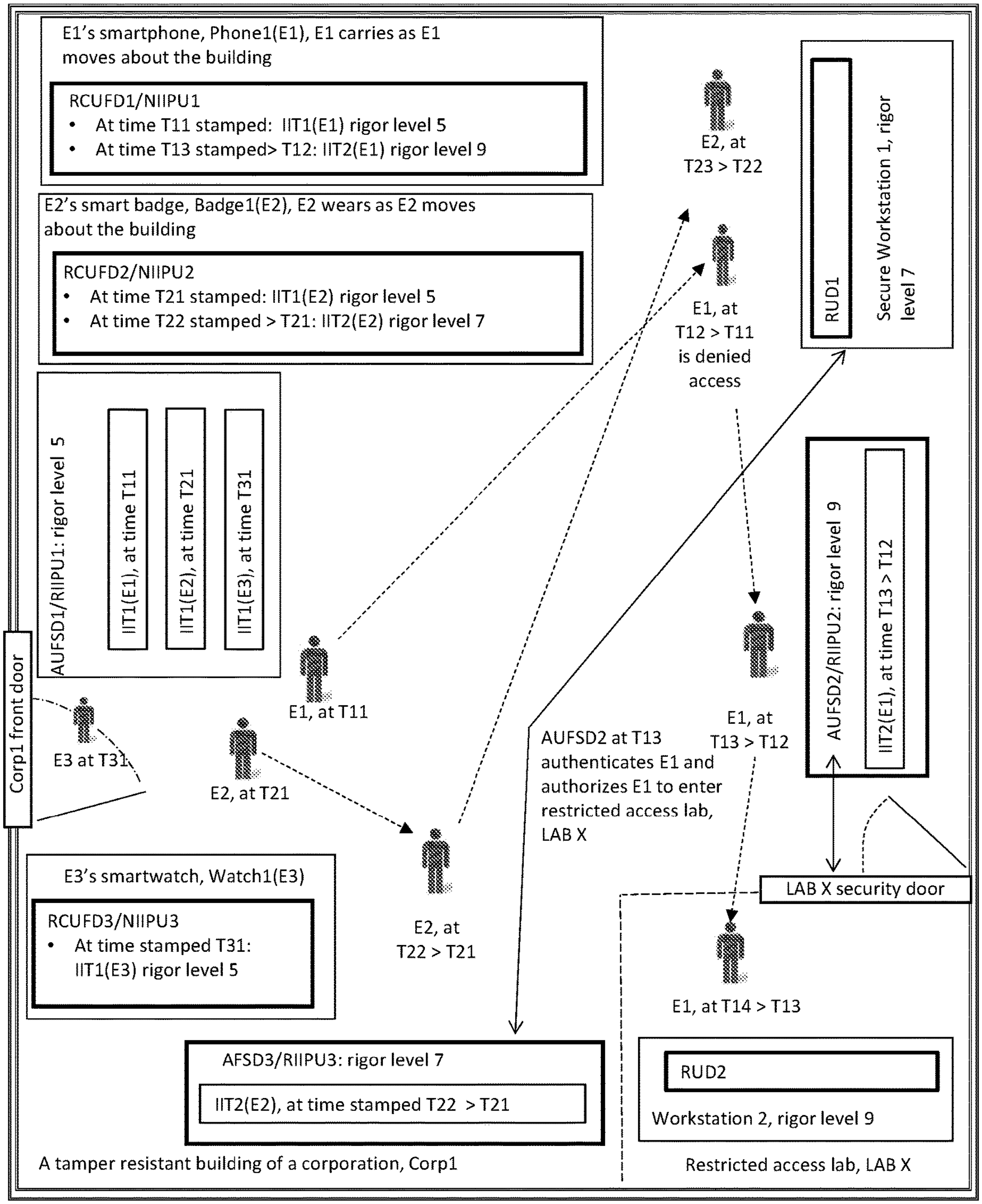

Figure 11: Non-limiting example of personal devices of a person providing such person's personal & work-related identification information sets for E/A governance, where such personal devices participate in both home & employer EBInet subnetwork activities in accordance with such subnetworks' and/or other services', and/or devices', respective policies

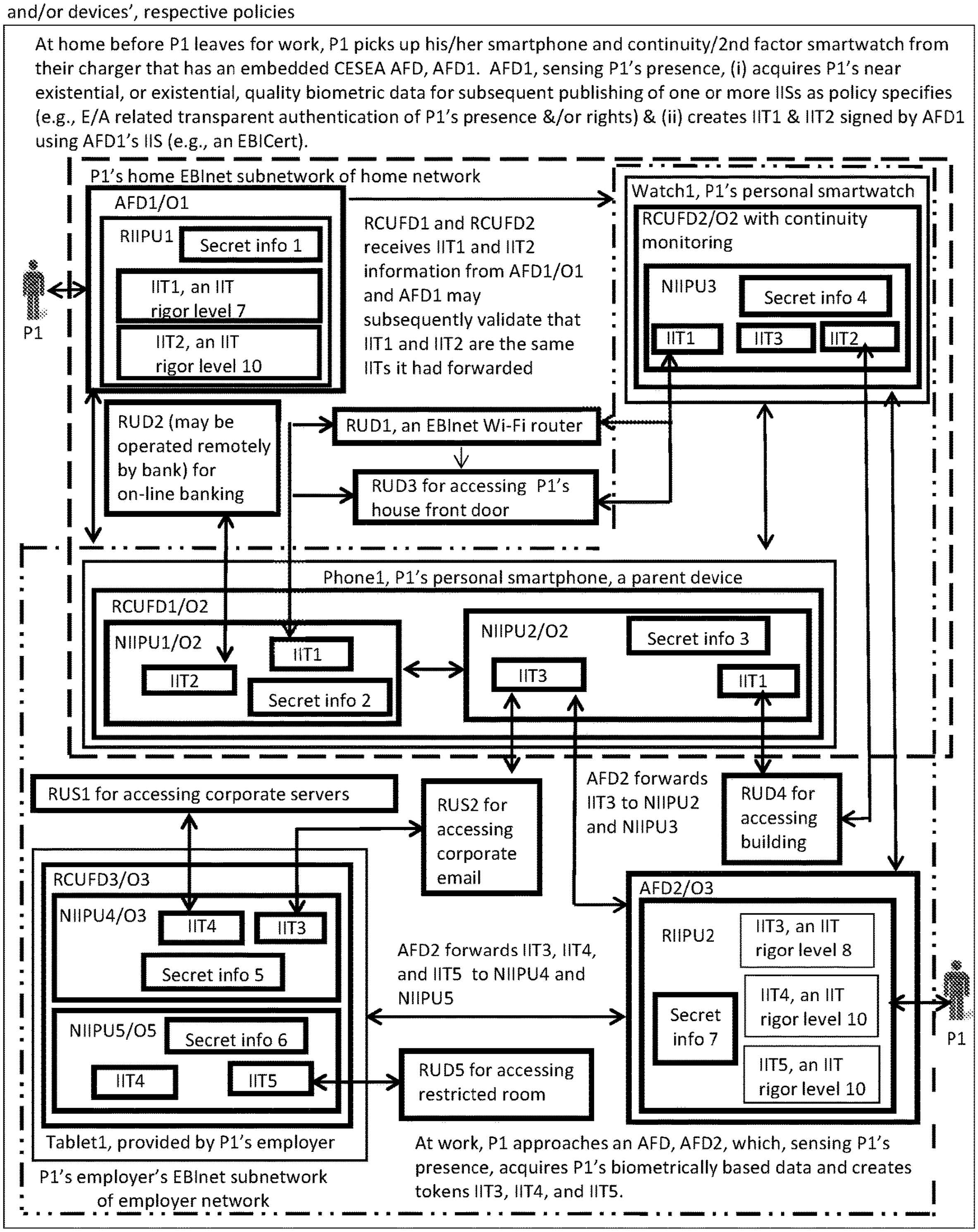

Figure 12: Non-limiting embodiment of a pBIDE environment that enables a person to employ a local TIIRS to transparently govern the use of IISs/IITs for controlling home located appliances, where such governing includes forwarding situationally appropriate IISs/IITs for different event/activity instances, such as IIT1 for social networking, IIT2 for accessing streaming services (such as Netflix, Disney+ and/or the like), and IIT3 for on-line banking and interacting with P1's employer computing environment

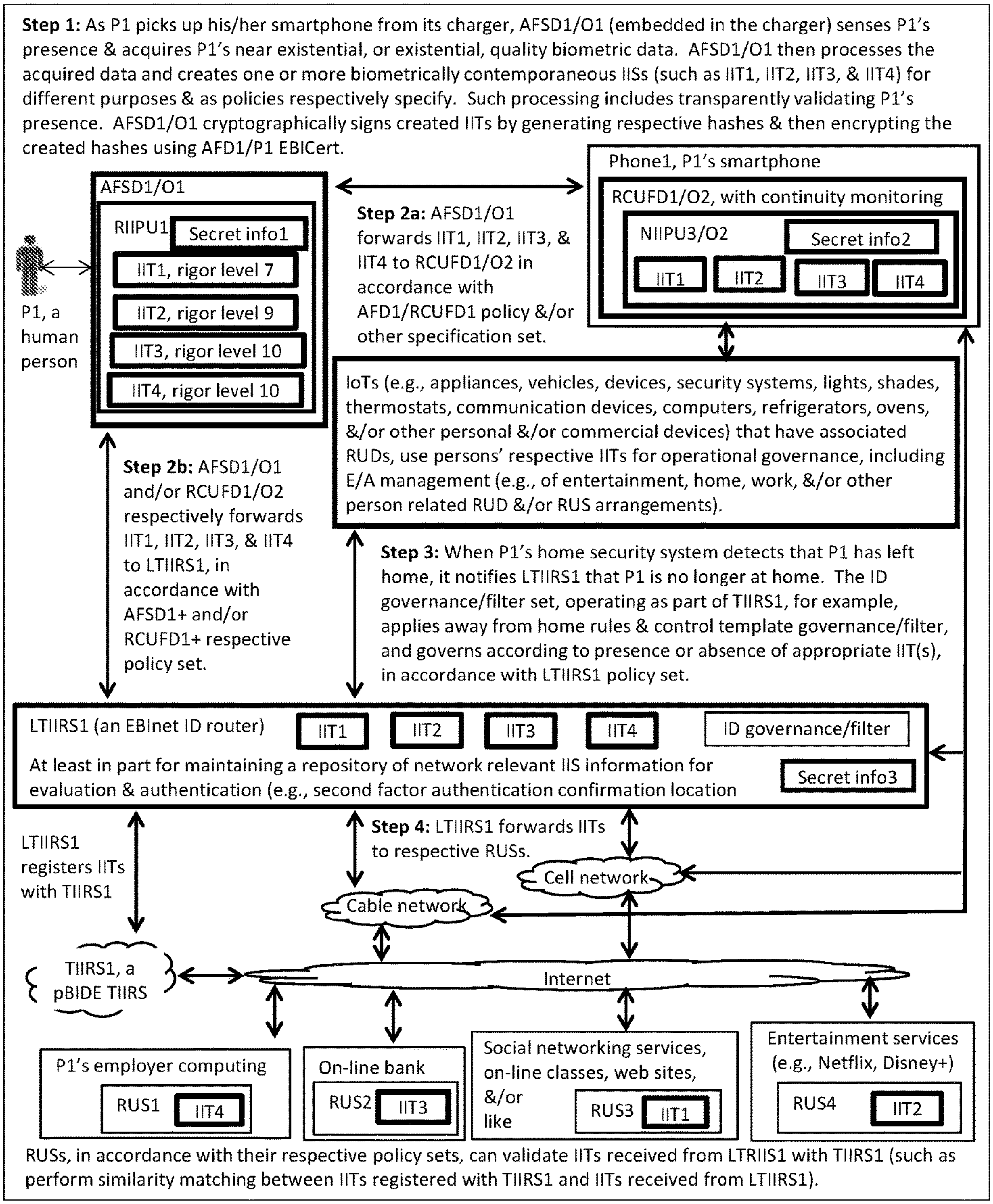

Figure 13: Non-limiting example embodiment showing a fused entity comprising a user, U1, and an associated RCUFD, RCUFD1/O1, generating and registering its EBICert
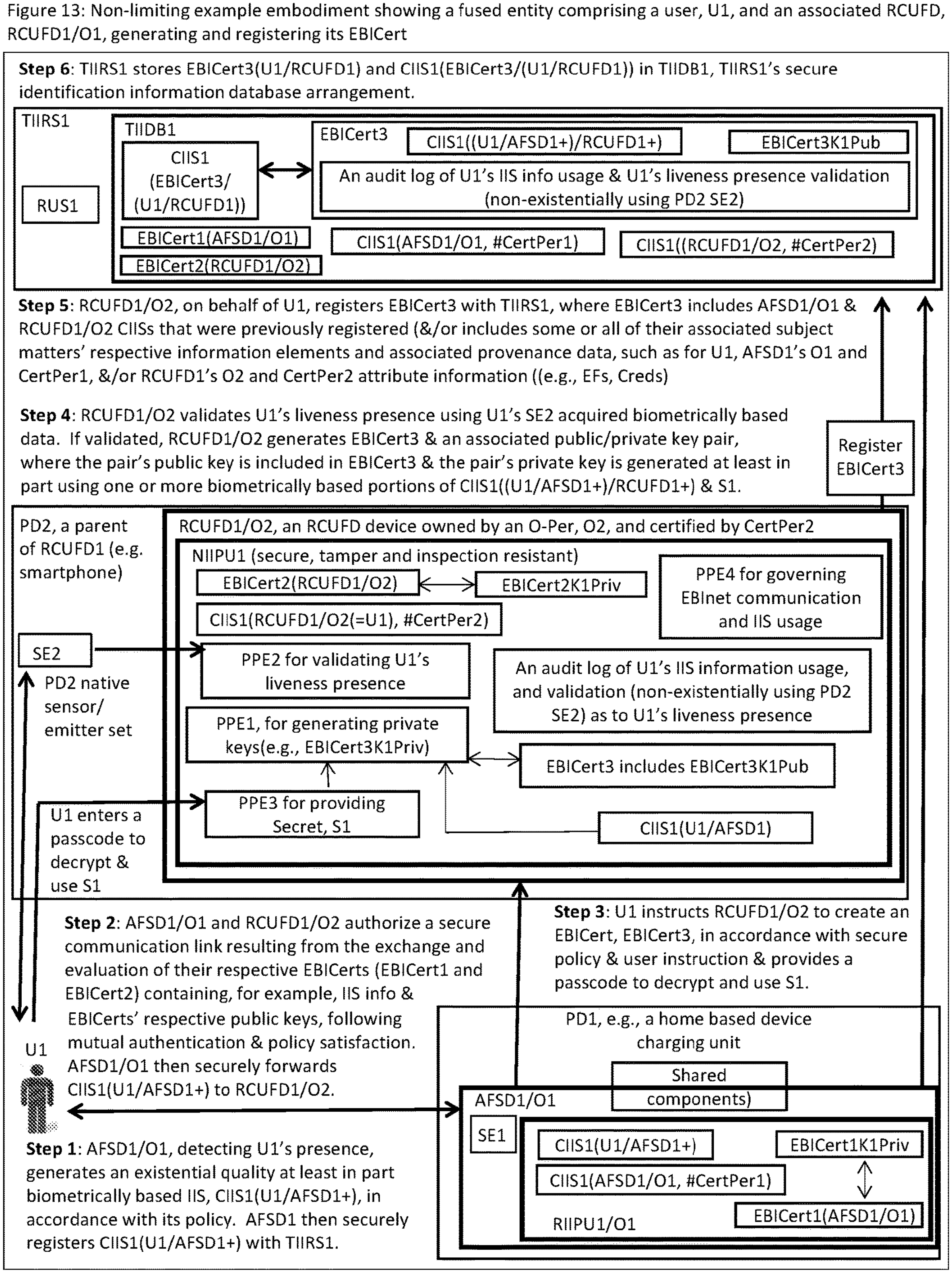

Figure 14: Non-limiting example embodiment showing a RCUFD device, RCUFD1/O2, being used in a high security environment, where RCUFD1/O2 securely discards a private key after use and until such key is subsequently required, & then regenerated
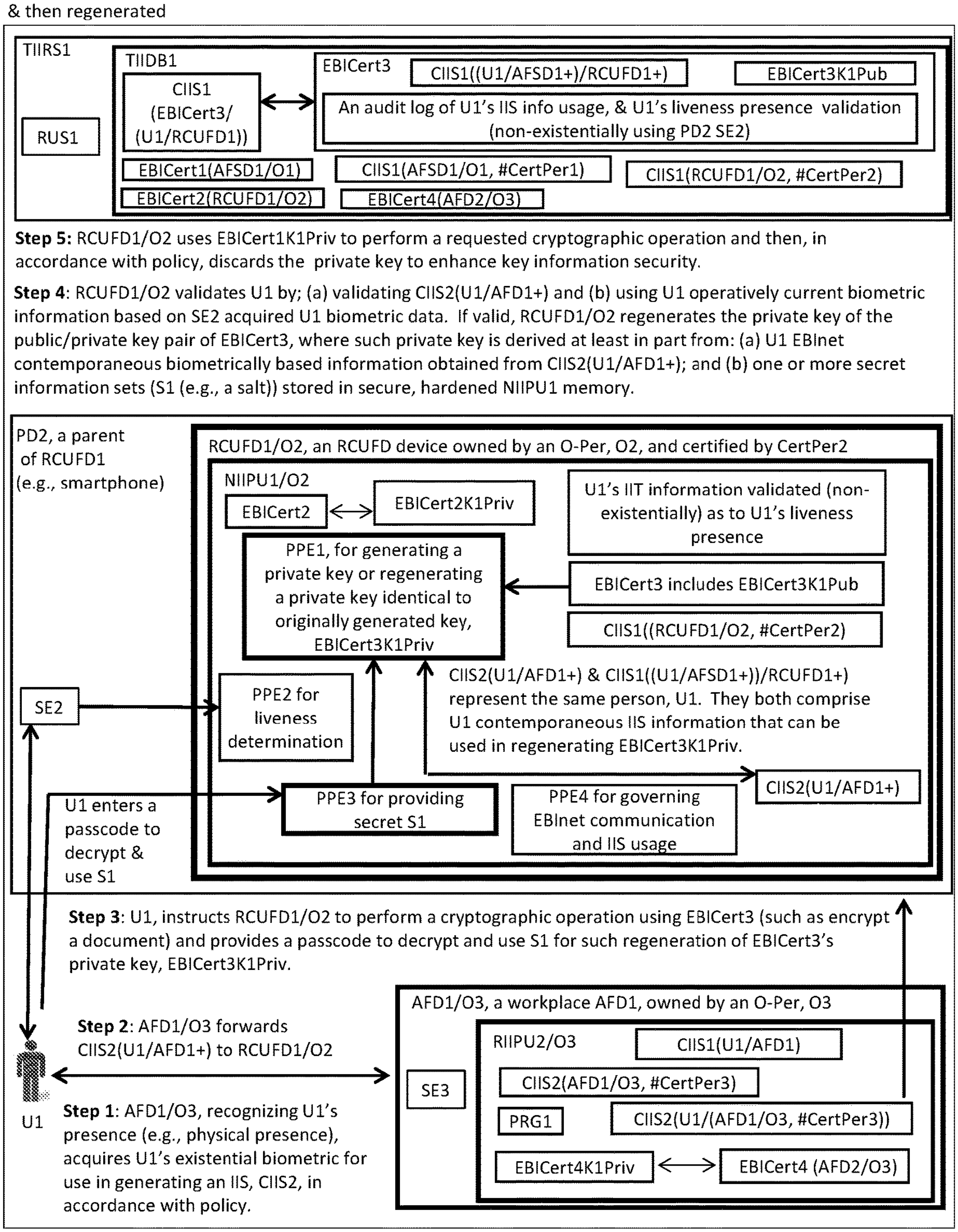

Figure 15A: Non-limiting example embodiment regarding two users, U1 and U2, using their respective RCUFDs to exchange respective EBICerts in anticipation of user U1 sending user U2 a signed document that, after determining U2's liveness/presence during biometric acquisition, only U2 can decrypt.
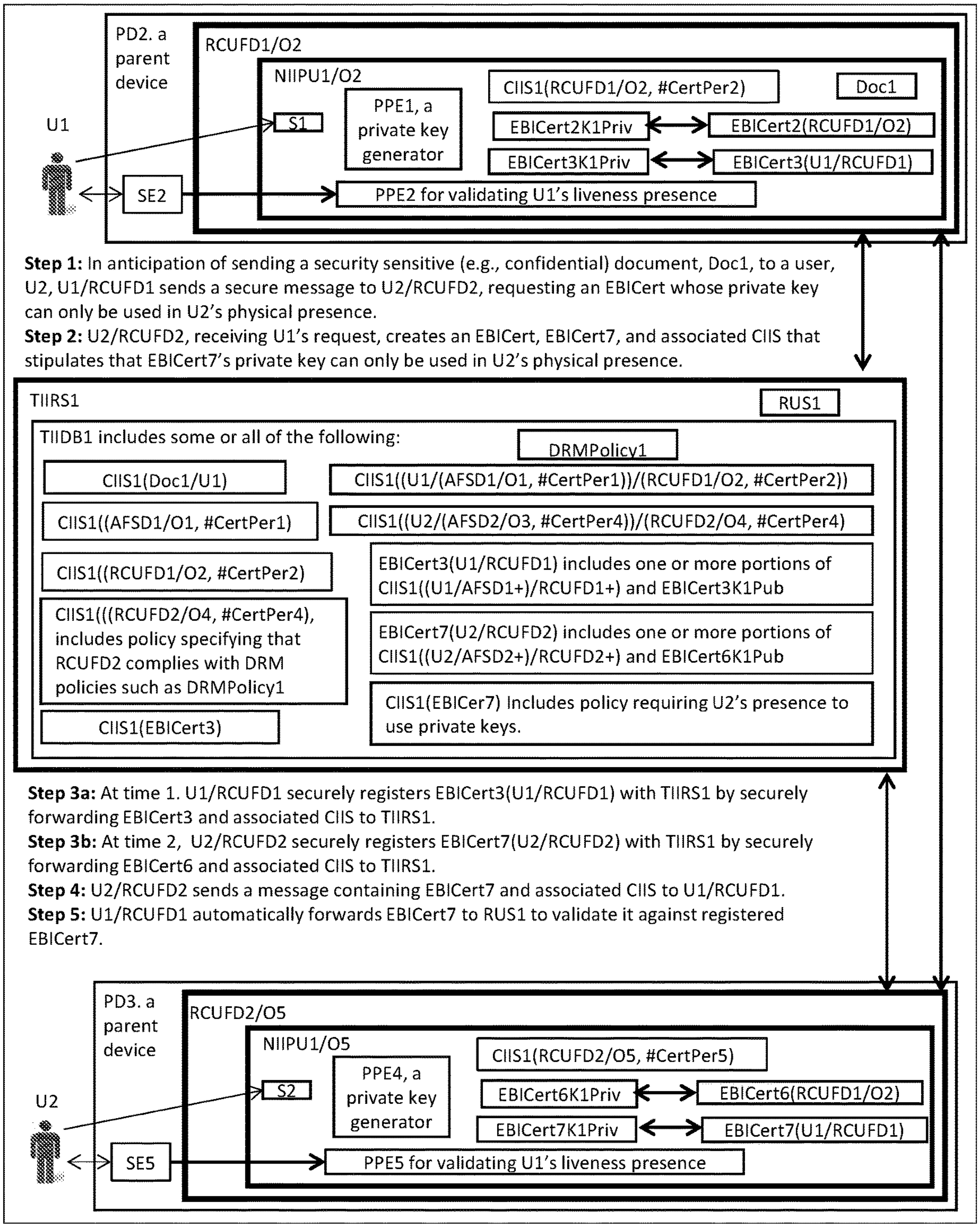

Figure 15B: Non-limiting example embodiment showing U1 employing RCUFD1 to create an EBIbox, EBIbox1 containing a signed and encrypted Doc1 that only U2, can access in cleartext after demonstrating U2's liveness.
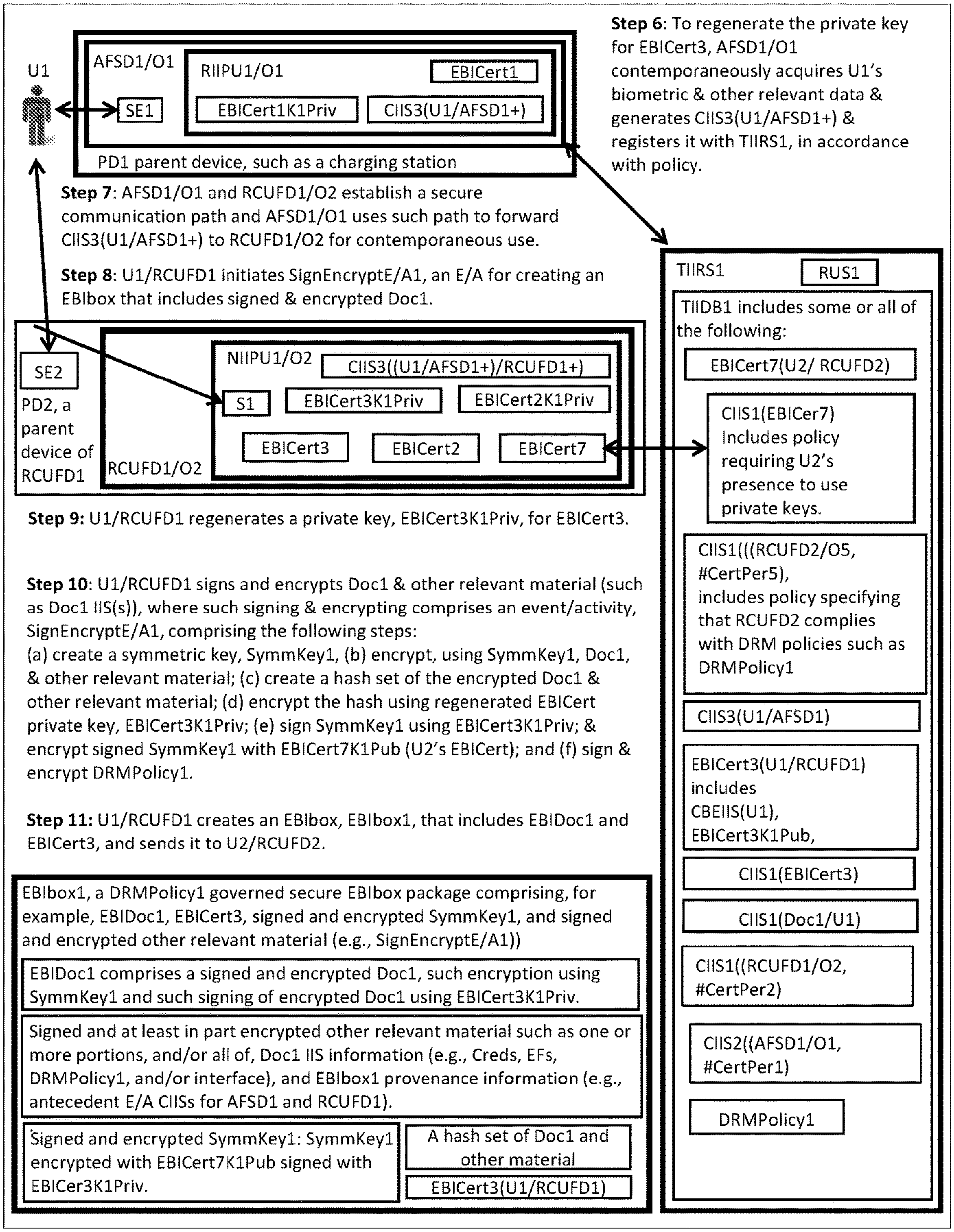

Figure 15C: Non-limiting example embodiment showing U2 decrypting a document, where such decryption requires that U2/RCUFD2 use contemporaneous CIIS for U2 existential, & RCUFD2, identification and SE5/NIIPU2 for U2 biometric identification for physical liveness demonstration and identification confirmation.
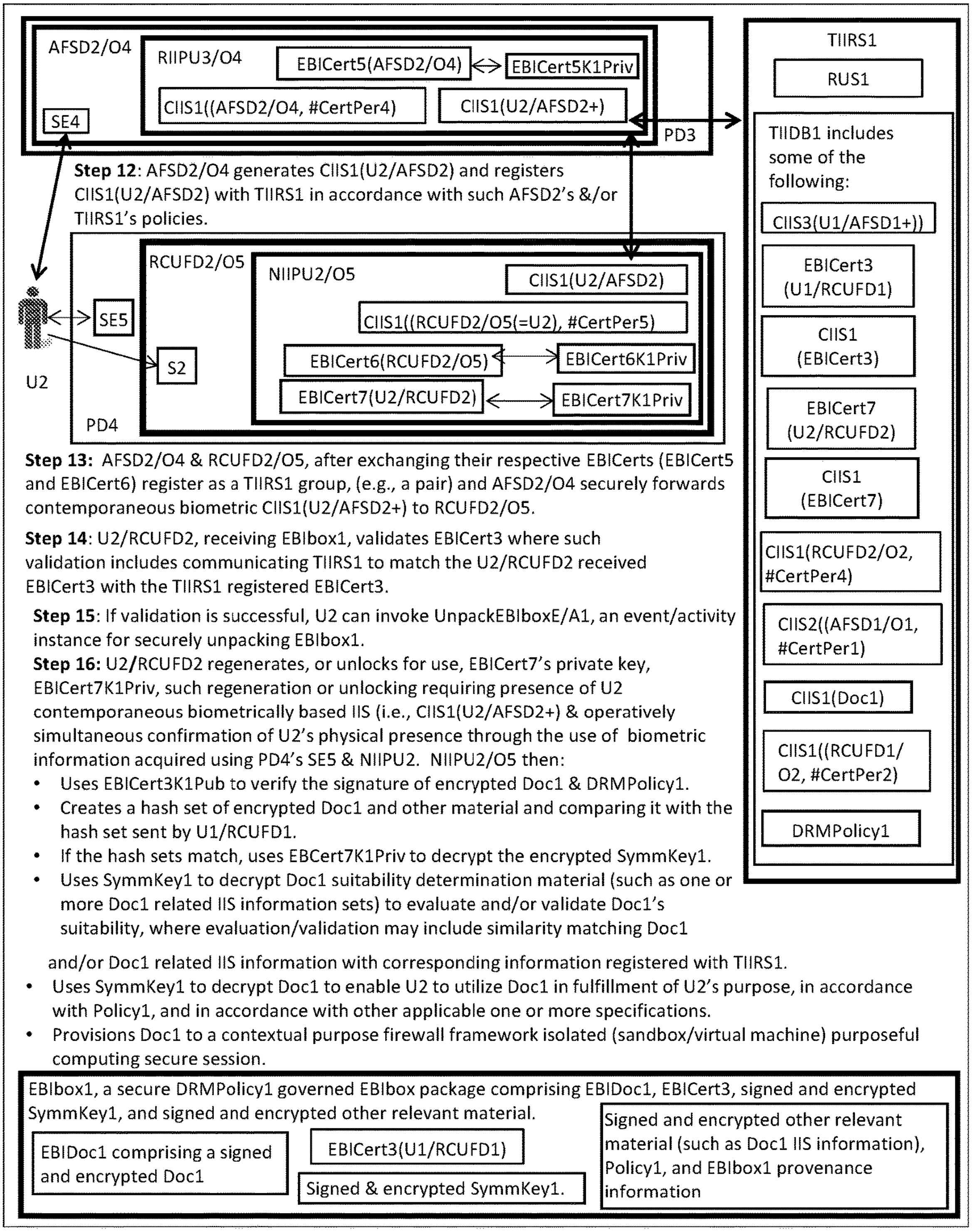

Figure 16: Non-limiting illustrative example of certain EBInet device arrangement secure processes and security hardened elements
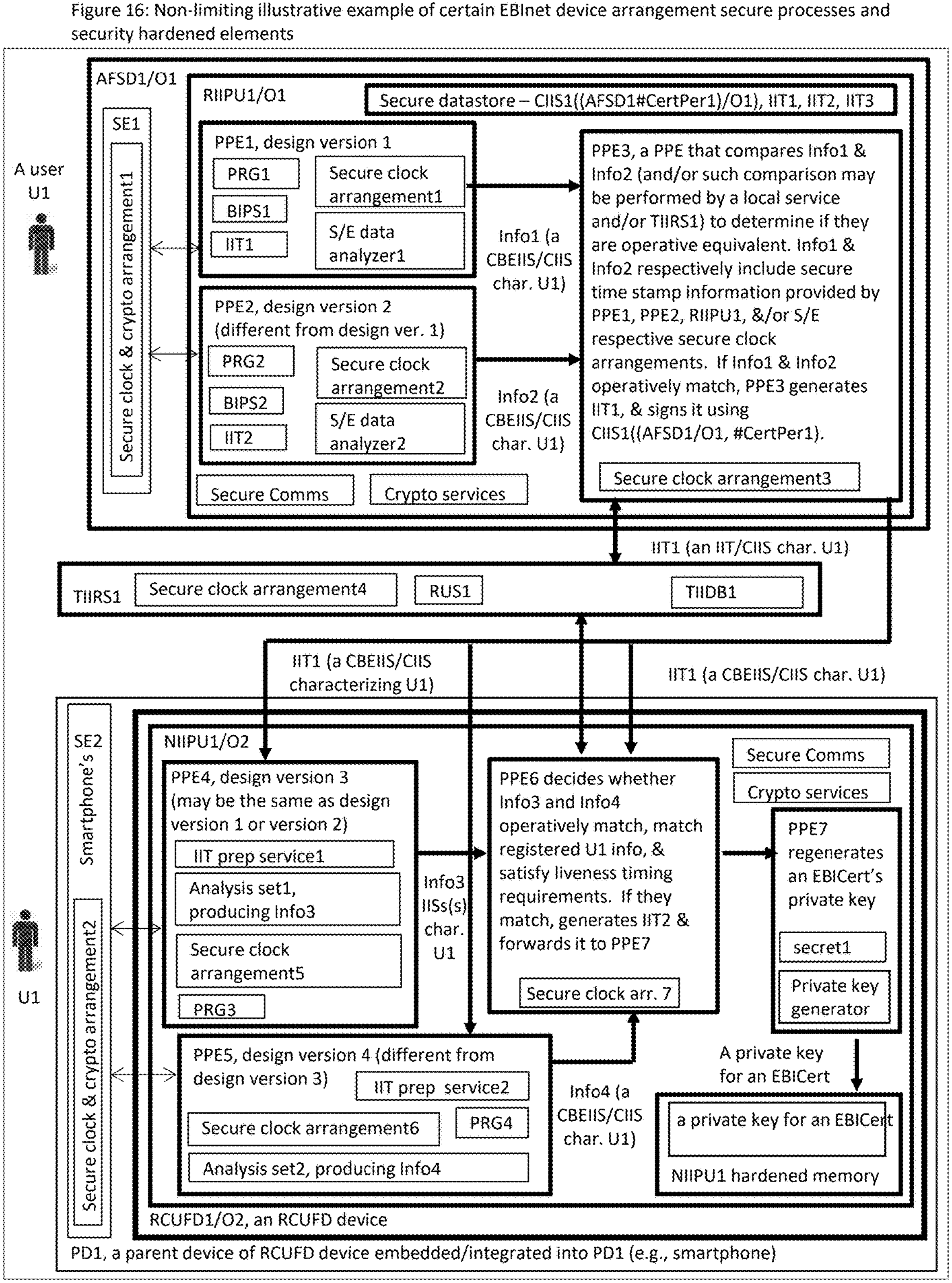

Figure 17: Non-limiting example of an EBInet AFD producing IITs that respective RCFDs receive and forward to RUDs and/or RUSs.
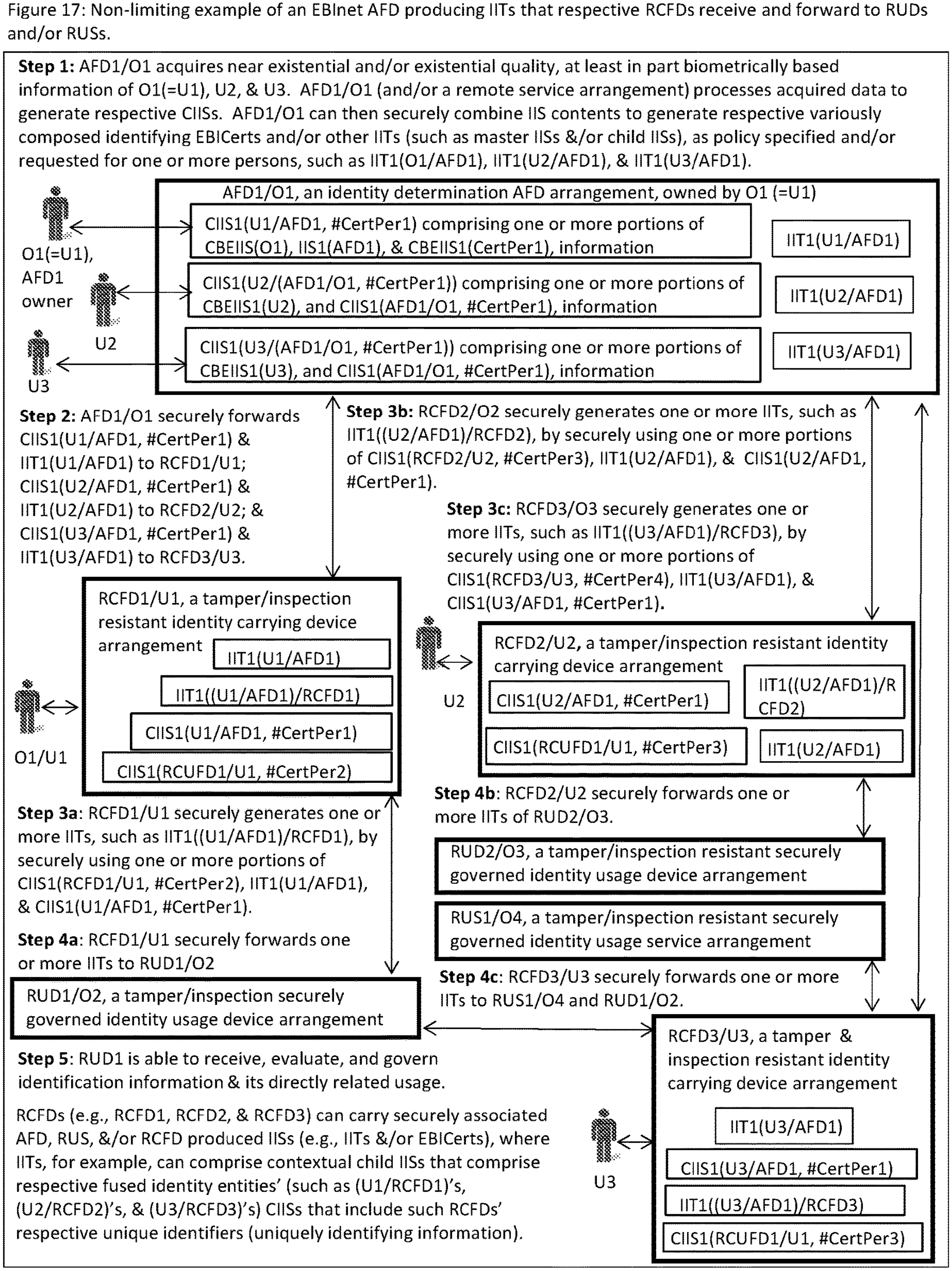

Figure 18A: Illustrative, non-limiting embodiment of an IIT, IIT1, generated by an AFSD, AFSD1. Such IIT is then forwarded to RCUFD1/O2, which, in turn, creates and carries an IIT, IIT2.
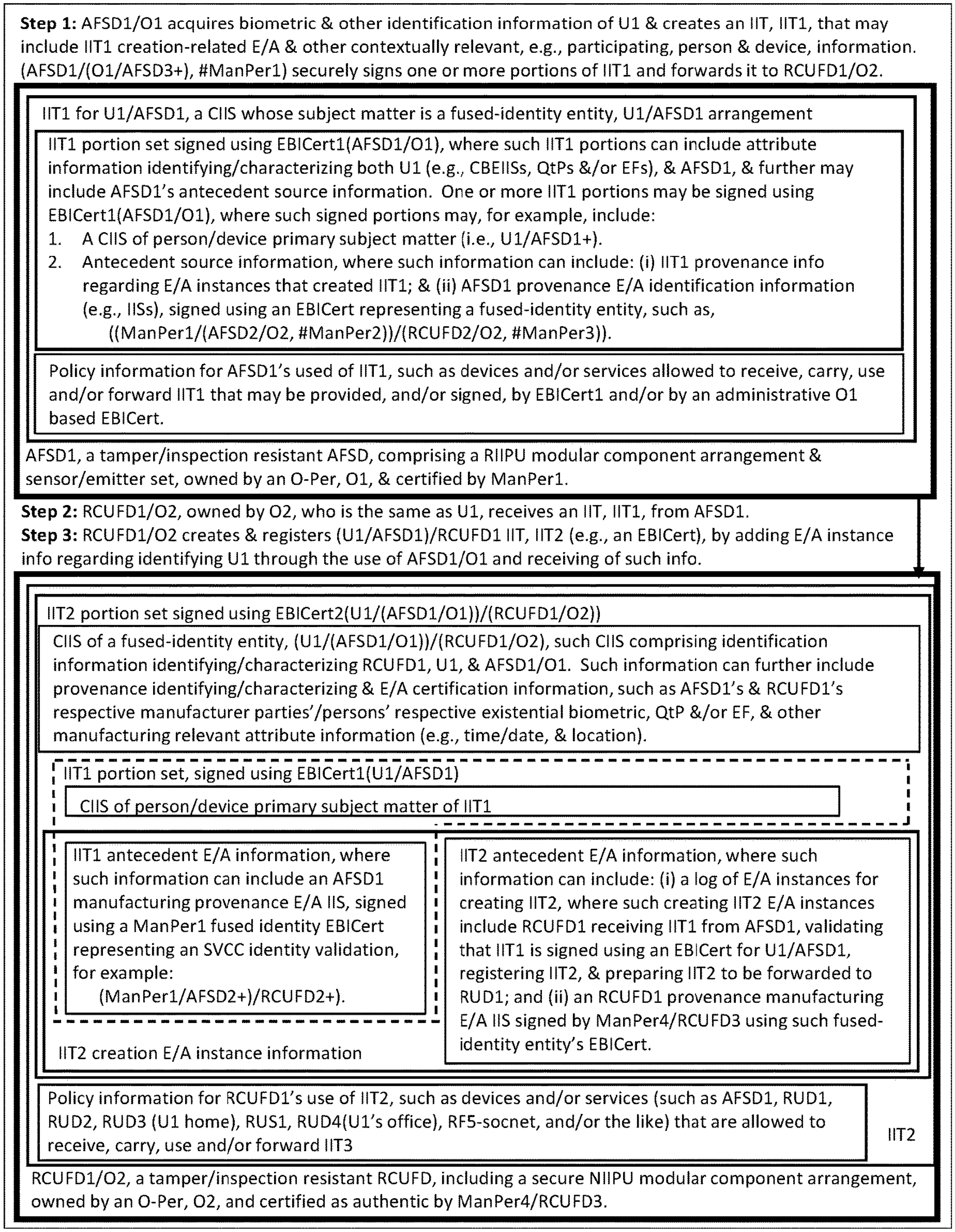

Figure 18B: Continuation of the non-limiting embodiment illustrated by Figure 18A of IITokens being generated, and forwarded from RCUFD1 to RUD1
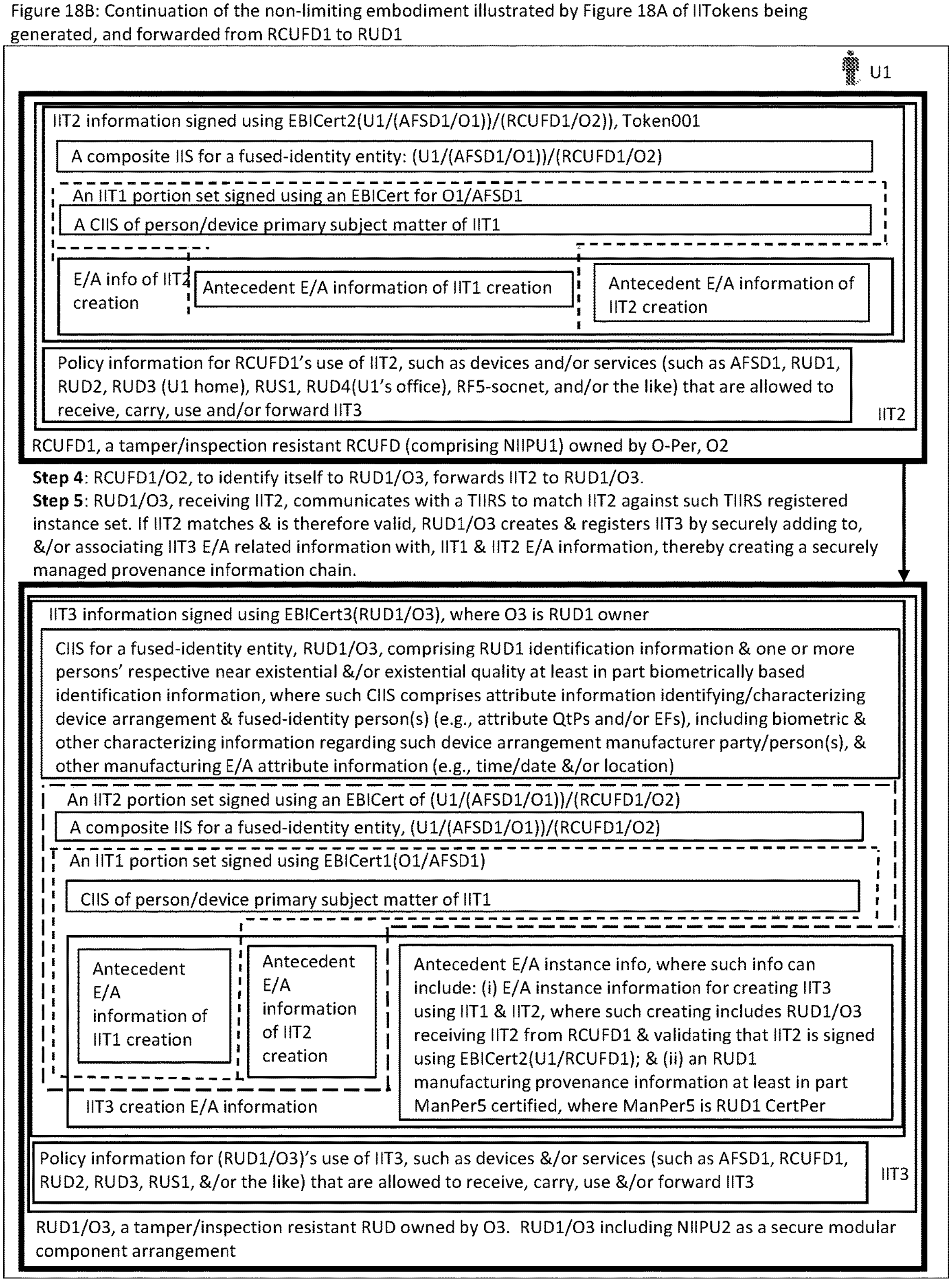

Figure 19A: Illustrative, non-limiting embodiment of IITs being generated, and forwarded from AFSD1 to RCUFD1 to be carried as an IIT

Stk1

Step 1: AFSD1 acquires biometric & other identification information & generates IIT1

IIT1(U1/AFSD1), a CIIS of a fused-identity entity, U1/AFSD1 arrangement

IIT1 portion set signed using EBICert1(AFSD1/O1), where such IIT1 portions can include attribute information identifying/characterizing both U1 (e.g., CBEIISs, QtPs &/or EFs), & AFSD1, & further may include AFSD1's antecedent source information. One or more IIT1 portions may be signed using EBICert(U1/AFSD1), such signed portions may, for example, include:

1. CIIS of person/device primary subject matter (i.e., U1/AFSD1).
2. Antecedent source information, where such information can include: (i) IIT1 provenance related E/A instances, & (ii) AFSD1 provenance E/A identification information (e.g., IISs), signed using a CertPer1 fused identity EBICert representing an identity validation chain, for example: ((ManPer1/(AFSD2/O2, #ManPer2))/(RCUFD2/O3, #ManPer3)).

Policy information for AFSD1's used of IIT1, such as devices and/or services allowed to receive, carry, use and/or forward IIT1 that may be provided, and/or signed, by EBICert1 and/or by an administrative O1 based EBICert AFSD1, a tamper/inspection resistant AFSD, comprising a RIIPU modular component arrangement & sensor/emitter set, owned by an O-Per, O1, & certified by ManPer1.

Step 2: RCUFD1, owned by O2, who is the same person as U1, receives IIT1, from AFSD1.
Step 3: RCUFD1 uses IIT1 to create and register IIT2, comprising: (i) a CIIS of (U1/AFSD1)/RCFD1, where such CIIS1 includes a stipulation that RCUFD1 is carrying IIT1; (ii) antecedent source information, (iii) a policy information set; and (iv) a secure reference to IIT1.

IIT1 and/or one or more IIT1 portions signed by U1/AFSD1 using EBICert1(U1/AFSD1) and forwarded by AFSD1/O1

IIT2 portion set, signed using EBICer2(U1/(AFSD1/O1))/RCUFD1/O2)), where such portion set (i) securely references IIT1; (ii) specifies that RCUFD1/U1 is carrying IIT2; and (iii) comprises the following:

- CIIS of a fused-identity entity, (U1/(AFSD1/O1))/(RCUFD1/O2) arrangement, such CIIS comprising identification information identifying/characterizing RCUFD1, U1, and AFSD1/O1. Such information further includes provenance identifying/characterizing information, such as, for example, AFSD1's and RCUFD1's respective manufacturer parties'/persons' respective QtPs and/or EFs, and other manufacturing relevant, attribute information (e.g., time/date, and location).
- Antecedent E/A instance information, where such information can include: (i) E/A instance information for creating IIT2, where such E/A instances for creating IIT2 include RCUFD1 receiving IIT1 from AFSD1, validating IIT1, registering IIT2, & preparing IIT2 to be forwarded to RUD1; and (ii) an RCUFD1 manufacturing provenance E/A IIS signed by ManPer4, an RCUFD1 manufacturer human agent who certified RCUFD1.

Policy information for RCUFD1's use of IIT2, such as devices and/or services (such as AFSD1, RUD1, RUD2, RUD3 (U1 home), RUS1, RUD4 (U1's office), RF5-socnet, and/or the like) that are allowed to receive, carry, use and/or forward IIT3

RCUFD1/O2, a tamper/inspection resistant RCUFD, comprising a NIIPU modular component arrangement, owned by an O-Per, O2, and certified by ManPer4.

Figure 19B: Continuation of the non-limiting embodiment illustrated by Figure 19A, of IITs being generated, and forwarded from RCUFD1 to RUD1 to be used to govern an E/A instance IIT1 and/or an IIT portion set signed by U1/AFSD1 using EBICert1(U1/AFSD1)

IIT2 portion set signed by U1/RCUFD1 using EBICert2(U1/(AFSD1/O1))/(RCUFD1/O2))

Policy information for RCUFD1's use of IIT2, such as devices and/or services (such as AFSD1, RUD1, RUD2, RUD3 (U1 home), RUS1, RUD4(U1's office), RF5-socnet, and/or the like) that are allowed to receive, carry, use and/or forward IIT3

IIT2

RCUFD1, a tamper/inspection resistant RCUFD, comprising a NIIPU modular component arrangement, owned by an O-Per, O2, and certified by ManPer4.

Step 4: RUD1 receives IIT1 and IIT2 either individually and/or collectively from RCUFD1

Step 5: RUD1 forms an IIToken, IIT3, comprising: (i) an assertion stating that RUD1 is using IIT1 to govern E/A instances, based on Stk1's CBEIISs and/or AFSD1 CIISs included in IIT1; (ii) composite RUD1 arrangement IIS; and (iii) securely references a signed IIT1 portion set IIT1, or one or more IIT1 portions, signed by U1/AFSD1 using EBICert1(U1/AFSD1)

IIT2, or one or more IIT2 portions, signed by U1/RCUFD1 using EBICert2(U1/(AFSD1/O1))/(RCUFD1/O2))

IIT3 portion set signed using EBICert3( RUD1/O3), where O3 is RUD1 O-Per and such portion set:
(i) securely references the IIT1 portion set signed by O1/AFSD1 using EBICert1(O1/AFSD1);
(ii) securely references IIT2 or one or more IIT2 portions signed by U1/RCUFD1 using EBICert2(U1/AFSD1/O1))//(RCUFD1/O2))
(iii) specifies that RUD1/O2 is carrying IIT3; and (iv) comprises:

- A CIIS for a fused-identity entity, RUD1/O3, comprising one or more RUD1 arrangement IISs and one or more persons' respective CBEIISs , such CIIS comprises attribute information identifying/characterizing device arrangement and person(s) (e.g., attribute QtPs and/or EFs), including information comprising identifying/characterizing such device arrangement manufacturer party/person identifying/characterizing information, and other manufacturing information (e.g., time/date, and location).
- Antecedent E/A instance info, where such info can include: (i) E/A instance information for creating IIT3, such creating includes RUD1/O2 receiving IIT2 from RCUFD1 and checking that IIT2 is signed using an EBICert for U1/RCUFD1; and (ii) an RUD1 manufacturing provenance information at least in part ManPer5 certified, where ManPer5 is RUD1 CertPer.

Policy information for RUD1's use of IIT3, such as devices and/or services (such as AFSD1, RCUFD1, RUD2, RUD3, RUS1, and/or the like) that are allowed to receive, carry, use and/or forward IIT3

IIT3

Tamper/inspection resistant RUD1 comprising NIIPU2 as a modular component arrangement Figure 20: Non-limiting illustrative example embodiment of TIIRS provenance information storage and use event/activity set that stores provenance information in the cloud and/or local cloud and uses such provenance information for matching, suitability analysis, and policy fulfillment.
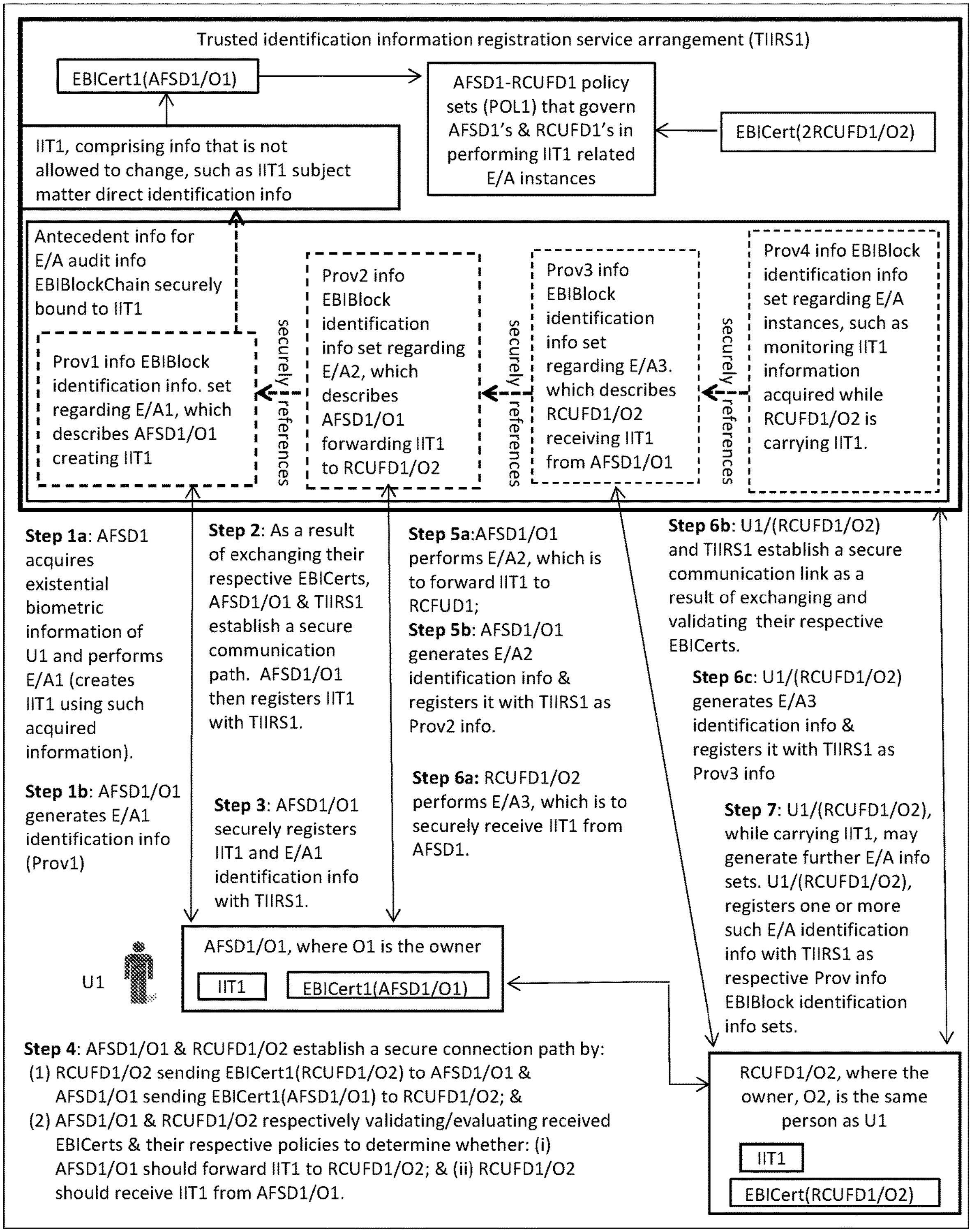

Figure 21: Non-limiting example of an identity governed EBISeal fabric for providing supply chain and operational integrity assurance framework that avoids and/or repels unauthorized entities' (e.g., persons'/parties') attacks on computing environments by securely creating, and limiting modifications to, software/firmware/hardware (s/f/h), and where the types of authorized creations and modifications are performed only by registered and/or expressly authorized, existentially biometrically identified persons in accordance with EBISeal/IGF specification sets.

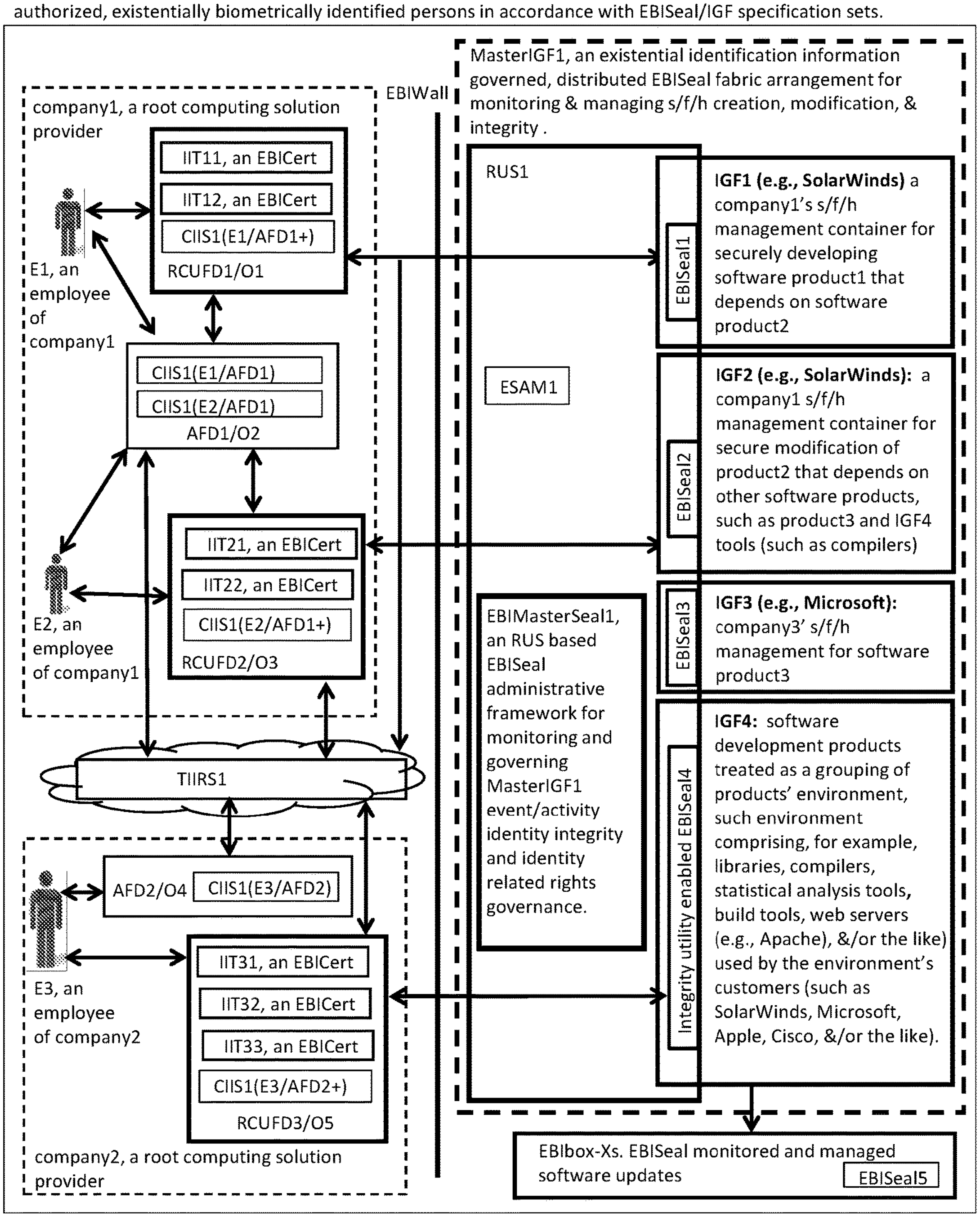

Figure 22: Non-limiting example of an identity governed fabric (IGF) for providing supply chain, and operational integrity, computer identity/security framework for resisting and repelling unauthorized persons' attacks on computing software and hardware environments. The framework limits software/firmware modifications to those modifications performed by existentially identified registered and/or expressly authorized/approved persons (e.g., in accordance with specification sets and/or instructions)

Step 1: AFD1/O1 senses physical presence of E1 & creates in part, a near existential or existential quality biometrically based CIIS, CIIS1(E1/AFD1+). AFD1/O1 forwards & registers CIIS1 with TIIRS1 and forwards it to RCUFD1/E1.

Step 2: RCUFD1/E1, receiving CIIS1(E1/AFD1+), creates IIT11 & IIT12, which are IITs used as EBICerts (have respective public/private keys), where such EBICerts are in part derived from CIIS1(E1/AFD1+). RCUFD1/E1 then forwards such IITs to, & registers them with, TIIRS1.

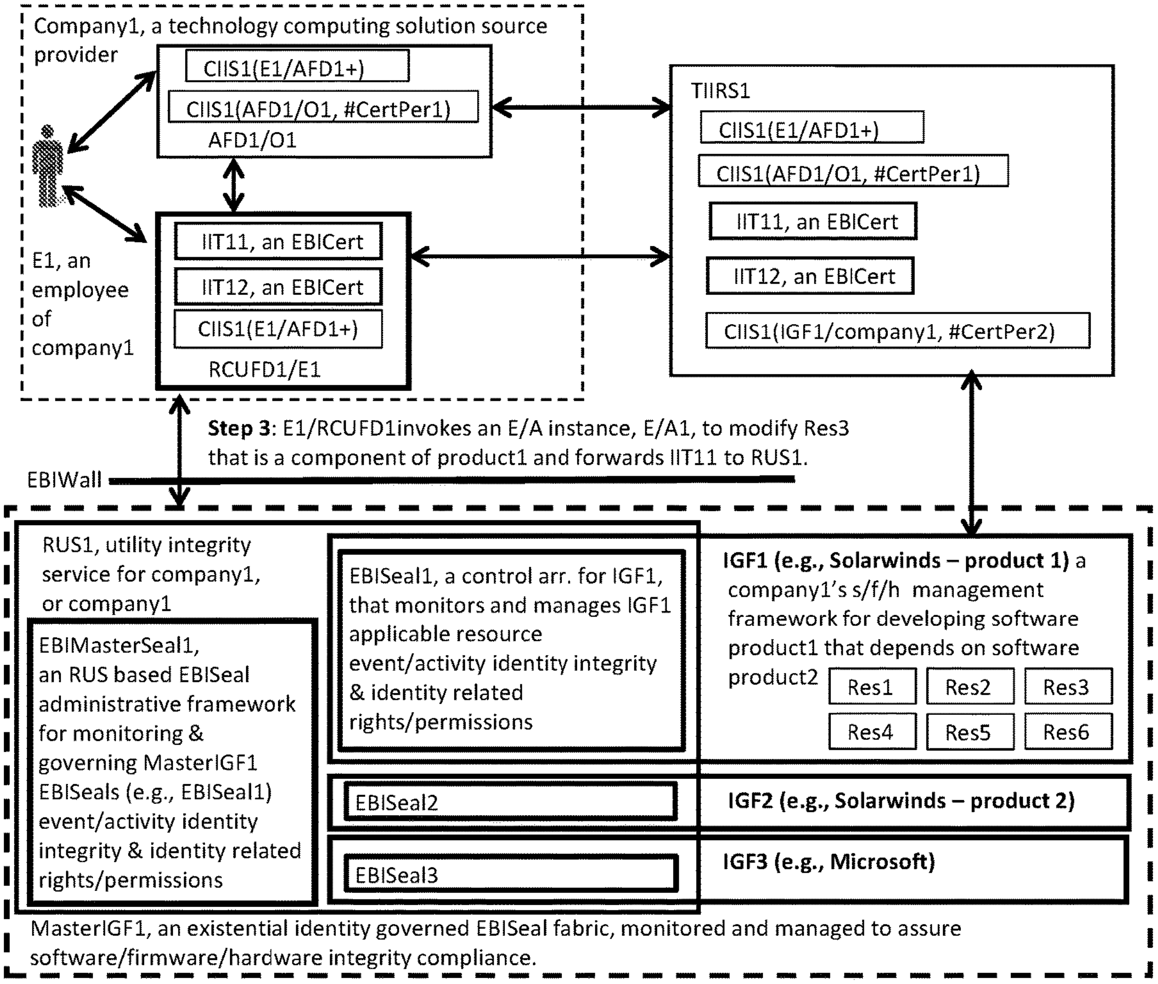

Step 4: EBIMasterSeal1 securely monitors and governs EBIMasterSeal1 associated E/A1 processing, such as: (i) Interacting with TIIRS1 to validate IIT11 using a secure RUS (e.g., NIIPU managed) hardware/software arrangement; (ii) validating that E1/RCUFD1 is authorized to perform E/A1, such as interacting with IGF1; and (iii) limiting E1/RCUFD1's interaction with MasterIGF1 to interacting with IGF1.

Step 5: EBISeal1 securely monitors and governs E1' E/A1 processing, where such governance can include: (i) validating E1/RCUFD1 is authorized to modify Res3 using a NIIPU managed hardware/software arrangement; (ii) ensuring E1/RCUFD1 signs modified Res3 with IIT11 (an EBICert) at the completion of each modification (e.g., modifying Res3).

Figure 23: Non-limiting example of a provenance/validation authority chain of IISs that supports identification authorization sequence for provenance information used in certifying SVCC EBInet device arrangement audit sequence for RFD1 (using devices' respective manufacturing and retail persons' respective near existential and/or existential quality at least in part biometrically based IISs), such audit sequence comprised of sets of contextually appropriate SVCC sequence instances' audit relevant IISs.

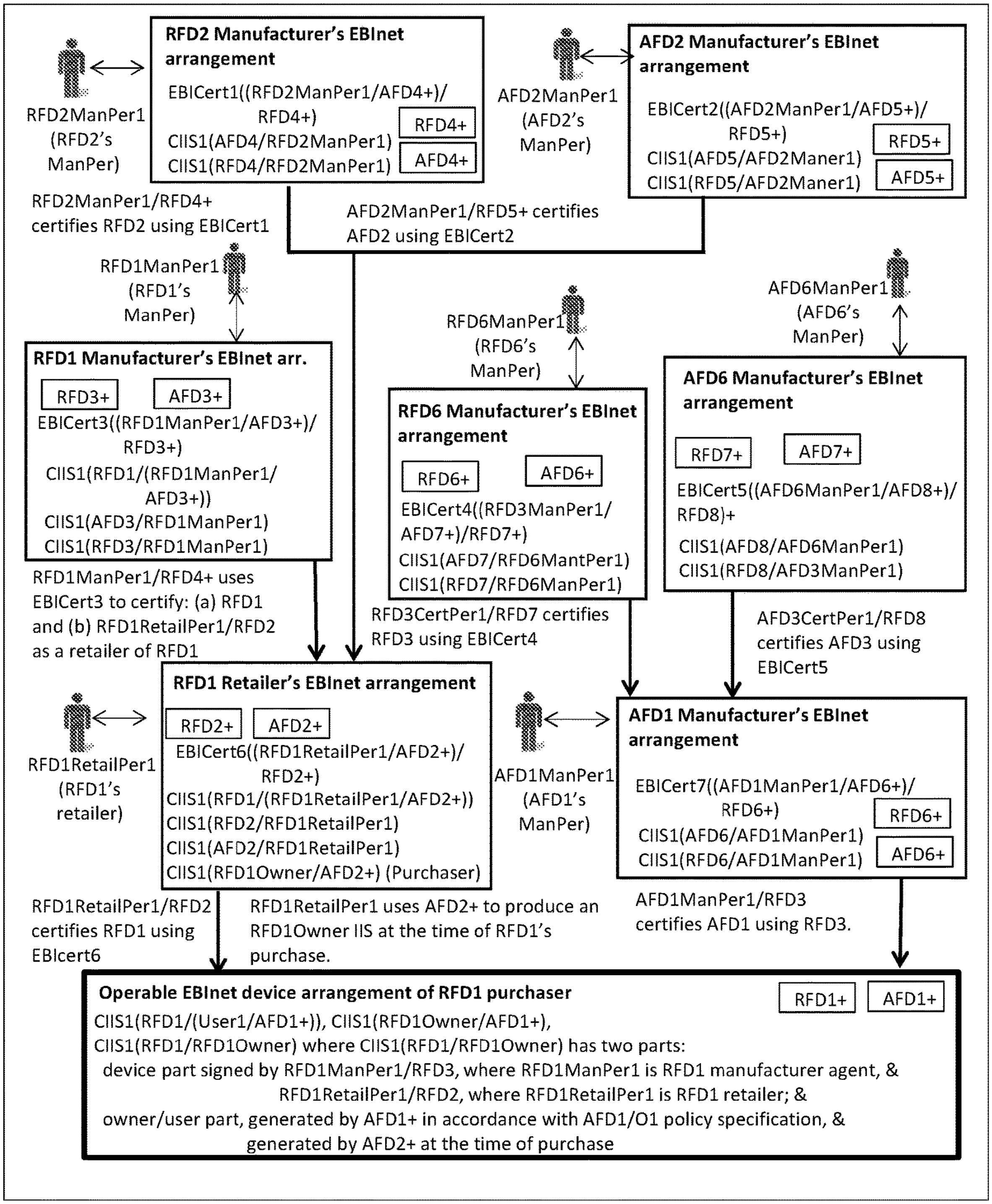

Figure 24: Non-limiting example of information instances of a provenance/validation authority chain of IISs that supports identification authorization sequence for provenance information used in certifying SVCC EBInet device arrangement audit sequence for RFD1 (using devices' respective manufacturing and retail persons' respective near existential and/or existential quality at least in part biometrically based IISs), such audit sequence comprised of sets of contextually appropriate SVCC sequence instances' audit relevant IISs.

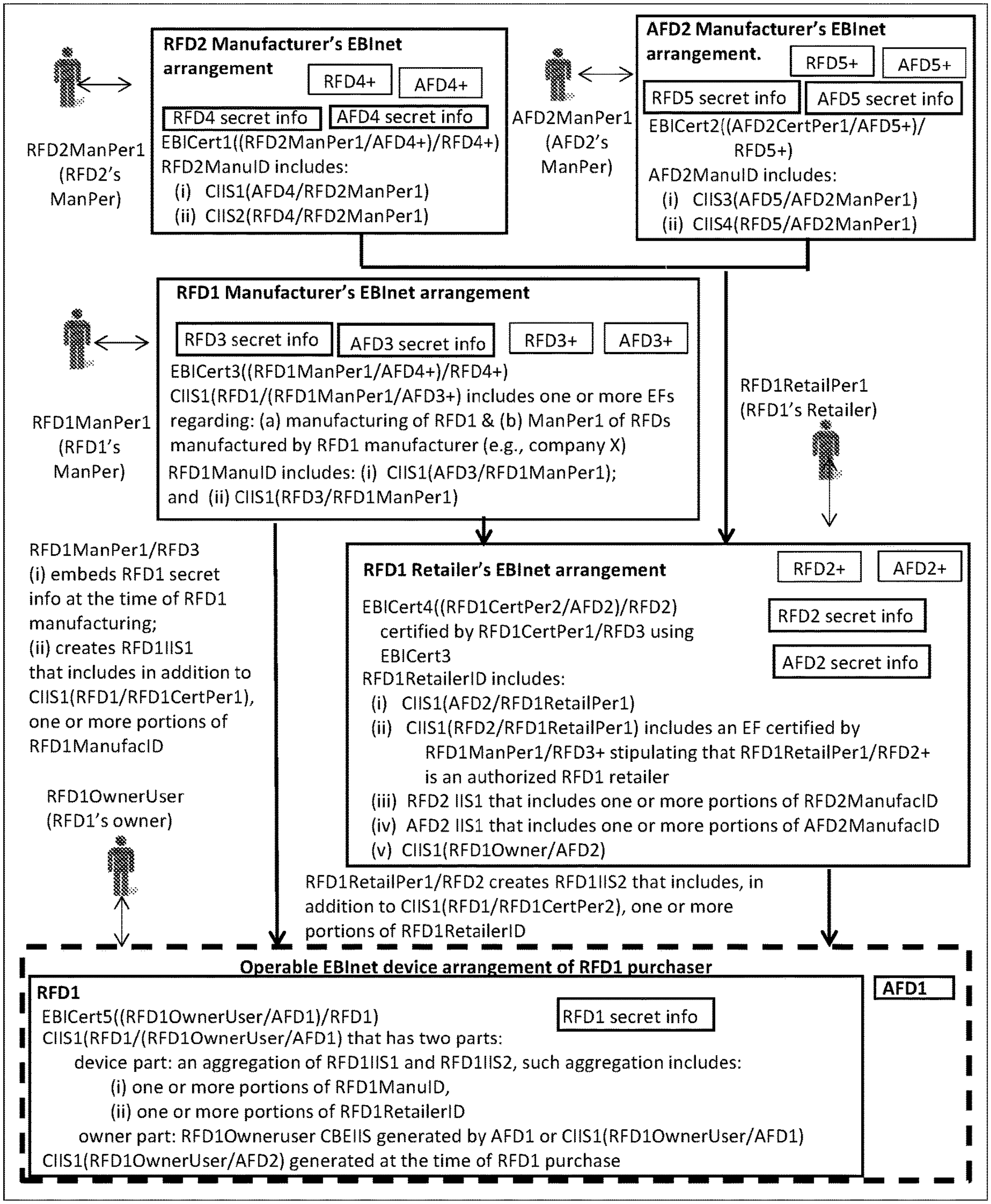

Figure 25A: Non-limiting example table comprising a list of device arrangements illustrated in Figures 26 - 28, such device arrangements' respective owners and users.

| Device | Owner, where an owner is a person or an owner agent person | User |
|---|---|---|
| RCFD1 | O1, RCFD1 purchaser | O1 uses RCFD1 to register CIIS1(RCFD1/O1, #ManPer2) with one or more TIIRS arrangements (E/A8), such CIIS includes one or more portions of CIIS1(O1/AFD1, #ManPer1) produced by E/A7 |
| AFD1 | O1 | O1, who previously acquired AFD1, uses AFD1 to generate CIIS1(O1/AFD1, #ManPer1) (E/A7) |
| RCFD2 | O2 may be the same person as RetailPer1 | RCFD used by RCFD1 retailer.<br>RetailPer1 uses RCFD2/O2 to certify O1's acquisition of RCFD1 using a carried EBICert, (EBICert1((RetailPer1/(AFD2/O3, #CertPer1)/ (RCFD2/O2, #CertPer2)) |
| AFD2 | O3 may be the same person as RetailPer1 | RetailPer1 uses AFD2/O3 to generate<br>(i) CIIS1((RetailPer1/(AFD2/O3))/(RCFD2/O2)) (E/A1) and<br>(ii) CIIS1((O1/(AFD2/O3))/(RCFD2/O2)) (E/A2) |
| RCFD3 | O4 | ManPer1 uses RCFD3/O4 to certify AFD1 using a carried EBICert, EBICert2((ManPer1/(AFD3/O5)/(RCFD3/O4)) (E/A7) |
| AFD3 | O5 | ManPer1 uses AFD3/O5 to generate<br>CIIS1((ManPer1/(AFD3/O5)/RCFD3/O4)) (E/A6) |
| RCFD4 | O6 | ManPer2 uses RCFD4/O6 to certify RCFD1 using a carried EBICert, EBICert3((ManPer1/(AFD4/O7))/(RCFD4/O6)) (E/A8) |
| AFD4 | O7 | ManPer2 uses AFD4/O7 to generate CIIS1(ManPer1(AFD4/O7)) |
| RCFD5 | O8 | ManPer3 uses RCFD5/O8 to certify RCFD2 using a carried EBICert, EBICert4(ManPer3/(AFD5/O10)/(RCFD5/O9)) (E/A9) |
| AFD5 | O9 | ManPer3 uses AFD5/O9 to generate CIIS1(ManPer3(AFD5/O9)) |
| RCFD6 | O10 | ManPer4 uses RCFD6/O10 to certify RCFD2 using a carried EBICert, EBICert4(ManPer3/(AFD5/O10)/(RCFD5/O9)) (E/A10) |
| AFD6 | O11 | ManPer4 uses AFD6/O11 to generate CIIS1(ManPer4(AFD6/O11)) |
| RCFD7 | O12 | ManPer5 uses CFD7/O12 to certify RCFD3 using a carried EBICert, EBICert6(ManPer5/(AFD7/O14)/(RCFD7/O13) (E/A11) |
| AFD7 | O13 | ManPer5 uses AFD7/O13 to generate CIIS1(ManPer5(AFD7/O13)) |
| RCFD8 | O14 | ManPer6 uses RCFD8/O14 to certify AFD3 using a carried EBICert, EBICert7((ManPer6/(AFD8/O16)/(RCFD8/O15)) (E/A12) |
| AFD8 | O15 | ManPer6 uses AFD8/O15 to generate CIIS1(ManPer3(AFD8/O15)) |

Figure 25B: Non-limiting example table comprising a list of device arrangements illustrated in Figures 26 - 28, such device arrangements' respective owners and users.

| Device/(owner, certifier) fused identity entity | User |
| --- | --- |
| RCFD1, owned by O1, RCFD1 purchaser; and certified by ManPer2, RCFD1 manufacturer agent person | O1 uses RCFD1 to register CIIS1(RCFD1/O1, #ManPer2) with one or more TIIRS arrangements (E/A10), such CIIS includes one or more portions of CIIS1(O1/AFD1, #ManPer1) produced by E/A9 |
| AFD1, owned by O1, and certified by ManPer1; AFD1 manufacturer agent person | O1, who previously acquired AFD1, uses AFD1 to generate CIIS1(O1/AFD1, #ManPer1) |
| RCFD2, owned by O2, who may be the same person as RetailPer1; certified by CertPer1, an SVCC CertPer | RCFD2/Retailer1 generates (or regenerates the private key of): EBICert1((RetailPer1/(AFD2/O3, #CertPer3))/(RCFD2/O2, #CertPer2))<br><br>RCFD2/Retailer1 generates<br>(i) CIIS1((RetailPer1/(AFD2/O3, #CertPer3))/(RCFD2/O2, #CertPer2)) based on CIIS1(RetailPer1/(AFD2/O3, #CertPer3)) RCFD2/Retailer1 received from AFD2/O3;<br>(ii) CIIS1(RCFD1/O1, #RetailPer1).<br><br>RCFD2/O2 certifies O1's acquisition of RCFD1 using a carried EBICert, (EBICert1((RetailPer1/(AFD2/O3, #CertPer1)/ (RCFD2/O2, #CertPer2)) |
| AFD2, owned by the same person as RetailPer1 | AFD2/O3, recognizing RetailPer1's physical presence, generates CIIS1(RetailPer1/(AFD2/O3, #CertPer3)), where such CIIS includes an EF signed (certified) by ManPer2/RCFD4 stipulating that RetailPer1/RCFD2 is an authorized retailer of RCFD1<br><br>Retailer1 uses AFD2/O3 to acquire O1's near existential or existential quality at least in part biometrically based data to generate CIIS1(O1/AFD2, #RetailPer1) |
| RCFD3, owned by an O-Per, O4 and certified by CertPer4 | RCFD3/ManPer1 certifies AFD1 using a carried EBICert, EBICert2((ManPer1/(AFD3/O5, #CertPer5))/(RCFD3/O4, #CertPer4)) |
| AFD3, owned by an O-Per, O5 and certified by CertPer5 | AFD3/O5 acquires ManPer1's near existential or existential quality at least in part biometrically based data to generate CIIS1(ManPer1/(AFD3/O5, #CertPer5) |
| RCFD4, owned by an O-Per, O6 who may be the same person as ManPer2, and certified by CertPer6 | ManPer2 uses RCFD4/O6 to certify RCFD1 using a carried EBICert, EBICert3((ManPer1/(AFD4/O7))/(RCFD4/O6)) |
| AFD4. owned by an O-Per, O7, who may be the same person as ManPer2 and certified by CertPer7 | ManPer2 uses AFD4/O7 to generate CIIS1(ManPer1(AFD4/O7)) |

Figure 26: Non-limiting example of a provenance/validation authority chain of IISs that supports identification authorization sequence for certifying an EBInet device arrangement, RCFD1
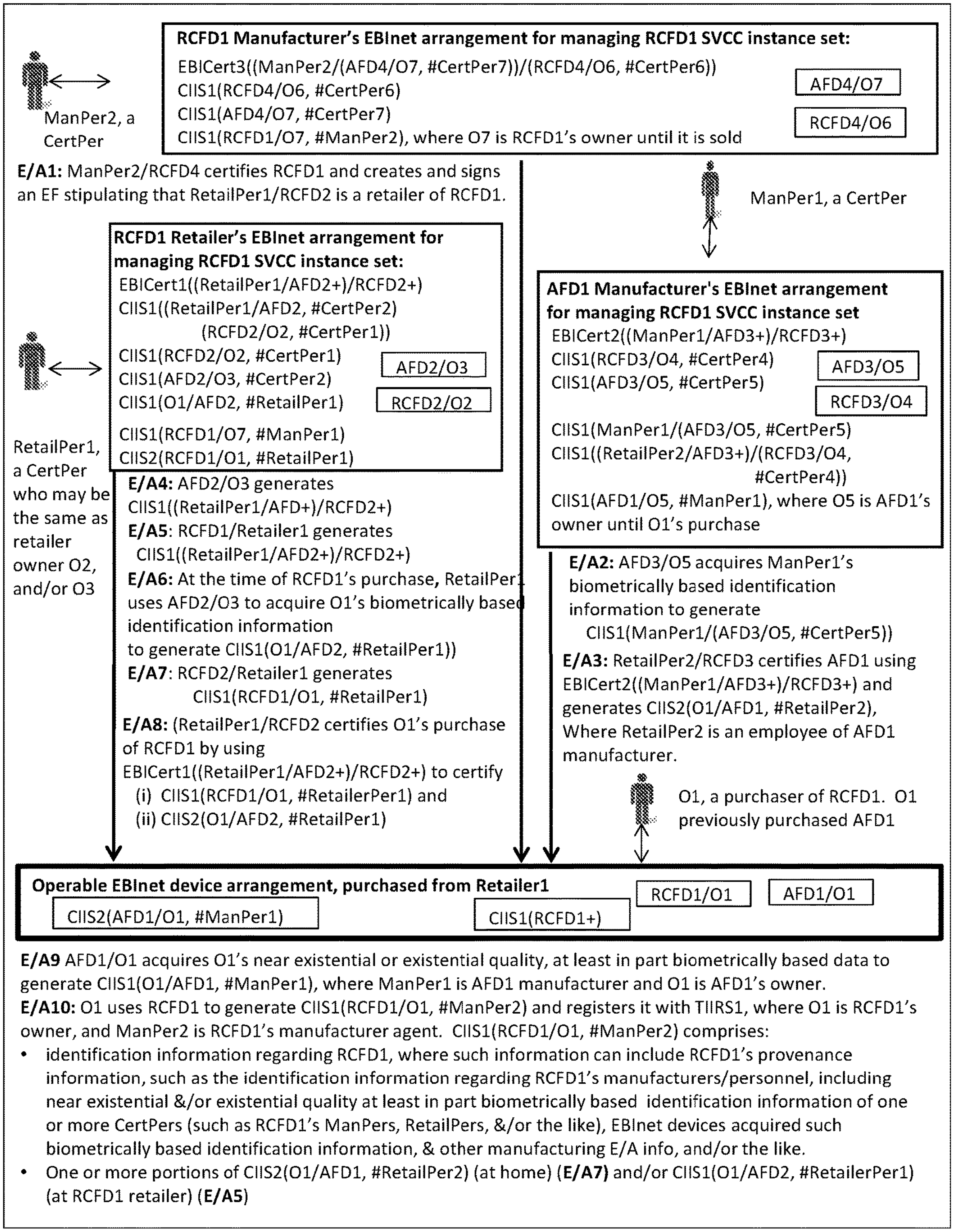

Figure 27: Non-limiting example of retailer identification information including RetailPer1, RCFD2, & ReailerPer1's near existential or existential quality at least in part biometric identification information acquiring device arrangement, AFD2. Such information is used in E/A retail transaction information acquisition and related E/A identity validation/authentication, other evaluation, &/or monitoring/recordation.

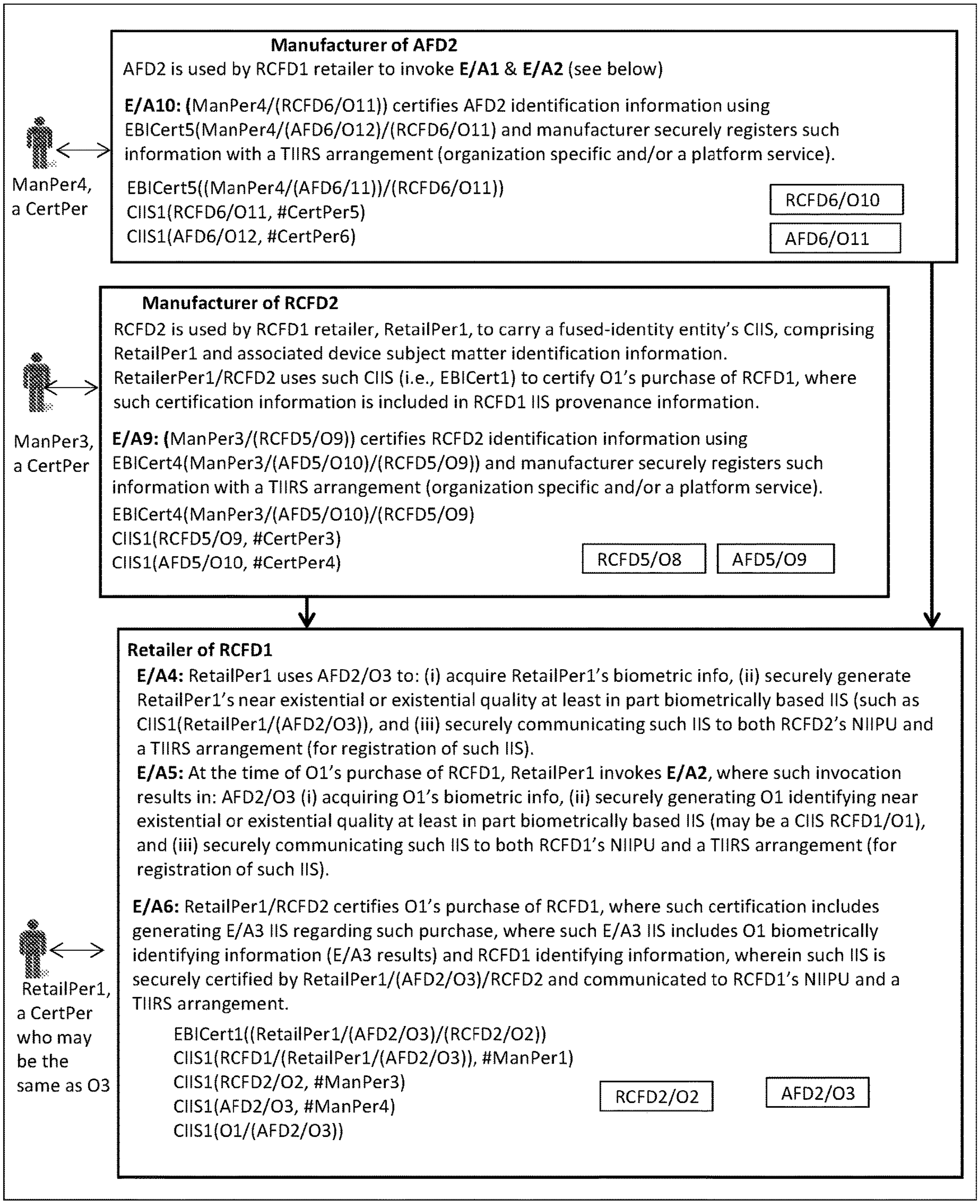

Figure 28: Non-limiting example of AFD1 provenance identification information, wherein such information regarding AFD1 certification, where such certification includes by ManPer5/RCFD7 and ManPer7/RCFD8 respectively certifying RCFD3 and AFD3.
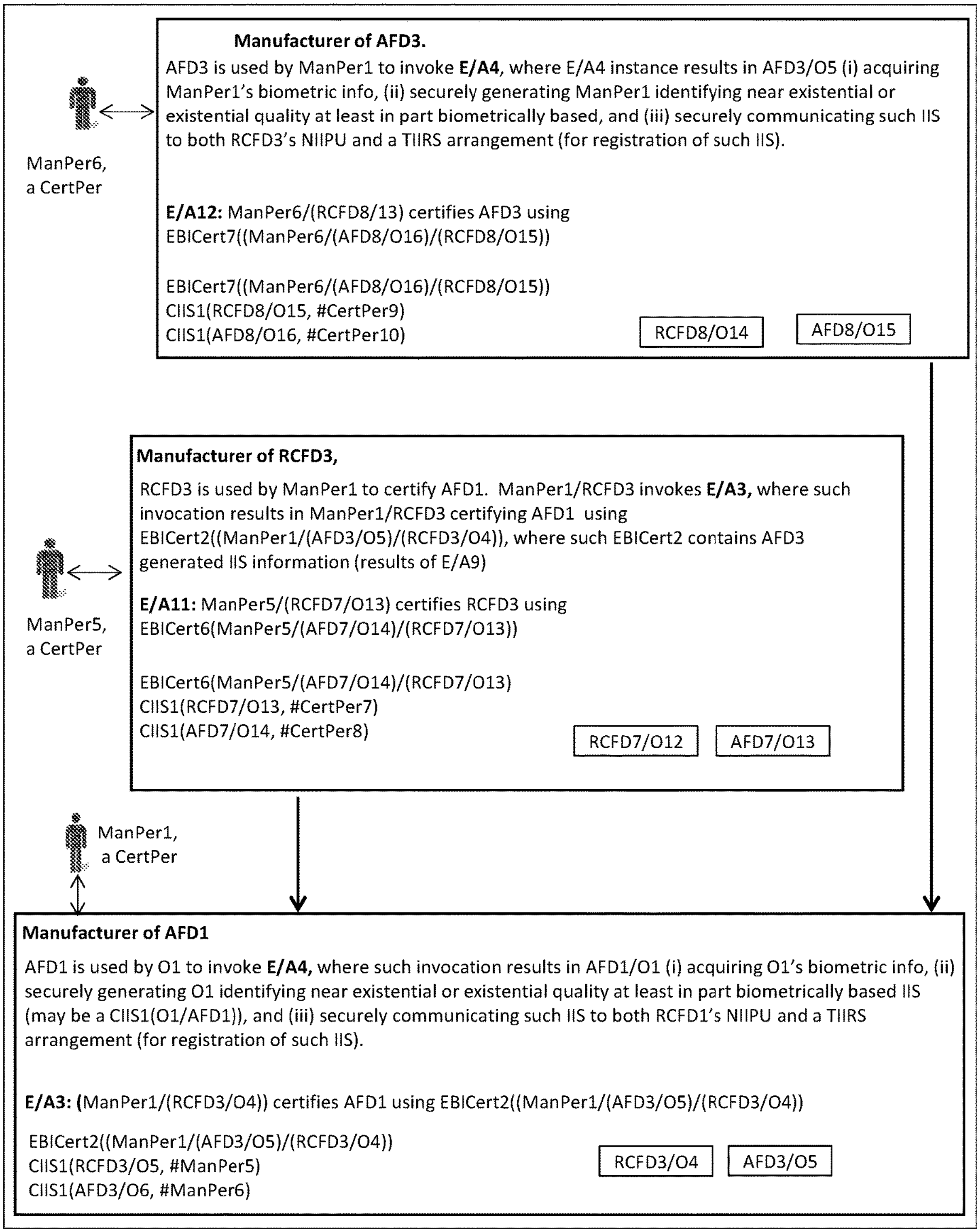

Figure 29: Non-limiting illustrative example of a system that assures authenticity of the identity of messaging senders and receivers, informs regarding identity related facts and/or other attributes, and assures reliability of certain key attribute types.
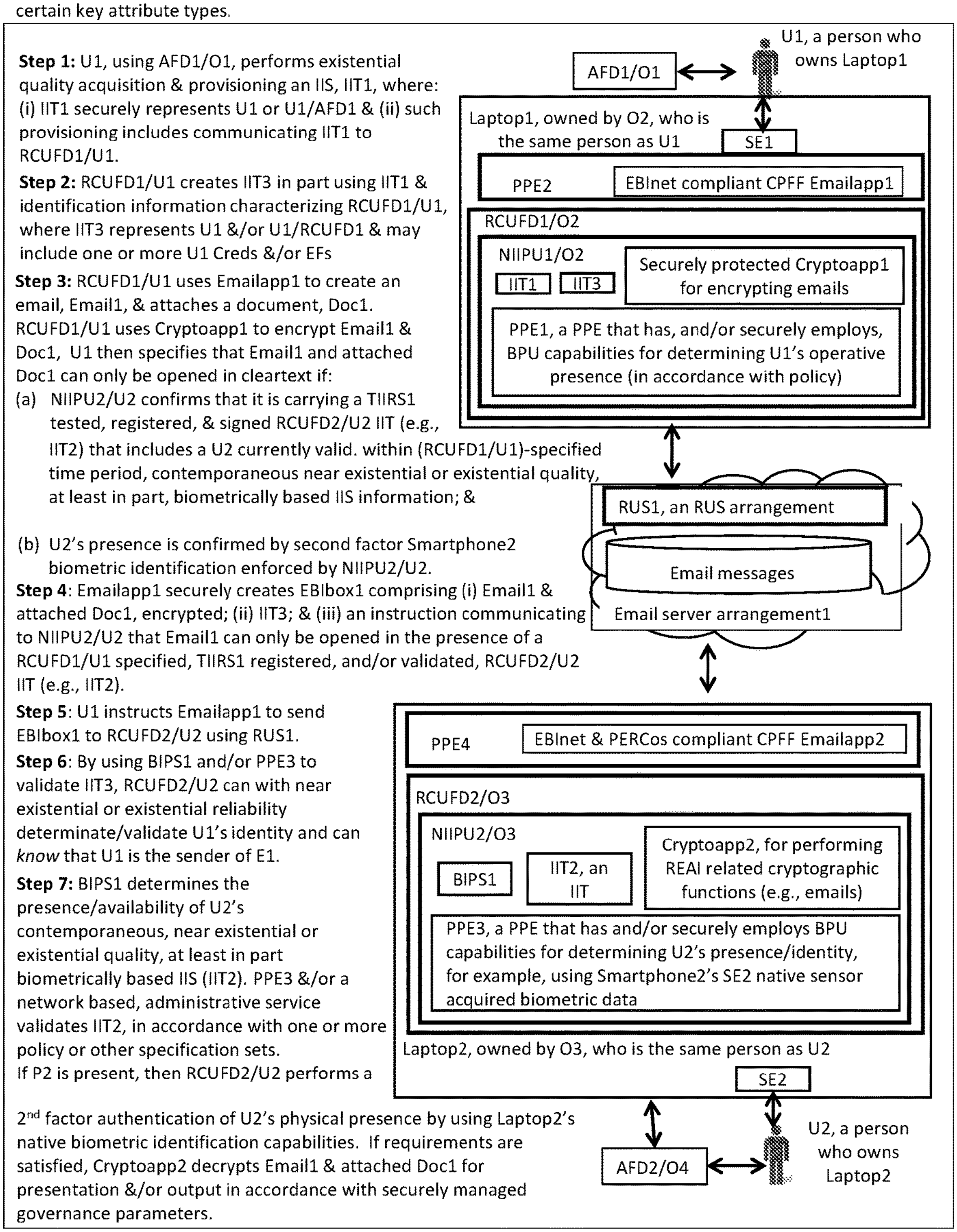

Figure 30: Non-limiting illustrative example of an EBInet compliant email system that authenticates sending and receiving persons' respective presence and attributes.

Step 1: U1, using AFD1/O1, performs existential quality acquisition & provisioning an IIS, IIT1, that in part includes existential quality biometrically based identification information & an EF stipulating that U1 is Bank X's employee agent, where such provisioning includes communicating IIT1 to RCUFD1/U1.

Step 2: RCUFD1/U1 creates IIT3 in part using IIT1 & identification information characterizing RCUFD1/U1, where IIT3 represents U1 and/or U1/RCUFD1 and includes one or more U1 Creds &/or EFs

Step 3: U1 creates a business email, Email1, on behalf of Bank X. Given the official nature of Email1, U1 directs Emailapp1 to: (i) use IIT3; (ii) encrypt & sign Email1 using EBICert1; & (iii) require that Email1 can be opened in cleartext only if U2 demonstrates his/her identity through the providing of a U2 contemporaneously acquired at least in part existential quality biometrically based IIT (e.g., IIT2), where U2's physical presence is confirmed through the use of RCUFD2/U2 (using SE2 & BPU capabilities).

Step 4: Emailapp1 securely creates EBIbox1 by associating with Email1: (i) IIT3; & (ii) an instruction communicating to RCUFD2/U2 that Email1 can only be opened in the presence of an (RCUFD2/U2) IIT (e.g., IIT2, an IIT registered with Bank X).

Step 5: Emailapp1 then sends EBIbox1 to RCUFD2/U2 using RUS1.

Step 6: By using BIPS1 and/or PPE3 to validate IIT3, RCUFD2/U2 can with near existential or existential reliability determinate/validate U1's identity & employment credentials. For example, U2 can *know,* due to the presence of testable/validatable EF(s), that U1 is actually an authorized CertPer/employee agent of Bank X , thus assuring U2 that Email1 is legitimately produced and suitable/trustworthy for U2's banking purpose(s).

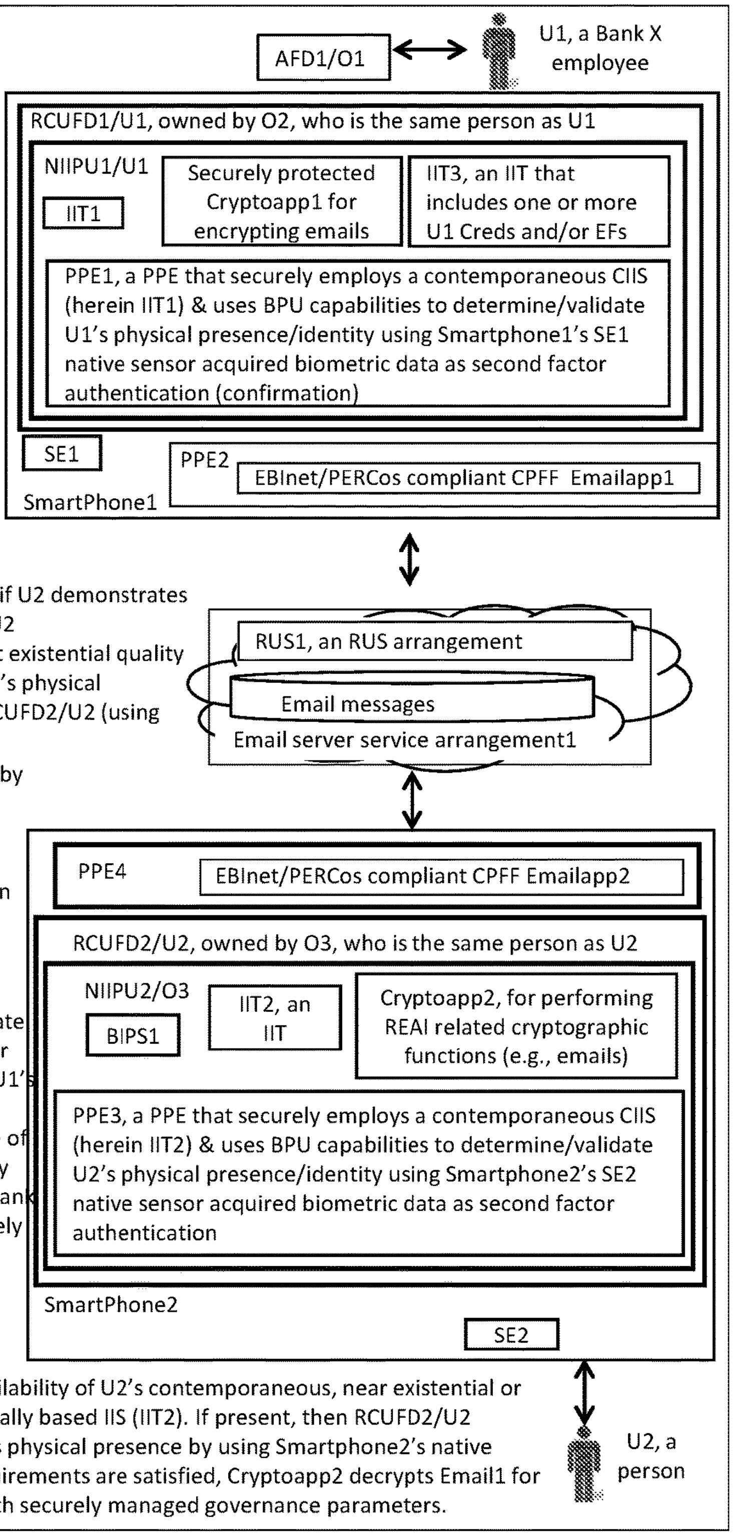

Step 7: BIPS1 determines the presence/availability of U2's contemporaneous, near existential or existential quality, at least in part biometrically based IIS (IIT2). If present, then RCUFD2/U2 performs a 2nd factor authentication of U2's physical presence by using Smartphone2's native biometric identification capabilities. If requirements are satisfied, Cryptoapp2 decrypts Email1 for presentation &/or output in accordance with securely managed governance parameters.

Figure 31: Non-limiting example of a pervasively available biometric identification environment (pBIDE) embodiment that enables: (i) an email sender to obtain personal biometrically based and/or composite IITs and/or EBICerts of intended recipients of an email message to ensure that the email message is presented in clear text only in presence of the email's intended recipients' respective appropriate, such as, contemporaneous, at least in part biometrically based IISs; and (ii) email receivers to authenticate (and/or otherwise inform regarding) the sender's identity.

Step 1: Users, U1 and U2 respectively authorize RCUFD1 and RCUFD2 to register U1's and U2's respective IISs (e.g., in a form of secure human/device composite IITs) with a centralized identity information pBIDE utility/service arrangement, pBIDE1. Such IITs may comprise near existential and/or existential quality, at least in part, contemporaneously derived, biometrically based IISs, e.g., CIISs of respective device/human users.

Step 2: U1 and U2, possibly at different times, use AFD1 and AFD2, respectively, to: (i) perform near existential or existential quality acquisition of contemporaneous biometric identification information process sets, (ii) provision one or more corresponding CIISs, and (iii) register provisioned CIISs with pBIDE1.
Step 3: AFD1 and AFD2, for example, at different times, forward provisioned CIISs to their respective correspondingly used RCUFD1 and RCUFD2 arrangements.

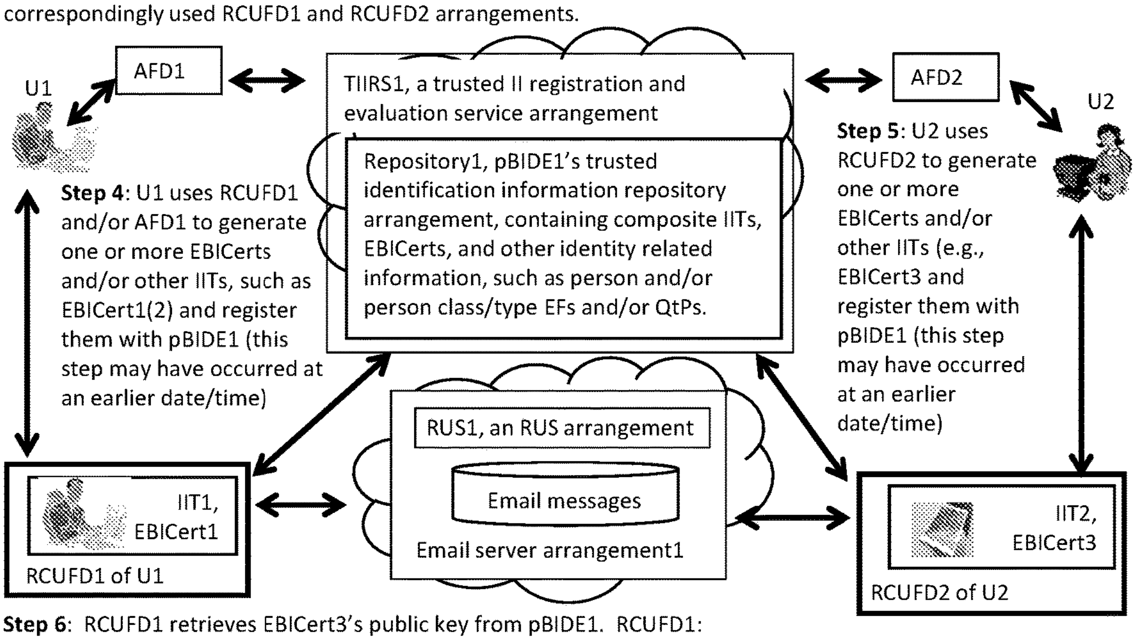

Step 6: RCUFD1 retrieves EBICert3's public key from pBIDE1. RCUFD1:
- Generates a symmetric key, SKey1, and uses SKey1 to encrypt(i) one or more portions of email1 (e.g., attached documents) and (ii) securely associated IIT1.
- Encrypts Skey1 using EBICert2(3)'s public key.
- Forms an email set, Emailset1, comprising encrypted Email1, IIT1, and Skey1.
- Signs Emailset1 using EBICert1(2) and sends Emailset1 to U2 via Email server arrangement1.

Step 7: RCUFD2 obtains Emailset1 from Email server arrangement1. RCUFD2:
- Interacts with pBIDE1 to obtain IIT1/EBICert1 AFD1 had registered with pBIDE1.
- Evaluates EBICert1(2). If the evaluation fails, RCUFD2 deletes Emailset1 and takes corrective action.
- Validates IIT1 included in Emailset1 with IIT1 RCUFD1 obtained from pBIDE1 and if they are the same and/or otherwise match as specified, U2 and/or RCUFD2 can validate/evaluate U1's identity. If U1's identity is valid, RCUFD2 can use the presence of one or more U2 contemporaneous near existential and/or existential quality, at least in part biometrically based CIISs, to authorize decryption, and/or other use of email1 as authorized.

Figure 32: Non-limiting example of a pervasively available, biometric identity, environment (pBIDE) that enables EBInet device &/or service arrangements to interact with TIIRS1 to obtain &/or employ near existential &/or existential quality, contemporaneous, at least in part biometrically based, IISs (such as IITs in a form of EBICerts, CIISs, or CBEIISs) for authenticating, &/or otherwise evaluating, proffered IISs for E/A instances.

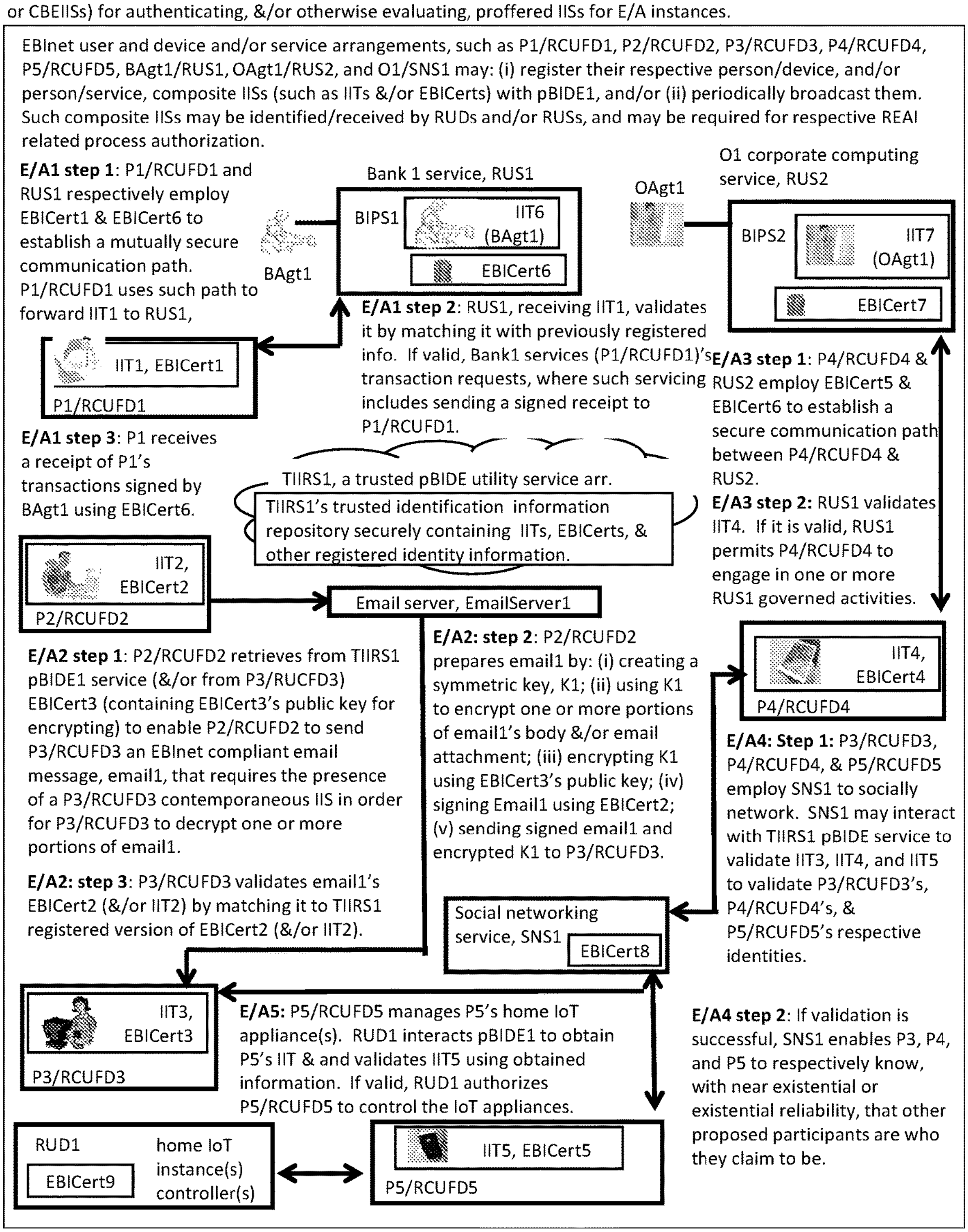

Figure 33: Non-limiting example of RCUFD1 generating an operatively near existential or existential quality at least in part biometrically based IIS for P1 using near existential or existential quality biometric information forwarded by AFD1/O1

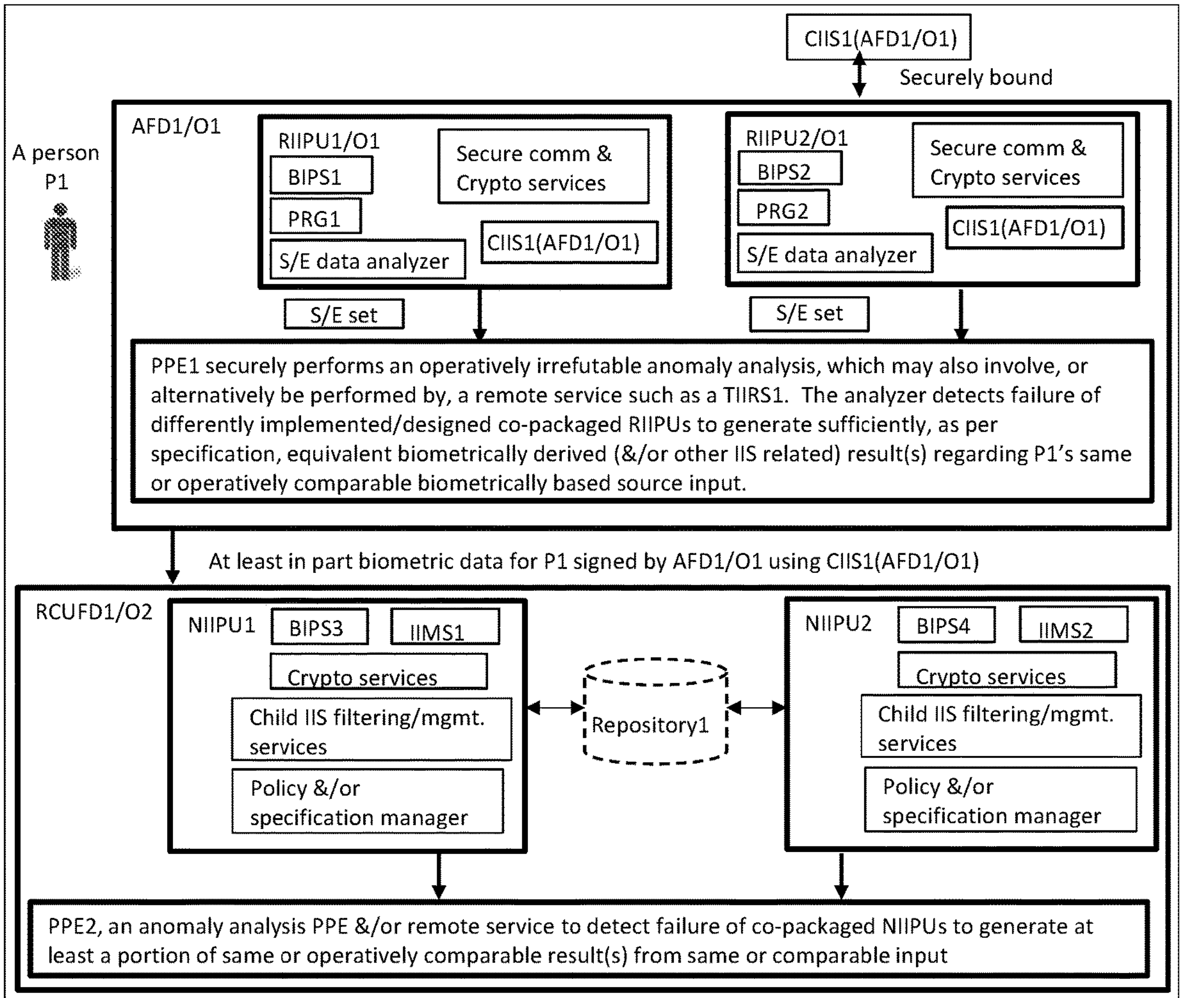

AFD1/O1 acquires a nearly existential or existential quality biometric identification info set that RIIPU1/O1 and RIIPU2/O2 process to create corresponding at least in part biometrically based data sets. PPE1 compares (RIIPU1/O1)'s & (RIIPU2/O2)'s result sets, & determine whether to embargo such results if they fail to match. If they match in accordance with a specification, AFD1/O1 forwards the results to RCUFD1/O2. RCUFD1 receiving the results, can generate a CBEIIS for P1 &/or CIIS for P1/RCUFD1 for use &/or forwarding to one or more RUDs &/or RUSs, creating such IISs through operative redundancy using differently designed NIIPUs, NIIPU1 & NIIPU2. NIIPU1 and NIIPU2 can, for example, interact with Repository1 to augment biometrically based info with other P1 &/or EBInet device attribute info to create CBEIISs and/or CIISs for P1 &/or P1/RCUFD1. NIIPU1 & NIIPU2 then forward their IIS results to PPE2. PPE2 requires at least a portion of such forwarded IIS outputs to be the same or otherwise correspond (in accordance with a specification set). If they do not sufficiently match in accordance with such specification set, PPE2 can generate an anomaly message, and/or report describing failure event info, and/or take one or more specified actions, such as embargoing at least a portion of such RIIPU set output until cause of such failure is determined.

For example, a CBEIIS(P1) can be created by RCUFD1 using P1 biometrically based info, provided & signed by AFD1/O1 (using CIIS1(AFD1/ O1), the CBEIIS may alternatively be created by AFD1)/O1. The CBEIIS (related CIIS), signed by P1/RCUFD1, &/or P1/AFD1, can contain, reference, &/or enable identification &/or evaluation of subject matter identification info (regarding P1 or P1/RCUFD1).

Figure 34: Non-limiting example of SVCC REAI process administration
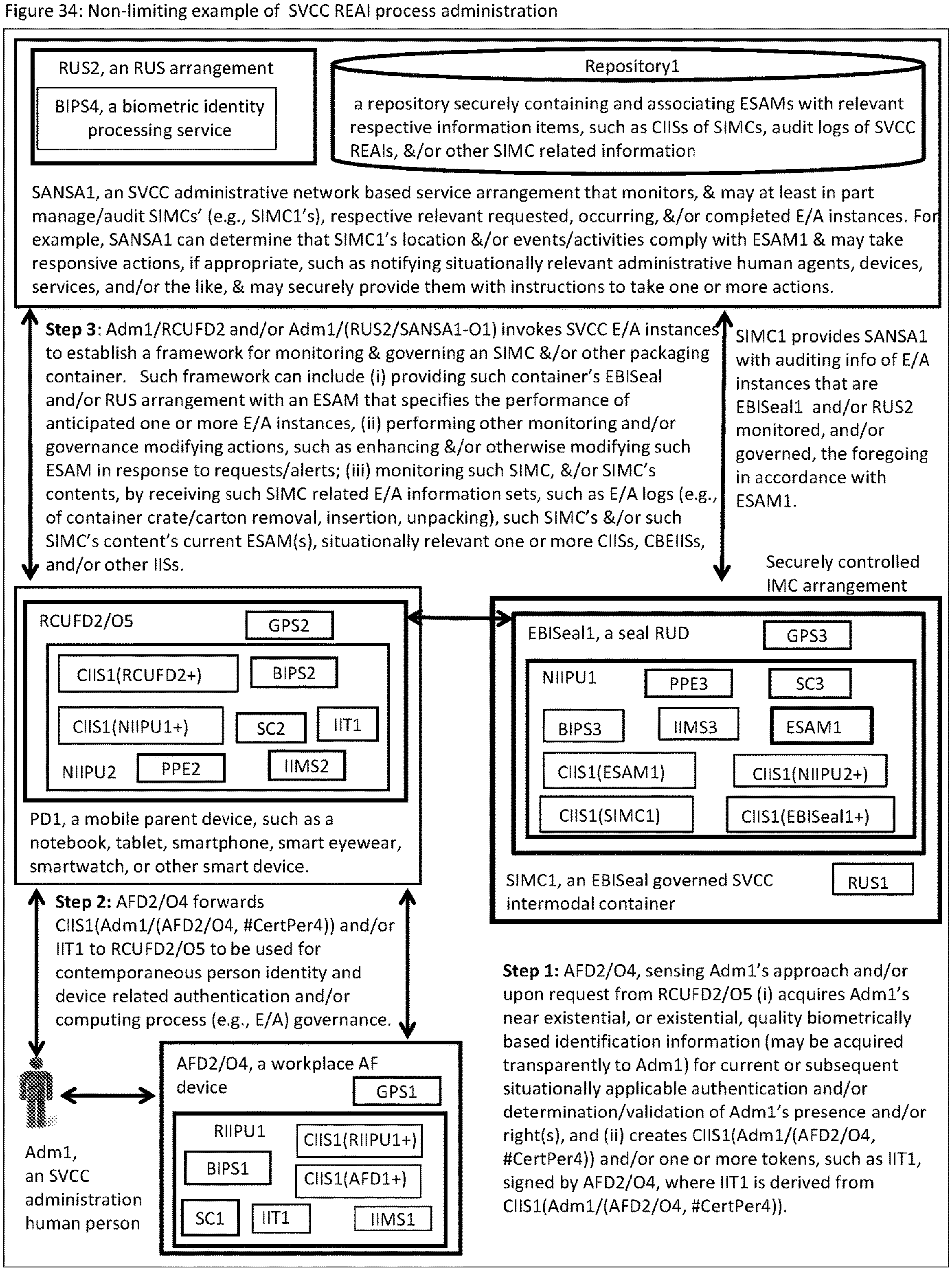

Figure 35A: A table for components described in Figures 36A - 39

| entity | EBInet Components | Descriptions |
|---|---|---|
| Stk1, IMC manufacturing agent | (AFD1/O-Per1, #ManPer1)<br>(RCUFD1/O-Per2, #ManPer2) | Stk1/RCUFD1 completes an IMC's conversion to an SIMC, SIMC1, by activating an EBISeal, EBISeal1, located in IMC.<br>O-Per1 and O-Per2 are owners and/or human owner agents of owning parties of AFD1 and RCUFD1, respectively. O-Per1 and O-Per2 may be the same person.<br>O-Per2 may or may not be the same person as Stk1.<br>A CreatePer is a creator (e.g., author/ developer/manufacturer person and/or human agent, and/or the like). ManPer1 and ManPer2 are CreatePers who are manufacturer persons and/or human agents of AFD1 and RCUFD1, respectively. |
| SIMC1 | (SIMC1/O3, #(Stk1/RCUFD1))<br>(EBISeal1/O3, #CertPer3)<br>EBICert1(EBISeal1/O3, #CertPer3)<br>RUS1/O3<br>PPE3, SC3, IIMS3, BIPS3 | O3, is the new owner and/or a human owner agent of owning party of SIMC1, an EBISeal/RUS monitored and governed SVCC Intermodal Container, where RUS1 is a networked, administrative, receiving and using, service arrangement. An SIMC, such as SIMC1, may contain one or more crates, cartons, pallets, boxes, and/or other containers, where each such container (such as Crate1) may employ its own EBISeal, SIMC1's EBISeal1 and/or RUS1 to monitor and govern SIMC and/or its contents (such as Crate1 and one or more Crate1's one or more packages and/or specific content objects, and/or container environment). |
| Adm1, an administrative agent | (AFD2/O4, #CertPer4)<br>(RCUFD2/O5, #CertPer5) | An administrator who works at SANSA1 to administer SANSA1 operations, where such administering includes monitoring and governing SANSA1's operations. |
| SANSA1, an SVCC administrative network based service arrangement | EBICert2(SANSA1/Adm1, #CertPer6)<br>RUS2/SANSA1-O1<br>PPE4, SC4, IIMS4, BIPS4 | SANSA1 provides monitoring and governing administrative services, including for example, securely provided EBISeal/ESAM related updated software, firmware, and/or input information. SANSA1 further can perform secure information reporting, such information securely reported to participating SVCC parties, and receiving instructions in accordance with ESAM and/or EBISeal related specification.<br><br>SANSA1-O1 is an O-Per of SANSA1<br>CertPer6 is a certifier of SANSA1's integrity. |

Figure 35B: A continuation of a table for components described in Figures 36A - 39

| entity | EBInet Components | Descriptions |
|---|---|---|
| Stk2, an agent who provides SIMC1 with an ESAM | (AFD3/O6, #CertPer6)<br>(RCUFD3/O7, #CertPer7) | Stk2/RCUFD3 provides EBISeal1 with an ESAM.<br>O4 and O5 are owner agents of AFD2 and RCUFD2, respectively. They may be the same people. O5 may or may not be the same person as Stk2. |
| Stk3 | (AFD4/O8, #CertPer8)<br>(RCUFD4/O9, #CertPer9) | Stk3/RCUFD4 supervises loading of SIMC1 with crates, Crate1 and Crate2. |
| Crate1 | (Crate1/O10, #CertPer10)<br>(EBISeal2/O10, #CertPer11)<br><br>EBICert3(EBISeal2/O10, #CertPer11) | Crate1 is provided with an ESAM, ESAM2, that EBISeal2 employs to govern Crate1. O10 is the owner and/or a human owner agent of owning party of Crate1 (including Crate1's content resource objects). O11 is the owner of EBISeal2. O10 and O11 can be the same person. |
| Crate2 | (Crate2/O11, #CertPer12)<br>(EBISeal3/O11, #CertPer13)<br><br>EBICert4(EBISeal3/O11, #CertPer13) | Crate2 is provided with an ESAM, ESAM3, that EBISeal3 employs to govern Crate2. O12 is the owner and/or a human owner agent of owning party of Crate2 (including Crate1's content resource objects). O11 is the owner of EBISeal2. O10 and O11 can be the same person. |
| Stk4, an agent at one of SIMC1's stops while in transit | (AFD5/O14, #CertPer14)<br>(RCUFD5/O15, #CertPer15) | Stk4/RCUFD5 supervises removing of Crate2 from SIMC1 and loading Crate3 into SIMC1. |

Figure 36A: Non-limiting example of activating SIMC1 by activating its RUS1/O3 & EBISeal1/O3, where SIMC1 is an EBInet compliant intermodal container, such EBISeal & RUS (RUS may be integrated into an EBISeal) integrated into IMC1 during, &/or after, completion of IMC1 manufacturing, to enable monitoring &/or managing the access to, other interaction with, &/or other monitoring and/or governance of IMC1, now SIMC1.

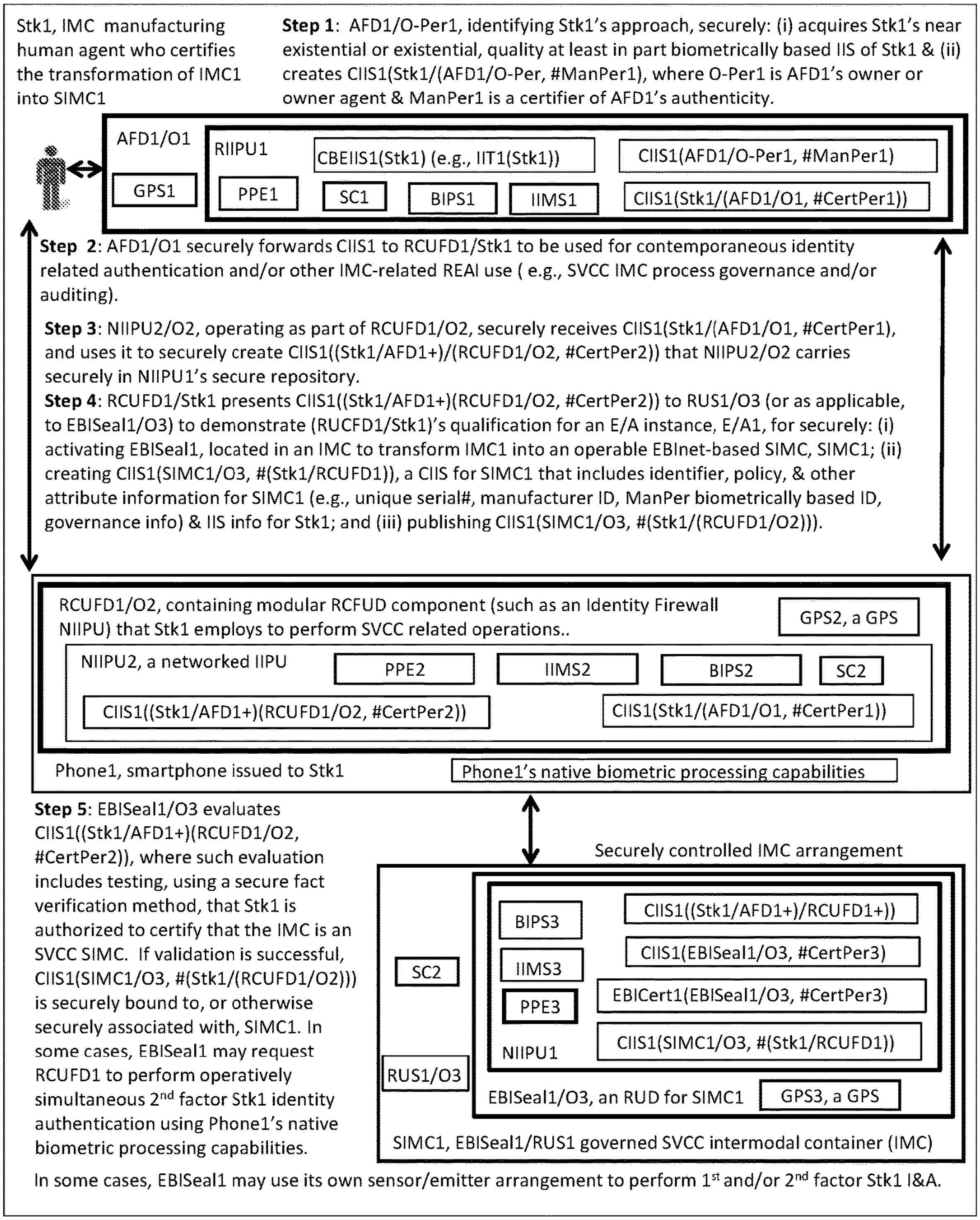

Figure 36B: Non-limiting example of an EBISeal arrangement of an SIMC providing irrefutable transaction history regarding such SIMC and related event/activity instances using an EBIBlockChain comprising securely generated and forwarded one or more EBIBlocks containing relevant E/A instance transaction information regarding such SIMC.
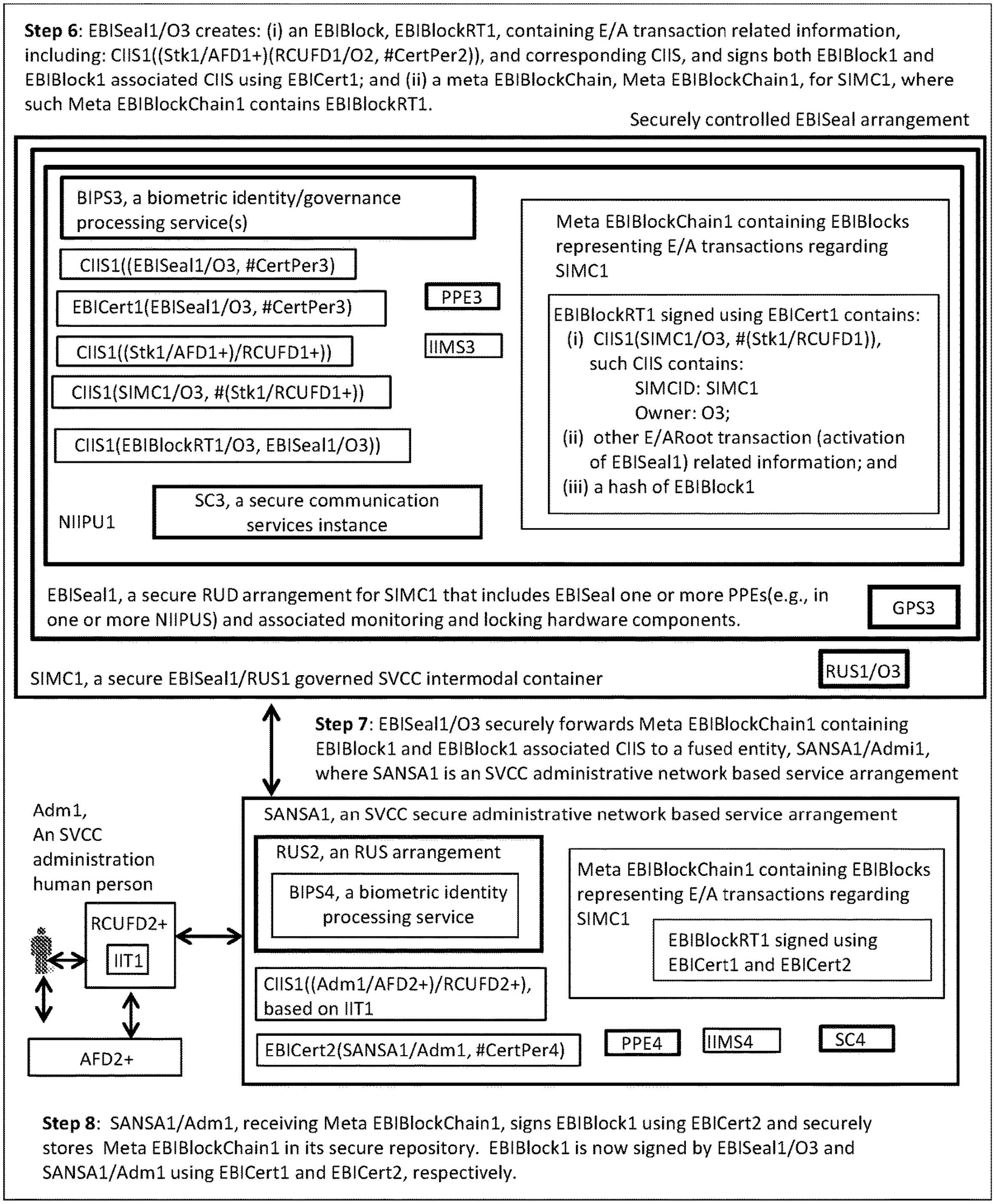

Figure 37A: Non-limiting example of a supply, value, and/or other commercial chain (SVCC) Stakeholder providing an existentially signed anticipatory manifest (ESAM) to EBISeal1 that EBISeal1 may use to governing SIMC1's E/A instances.
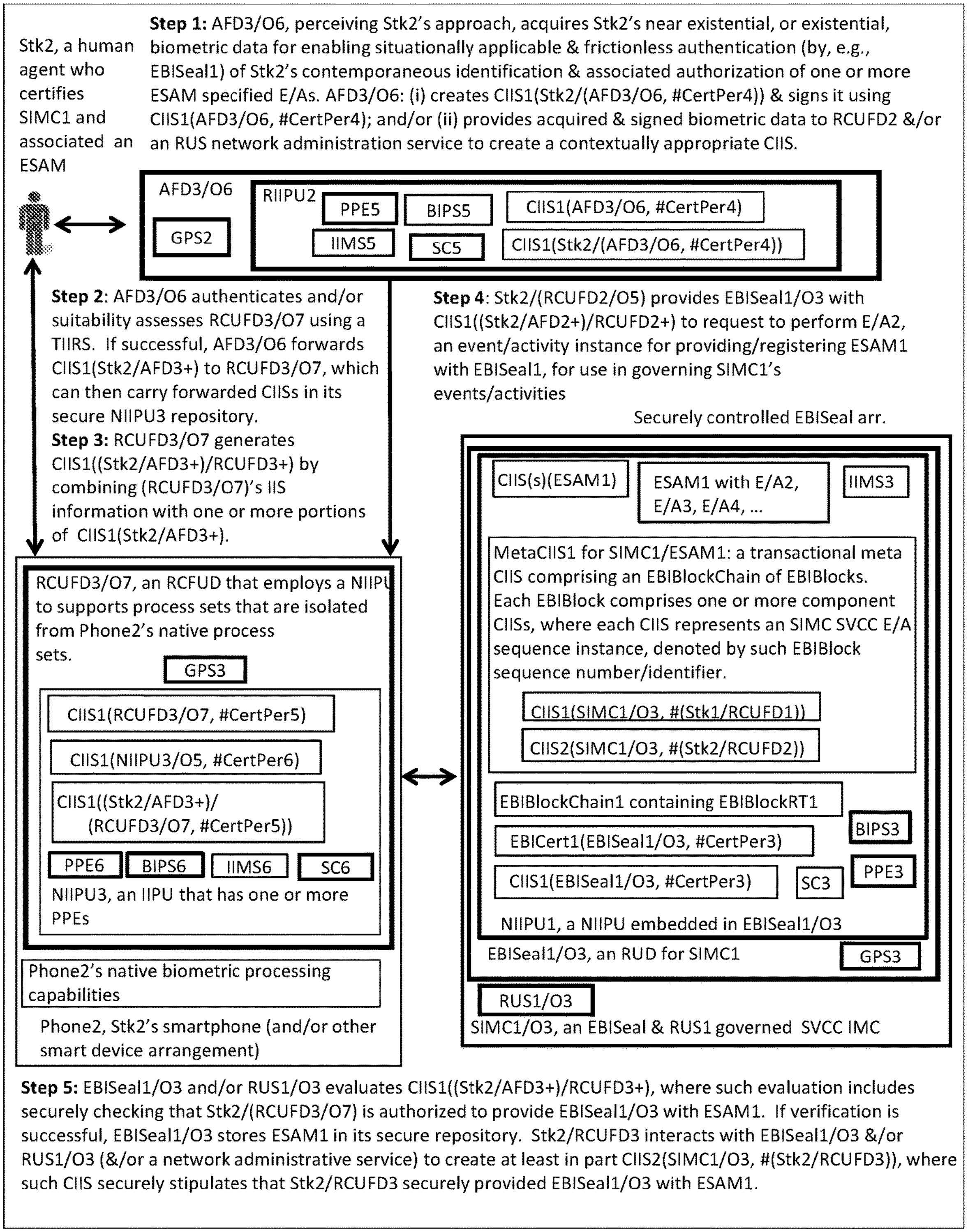

Figure 37B: Non-limiting example of an SVCC administrative network based service arrangement providing irrefutable transaction history regarding an SIMC in an EBIBlockChain comprising securely generated and forwarded EBIBlocks containing relevant E/A instance transaction information regarding such SIMC.

Step 5: EBISeal1/O3 &/or RUS1 forwards CIIS2(SIMC1/O3, #(Stk2/RCUFD2)) to SENSA1, an SVCC administrative network based service arrangement that monitors, and at least in part manages, SIMC1 E/A instances.

Step 6: EBISeal1/O3 and/or RUS1 publishes CIIS3 to SIMC1 and securely binds it to SIMC1. EBISeal1/O3 then creates an EBIBlockChain, EBIBlockChainESAM1, to contain EBIBlocks containing ESAM1 E/A related transactions, including EBIBlock1 comprising E/A1 (for providing EBISeal1 with ESAM1) transaction related identification information, where such information includes CIIS2(SIMC1 /O3, #(Stk2/RCUFD2)) and other transaction related information. and corresponding CIIS, and signs both EBIBlock1 and EBIBlock1 CIIS using EBICert1.

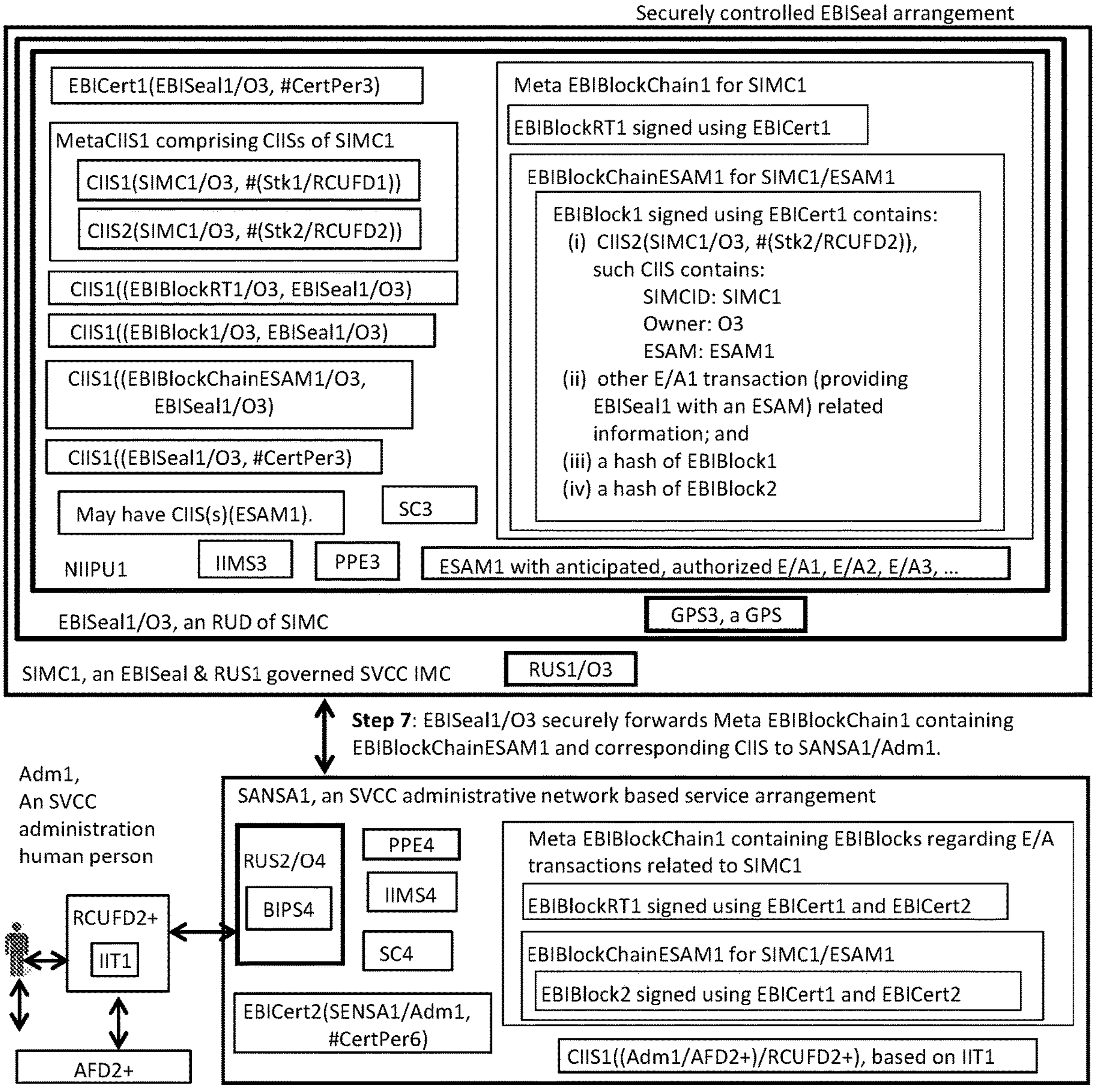

Step 8: SANSA1/Adm1, receiving EBIBlockChainESAM1 containing EBIBlock1, signs EBIBlock1 signed by EBISeal1/O3 using EBICert1 and adds modified EBIBlockChainESAM1 to EBIBlockChain1

Figure 38A: Non-limiting example of loading container arrangements & their contents into an operating SIMC, SIMC1.
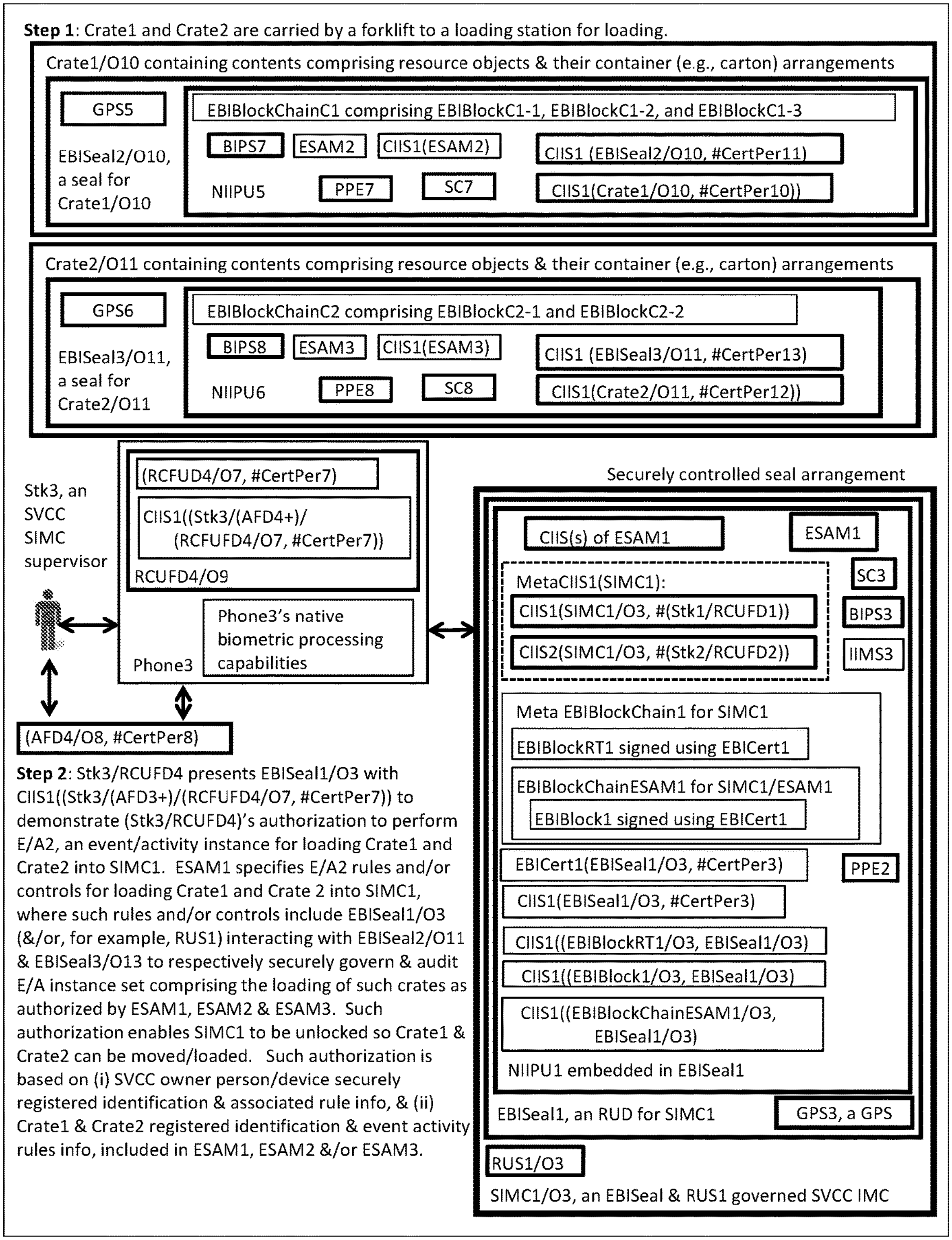

Figure 38B: Non-limiting example of loading container arrangements & their contents into an operating SIMC, SIMC1.

Step 3: If EBISeal1/O3 (SIMC1's EBISeal), EBISeal2/O10 (Crate1's EBISeal), and EBISeal3/O11 (Crate2/s EBISeal) (and may include RUS1/O3 and/or Stk3/RCUFD3) determine that loading Crate1 and Crate2 into SIMC1 complies with all relevant rules and controls, one or more authorizations, as compliant with specifications. EBISeal1 unlocks SIMC1's entrance. In some embodiments, ESAMs may contain specification of EBInet device and/or RUS related seniority of rules and controls, for example, for managing crates. Such seniority of rules and controls may include notifying one or more EBInet administrative device and/or service arrangements, and/or one or more human management personnel and/or such personnel associated device and/or service arrangements, to monitor, respond to such loading as appropriate, to audit and identify any crate related E/A inconsistencies with ESAM specifications, and take any action responsive to such E/A.

Step 4: Stk3 loads Crate1/O10 & Crate2/O11 into SIMC1. Upon completion, Stk3/RCUFD3 informs EBISeal1/O3 to reseal SIMC1 process set (or EBISeal1/O3 automatically reseals upon Stk3/ RCUFD3 leaving SIMC1 or recognizing the completion of the task using container internal or external sensor, such as video, arrangements).

Step 5: EBISeal2/O10 and EBISeal3/O11, in accordance with their respective ESAM specifications, respectively perform steps 6a and 6b: where:

Step 5a: EBISeal2/O10 creates EBIBlockC1-4 containing E/AC1-4 transaction information such as:

- CIIS2(Crate1/O10, #(Stk3/RCUFD3)), such CIIS contains:
    - Crate-IIS: Crate1's one or more relevant IISs
    - Owner-IIS: O10's one or more relevant IISs
    - ESAM: ESAM2,
    - Status: is loaded in SIMC1;
- Other E/AC1-4 transaction information (such as information related to Crate1 being loaded into SIMC1 and/or Crate1 provenance information);
- A hash of EBIBlockC1-4
- A hash of EBIBlockC1-3

EBISeal2/O10 securely adds EBIBlockC1-4 to EBIBlockChainC1

Step 5b: EBISeal3/O11 creates EBIBlockC2-3 containing E/AC2-3 transaction information such as:

- CIIS2(Crate2/O11, #(Stk3/RCUFD3)), such CIIS contains:
    - Crate-IIS: Crate2's one or more relevant IISs,
    - Owner-IIS: O11's one or more relevant IISs
    - ESAM: ESAM3,
    - Status: is loaded in SIMC1;
- Other E/AC2-3 transaction information (such as information related to Crate2 being loaded into SIMC1 and/or Crate2 provenance information);
- A hash of EBIBlockC2-3
- A hash of EBIBlockC2-2

EBISeal3/O11 securely adds EBIBlockC2-3 to EBIBlockChainC2

Step 6: EBISeal2/O10 and EBISeal3/O11, in accordance with their respective ESAM specifications, securely, respectively communicate EBIBlockChainC1 and EBIBlockC2 to EBISeal1/O3 and/or RUS1/O3

Step 7: EBISeal1/O3 (and/or RUS1/O3) securely creates an EBIBlock, EBIBlock2, characterizing E/A2 transaction info, including relevant CIISs and other transaction related info (such as Crate1 and Crate2 have been loaded into SIMC1). RUS1/O3 &/or EBISeal1/O3 signs EBIBlock2 using EBICert1. EBIBlock2 can contain:

- CIIS3(SIMC1/O3, #(Stk3/RCUFD3)) containing:
    - SIMC-IIS: SIMC1's one or more relevant IISs and/or relevant information portions thereof,
    - Owner-IIS: O3's one or more relevant IISs and/or relevant information portions therefrom,
    - ESAM: ESAM1;
    - Status: may comprise one or more portions of EBIBlockChainC1 and/or EBIBlockChainC2;
    - Content Info: Crate1 and Crate2 related IISs and/or ESAM2 and ESAM3;
    - Provenance Info:
        - CIIS1((Stk3/(AFD4/O8, #CertPer8))/(RCUFD3/O7, #CertPer7)) and/or one or more portions thereof;
        - CIIS1(AFD4/O8, #CertPer8) and/or one or more portions thereof;
- Other E/A2 transaction related information such as information regarding loading Crate1 and Crate2 into SIMC1;
- A hash of EBIBlock2; and
- A hash of EBIBlock1.

EBISeal1/O3 (and/or RUS1/O3) securely adds EBIBlock2 to EBIBlockChain1

Figure 38C: Non-limiting example of SIMC1 after the completion of E/A2, in which Crate1 and Crate2 have been loaded into SIMC1, and EBISeals and/or RUSs have created situationally relevant EBIBlocks and added them to respective EBIBlockChains
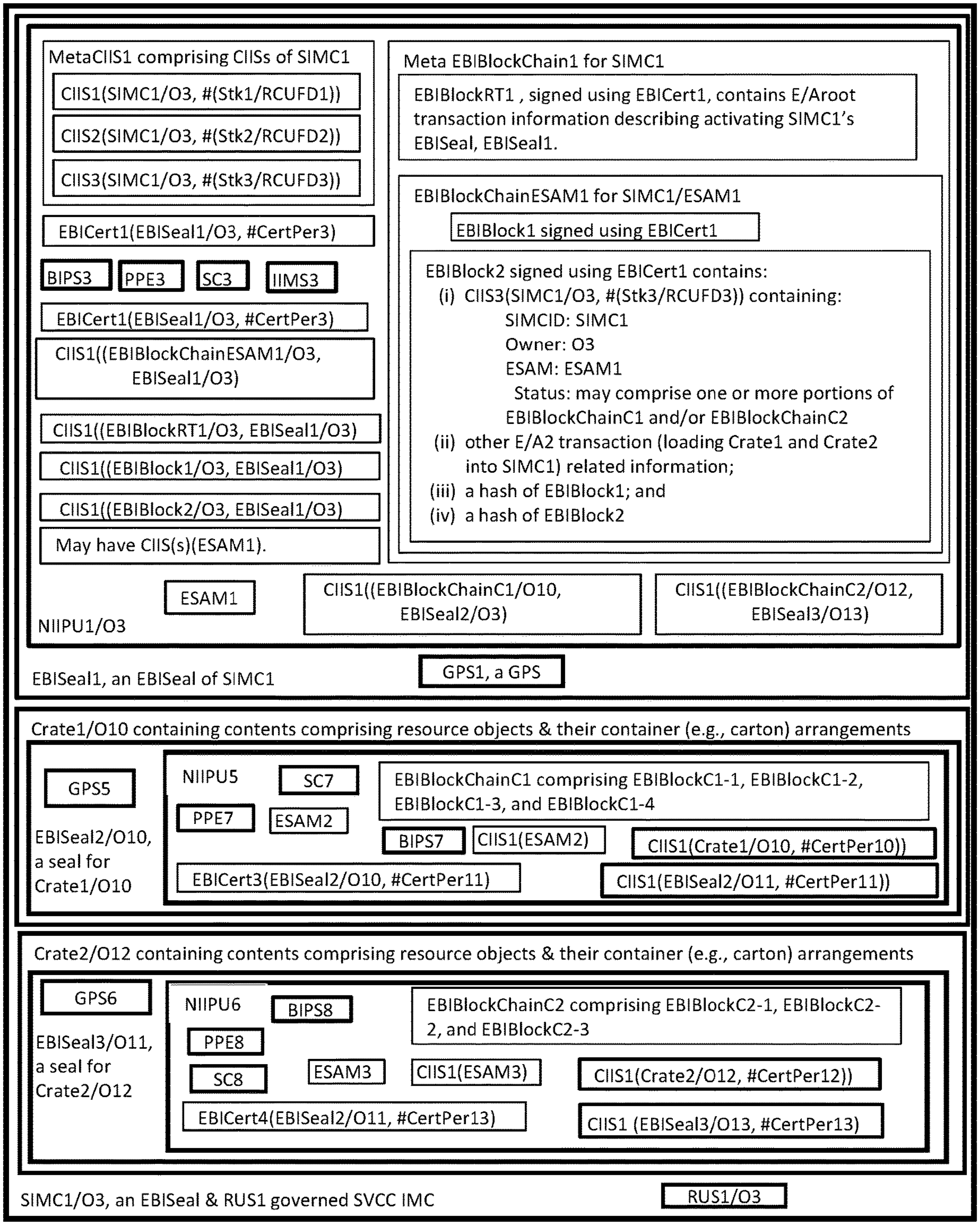

Figure 38D: Non-limiting example of SIMC1's EBISeal and/or RUS1 creating an EBIBlock containing an E/A transaction information regarding moving/loading crates Crate1 and Crate2 into SIMC1
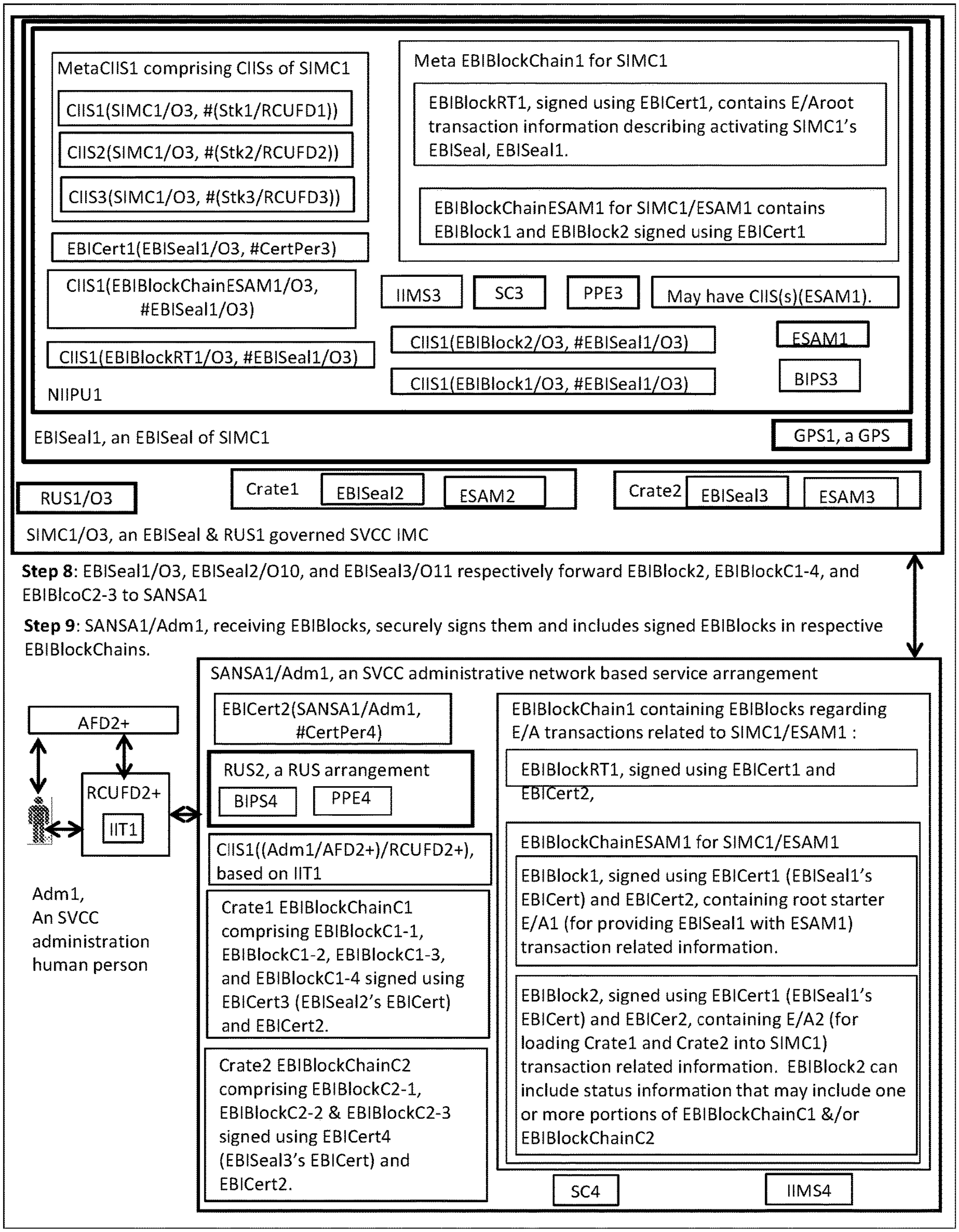

Figure 39: Non-limiting example of an SVCC stakeholder human and/or a robot agent removing one or more crates from an SVCC intermodal container

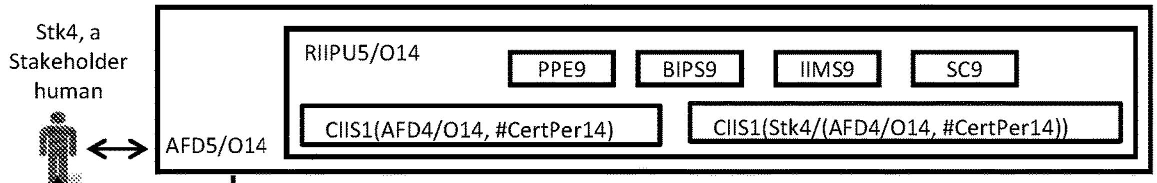

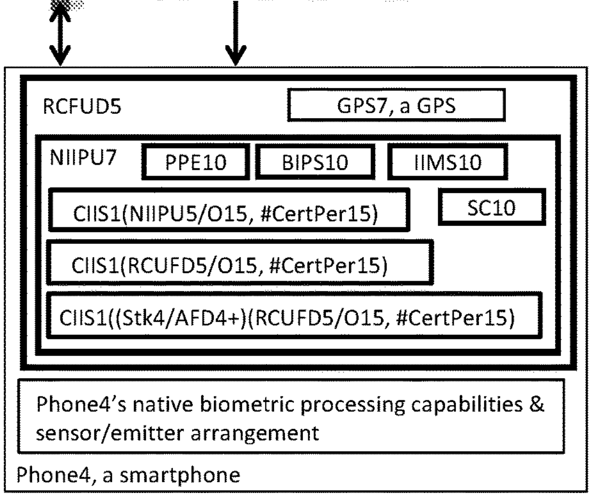

Step 1: AFD5/O14, sensing Stk4's approach, acquires Stk4's near existential, or existential biometric identification information for subsequent situationally applicable (e.g., contemporaneous) and transparent authentication of Stk5's presence (assumed if an applicable IIS is available), and creates and signs CIIS1(Stk4/(AFD4/O14, #CertPer14)) where such CIIS is at least in part derived from such Stk4 acquired biometrically based identification information, and may include a CIIS of AFD5, and/or information derived therefrom.

Step 2: AFD5/O14 forwards CIIS1(AFD4/O14, #CertPer14) to RCUFD5/O15. RCUFD5/O15 creates CIIS1((Stk4/AFD5+) /(RCUFD5/O15, #CertPer15) based in part on CIIS1(AFD4/O14, #CertPer14).

Step 3: SIMC1 arrives at Stk4's location, as specified by ESAM1.

Step 4: Stk4/RCUFD5 establishes a secure communication with EBISeal1/O3, and invokes ESAM1 E/A3 which includes validating (Stk4/RCUFD5)'s identity and authorization, such as, for example, authorization to remove one or more crates that ESAM1 specifies are authorized for removal at its current location. To initiate E/A3, Stk4/RCUFD5 presents (securely communicates) CIIS1((Stk4/AFD5+) /(RCUFD5/O15, #CertPer15) to EBISeal1/O3. EBISeal1/O3 validates/evaluates CIIS1((Stk4/AFD5+) /(RCUFD5/O15, #CertPer15) to determine that Stk4/RCUFD5 is authorized to: (i) unseal/unlock/open SIMC1, and (ii) take Crate2 out of SIMC1.

Step 5: If Stk4/RCUFD5 is authorized, EBISeal1 unlocks SIMC1 so that Crate2 can be removed. Optionally, Stk4/RCFDU5 receives the current inventory of SIMC1 and/or Crate2. EBISeal1 monitors/governs that such event/activity (E/A3 for removing Crate2) is consistent with ESAM1 rules and control information (e.g., proper location, time/date related information, Stakeholder/device IIS). If such removal is inconsistent with ESAM1, EBISeal1/O3 would initiate an alarm and/or other, notification. Upon completion of the removal, Stk4/RCUFD5 reseals SIMC1. EBISeal1, and/or a network administrative service arrangement, creates one or more EBIBlocks containing E/A3 transaction related information and add created EBIBlocks to respective EBIBlockChains.

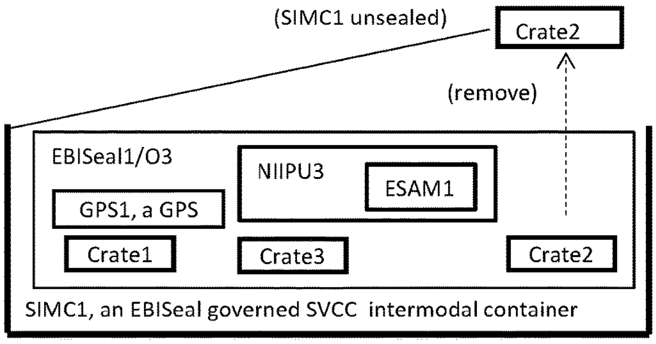

Step 6: EBISeal1/O3 or RUS1/O3 securely forwards created EBIBlocks to SANSA1 and RCUFD5 (& any applicable other RUS(s)).

Step 7: SANSA1, receiving EBIBlocks, adds them to respective EBIBlockChains and securely makes them available to appropriate person(s)/device(s) and/or one or more classes of such.

Figure 40: Non-limiting example embodiment illustrating generation of contextually appropriate, at least in part biometrically based IISs/IITs relating to a human user, P1. One or more such IISs/IITs can comprise child IISs/IITs derived from a P1, or P1/RCUFD1, master IIS.
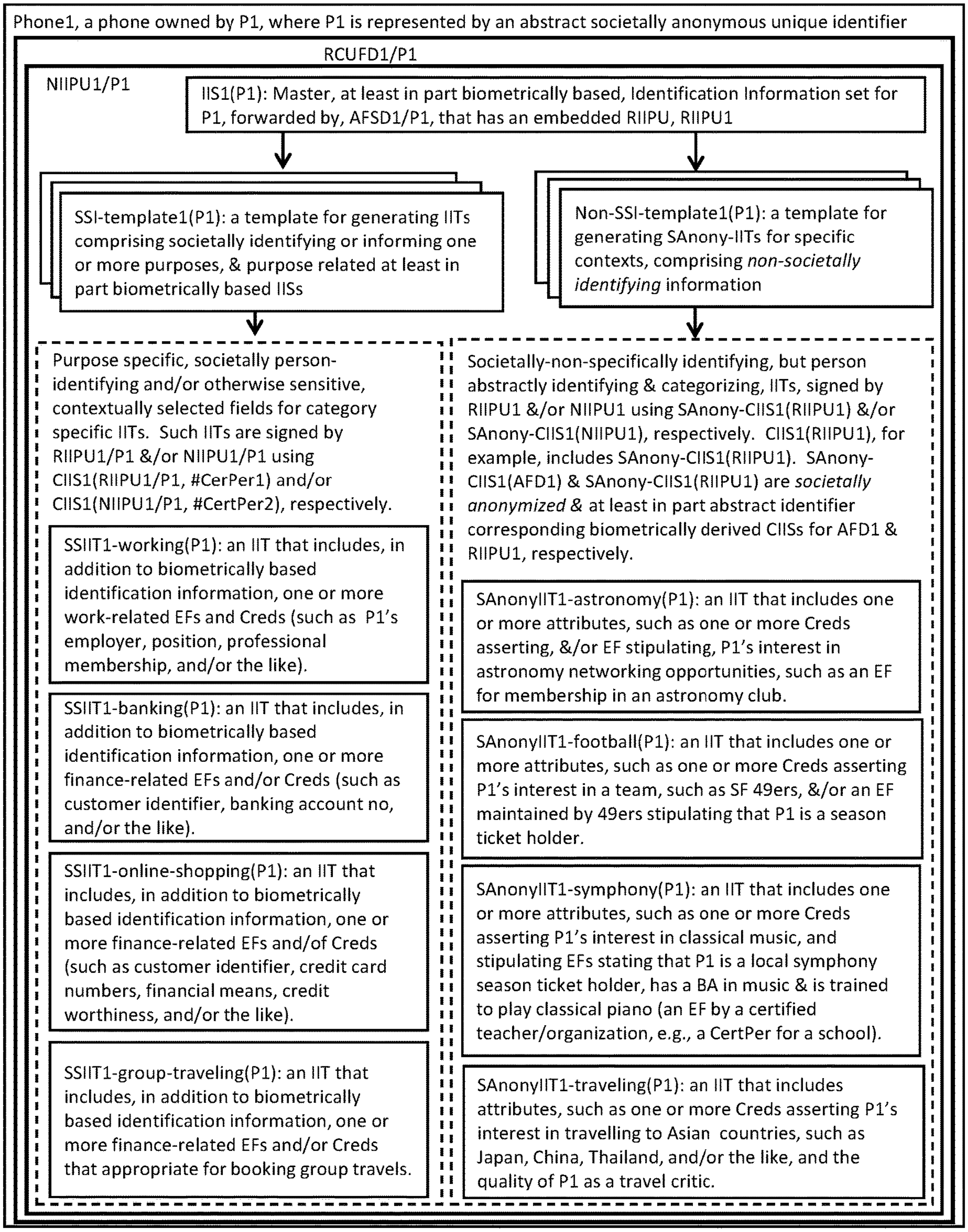

Figure 41: Non-limiting example EBInet embodiment that illustrates generation of both societally and non-societally specific at least in part biometrically based identification information sets (SS-IITs and SAnony-IITs) using contextual attribute field based templates for pursuing event/activity instances.

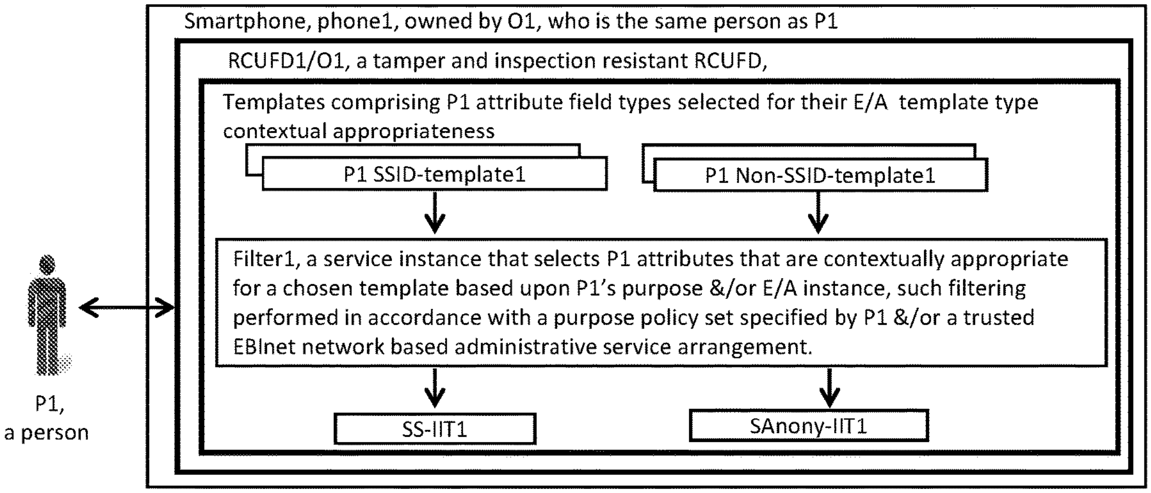

Step 1: RCUFD1/O1, embedded in P1's phone, in accordance with RCUFD1 specification set, receives (e.g., from a local AFD/O2) &/or creates/modifies (e.g., fills in a template) one or more contextually appropriate at least in part biometrically based IISs (such as CIISs which may, for example, comprise EBICerts and/or other IITs). RCUFD1/O1 may aggregate or otherwise in part combine such IISs, then invoke Filter1, which in turn uses SSID-templates, non-SSID-templates, or combination of contextual templates, to create respective SS-IITs, SAnony-IITs, &/or other appropriate IISs (comprising contextually appropriate field type attributes), such as:

- SS-IIT1 created using a SSID-template, where SS-IIT1: (i) contains and/or references societally, specifically identifying one or more attributes of P1 that identify U1, such as one or more portions of P1's at least in part biometrically based identification information set; & (ii) further includes other relevant attributes, such as P1's employee number, &/or the like regarding P1, such as one or more attributes for authorizing/allowing P1 to, for example, enter P1's office building; and
- SAnony-IIT1, created using a non-SSID-template, that does not have societally identifying person specific information, but does have non-societally identifying at least in part both biometrically based information and one or more non-biometric attributes (e.g., income, professional license type, education degree, sex, and/or the like).

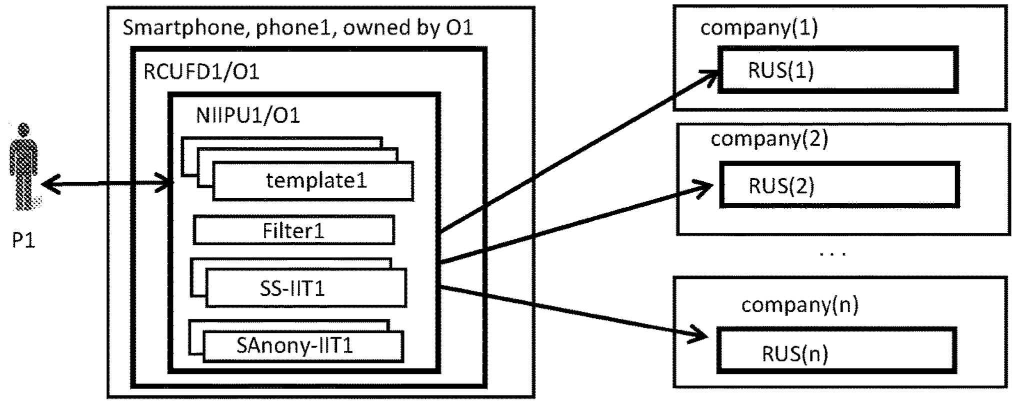

Step 2: P1/RCUFD1 uses SAnony-IIT1, a contextually appropriate as to purpose identification information that has sufficiently suitable identification information for initially identifying P1/RCUFD1 in social networking interaction with people with whom P1 is not familiar, but share certain interests, such as social equity.

Figure 42: Non-limiting example of an EBInet system that provides a cloud service arrangement that generates contextually appropriate, societally specific, or societally anonymous, at least in part biometrically based IIS sets (such as IITs, for example, EBICerts) for users.
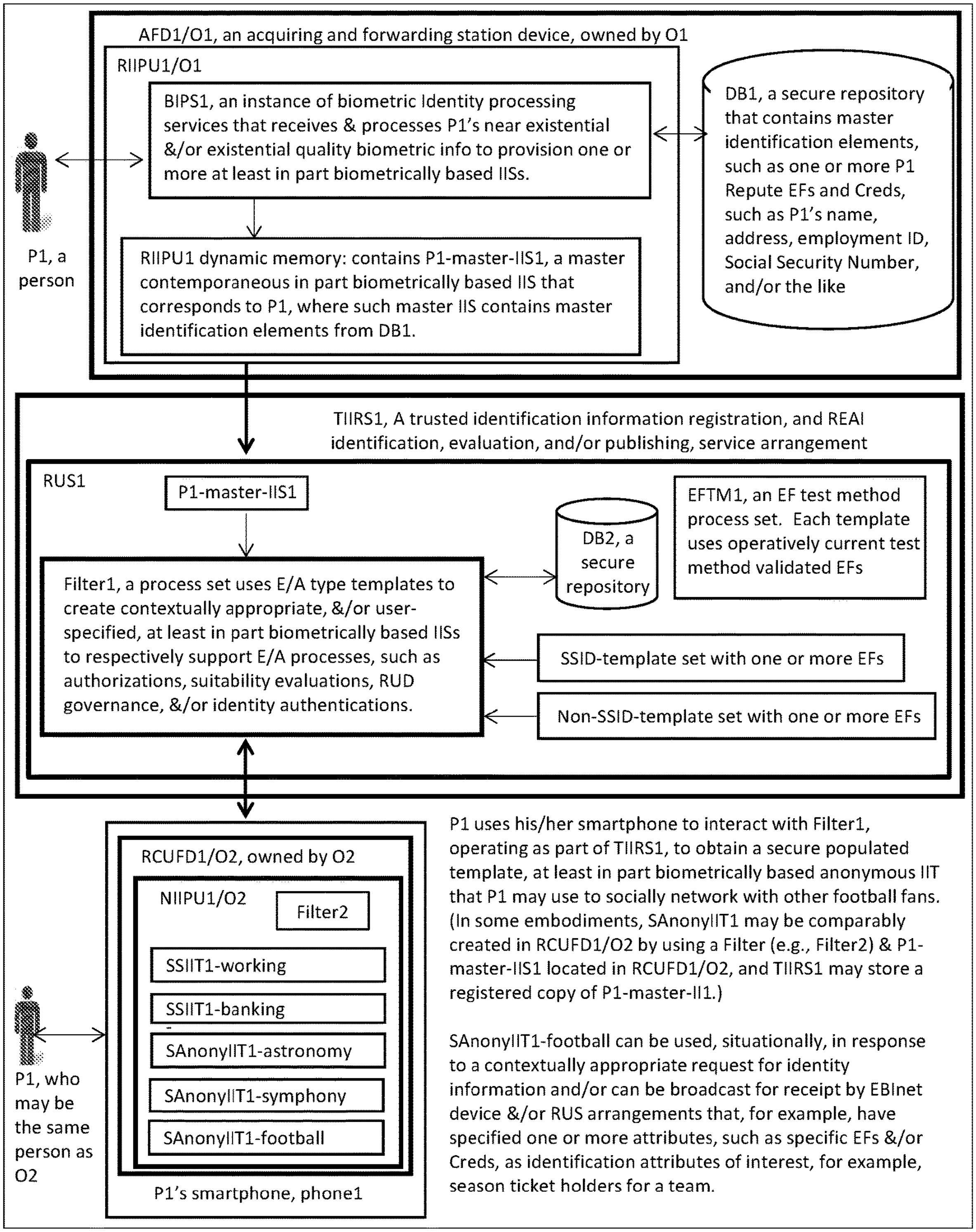

Figure 43A: Non-limiting example of pBIDE, a pervasive biometric Identification environment that includes mobile identity presentation capabilities, where such embodiment enables a user, P1, employing an anonymous, situationally suitable, at least in part biometrically based IIT, SAnony-IIT2, to form an affinity group comprising people carrying their respective EBInet compliant RCUFDs that share P1's interest in attending the next Super Bowl game.

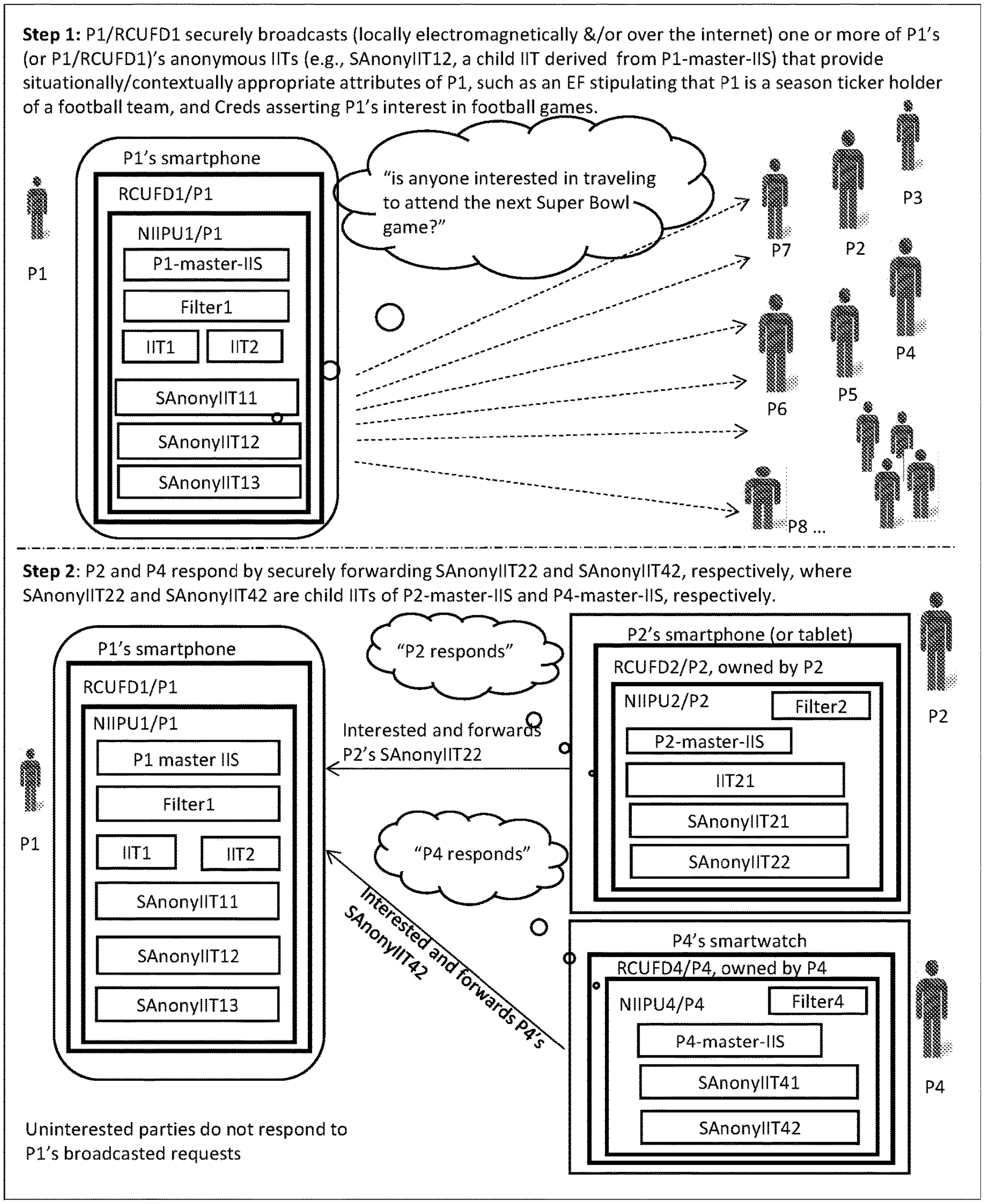

Figure 43B Continuation of Figure 43A

Step 3: P1/RCUFD1, P2/RCUFD2, and P4/RCUFD4, deciding to interact further, agree to form an affinity group. Such formation of the affinity group can include P1/RCUFD1, P2/RCUFD2, and P4/RCUFD4 securely:

(i) registering their respective CIISs with SCNSA1 (which can be performed at an earlier time/date);

(ii) employing, if needed, respective filters (e.g., Filter1, Filter2, and Filter 4) to generate further anonymous child IITs using respective master IITs that provide additional identification information (e.g, SAnonyIIT13, SAnonyIIT23, and SAnonyIIT43) .

Step 4: P1/RCUFD1, P2/RCUFD2, and P4/RCUFD4 respectively, securely forward their IIS signed SAnonyIIT3, SAnonyIIT23, and SAnonyIIT43 to SCNSA1 (and/or to a TIIRS) to register them.

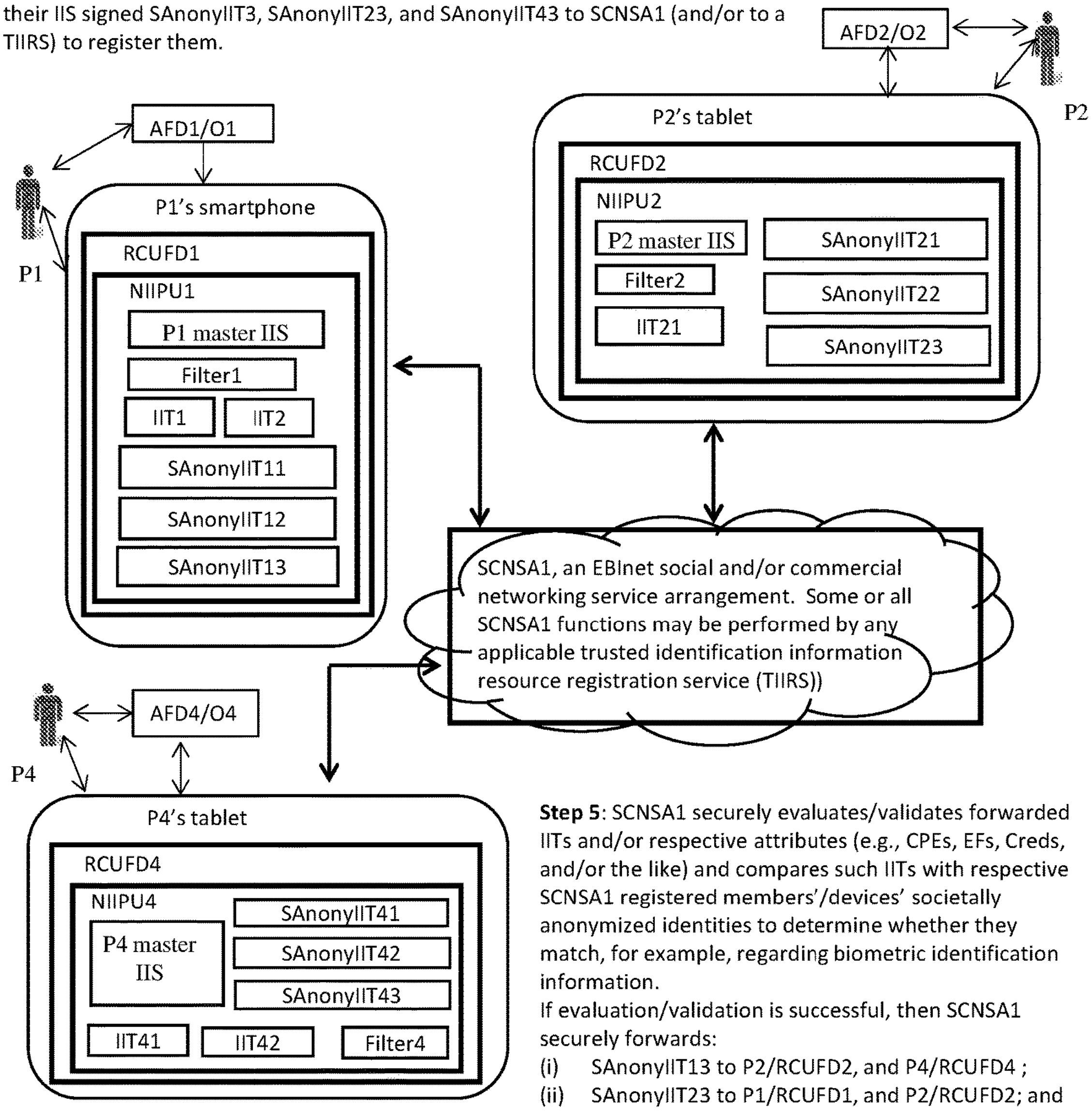

Step 5: SCNSA1 securely evaluates/validates forwarded IITs and/or respective attributes (e.g., CPEs, EFs, Creds, and/or the like) and compares such IITs with respective SCNSA1 registered members'/devices' societally anonymized identities to determine whether they match, for example, regarding biometric identification information.

If evaluation/validation is successful, then SCNSA1 securely forwards:

(i) SAnonyIIT13 to P2/RCUFD2, and P4/RCUFD4 ;

(ii) SAnonyIIT23 to P1/RCUFD1, and P2/RCUFD2; and (iii) SAnonyIIT43 to P1/RCUFD1, and P4/RCUFD4.

Figure 43C: Continuation of Figures 43A and 43B.

Step 5: P1/RCUFD1, P2/RCUFD2, and P4/RCUFD4 respectively evaluate/validate SCNSA1 forwarded IITs. If evaluation/validation is successful and satisfy their respective purposes , P1/RCUFD1, P2/RCUFD2, and P4/RCUFD4 can decide to communicate with each other directly and request SCNSA1 to establish secure communication paths between them.

Step 6: SCNSA1 establish secure communication paths (such as, for example, VPN) by providing P1/RCUFD1, P2/RCUFD2, and P4/RCUFD4 with encryption keys and/or other key material they can use to directly communicate with each other securely, including forming an ad hoc affinity group to fulfill a common purpose, such as making plans to travel to Super Bowl together.

Step 7: P1/RCUFD1, P2/RCUFD2, and P4/RCUFD4 securely establish a video conferencing session to further acquaint themselves with each other and then proceed to plan their joint trip to attend next Super Bowl game. They securely exchange societally identifying IISs, comprising attributes such as names, mobile phone numbers and/or other contact and identification information.

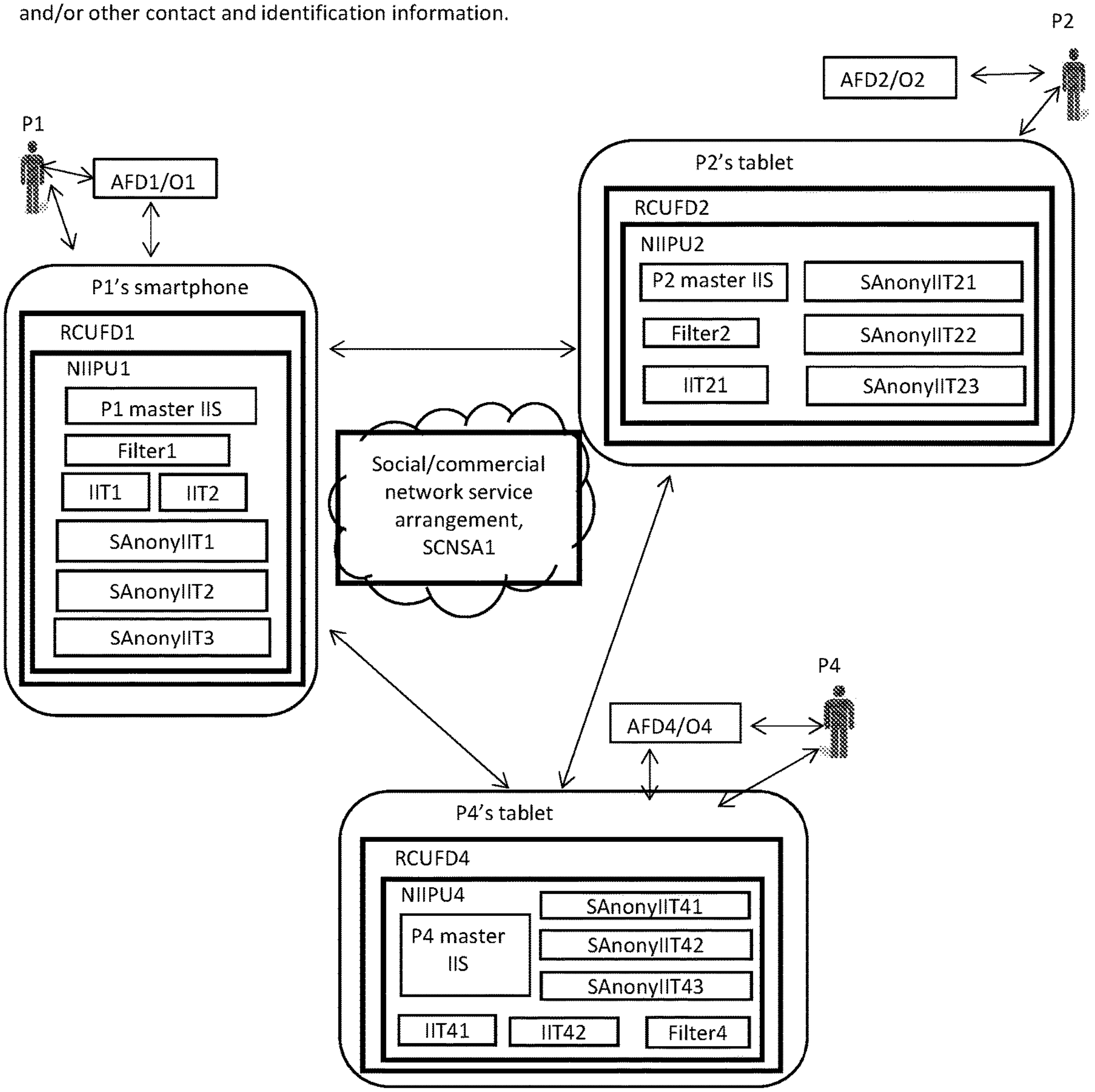

Figure 44: An outline of a non-limiting example, illustrated by Figures 46A – 46E, of a trusted pBIDE arrangement that enables CertPers, and/or users, &/or their device &/or service arrangements, to (i) register REAIs' IISs (e.g., REAI CertPers', users', &/or person/device fused-identity entities' IISs); (ii) authenticate/validate such REAIs' IISs; &/or (iii) identify/evaluate one or more suitable REAIs for fulfilling users' respective purposes.

Step 1: CertPers &/or users respectively register/publish REAIs as respective subject matters & such subject matters' associated at least in part biometrically based IISs (i.e., CIISs and/or CBEIISs). For example, CertPers, users, devices, services (such as Pub1), software &/or other info and/or tangible objects, & their associated IISs can be registered in the form of subject matter REAI information sets with one or more TIIRSs (e.g., TIIRS1). Such IISs (e.g., IITs) are at least in part digitally signed/certified, &/or otherwise securely bound to such IISs' respective subject matter REAIs.

Step 2: RCUFD1/CertPer1 certifies/signs RS1 &/or RS1 IIS(s) individually &/or as a set, where CertPer1 is the user of RCUFD1 & RS1 is a resource set. CertPer1/RCUFD1 interacts with TIIRS1 to retrieve/identify, authenticate, &/or otherwise evaluate Pub1 at least using Pub1 IIS information (e.g., CIISs &/or EBICerts). If Pub1 is determined to be suitable/authentic (e.g., satisfies requirements), CertPer1/RCUFD1 interacts with Pub1 to publish &/or register RS1. CertPer1/RCUFD1 &/or PUb1 registers RS1 & associated IISs (e.g., CIISs) with TIIRS1.

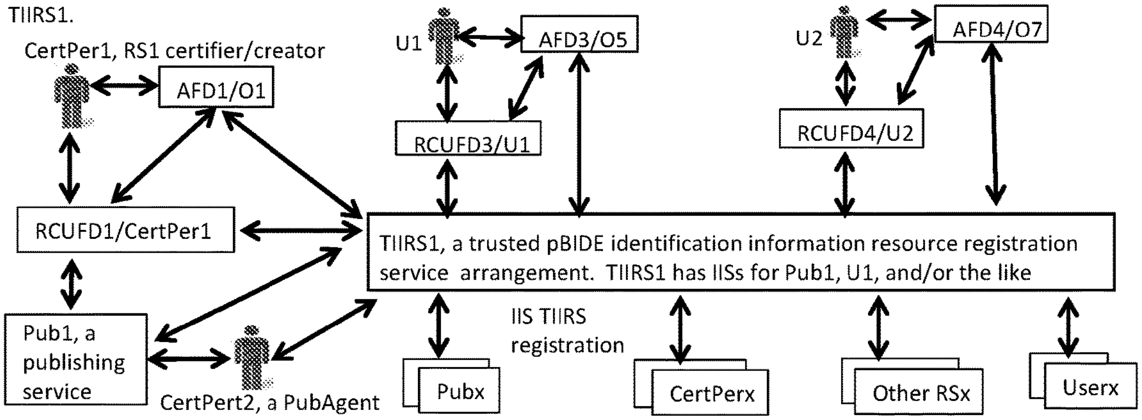

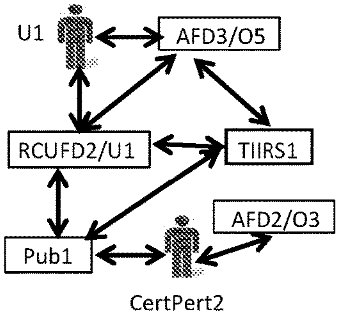

Step 3 RCUFD2/U1 interacts with TIIRS1 to retrieve Pub1's associated (fused-identity) one or more CIISs and RS1 and/or RS1's one or more IISs (&/or portions thereof) & evaluates their identifying attributes for suitability to U1's purposes. If Pub1 & RS1(1) are determined to be suitable & authentic, U1/RCUFD2 obtains RS1(2), a copy of RS1(1), from Pub1. RCUFD2/U1 may validate the authenticity of RS1(2) IIS & its subject matter set by comparing/matching them with information from TIIRS1, such as with RS1(1), &/or RS1(1) IIS, information. RCUFD2/U1 forwards RS1(3), a copy of RS1(2), & associated one or more IISs, to RCUFD3/U2, for authentication & use. (If U1 modifies RS1 subject matter, which produces a new resource set, RS2(1), then RCUFD2/U1 registers RS2(1) with TIIRS1 as a new subject matter).

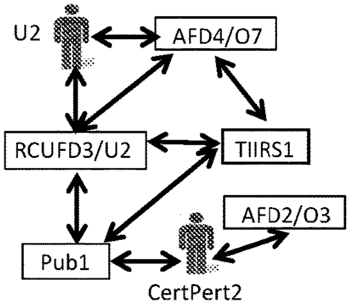

Step 4a: RCUFD3/U2 interacts with TIIRS1 to retrieve RCUFD2/U1, Pub1, &/or RS1 IIS/IIT information, such as their respective CIISs, CBEIISs, &/or other IISs (including CertPer1 IIS).

Step 4b: RCUFD3/U2 evaluates such one or more IISs for their respective suitability to U2's purposes.

Step 4c: If RCUFD2/U1, Pub1, & RS1(3) are determined to be suitable, RCUFD3/U2 obtains RS1(4), a copy of RS1(1) &/or one or more associated IISs, from Pub1. RCUFD3/U2 validates the authenticity of RS1(4) (e.g., determines whether it is a fake), received from RCUFD2/U1, using a copy, &/or cryptographic hash, of RS1, & IIS, provided by TIIRS1 &/or Pub1.

Figure 45: A table describing human roles and EBInet devices in Figures 46A – 46E

| **Primary actor human parties illustrated in Figure 44** | **Composite identification information for EBInet devices'/services' and persons' respective fused identities for EBInet devices of primary actor human parties, such CIISs presented using a short form** | **Roles of human parties illustrated in Figures 46A –46E** |
|---|---|---|
| CertPer1 is the same person as O2 | CIIS1(AFD1/O1, #CertPer3)<br>CIIS1(RCUFD1/O2, #CertPer4)<br><br>Certain antecedent identification information for AFD1/O1:<br>CIIS1(CertPer3/(AFD5/O7, #CertPer12))<br><br>Certain antecedent identification information for RCUFD1/O2:<br>CIIS1(CertPer4/(AFD6/O8, #CertPer13)) | CertPer1 is RS(1) certifier, who may be its creator,<br>CertPer3 and CertPer4 are certifiers of AFD1 and RCUFD1, respectively<br><br>CertPer12 and CertPer13 are certifiers of AFD5 and AFD6, respectively, where<br>(i) AFD5 is an AFD at AFD1's manufacturer facility that acquired CertPer3's near existential or existential quality at least in part biometrically based IIS;<br>(ii) AFD6 is an AFD at RCUFD1's manufacturer facility that acquired CertPer4's near existential or existential quality at least in part biometrically based IIS. |
| CertPer2 is the same person as O4 | CIIS1(RUS2/O3, #CertPer5)<br>CIIS1(AFD2/O3, #CertPer6)<br>CIIS1(RCUFD2/O4, #CertPer7)<br><br>Relevant antecedent identification information | CertPer2 is Pub1 agent<br>CertPer5 is RUS1 certifier<br>O3 is a human party agent of Pub1 (Pub1 owns AFD2)<br>O4, the owner of RCUFD2, is the same person as CertPer2<br>CertPer6 and CertPer7 are certifiers of AFD2 and RCUFD2, respectively |
| U1 is the same person as O6 | CIIS1(AFD3/O5, #CertPer8)<br>CIIS1(RCUFD3/O6, #CertPer9)<br><br>Relevant antecedent identification information | U1 is a user who retrieves a copy of RS1(1) from Pub1 and sends a copy to RCUFD4/U2<br>CertPer8 and CertPer9 are certifiers of AFD3 and RCUFD3, respectively |
| U2 is the same person as O8 | CIIS1(AFD4/O7, #CertPer10)<br>CIIS1(RCUFD4/O8, #CertPer11)<br><br>Relevant antecedent identification information | U2 is a user who retrieves a copy of RS1(4) from Pub1 and sends a copy to RCUFD4/U2 |

Figure 46A: Non-limiting example of a TIIRS, an established pBIDE trusted identification information resource registration/evaluation/management service arrangement that enables CertPers, &/or users, & their EBInet device &/or service arrangements, to securely: (i) register such CertPers', &/or users' respective person, device, service, instances &/or associated other REAIs, using instances' respective IISs, (ii) authenticate/validate such instances; &/or (iii) identify/evaluate/manage one or more suitable resources &/or events/activities in fulfillment of users' respective purposes.

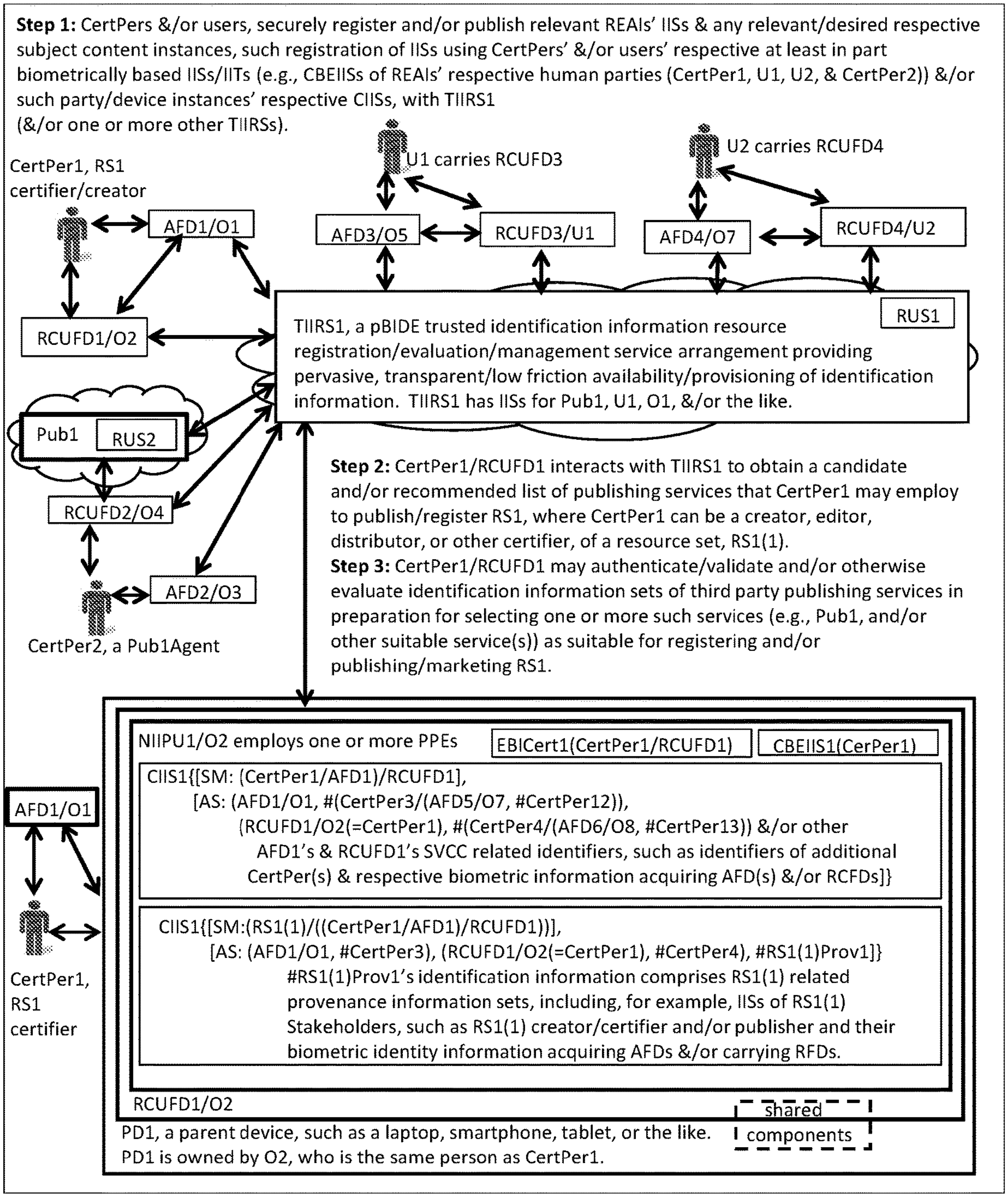

Figure 46B: Continuation of Figure 46A. Figure 46B illustrates an established trusted pBIDE arrangement enabling a user (CertPer1) to certify and register/publish a resource set, RS1, with a third party publishing service using a CIIS of a fused identity entity, comprising such user and such user's RCUFD, such CIIS carried by such user's RCUFD that is securely integrated into a parent smartphone device arrangement, PD1.

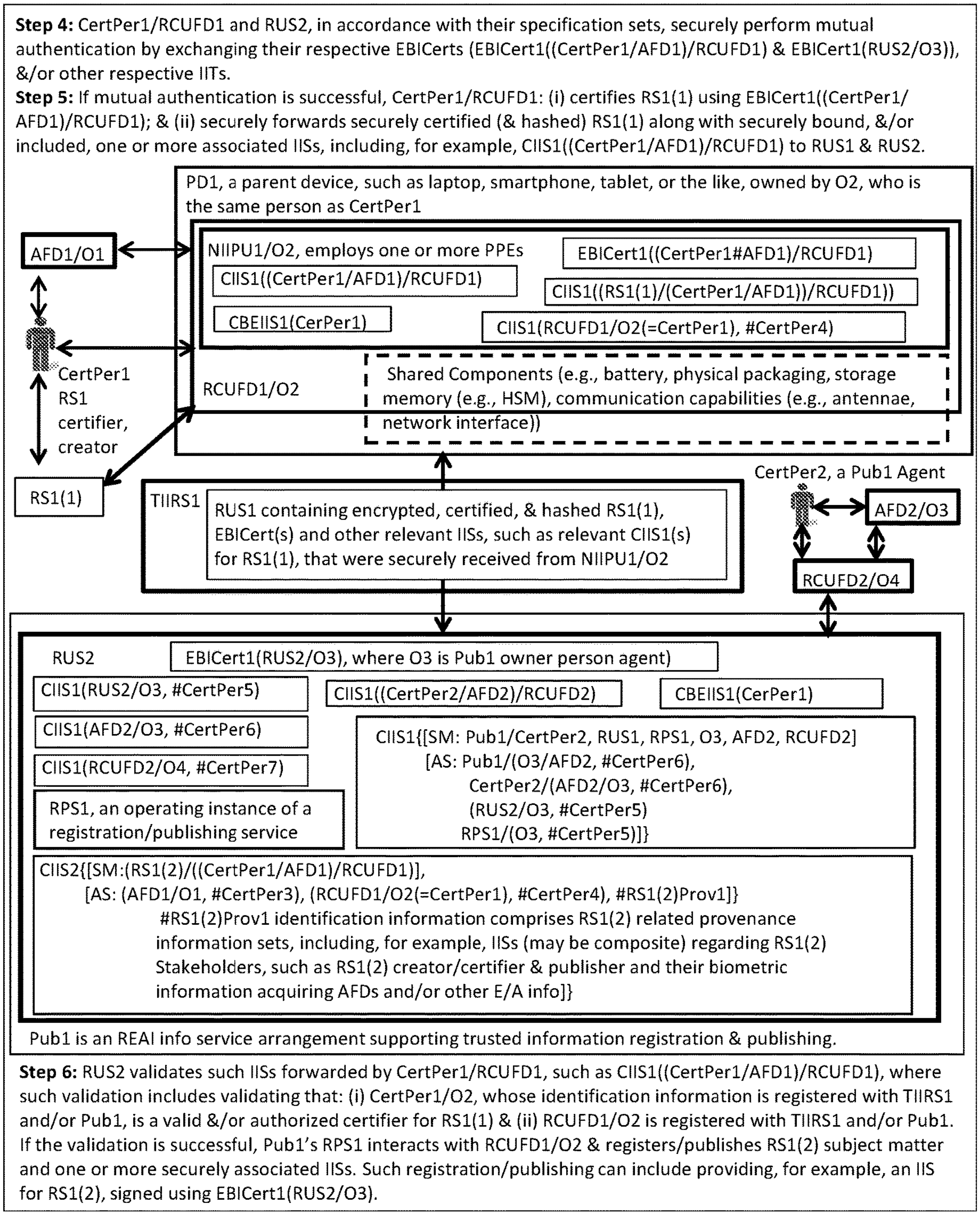

Figure 46C: Continuation of Figure 46B. Figure 46C illustrates RCUFD3/U1 retrieving from Pub1, a copy of a resource set, RS1(2), & associated CIIS set that are registered with TIIRS1 & published by Pub1. RCUFD3/U1 validates TIIRS1's &/or Pub1's respective authenticity as a source by checking their one or more IISs, EFs, QtPs, &/or the like. RCUFD3/U1 determines Pub1's suitability for: (i) certifying &/or authenticating RS1(3), a copy of RS1(2); &/or (ii) providing attribute information for suitability determination of RS(1) (i.e., subject matter), where such attribute info includes, for example, one or more of IISs for RS1(1), RS1(1) CertPers, &/or relevant EBInet device &/or service arrangements (such as RCFDs, AFDs, &/or RUSs).

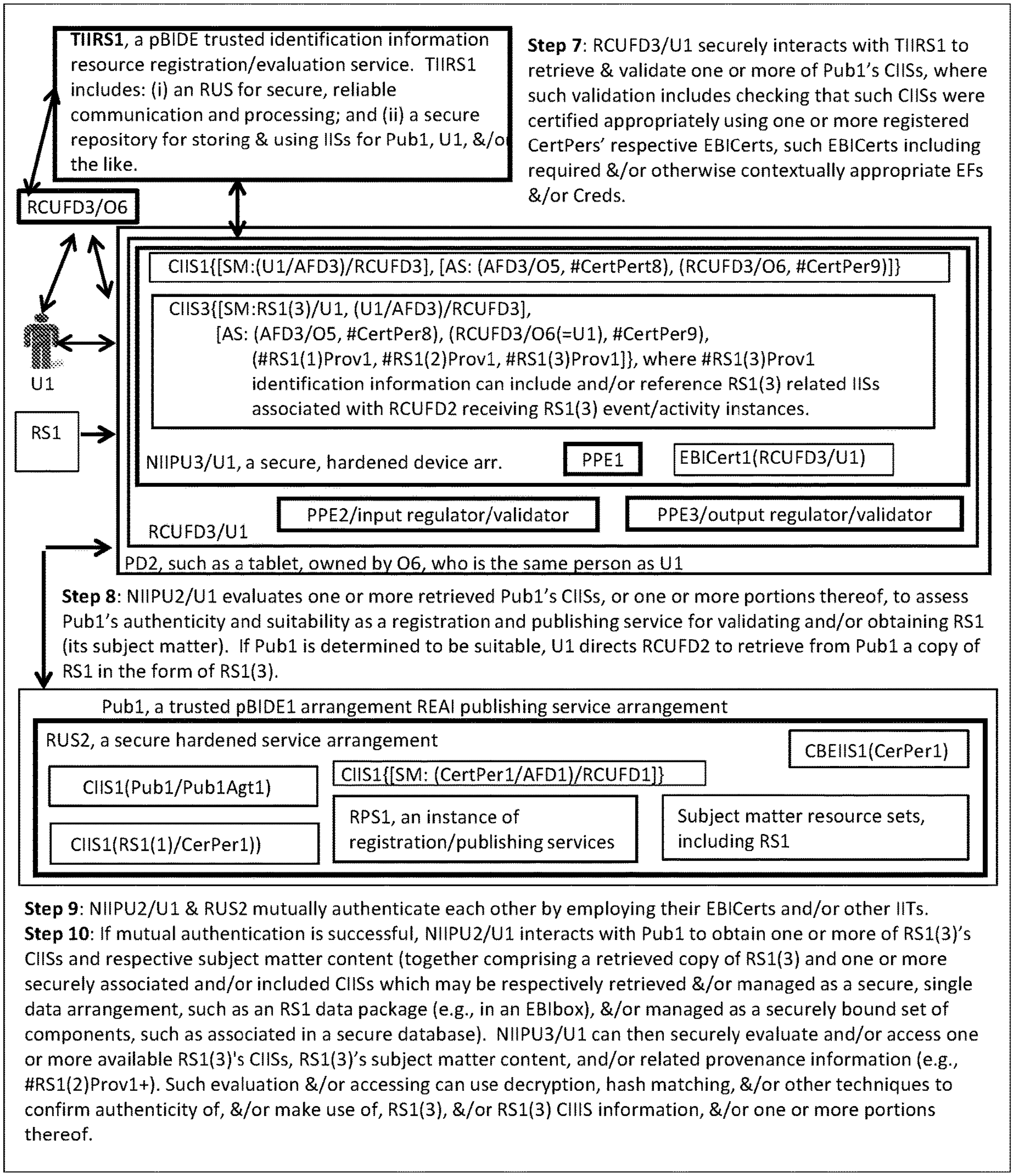

Figure 46D: Continuation of Figure 46C. Figure 46D illustrates RCUFD3/U2 interacting with TIIRS1 (and/or other relevant service(s)) to determine TIIRS1's authenticity and/or suitability for certifying, authenticating and/or providing attribute information regarding registered resources. Based on successful results, RCUFD3/U2 employs TIIRS1 to compare RS1(3) against at least a portion of such TIIRS1 registered copy of RS1(1) subject matter IIS information (e.g., a hash of RS1), and/or other RS1(1) identifying and/or summarizing information, to ensure authenticity of an RS1 copy.

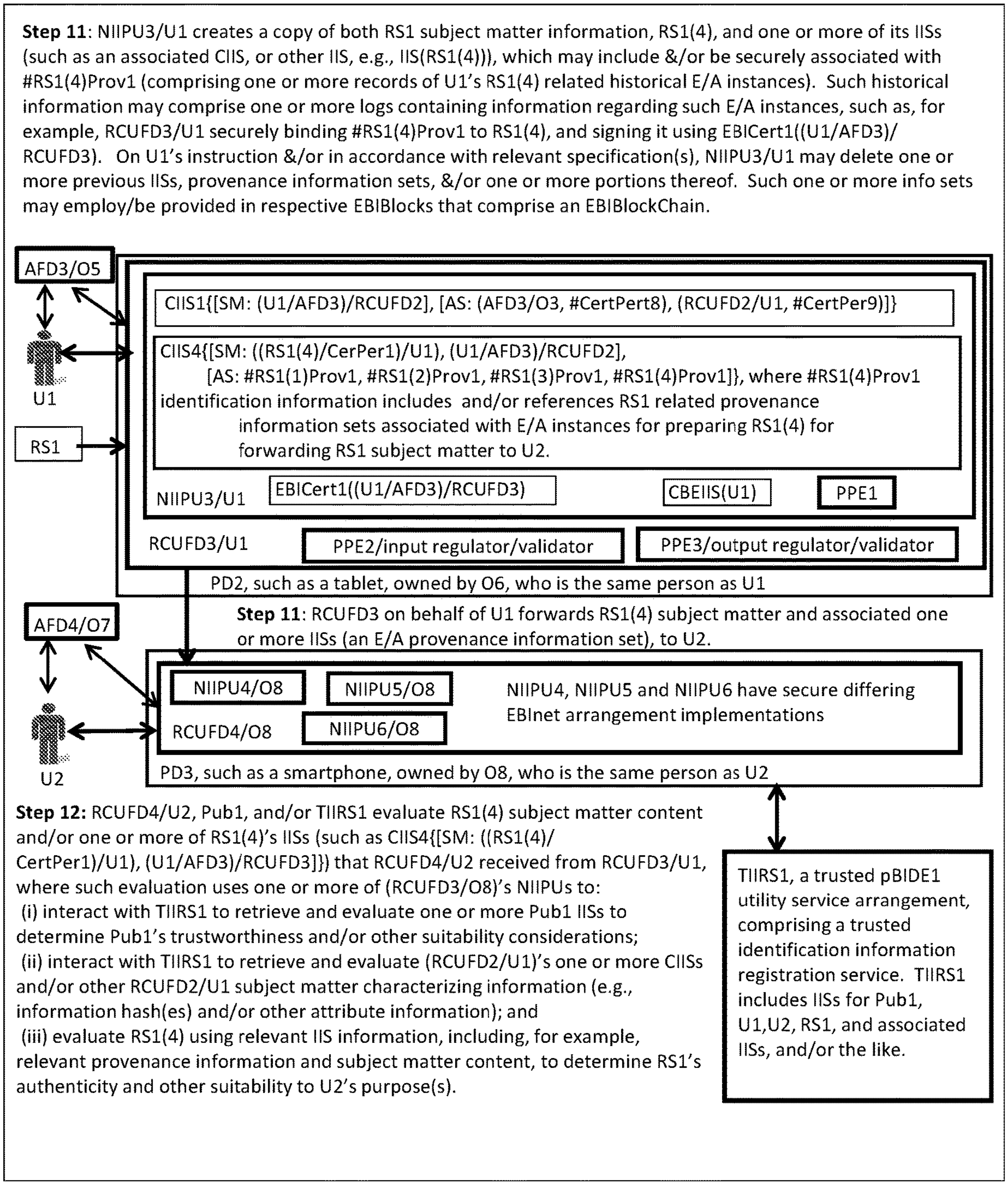

Figure 46E: Continuation of Figure 46D. Figure 46E illustrates RCUFD4/U2 causing &/or performing a suitability evaluation & determination of authenticity of RS1 as received from RCUFD3/U1 (e.g., authenticity regarding whether RS1 was modified (e.g., maliciously)). RCUFD4/U2 can strengthen recognition of security faults by having NIIPU4/U2 check that one of differently implemented NIIPU5/U2 and NIIPU6/U2, when performing an identification function, has not been suborned (e.g., by malware) through matching of results.

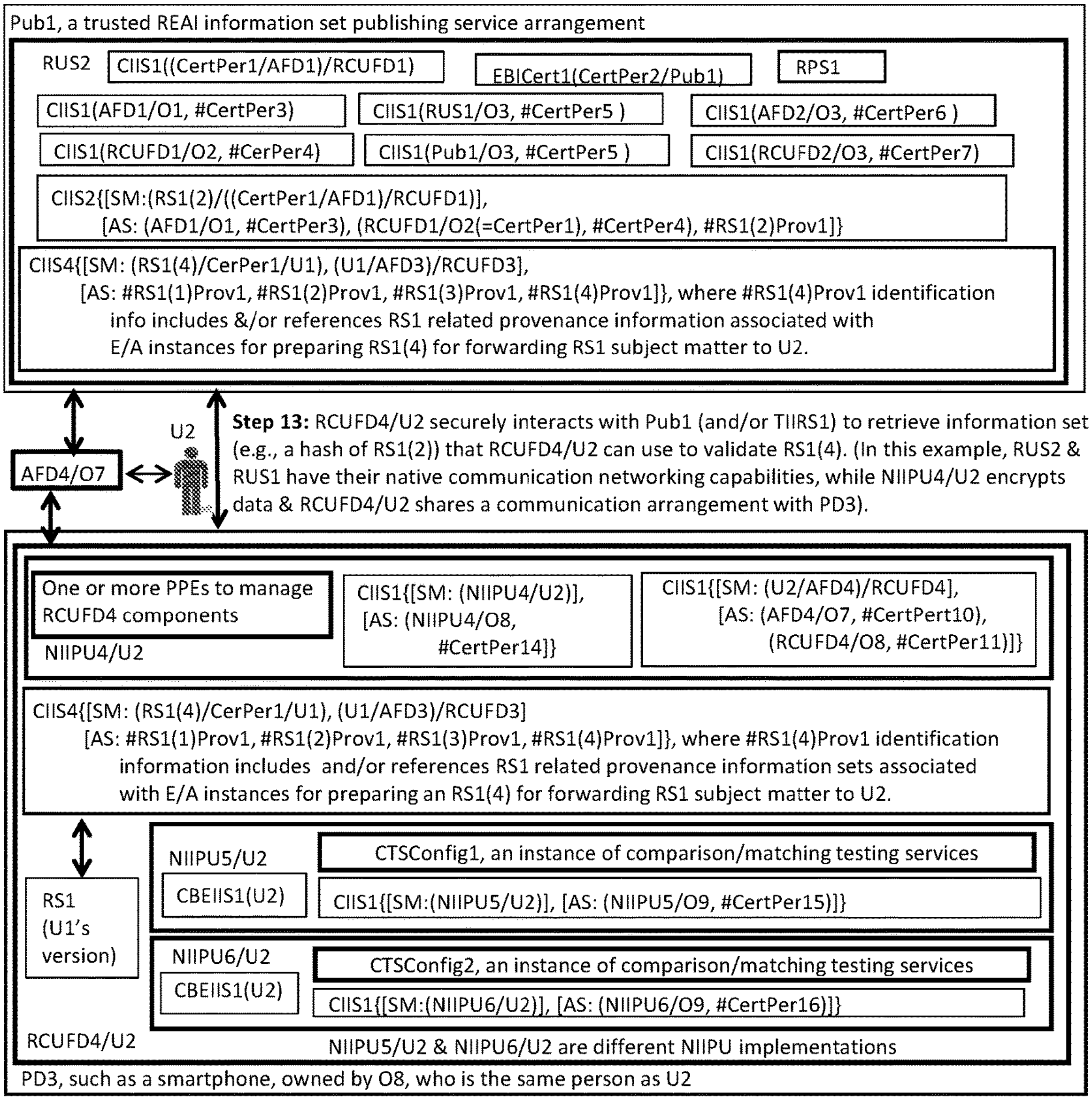

Step 14: CTSConfig1, processing in NIIPU5/U2, & CTSConfig2, processing in NIIPU6/U2, respectively securely interact with Pub1 &/or TIIRS1 to perform, locally &/or remotely, identification & comparison/matching functions for two instances of RS1 subject matter content, in accordance with RCUFD4, Pub1, &/or TIIRS1 specification(s), where: (i) RS1(1) was previously registered/published by CertPer1; & (ii) RS1(4) was received from U1. CTSConfig1 & CTSConfig2 respectively provide results to NIIPU4/U2, which compares the results. If results match, RCUFD4/U2 notifies U2 that RS1(4), received by RCUFD4/U2, is an authentic instance of RS1. If comparison/matching does not satisfy applicable specification(s), RCUFD4/U2 quarantines comparison/matching results & securely alerts (e.g., notifies) admin, RPS1, TIIRS1, Pub1, &/or U2.

Figure 47A: Non-limiting example of one or more TIIRS, and/or EBICert device, arrangements building & managing an SVCC provenance EBIBlockChain comprising EBIBlocks whose primary subject matters are RCUFD2 & RCUFD2 associated E/As. Such EBIBlockChain comprises an aggregation of secure provenance information & rules governing SVCC objects, as they move through a secured commercial chain of handling & control.

Step 1: AFD1/O1 acquires CertPer1's near existential or existential quality at least in part biometrically based data, and creates CIIS1(CertPer1/AFD1+), a composite IIS for a fused-identity entity, CertPer1/AFD1.
Step 2: AFD1/O1 (i) forwards CIIS1(CertPer1/AFD1+) to RCUFD1/O2; and (ii) forwards and registers CIIS1(CertPer1/AFD1+) with TIIRS1.
Step 3: CertPer1/RCUFD1 uses CIIS1(CerPer1/AFD1+) to create CIIS1((CertPer1/AFD1+)/RCUFD1+) & registers it with TIIRS1. CertPer1/RCUFD1 then uses it to initiate E/A1 processing that securely enables: (i) CertPer1/RCUFD1 to certify the manufacturing of Smartphone2 with integrated RCUFD2; & (ii) CertPer1/RCUFD1, &/or an administrative arrangement (RUS1), to generate and embed secret info into RCUFD2/NIIPU2, such as a private key(s), for encrypting intangible resources &/or validating RCUFD2's identity.
Step 4: CertPer1/RCUFD1 uses an RCUFD2 IIS framework (incl. an RCUFD2 template) to create a composite IIS, CIIS1(RCUFD2/((CertPer1/AFD1+)/RCUFD1+)), whose primary subject matter is RCUFD2, and signs CIIS1(RCUFD2/((CertPer1/AFD1+)/RCUFD1+)) with (CertPer1/RCUFD1)'s EBICert and registers it with TIIRS1.
Step 5: CertPer1/RCUFD1 creates an EBIBlock, EBIBlock1(RCUFD2/((CertPer1/AFD1+)/RCUFD1+), #(E/A1((CertPer1/AFD1+)/RCUFD1+))), that contains CIIS1(CIIS1(RCUFD2/((CertPer1/AFD1+)/RCUFD1+)) and other E/A1 audited transaction related information.
Step 6: CertPer1/RCUFD1 securely forwards and registers EBIBlock1(RCUFD2/((CertPer1/AFD1+)/RCUFD1+), #(E/A1((CertPer1/AFD1+)/RCUFD1+))) with TIIRS1.

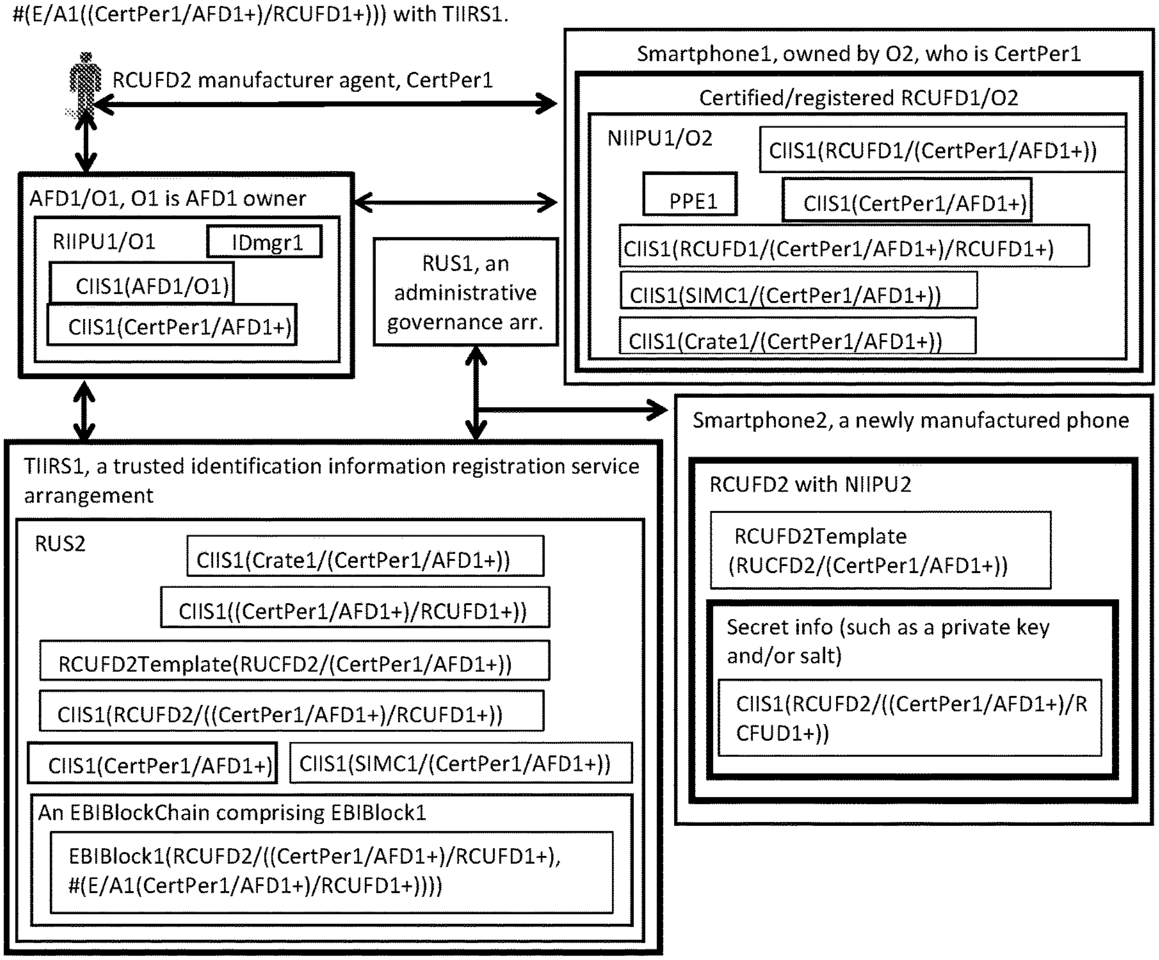

Figure 47B: Continuation of Figure 47A
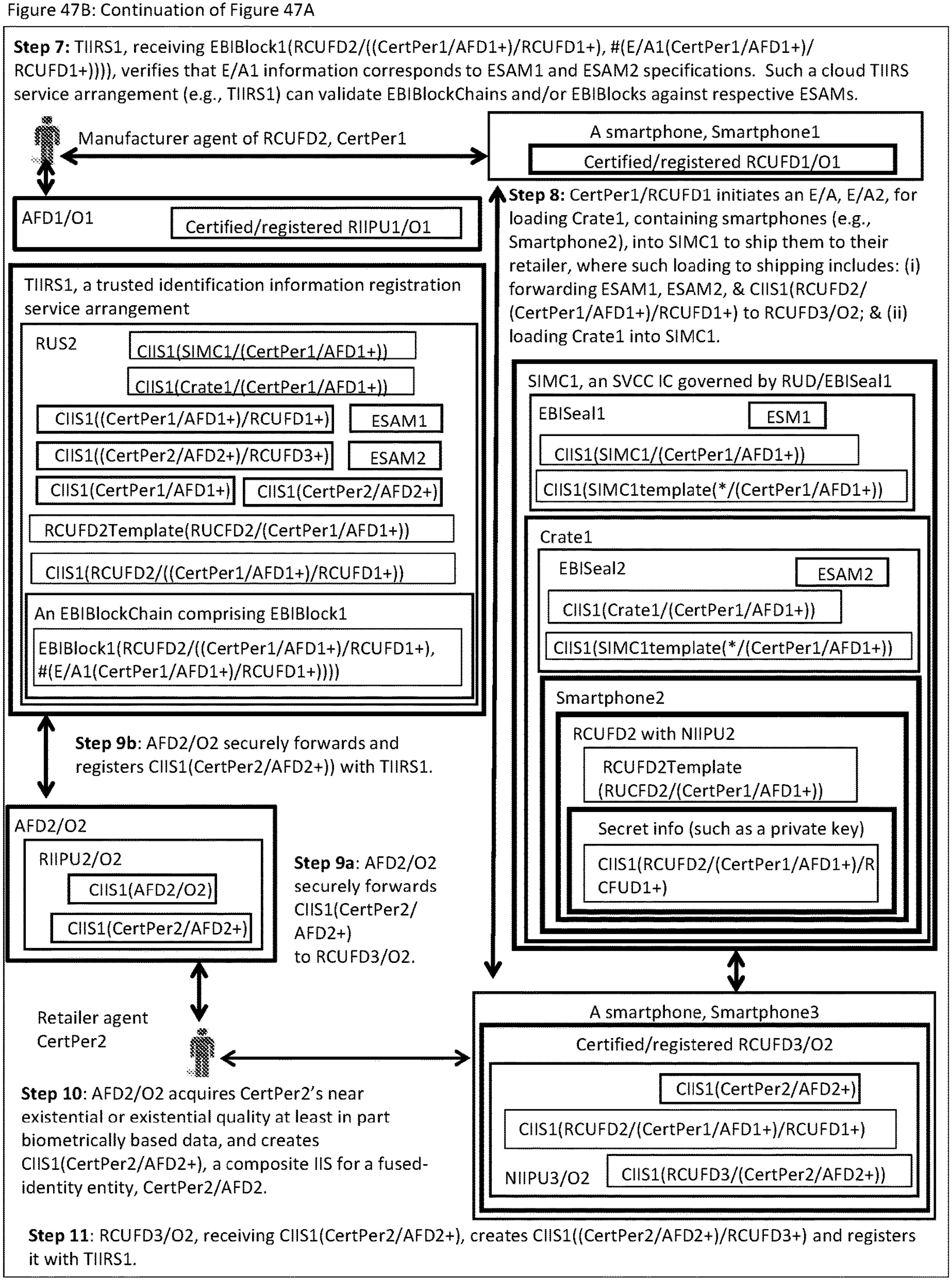

Figure 47C: Continuation of Figure 47B

Step 12: When SIMC1 arrives at the retailer, CertPer2/RCUFD3 initiates E/A3, an E/A for governing and performing receiving, unloading and registering receipt of SIMC1 content (e.g., Smartphone2). E/A3 comprises: (i) creating CIIS1(RCUFD2/((CertPer2/AFD2+)/RCUFD3+) & EBIBlock2(RCUFD2/((CertPer2/AFD2+)/RCUFD3+), #E/A3((CertPer2/AFD2+)/RCUFD3+)); (ii) securely binding CIIS2(RCUFD2/((CertPer2/AFD2+)/RCUFD3+), #E/A3(CertPer2/AFD2+)) with RCUFD2/((CertPer2/AFD2+)/RCUFD3+); & (iii) securely binding &/or securely associating such EBIBlock with its primary subject matter, RCUFD2.

Step 13: RCUFD3/O2 securely forwards to & registers with TIIRS1:
(i) CIIS2(RCUFD2/((CertPer2/AFD2+)/RCUFD3+) &
(ii) EBIBlock2(RCUFD2/((CertPer2/AFD2+)/RCUFD3+), #E/A1((CertPer1/AFD1+)/RCUFD3+)).

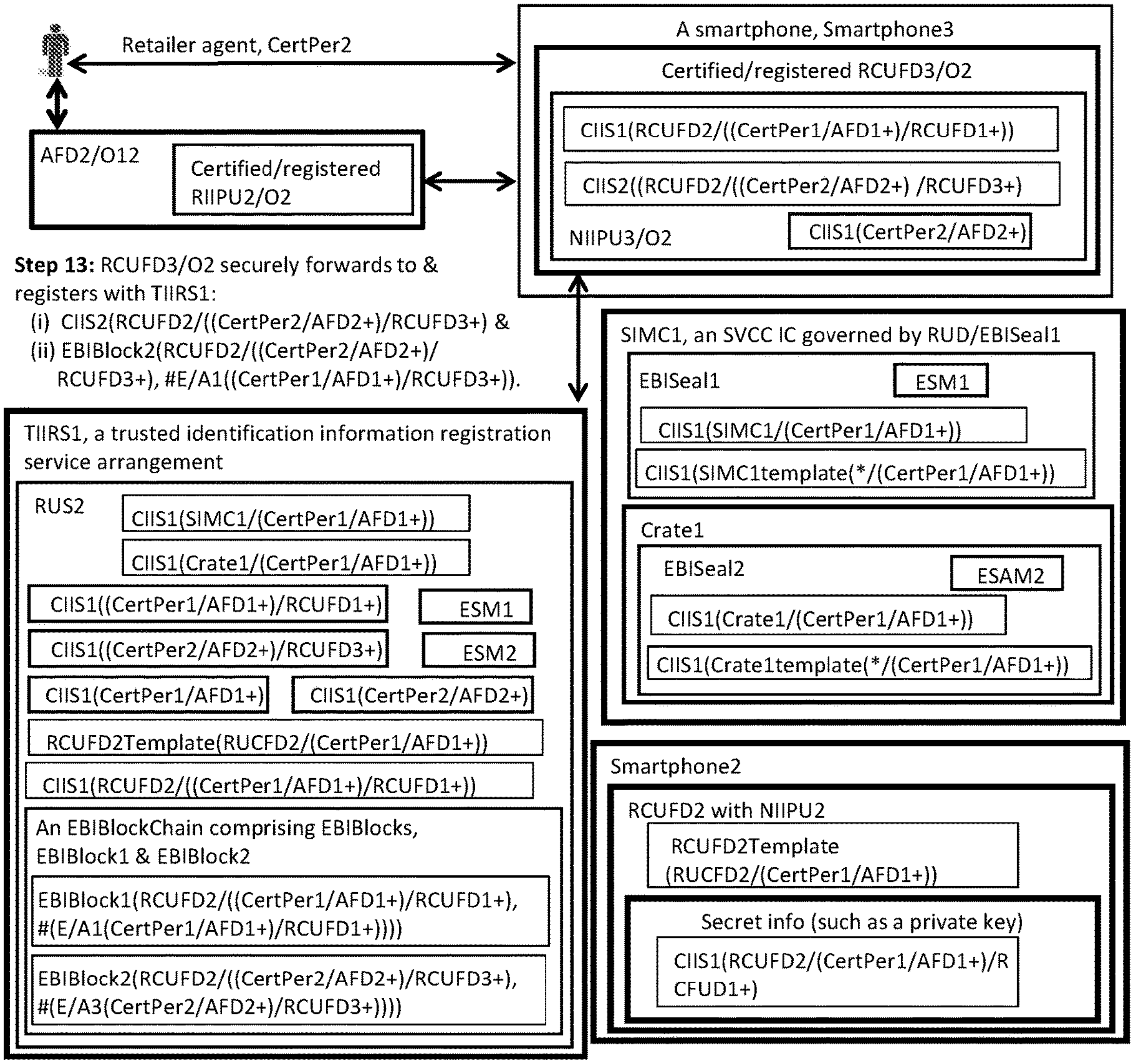

Step 14: TIIRS1, receiving EBIBlock2, verifies that E/A3 information corresponds to ESAM1 &ESAM2 specifications, including for any anomalies. TIIRS1 cryptographically bind EBIBlock2(RCUFD2/(CertPer2/AFD2+), #(E/A2(CertPer2/AFD2+)/RCUFD3+))) to EBIBlock1(RCUFD2/(CertPer1/AFD1+), #(E/A1(CertPer1/AFD1+)/RCUFD1+))) to form an EBIBlockChain. In some embodiments, as part of registration process, RCUFD3 and RUS1 may perform mutual authentication and enforce other policy compliance. Registering such EBIBlockChain securely bound &/or otherwise associated with, its primary subject matter, RCUFD2, enables third parties to confirm integrity of RCUFD2 and any associated E/As by matching TIIRS1 registered information with such bound and/or associated identification information.

Figure 47D: Continuation of Figure 47C

Step 15: P1 requests to purchase Smartphone2. CertPer2/RCUFD2 uses CIIS1(CertPer2/AFD3+) to initiate E/A3 for processing such a purchase. E/A3 processing includes, at the point of sale:

(1) AFD2/O3: (i) acquiring P1's near existential or existential quality at least in part biometrically based data to create CIIS1(P1/AFD2+) based on at least in part acquired biometrically based data; & (ii) securely registering CIIS1(P1/AFD2+) with TIIRS1 & RUS3 & securely forwarding it to RCUFD3/O2; &

(2) CertPer2/RCUFD3: (i) interacting with RUS3/O3 to activate RCUFD2 so that it becomes operational; (ii) CertPer2/RCUFD3 creating CIIS2(P1/AFD2+, #((CertPer2/AFD2+)/RCUFD3+)) & CIIS2(RCUFD2/O5(=P1), #(CertPer2/AFD2+)/RCUFD3+)); (iii) registering created CIISs with TIIRS1 & forwarding it to RCUFD2/P1; & (iv) creating an EBIBlock, EBIBlock3(RCUFD2/(P1/AFD2+), #(E/A3(CertPer2/AFD2+)/RCUFD3+)) & signing &forwarding to TIIRS1.

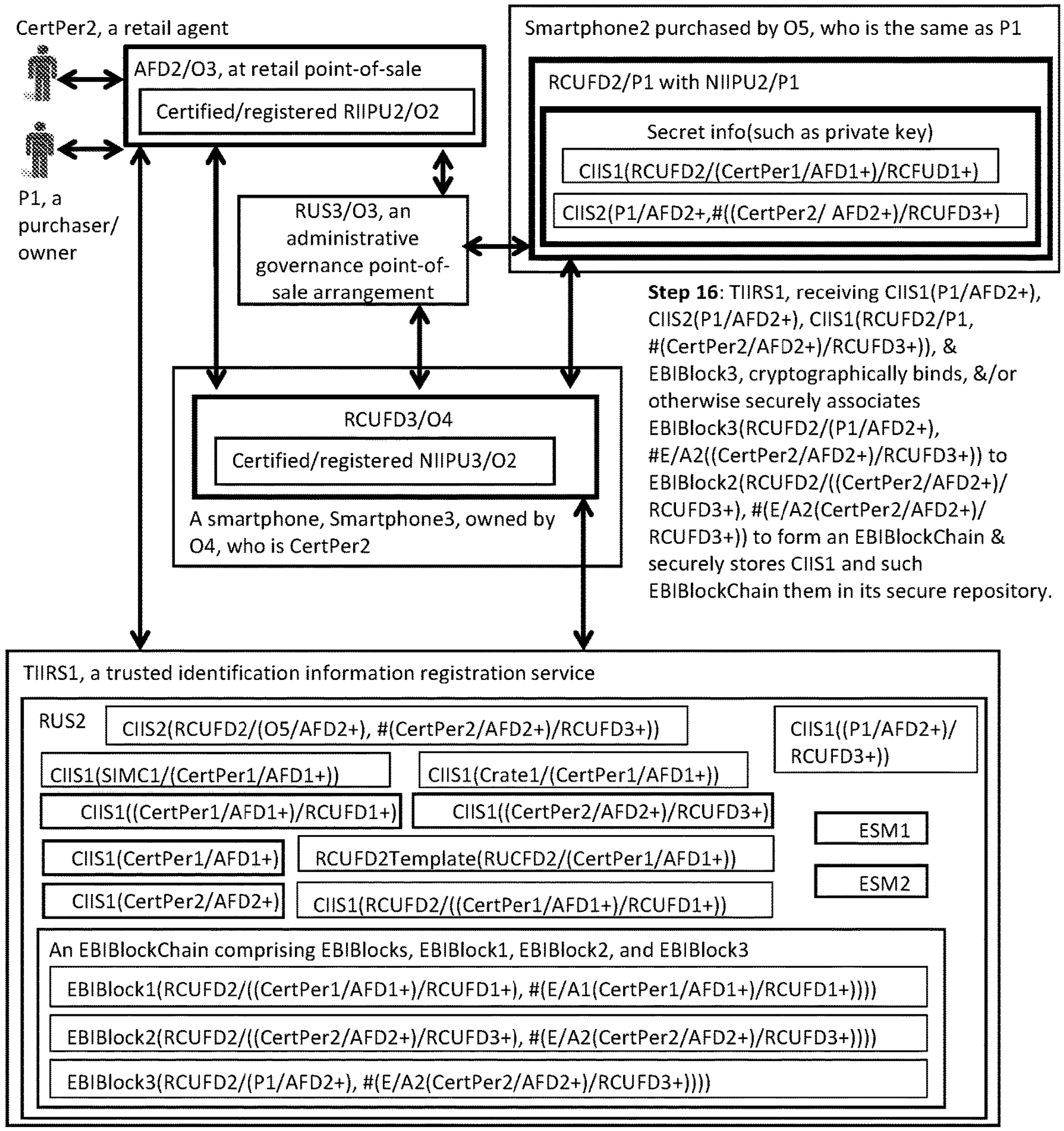

Figure 47E: Continuation of Figure 47D
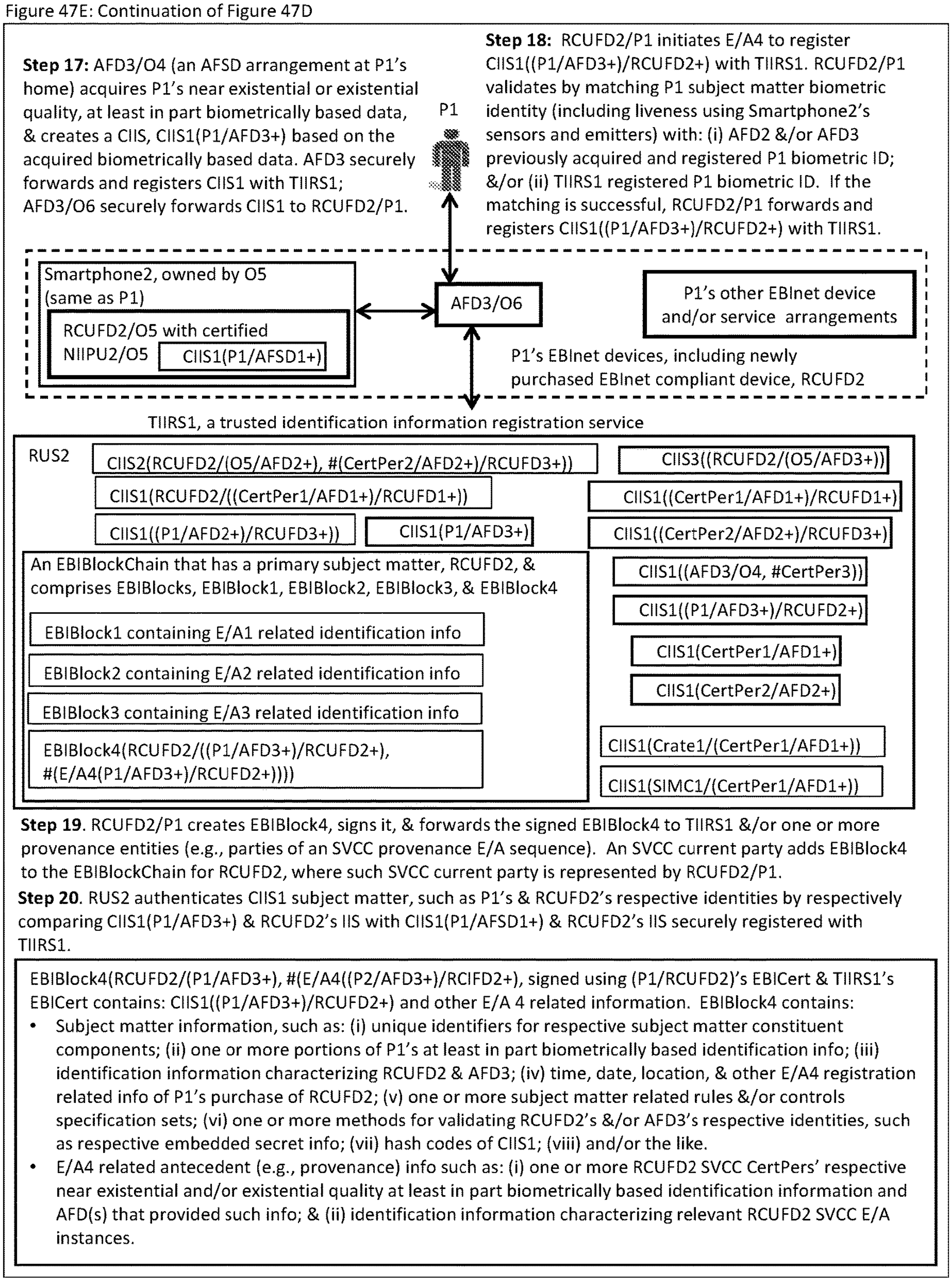

Figure 48A: a list of human parties and their device arrangements and EBICerts

| Human Parties | Fused-identity device arrangement associated with human parties | Human parties' respective EBICerts |
|---|---|---|
| Cen1CertPer1 may be the same person as Cen1Agt1 | (AFD1/O1, #CertPer1)<br>(RCFD1/O2, #CertPer2)<br>(RUS1/O3, #CertPer3) | EBICert1(RUS1/((Cen1CertPer1/AFD1+)/RCFD1+)) |
| Cen1Agt1 | (AFD2/O4, #CertPer4)<br>(RCFD2/O5, #CertPer5)<br>(RUS1/O3, #CertPer3) | |
| Cen1CertPer2 may be the same person as Cen1Agt2 | (AFD3/O6, #CertPer6)<br>(RCFD3/O7, #CertPer7)<br>(RUS1/O3, #CertPer3) | EBICert2(RUS1/(Cen1CertPer2/AFD3+)/RCFD3+)) |
| Cen1Agt2 | (AFD4/O8, #CertPer8)<br>(RCFD4/O9, #CertPer9)<br>(RUS1/O3, #CertPer3) | |
| Bank1CertPer1 may be the same person as Bank1Agt1 | (AFD5/O10, #CertPer10)<br>(RCFD5/O11, #CertPer11)<br>(RUS2/O12, #CertPer12) | EBICert3(RUS2/(Bank1CertPer1/AFD5+)/RCFD5+) |
| Bank1Agt1 | (AFD6/O13, #CertPer13)<br>(RCFD4/O14, #CertPer14)<br>(RUS2/O12, #CertPer12) | |
| TIIRS1CertPer1, a human agent of TIIRS1 | (AFD7/O15, #CertPer15)<br>(RCFD7/O16, #CertPer16)<br>(RUS3/O17, #CertPer17) | EBICert4(TIIRS1/((TIIRS1CertPer1/AFD7+)/RCUFD7+)) |
| Cen1CertPer3 may be the same person as Cen1Agt3 | (AFD8/O18, #CertPer1)<br>(RCFD8/O19, #CertPer2)<br>(RUS1/O3, #CertPer3) | EBICert5(RUS1/((Cen1CertPer3/AFD8+)/RCFD8+)) |
| Cen1Agt3 | (AFD9/O20, #CertPer20)<br>(RCFD9/O21, #CertPer21)<br>(RUS1/O3, #CertPer3) | |
| Bank1CertPer2 may be the same person as Bank1Agt2 | (AFD10/O22, #CertPer22)<br>(RCFD10/O23, #CertPer23)<br>(RUS2/O12, #CertPer12) | EBICert6(RUS2/(Bank1CertPer2/AFD10+)/RCFD10+) |
| Bank1Agt2 | (AFD11/O24, #CertPer24)<br>(RCFD11/O25, #CertPer25)<br>(RUS2/O12, #CertPer12) | |

Figure 48B: a continued list of human parties and their device arrangements and EBICerts

| Human Parties | Fused-identity device arrangement associated with human parties | Human parties' respective EBICerts |
|---|---|---|
| TIIRS1CertPer2, a human agent of TIIRS1 | (AFD12/O26, #CertPer26)<br>(RCFD12/O27, #CertPer27)<br>(RUS3/O17, #CertPer17) | EBICert7(RUS3/((TIIRS1CertPer2/AFD12+)/RCFD12+) |
| U1 | (AFD13/O28, #CertPer28)<br>(RCFD13/O29, #CertPer29) | EBICert8((U1/AFD13+),<br>EBICert9((U1/AFD13+)/RCFD13+) |
| U2 | (AFD14/O30, #CertPer30)<br>(RCFD15/O31, #CertPer31) | EBICert8(U2/AFD14+),<br>EBICert11((U2/AFD14+)/RCFD14+) |

Figure 49: a list of human parties and description of their functions

| Human Parties | Information contributing to human party associated fused-identities' respective CIISs. |
|---|---|
| Cen1CertPer1, Cen1CertPer2, Cen1CertPer3 | Cen1CertPer1, Cen1CertPer2, and Cen1CertPe3 are identifiers for the role of Cen1 personnel who monitor Cen1 transactions, such as minting digital coins, governing the use of minted digital coins, providing digital coins and/or EBICoins to financial institutions, registering relevant identification information regarding digital currencies to one or more TIIRSs, and/or the like. Such CertPers then certify results of transactions by signing the results using their respective EBICerts. |
| Cen1Agt1, Cen1Agt2, Cen1Agt3 | Cen1Agt1, Cen1Agt2, Cen1Agt3 are identifiers for Agents at a Central Bank or other monetary governing authority, Cen1, who perform financial transactions, such as servicing requests from financial institutions, such as requests to buy, borrow, and/or otherwise acquire digital currencies and/or EBICoins from Cen1. |
| Bank1CertPer1, Bank1CertPer2 | Bank1CertPer1 and Bank1CertPer2 are identifiers for CertPers at a commercial bank, Bank1. In some cases, a Cen1CertPer may act as a Bank1 agent (i.e., such CertPer can be the same person as an Bank1 agent). Bank1CertPers monitor transactions performed by Bank1 agents, such as buying, borrowing, and/or otherwise acquiring digital currencies from monetary minting and/or governing authorities, servicing requests from their customers, and/or the like. |
| Bank1Agt1, Bank1Agt2 | Bank1Agt1, Bank1Agt2 are identifiers for Bank1 agents who performs financial transactions, such as acquiring digital currencies from monetary minting and/or governing authorities, servicing requests from Bank1 customers to buy and/or sell digital currencies, or transfer digital currencies from their customer to one or more parties. |
| TIIRS1CertPer1, TIIRS1CertPer2 | TIIRS1CertPer1 and TIIRS1CertPer2 are CertPers at a trusted identification information registration service (TIIRS). |
| U1, U2 | U1 and U2 are users who perform event/activity transactions, such as buying and selling EBICoins, transferring the possession of EBICoins, transferring the ownership of one or more digital coins contained in their EBICOins, and/or receiving EBICoins containing one or more digital coins. |
| O1, O2, O3, O4, O5, O6, O7, O8, O9, ..., O28, O29, ..., O32, | O1, ..., O28 are identifier for owners of EBInet device arrangements used by CertPers and/or agents at Cen1, Bank1, and TIIRS1.<br>O29 and O30 are identifiers for owners of an AFD and RCFD U1 uses to perform transactions; and<br>O31 and O32 are identifiers for owners of an AFD and RCFD U1 uses to perform transactions; |
| CertPer1, ..., CertPer32 | CertPer1, ..., CertPer32 are identifiers for CertPers of EBInet device arrangements employed by human parties (such as Cen1CertPer1, Cen1Agt1, Cen1CertPer2, ...) in the use case examples, illustrated by Figures 50 – 58C, where such CertPers are such arrangements' respective manufacturer Stakeholders who declare such arrangements' respective authenticity by EBIsigning using their respective EBICerts). |

Figure 50: Non-limiting illustrative example showing a Central Bank and/or other governing monetary authority minting digital coins and creating corresponding IISs, registering both such minted digital coins and corresponding IISs with a TIIRS, & storing at least in part Central Bank agent biometrically signed minted digital coins until financial institutions (e.g., commercial banks) request one or more digital coin sets in anticipation of bank transactions.

Step1: Cen1Agt1/RCFD1 securely initiates an E/A1 instance in which Cen1Arr securely interacts with RUS1/Cen1CertPer1 to initiate secure:

(i) Minting of digital coins, CoinA and CoinB, where such digital coins have respective unique identifiers;
(ii) Creating such digital coins' one or more CIISs, where such CIISs contain near existential or existential quality at least in part biometrically based identification information of such digital coins' one or more applicable Cen1CertPers, such as Cen1CertPer1 who certified such digital coins;
(iii) Respectively including and/or associating the created CIISs with such digital coins
(iv) Signing of CoinA and CoinB and corresponding IISs by RUS1/Cen1CertPer1 using EBICert1. In some embodiments, digital coins and/or EBICoin related transactions can be signed by more than one CertPers, such as line and supervisory personnel;
(v) Creating EBIBlocks, EBIBlockA1 and EBIBlockB1, respectively containing a CIIS of CoinA and other relevant E/A1 transaction related information and a CIIS of CoinB and other relevant E/A1 transaction related information

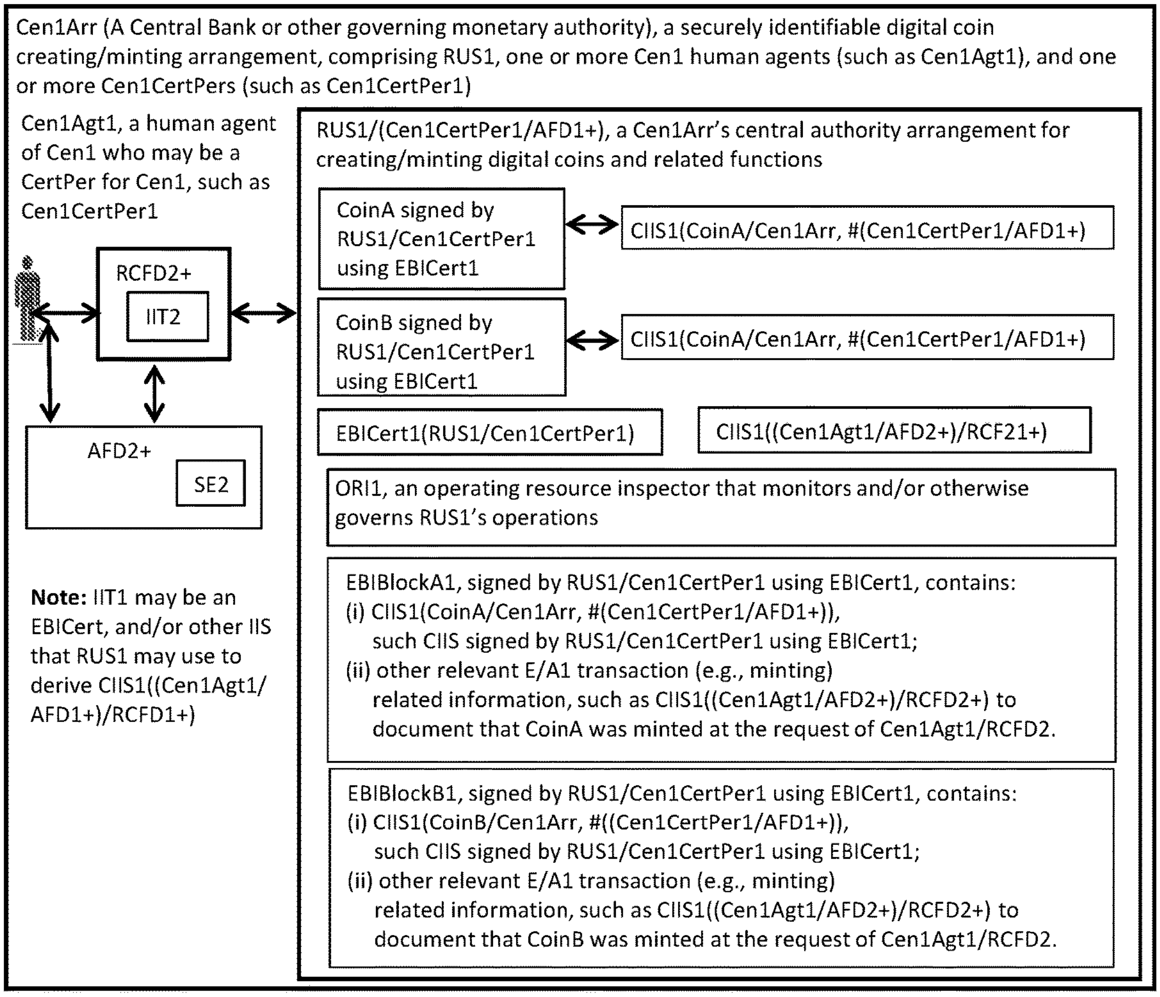

Figure 51A: Non-limiting example showing a Central Bank and/or other monetary authority arrangement selling, lending &/or otherwise providing digital coins it has minted to a commercial bank, Bank1, wherein such bank stores such acquired digital coins in a secure repository arrangement (until it satisfies customers' respective currency transaction requests).

Step1: RUS2/((Bank1Agt1/AFD6+)/RCFD6+), on behalf of Bank1, forwards CIIS1((Bank1Agt1/AFD6+)/RCFD6+) to RUS1/Cen1CertPer2, such CIIS1 satisfying required authorization to request the performance of, & participation in, an E/A set, E/A2, comprising Bank1 acquiring digital coins from Cen1Arr, such E/A2 describing:

- (Bank1Agt1/AFD6+)/RCFD6+ acquiring from Cen1Arr a specified financial aggregate value & value corresponding denomination Central Bank digital coin instances for future use in exchange, for example, for conventional currency, such as US dollars &/or dollar debt. CIIS1((Bank1Agt1/AFD6+)/RCFD6+) includes one or more testable/verifiable EFs stipulating that (Bank1Agt1/AFD6+)/RCFD6+ is a registered Bank1 agent, authorized to perform & participate in the transaction on behalf of Bank1.
- (Cen1Agt2/AFD4+)/RCFD4+ &/or RUS1/(Cen1CertPer2/AFD3+) responding to Bank1Agt1's request by securely selling, lending, &/or otherwise providing CoinA & CoinB to Bank1, where such transaction includes: (Cen1Agt2/AFD4+)/RCFD4+ &/or RUS1/(Cen1CertPer2/AFD3+) securely (i) authorizing the creation of, &/or creating, CIISs for CoinA & CoinB, such CIISs respectively specifying that Bank1 is the owner of CoinA & CoinB & may also stipulate transfer of control (such as ownership) from Cen1Arr to Bank1 (in part represented by Bank1CertPer1);(ii) EBIsigning CoinA's & CoinB's respective CIISs using EBICert1; (iii) creating EBIBlockA2 & EBIBlockB2 to record E/A2 transactions, & sign them using EBICert1; & (iv) forwarding CoinA, CoinB, corresponding signed CIISs, & EBIBlocks to RUS2/Bank1Agt1.

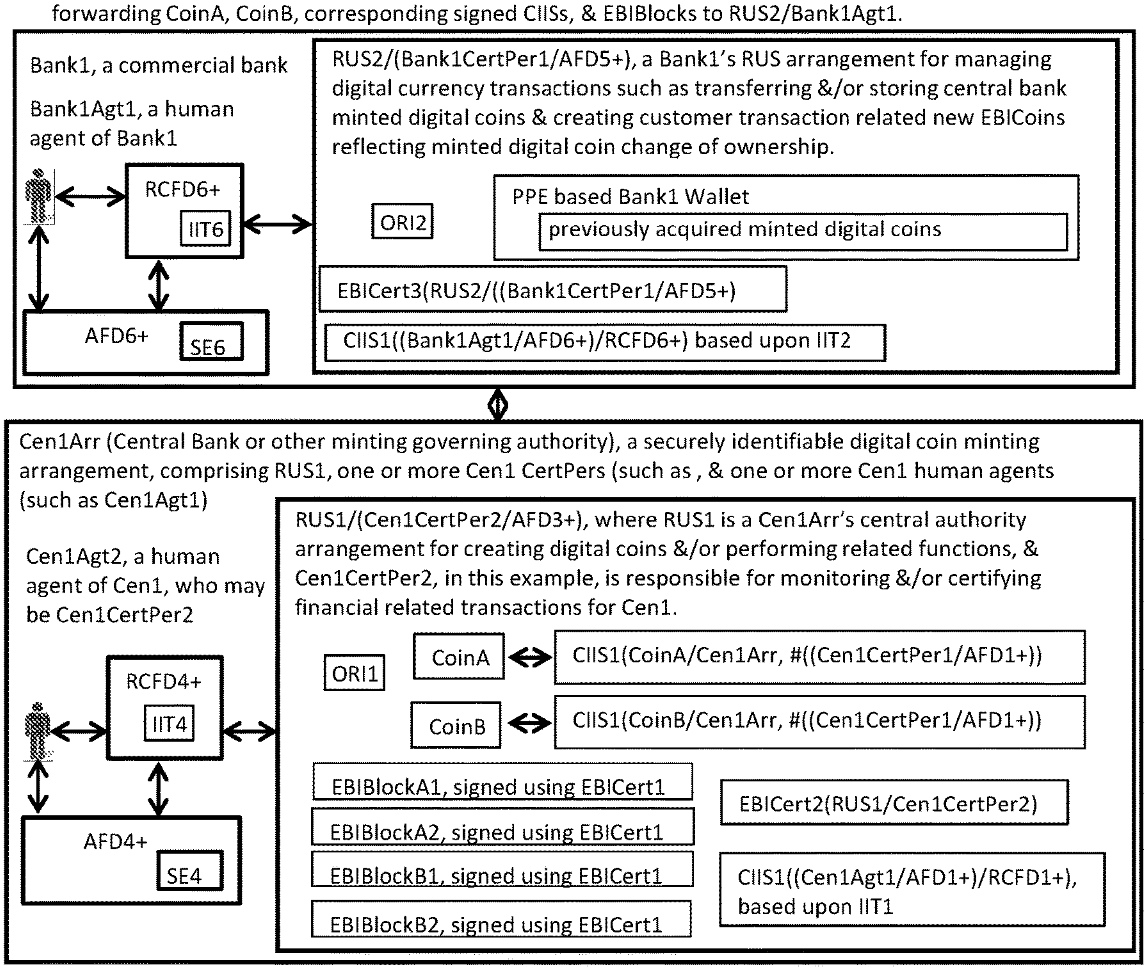

Figure 51B: Non-limiting example showing a central bank arrangement selling, lending, and/or providing minted digital coins to a commercial bank, wherein such commercial bank stores bought, borrowed, and/or acquired on consignment minted digital coins in a secure repository (until its customers make transaction demands).
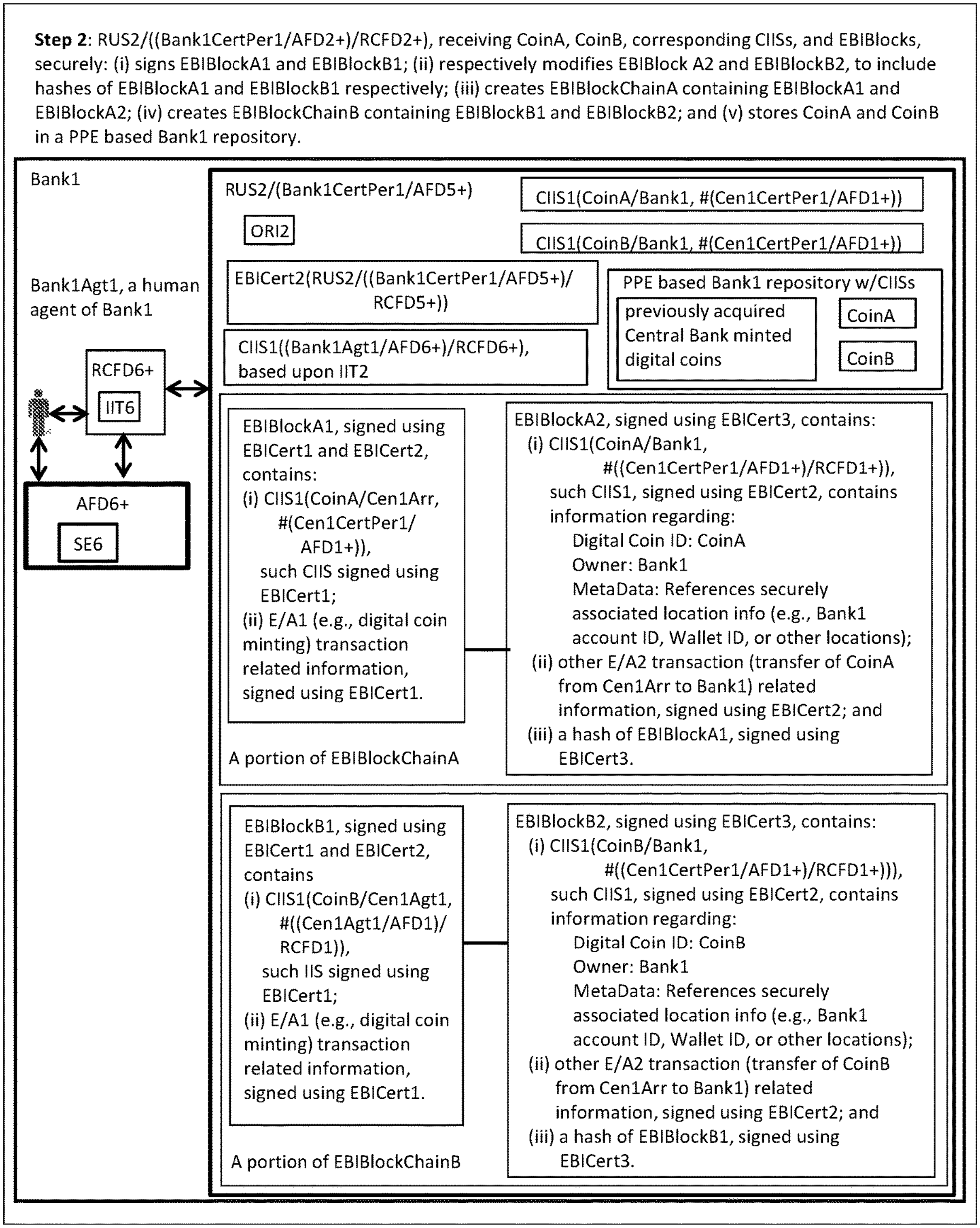

Figure 51C: Non-limiting illustrative example showing a Central Bank arrangement selling, lending, and/or providing on consignment minted Digital Coins to a commercial bank, wherein such bank stores bought, borrowed, and/or acquired on consignment minted digital coins in a secure repository (until its customers make transaction demands).
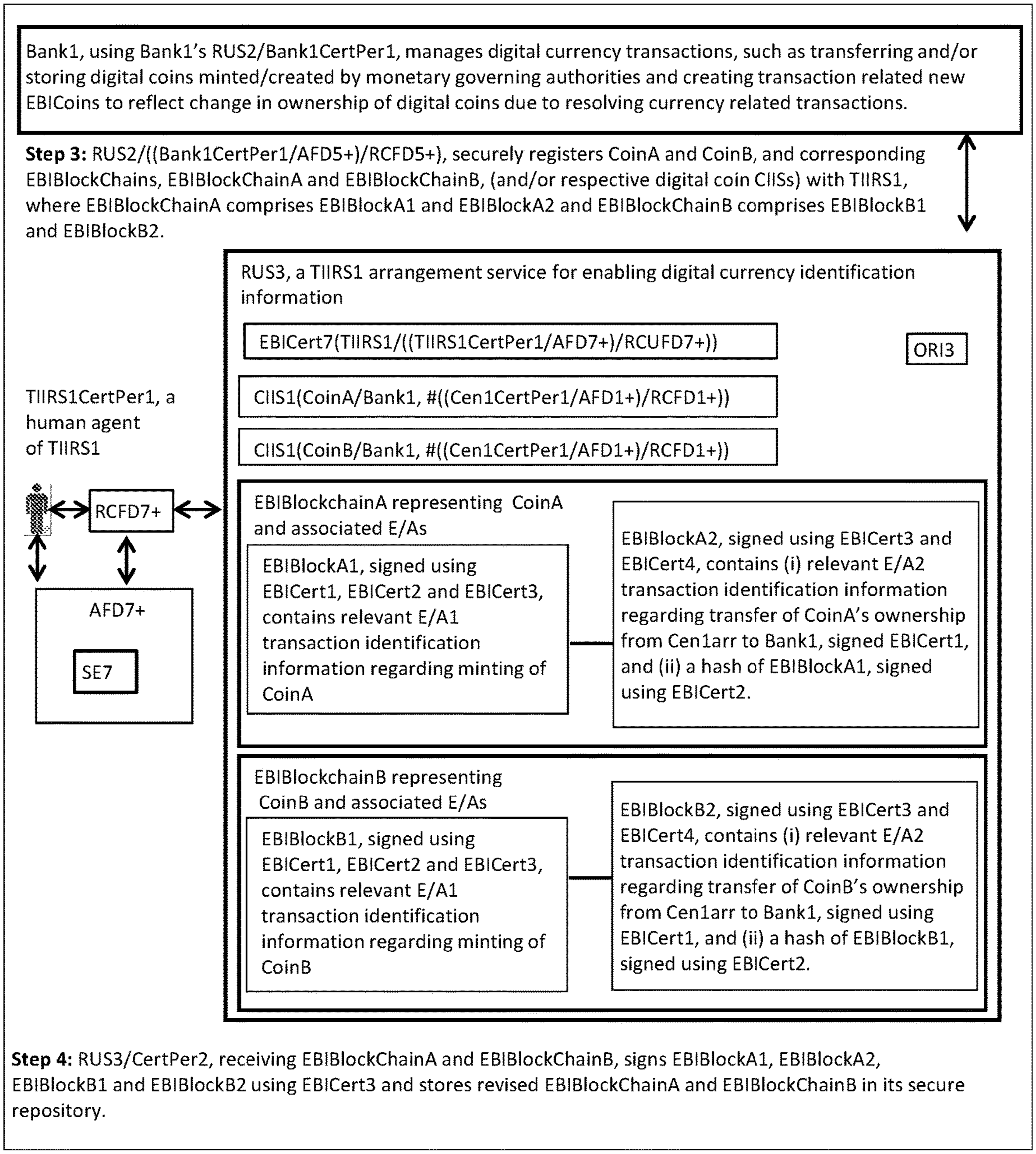

Figure 52A: Non-limiting illustrative example showing a monetary governing authority creating EBICoins and selling, lending, and/or otherwise providing, such EBICoins to a commercial bank, wherein such bank securely stores such acquired EBICoins in a secure repository (until its customers make currency purchase transactions).

Step1: RUS2/((Bank1CertPer1/AFD5+)/RCFD5+), on behalf of Bank1, forwards CIIS1((Bank1Agt1/AFD6+)/RCFD6+) to RUS1/Cen1Agt1, such CIIS1 satisfying required authorization to perform and participate in an E/A set, E/A2, comprising Bank1 acquiring EBICoins from Cen1Arr, where E/A2 describes:

- (Bank1Agt2/RCFD11+ requesting to purchase, borrow, and/or otherwise acquire EBICoins of a specified aggregate value and value corresponding denomination instances from Cen1Arr. CIIS1(Bank1Agt1/RCFD6+) includes one or more testable/verifiable EFs stipulating that Bank1Agt1/RCFD6+ is a registered Bank1 agent, authorized to perform the transaction.
- (Cen1Agt1/AFD9+)/RCFD9+ and/or RUS1/(Cen1CertPer3/AFD8+) responding to Bank1CertPer2's request by securely: (i) creating EBICoin1 and EBICoin2, respectively containing CoinA and CoinB; and (ii) providing and transferring EBICoin1 and EBICoin2 to Bank1. Such transaction includes Cen1Agt3/RCFD9+) and/or RUS1/(Cen1CertPer3/AFD8+) securely (i) authorizing the creation of, and/or creating, CIISs for EBICoin1 and EBICoin2, such CIISs respectively specifying that Bank1 is the owner of EBICoin1 and EBICoin2 and stipulate transfer of CoinA's and CoinB's ownership from Cen1Arr to Bank1 (in part represented by Bank1CertPer2, one or more persons who function as respective subject matters of EBICoins); (ii) signing EBICoin1's and EBICoin2's respective CIISs using EBICert3; creating EBIBlockA2 and EBIBlockB2 to record E/A2 transactions, and sign them using EBICert1; and (iv) forwarding CoinA, CoinB, corresponding signed CIISs, and EBIBlocks to RUS1/Bank1CertPer1.

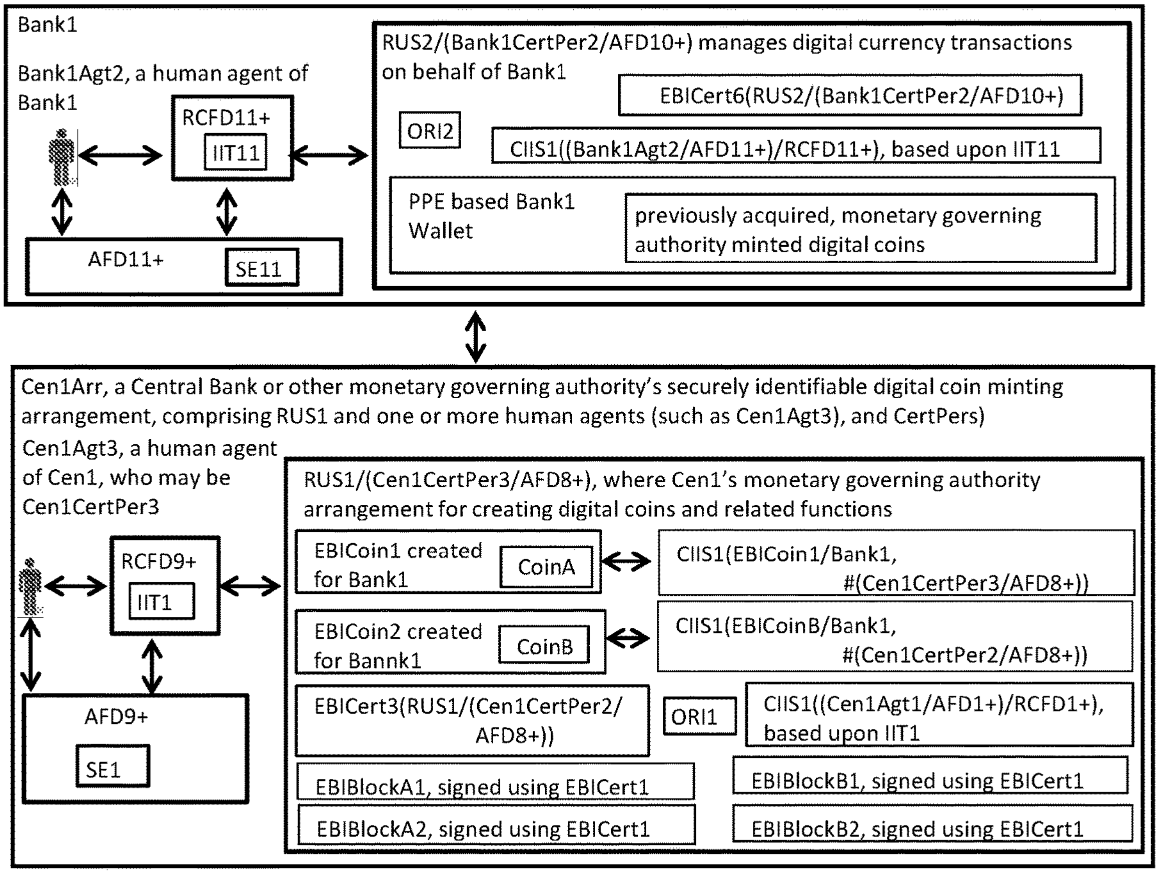

Figure 52B: Continuation of Figure 52A.
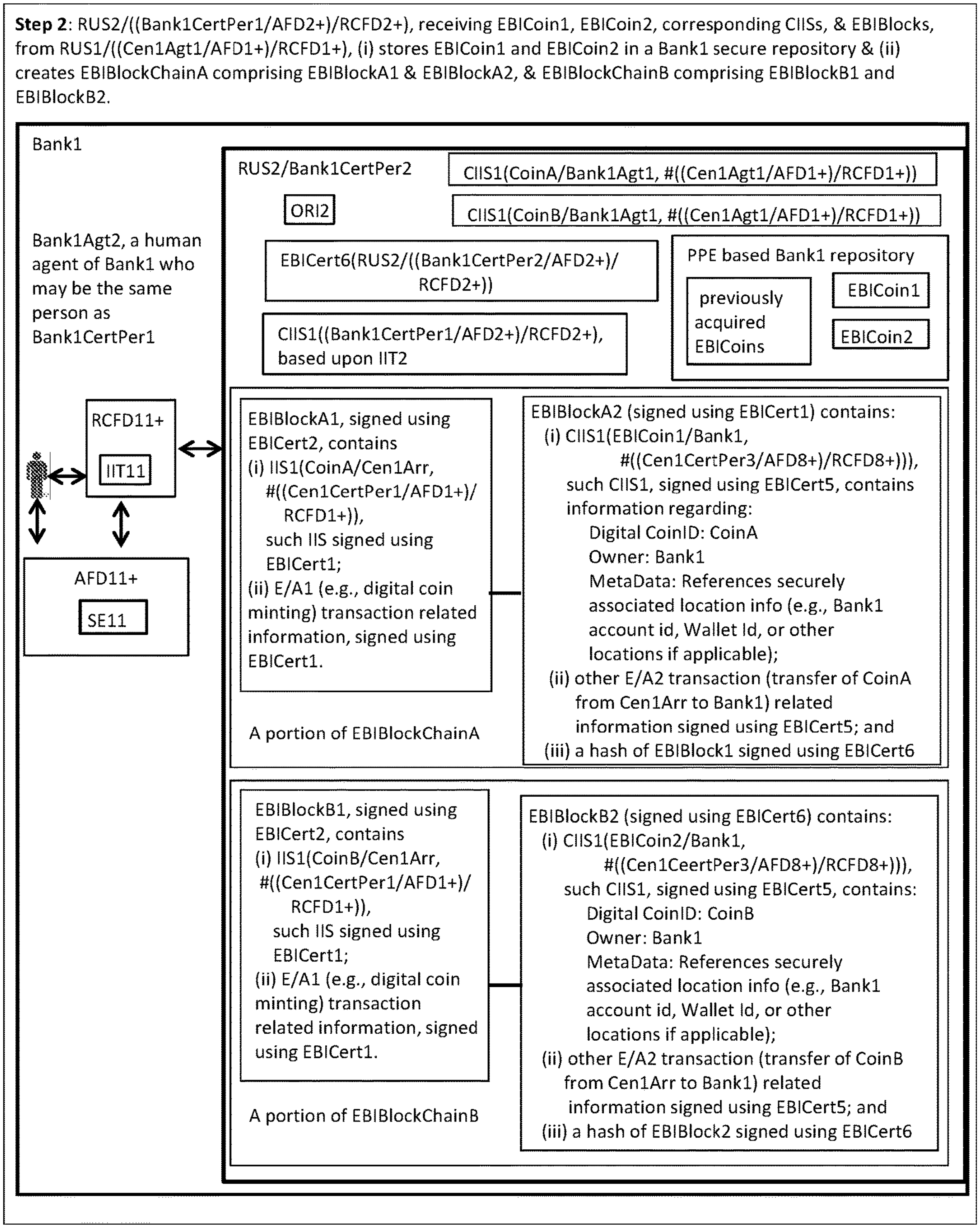

Figure 52C: Continuation of Figure 52B.
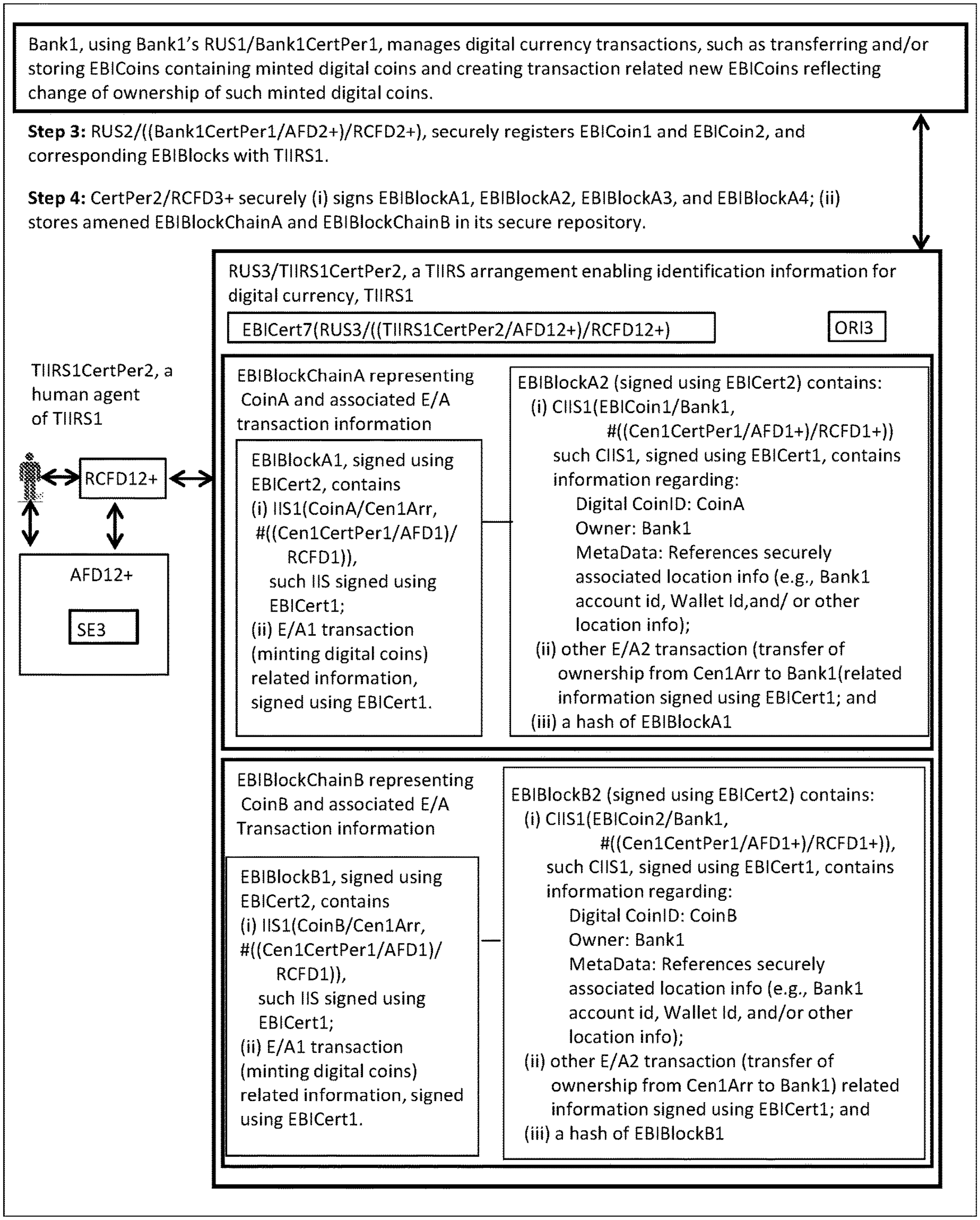

Figure 53: Non-limiting illustrative example showing a Central Bank arrangement securely: (i) minting digital coins and corresponding IISs; (ii) creating EBICoins, each EBICoin containing a minted digital coin; (iii) creating IIS for each created EBICoin; and (iv) registering created EBICoins.
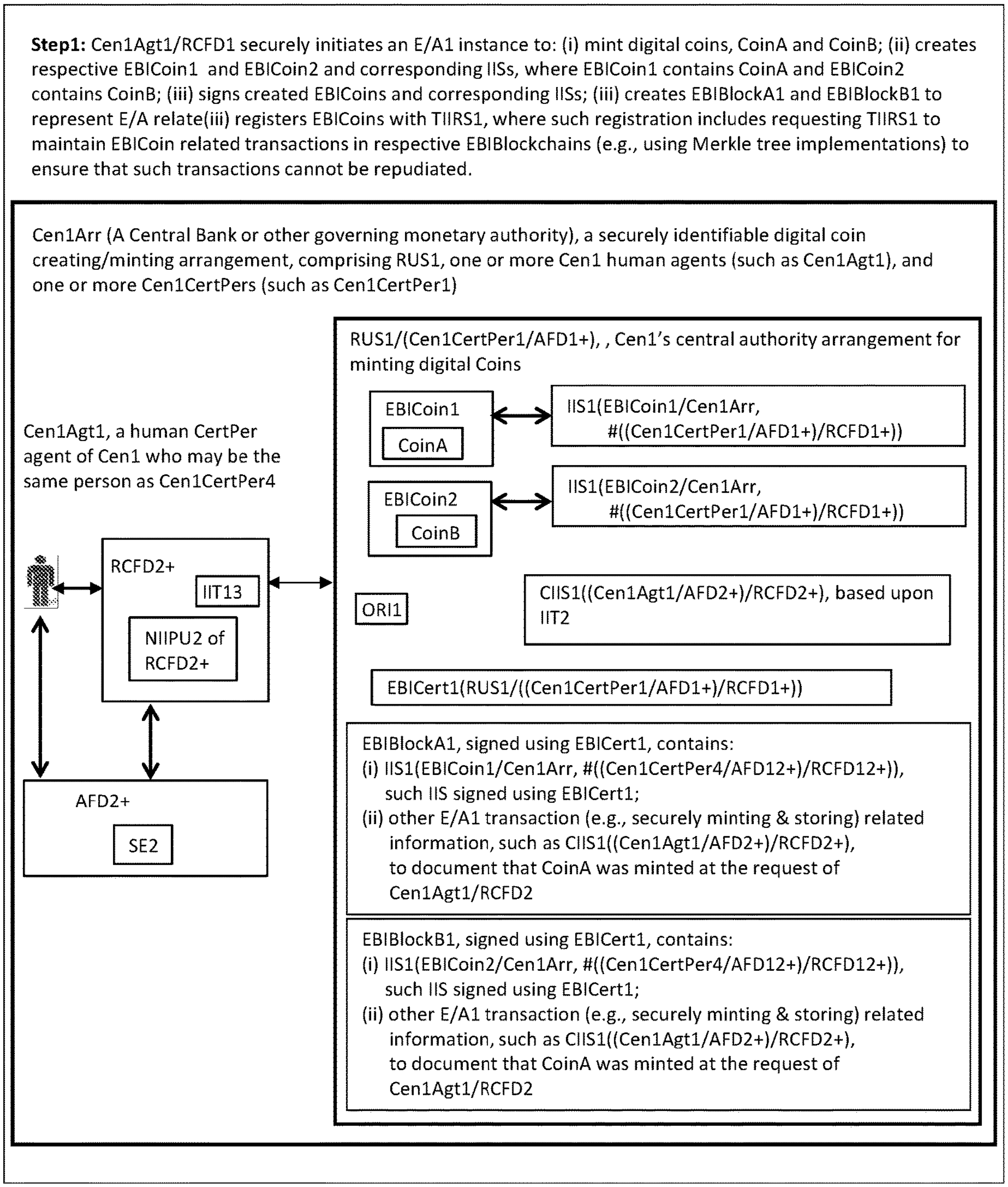

Figure 54A: Non-limiting illustrative example showing a Central Bank arrangement selling, lending, &/or otherwise providing EBICoins to a financial institution, Bank1, where such bank stores Central Bank mined digital coins in EBICoins in a secure repository (until acting on customer transaction requests).

Step1: RUS2/((Bank1CertPer1/AFD5+)/RCFD5+), on behalf of Bank1, forwards CIIS1((Bank1Agt1/AFD6+)/RCFD6+) to RUS1/Cen1CertPer1, such CIIS1 satisfying qualifications required to participate in an E/A set, E/A2, comprising Bank1 acquiring EBICoins from Cen1Arr, where E/A2 describes:

- Bank1Agt1/RCFD6+ performing purchasing, borrowing, and/or otherwise acquiring EBICoins 3 & 4 respectively containing Coin 1 & Coin 2 & having specified aggregate value and value corresponding denomination(s) from Cen1Arr, the owner of EBICoins 1 & 2 that contained Coin 1 & Coin 2. CIIS1((Bank1Agt1/AFD6+)/RCFD6+) includes one or more testable/verifiable EFs that (Bank1Agt1/RCFD6+) is a registered Bank1 agent & Bank1 is an authorized financial institution to be the owner of EBICoins 3 & 4.
- (Cen1Agt1/AFD2+)/RCFD2+, and/or RUS1/((Cen1CertPer1/AFD1+)/RCFD1+)), responding to Bank1Agt1's request by securely: (i) concurrently canceling EBICoin1 and EBICoin2 and creating EBICoin3 and EBICoin4, respectively containing CoinA and CoinB and stipulating Bank1 as their new owner (or controlling custodian); & (ii) selling, lending, and/or otherwise providing EBICoin3 and EBICoin4 to Bank1. Such transaction includes (Cen1Agt1/AFD2+)/RCFD2+ and/or RUS1/((Cen1CertPer1/AFD1+)/RCFD1+)), securely: (i) authorizing creation of, &/or creating, CIISs for EBICoins 3 & 4, the CIISs respectively specifying that Bank1 is the owner of EBICoin3 and EBICoin4, & registering such EBICoins &/or CIISs with a TIIRS; (ii) signing EBICoin3's and EBICoin4's respective CIISs using EBICert1; (iii) creating EBIBlockA2 and EBIBlockB2 to record E/A2 transactions, and sign such EBIBlocks using EBICert1; and (iv) forwarding EBICoin3, EBICoin4, & corresponding signed CIISs &/or EBIBlocks, to RUS2/Bank1CertPer1 .

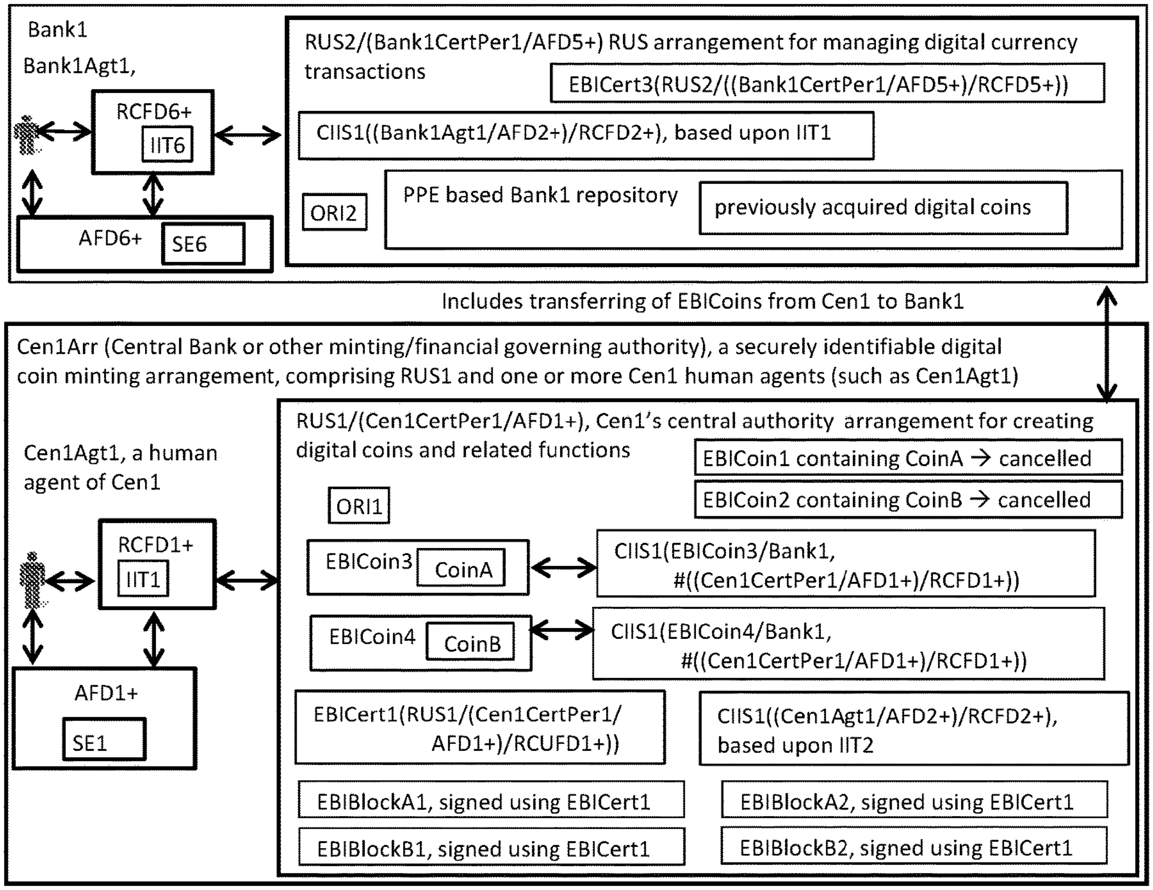

Figure 54B: Non-limiting illustrative example showing a Central Bank arrangement selling, lending, and/or providing on consignment minted digital coins to a commercial bank, Bank1, wherein such bank stores bought, borrowed, and/or otherwise acquired (e.g., on consignment) digital coins in EBICoins in a secure repository (until, for example, in response to transaction requests by customers, where such bank transfers such coins in newly created EBICoins).

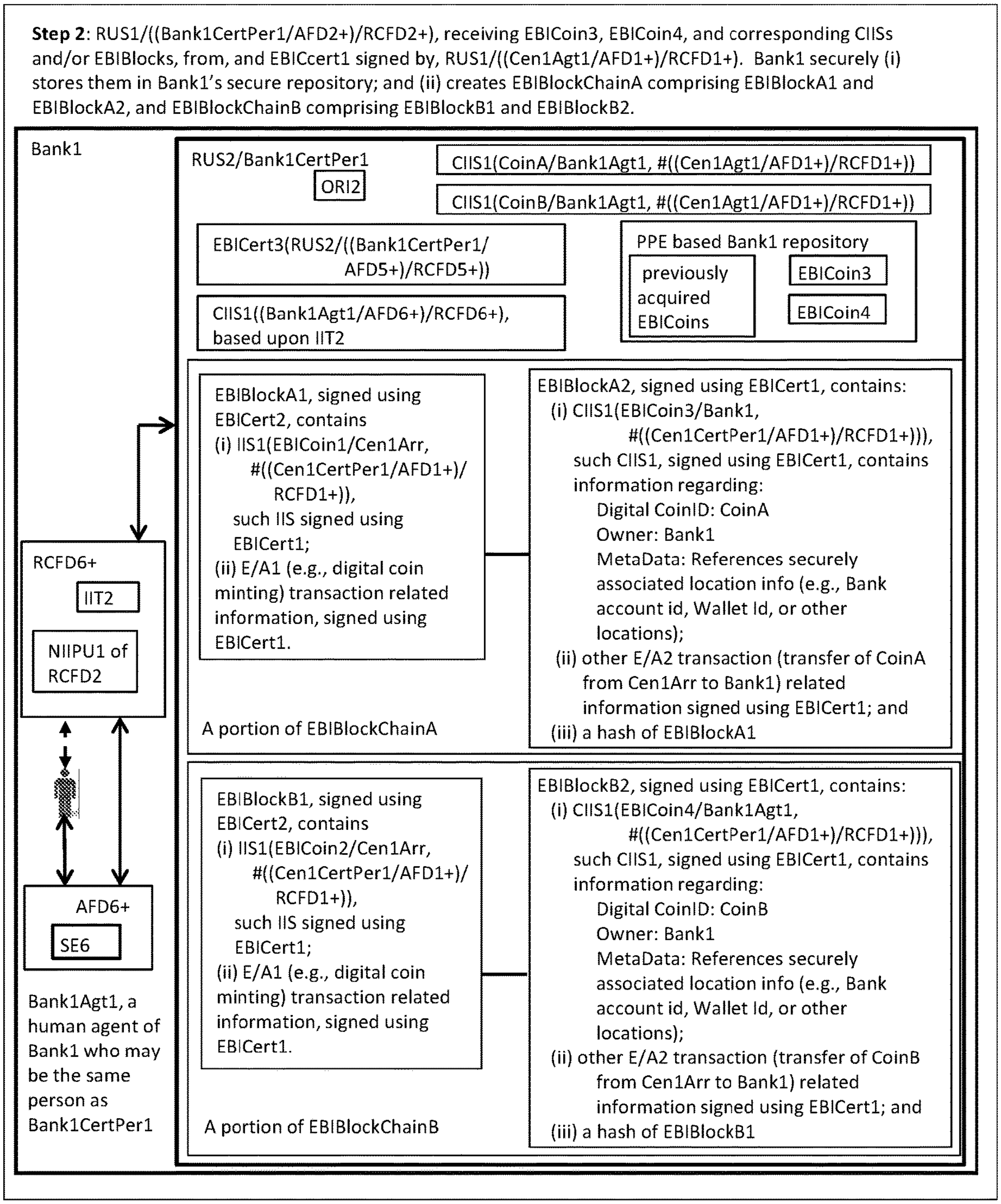

Figure 54C: Non-limiting illustrative example showing a Central Bank arrangement creating EBICoins and selling, lending, and/or otherwise providing, such EBICoins to a financial institution (e.g., a commercial bank), wherein such institution stores such bought, borrowed and/or acquired one or more EBICoins in a secure repository (until its customers make transaction requests).

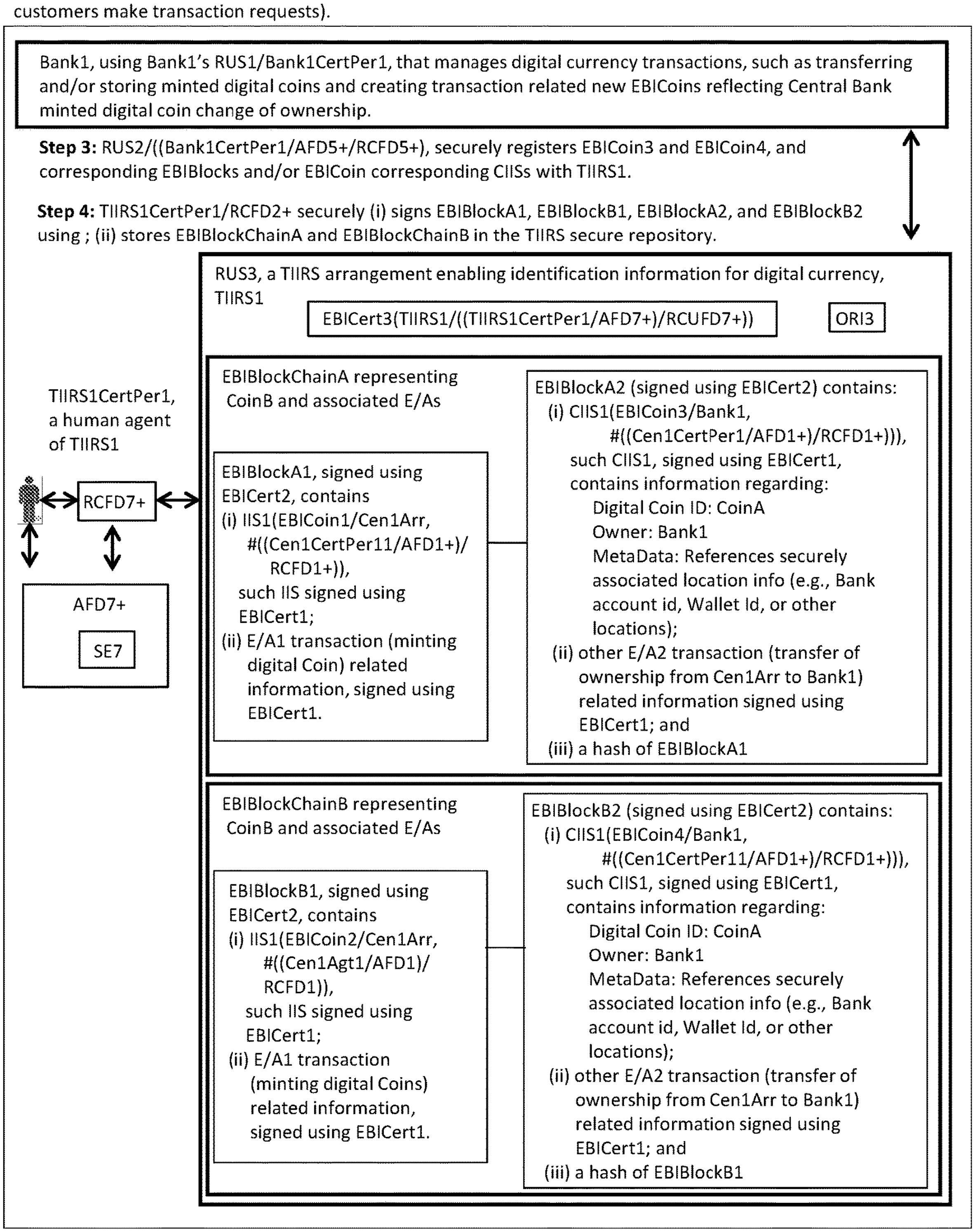

Figure 55A: Non-limiting illustrative example showing process steps performed when a user requests to buy EBICoins of respective specified denominations from a financial institution (such as a commercial bank) in exchange for traditional currency.

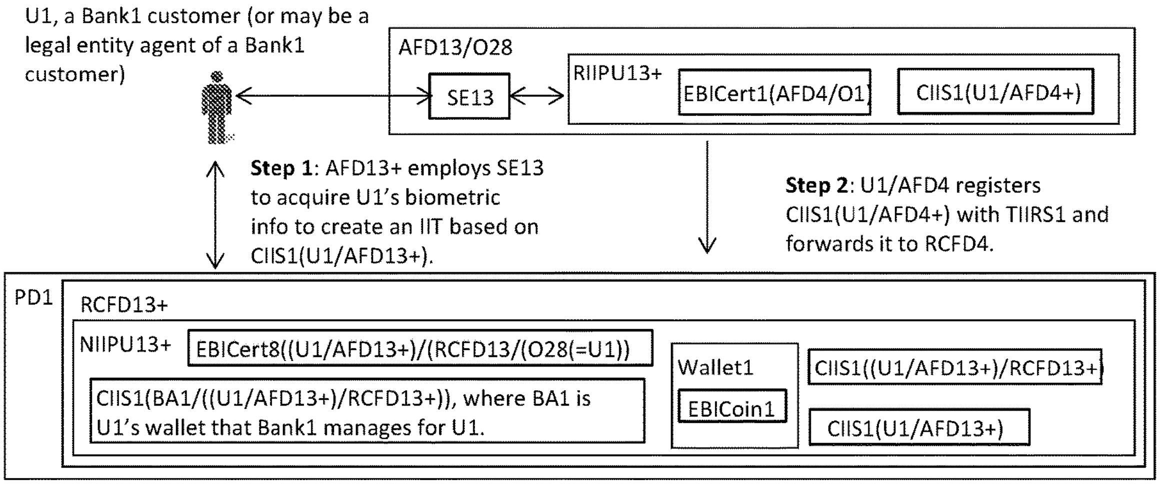

Step 3: U1/RCFD13+ creates CIIS1((U1/AFD13+)/RCFD13+), an IIT, which may be an EBICert, e.g., EBICert8, that U1/RCFD13+ uses to sign E/A instances, such as (RCFD13/U1)'s request to Bank1 to buy EBICoins respectively containing Cen1Arr minted digital coin sets. RCFD13/U1 registers ((U1/AFD13)/RCFD13) with TIIRS1, where registration info can identify provenance, biometrically identified CertPers (e.g., ManPers) for AFD13 & RCFD413.

Step 4: U1/RCFD13+ securely presents CIIS1((U1/AFD13+)/RCFD13+) to RUS2/Bank1CertPer1 to demonstrate (U1/RCFD13)'s right to initiate an E/A instance process set, E/A3 (which is requesting to buy two EBICoins from Bank1, where each EBICoin to contain a specified denomination), where such right includes CIIS1((U1/AFD13+)/RCFD13+) having one or more EFs stipulating that U1 is an authentic Bank1 customer in good standing with sufficient credit and/or resources to purchase requested EBICoins.

Step 5: RUS2/(Bank1CertPer1/RCFD5+) and/or Bank1Agt1/RCFD6+ services U1's request by:

- Securely validating (U1/RCFD13+)'s request, where such validation includes validating that: (i) U1 has sufficient funds to purchase the requested EBICoins; and (ii) (U1/RCFD13+)'s IIT identification information matches (U1/RCFD13+)'s identification information registered with Bank1 customer service arrangement and/or at TIIRS1; and
- If validation is successful, securely:
    i. Selecting/composing digital coins, CoinA and CoinB, where such digital coins have respective value corresponding to U1's request specification;
    ii. Creating EBICoin2 and EBICoin3 respectively containing CoinA and CoinB;
    iii. Authorizing the creation of, and/or creating, CIISs respectively for EBICoin2 and EBICoin3 using an IIS for U1 and/or fused-identity (U1/AFD13+)/RCFD13+ entity and/or information portions thereof, where such CIISs respectively specify that U1 is the new/current owner of digital coins CoinA and CoinB;
    iv. Signing EBICoin2, EBICoin3, and corresponding CIISs using EBICert3;
    v. Creating EBIBlocks, EBIBlockA2 and EBIBlockB2, respectively comprising CoinA and CoinB, corresponding CIISs and any other specified E/A3 transaction related identification information;
    vi. Registering EBICoin2 and EBICoin3 along with associated EBIBlocks with TIIRS1; and
    vii. Forwarding EBICoin2 and EBICoin3 and associated CIISs to U1/RCFD13+ and/or one or more to specified parties, and/or maintaining such digital currency in a financial account (i.e., BA) in the name of U1 and/or other specified one or more parties.

Figure 55B: Non-limiting illustrative example showing process steps performed when a user requests to buy EBICoins of respective specified denominations from a bank in exchange for traditional currency.
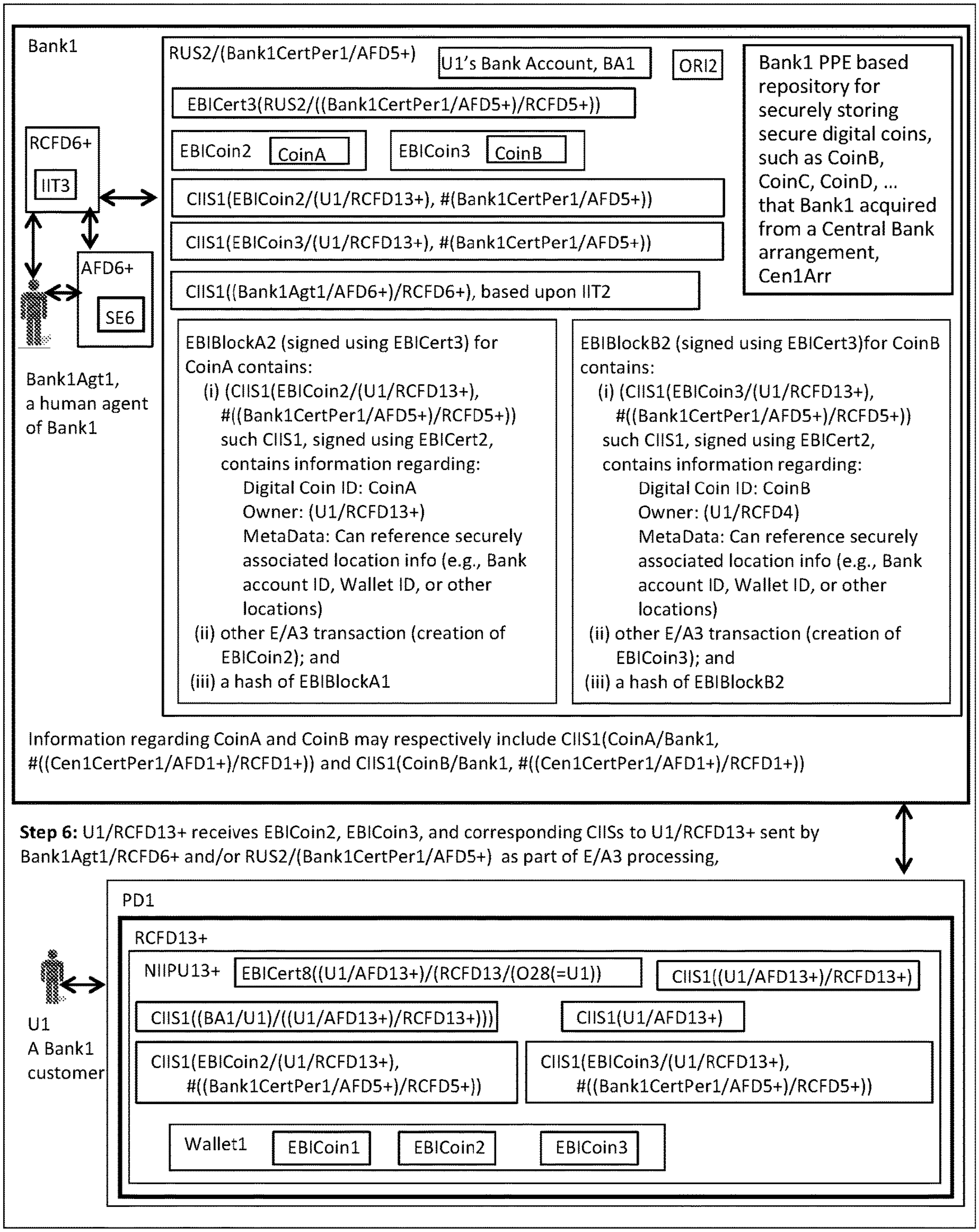

Figure 55C: Non-limiting illustrative example showing process steps performed when a user requests to buy EBICoins of respective specified one or more denominations from a bank in exchange for traditional currency.
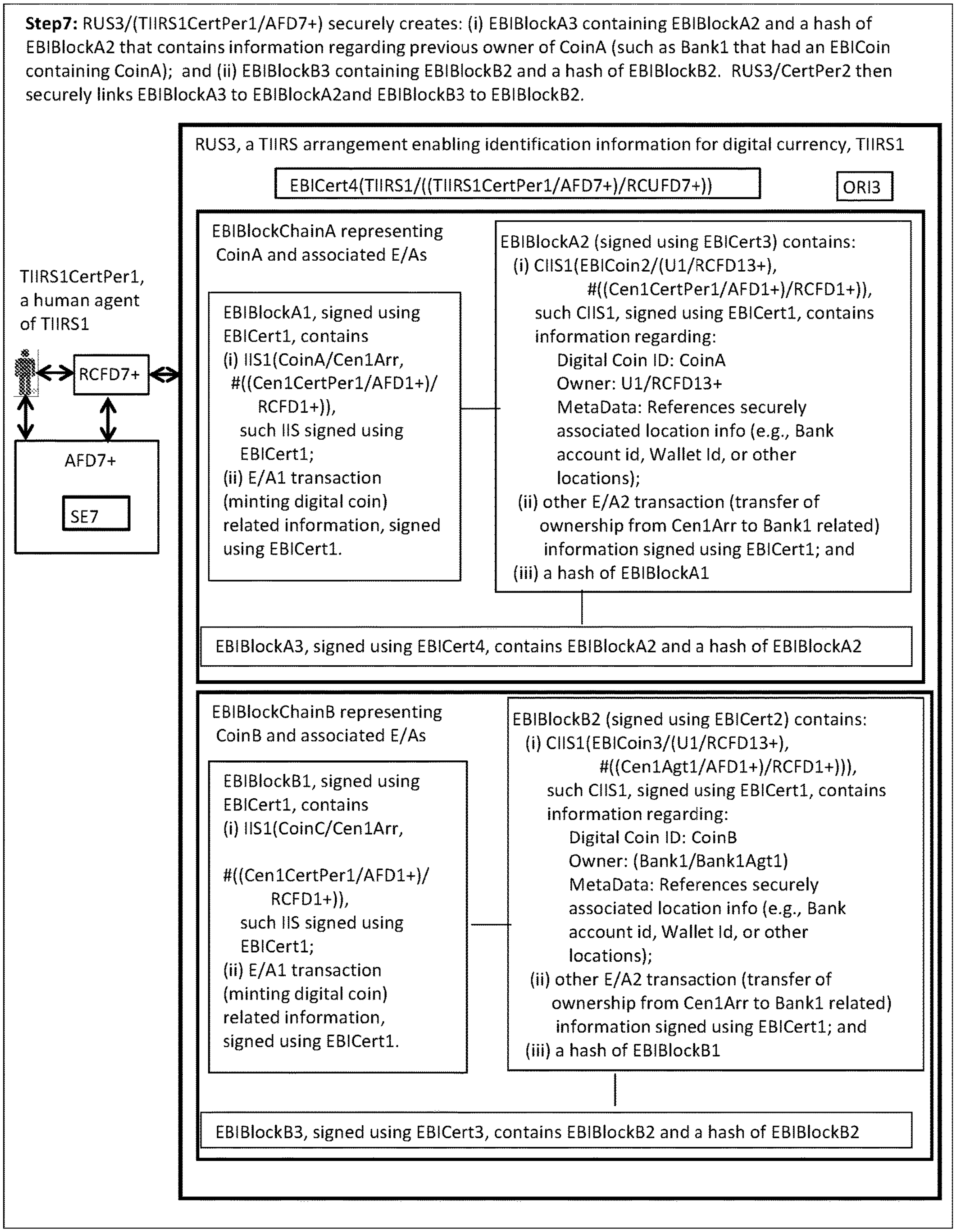

Figure 56A: Non-limiting illustrative example showing process steps performed when a user requests to buy EBICoins of respective specified denominations from a financial institution (such as a commercial bank) in exchange for traditional currency.

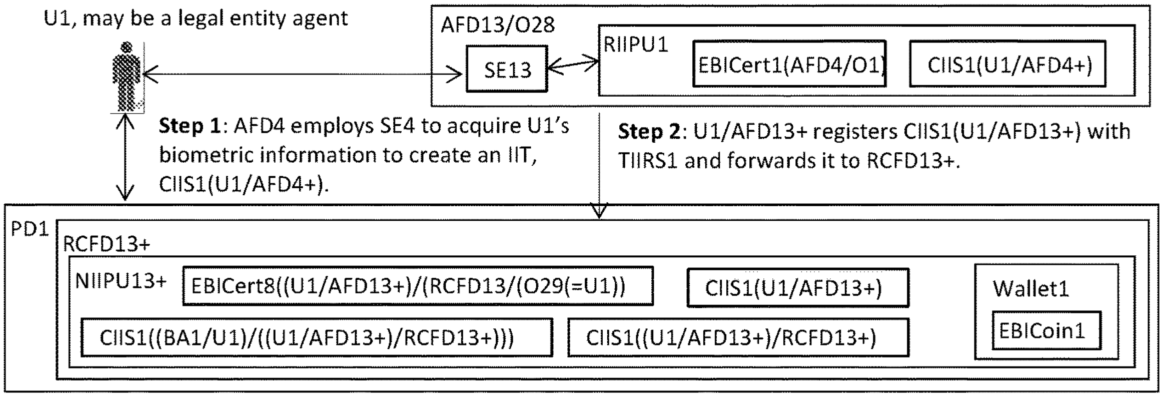

Step 3: U1/RCFD13+ creates CIIS1((U1/AFD13+)/RCFD13+), an IIT, which may be an EBICert, e.g., EBICert8, that U1/RCFD13+ uses to sign E/A instances (such as (U1/RCFD13+)'s request to Bank1 to buy EBICoins respectively containing Cen1 minted digital coin sets). U1/RCFD13+ registers ((U1/AFD4)/RCFD4) with TIIRS1.

Step 4: U1/RCFD13+, on behalf of U1, securely presents CIIS1((U1/AFD4)/RCFD4) to RUS2/Bank1CertPer1 to demonstrate (U1/RCFD4)'s right to initiate an E/A instance process set, E/A3 (which is requesting Bank1 for two EBICoins, each EBICoin having a specified denomination), where such right includes CIIS1((U1/AFD13+)/RCFD13+) having one or more EFs stipulating that U1 is an authentic Bank1 customer in good standing with sufficient credit and/or resources to purchase requested EBICoins.

Step 5: RUS2/(Bank1CertPer1/RCFD5+), or BankAgt1/RCFD6+, validates (U1/RCFD13+)'s request, such validation includes validating that (U1/RCFD13+)'s IIT identification information matches (U1/RCFD13+)'s identification information registered with Bank1 customer service arrangement and/or at TIIRS1.

Step 6: If validation is successful, RUS2/(Bank1CertPer1/RCFD5+), or BankAgt1/RCFD6, securely:

i. Selects/arranges digital coin sets, CoinSet1 and CoinSet2, where the two digital coin sets respectively have aggregate values corresponding to U1's requested specification;
ii. Creates EBICoins, EBICoin2 and EBICoin3, respectively containing CoinSet1 and CoinSet2;
iii. Authorizes the creation of, and/or creating, CIISs respectively for EBICoin2 and EBICoin3 using an IIS for U1 and/or fused-identity (U1/AFD13+)/RCFD13+ entity and/or information portions thereof, where each CIIS specifies that U1/RCFD13+ is the new/current owner of digital coins in CoinSet2 and CoinSet3;
iv. EBIsigns EBICoin2, EBICoin3, and corresponding CIISs using EBICert3, if RUS2/(Bank1CertPer1/RCFD5+) is servicing the request; otherwise requests RUS2/(Bank1CertPer1/RCFD5+) to EBIsign EBICoin2, EBICoin3, and corresponding CIISs;
v. Creates an EBIBlock set comprising one or more EBIBlocks for respective CoinSet1's one or more minted digital coins, where each such EBIBlock contains a CIIS of EBICoin2 and any other specified E/A3 transaction related identification information;
vi. Creates an EBIBlock set comprising one or more EBIBlocks for respective CoinSet2's one or more minted digital coins, where each such EBIBlock contains a CIIS of EBICoin3 and any other specified E/A3 transaction related identification information;
vii. Registers EBICoin2 and EBICoin3 along with associated EBIBlock sets with TIIRS1; and
viii. Forwards EBICoin2 and EBICoin3 and associated CIISs to U1/RCFD4 and/or one or more specified parties, and/or maintains such digital currency in a financial account in the name of U1 and/or other specified one or more parties.

Figure 56B: Continuation of Figure 56A.
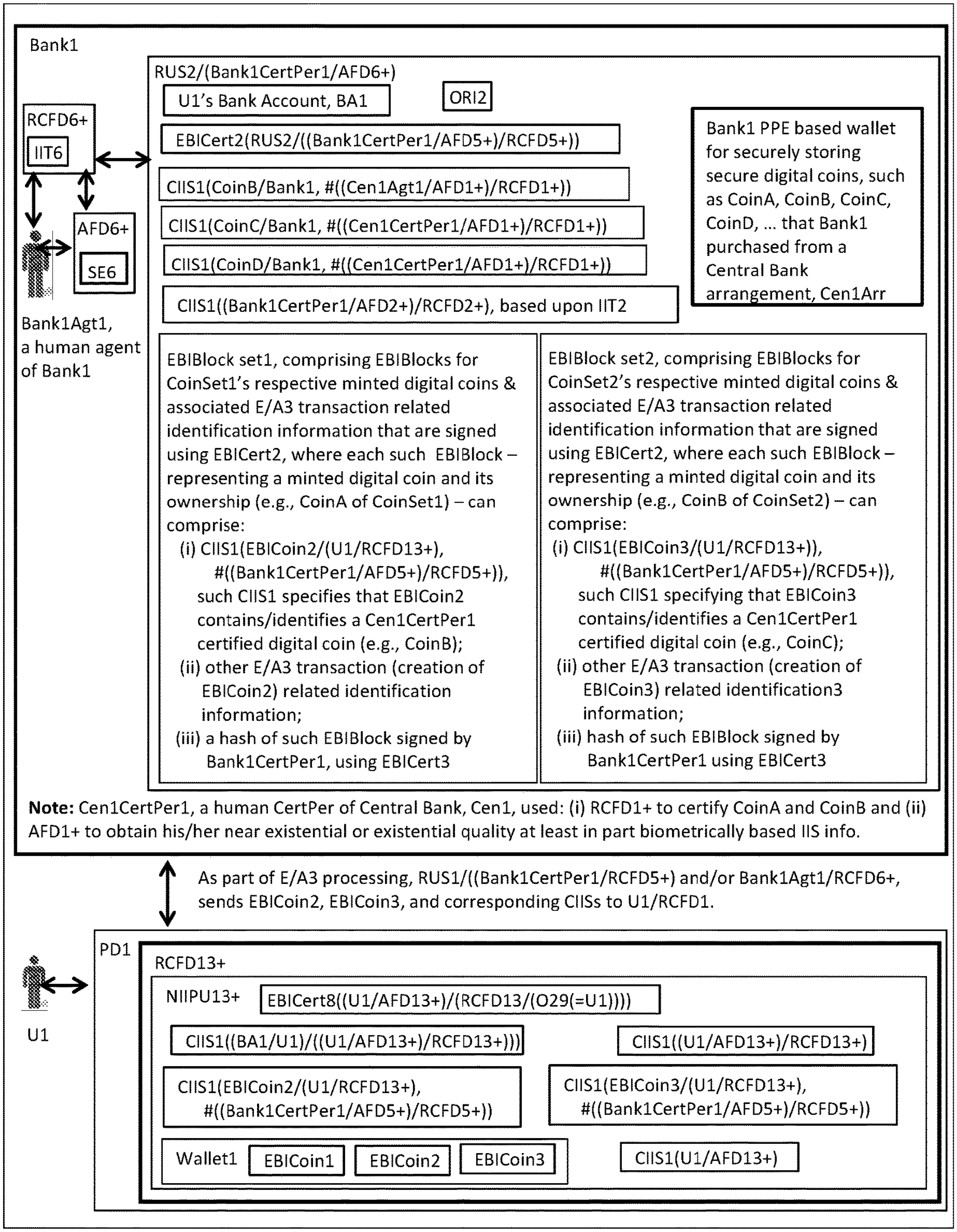

Figure 56C: Continuation of Figure 56B.

Step6: RUS3/TIIRS1CertPer1 securely creates EBIBlocks that respectively include EBIBlockSet1's EBIBlocks and EBIBlockSet2's EBIBlocks. For example, RUS3/TIIRS1CertPer2 securely creates an EBIBlockA3 comprising (i) a copy of an EBIBlock (e,g,, EBIBlock A2) that is an element in EBIBlockSet1 and (ii) a hash of EBIBlockA2 that describes a CIIS that includes information that specified that Bank1 owned CoinB and E/A3 transaction related identification information characterizing RUS2/Bank1CertPer1's transfer of CoinB's ownership to U1 by creating EBICoin2 containing CoinB and forwarding EBICoin2 to U1.

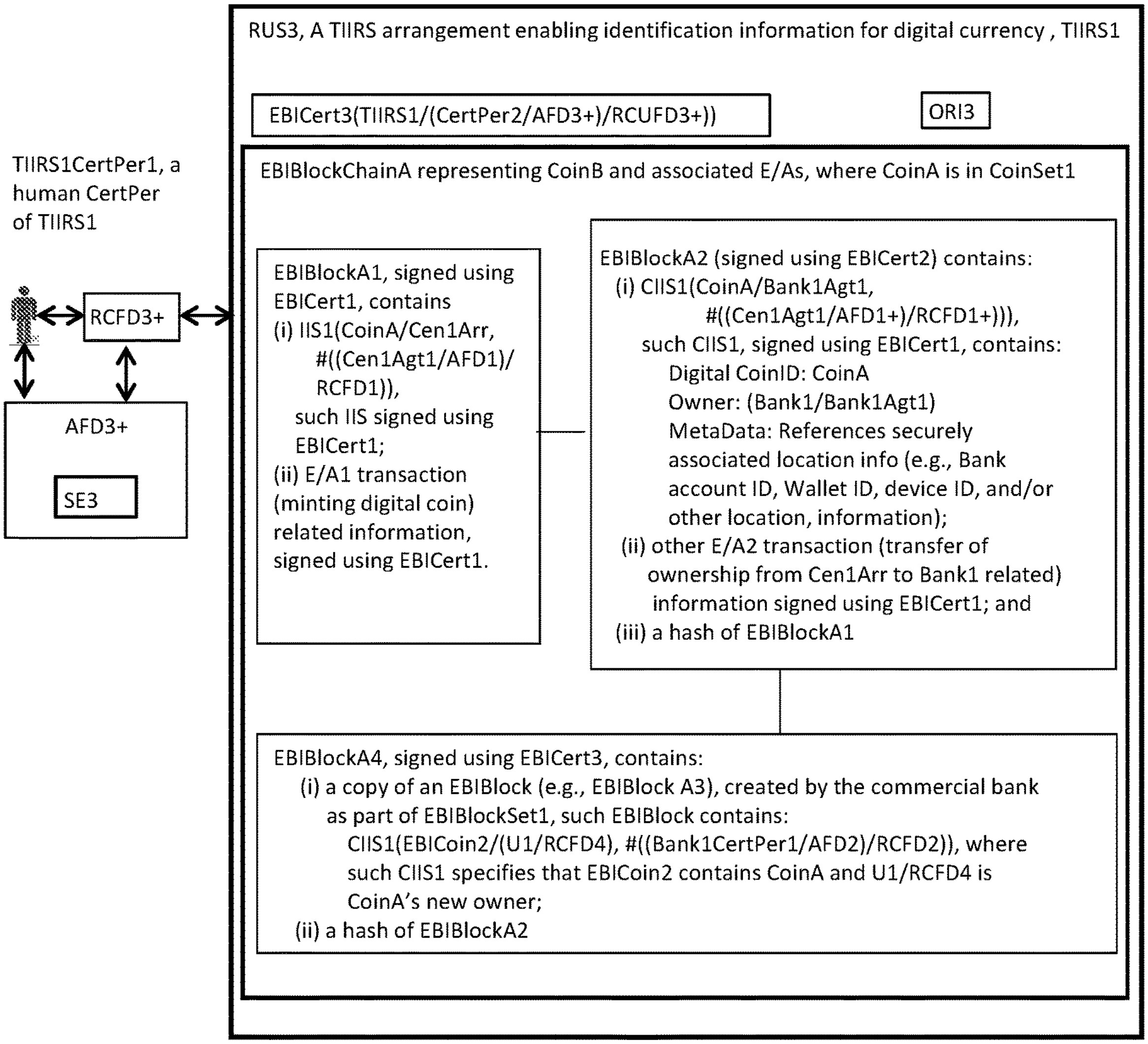

Figure 57A: Non-limiting illustrative example showing process steps performed when a user requests to buy EBICoins of specified denominations from a commercial bank in exchange for traditional currency, where such commercial bank manages EBICoins it had acquired from a Central Bank.

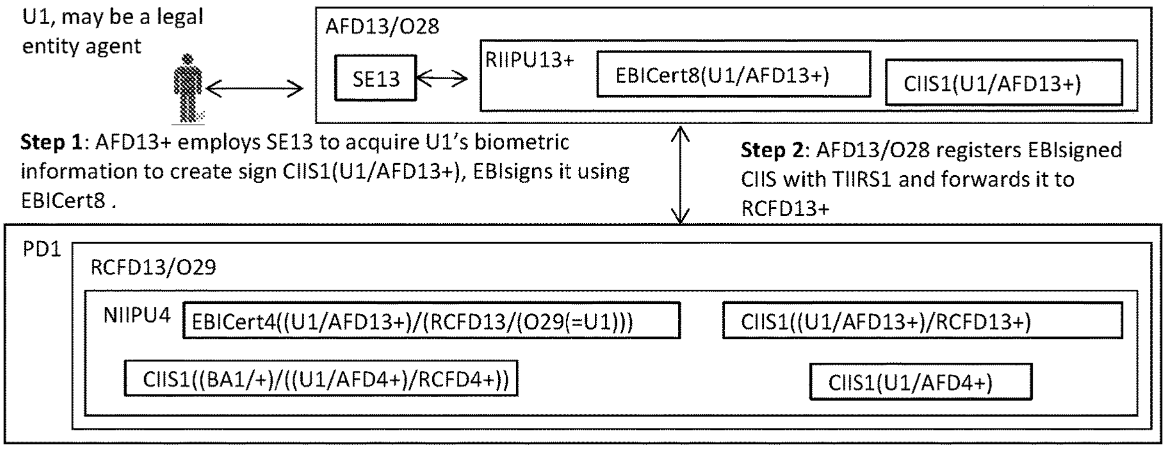

Step 1: AFD13+ employs SE13 to acquire U1's biometric information to create sign CIIS1(U1/AFD13+), EBIsigns it using EBICert8 .

Step 2: AFD13/O28 registers EBIsigned CIIS with TIIRS1 and forwards it to RCFD13+

Step 3: U1/RCFD13+ creates CIIS1((U1/AFD13+)/RCFD13+), an IIT, which may be an EBICert that U1/RCFD13+ uses to sign E/A3, an E/A instance that (U1/RCFD13+) initiated a request for Bank1 to provide EBiCoins containing Cen1 minted digital coins, where such EBICoins were created by the Central Bank and provided to Bank1 upon request. U1/RCFD13+ registers ((U1/AFD13+)/RCFD13+) with TIIRS1.

Step 4: U1/RCFD13+, on behalf of U1, securely presents CIIS1((U1/AFD13+)/RCFD13+) to RUS2/Bank1CertPer1 to demonstrate (U1/RCFD13+)'s right to initiate an E/A instance process set, E/A3 (which is requesting Bank1 for two EBICoins, each EBICoin having a specified denomination), where such right includes CIIS1((U1/AFD13+)/RCFD13+) having one or more EFs stipulating that U1 is an authentic Bank1 customer in good standing with sufficient credit and/or resources to purchase requested EBICoins.

Step 5: RUS2/(Bank1CertPer1/RCFD5+) and/or Bank1Agt1/RCFD6+, validates (U1/RCFD13+)'s request, such validation includes validating that (U1/RCFD13+)'s IIT identification information matches (U1/RCFD13+)'s identification information registered with Bank1 customer service arrangement and/or at TIIRS1.

Step 6: If validation is successful, RUS2/(Bank1CertPer1/RCFD5+), and/or Bank1Agt1/RCFD6+, securely:

i. Selects EBICoins, EBICoin1 and EBICoin2, respectively containing digital coins, CoinA and CoinB, where each EBICoin has an aggregate value corresponding to U1's request specification;
ii. Concurrently cancels EBICoin1 and EBICoin2 and creates new EBICoins, EBICoin3 and EBICoin4, respectively containing digital coins, CoinA and CoinB.
iii. Authorizes the creation of, and/or creates, CIISs respectively for EBICoin3 and EBICoin4 using an IIS for U1 and/or fused-identity (U1/AFD13+)/RCFD13+ entity and/or information portions thereof, where such CIISs respectively specify that U1/RCFD13+ is the new/current owner of EBICoin3 containing CoinA and EBICoin4 containing CoinB;
iv. EBIsigns EBICoin3, EBICoin4, and corresponding CIISs using EBICert3, if RUS2/(Bank1CertPer1/RCFD5+) is servicing the request; otherwise requests RUS2/(Bank1CertPer1/RCFD5+) to EBIsign EBICoin3, EBICoin4, and corresponding CIISs;
v. Creates: (i) EBIBlocks, EBIBlockA3 and EBIBlockB3, respectively for EBICoin3 and EBICoin4; and where such EBIBlocks contain (ii) associated E/A3 transaction related identification information describing U1's purchase of EBICoin4 and EBICoin5;
vi. Registers EBICoin3 and EBICoin4 along with associated EBIBlocks with TIIRS1; and
vii. Forwards EBICoin3 and EBICoin4 and associated CIISs to U1/RCFD13+, and may also forward such associated EBIBlocks.

Figure 57B: Continuation of Figure 57A.
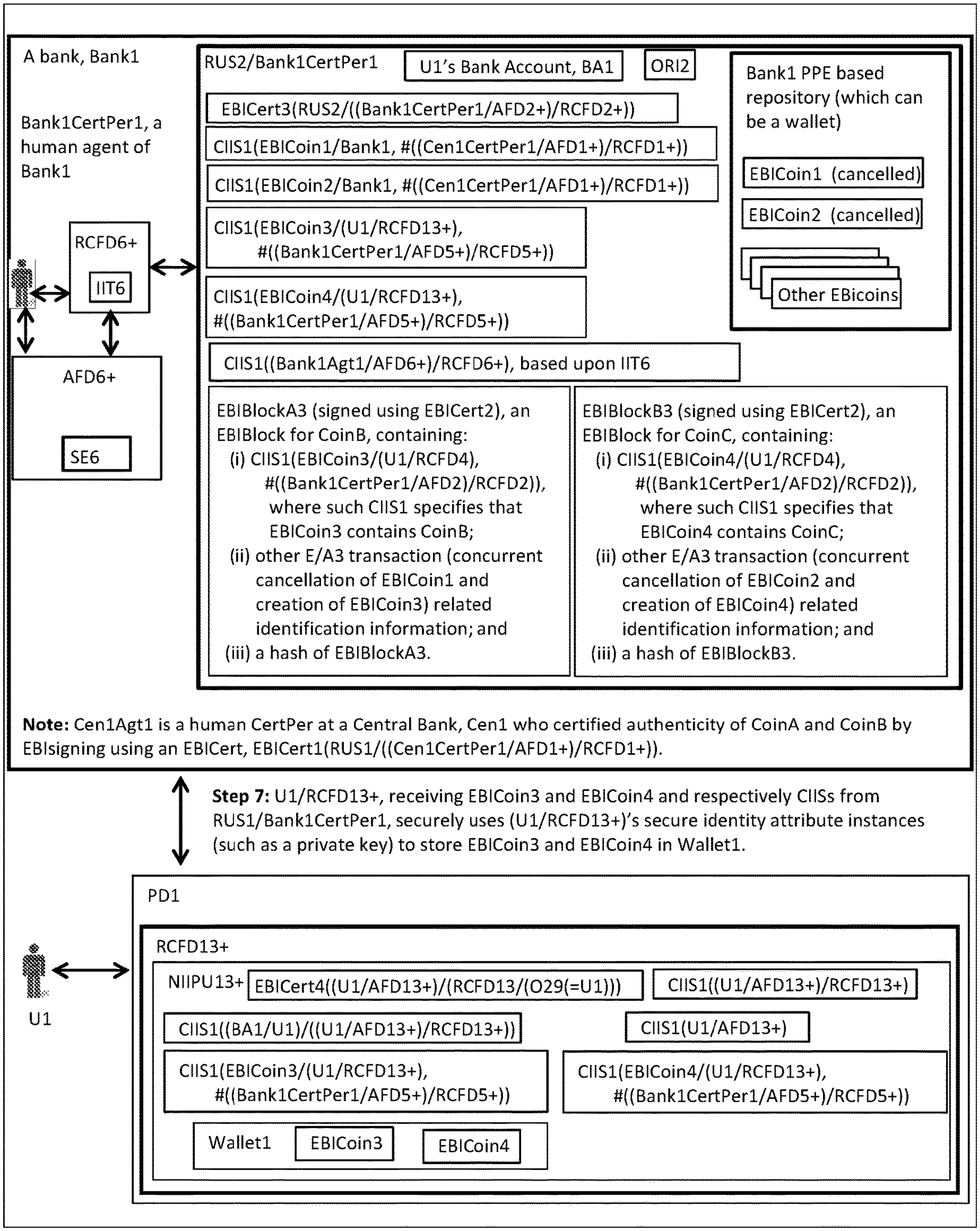

Figure 58A: Non-limiting illustrative example showing a financial transaction process set wherein a user, U1, participates in a transaction that causes Bank1 to securely: (i) concurrently as a component of the transaction, cancel EBICoin1 containing a digital coin, CoinA, contained in an EBICoin. EBICoin1, that U1 owns, and create an EBICoin, EBICoin4, containing CoinA and associated CIIS; (ii) create an EBIBlock recording the transfer of ownership; (iii) register EBICoin4 and associated CIIS1 with TIIRS1; and (iv) forward EBICoin4 to a new owner, U2/RCFD14+.

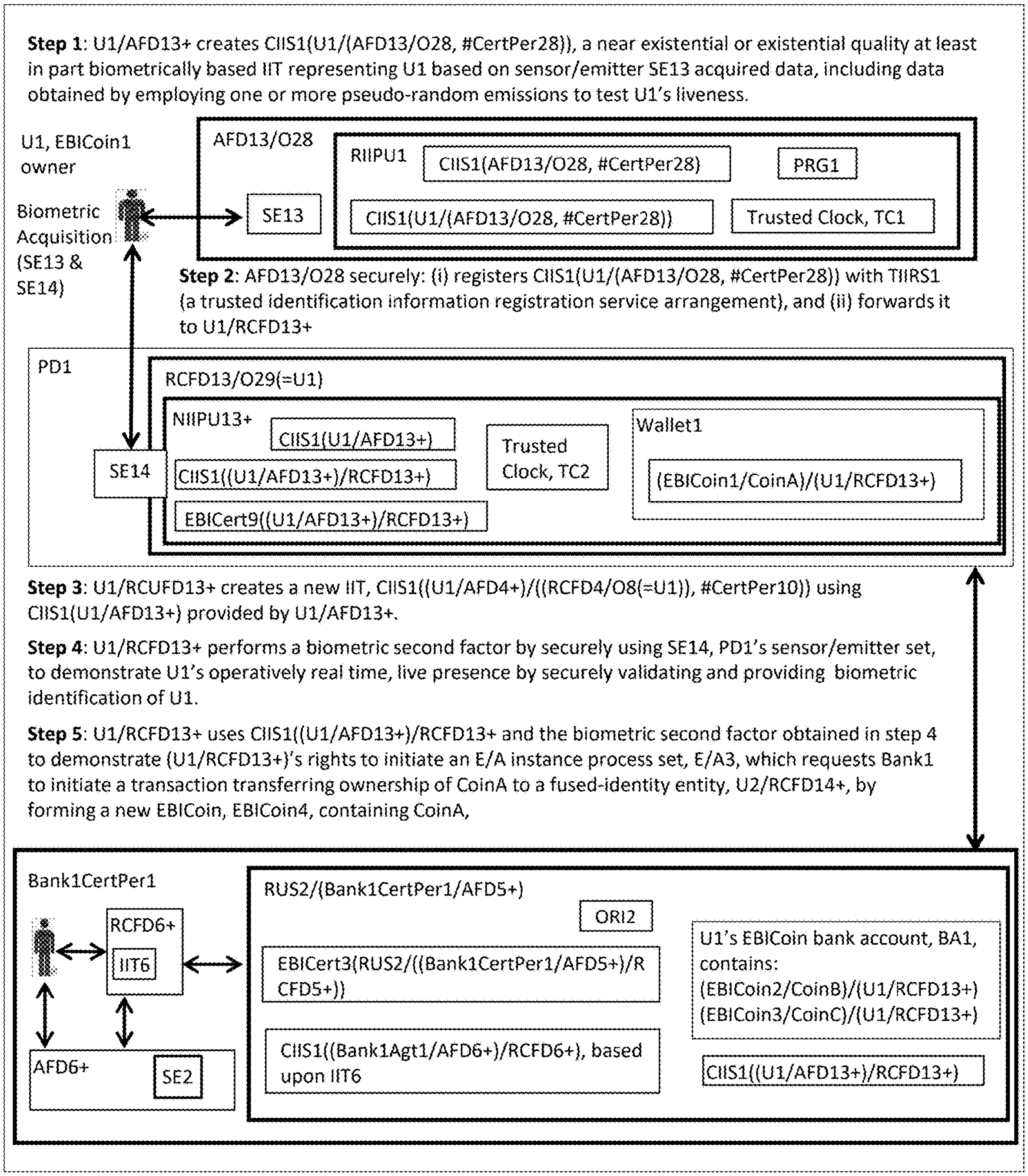

Figure 58B: A continuation of Figure 58A.
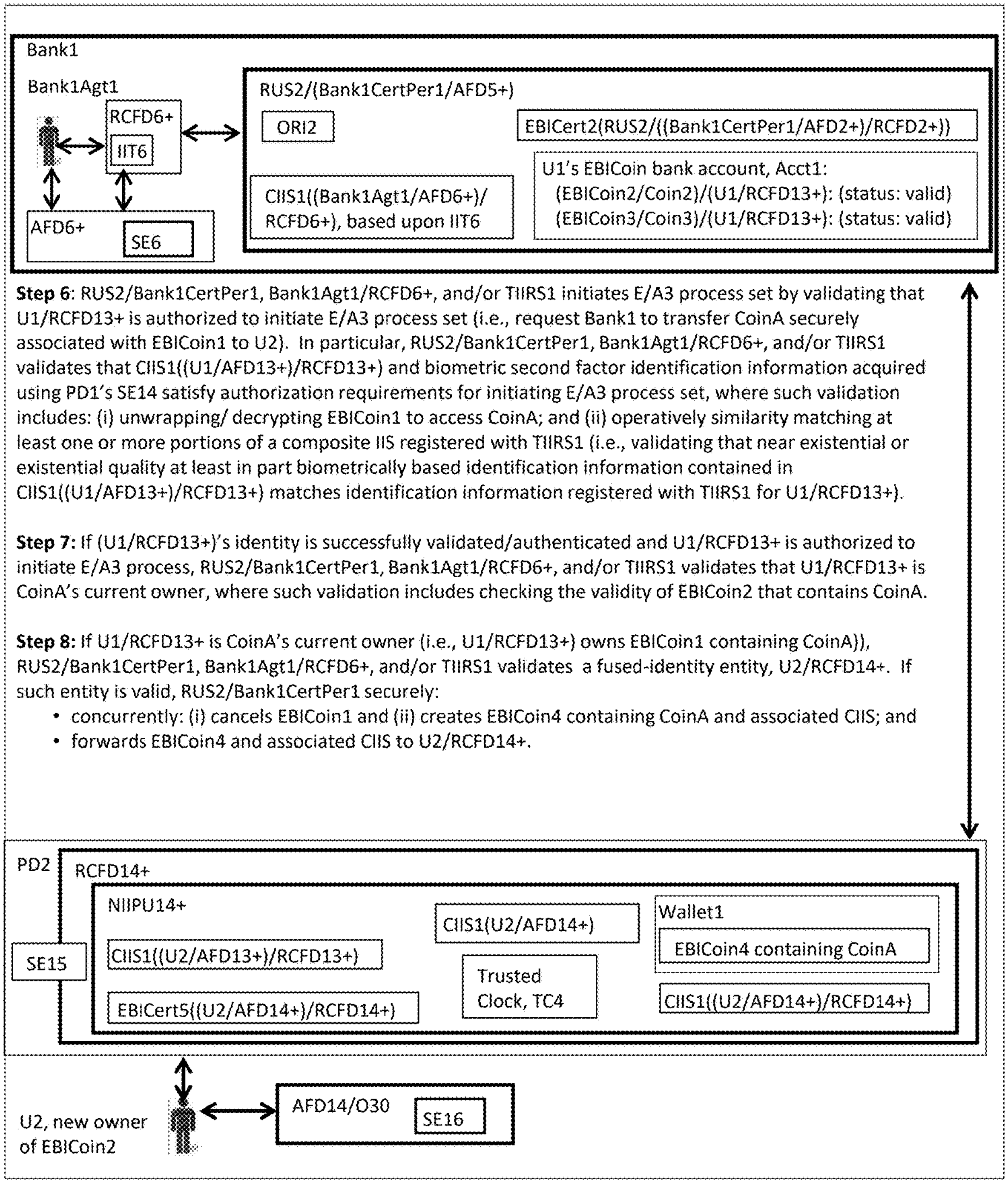

Figure 58C: A continuation of Figure 58B.

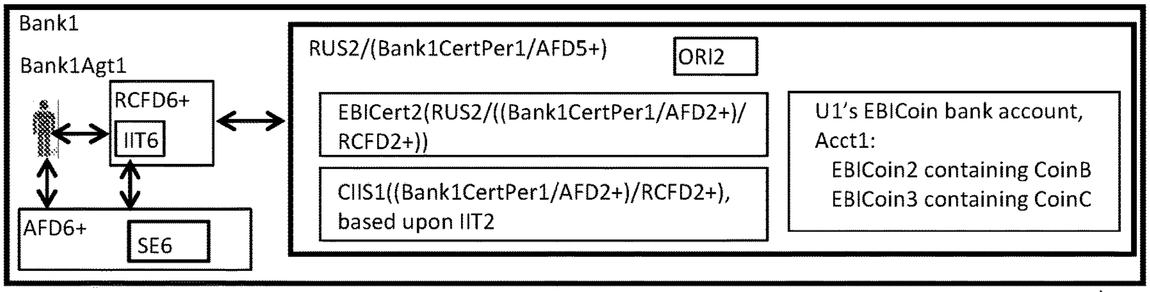

Step 9: RUS2/Bank1CertPer1, Bank1Agt1/RCFD6+, and/or TIIRS1 completes E/A3 process set by concurrently securely registering EBICoin4 containing CoinA, and requesting TIIRS1 to cancel EBICoin1 in TIIRS1's database. In differing embodiments, TIIRS1 can manage authenticity of EBICoins and prevent, or at least substantially mitigate risk of, the creation of multiple EBICoins for the same digital coin (e.g., CoinA) by requiring:

- Financial institutions, such as Bank1, to check the validity of EBICoins prior to using them in EBICoin based transactions,
- Users to maintain EBICoins' respective identification information in users' respective NIIPUs/wallets and/or EBICoin accounts (e.g., bank accounts).
- Financial institutations' respective fused-identity CertPer related entities to securely transfer ownership of digital coins from such coins' respective current owners (represented by corresponding EBICoins) to new owners by, at the time of registration of the transfer, simultaneously: (i) canceling current owners' respective EBICoins; (ii) creating new EBICoins to respectively contain such digital coins and securely stipulate their respective new ownerships; and (iii) registering newly created EBICoins and associated CIISs with TIIRS1.

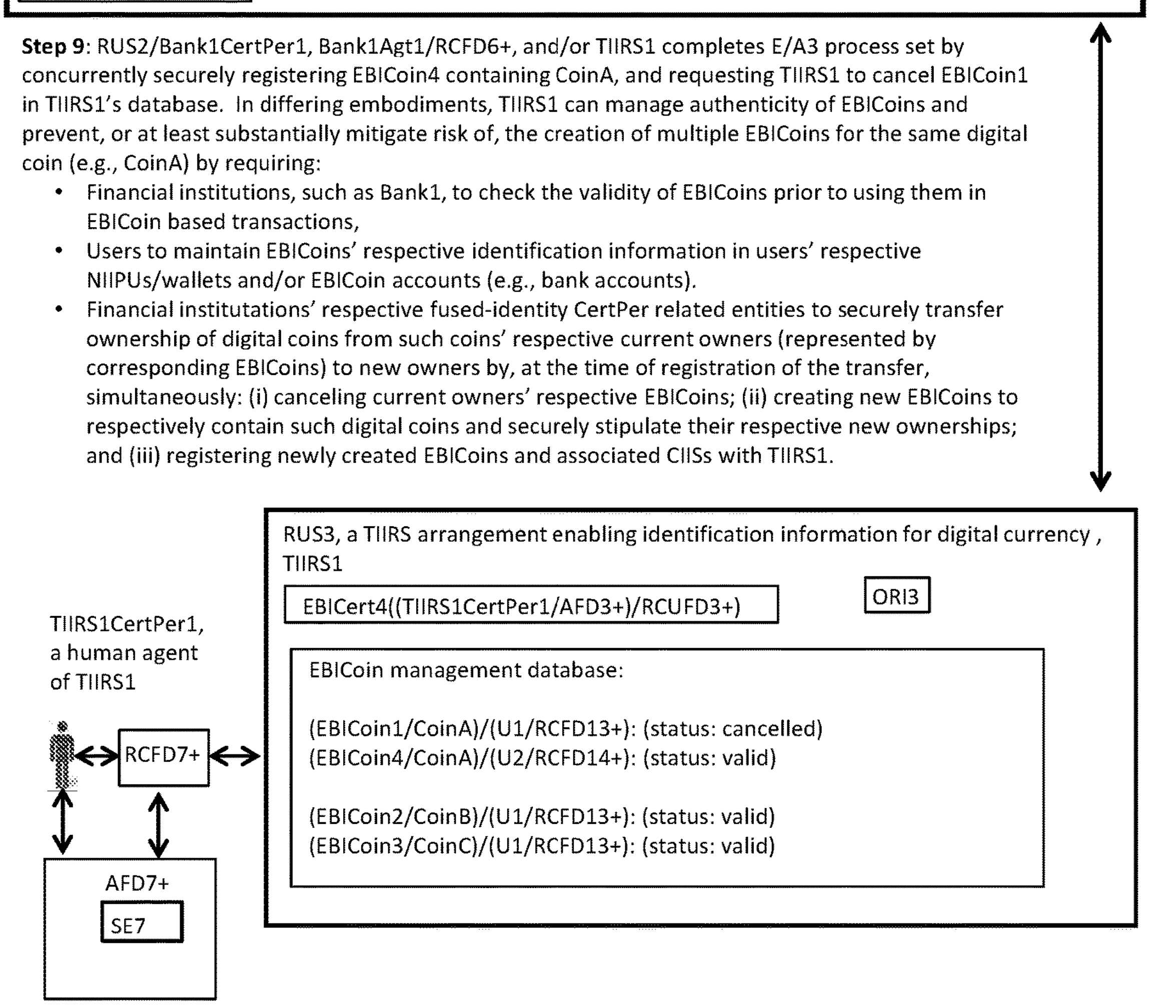

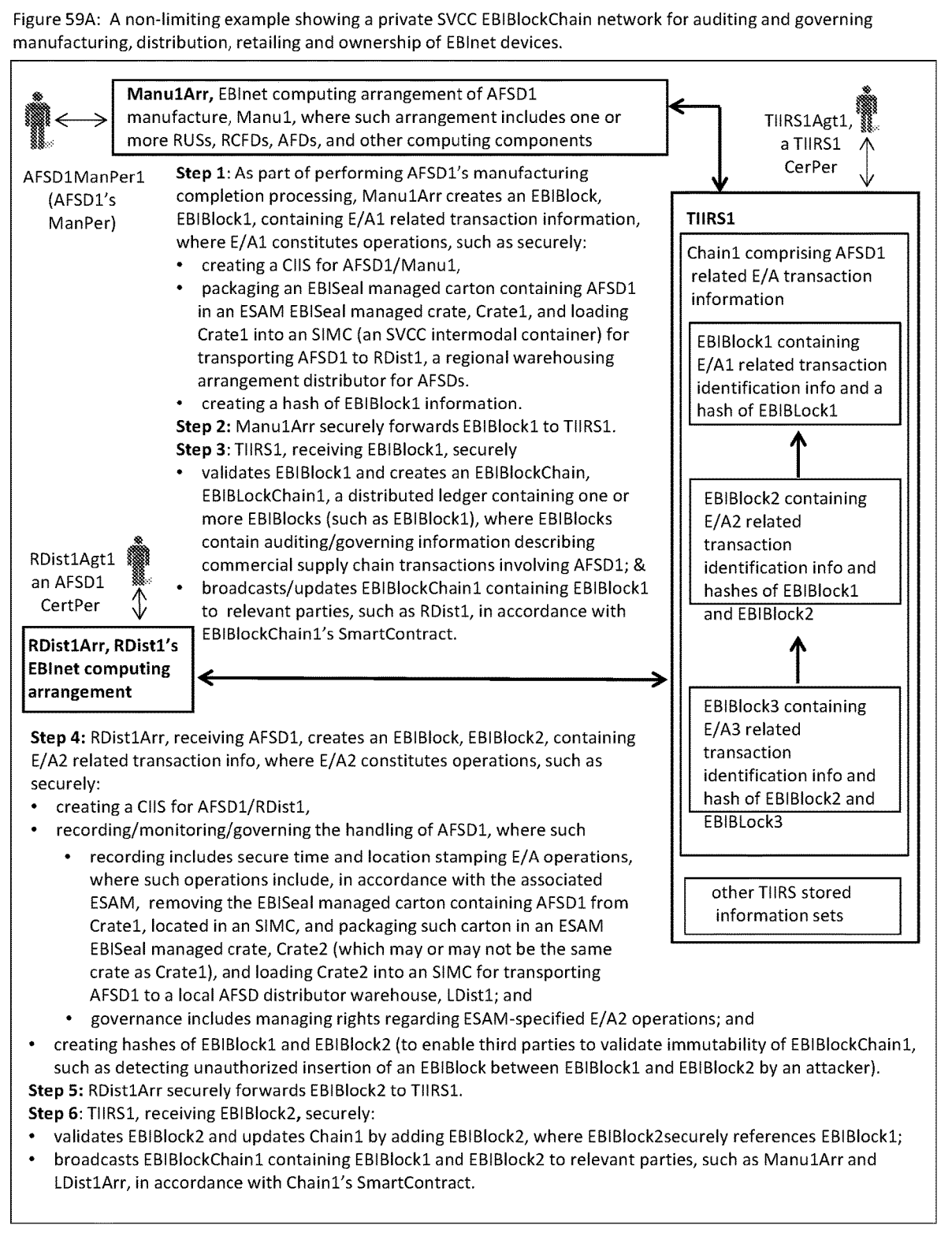

Figure 59A: A non-limiting example showing a private SVCC EBIBlockChain network for auditing and governing manufacturing, distribution, retailing and ownership of EBInet devices.

Manu1Arr, EBInet computing arrangement of AFSD1 manufacture, Manu1, where such arrangement includes one or more RUSs, RCFDs, AFDs, and other computing components AFSD1ManPer1 (AFSD1's ManPer)

TIIRS1Agt1, a TIIRS1 CerPer

Step 1: As part of performing AFSD1's manufacturing completion processing, Manu1Arr creates an EBIBlock, EBIBlock1, containing E/A1 related transaction information, where E/A1 constitutes operations, such as securely:

- creating a CIIS for AFSD1/Manu1,
- packaging an EBISeal managed carton containing AFSD1 in an ESAM EBISeal managed crate, Crate1, and loading Crate1 into an SIMC (an SVCC intermodal container) for transporting AFSD1 to RDist1, a regional warehousing arrangement distributor for AFSDs.
- creating a hash of EBIBlock1 information.

Step 2: Manu1Arr securely forwards EBIBlock1 to TIIRS1.

Step 3: TIIRS1, receiving EBIBlock1, securely

- validates EBIBlock1 and creates an EBIBlockChain, EBIBLockChain1, a distributed ledger containing one or more EBIBlocks (such as EBIBlock1), where EBIBlocks contain auditing/governing information describing commercial supply chain transactions involving AFSD1; &
- broadcasts/updates EBIBlockChain1 containing EBIBlock1 to relevant parties, such as RDist1, in accordance with EBIBlockChain1's SmartContract.

TIIRS1

Chain1 comprising AFSD1 related E/A transaction information

EBIBlock1 containing E/A1 related transaction identification info and a hash of EBIBLock1

EBIBlock2 containing E/A2 related transaction identification info and hashes of EBIBlock1 and EBIBlock2

EBIBlock3 containing E/A3 related transaction identification info and hash of EBIBlock2 and EBIBLock3 other TIIRS stored information sets

RDist1Agt1 an AFSD1 CertPer

RDist1Arr, RDist1's EBInet computing arrangement

Step 4: RDist1Arr, receiving AFSD1, creates an EBIBlock, EBIBlock2, containing E/A2 related transaction info, where E/A2 constitutes operations, such as securely:

- creating a CIIS for AFSD1/RDist1,
- recording/monitoring/governing the handling of AFSD1, where such
  - recording includes secure time and location stamping E/A operations, where such operations include, in accordance with the associated ESAM, removing the EBISeal managed carton containing AFSD1 from Crate1, located in an SIMC, and packaging such carton in an ESAM EBISeal managed crate, Crate2 (which may or may not be the same crate as Crate1), and loading Crate2 into an SIMC for transporting AFSD1 to a local AFSD distributor warehouse, LDist1; and
  - governance includes managing rights regarding ESAM-specified E/A2 operations; and
- creating hashes of EBIBlock1 and EBIBlock2 (to enable third parties to validate immutability of EBIBlockChain1, such as detecting unauthorized insertion of an EBIBlock between EBIBlock1 and EBIBlock2 by an attacker).

Step 5: RDist1Arr securely forwards EBIBlock2 to TIIRS1.

Step 6: TIIRS1, receiving EBIBlock2, securely:

- validates EBIBlock2 and updates Chain1 by adding EBIBlock2, where EBIBlock2securely references EBIBlock1;
- broadcasts EBIBlockChain1 containing EBIBlock1 and EBIBlock2 to relevant parties, such as Manu1Arr and LDist1Arr, in accordance with Chain1's SmartContract.

Figure 59B: Continuation of Figure 59A.
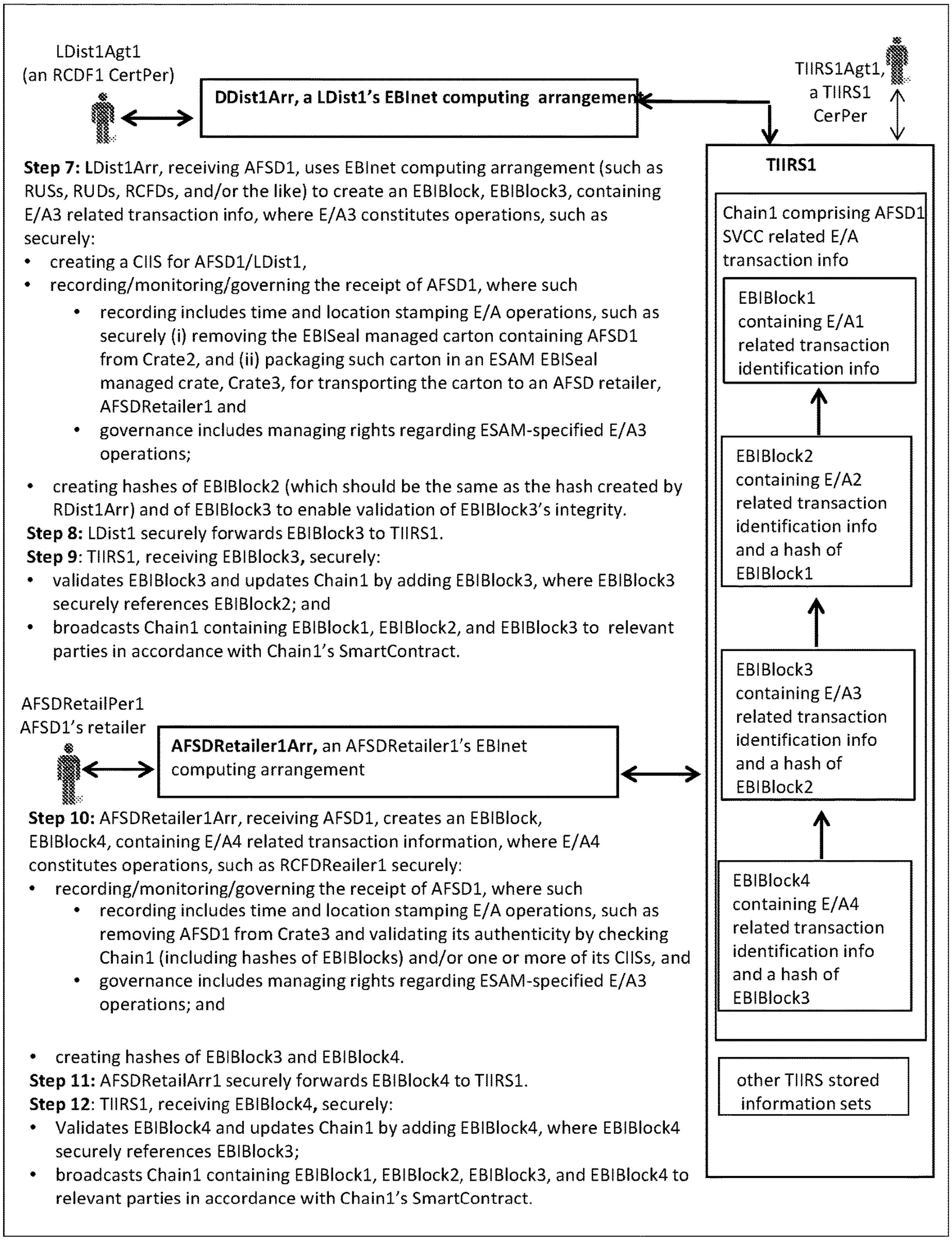

Figure 59C: A continuation of Figure 59B.

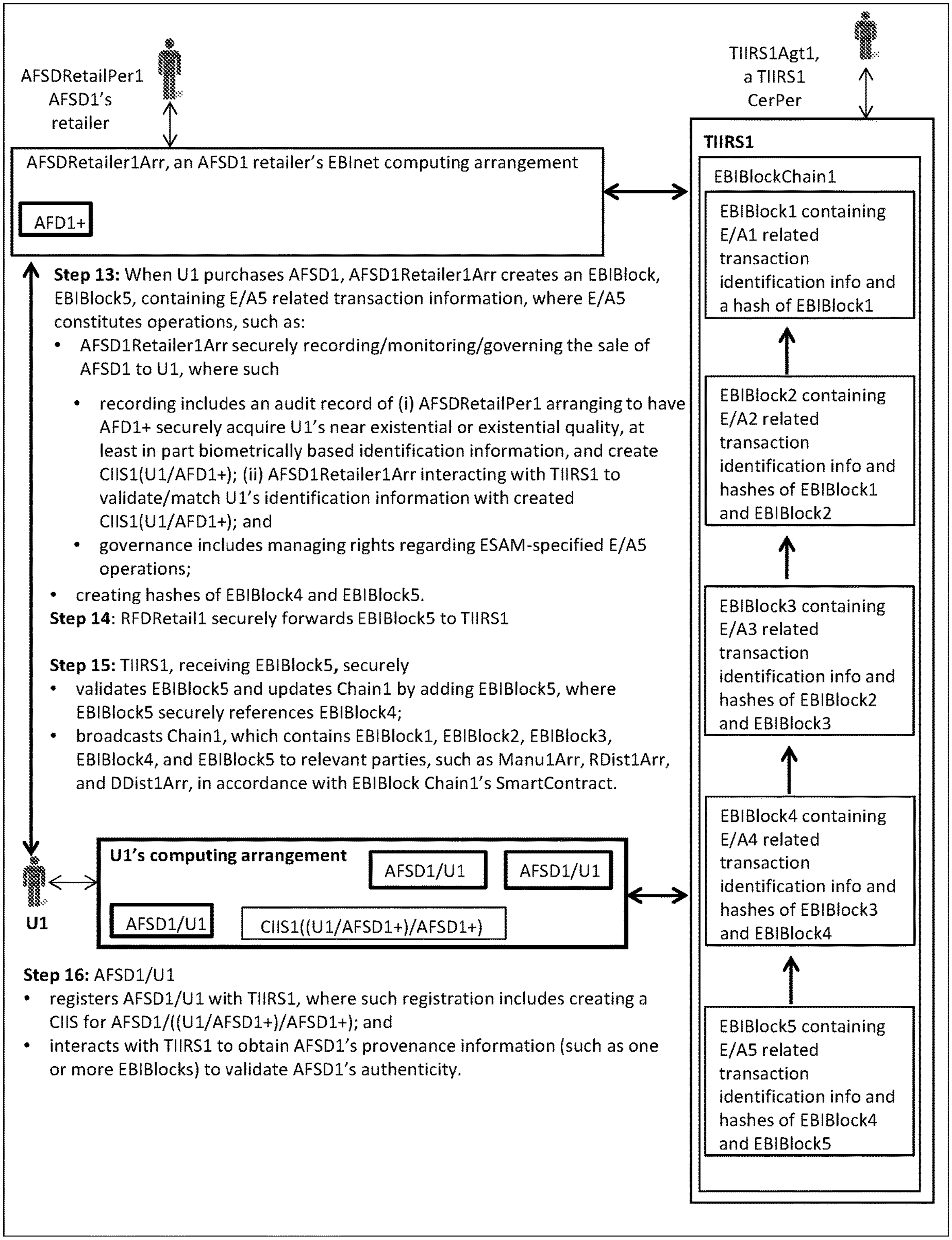

Step 13: When U1 purchases AFSD1, AFSD1Retailer1Arr creates an EBIBlock, EBIBlock5, containing E/A5 related transaction information, where E/A5 constitutes operations, such as:

- AFSD1Retailer1Arr securely recording/monitoring/governing the sale of AFSD1 to U1, where such
  - recording includes an audit record of (i) AFSDRetailPer1 arranging to have AFD1+ securely acquire U1's near existential or existential quality, at least in part biometrically based identification information, and create CIIS1(U1/AFD1+); (ii) AFSD1Retailer1Arr interacting with TIIRS1 to validate/match U1's identification information with created CIIS1(U1/AFD1+); and
  - governance includes managing rights regarding ESAM-specified E/A5 operations;
- creating hashes of EBIBlock4 and EBIBlock5.

Step 14: RFDRetail1 securely forwards EBIBlock5 to TIIRS1

Step 15: TIIRS1, receiving EBIBlock5, securely

- validates EBIBlock5 and updates Chain1 by adding EBIBlock5, where EBIBlock5 securely references EBIBlock4;
- broadcasts Chain1, which contains EBIBlock1, EBIBlock2, EBIBlock3, EBIBlock4, and EBIBlock5 to relevant parties, such as Manu1Arr, RDist1Arr, and DDist1Arr, in accordance with EBIBlock Chain1's SmartContract.

Step 16: AFSD1/U1

- registers AFSD1/U1 with TIIRS1, where such registration includes creating a CIIS for AFSD1/((U1/AFSD1+)/AFSD1+); and
- interacts with TIIRS1 to obtain AFSD1's provenance information (such as one or more EBIBlocks) to validate AFSD1's authenticity.

Figure 60A: A non-limiting example showing a private SVCC EBIBlockChain network for auditing and governing device (such as an RFD) manufacturing, distribution, and retailing.
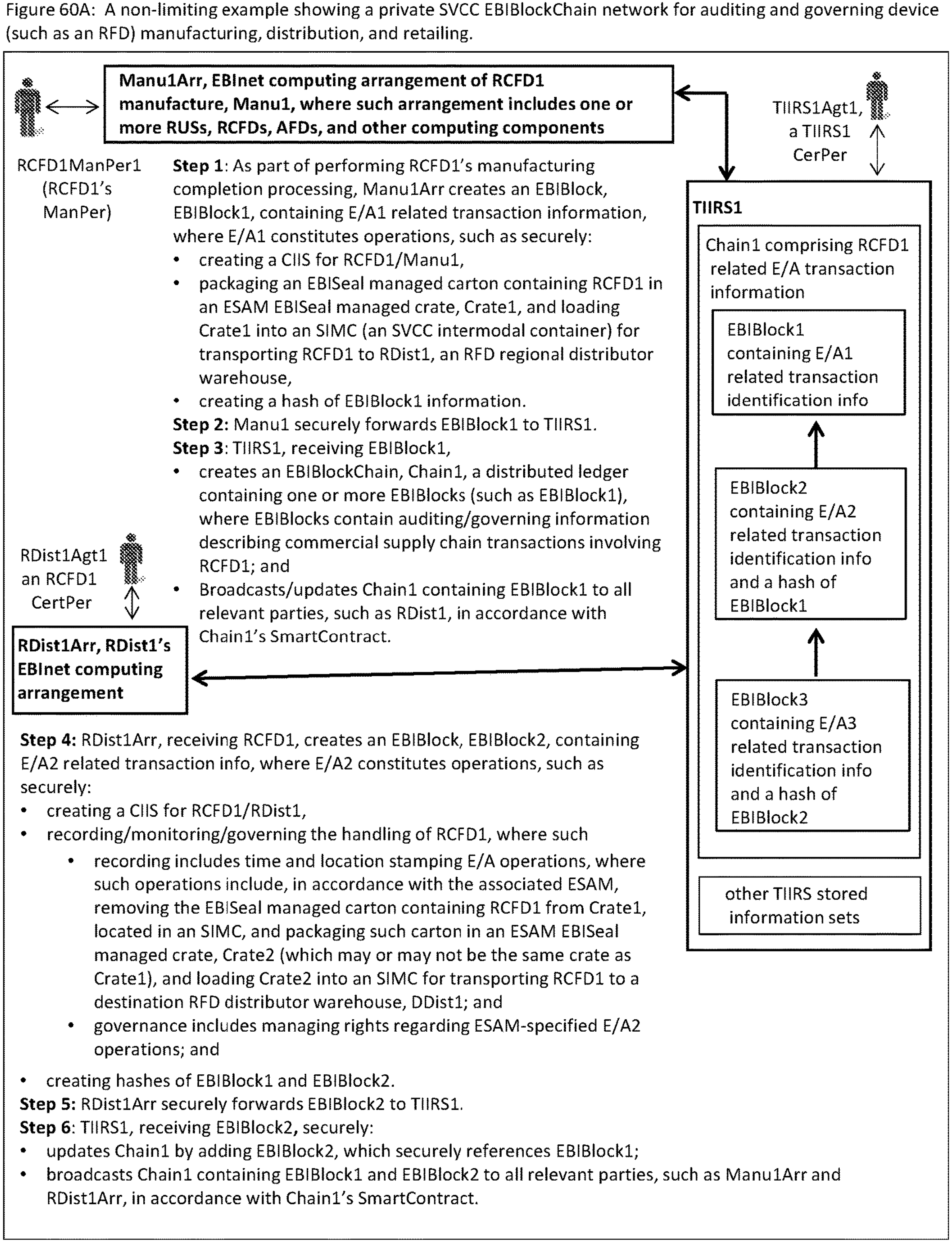

Figure 60B: A continuation of Figure 60A.
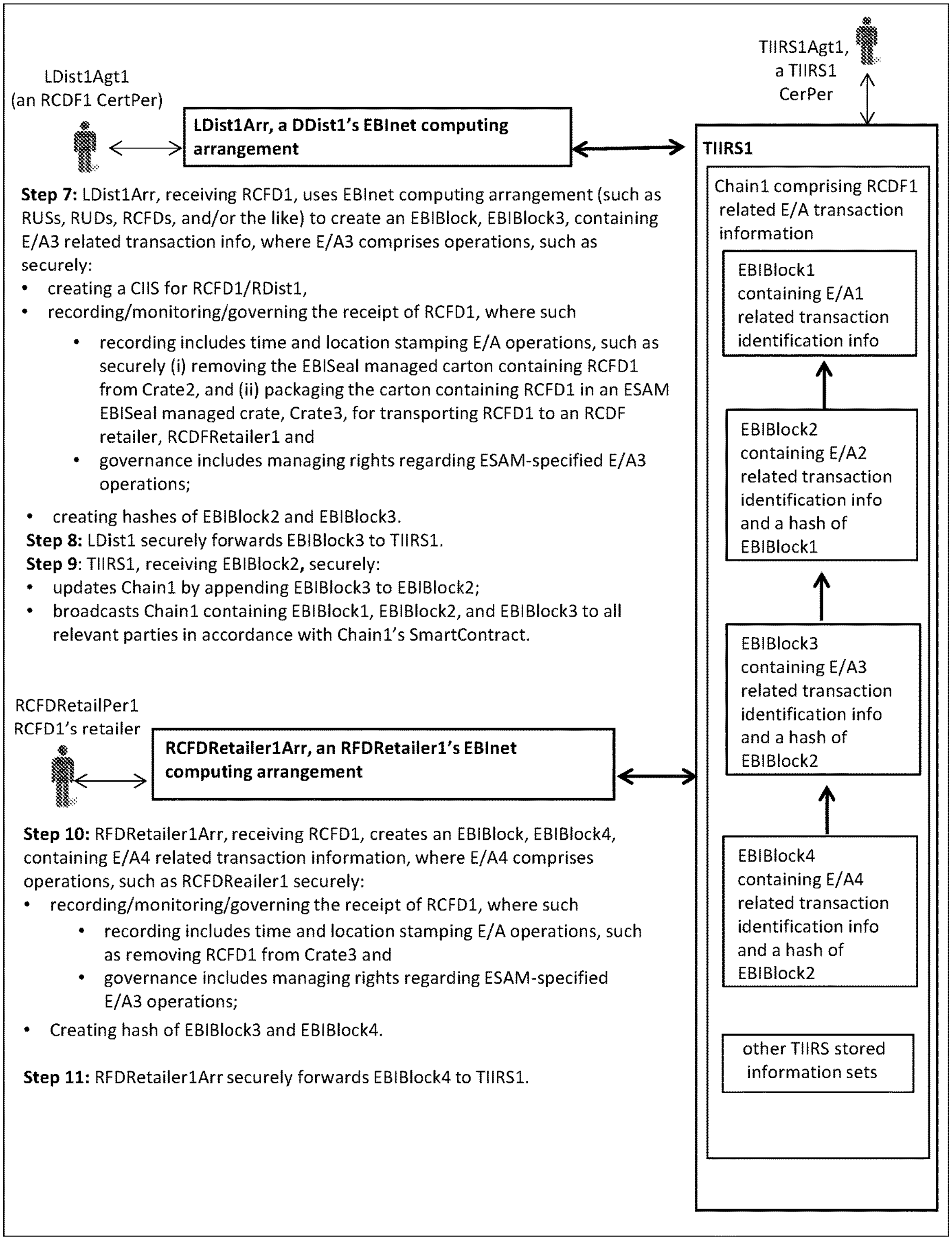

Figure 60C: A continuation of Figure 60B.
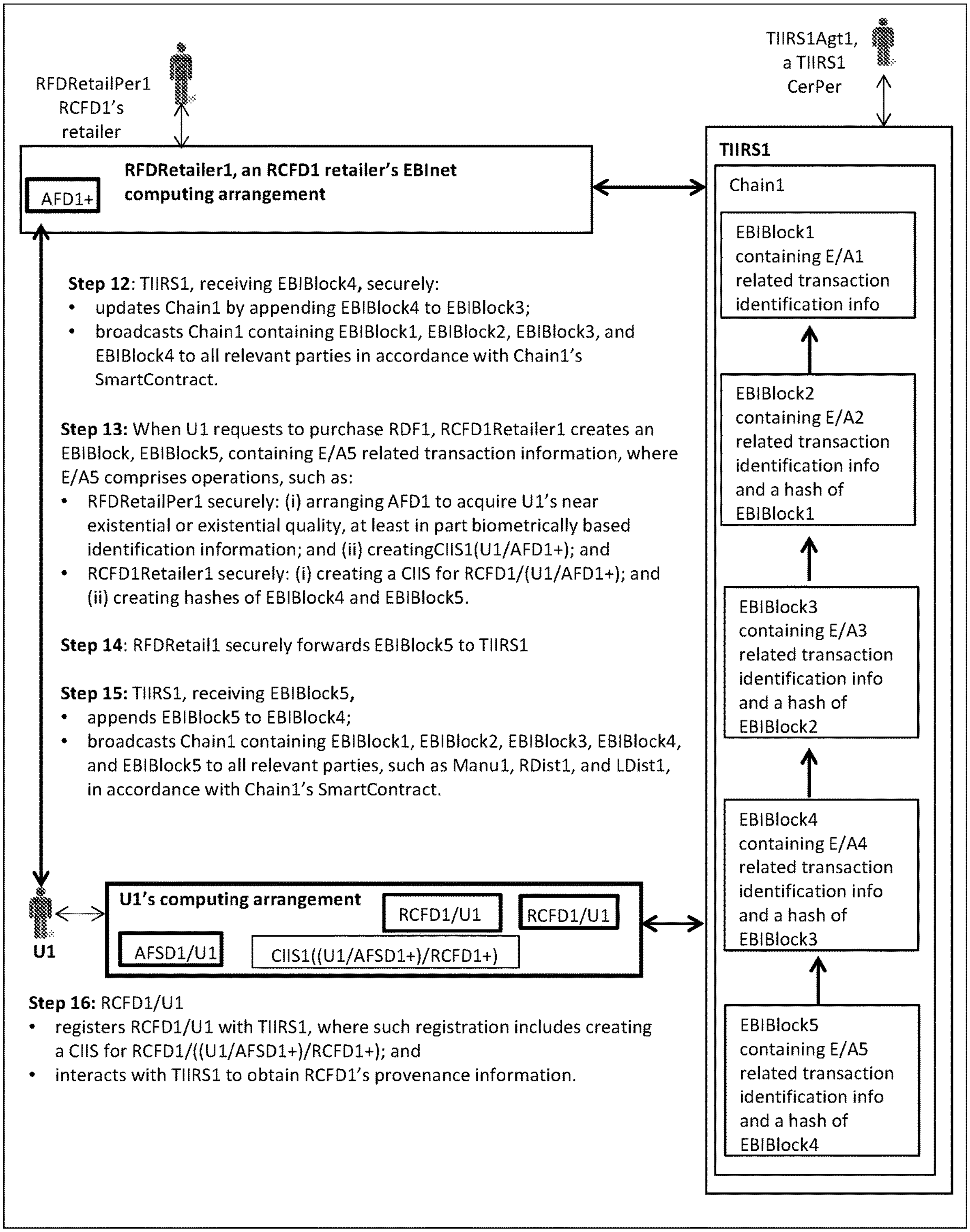

Figure 61A: A non-limiting illustrative example of a system and method for highly assiduous assurance of live presentation of a specific human using biometric pattern set identification and dynamic biologic process set timing relationships between human body multiple positions.

(A) Enrollment/Registration Step

1. Measure person-specific one or more relative timings (e.g., relative phase) of physical-event biological process set(s) of features at a plurality of spatial positions on an enrolling human's body, where such measurements include, but are not limited to, measurements of time-related biometric signal intensities of one or more spectral components at the plurality of spatial positions.
2. Produce one or more templates for use in determining liveness in a subsequent Authentication Evaluation Step, where such template production is accomplished using such plural-position relative-timing measurement information to create person-specific relative timing (e.g., relative phase) signature information for such physical-event biological process set(s).
3. Acquire person-identifying spatial, spectral, and/or temporal pattern information using the same or overlapping one or more body feature sets that are used to acquire such liveness-establishing signature information. Such spatial, spectral, and/or temporal pattern information is used to produce one or more templates for identifying a specific human as part of a subsequent Authentication Evaluation Step.

Enrolling Human Body Feature Set

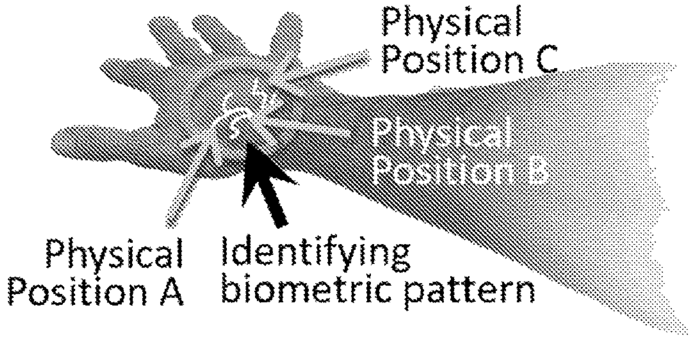

Biological Process Set Relative Timing Information

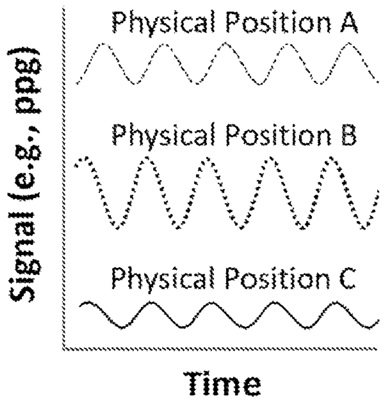

Figure 61B: a continuation of Figure 61A.

(B) Authentication Evaluation Step

1. Acquire, for a tangible feature set presenting for authenticating the presence of such enrolled human, (a) plural-position relative-timing signature information for such dynamic process sets at a plurality of spatial positions that correspond to/portray the plurality of human body spatial positions employed in the Enrollment/Registration Step, and (b) spatial, spectral, and/or temporal pattern information at spatial positions that correspond to/portray human body spatial positions employed in the Enrollment/Registration Step.
2. Evaluate similarity of such plural-position relative-timing signature information and such spatial, spectral, and/or temporal pattern information between the Enrollment/Registration Step and the Authentication Step.
3. Determine whether such Authentication Evaluation Step presenting tangible feature set comprises such enrolled specific, living human's body element set by satisfying similarity matching thresholds for such relative-timing signature information and corresponding feature-characterizing spatial, spectral, and/or temporal pattern information.

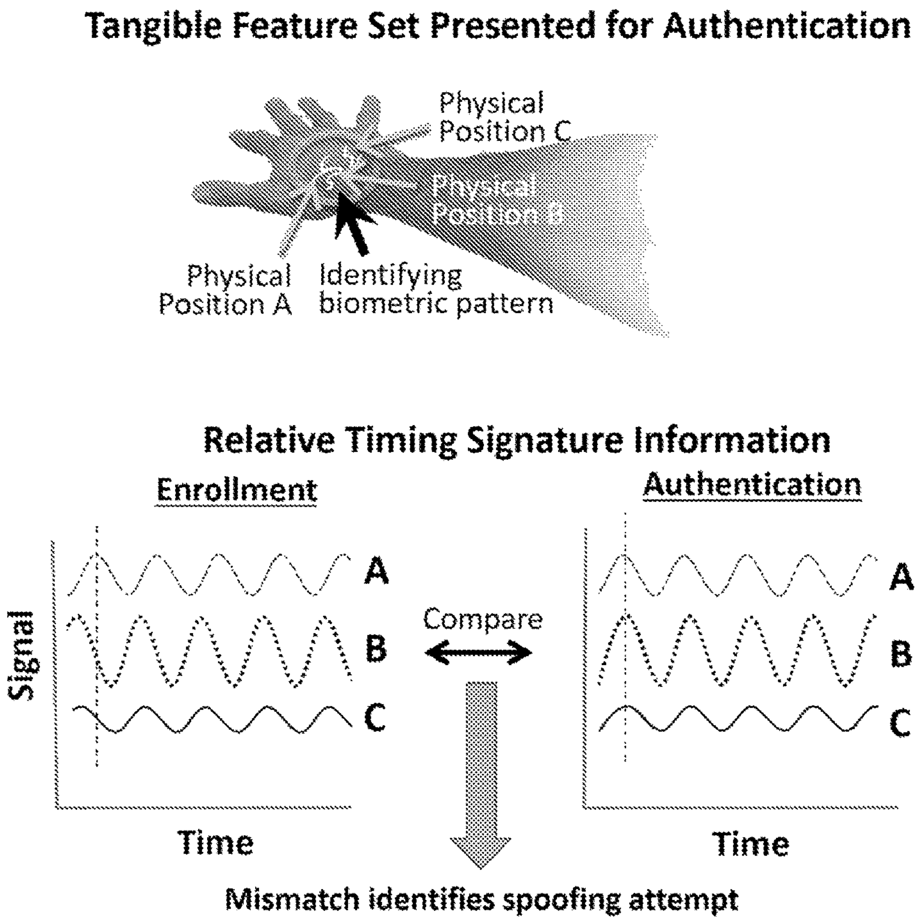

Figure 62: A non-limiting illustrative example of an AFD container for highly assiduous liveness and biometric pattern set determination.
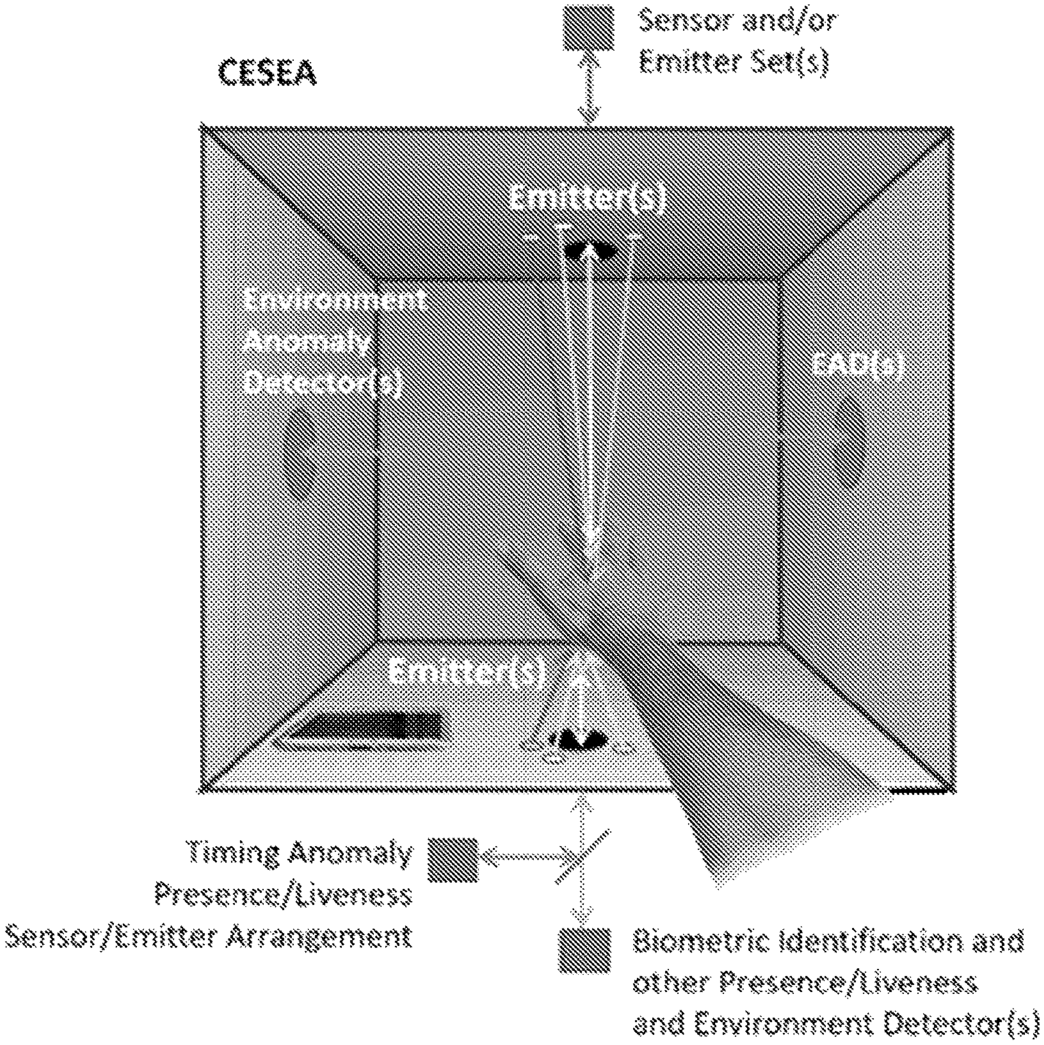

Figure 63: Non-limiting illustrative example of certain EBInet device arrangement components
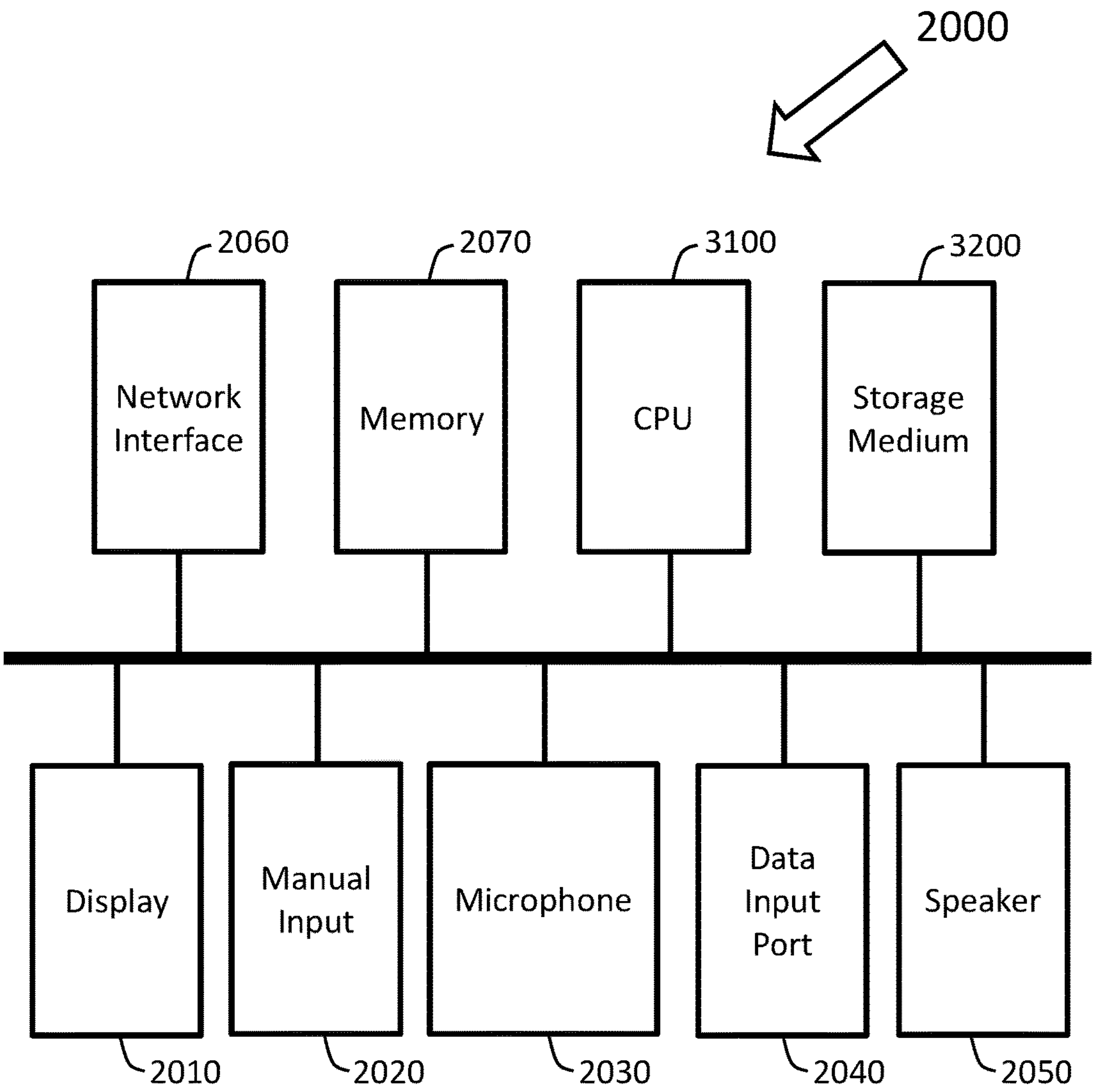

SYSTEMS AND METHODS FOR A CONNECTED COMPUTING RESOURCE AND EVENT/ACTIVITY IDENTIFICATION INFORMATION INFRASTRUCTURE USING NEAR EXISTENTIAL OR EXISTENTIAL BIOMETRIC IDENTIFICATION OF HUMANS

RELATED APPLICATIONS

This application is a continuation of U.S. patent application Ser. No. 18/525,832 filed Nov. 30, 2023, now U.S. Pat. No. 12,259,958, which is a divisional of application Ser. No. 18/198,540 filed May 17, 2023, now USP 12, 111,902, which claims the benefit of U.S. Provisional Patent Application No. 63/365,067, titled EXISTENTIAL BIOMETRIC IDENTIFICATION, filed May 20, 2022. Each of these prior applications is incorporated herein by reference in its entirety for all purposes. U.S. Pat. No. 9,721,086, filed Sep. 13, 2014, titled METHODS AND SYSTEMS FOR SECURE AND RELIABLE IDENTITY BASED COMPUTING, is a continuation-in-part of PCT Application No. PCT/US2014/026912, filed Mar. 14, 2014, titled METHODS AND SYSTEMS FOR PURPOSEFUL COMPUTING, which is a continuation-in-part of U.S. Pat. No. 9,378,065, filed Jun. 26, 2013, titled PURPOSEFUL COMPUTING, which is a continuation-in-part of U.S. Pat. No. 10,075,384, filed Mar. 15, 2013, titled "PURPOSEFUL COMPUTING" all of which are incorporated herein by reference in their entirety. These applications are referred to collectively as the Parent Application Set.

BACKGROUND

Modern connected computing does not provide a coherent generally applicable platform supporting the identification and evaluation of resources available from the nearly boundless resource opportunities. Without particular, significant expertise in a given activity/topic of interest, connected computing often provides inefficient, and too frequently insecure, identification and evaluation of resource opportunities; such resource identification and evaluation can be unreliable and inadequate, misleading and misdirecting, where the absence of sufficient resource descriptive/informing, including existentially reliable, provenance information, can lead to unfortunate, and at times destructive, results due to, for example, embedded malware.

Current computing's inchoate resource ecosphere results from, at least in part, connected computing's patchwork evolution from desktop and client/server computing architectures employed by a nearly boundless array of independent parties. While today's computing capabilities have had a transformative impact on human activity, this ecosphere is a highly distributed environment whose resources and activities, and their usage consequences, are often unreliable, risky, inefficient, misrepresented, and/or, for given resources, inadequate or suboptimal for user purposes.

Connected computing has propelled human productivity and knowledge, but it often fails to support the individual user's or user groups' quest for reliability, trustworthiness, and optimal performance in satisfying user priorities and purposes. Computer based identification information resources provisioned through connected computing are frequently inadequate in stakeholder descriptive identification and attribute information and when stakeholders are identified, information is too often inadequately, inaccurately, and/or deceptively represented. Information regarding such resources can be laden with false and/or misleading content that is presented by ill-intentioned, misidentified, and/or insufficiently competent persons and/or their respective agent computing arrangements/organizations, where such persons and organizations are subject to relatively weak identification procedures.

Today's identification information tools often fail to provide sufficient provenance of resources' descriptive information, and they are used inconsistently and when used they too often employ weak/vulnerable (e.g., insecure) identification information techniques. As a result, resource descriptive information is often insufficient and/or may be effectively inaccessible to both non-expert and expert person alike. Such inadequate resource characterizing identification information (such as stakeholder provenance information) prevents computer users and organizations from realizing the most advantageous/least risky results from their computing activities and it exposes such users/parties to false, misleading, and/or malicious resource content.

Modern connected computing does not provide a standardized and interoperably interpretable framework for transforming its many trillions (or quadrillions) of resources (e.g., human participants, devices, software, webpages, media, documents, and communication instances), as well as countless arrays of events/activities, into generally accessible, secure, and otherwise reliable resources. Such a transformation can be realized using contemporaneous and/or operatively real-time near existential or existential human biometric identification as root identity anchors for resource and event/activity identification information, such capabilities operating in a distributed, highly secure, identification information environment, a networking infrastructure arrangement for acquiring, receiving, carrying, forwarding, and using identification information. Such an identification information infrastructure arrangement, an EBInet (Existential Biometric Identification Network) system, comprises a highly reliable and secure system that supports entity, including human and event/activity, authenticity and provenance assessment.

Connected computing—e.g., peer-to-peer, local networked, and internet-based computing-enables the use of highly diverse environments. But productivity and trustworthiness, when using today's connected computing environment, is undermined by the environment's, and its accessible resources', largely inchoate organization, and its conspicuously inadequate, unreliable, insecure, and insufficiently informative identification of computing resource attributes and provenance. Such an inchoate resource environment lacks suitability to user purpose informing attributes, whether such entities/resources are human, non-human tangible (e.g., devices), and/or intangible (e.g., digital data, software), and lack root reliability that results from fundamentally accurate person and other entity identification identifier and attribute infrastructure.

Systems described herein support assiduously reliable, ubiquitously available identification information for use in highly diverse types of identification computing processes. Such described systems support determination of entity suitability based on biometric/liveness, stipulated fact, and assertion, attributes, where such identification information may be employed with artificial intelligence and other purposeful computing capabilities. Such identification information can be securely bound to all types of entity and event/activity identifiers and used to assess resource, such as person or other entity, suitability and trustworthiness. Such same infrastructure can be used to establish a user's authenticity for both personal activities such as starting one's car, entering one's house, contractually entering into a financial transaction, and/or the like, as well as stipulating stakeholder, and certifying provenance, information for organizational, societal, and business purposes.

Today's connected computing sourced resources and processes are subject to destructive security risks that can, at times, be profoundly damaging to individuals and/or groups. For example, it is important, and may be critical, to understand the source of a digital object. If the liveness/presence of a stakeholder party (e.g., a creator, modifier, and/or publisher of a digital object) in a communicated digital resource is spoofed (e.g., during information acquisition and/or liveness/presence information usage/storage), even if normally an identification of the stakeholder is reliable 99.99 percent of the time, the consequences of failure to identify a liveness/presence spoofing event may be costly, destructive, and even catastrophic (e.g., a malware attack causing failure in societal infrastructure, such as the electrical grid, hospital operations, financial institution operations, government computer networking, and/or the like).

SUMMARY

Embodiments include systems, devices, methods and computer-readable media to ensure authenticity of identity, flexibility of identification information arrangements, and security related to resource identification and purposeful computing in computing architectures.

BRIEF DESCRIPTION OF THE DRAWINGS

FIG. 1A-1D is a table of Acronyms.

FIG. 2 is a description of Notation used.

FIG. 3 is a non-limiting example of a tamper and inspection resistant acquiring and forwarding station device at least for acquiring near existential, or existential quality, biometric identification information sets of human individuals for contemporaneous use.

FIG. 4 is a non-limiting example of steps a time-delay anomaly system takes in respond to emissions of an unpredictable emission signal set.

FIG. 5 is a non-limiting example of a tamper and inspection resistant acquiring and forwarding station device at least one of: (a) employing acquired near existential and/or existential quality biometric identification information to create one or more IISs (e.g., IITs that may be EBICerts and/or CIISs); and (b) forwarding such acquired biometric identification information and/or such one or more IISs to one or more EBInet arrangement compliant identification information registration and/or publishing services. Such acquired biometric identification information, and/or IISs, may alternatively and/or in addition be respectively forwarded to one or more RCFDs and/or RUSs.

FIG. 6 is a non-limiting example of a distributed AFD arrangement used by an organization for provisioning highly reliable, fault tolerant, (near) existential quality IISs (such as CBEIISs of the organization's employees, CIISs of AFDA1/Owner components, & CIISs of employees & their respective RCFDs).

FIG. 7 is a non-limiting example of a distributed AFD arrangement used by an organization for provisioning highly reliable, fault tolerant, (near) existential quality IISs (such as CBEIISs of the organization's employees, CIISs of AFDA1/Owner components, & CIISs of employees & their respective RCFDs).

FIG. 8 is a non-limiting example of an EBInet embodiment that supports RUD and RUS arrangements receiving IISs, such IISs used to respectively detect and prevent replay attacks.

FIG. 9 is a non-limiting example of an AFD creating contemporaneous at least in part biometrically based identification information sets for different family members (parents P1 and P2, and a child, C1) RCUFDs, for their respective identity purposes, using respective CIISs and/or CBEIISs.

FIG. 10 is a non-limiting example of a corporation employing a plurality of AFDs to enable its employees to acquire near existential, and/or existential biometric information sets that third parties may use to authenticate them at higher rigor levels.

FIG. 11 is a non-limiting example of personal devices of a person providing such person's personal & work-related identification information sets for E/A governance, where such personal devices participate in both home & employer EBInet subnetwork activities in accordance with such subnetworks' and/or other services', and/or devices', respective policies.

FIG. 12 is a non-limiting example of pBIDE environment that enables a person to employ a local TIIRS to transparently govern the use of IISs/IITs for controlling home located appliances, where such governing includes forwarding situationally appropriate IISs/IITs for different event/activity instances, such as IIT1 for social networking, IIT2 for accessing streaming services (such as Netflix, Disney+ and/or the like), and IIT3 for on-line banking and interacting with P1's employer computing environment.

FIG. 13 is a non-limiting example of an embodiment showing a fused entity comprising a user, U1, and an associated RCUFD, RCUFD1/O1, generating and registering its EBICert.

FIG. 14 is a non-limiting example of an embodiment showing a RCUFD device, RCUFD1/O2, being used in a high security environment, where RCUFD1/O2 securely discards a private key after use and until such key is subsequently required, & then regenerated.

FIG. 15A is a non-limiting example of an embodiment regarding two users, U1 and U2, using their respective RCUFDs to exchange respective EBICerts in anticipation of user U1 sending user U2 a signed document that, after determining U2's liveness/presence during biometric acquisition, only U2 can decrypt.

FIG. 15B is a non-limiting example of an embodiment showing U1 employing RCUFD1 to create an EBIbox, EBIbox1 containing a signed and encrypted Doc1 that only U2, can access in cleartext after demonstrating U2's liveness.

FIG. 15C is a non-limiting example of an embodiment showing U2 decrypting a document, where such decryption requires that U2/RCUFD2 use contemporaneous CIIS for U2 existential, & RCUFD2, identification and SE5/NIIPU2 for U2 biometric identification for physical liveness demonstration and identification confirmation.

FIG. 16 is a non-limiting example of certain EBInet device arrangement secure processes and security hardened elements.

FIG. 17 is a non-limiting example of an EBInet AFD producing IITs that respective RCFDs receive and forward to RUDs and/or RUSs.

FIG. 18A is a non-limiting example of an embodiment of an IIT, IIT1, generated by an AFSD, AFSD1. Such IIT is then forwarded to RCUFD1/O2, which, in turn, creates and carries an IIT, IIT2.

FIG. 18B is a continuation of the non-limiting embodiment illustrated by FIG. 18A of IITokens being generated, and forwarded from RCUFD1 to RUD1.

FIG. 19A is a non-limiting example of an embodiment of IITs being generated, and forwarded from AFSD1 to RCUFD1 to be carried as an IIT.

FIG. 19B is a continuation of the non-limiting embodiment illustrated by FIG. 19A, of IITs being generated, and forwarded from RCUFD1 to RUD1 to be used to govern an E/A instance.

FIG. 20 is a non-limiting example of an embodiment of TIIRS provenance information storage and use event/activity set that stores provenance information in the cloud and/or local cloud and uses such provenance information for matching, suitability analysis, and policy fulfillment.

FIG. 21 is a non-limiting example of an identity governed EBISeal fabric for providing supply chain and operational integrity assurance framework that avoids and/or repels unauthorized entities' (e.g., persons'/parties') attacks on computing environments by securely creating, and limiting modifications to, software/firmware/hardware (s/f/h), and where the types of authorized creations and modifications are performed only by registered and/or expressly authorized, existentially biometrically identified persons in accordance with EBISeal/IGF specification sets.

FIG. 22 is a non-limiting example of an identity governed fabric (IGF) for providing supply chain, and operational integrity, computer identity/security framework for resisting and repelling unauthorized persons' attacks on computing software and hardware environments.

FIG. 23 is a non-limiting example of a provenance/validation authority chain of IISs that supports identification authorization sequence for provenance information used in certifying SVCC EBInet device arrangement audit sequence for RFD1 (using devices' respective manufacturing and retail persons' respective near existential and/or existential quality at least in part biometrically based IISs), such audit sequence comprised of sets of contextually appropriate SVCC sequence instances' audit relevant IISs.

FIG. 24 is a non-limiting example of information instances of a provenance/validation authority chain of IISs that supports identification authorization sequence for provenance information used in certifying SVCC EBInet device arrangement audit sequence for RFD1 (using devices' respective manufacturing and retail persons' respective near existential and/or existential quality at least in part biometrically based IISs), such audit sequence comprised of sets of contextually appropriate SVCC sequence instances' audit relevant IISs.

FIG. 25A-25B is a non-limiting example table comprising a list of device arrangements illustrated in FIGS. 26-28, such device arrangements' respective owners and users.

FIG. 26 is a non-limiting example of a provenance/validation authority chain of IISs that supports identification authorization sequence for certifying an EBInet device arrangement, RCFD1.

FIG. 27 is a non-limiting example of retailer identification information including RetailPer1, RCFD2, & ReailerPer1's near existential or existential quality at least in part biometric identification information acquiring device arrangement, AFD2. Such information is used in E/A retail transaction information acquisition and related E/A identity validation/authentication, other evaluation, &/or monitoring/recordation.

FIG. 28 is a non-limiting example of AFD1 provenance identification information, wherein such information regarding AFD1 certification, where such certification includes by ManPer5/RCFD7 and ManPer7/RCFD8 respectively certifying RCFD3 and AFD3.

FIG. 29 is a non-limiting example of a system that assures authenticity of the identity of messaging senders and receivers, informs regarding identity related facts and/or other attributes, and assures reliability of certain key attribute types.

FIG. 30 is a non-limiting example of an EBInet compliant email system that authenticates sending and receiving persons' respective presence and attributes.

FIG. 31 is a non-limiting example of a pervasively available biometric identification environment (pBIDE) embodiment that enables: (i) an email sender to obtain personal biometrically based and/or composite IITs and/or EBICerts of intended recipients of an email message to ensure that the email message is presented in clear text only in presence of the email's intended recipients' respective appropriate, such as, contemporaneous, at least in part biometrically based IISs; and (ii) email receivers to authenticate (and/or otherwise inform regarding) the sender's identity.

FIG. 32 is a non-limiting example of a pervasively available, biometric identity, environment (pBIDE) that enables EBInet device &/or service arrangements to interact with TIIRS1 to obtain &/or employ near existential &/or existential quality, contemporaneous, at least in part biometrically based, IISs (such as IITs in a form of EBICerts, CIISs, or CBEIISs) for authenticating, &/or otherwise evaluating, proffered IISs for E/A instances.

FIG. 33 is a non-limiting example of RCUFD1 generating an operatively near existential or existential quality at least in part biometrically based IIS for P1 using near existential or existential quality biometric information forwarded by AFD1/O1.

FIG. 34 is a non-limiting example of SVCC REAI process administration.

FIG. 35A-35B is a table for components described in FIGS. 36A-39.

FIG. 36A is a non-limiting example of activating SIMC1 by activating its RUS1/O3 & EBISeal1/O3, where SIMC1 is an EBInet compliant intermodal container, such EBISeal & RUS (RUS may be integrated into an EBISeal) integrated into IMC1 during, &/or after, completion of IMC1 manufacturing, to enable monitoring &/or managing the access to, other interaction with, &/or other monitoring and/or governance of IMC1, now SIMC1.

FIG. 36B is a non-limiting example of an EBISeal arrangement of an SIMC providing irrefutable transaction history regarding such SIMC and related event/activity instances using an EBIBlockChain comprising securely generated and forwarded one or more EBIBlocks containing relevant E/A instance transaction information regarding such SIMC.

FIG. 37A is a non-limiting example of a supply, value, and/or other commercial chain (SVCC) Stakeholder providing an existentially signed anticipatory manifest (ESAM) to EBISeal1 that EBISeal1 may use to governing SIMC1's E/A instances.

FIG. 37B is a non-limiting example of an SVCC administrative network based service arrangement providing irrefutable transaction history regarding an SIMC in an EBIBlockChain comprising securely generated and forwarded EBIBlocks containing relevant E/A instance transaction information regarding such SIMC.

FIG. 38A-38B is a non-limiting example of loading container arrangements and their contents into an operating SIMC, SIMC1.

FIG. 38C is a non-limiting example of SIMC1 after the completion of E/A2, in which Crate1 and Crate2 have been loaded into SIMC1, and EBISeals and/or RUSs have created situationally relevant EBIBlocks and added them to respective EBIBlockChains.

FIG. 38D is a non-limiting example of SIMC1's EBISeal and/or RUS1 creating an EBIBlock containing an E/A transaction information regarding moving/loading crates Crate1 and Crate2 into SIMC1.

FIG. 39 is a non-limiting example of an SVCC stakeholder human and/or a robot agent removing one or more crates from an SVCC intermodal container.

FIG. 40 is a non-limiting example embodiment illustrating generation of contextually appropriate, at least in part biometrically based IISs/IITs relating to a human user, P1. One or more such IISs/IITs can comprise child IISs/IITs derived from a P1, or P1/RCUFD1, master IIS.

FIG. 41 is a non-limiting example EBInet embodiment that illustrates generation of both societally and non-societally specific at least in part biometrically based identification information sets (SS-IITs and SAnony-IITs) using contextual attribute field based templates for pursuing event/activity instances.

FIG. 42 is a non-limiting example of an EBInet system that provides a cloud service arrangement that generates contextually appropriate, societally specific, or societally anonymous, at least in part biometrically based IIS sets (such as IITs, for example, EBICerts) for users.

FIG. 43A-43C is a non-limiting example of pBIDE, a pervasive biometric Identification environment that includes mobile identity presentation capabilities, where such embodiment enables a user, P1, employing an anonymous, situationally suitable, at least in part biometrically based IIT, SAnony-IIT2, to form an affinity group comprising people carrying their respective EBInet compliant RCUFDs that share P1's interest in attending the next Super Bowl game.

FIG. 44 is an outline of a non-limiting example, illustrated by FIGS. 46A-46E, of a trusted pBIDE arrangement that enables CertPers, Stakeholders and/or users, &/or their device &/or service arrangements, to (i) register REAIs' IISs (e.g., REAI CertPers', Stakeholders', users', &/or person/device fused-identity entities' IISs); (ii) authenticate/validate such REAIs' IISs; &/or (iii) identify/evaluate one or more suitable REAIs for fulfilling users' respective purposes.

FIG. 45 is a table describing human roles and EBInet devices in FIGS. 46A-46E.

FIG. 46A is a non-limiting example of a TIIRS, an established pBIDE trusted identification information resource registration/evaluation/management service arrangement that enables CertPers, Stakeholders, &/or users, & their EBInet device &/or service arrangements, to securely: (i) register such CertPers', Stakeholders', &/or users' respective person, device, service, instances &/or associated other REAIs, using instances' respective IISs, (ii) authenticate/validate such instances; &/or (iii) identify/evaluate/manage one or more suitable resources &/or events/activities in fulfillment of users' respective purposes.

FIG. 46B (FIG. 46A continued) is a non-limiting example of an established trusted pBIDE arrangement enabling a user (CertPer1) to certify and register/publish a resource set, RS1, with a third party publishing service using a CIIS of a fused identity entity, comprising such user and such user's RCUFD, such CIIS carried by such user's RCUFD that is securely integrated into a parent smartphone device arrangement, PD1.

FIG. 46C (FIG. 46B continued) is a non-limiting example of RCUFD3/U1 retrieving from Pub1, a copy of a resource set, RS1(2), & associated CIIS set that are registered with TIIRS1 & published by Pub1.

FIG. 46D (FIG. 46C continued) is a non-limiting example of RCUFD3/U2 interacting with TIIRS1 (and/or other relevant service(s)) to determine TIIRS1's authenticity and/or suitability for certifying, authenticating and/or providing attribute information regarding registered resources.

FIG. 46E (FIG. 46D continued) is a non-limiting example of RCUFD4/U2 causing &/or performing a suitability evaluation & determination of authenticity of RS1 as received from RCUFD3/U1 (e.g., authenticity regarding whether RS1 was modified (e.g., maliciously)).

FIG. 47A-47E is a non-limiting example of one or more TIIRS, and/or EBICert device, arrangements building & managing an SVCC provenance EBIBlockChain comprising EBIBlocks whose primary subject matters are RCUFD2 & RCUFD2 associated E/As.

FIG. 48A-48B is a list of human parties and their device arrangements and EBICerts.

FIG. 49 is a list of human parties and description of their functions.

FIG. 50 is a non-limiting illustrative example showing a Central Bank and/or other governing monetary authority minting digital coins and creating corresponding IISs, registering both such minted digital coins and corresponding IISs with a TIIRS, & storing at least in part Central Bank agent biometrically signed minted digital coins until financial institutions (e.g., commercial banks) request one or more digital coin sets in anticipation of bank transactions.

FIG. 51A is a non-limiting illustrative example showing a Central Bank and/or other monetary authority arrangement selling, lending &/or otherwise providing digital coins it has minted to a commercial bank, Bank1, wherein such bank stores such acquired digital coins in a secure repository arrangement (until it satisfies customers' respective currency transaction requests).

FIG. 51B is a non-limiting example showing a central bank arrangement selling, lending, and/or providing minted digital coins to a commercial bank, wherein such commercial bank stores bought, borrowed, and/or acquired on consignment minted digital coins in a secure repository (until its customers make transaction demands).

FIG. 51C is a non-limiting illustrative example showing a Central Bank arrangement selling, lending, and/or providing on consignment minted Digital Coins to a commercial bank, wherein such bank stores bought, borrowed, and/or acquired on consignment minted digital coins in a secure repository (until its customers make transaction demands).

FIG. 52A-52C is a non-limiting illustrative example showing a monetary governing authority creating EBICoins and selling, lending, and/or otherwise providing, such EBICoins to a commercial bank, wherein such bank securely stores such acquired EBICoins in a secure repository (until its customers make currency purchase transactions).

FIG. 53 is a non-limiting illustrative example showing a Central Bank arrangement securely: (i) minting digital coins and corresponding IISs; (ii) creating EBICoins, each EBICoin containing a minted digital coin; (iii) creating IIS for each created EBICoin; and (iv) registering created EBICoins.

FIG. 54A is a non-limiting illustrative example showing a Central Bank arrangement selling, lending, &/or otherwise providing EBICoins to a financial institution, Bank1, where such bank stores bank mined digital coins in EBICoins in a secure repository (until acting on customer transaction requests).

FIG. 54B is a non-limiting illustrative example showing a Central Bank arrangement selling, lending, and/or providing on consignment minted digital coins to a commercial bank, Bank1, wherein such bank stores bought, borrowed, and/or otherwise acquired (e.g., on consignment) digital coins in EBICoins in a secure repository (until, for example, in response to transaction requests by customers, where such bank transfers such coins in newly created EBICoins).

FIG. 54C is a non-limiting illustrative example showing a Central Bank arrangement creating EBICoins and selling, lending, and/or otherwise providing, such EBICoins to a financial institution (e.g., a commercial bank), wherein such institution stores such bought, borrowed and/or acquired one or more EBICoins in a secure repository (until its customers make transaction requests).

FIG. 55A is a non-limiting illustrative example showing process steps performed when a user requests to buy EBICoins of respective specified denominations from a financial institution (such as a commercial bank) in exchange for traditional currency.

FIG. 55B is a non-limiting illustrative example showing process steps performed when a user requests to buy EBICoins of respective specified denominations from a bank in exchange for traditional currency.

FIG. 55C is a non-limiting illustrative example showing process steps performed when a user requests to buy EBICoins of respective specified one or more denominations from a bank in exchange for traditional currency.

FIG. 56A-56C is a non-limiting illustrative example showing process steps performed when a user requests to buy EBICoins of respective specified denominations from a financial institution (such as a commercial bank) in exchange for traditional currency.

FIG. 57A-57B is a non-limiting illustrative example showing process steps performed when a user requests to buy EBICoins of specified denominations from a commercial bank in exchange for traditional currency, where such commercial bank manages EBICoins it had acquired from a Central Bank.

FIG. 58A-58C is a non-limiting illustrative example showing a financial transaction process set wherein a user, U1, participates in a transaction that causes Bank1 to securely: (i) concurrently as a component of the transaction, cancel EBICoin1 containing a digital coin, CoinA, that U1 owns, and create an EBICoin, EBICoin4, containing CoinA and associated CIIS; (ii) create an EBIBlock recording the transfer of ownership; (iii) register EBICoin4 and associated CIIS1 with TIIRS1; and (iv) forward EBICoin4 to a new owner, U2/RCFD14+.

FIG. 59A-59C is a non-limiting illustrative example showing a private SVCC EBIBlockChain network for auditing and governing manufacturing, distribution, retailing and ownership of EBInet devices.

FIG. 60A-60C is a non-limiting example showing a private SVCC EBIBlockChain network for auditing and governing device (such as an RFD) manufacturing, distribution, and retailing.

FIG. 61A-61B is a non-limiting illustrative example of a system and method for highly assiduous assurance of live presentation of a specific human using biometric pattern set identification and dynamic biologic process set timing relationships between human body multiple positions.

FIG. 62 is a non-limiting illustrative example of an AFD container for highly assiduous liveness and biometric pattern set determination.

FIG. 63 is a non-limiting example of certain EBInet device arrangement components.

DETAILED DESCRIPTION OF EXAMPLE EMBODIMENTS

1 Existential Biometric Identification Information Network-EBInet—a Secure and Reliable, Resource Provenance and Suitability, Connected Computing Infrastructure Connected computing (e.g., peer-to-peer, local networked, and internet-based computing) enables highly diverse environments that increasingly support operating frameworks for contemporary civilization. Connected computing has been ubiquitously fused into modern human life and has significantly altered, and in many ways improved, the lives of people in the developed and developing worlds. But productivity using today's connected computing environment is constrained by the largely inchoate organization of computing resources. There is an absence of technologies and tools for transforming modern computing's many trillions (or quadrillions) of resources (e.g., devices, software, webpages, information and communication instances, human participants), as well as countless arrays of events/activities, into optimally useful and cyber secure computing. With modern computing, there is no resource and event/activity identity information infrastructure for supporting a computing usage purpose fulfillment infrastructure, no computing purpose schema supporting a resource and event/activity opportunity, suitability, and risk assessment, infrastructure.

Modern computing does not provide a coherent platform supporting the identification, evaluation, and use of the nearly boundless array and diversity of computing resources. Without particularly significant expertise in a given activity/topic of interest, today's connected computing is inefficient; identification and evaluation activity results can be inadequate, misleading and misdirecting; and computing resources and processes are subject to security risks that are at times profoundly significant to individuals and/or groups. Computing's inchoate resource ecosphere results from, at least in part, connected computing's patchwork evolution from desktop and client/server computing architectures. While today's computing capabilities have had a transformative impact on human activity, this ecosphere is a highly distributed environment whose resources and activities, and their usage consequences, are often unreliable, risky, inefficient, misrepresented, and/or, respectively for given resources, inadequate or suboptimal for user purposes. Modern computing has propelled human productivity and knowledge, but it often fails to support the individual user's or user groups' quest for reliability, trustworthiness, and optimal performance in satisfying user priorities and purposes. Computer based information resources provisioned through connected computing are frequently inaccurately and/or deceptively represented. Information regarding such resources can be laden with false and/or misleading content that is presented by ill-intentioned, mis-identified, and/or insufficiently competent persons and/or their respective agent computing arrangements/organizations. Such resources representative information is often substantively inadequate and may be effectively inaccessible to the non-expert. This prevents computing users/parties from realizing the most advantageous results from their computing activities and exposes users/parties to false, misleading, and/or malicious resource contents.

Modern computing lacks a user informing framework that enables assessment of the suitability, including consequences of use, of connected computing resource and activity opportunities. Such a framework's user tools need to support resource related basic information considerations, such as how to efficiently/easily find and assess resources, such finding and assessing including how to readily acquire information that supports judging the reliability and background of resource characterizing information and such resources' relative suitability/usefulness.

The inventive framework described in this specification provides a connected computing foundation that securely supports, without limitation and in some embodiments:

1. truly rigorous resource, and associated event/activity, identification information authenticity in part by employing the use of near existential quality, and/or existential quality, resource associated one or more persons' biometrically based identification information, such information provided through the use of highly mobile, tamper and inspection resistant, secure information carrying arrangements that ensure trustworthy and ubiquitously available identification information for event/activity governance.
2. resource suitability-to-user-purpose informing attributes, where such attributes are presented, at least in part, using quantized quality to user purpose assertions, and highly secure, rule-based testable/verifiable stipulated facts.
3. attribute(s) of attributes of respective resources and/or event activities, where such attributes of attributes may be significantly informing regarding such resources' and/or events'/activities' trustworthiness and/or other suitability. For example, the inventive framework can provide highly reliable attributes of attributes of resources, where attributes of resources can comprise their creators, providers, publishers, participants, and/or the like. In such an example, attributes of such persons can provide essential informing information regarding such persons' respective associated resources, that is, regarding the suitability (e.g., trustworthiness and/or usefulness) of any such resource for a user's purpose(s). Such attributes (e.g., for resource certifiers) can provide person authenticity information (e.g., using biometric identification) and/or competence (e.g., expertise), and/or reveal information regarding the suitability, for respective user interests, of such persons' motives/trustworthiness.
4. resource, and, as relevant, associated event/activity, relevant provenance identification information that can show antecedent associated participating device, service, and/or biometrically identifying human historically relevant provenance information.

Today's connected computing platform can be considered an "advanced" first-generation environment. It has proven to be very empowering/productive, but it is in many respects quite primitive, since today's computing environment fails to provide an identification information resource and event/activity consistent and distributed infrastructure, and further fails to provide formal contextual purpose computing capabilities.

Today's connected computing lacks a general purpose, category independent, standardized and interoperably interpretable, highly secure, identity-based, and user purpose fulfillment optimizing, computing framework. The embodiments discussed in this specification can transform the ability of computer users to reliably evaluate/understand the suitability, including trustworthiness, of network-based computing resources and events/activities; this can result in substantial improvements in associated computer related cybersecurity, rights governance, and overall user quality of work and productivity.

There has been, until recently, no, or at least not identifiable, attention paid to creating systems that are existentially reliable biometric identification, and attribute, based, resource and event/activity suitability frameworks. More specifically, no system, available or proposed, employs (a) nearly existential or existential quality biometrically based identification to support contextually practical and fundamentally reliable resource identification, (b) an attribute-based, computing resource and event/activity subject matter suitability, and participant rights management, framework, and (c) a highly mobile, very low friction, situationally adaptive, and, for example, contextually or always available, subject matter (resource and/or event/activity) identification information environment. Such an identity environment comprises a cost-effective, highly mobile, smart device compliant, existential quality, biometrically based, human and other resource identification information infrastructure. Such an infrastructure can, in certain embodiments, employ standardized quality to purpose, effective fact (stipulated and verifiable fact), and purpose expression, suitability attributes that are securely associated with computing resource and/or event/activity instances.

Such an association framework can enable a highly flexible and contextually adaptive suitability and rights management computing infrastructure. The absence of the combination of human stakeholder near existential or existential quality identifying information with standardized and interoperably interpretable stakeholder attribute information sets is a critical shortcoming in today's connected computing resource cosmos. Such attribute information sets, securely bound to assiduously reliable resource and/or event/activity identifying information sets, can substantially improve computing productivity and security, and the absence of such an infrastructure represents a critical set of shortcomings in modern computing's ability to:

(a) defend against malicious and otherwise inappropriate cyber behavior, such as computer hacking, impersonation, faking and otherwise manipulating news, science, and facts, counterfeiting by mislabeling, and failure to observe or enforce stakeholder and user rights, and
(b) provide systems for identification of resource and event/activity instances that are optimally appropriate, that is, most effective for, and/or otherwise appropriate to, user purposes and interests.

The current specification describes resource and associated event/activity information governance and suitability computing based systems, for example, for secure and reliable: social and commercial networking and communication, supply and other value chain management, information quality and integrity evaluation (and integrity assurance including identifying/evaluating fake facts/news), digital currency value storage and transactions, digital object certification and integrity maintenance, digital object and event/activity auditing (e.g., using EBIBlockChains and/or other provenance systems), and/or identification of resources optimally useful and/or otherwise suitable to user respective purposes.

For example, important areas in which EBInet embodiments discussed herein can substantially improve computing include:

Cybersecurity, including use of existential biometrically based identification information bound to standardized expressions of suitability-informing-attributes. Such binding informs regarding, and may thwart or otherwise prevent, cybersecurity threats and events, such as identifying and/or avoiding/disabling/rejecting malware, the foregoing based on informing regarding resource cybersecurity considerations. For example, cybersecurity governance can, at least in part, be based on resource, resource provenance, and/or resource related persons' (e.g., resource stakeholders') respective attributes (e.g., attributes of owners, creators, providers, and/or publishers of respective resource instances) that inform regarding trustworthiness, expertise, employment, accomplishments, memberships, certifications, publications, and/or other attributes considered as cybersecurity relevant;

Inter-person and/or organization enhancement of communication security, communication related source-identification, and source-identification related usage governance, through, for example, informing regarding communication sending persons' respective motives, competence, and/or other appropriateness considerations. Such informing can employ securely binding of a sender person's existential biometric quality identifying information to one or more effective fact stipulations. For example, a bank can stipulate, in an identification information set that is securely testable/verifiable, that an email apparently sent by such bank was authentically sent by a person whom the bank stipulates is an employee authorized to send such an email. Such person proves that he/she is a sending person by providing in such securely bound information set a contemporaneous, and/or operatively simultaneously acquired, near existential, or existential, quality person, and bank, identification information set, (and where such bank's identity may itself be identified/certified by a bank CertPer);

Social and commercial networking, including infallibly identifying participating persons (e.g., providing suitability informing attribute information) involved in anticipated, and/or ongoing, connected computing activities. Such identifying is enabled by providing near existential and/or existential quality identification of one or more participating persons and respective such persons' attributes, such as age, membership, employment, location, and/or the like effective fact stipulated information;

Supply, value, and other commercial/societal/social chain monitoring and governance, including highly trustworthy and informative product distribution management, blockchain digital currency (e.g., EBICoins), and other chain of handling and control implementations;

Authenticity/reliability demonstrations, such as certifications, of REAIs (resource and/or event/activity instances) using human (CertPer) near existential and/or existential quality identification and/or associated certifying persons' relevant verifiable other attributes (e.g., non-biometric). Demonstrating such authenticity/reliability enables, for example, highly reliable Internet of Things (IoT) governance and auditing. Such governance and auditing can include identifying device arrangement authenticity/integrity through, at least in part, use of near existential and/or existential, quality identification of REAI stakeholder and/or other—such as certifying CertPer—person(s);

Digital rights management for REAIs, ensuring that events/activities are managed in accordance with rights securely associated with near existential and/or existential quality, biometrically identified REAI related persons (e.g., REAI users, owners, and/or participants), where such rights management may at least in part be managed in response to such persons' respective, verifiable one or more non-biometric attributes (such as effective facts and/or creds). Digital rights can, for example, be enforced by securely associating REAI rules and controls with (a) stakeholder persons' near existential or existential quality biometrically based identification information, and (b) stakeholder persons' identification information non-biometric attributes, forming REAI identification information corresponding rules and controls sets; and Digital currency management and auditing, including theft and fraud prevention, resulting from use of nearly existential and/or existential quality biometric identification of currency ownership, and transaction participating, persons/parties, where use may further include using one or more of such persons'/parties' non-biometric, verifiable effective fact and/or cred attributes. An EBInet digital currency arrangement employs EBICoins that stipulate the current owner parties for respective digital coins, such ownership stipulated at least in part using such biometric identification. EBICoins can contain and/or securely reference their respective digital coins and such stipulation of ownership of digital coins can prevent digital coin theft and fraudulent transactions. Such theft and fraudulent transaction prevention is enabled through the use of owner nearly existential and/or existential quality biometric identification information sets being respectively securely bound to their owned, corresponding digital coin set. Using an EBICoin, an underlying (securely contained and/or otherwise securely referenced) digital coin set can be identified using (a) such digital coin's unique identifier and its issuer's (e.g., issuer's biometrically certifying person's (a CertPer's)) at least in part nearly existential and/or existential quality information instances, and (b) such digital coin's current owner's at least in part nearly existential or existential quality information instance. In some embodiments, an EBInet arrangement digital currency, such as EBICoins, can be mined, issued, audited, and/or governed at least in part using blockchain arrangements (e.g., EBIBlockChains).

Given the nature of the emerging cyber world, the greatest threats to computing arrangement users are unrecognized bad actors' malicious intents, where malicious manipulations of computing resources produce damaging consequences and where connected computing users are unable to efficiently or reliably evaluate the suitability of resource and/or event/activity instances (such as suitability of information, suitability of one or more associated/participating persons, and/or suitability of computing processes). In particular, today's computing environments fail to provide existentially reliable identification recognition tools in practical, cost-effective, and user-friendly forms. Further, today's computing environments are vulnerable to spoofing, enabling identity substitutions and other malicious masquerading. The absence of practical, highly trustworthy, and cost-effective information tools regarding identified computing activity persons, and/or persons' respective resources and/or attributes, can allow false identity attribute representations, wherein such representations inappropriately appear suitable in context, such as suitable to a user's purpose. Today's systems are simply inadequate for the purpose of providing sufficiently informing information sets regarding computing activity related participant motives and/or competence.

This specification describes the use of computing resource associated persons' (e.g., stakeholders', users', certifying persons') respective at least in part securely managed (a) near existential and/or existential quality, biometrically based identification information, and (b) associated persons' respective characterizing non-biometric attribute information, to at least in part enable identification, evaluation, selection, auditing, authorization, provisioning, governance of use of, and/or communication with, computing resources and/or computing event/activity instances. Such specified systems and methods combine resource stakeholder, user, and/or certifying person (CertPer) assiduously acquired, biometrically based identifiers, with such identifiers' respective associated suitability informing attributes, to form identification information sets (IISs) that inform regarding computing resources and events/activities. Such IISs may be configured and used as identification information tokens (IITs) for computing resource, and/or event/activity, instances, and may further comprise, for example, respective IIS certificates (existential biometric identification certificates (EBICerts)) when they include encryption key information.

Today's connected computing fails to provide incontrovertible and meaningful recognition of the identity of connected computing participating, candidate for participating, and/or otherwise associated, resource and/or event/activity related persons. Current connected computing implementations are subject to malicious human identification information substitution, and inaccurate and insufficiently informative human attribute characterization. An EBInet (an "existential biometric identification information network") embodiment as described herein, combines incontrovertible biometric recognition with innovative forms of person identification attribute information (e.g., testable effective facts, and quality to purpose assertions) to address significant connected computing problems. These problems are associated with identifying/understanding the suitability (based on, for example, trustworthiness, risk, productivity, capability/competence) of computing resources (e.g., devices, software, people), and/or user participation in computing events/activities.

EBInet connected computing embodiments address today's computing infrastructure's failure to reliably, incontrovertibly identify persons who have responsibility for (e.g., own, control, and/or use), or assume responsibility for (e.g., certify), resources and/or events/activities accessed through connected computing. Using EBInet device arrangements and services, such resources and/or events/activities can be effectively identified and/or evaluated for computing use/interaction/participation suitability, such identification and/or evaluation based at least in part upon the attributes of resource and/or event/activity related persons.

Today's connected computing is flawed in basic ways. It doesn't sufficiently address various pressing resource and event/activity effectiveness, efficiency, integrity, and trustworthiness/truthfulness challenges. EBInet supports unambiguous identification discrimination between human individuals, and can often provide, individually and/or in combination, highly reliable and unambiguous representation of such individuals' respective contextually significant attributes. Such attributes can comprise identification information informing regarding suitability for users' purposes. Such information enables evaluation of resources and/or events/activities at least in part through evaluation of resources' and/or events'/activities' respective associated humans' appropriateness to a user purpose, where, for example, such information may inform regarding resource authenticity/trustworthiness/security, efficiency, productivity, associated rights, and/or the like considerations.

Connected computing suffers from the absence of characterizing information regarding human attributes, where such information informs regarding the suitability of respective resources and events/activities (including where persons are resources and/or REAI creators/providers/certifiers/attestors/participants). Without accurate human identification in forms particularly adapted to discerning a human's or human associated resource's suitability to a user's purpose, it is often not feasible to reliably assess human motives, competence, and other suitability factors regarding usage of, and/or participation in, computing resource and event/activity instance sets. At its root, connected computing depends upon humans as resources and/or as resource stakeholders (as, for example, creators, providers, modifiers, owners/users, certifiers), and/or as event/activity participants.

Today's computing arrangements do not provide adequate, reliable suitability/optimality information for informing regarding (a) computing resource use, and/or (b) person event/activity related participation. In particular, today's computing environments do not provide sufficiently reliable REAI related human specific identifiers, nor do they provide, for many circumstances, sufficiently reliable human identity associated and standardized suitability/optimality informing attribute information. Creating systems that can provide such information enables assessment of humans and/or their associated (a) resources, and/or (b) events/activities, through assessment of, for example, respective such humans' and/or resources' intentions, appropriateness, competence/capability, authenticity, and/or digital rights.

In many embodiments, EBInet supports a new, standardized form of resource identification infrastructure that presents (enables the representation of) resource/person identification information fused identities comprising (a) object content instances, and/or their respective identifiers (such objects comprising, for example, documents, devices, services, web sites, persons, other objects/entities, and/or their respective unique identifiers), with (b) subject matter persons' (e.g., SubPers') and/or certifying persons' (e.g., CertPers'), at least in part near existential or existential quality biometrically based identification information. Such fusing of a subject matter SubPer's, and/or certifying CertPer's, at least in part identification information with object content instances and/or identifiers provides information regarding one or more persons who certify, authenticate, and/or provide suitability informing REAI identification information attributes. Such persons can assume direct (CertPers) and/or implied (SubPers) responsibility for an REAI by users treating such persons' respective at least in part biometrically based identification information subject matter and/or certifying information as information that's used to "stand behind" such persons' respective resource and/or event activity instances. IIS users, for example, may use such information to authenticate, govern, and/or inform for REAI suitability determination in response to attributes of owners and/or certifiers, for example, use such information in governing event/activity instances.

To ensure informed and reliable identification information of REAI instances, EBInet embodiments can employ nearly existential and/or existential quality, at least in part biometrically based, contemporaneously acquired identification information that, for example, can be acquired at a biometric identification acquisition and forwarding "station", for example in an individual's home in the morning, and then "carried" in a mobile device arrangement by such identified individual, for subsequent, contemporaneous use. Such a carrying arrangement can serve as an identification information arrangement that provides/makes available, for example, a CertPer or SubPer resource object composite identification information set that includes at least in part existential (and/or nearly existential) quality biometric identification information of a certifier/attester/owner/user person and such person's securely associated resource and/or event/activity identification information. Such contemporaneous and carried nearly existential and/or existential quality identification information can be pervasively available for use, for example, by broadcast, and/or available in response to request from another EBInet compliant arrangement, as contextually appropriate. Such an EBInet contemporaneous identification information environment improves computing security and reliability by providing a very easy to use (use can be transparent/automated), cost-effective infrastructure. Such an infrastructure can provide existential identification information using biometric identification acquisition one or more stations and obviates the need for existential acquisition arrangements integrated into, for example, each and every biometric identification information using device arrangement, e.g., mobile phones, tablets, laptops, and other computing arrangements.

With EBInet, human identification information comprising assiduously reliable identifying of persons is combined with standardized and interoperably interpretable characterization of such humans' respective intents/motives, competence, background, expertise, interests, and/or other suitability informing personal details. Such an identification information framework is used to produce informative, and frequently vital, input regarding the suitability to user purpose of computing resources and/or events/activities. Such association can provide critical information informing regarding the effectiveness and other suitability considerations of such REAIs, for example, information regarding threats embedded in, and/or otherwise associated with, computing resources and/or processes.

EBInet arrangements can include fused identity (REAI instance uniquely identified, and human irrefutably biometrically identified, instances that are securely bound together as fused subject matters) composite identification information sets (CIISs, IISs that have composite, fused subject matters that include human (SubPers), and associated non-human, subject matter components). To date, human identity, as associated with computing resources and processes (e.g., events/activities), is not available as interoperably interpretable expression, person characterizing (e.g., non-biometric), standardized attribute information sets securely bound to at least in part near existential or existential quality biometric identification information, such identification information sets used, for example, in computer resource and/or event/activity identification, authentication, selection, auditing, authorization, and management. Simply put, there is currently no connected computing standardized and interoperably interpretable resource identification information infrastructure that securely associates (e.g., cryptographically binds and protects) assiduously reliable identifying information of persons with such persons' respective securely maintained identity related attributes. Providing an EBInet infrastructure, as described herein, can inform computer users regarding the suitability of REAIs; for example, an REAI would not be suitable if such an REAI presented a threat to user interests, or if the creator of the REAI had questionable or inadequate competence/expertise, or if a person lacked the right (e.g., expressed as a testable effective fact) to participate in a commercial or social networking arrangement.

In some embodiments, IISs may respectively include interoperably interpretable standardized specifications/expressions of user and/or stakeholder purposes, where each such expression of purpose associated with an REAI has an associated asserted quantized value expressing the relative value of such an REAI in fulfilling such specified/expressed purpose (e.g., expressed as a Cred). Such IISs may further or alternatively include testable/verifiable interoperably interpretable expressions of one or more facts associated with respective such REAIs, and/or may include other REAI characterizing attributes. The respective at least in part biometrically based identifiers of IISs, and their identifier securely associated attributes, can be, for example, used to reliably and efficiently locate and assess resources, including, for example, determining the suitability of using one or more such resources to fulfill user respective purposes. Resources and events/activities are frequently sourced from an extraordinarily large resource and event/activity cosmos that, in many circumstances, has no consistent and manageable organizational/informational infrastructure for identifying and evaluating the hugely diverse work product of independently operating resource publishers and event/activity managers and/or participants. EBInet IIS information implementations provide a framework for efficient user purpose associated resource and/or event/activity identifying, filtering, evaluating, and selecting. With an EBInet framework, the implications of REAI use may be evaluated from the standpoint of respective REAI stakeholder creator, publisher, provider and/or participant competence, background, and/or motive.

Biometric recognition of REAI stakeholder and user persons and the secure (e.g., cryptographic) binding of biometrically based identification information with associated respective such persons' characterizing attributes, and the further binding of such information sets to respective REAIs as described in this specification, can enable important improvements in the trustworthiness of REAIs and their relevance and suitability in user purpose fulfillment. Such biometric recognition and liveness testing, when performed employing nearly existential or existential recognition, and employed as described in embodiments in this specification, can ensure convenient, cost-effective stakeholder and user REAI identification and evaluation, resolving many of the inadequacies inherent in working with a boundless, relatively inchoate resource cosmos.

It is not, with known technology, technically nor financially practical to broadly, repeatedly implement existentially reliable biometric identification capabilities within highly mobile device types such as smartphones, tablets, smartwatches, smart bracelets, smart pendants, and/or the like. Nor is it sufficiently user friendly, nor financially and/or operationally practical to incorporate such existentially reliable capabilities redundantly in various non-mobile computer and computer managed arrangements, for example, incorporated in each of a user's, and/or such user's one or more groups', respective computing managed arrangements, such as (a) desktop computers, (b) IoT instances, and/or (c) manufacturing, supply, and/or value chain, and/or other group, shared computer managed arrangements.

In some embodiments, the present specification's existential biometric identity network provides at least in part biometrically based human person identification arrangements employing near-existential and/or existential quality biometric identification information acquisition arrangements that communicate with associated receiving, carrying, using, and forwarding (RCUFD) other biometric identification information device arrangements. Such RCUFDs receive and carry highly reliable biometric identification information; they function as mobile identification wallet arrangements, supplying identification information to network or otherwise connected computing arrangements for event/activity governance.

Human intents/motives are at the root of human conduct, and since the beginning of our species, human safety and trust were substantially built upon knowledge regarding the motives and/or intentions of "other" human actors. Unfortunately, modern computing resource and event related technologies normally fail to reliably, specifically inform regarding the identity, and trustworthiness, rights, motives, and/or other suitability aspects, of human computing activity participants, e.g., those human parties involved in the creation, handling, and/or modification of computing, and computing managed, resources, and/or who participate in, or are otherwise directly associated with, human computing events/activities. Reputational and factual attributes regarding such computing activity related participants (identified by near existential or existential quality biometrics) can be essential in determining whether such participants, and/or their respective resources and/or events/activities, are authorized for, and/or are trustworthy for, and/or otherwise compliant with/suitable for, user, stakeholder, and/or other resource and/or event/activity purposes and/or policies, including REAI rights management.

The foundation of human trust is based almost entirely on recognizing human intent and/or competence. Confidence in REAI suitability relies on the human ability to recognize specific to given humans, associated attributes informing regarding intent, trustworthiness, and competence, generally and/or situationally/contextually. Given the importance of reliably identifying information regarding who is "behind", or "stands behind", a resource and/or event/activity set instance (e.g., an REA instance that a user wants to use or consider using, and/or wants to interact with), EBInet provides practical and cost effective identification information acquisition, carrying, receiving, using, and forwarding device arrangements and information sets that support nearly existential and/or existential recognition of, and use of, instance associated relevant one or more persons' identifying information.

Today's computing environment's effectiveness is severely hampered by its unreliable, and insufficiently informing, resource and event/activity identification information arrangements. For example, today's computing systems:

1. do not securely acquire, maintain, and provide existentially (or near-existentially) reliable identification of computing REAI stakeholders and/or users (including, for example, event/activity participants) and, for example, do not securely provide standardized and interoperably interpretable at least in part such biometrically based identification (with liveness analysis) of such instances' associated persons;
2. do not comprise secure human identification information receiving and forwarding mobile device arrangements that receive from acquisition and forwarding identification device arrangements at least in part nearly existentially, or existentially, reliable at least in part near existential or existential quality biometrically based and contemporaneously acquired stakeholder and/or user identification information. By contrast, EBInet receiving and forwarding mobile device arrangements can securely carry, and can transparently and contextually provide, such identification information. Such identification information can be received and used by an EBInet arrangement's standards compliant device and/or service arrangements;
3. do not securely bind at least in part biometrically based identifiers of such stakeholders and/or users (SubPers), and/or certifiers (CertPers), to respective:
   a. at least in part standardized and interoperably interpretable subject matter REAIs' non-person unique identifiers, and identification attribute information, including, for example, instances' respective standardized and interoperably interpretable quality to purpose and/or other assertions, testable/verifiable effective facts, contextual purpose expressions, and/or rules and controls policy (e.g., rights management) information, and/or
   b. at least in part standardized and interoperably interpretable REAIs' stakeholders' and/or users' and/or certifiers' attributes (i.e., attributes of one or more of such REAIs' respective stakeholder and/or user (SubPer), and/or certifier (CertPer), persons), such as attributes regarding characterizing attributes of such stakeholders and/or users, and/or certifiers, e.g., respective quality to purpose and/or other assertions, testable/verifiable effective facts, associated contextual purpose expressions, and/or rules and controls policy (e.g., parties' and/or individuals' rights governance) related information.
4. do not securely and reliably provide standardized identification information architecture embodiments for exceptionally large and diverse resource arrays, such as described in this specification. EBInet embodiments can enable computer arrangement resource and/or event/activity instances' respective stakeholders and/or their agents and/or other parties and/or their respective work products and/or associated processes and/or events/activities, to be reliably evaluated for:
   a. suitability, e.g., trustworthiness and/or effectiveness, as regards to, and/or
   b. rights and/or other authorizations for fulfilling, users' respective connected computing commercial, societal, and/or social requests and/or purposes.

Given the inherent unreliability of identifiers pertinent to remotely sourced resource and event/activity instances, and, given the absence of relevant, trustworthy, and interoperably interpretable resource and event/activity instance identifying/characterizing attributes and attribute based computing management, connected computing can be highly inefficient, frequently provides suboptimal results, and is, inherent in its lack of an organizing suitability to purpose framework, vulnerable to cyber security threats, and identity misrepresentations and misevaluations.

EBInet platforms and component sets represent, in part, the formulation of new types of computer resource at least in part biometrically based identification information sets for REAIs, where such information sets each may comprise a secure combination (e.g., binding) of, for example, One or more near-existentially and/or existentially reliable, at least in part biometrically based stakeholder (e.g., SubPer), user, and/or certifier (e.g., CertPer) person identification information sets, where human identifiers are either very highly reliably, or indisputably, accurate (e.g., attained using nearly existentially, or existentially, accurate, biometric identity acquisition forwarding device arrangements (AFDs)), with:

(a) One or more secure times and/or dates, wherein time start, stop, period, duration, and/or other formulations provide securely maintained (communicated and/or stored) time and/or date information instances for respective REAI related events, such as the time of IIS creation. A time information instance (e.g., information instance that is time stamped) can include, for example, securely generated/provided time of acquisition of biometric identification information, where, for example, such secure time of acquisition information can include time of applicable emitter emission of electromagnetic and/or sonic signals, and/or time of corresponding sensor arrangement receipt of biometric data, (b) One or more secure representations of location (e.g., of composite device/person carried arrangement), such as securely triangulating and/or otherwise locating such an arrangement using cellular tower(s)' location(s)' information, identified Wi-Fi one or more instances, GPS location acquiring implementations, and/or location correlations based at least in part on biometrically based identities of respective one or more parties (e.g., based on respective individuals and/or other parties being associated with known, for example, persons' respective registered locations of employment (e.g., stipulated as verifiable effective facts), and/or the like), (c) One or more unique identifiers for non-human one or more subject matters of resource and/or event/activity instances' IISs and may further include one or more unique identifiers for subject matter portions of respective such IISs, (d) One or more identification information set unique identifiers, which may be at least in part comprised of, or otherwise employ information with/from, respective such non-human subject matter unique identifiers, and/or (e) One or more standardized and interoperably interpretable resources' (including one or more persons'), and/or event/activity instances', purpose specifications characterizing:

a. An REAI subject matter and/or subject matter instance's attribute that specifies such an instance's associated usage purpose, such as a PERCos CPE, and b. One or more at least in part standardized REAI subject matter, and/or subject matter human stakeholder and/or user, purposeful computing informing attributes such as a PERCos QtP that asserts an REAI purposeful computing value, and/or a verifiable, stipulated effective fact.

In some embodiments, EBInet environments employ at least two forms of secure identification information processing units (IIPUs), such IIPUs comprising highly secure, tamper resistant hardware protected processing environments that may be respectively provided in the form of hardened modular component (or subcomponent) arrangements. In some embodiments, such IIPUs comprise embedded component arrangements that either operate within EBInet standalone devices, or are embedded in parent (e.g., host) device arrangements (e.g., mobile computing devices such as mobile phones, where such mobile devices can provide, for example, power, storage space, convenient mobile packaging, and/or other complementary capabilities). Such modular component IIPU arrangements can comprise several variations, such as root of identity acquisition IIPUs (RIIPUs) used at least in part to acquire near existential and/or existential quality biometric identification information, and network identification information management IIPUs (NIIPUs), that can receive, process, carry, forward, and at least in part manage the availability and/or use of, a person's, or person/device's fused identity composite, identification information sets. IIPUs are designed to a very high standard to be tamper and inspection resistant, and provide secure processing, memory, and cryptographic functions, and such functions may be implemented to operate independently from other computer processing arrangements, such as those found in a NIIPU's parent smart device. IIPUs are designed to acquire and/or receive nearly existential and/or existential quality biometrically based identification information, and may further securely receive and process other person characterizing attribute information such as effective facts and creds. IIPU component integrity can be maintained by supporting only IIPU minimal to identification information purposes' software functions to provide a minimized attack surface. Further, in some embodiments, EBInet IIPUs may employ dedicated to IIPU display arrangements comprising a dedicated, or binary switchable portion of a, display arrangement, such as a dedicated portion of a user's parent mobile phone screen, and such IIPUs may, at least in part, receive user instructions provided through use of respective trusted path arrangements.

In some embodiments, RIIPUs are at least in part highly secure, isolated and tamper resistant, nearly existentially or existentially reliable biometric identity acquisition units. RIIPUs function, at least in part, as one or more constituent components of respective acquiring and forwarding device (AFD) arrangements. RIIPUs acquire biometric data (e.g., to produce pattern and/or other information) to support determining and generating humans' respective unique biometric identifiers. RIIPUs are modular component arrangements that can be employed, at least in part, in the acquisition of contemporaneous (for subsequent usage), nearly existential or existential quality biometric identity information using such RIIPUs' respective sensor arrangements. Each such RIIPU may at least in part control an AFD electromagnetic and/or sonic (e.g., ultrasound) emitter arrangement. Such biometrically acquired human specific identification information can be used to supply time contemporaneous (as discussed herein) human biometrically based identification information for use, for example, in at least part contemporaneous, identification information sets. Such EBInet humans' respective identification information instances are at least in part based on such nearly existentially and/or existentially reliable biometric acquisition processes.

In some embodiments, RIIPU parent devices may employ one or more frequently used, for example used on a regular daily basis, smart mobile device charging and/or other docking arrangements (e.g., a RIIPU embedded in a smartphone's and/or other mobile device's AC adapter and/or other appliance docking arrangement), and/or in some embodiments a RIIPU may be packaged within an AFD external standalone device arrangement. RIIPUs provide extremely reliable nearly existential and/or existential quality at least in part biometrically based, human specific identification information sets using secure, isolated from non-RIIPU processes, respective protected processing environments (PPEs), such PPEs performing human specific identification and liveness/presence determination. RIIPUs can be embedded in, and/or otherwise connected to, computing and/or other appliance arrangements. RIIPUs can function as root of identity near existential and/or existential quality biometric acquisition arrangements that produce at least in part biometrically based identification information that "anchors", that is provides nearly existential or existential, person specific identity information for, identification information sets that characterize/identify resource and/or event/activity instances. Such anchor information sets are securely bound, within a RIIPU, NIIIPU, and/or EBInet service arrangement, to attribute information that describes their respective resource and/or event/activity instances. Such root IIPU device arrangements, in some embodiments, can forward at least in part biometrically based identification information to other EBInet device and/or service arrangements, where such other device and/or service arrangements may, at least in part, perform highly secure EBInet identity management functions but where such other EBInet device and/or service arrangement does not acquire, for example, nearly existential or existential, root, person specific, raw biometric identifying information. Such RIIPU at least in part biometrically based data sets can be acquired and processed in such sets' respective highly secure, isolated processing, tamper and inspection resistant, resource and/or event activity instance identification information acquisition arrangements. Such arrangements may further formulate, evaluate, forward, receive, and/or manage/process such sets using isolated processing performed in compliant IIPU arrangements.

Root IIPUs (RIIPUs) are, in various embodiments, used in conjunction with NIIPUs, where such NIIPUs may comprise highly secure, isolated processing, tamper and inspection resistant, low cost and energy efficient, modular component identification information receiving, carrying, using, and forwarding, component arrangements. In contrast with RIIPUs, NIIPUs do not use their own nearly existential or existential quality respective sensor biometric arrangements for acquiring at least in part biometrically based person identification information. NIIPU arrangements normally perform receiving, carrying, using (e.g., publishing and/or event/activity authorizing), evaluating, and/or forwarding of contemporaneous, AFD acquired, at least in part biometrically based, one or more humans' identity information sets, e.g., acquired at least in part by AFD RIIPUs and forwarded from such AFDs to embedded RCUFD NIIPUs. Such RCFD NIIPUs can then forward such identity information to EBInet compliant RUD and/or RUS arrangements that use IIS information for event/activity governance (such RUDs and/or RUSs comprising identification information receiving and using EBInet device and/or service arrangements).

In some embodiments, NIIPU arrangements may also perform (and/or receive) biometric identification using parent device and/or network based, sensor acquired, non-existential biometric identification information. EBInet identification information sets are used as identification information for respective resource and/or event/activity instances, and such contemporaneous identification information can "age out", that is become invalid, after a certain secure time clock (e.g., NIIPU secure clock) determined real-time, time period, and/or other securely specified event.

In various embodiments, identification information sets, in addition to having REAI associated humans' biometrically identifying information, can further include other (e.g., securely bound) descriptive attributes of such persons and/or respective REAIs, e.g., such persons' associated REAIs (such attributes comprising, for example, respective quality to purposes and/or testable/verifiable stipulated facts). Such modular component RIIPU and NIIPU arrangements are respectively embedded into, and/or otherwise securely coupled with (such as by wired, wireless, and/or other I/O connection(s)) their respective parent arrangements.

In some embodiments, EBInet at least in part biometrically based identification information sets (IISs) are published to, registered with, and/or otherwise stored by, one or more respective identification information device, platform, cloud, and/or organization, services as uniquely identified identification information sets. Such published, registered and/or otherwise stored sets and/or their identifying information (e.g., identifying hashes), are then respectively made available for later use by IIS using parties and/or EBInet arrangement compliant devices that are at least in part independent of such sets' respective creating, publishing, and/or registering process sets (e.g., persons/devices/services that use a given identification information set but are not creators/publishers). Such process sets (e.g., performed by biometrically authenticated parties) can produce cryptographically protected IISs (e.g., IIS that are at least in part cryptographically hashed and biometrically signed).

Such published, registered, and/or otherwise stored at least in part biometrically based identification information sets are available for secure referencing and use by interested one or more at least in part independent parties. Such publishing may involve, for example, secure publishing to a cloud service and/or other administrative, management, and/or utility service, where such published identification information instances may be securely registered as resource and/or event/activity IISs. Such IISs, characterizing respective resources and/or events/activities, may be securely associated with (e.g., securely bound to) such information sets' respective resource and/or event/activity subject matter instances. Such instances may include, for example, documents, digital currency, computer programs, videos, web pages, digital currency, NFTs, communication instances (e.g., emails, tweets, and/or chat instances), financially based exchange of value transactions, computing/communication interfaces to people and/or other tangible items (such as IoT, user "smart", and/or supply, value, and/or other commercial chain, device arrangements), social networking sessions, metaverse sessions, and/or the like.

In some embodiments, at least in part biometrically based identification information instances may be securely stored within mobile smart parent and/or dedicated identification information devices and carried by, and/or otherwise associated with, respective owners and/or users, where such carried at least in part biometrically based identification information is at least in part nearly existentially or existentially accurate (human person uniquely identifying). Such at least in part biometrically based identification information can be "contemporaneously" used, for example in a friction-free, transparent manner, to securely highly reliably convey (a) such owners' and/or users' person specific identification information as specific person fused biometric and such person's other characterizing identification information sets, and/or based on context, and (b) at least in part real-world-anonymized IISs that securely provide person not specifically identifying (i.e., non-societally characterizing) attributes. Such identification information sets can be respectively employed to authorize, evaluate (including authenticate and/or otherwise validate), identify, select, provision, and/or use computing resource and/or event/activity instances.

EBInet processes can be used for evaluating and/or ensuring the suitability, and/or accessibility (including in some embodiments, for example, authorizing the performance), of respective resource and/or event/activity subject matter instances for user one or more purposes. Such suitability evaluation processes may include, for example, recognizing and/or evaluating, subject matter instance attribute evaluation and/or recognition, including, for example: integrity (e.g., through authentication and/or other validation), trustworthiness (e.g., through attribute evaluation and/or recognition), REAI associated parties' (e.g., user, owner, etc.) respective rights (e.g., for respective event/activity authorizations), provenance information, and/or other germane resource and/or event/activity instance one or more related characteristics.

In some embodiments, EBInet at least in part biometrically based IISs may be at least in part stored on highly secure RIIPU and/or NIIPU modular component arrangements. Such arrangements can comprise hardened tamper and inspection resistant secure modular component arrangements for acquiring, carrying, using, and/or forwarding at least in part near existential and/or existential quality biometric identification information, as well as other relevant subject matter attributes. Such identity modular components are, in some embodiments, respectively packaged as at least in part isolated processing, tamper and inspection resistant, hardware and software arrangements that employ misuse countermeasure techniques.

In some embodiments, there are two general types of EBInet modular components: (a) those that perform more processor intensive biometric acquisition and analysis functions, such as RIIPUs that support AFSD processing requirements, and (b) those that perform what is often less processor intensive identity information and rights management, for example, economical, secure NIIPUs that support arrangements that may have more limited processing requirements, and therefore overhead, for identification information related carrying, forwarding, and/or using functions. In some embodiments, such EBInet modular component types (i.e., RIIPUs and NIIPUs) can populate an EBInet environment. In some embodiments, functions performed by a RIIPU or NIIPU may be performed by a native device component arrangement. For example, an AFSD may use, for example, Apple's Secure Enclave capabilities for supporting secure (e.g., tamper resistant) biometric and/or other identification information functions.

In some embodiments, AFSDs (e.g., using their RIIPUs) can require more powerful processing capabilities than NIIPUs, for example, for anomaly analysis, supporting pattern and/or statistical analysis functions, filtering algorithms, and/or more complex dynamic memory encryption requirements for maintaining information security. In contrast, the broadly distributed modular components in mobile and IoT and the like devices may have simpler, identity management functions that are performed using less expensive, less complex identity processing NIIPU arrangements.

In some embodiments, such isolated, secure modular component hardware arrangements (respectively comprising, for example, NIIPUs and/or RIIPUs) may be respectively embedded, or inserted, in mobile "parent" (host) smart devices, such as smartphones, laptops, tablets, smart watches, and/or identification wrist bracelets, and/or pins/brooches. Such modular component arrangements at least in part enable the use of highly secure and reliable at least in part biometrically based smart device user, and/or owner, and/or other stakeholder (e.g., SubPer, (subject matter person) and/or CertPer (certifying person), identification information. Such modular component arrangements can enable the processing and use of such at least in part biometrically based identification information sets. Further, such information can be published and securely associated with resource and/or event/activity instances.

Such modular components may be included within or comprise secure protected processing environments, such as hardened PERCos Identity Firewalls and/or Awareness Managers, where such Identity Firewalls and/or Awareness Managers may comprise AFDs and/or RCFDs, as discussed herein. Such IFs and AMs can be respectively employed in secure identity related event/activity governance operations using, for example, such at least in part biometrically based identification information. Such identification information may include securely associated one or more securely maintained and securely verifiable facts (e.g., one or more digitally expressed rights, identified persons' respective addresses, educational and/or professional certificates/degrees, employers and/or employment positions, countries of residence, ages, genders, and/or the like, for example, stipulated in the form of PERCos Effective Facts) and/or other stipulated attributes. Such facts may be validated using facts' respective secure test methods (e.g., standardized and interoperably interpretable test methods). Such identification information may also include assertions that are expressed in standardized and interoperably interpretable quantized form (e.g., numeric, binary (yes/no), and/or the like discrete value expression), where such expressions assert one or more qualities associated with at least in part nearly existential, or existential, quality biometrically identified respective persons regarding one or more specified purposes. In some embodiments, both such assertions and facts may be incorporated within and/or otherwise securely bound to, for example, a receiving, carrying, and forwarding device (RCFD or other applicable RD) arrangement's owner's and/or user's at least in part carried, and contemporaneously acquired, biometrically based identification information one or more sets. Such modular components may include any set of NIIPU and/or RIIPU feature sets, and for example, may comprise one or more security hardened identity firewalls and/or awareness managers. In some embodiments, such secure component hardware arrangements can support very low effort and/or transparent (e.g., low user friction or frictionless, depending on context) mobile device provisioning of at least in part contemporaneously acquired (recently acquired, and previous to use, versus operatively simultaneous to use), at least in part biometrically based, devices' respective owners', other stakeholders', users', and/or certifiers' identification information.

In some embodiments, parent devices host isolated processing EBInet modular component device arrangements that may respectively employ embedded modular component tamper resistant, isolated hardware and software processing arrangements. Such modular component arrangements constitute highly rigorous RCFD (receiving, carrying, using, and forwarding device) arrangements that can employ contemporaneous at least in part near-existential and/or existential quality person identifying at least in part biometrically based identification information. EBInet parent device arrangements, such as mobile smart phones, may have native biometric arrangements that employ less rigorous than near existential or existential quality identification EBInet device arrangements. Biometric recognition performed by, for example, an EBInet RIIPU modular component arrangement, may, for example, employ electromagnetic biometric recognition using fingerprint, finger and/or wrist and/or palm and/or hand blood vessel structure and/or composition, face and/or facial component ID, and/or 3D ultrasonic (ultrasound) recognition techniques for body components, that may respectively support, for example, heart rate, blood flow dynamics, and/or impedance, liveness detection, and where liveness detection information can be securely, inextricably associated with person uniquely identifying biometric data acquired using such techniques. Such biometric identification arrangements can support masquerade resistance, where, for example, electromagnetic signal timing anomaly analysis and/or 3D ultrasonic techniques are resistant to photo based, mold of fingertip, and/or similar spoofing approaches, and where timing anomaly analysis techniques may be employed for liveness detection as described herein, and such techniques may employ one or more of spatial, temporal, and/or spectral (e.g., wavelength) analysis, the foregoing to counter, at least in part, virtual/augmented reality, and/or highly sophisticated, for example, prosthetic based (e.g., face, fingerprint), masquerading/spoofing attempts.

In some embodiments, certain EBInet device arrangements may support a host device, EBInet compliant, virtual ACFD (virtual acquiring, carrying, and forwarding device) arrangement that uses less rigorous, non-near existential or non-existential quality biometric identification capabilities, such as non-existentially rigorous device native sensor arrangements, to produce contemporaneous, at least in part biometrically based, identification information sets. Such EBInet compliant acquiring, carrying, and forwarding virtual arrangement (e.g., operating on a conventional smart phone) produces at least in part biometrically based identification information sets that are less rigorous than near existential or existential quality EBInet biometrically acquired/based identification information sets.

In some embodiments, because of commercial and related practical product constraints, biometric identification arrangements, such as found on today's smartphones and other mobile devices, lack highly rigorous performance due to complex design and market suitable cost, and packaging (e.g., size and/or configuration), considerations. As a result, such devices fail to produce near existential or existential quality biometric identification results.

In some embodiments herein, such mobile device biometric identification arrangements can be used to acquire and then communicate today's devices' less rigorous results to user respective, isolated processing, highly tamper and inspection resistant, EBInet modular component RCFD, RUD, and/or RUS compliant arrangements. Such arrangements can employ such communicated biometric identification information as at least in part biometrically based identification information second factor input for REAI authentication and/or governance, managed by, for example, EBInet modular component, e.g., NIIPU, arrangements.

In some embodiments, EBInet modular component arrangements enable identification information governance and/or purpose suitability determination in distributed connected device environments/networks that at least in part comprise IoT arrangements. Such arrangements include, for example depending on context (e.g., mobile or stationary), RUD components integrated into security and/or lighting and/or heating (thermostat controlled) systems, refrigerators (and/or ovens and/or phone systems), and/or other household and/or work appliances, and/or other home and/or office/work devices, vehicles and/or components thereof, manufacturing devices, drones, and/or commercial chain of handling and distribution arrangements (e.g., supply chain shipping containers), and/or the like. Such distributed environments respectively employ tamper resistant/security hardened identification information processing unit (IIPU) components that provide standardized, highly trustworthy rights and consequence managed, distributed, secure, at least in part biometrically based, identification information operating environments.

In some embodiments, using EBInet modular component hardware arrangements supports secure, isolated processing identification information environments, and such components may share (e.g., employ) at least a portion of one or more capabilities of their respective smart parent device capabilities, such as at least in part sharing and/or otherwise using respective packaging, power (e.g., batteries), communication (e.g., antennas and/or networking components), sensor, security (secure enclaves), storage (dynamic and/or persistent memory storage spaces), and/or processing (e.g., protected processing) arrangements and/or portions thereof, and/or the like.

Some EBInet arrangements may securely pass identification information through one or more EBInet device and/or service arrangements, where such device and/or service arrangements receive and forward IIS information, and such information may be securely maintained ephemerally, and/or may be carried/stored more persistently. Such device arrangements may support identification information "hopping", where such information passes through one or more interim nodes to one or more RUDs (and/or RUS service arrangements) that use such information for event/activity identification and/or associated governance, processes. Such information set hopping and related event/activity information may securely become part of, or otherwise be securely cryptographically associated with, an IIS sequence as it can include (directly and/or by reference) provenance information comprising relevant information regarding the IIS sequence instance step locations and other attributes, such as participating persons' respective biometrically based identifying information. In some embodiments, such information provides device historical pathway information that can be provided using EBInet (a) composite fused-identity identification information sets (CIIS); and/or (b) discrete separately provided device and/or service arrangement information sets, securely associated with stakeholder and/or user (SubPer) and/or certifier (CertPer) IIS information sets (e.g., CBEIISs). Such "passing through" process sequence and associated, relevant REAI identification information may include provenance information (e.g., in the form of EBI-BlockChains comprising such chains' respective EBI-Blocks) that may be communicated to an organization and/or cloud information management service, such as an EBInet identification information utility, and may be used by administrative and/or end-user parties in evaluating REAIs. Such passthrough device and/or service arrangements may respectively employ EBInet modular component arrangements, such as NIIPU (and/or RIIPU) arrangements.

Reliably establishing human actor identity is an essential component in achieving a cyber secure, suitability and rights managed, safe and performance optimized, connected computing resource and/or event/activity instance cosmos. Human actor nearly existential or existential quality at least in part biometrically based identifying information, for example securely coupled with relevant stipulated fact, and quality to purpose assertion, other standardized and interoperably interpretable suitability informing attribute information types, helps ensure (a) authenticity of an REAI, and (b) rights, other policy, and associated REAI suitability, management. Such securely combined human actor and device and/or service attribute information arrangements (e.g., CIISs, such as CIIS IITs) can comprise essential ingredients in protecting and managing, for example, supply, value, and other commercial chains (SVCCs) (which may use EBInet EBIBlock secure blockchains), metaverse virtual or augmented reality arrangements, and/or EBInet digital currency arrangements (EBICoin arrangements which may also use EBIBlocks), and in ensuring safe and suitable selection of whom (and/or what) users interact with and/or depend on, for example, when engaging in online social, commercial, societal (e.g., government related), affinity, entertainment, and/or educational (e.g., knowledge acquisition) networking.

Securely combining, in standardized and interoperably interpretable form, human at least in part nearly existential and/or existential quality, biometrically based human identification information, with associated device, service, and/or event/activity descriptive information, provides the basis for analyzing/deciding upon the consequence of REAI use and/or event/activity participation. Such information sets provide the operative dimension basis for a composite person/computing instance identity informing infrastructure used to evaluate/calculate user purpose suitable REAIs. Such combining can result in substantially improved computing resource trustworthiness and other suitability considerations—it resolves problems that underlie many of today's connected computing problems and challenges. These challenges arise from inadequate cyber security, SVCC management, communications network security, digital currency (such as blockchain) implementations, metaverse and NFT management, and social and commercial networking trustworthiness, all the foregoing fraught with the risks flowing from unreliable identity. Secure and efficient computing needs new types of integrated, standardized interoperably interpretable, and distributed person identity informing systems that existentially (and/or in some embodiments, nearly existentially), that is, fundamentally reliably, identify computing activity participants and/or associated stakeholders/users/CertPers, and employ identifying information (or information at least in part derived therefrom) as "root" biometrically based identity anchors (biometric attributes) that are securely bound to respective participant descriptive (non-biometric) attributes. Such attributes provide information dimensions for calculating and/or otherwise assessing the suitability, including, for example, trustworthiness and/or effectiveness for user purpose fulfillment, of REAIs. Such attributes can be combined with other REAI attributes for respective device, service, and event/activity instances. REAI attributes can comprise, for example, such instances' respective unique identifiers (e.g., embedded secrets comprising, for example, instances' respective private keys), and quality to purpose and effective fact, information sets.

The use of "existential" and its grammatical variations in reference to person-specific biometric identification systems herein means such systems produce "existentially reliable" identification information sets, where no known technology set, under practical usage conditions/context, will subvert such a system's existentially determined human specific identity's accuracy (such accuracy distinguishing with effective (practical) certainty a specific human from all other specific humans). Such existentially reliable person-specific identification precludes the feasibility of successful spoofing and can involve one or more anti-spoofing techniques, where such techniques include, for example, liveness person validation (e.g., using electromagnetic emitter and sensor signal timing anomaly analysis) and/or at least recognizing a portion of a spoofing arrangement (e.g., a virtual reality spoofing emitter set).

In some embodiments described in this specification, and without limitation, EBInet identification information sets may include and/or be otherwise securely associated with easily interpretable and standardized, human specific and/or human grouping (a) purpose expression and suitability associated quantized value (e.g., PERCos quality to purpose (cred)), (b) testable fact (e.g., PERCos effective fact), (c) rights and/or purpose management, and/or (d) security policy, information sets. As described in embodiments herein, such systems provide at least in part biometrically based identity related information in highly efficient, user-friendly, and cost-effective ways for use in identifying and/or evaluating the suitability of (for example, including authorization for), and/or otherwise supporting, computing related activities associated with specifically identified humans and/or human groups.

Existentially (or nearly existentially) reliable computing activity identity recognition/authentication requires use of advanced biometric recognition technologies, for example using technologies described herein. Existentially reliable identification of human presence and/or conduct resulting from participation in computing activities such as involvement in a social networking session, or creation of stakeholder computing activity work product (e.g., creation of a computing activity stakeholder product resource such as a software program, a document, or an email) can result in a reduction in computing activity privacy, and supplement the already rapidly accumulating big sets of data mapping respective humans' activity patterns, as well as forecasting such humans' respective potential situational responses (e.g., response to advertising). While this leads to use, and some misuse, of such specific human information in attempts to shape the future conduct of individuals, including, for example, societal attempts to undermine human individuality, and commercial attempts to encourage specific commercial actions (e.g., buy certain products), ubiquitous employment of biometric identification is an emerging reality and if delivered with nearly existential or existential quality, can provide considerable value when implemented through use of EBInet arrangements that inform regarding, for example, REAI suitability, including trustworthiness, reliability, efficiency, productivity, and the like. Biometrics, and in particular liveness verified, existential quality biometrics, offer many advantages over use of passwords and multi-factor device identity arrangements. EBInet embodiments can support and substantially extend efficient, secure, and user-friendly human control in the emerging connected computing cosmos, as well as provide non-societally identifying, at least in part anonymized, REAI identification information.

In some embodiments described in this specification, nearly existential and/or existential quality in part biometrically based identification information sets' root person identifying information (1) is secure and cryptographically protected, (2) can be anonymous as to societally identifying information (e.g., not providing street address, name, social security number), and (3) is securely bound to (e.g., cryptographically hashed in combination with) identifying information sets' respective one or more descriptive, but not specific person identifying, attributes, such as Creds and/or EFs. Such an information arrangement supports, for example, securely, reliably providing suitability informing, person characterizing information (such as providing verifiable stipulations regarding one or more affinity group memberships, professional certifications and/or memberships (e.g., certified plumber, physician, professional actor), age and/or general approximate physical location, income, and/or educational degree accomplishments) without employing, and/or revealing and/or otherwise providing, "real-world" specific person identifying, and/or privacy compromising, information instances or aggregations.

Effectively eliminating identity misrepresentation, and providing identity associated parties' suitability informing attributes, including providing secure and flexible, at least in part biometrically based, standardized and interoperable, identification information arrangements, can greatly improve modern computing's efficiency and productivity, as well as the integrity/trustworthiness of computing resources, and event/activity instance sets. Such capabilities, as described in the present specification, can support far more reliable, practical, cost-effective, and frictionless use (e.g., using contemporaneous near existential or existential quality biometric acquisition and subsequent transparent or directed use) in computing event/activity participant identification information governance.

EBInet systems can resolve or ameliorate serious problems resulting from today's largely first generation connected computing architectures, where the absence of systems supporting both near existentially and/or existentially reliable identifiers and standardized and easily interpretable person and other resource, as well event/activity instance, respective suitability informing attributes, results in connected computing:

1. inefficient and inadequate personal and commercial computing activity/work product outcomes,
2. inadequate support for commercial value chain activities, such as value chain serialization management,
3. exposure to financial loss (and other financial uncertainties) resulting from cryptocurrency theft, or loss of keys resulting from use of conventional blockchain technology,
4. financial losses and/or other financial consequences due to inadequately reliable identification of REAI stakeholders/participants,
5. inadequate identity integrity assurance resulting in reputational uncertainties, risks, and consequences due to misuse/misappropriation of persons' respective identification information,
6. unnecessary user overhead requirements when performing biometric identification activities,
7. personal data privacy threats, including the inability to properly balance the interests of connected computing participants through the use of anonymized root biometric identity, securely bound to participant characterizing, but not specifically societally identifying, identification attribute information,
8. inability to efficiently, securely, and effectively explore and exploit social and commercial networking opportunities, including supplying insufficient information regarding the identity of participants in social and commercial networking activities and resulting uninformed interaction with connected computing other parties,
9. inadequate cybersecurity protection against threats resulting from absence of reliable identification information informing regarding resource, and/or event/activity, instances, (e.g., absent the reliability of near existential or existential quality human identity and other attribute secure binding), failure to identify virus and/or other malware infected/subverted objects such as infected software code, email, webpages, and documents),
10. misdirection of (such as misdirected to counterfeit cell towers) and/or eavesdropping on and/or other interference with communication instances such as cell phone calls,
11. misidentified and/or misleading resource and/or event/activity instances, e.g., resulting in malicious counterfeiting of tangible goods (e.g., food, pharmaceuticals, electronic components) and inadequate and inefficient governance of supply, value, and other commercial chain arrangements,
12. costly and complex digital transcript and information verification implementations,
13. disinformation (e.g., fake news), and/or other disreputable content, including unreliable/untrustworthy and/or maliciously modified information sets,
14. absence of standardized and interoperably interpretable REAI provenance arrangements that employ, at least in part, near existential or existential quality biometrically based identification information of stakeholders, providers, users, and certifiers, and
15. failure to provide standardized and interoperably interpretable means for users to characterize and associate computing arrangement purposes as person and/or organization associated attributes, and where inadequate information and/or misinformation sets can be eliminated and/or mitigated based on suitability standardized attributes of information set providing and/or creating/modifying one or more parties.

The foundation of human trust and understanding is substantially based on the perception of another person's (and/or group's) intent(s), trustworthiness, right(s), competence, and/or other appropriateness attributes. In computing contexts, understanding person and/or person associated resource and/or event/activity instance appropriateness (suitability) depends on a user's/participant's ability to recognize, and situationally appraise, another party's one or more germane attributes as associated with reliable person specific identification. For dependability, such germane attributes should be anchored to foundational, fundamentally reliable human identifiers. Such suitability considerations may be at least in part perceived as, and/or evaluated using, generally characterizing (e.g., trustworthiness) and/or situationally/contextually germane (e.g., competence/usefulness associated with one or more specified user purposes) attributes. Determining persons' identifying information regarding who respectively "stands behind," and/or is otherwise associated with, resource and/or event/activity set instances can be vital to human computing reliability, security, efficiency, and productivity and outcome effectiveness.

With various EBInet embodiments, resource and event/activity identification information instances are anchored to their associated person underlying biometric based identification information sets, and in particular to one or more instances' respective SubPer (stakeholder owner, agent, and/or user), and/or CertPer (certifier), existential quality biometric identification information. Such biometrically based identification information may be securely bound to and/or securely otherwise associated with (including, for example, integrated with) germane person specific, computing suitability informing, information attributes, such as PERCos testable/authenticatable effective facts, quantized quality to purpose assertions, and/or contextual purpose specifications.

In some embodiments, for example, EBInet supports obtaining identifying information for a person with existential biometric accuracy and stipulating such person's one or more attributes in a form that cryptographically binds such attributes to an identity anchor comprised at least in part of existentially accurate or nearly existential accurate, biometrically based identifying information. Such highly accurate, identity-anchored information can be critical to ensuring cyber secure computing, and/or otherwise determining computing resources' (e.g., programs', documents', emails', texts', tweets', webpages', devices', and/or persons') situationally specific (or general) appropriateness. It is, for example, essential under many circumstances that the human specific respective identities of one or more "standing behind" stakeholder persons be fundamentally reliable, such as a provider/sender of an email or email attachment. Such one or more persons' identifying information can then be used for producing and publishing (and/or otherwise employing) contemporaneous (acquired near to the time of use) resource and/or event/activity instance identification information sets using, for example biometric identification AFSD arrangements (acquisition and forwarding stations). Such a near existential or existential quality contemporaneous to use biometric identification acquisition arrangement enables near existentially or existentially reliable identification information acquisition to be acquired without the expense, and user overhead, of repeated, operatively simultaneous information acquisition (for example, using biometric acquisition device arrangements embedded into one's computing mobile devices). Such information can then be economically and practically used, for example, in forming resource and/or event/activity instance identification information sets for use in computing identification and/or authorization purposes.

EBInet arrangements support the use of nearly existential and/or existential quality biometric information in the recognition of, and use of, resource and/or event/activity instances' associated stakeholder persons. Such support enables providing secure, and user purpose-applicability informing, attribute information. Such attribute information can both directly characterize REAIs' respective subject matters (including characterizing such REAIs' respective humans that comprise subject matters) and/or can characterize subject matter associated stakeholders and/or certifiers. As a result of using nearly existential or existential quality identification techniques, EBInet arrangements, in some embodiments, provide respective root, uniquely identifying and/or otherwise uniquely distinguishing, identifiers. Such identifiers can be, for example, cryptographically bound as anchoring person identification information used in certifying and authenticating respective REAI attributes, enabling a secure cryptographic, in part human explicitly identifying, identification token (and/or the like secure instance information set) ecosphere. Such binding can associate biometrically based near existential and/or existential quality human specific identifier information with specific to such identifier, and/or more generally characterizing (e.g., regarding class/category), information useful in determining instance appropriateness/suitability. Such EBInet arrangements may, for example, include highly secure association of one or more of trustworthiness, competence (e.g., using credentials), and/or rules and controls related attributes (e.g., digital rights management, such as authorization, attributes, other policy information attributes, and associated secure management/enforcement specifications) with root person identifying information (e.g., using existential quality biometrics). In some embodiments, such information and enforcement capabilities include providing rules and controls management for auditing (such as provenance management) and rights management capabilities. Such capabilities can ensure the integrity of computing activities, including enabling, for example, more reliable serialization (supply, value, and/or other commercial chain) management, safer and more reliable social networking, optimized computing resource identification and evaluation, trusted communication, substantially more secure and reliable digital currency implementations, and/or far more reliable cyber security protection.

It is not practical to broadly, commercially implement existentially reliable biometric identification acquisition capabilities within highly mobile device types such as smartphones, smartwatches, smart bracelets, smart pendants, smart continuity wristbands, and/or the like. For example, it would not be financially practical to incorporate such existentially reliable capabilities redundantly in a user's various non-mobile computer and computer managed arrangements, for example, to incorporate in each of a user's, and/or user's one or more group's, respective computing arrangements, such as (a) mobile computing devices, (b) desktop computers, (c) IoT instances, and customized digital communication connected device arrangements, and (d) manufacturing, supply, value chain and/or other group shared computer managed arrangements. EBInet arrangements employ near-existential and/or existential contemporaneous biometric identification information acquisition and forwarding stations that acquire, and can communicate, at least in part biometrically based identification information with associated receiving, using, carrying, and/or forwarding EBInet device arrangements. Such stations may directly, securely forward, for example, updated stakeholder person biometrically based identification information as made available for, and/or on request by, other EBInet compliant device arrangements. Such identification information forwarding may, in some embodiments, be specified by securely enforced policies.

In some embodiments, using rights management, a person's rights can be enforced as related to digital operations by ensuring that such a relevant person genuinely or operatively currently agrees to an electronic contractual obligation (e.g., smart contract enforced by executable code) and/or other commitment to allow performance of a digitally executed process set wherein contract or other agreement terms require such a person's operatively current, direct, and explicit agreement (e.g., answering yes or no), for example, using a trusted path user interface instruction arrangement. Such agreement (or a decline to proceed with such process set) may, for example, require making available such a person's carried contemporaneous at least in part near existential or existential quality biometrically based identification information, and matching such information against a person's anonymous, or societally identifiable, biometric identification information. Such information can be carried within a transaction (e.g., digital contract's) related rules and controls information instance, such as within a digital currency blockchain's information set, such as within an EBICoin sequence (e.g., EBIBlockChain) arrangement, and/or registered with an identification information matching service authority. Such providing of identification information may, in some embodiments, require an accompanying user initiated trusted path instruction to consummate one or digital contract provisions.

EBICoins are a form of digital currency comprising securely managed person/digital coin identification information instances. In some embodiments, EBICoins respectively securely specify/stipulate:

(a) their contained and/or securely associated, minted or mined, and issued, one or more digital coins' unique identifier information, where such information may include and/or be securely associated with date, time and/or location of such digital coin minting or mining, and issuance, (b) the financial value (e.g., denomination) of their contained and/or securely associated minted or mined, and issued, digital coins, and (c) contained and/or securely associated at least in part near existential or existential quality, biometrically based identification information of their digital coins' one or more current human owners and/or owner human agents, and may further specify/stipulate:

(d) contained and/or securely associated at least in part near existential or existential quality, biometrically based identification information of their digital coins' one or more minters, miners, and/or issuers, and/or human agents thereof, such as agents of respective financial institutions, (e) identification information of financial institution EBICoin/digital coin transfer service providers that issue new one or more EBICoins that securely specify new digital coin ownership information, such information using at least in part biometrically based identifying information and replacing expiring/terminated one or more EBICoins, and/or (f) such EBICoins' and/or EBICoins' respective securely contained/associated digital coins' certification/cryptographic signing information, such certification/signing performed by such minter, miner, issuer, and/or owner party, where such certification/signing can be performed by one or more persons and/or agents thereof, and where such certification/signing may be performed using such persons' and/or agents' respective EBICerts.

EBICoins, for example in the form of EBIboxes, are used in the storage of financial value owned by party and enable value transfer for consummating financial transactions. An EBICoin set transforms during a transaction to a new EBICoin set to reflect one or more changes in the underlying, issued and persistent, one or more digital coins' ownership. For example, during the consummation of a transaction, such as the purchase of an item, an EBICoin set X transforms into an EBICoin set Y to represent a transaction's digital coin set transfer, where a currency minted or mined digital coin set (which may have been digitally signed by a minter or miner person or other issuing party using an EBICert and/or other certificate) is transferred from the purchaser to the item seller, and where a securely maintained event/activity specification/policy set (such as securely enforced by a digital contract) requires the moving of the buyer's digital coin set from EBICoin X to an item seller's new EBICoin Y. Such an EBICoin sequence reflects the start and end of a transaction's change of digital coin ownership.

For example, an EBICoin set can be used by its owner to facilitate/consummate a financial transaction through the transfer of ownership of one or more of such an EBICoin's contained uniquely identified digital coins to a receiving party. In such an arrangement, such an EBICoin contains a subject matter EBICoin owner or owner agent representation comprising an at least in part near existential or existential biometrically based identification information set. Such an EBICoin's "contained" digital coin can be cryptographically, digitally signed by its issuer's (e.g., a sovereign nation's central bank or other issuing authority) human (for example by an issuer's human agent using an EBICert), where EBICoins effectively constitute "parent" digital coins (coin arrangements containing a digital coin set) that explicitly stipulate such parent coin's owner, for example by such owner or an owner agent cryptographically, digitally signing the EBICoin (e.g., using an EBICert). Such EBICoin also contains (or in some embodiments securely references) such issuer cryptographically signed one or more digital coins.

Such EBICoin related signings can be performed using EBICerts, where each EBICoin can contain at least two signing certifications, one by such a digital coin's issuer whose issuer's agent signed such issuer's issued digital coin and one by the EBICoin's owner, where such owner or owner agent signs (at least in part biometrically) the EBICoin that contains such an issuer signed digital coin. Such owner signed EBICoin becomes invalid with/after a financial transaction consummation employing such an EBICoin. One or more of the EBICoin "carried", issuer signed and issued digital coins persist as a result of being contained within one or more new EBICoins, such new EBICoins being owned by a digital coin receiving party. One or more digital coins of the original EBICoin owner may be retained by such owner in the form of new one or more EBICoins that represent change provided to such owner that remain owned by the original EBICoin owner, where such one or more digital coins constitute value remaining-change from the digital currency used in a transaction.

Digital currency rights management has proven to be a difficult challenge as regards to cryptocurrencies. Theft of passwords, loss of currency wallets, currency exchange cybersecurity compromises, and mal-intentioned digital contract code, present egregious harm to many digital currency users. It has been estimated that as much as 20% of Bitcoins may have been irretrievably lost (New York Times Jan. 14, 2021, as well as estimated by both CoinDesk and Bankrate, employing information provided by Chainalysis). Employing EBInet arrangement capabilities such as using near existential or existential quality biometrically based identification information capabilities identifying parties that own and/or transfer currency can, in operatively anonymous or operatively societally person identifiable implementations, greatly reduce digital currency related fraud and theft by ensuring digital currency valid ownership and related computing event/activity, such as digital contract, management.

Enforcement processes of a user's rights, for example to digital currency, can at least in part be performed on such user's RCFD where a NIIPU and/or other PPE requires an explicit user assertion/acceptance of a transaction process (for example, approving the execution of a smart contract provision), such as a movement of, and/or rights transfer of, digital currency-such process management can alternatively or additionally be required by a crypto-currency exchange platform, such as Coinbase. The biometric identification techniques employed in such a rights management model may in addition or alternatively employ operatively real-time acquired identification information, such as smart device native and/or RIIPU biometric identification capabilities. Assertion/acceptance requirement enforcing rules regarding one or more transaction or other event/activity control processes may also apply to receiving parties, such as a receiver and/or mover of crypto-currency, where the receiver and/or mover is required to be biometrically identified and, for example, be physically or contemporaneously "present" for an applicable transaction or other event/activity, to be completed, and further where such currency receiving and/or paying/transferring party must stipulate their approval, e.g., provide a trusted path instruction that causes the signing of a transaction event/activity information set (e.g., using an EBICert). Such information set may be stored and conveyed in a crypto blockchain such as an EBIBlockChain. A digital currency sender, transferor, and/or receiver, in a transaction may, in some embodiments, also sign (may be required to sign) a transfer involving an EBIBlockChain event/activity crypto block.

In some embodiments, an EBICoin, EBICoin X, and/or such EBICoin's societally and/or biometrically based owner identifying information, may be deleted upon, e.g., operatively simultaneously to, an exchange of value and/or other secure transfer of value transaction in which ownership of at least a portion of EBICoin X's digital coin set are transferred to a receiving, new owner party. Upon such a transaction's completion, such an EBICoin's X's at least a portion digital coin set's securely contained and/or otherwise securely associated one or more digital coins are now owned by a new, receiving party. Such receiving party receives a new EBICoin, e.g., an EBICoin Y, that contains the transferred digital coin set. Such new EBICoin, securely at least in part comprises and/or otherwise securely references such digital coin set's new owner party's human person, or new owner party agent, at least in part near existential or existential quality biometrically based identification information set, such identification information set stipulating the identity of such digital coin set's new owner, the receiving party. Upon, or contemporaneous to, such transfer of value transaction and creation of such new EBICoin, and upon performance of a secure policy instruction set, or by direct instruction by the EBICoin's (EBICoin X) transferer of ownership initial owning party person or person agent, such instruction including providing at least a portion of (or all of) such EBICoin X owners at least in part biometrically based identification information, such biometrically based identification information and/or other such transaction related information, as specified, is securely, permanently deleted so as, post such transaction completion, any maintained EBICoin X related status and/or event/activity information does not include, that is ensures going forward the identification anonymity of, such EBICoin X transferer. Further, such identification information of such digital coin set transferer/previous set owner can, by securely implemented policy and/or by direct such past owner instruction, be deleted from any identification information storage arrangements, including, for example, from local EBInet device (e.g., NIIPUs and/or RIIPUs) and/or service arrangement memory, owner related organization network-based RUS managed memory, and/or from an EBICoin X TIIRS registration information memory. Such memory deletion (and/or alternatively, other anonymity governance, such as locking (e.g., encrypting and/or otherwise securely storing) societally identifying identification information in a manner inaccessible to parties other than EBICoin X's owner and available, for example, to EBICoin X's owner only upon the secure (e.g., trusted path) presenting of EBInet arrangement compliant such owner's or applicable owner agent's nearly existential or existential quality biometrically based identification information.

In some embodiments, EBInet arrangements, including for example Pervasive Biometric ID Environment (pBIDE) capabilities, offer substantially more reliable, practical, cost effective, and performance improving integrity, and suitability to user interest management, of resource and/or event/activity instances. Such improvements are at least in part achieved through the use of biometrically based near-existential and/or existential quality stakeholder person identification, liveness, and authentication technologies, and securely associated and maintained person specific, and user person relevant, attributes. Such REAIs broadly involve many types of computer activity considerations including, for example: cyber security management; social and/or commercial networking; supply, value, and/or other commercial chain monitoring and governance; IoT and other device arrangement operation; digital currency' communication trustworthiness; and news and document authenticity. Such EBInet arrangements enable the identification, evaluation, and/or other determination of the appropriateness (e.g., trustworthiness, other suitability) of, and/or authorization for, computing activity resource and/or event/activity instance sets. In some embodiments, enabling of such identification, evaluation, and/or other determination of appropriateness and/or authorization is performed and/or otherwise supported by EBInet compliant local network and/or cloud (e.g., internet) related services. Such EBInet device arrangements can inter-communicate, and/or one or more such EBInet device arrangements can communicate with remote administrative, utility, and/or platform arrangements, for example for performing auditing, rights management and/or other attribute, and/or policy, information updating, and/or for at least in part performing attribute related resource and/or event/activity instance management. Such management may include redundantly and operatively concurrently performing operations in disparate locations (e.g., across network locations) to ensure the integrity of such operations, for example, by producing the same or consistent results, in accordance with specifications.

EBInet identification information sets are particularly useful in the management of, including avoidance of, cyber security threats and communication protection challenges. These threats and challenges comprise important risk factors threatening modern civilization's infrastructure and operations, including commercial, personal, and societal interests and assets. Since cyber security malware activities are primarily implemented (e.g., initiated) remotely to a threatened party's physical location, the practical realities of EBInet contemporaneous time periods (e.g., one day) means that bad actors, other than smart device thieves who may steal a device, won't have the opportunity to misappropriate a device and exploit stored (carried) biometrically based identification information, since such thieves would have a very limited time window in which to use such information (policy managed contemporaneous identification information would timeout (e.g., expire) and need to be refreshed). Since physical control/theft of personal computing devices is not a primary source of cyber security attacks, contemporaneous, nearly existential or existential quality acquisition of biometric identification information used for subsequent authentication of an individual person's identity, and the binding of such identity to resource and/or event/activity instance information sets, can, under most circumstances, provide superior cost, packaging, user friendliness, practical flexibility, mobility, and security, performance in comparison to comparable quality simultaneous to biometric information acquisition, identity information usage.

Cyber security malicious attacks are, at their foundation, almost entirely due, at least initially, to the actions of remotely located parties. Since cyber security attacks are, for various reasons, normally performed by hackers using specialized tools and skills (not the normal tools and/or skills of a street thief who steals a phone), the physical theft of a smart mobile device doesn't normally lead to cyber security vulnerability. In particular, from a cyber security standpoint, contemporaneously providing (such as during the same day or shorter period during a day) user near-existential or existential quality (e.g., liveness evaluated) identification information can provide the same biometric identification benefits as performing such a fundamentally reliable biometric identification process set operatively simultaneously with a computing activity. Consequently, the physical theft of an EBInet (or other) identification information carrying and provisioning device would rarely result in material, identity related, cyber security (versus local, physical access to device arrangement) threats. For example, in some embodiments, a stolen EBInet RCFD, such as an EBInet compliant smartphone (or other smart device), can at least in part be protected through use of its inherent, non-existential biometric identification capability set. Such capability set may have sufficient rigor and associated technical and equipment complexity to prevent thieves (versus highly sophisticated black hat hackers) from misusing an RCFD device's carried user and/or owner identification information within the limited sunset/refresh specified requirements (e.g., hours remaining of a day period) of such device's contemporaneous identity refresh policy set as managed, for example, by an EBInet arrangement's RCFD mobile device embedded, secure, isolated modular component arrangement (e.g., a NIIPU arrangement).

In some embodiments, EBInet device arrangements comprise tamper resistant, networking device arrangements for securely acquiring and contemporaneously (versus simultaneously) using one or more at least in part biometric near-existential or existential quality, human identification information sets that, in many embodiments, are bound to respective, securely acquired time and location of acquisition, and related acquiring device, information. Such human identification information sets can be acquired using biometric identification tamper resistant, secure identity information acquisition and forwarding station device arrangements that employ respective RIIPU arrangements. Such biometric information, and/or information derived therefrom, can then be forwarded to one or more receiving EBInet device arrangements for carrying, using, and/or further processing of, human-computing activity related identification information one or more purposes. Such receiving device arrangements may use, and/or carry, such biometric identification information (such as with other pertinent identification information), and/or information at least in part derived therefrom, and/or may forward such information to one or more further EBInet device arrangements, where such information may be used as input information for (a) authorizing event/activity one or more instances, and/or (b) producing at least in part biometrically based identification information sets that are securely published (and used ephemerally and/or maintained persistently) for computing resource and/or event/activity instance set identification, evaluation, auditing, and/or other administration and/or management.

EBInet contemporaneous provisioning of human specific persons' at least in part biometrically based identification information sets occurs subsequent to (versus operatively simultaneous with) respective identified persons' biometric identification acquisition process sets. Such contemporaneous provisioning and use of such identification information allows higher quality, more reliable human computing activity identification information to be used for resource and/or event/activity instance set identification, evaluation, auditing, authorization, and/or other administration and/or management. Such contemporaneous to its use acquired identification information can be produced using biometrically based identification information acquisition "stations" that enable performance not constrained by the same design considerations related to mobile device packaging, cost, power consumption, sensor arrangement, and redundancy (e.g., operatively simultaneous acquisition requires implementation in each, or plural of, user computing device arrangement(s)). As a result, such EBInet arrangement acquiring stations, such as those enabled through the use of respective RIIPUs, may employ advanced and highly innovative techniques for assuring the reliability of produced, human specific identifying information, enabling the secure, e.g., cryptographic, associating of such highly reliable identity information with identity related, user purpose suitability informing, person specific attribute information (e.g., person characterizing information including, for example, persons', and/or persons' respective groups', rights management, professional, expertise/competence, trustworthiness, and/or the like information).

Use of acquiring, forwarding, "station" devices (AFSDs) (may be complemented by the use of AFD distributed and dedicated EBInet acquisition devices) may significantly improve the practicality of providing nearly existential or existential quality biometric identification capabilities, by enabling a non- or less-redundant use of AFD capabilities, for example by integrating RIIPUs into smartphone charging stations in support of parent smartphone RCFD implementations (for example, for use once in the morning to contemporaneously acquire (from the standpoint of use) biometric identification information when picking up one's smartphone at the start of the day) and forgoing the need to implement AFD capabilities in the ubiquitously occurring smart devices populating modern life, such as smartphones, tablets, watches, notebook computers, and/or the like. Such implementations of, for example, AFSD biometric identification stations, can support both higher quality biometric identification performance, and be designed for not only secure software upgrades, but support removeable RIIPU and/or other EBInet compliant modular component arrangements (e.g., NIIPUs) that may be easily "unplugged", or otherwise conveniently removed, for security and/or other performance upgrade and/or security enforcement purposes.

In some embodiments, provisioning EBInet contemporaneous biometrically based identification information supplies, at least in part, information sets for use in securely publishing, by respective stakeholder publishing parties, computing activity resource and/or event/activity instance identification information sets. Such information sets are, for example, published in support of such respective information sets' availability for later use by other parties desiring to be informed regarding who is associated with certifying and/or otherwise "standing behind" and/or otherwise associated with, a given resource set instance. Such at least in part biometrically based identification information sets may be respectively employed for ephemeral periods, for example, as identification information sets regarding inter-party communication process sets, where such information may inform one or more digitally interacting parties regarding who is participating in, and/or certifying and/or otherwise standing behind, a communication and/or access control process and/or one or more other REAIs. Such REAIs' at least in part biometrically based identification information publishing provides instance set characterizing information sets, for informing event/activity participating one or more parties' identifying, evaluating, receiving, using, and/or verifying, regarding other parties' trustworthiness, competency, and/or other suitability of (a) computing resource instances, (b) computing rights management process sets (e.g., access control), (c) communication (e.g., protocol, path) process related sets, and/or (d) event/activity set participation and/or other involvement.

In some embodiments, EBInet arrangements' respective uses of such biometrically based identification information sets are time limited "contemporaneous", and/or may be otherwise user/owner instruction based such as due to an event such as theft of device (and/or, for example, the breaching of a continuity tethering arrangement), segments, where such identification information is trusted as sufficiently current for user and/or user organization one or more purposes, and where the rigor, cost, packaging, mobility, power consumption, sensor arrangement, and/or redundancy of implementation costs, are burdens that make real-time (e.g., operatively simultaneous with an associated computing activity event) highly assiduous (nearly existential or existential quality) biometric identity determinations impractical.

Use of currently available, operatively simultaneous biometric identity-based information (using today's substantially lower than existential quality biometric identification implementations) has serious identity discrimination accuracy and spoofing current and anticipated vulnerability weaknesses. Given the impracticality of implementing near-existential or existential quality biometric identification across a range of mobile and stationary devices and contexts, use of a single installation, contemporaneous (previously acquired) and more reliable (than current approaches), near existential or existential quality biometric information acquisition station to determine stakeholder and/or other user identity has greater, to far greater, practical value in most cyber security contexts and many social networking/social venues.

In some embodiments, particularly in cyber security related, and manufacturing, supply, value, and/or other commercial chain management, applications, where malicious organizations and rogue governments may support highly financed, well-equipped laboratories that can perform very sophisticated identity spoofing, any material exposure to FRR (false rejection rate) and any exposure, in particular, to FAR (false acceptance rate), is unacceptable. Employing existential biometric identification acquisition stations (whether fixed position or portable) and contemporaneous use of station acquired existential identities can be essential in implementing and maintaining the integrity of a cyber security (and/or supply, value, and/or other commercial chain) identification information infrastructure. Accurate human person identity acquisition and time frame limited demonstration of the live presence of such a person (e.g., biometric liveness tested) is vital for ensuring that identities associated with resource and/or event/activity instance sets are inarguably accurate. The need for inarguably accurate/unspoofable person identification arrangements increases in importance as the use of biometric identification/acquisition technology is increasingly deployed and biometric identification database information is misappropriated.

In some embodiments, EBInet's contemporaneous provisioning of nearly existentially or existentially reliable human specific identifying information, when combined with relatively robust, but not nearly existentially or existentially reliable biometric identification and authentication capabilities built into certain modern day portable and desktop appliances (including desktop computers, smartphones, tablets, laptops, and the like), enables EBInet contemporaneous existential identification capabilities, and such native to device non-existential biometric information capabilities, to function as complementary arrangements. Such complementary arrangements provide, for example, additional factor input in managing cyber security threats, as well as functioning as additional biometric analysis one or more factors for controlling threats involving local, physically present, bad actor device theft and/or other bad actor physical presence and device misuse.

In some embodiments, one or more AFDs may be employed, subsequent, for example, to a day's first AFSD user biometric identification information acquisition, to acquire more recent nearly existential or existential quality biometrically based identification information. Such further AFD biometrically based identification information acquisition may then be forwarded as contemporaneous information for use by an RCFD, and/or be used to validate/authenticate at least a portion of an RCFD's carried contemporaneous at least in part biometrically based identification information. Such validation can assure that such first acquired biometric identification information operatively matches, in accordance with specification, such newer AFD acquired information. Such further one or more AFDs may acquire nearly existential or existential quality biometric identification information and, for example, employ such information to at least one of (a) update an RCFD arrangement's user's AFSD biometric identification information of one or more currently carried, such as the most recently received/updated, contemporaneous, at least in part biometrically based identification information one or more sets, and (b) authenticate and/or otherwise validate, for example, one or more of an RCFD arrangement's one or more carried contemporaneous at least in part biometrically based identification information instances (or one or more portions thereof). Such validation tests can determine whether such an RCFD arrangement's carried one or more contemporaneous identification information sets represent the one or more persons corresponding to such carried identification information sets. For example, such validation tests can determine whether one or more persons are the same persons as represented as carrying, using, and/or owning at least in part biometrically based identification information sets as demonstrated by use of a sensor arrangement within a field of view of such sensor's corresponding mobile RCFD, as tested/evaluated by (e.g., compared to registered such information stored within and/or accessible to) an AFD, and/or an associated administrative/management identification information service, arrangement.

In some embodiments, an RCFD user's biometrically identifying information may be acquired and associated with "real-world" person identification information (commercially, societally, socially, and/or the like information, such as an employment ID # and/or social security identifier, and/or being named as a licensed physician). By analyzing and/or comparing such person's AFSD's biometrically acquired identifying information (and subsequently associated attribute information, where for example, such combination of information is registered with an identification information utility and/or other administrative arrangement), a RIIPU, NIIPU, and/or an associated administrative and/or cloud service and/or other EBInet arrangement can determine that such AFSD acquired information sets each represent the same person and person attributes as such RCFD's carried contemporaneous at least in part biometrically based identification information. Such validation testing may employ matching such RCFD's at least in part biometrically based identification information with registered (e.g., with such RCFD and/or an organization and/or cloud service arrangement) persons' at least in part biometrically based identification information, such as using corresponding persons' and devices' composite in part biometrically based identification information sets, where such registered and/or the like stored information sets are stored, for example, as registered information sets identifying their user and/or owner respective persons and where such sets are stored on organizational and/or cloud service and/or grouped EBInet device respective identification information arrangements.

In some embodiments, one or more AFDs may be employed at places of employment for persons' identification, where such persons may respectively activate biometric identification processes when each or any of such persons comes within organization arrangement sensor/emitter arrangement operative fields of view. Such persons may be respectively identified, for example, when entering an organization's building, office arrangement, and/or walking through and/or operating within such an organization's AFD biometrically monitored one or more areas (hallways, outside locations, meeting and/or high security rooms, common areas (e.g., cafeterias), and/or the like). An employee, consultant, and/or other person who is carrying an RCFD (e.g., an RCFD that supports pBIDE) entering such one or more monitored spaces may be recognized by one or more area biometric monitoring AFD arrangements. Such a person can be identified as an appropriate party registered to carry (or identified as not registered to carry) such a specific RCFD mobile device. Such an identification process may include determining whether such a person identified by such RCFD's carried contemporaneous one or more biometric identification information sets is registered to carry a device containing such specific person identification information and/or is registered to carry the specifically identified, carried device. In such monitored, and then evaluated, process set, such an RCFD may receive from, send to, and/or exchange with, an organization arrangement AFD and/or administrative arrangement, one or more such person, or person/device composite, at least in part biometric identification information sets. Upon such receipt, a secure PPE arrangement (e.g., a NIIPU) within, for such an RCFD, and/or a secure PPE arrangement within such an AFD arrangement (e.g., a RIIPU) and/or an RUD or RUS arrangement, can determine whether received such identification information is compliant with administrative specification(s), that is, matches sufficiently, as may be required by respective AFD and/or RCFD and/or other EBInet administrative arrangement policy specification(s), and, for example, can determine whether such RCFD carried, and AFD produced, at least in part biometric identification information sets or one or more portions thereof (e.g., CBEIISs, and/or CIISs and/or the like securely bound information sets) match in accordance with such specifications (CBEIIS being contemporaneous person identifying at least in part biometrically based, nearly existential or existential quality, identification information set).

Such an AFD and/or associated RUS administrative arrangement can receive and evaluate at least a portion of an RCFD's carried CBEIIS and/or CIIS identification information, and may take one or more actions based upon determining whether such IIS information matches as corresponding to one or more RCFD internally stored IISs (such matching securely determined as compliant with specification(s)). Based upon such determination, such AFD and/or associated RUS arrangement may notify an administrative authority (e.g., an identification information registration, and/or event/activity governance, service) and/or pass a control instruction (e.g., at least in part disable) to such a receiving RCFD. Such actions can be based on a determination by such AFD and/or RUS administrative entity that one or more such biometric identification information sets operatively currently acquired from such an organization arrangement's AFD is respectively consistent with the carried by such RCFD biometrically contemporaneous IIS, that is a carried contemporaneous IIS set is consistent with operatively current biometrically observed and acquired, and/or previously registered, human presence and/or human/device composite grouping and/or related event/activity information. Such information should be consistent with, that is compliant with, associated policies regarding stored person, and/or composite identity (e.g., person and device), stored and registered information. Such information can provide a basis for identifying anticipated and/or authorized (e.g., registered) mobile EBInet arrangement users, such as for enforcing rules and controls for user rights management, administrative monitoring, and/or threat analysis purposes. Such AFDs, and/or associated network(s) administrative arrangement(s) (such as organization and/or cloud platform, identification information management service arrangements) may, in response to a failure to match through comparison of an RCFD carried at least in part biometrically based identification information of a user and/or user/device with a registered and/or other authorized (e.g., acquired through operatively current monitoring) user/person identification information set, at least in part deactivate and/or otherwise control (e.g., constrain) operations of such RCFD and/or the parent mobile device arrangement that carries such compared/evaluated identification information set (e.g., deactivate and/or otherwise at least in part control the functioning of such an EBInet arrangement RCFD and/or parent, compliant parent device (e.g., a smartphone or other smart mobile device)). Such deactivation and/or otherwise controlling may include, for example, broadcasting such mobile device's location, shutting off (powering down) the mobile parent device, having such parent device arrangement generate a sonic and/or electromagnetic alarm signal, and/or limiting one or more functions of such mobile device arrangement, and/or such device arrangement's RCFD or one or more portions thereof (e.g., its embedded highly secure NIIPU modular component arrangement). An AFD arrangement and/or one or more associated services may, for example, send instructions to a communicating/corresponding RCFD that does not have presence authorizing and registered matching person at least in part biometrically based identification information. Such instructions, at least in part can stipulate deactivating and/or otherwise constraining at least a portion of its capabilities and/or interactions with other device and/or service (e.g., EBInet compliant) arrangements. Such device and/or service arrangements may be instructed to cease operating, and/or notify other device arrangements and/or appropriate network services, administrative persons, and/or administrative groups regarding such failure to match in accordance with specification information.

In some embodiments, AFD arrangements may forward updated biometrically based user identification information sets to respective such RCFDs to augment and/or replace/refresh biometrically based user identifying information employed in user and/or composite device arrangement at least in part biometrically based identification information sets. Such information may be used, for example, in one or more pBIDE embodiments. Such an AFD's more recently produced biometrically based identification information, for example, may be employed after being received, while older (or newer) such information instances may be retained in a manner compliant with specifications for audit history and/or operations performance/compliance/governance (e.g., rights management) analysis and control purposes and/or second (or other) factor identification information authentication.

In some embodiments, distributed AFDs, such as within one or more organizations' facility arrangements, can enable operatively recent or operatively current nearly existential or existential quality biometric identification information to be made available without compromising parent mobile device (or dedicated RCF device) practical cost, size/configuration, ease of use/usage transparency, and improved performance. Using a combination of distributed, shared use, organization/group AFDs to acquire contemporaneous at least in part nearly existential or existential quality biometrically based identification information, can support substantially higher quality device and/or person identification information performance in commercially reasonable configurations.

In some embodiments, combined use of nearly existential or existential quality contemporaneous biometric information with operatively simultaneous biometric identification information produced by mobile and other portable computing devices, can, when properly implemented and used, reduce or eliminate a large portion of known computer security threats involving attempts at local device information misappropriation and/or other device misuse.

In some embodiments, EBInet arrangements can use smart device trusted path capabilities for performing user confirmation of activity instances, such as authorizing the binding of a carried CBEIIS and/or CIIS with IIS information for non-human subject matter, such as a document, software code, text message, email, device, event/activity, and/or the like. Such confirmation assertions can use trusted paths for conveying event/activity certification, such as when a user uses an isolated, auxiliary trusted pathway for user action declaration/confirmation. Such use, for example, can involve a user pressing a trusted path action confirming button, or array of buttons where, for example, different button sets correspond to different actions, such as publishing an EBInet compliant email and/or email specific type (e.g., to a friend, secure, financial, etc.) or saving a data instance such as a document or software program. The pressing of specific one or more buttons in sequence or simultaneously can distinguish between data purposes, that is, for example, between signing, registering, and publishing/sending a document versus sending an email, or sending a text. In some of such embodiments, some or all of such buttons may be programmed by a device user (e.g., programming a first button to initiate employer confidential information signing and publishing/registering, versus programming a second button to initiate the preparing of a personal document). The foregoing may include, for example, publishing a document's or other data set's corresponding user-CertPer initiating button set to sign such data set with at least a portion of a user's at least in part contemporaneous and nearly existential or existential quality biometrically based EBInet identification information set, and/or the like (e.g., using an EBICert).

In some embodiments, a trusted path instruction arrangement can be physically, securely integrated into a smart device arrangement (e.g., a smartphone or laptop) to perform tamper resistant, trusted path EBInet one or more operations, or such trusted path arrangement may be an auxiliary device arrangement that wirelessly connects to, and/or is physically affixed to, a partner smart device arrangement. Such trusted path device arrangement can provide an isolated trusted pathway for initiating and certifying (e.g., using an EBICert) one or more EBInet related operations, such as securely publishing a document and a securely associated device/CertPer composite at least in part biometrically based IIS. Such a button arrangement can be programmed to respond to different button pressing configurations, such configurations respectively corresponding to different event/activity instances, such as pressing a trusted path button twice to initiate/authorize/confirm sending an e-mail, or, for example, pressing such same button using two short and one longer presses for publishing an IIS for a resource, or for securely saving a confidential document with its IIS.

In some embodiments, a trusted path arrangement can prevent a compromised EBInet compliant smart device or other compliant device arrangement from acquiring and/or using a biometrically based identification information set, for example, for certifying resource and/or event/activity identification information sets and/or the like. Such an arrangement can be used to prevent counterfeit signing (e.g., falsely certifying), and/or other use (e.g., falsely authorizing), of EBInet identification information sets, such as counterfeit signing resulting, for example, from malicious compromising of an EBInet compliant device arrangement (e.g., a smart device with an embedded modular component RIIPU) by one or more remotely delivered bots masquerading as a legitimate EBInet registered user, where such bots are unable to spoof activation of a trusted path one or more physical button activations.

In some embodiments, EBInet arrangements support the use of contemporaneous, at least in part biometrically based, identification information sets for, for example, computing resource and/or event instance sets' respective identification, trustworthiness evaluation, authenticity and/or other integrity analysis, rights management (such as authorizing access to a sensitive web site and/or data store based on usage rights attributes associated with a user's identity), and/or managing auditing (for example provenance management) of EBInet related events/activities.

EBInet resource and/or event/activity instances' respective at least in part biometrically based identification information instance sets, in some embodiments, support:

(1) User and/or participant evaluation of the suitability of, and/or managing the use of, computing resource instances (documents, emails and texts, software, web pages, databases, networks, hardware components, appliances, human resources, value chains, digital currency, and/or the like); process/event instances (such as communication process sets such as communication protocol execution); and/or activity instances (e.g., online banking, online shopping, physical entry management, video networking, and/or the like). Such evaluation and/or managing may, at least in part, employ human person near-existential or existential quality at least in part biometrically based human identifiers and resource and/or event/activity instances' respective asserted/stipulated characteristics (e.g., qualities to specified purposes, effective facts, contextual purpose expressions, and/or the like), wherein, for example, user evaluation of an REAI's suitability is based on a user's and/or instance participant's operative purpose set (where a set is one or more);

(2) At least in part, standardized and interoperably interpretable certifying and/or other informing, asserting, and/or stipulating regarding suitability (e.g., usefulness, trustworthiness, compatibility, competence), by human stakeholder persons, of person respective resource and/or event/activity instance set identification information sets. Such certification and/or other informing involves, for example, stakeholder persons personally endorsing (and/or otherwise associating their identity as an attribute set information set regarding) the integrity, authenticity, validity, performance, applicability, and/or the like, of (a) identification information sets' respective content sets, and/or (b) identified REA instances' respective specific subject matter instantiations (e.g., an identified software program, electronic document, web site, human "participant" (e.g., expert), and/or device arrangement). Such identification information of such stakeholders may, in some embodiments, be evaluated as suitability informing attribute sets for their respective (e.g., associated) REA instances' identification information sets and/or respective subject matters.

(3) Managing resource and/or event/activity instances' authorization, usage, respective subject matter (e.g., rights management related) operations, and/or participation. For example, such managing may be performed by and/or for respective resource users and/or event/activity participants, where such authorization, usage, and/or participation comprises, at least in part, rights, consequences, and/or purpose fulfillment process sets.

EBInet can securely supply, from AFDs, at least a portion of biometrically acquired identification information sets (and/or identification information at least in part derived therefrom) within "contemporaneous" time periods of such information's biometric acquisition, where such acquired information may be securely "carried" by RCFDs, and made available, as appropriate, by an EBInet device arrangement for later, contemporaneous (e.g., as securely specified by policy) use.

In some EBInet embodiments, computing activity participants' respective identification, evaluation, and/or management of resource instance sets at least in part employs standardized and interoperably interpretable subject matter characterizing identification information, where such information may respectively include:

(a) unique instance one or more subject matter identifying information sets that can be used to at least in part stipulate and/or validate, for example, a hardware instance's (an at least in part hardware resource's) identity, and where such hardware subject matter's manufacturer's one or more identifying information sets may include embedded in such hardware unique subject matter identifying information comprising, at least in part, one or more identification information securely maintained secrets, and/or (b) attributes informing as to suitability for user respective purposes, where such attributes respectively comprise or are securely bound to (i) such subject matter instance one or more identifying information sets, (ii) instances of one or more identifying information sets for respective resource instance groupings (e.g., where instances are members of an identified class), and/or (iii) subject matter one or more attribute information sets, such as identification information for REAIs that respectively comprise identification information of such subject matters, such attributes, for example, comprising identification information for a document's or email's stakeholder, such as an author, and/or provider such as a sender.

Such identification information instance sets' respective attributes may, for example, also include one or more specified, at least in part standardized and interoperably interpretable (a) purpose and/or contextual purpose quality to purpose (e.g., cred), approximation expressions (e.g., specifications), and/or (b) testable facts (for example, PERCos effective facts), where such attributes can be used to assess appropriateness of respective one or more REAIs' instance sets' subject matters in satisfying one or more user purpose related computing functions.

In some embodiments, EBInet identification information sets may include one or more unique identifiers for respective resource and/or event/activity instance set subject matters, where such identification information sets respectively have one or more securely associated nearly existential or existential quality biometrically based person certifications (e.g., using EBICerts).

Such at least in part biometrically based certification (and its information content) can be employed, at least in part, to certify, otherwise attest to, and/or otherwise supply information validating and/or otherwise indicating, suitability in fulfilling or otherwise contributing to fulfilling, e.g., through effectiveness, trustworthiness, reliability, relevance, performance, and/or the like, user computing events'/activities' respective purposes.

In some embodiments, REAIs each securely include and/or reference one or more identification information sets. Such sets include subject matter unique identifiers that comprise one or more unique descriptors of resource and/or event/activity instance sets' corresponding subject matters, such as unique, serialized abstract identifiers for the respective specific copies of a software program, such unique descriptors representing/identifying/linking to the resource and/or event/activity sets' respective specific subject matter instances. Such identification information sets may securely reference and/or securely include unique item specific subject matter and/or subject matter instance, identity information, such as, for example, subject matter model version identifiers, and/or company and/or model associated instance specific serial numbers, and/or hardware instance specific embedded manufacturer provided unique secrets, and/or such secrets' securely associated, respective information instances, where such secrets and/or secrets' associated information instances were incorporated, at least in part, to uniquely identify different computing resource device and/or other REAI arrangement instances. In some embodiments, such identification information may in part further include one or more reputational (e.g., quality to purpose) and/or other contextual purpose and/or testable fact (such as PERCos effective fact) item attribute information sets, and/or employ other attribute methods and systems.

In some embodiments, EBInet one or more item identification information elements as described herein, can be securely combined with respective stakeholders' human at least in part near-existential or existential quality biometrically based identification information to form specific to one or more humans' resource, device, and/or event/activity instance sets' respective instance composite, at least in part biometrically based, identification information sets. Using tamper resistant environments, such combining activity can be performed during resource and/or event/activity instance subject matter IIS publishing (e.g., when publishing an identification information set for a document or other REAI set, such as when saving a software program, when sending an email, text message, performing a video-conferencing and/or other "live" communication event, and/or when using an internet banking arrangement). Such an in part biometrically based composite information set may then be used as a human person associated resource and/or event/activity instance set identification information set, where such an information set is securely created, for example, for use during a secure process publishing event/activity instance.

In some EBInet embodiments, provisioning of such a near-existential or existential quality, at least in part biometrically based identification information set for a resource and/or event/activity instance set publishing event can occur contemporaneously with, instead of operatively simultaneously with, a stakeholder's and/or user's respective biometric identification information set acquisition. Each such composite identification information set can be at least in part cryptographically protected, for example using one or more cryptographic hashes (which may be based upon using at least a portion of an identification instance set's biometric information in generating one or more cryptographic hashing keys), and where such hashes may be stored as one or more secure tokens. Each such composite identification information set can be maintained as an authentic and reliably verifiable information set. Such a set may be used, for example, in computing activity authorization (e.g., authentication of an authorized user) and/or in stakeholder signing (e.g., certifying) of, and/or in identification, evaluation, and/or management of, such a set's associated resource and/or event/activity set subject matter instance set, and/or associated one or more stakeholders and/or other subject matter one or more attributes.

In some embodiments, at least a portion of a composite identification information set, and/or information securely at least in part derived therefrom, comprises:

(a) at least in part biometric identification based information that uniquely distinguishes one or more stakeholder humans who are respectively associated (e.g., as stakeholders, which may be CertPers) with specific resource and/or event/activity instances' information sets, and (b) identification information sets for respective at least one of:

(i) one or more specific such stakeholder humans' respective one or more EBInet electronic device arrangements, and/or one or more other Big Resource subject matter resource instances such as, for example, one or more pharmaceutical, food supply, and/or electronic component tangible instances, and/or one or more intangible documents, software programs, communication instances/sessions (e.g., email, text), digital currency, and/or webpages, and (ii) one or more such stakeholder human associated respective process and/or event/activity sets (in this context, and generally herein, an event/activity set comprises, at least in part, an EBInet arrangement related resource and process set, for example, for a content publishing event/activity, a bank transaction event/activity, a secure communication event/activity, a texting or emailing event/activity, a biometric information acquisition event/activity, and/or the like), where, for example, such one or more events/activities are respectively at least in part made up of a set of purpose related one or more processes, and are respectively further comprised of/involve one or more subject matter resource instances (where a subject matter resource is comprised of one or more intangible and/or tangible resource instances).

In some embodiments, EBInet identification information acquiring and/or using device arrangements securely and reliably produce at least in part biometrically based human identification information sets (such identification information sets may include human person one or more unique identifiers, such as an identification number, other unique code or designator, and/or may, for example, be at least operatively anonymous regarding societal identifying attribute information). Such identification information can be used to at least in part enable provisioning human biometrically (e.g., biometrically derived) identifying information to other computing environment EBInet device arrangements to satisfy identification information requirements. Such requirements can include receiving device arrangements using such information for computing event/activity process sets (e.g., certifying, identifying, and/or authorizing and/or otherwise governing), such as for EBInet publishing (as may be securely maintained or ephemerally (short period) employed) resource and/or event/activity instance sets' identification information sets. Such identification information sets and/or information derived therefrom can be employed, at least in part, to ensure the trustworthiness, integrity, authenticity, identifiability, evaluability, digital rights compliance, and/or other situational suitability (e.g., policy, such as specified rules and controls, compliance) of human, device and/or other such computing resource, process, and/or event/activity set one or more instances.

In some EBInet embodiments, one or more portions of composite identification information may be securely acquired using a tamper resistant biometric identification information acquiring and forwarding (e.g., AFSD) device arrangement, and at least a portion of such identification information and/or information derived at least in part therefrom can be subsequently, and time contemporaneously (versus operatively simultaneously), forwarded for carrying and/or use to a receiving device (RD) EBInet compliant arrangement. Important to EBInet implementations, acquired human biometric identification information comprises at least in part human near-existential and/or existential quality identifying information, where such information can be reliably used in identifying at least one of resource and/or event/activity instance set human stakeholders' specific participation in, certification of, and/or for authorizing, stakeholders' respectively related computing environment activities. Such EBInet human specific identification can inform regarding an instance set's stakeholder associated, human intent and/or suitability, and/or by extension the suitability for respective users' purposes of such stakeholders' associated computing resource and/or event/activity instances.

In some embodiments, such stakeholder human, and such associated resource and/or event/activity identification information may be used to inform as to the value of, and/or to audit and/or otherwise characterize, and/or authorize and/or otherwise manage, the use of one or more computing resources and/or event/activity instance sets. Such characterizing, informing, and/or managing techniques may include, for example, standardized and interoperably interpretable, quantized quality to purpose assertion specification sets (e.g., Cred), and/or Effective Fact (EF) fact stipulation and test specification sets.

In service of trustworthy computing, in some embodiments, a computing environment resource set may comprise EBInet compliant device arrangements whose respective identification information sets comprise secure EBInet compliant identification information, such identification information sets containing and/or otherwise securely associating, at least in part, respective manufacturers' one or more employee and/or other agents' persons" respective biometrically based identification information sets, and/or one or more users' and/or owners' persons' respective biometrically based identification information sets (such information sets used, for example, in performing stakeholder certification (e.g., where such persons are CertPers) of REAIs and/or REAI respective IISs). Such sets may securely contain and/or be securely associated with one or more uniquely identifying manufacturer supplied secret information sets (e.g., one or more securely maintained secret keys and/or key associated information). Such device arrangements' identification information sets may be used to inform as to the value of, and/or as to whether to allow interaction with and/or use of, one or more such device arrangements and/or associated computing resource and/or event/activity instance sets. Such identification information sets may also, or alternatively, provide information for informing as to the suitability of—including, for example, whether to allow, and/or otherwise manage—interaction with, such one or more device arrangements' stakeholder one or more persons.

For example, a stakeholder's electronic device's EBInet compliant identification information set may securely comprise, in some embodiments:

(a) at least in part device uniquely identifying information, such information based at least in part on manufacturer and/or other device stakeholder (supply, value, and/or other commercial chain party) one or more securely communicated and/or otherwise provided, and securely maintained, information sets (for example, secret information sets which are respectively, in some embodiments, securely associated with their corresponding, publicly available device identifying information instances such as instances' respective certificates, such as EBICerts), and (b) such device's one or more device associated stakeholder human (owner, family member, employee, agent (including, for example, a guardian (e.g., a supervising person)), and/or the like) at least in part biometrically based identification information sets, wherein such stakeholder human one or more identification information sets, in some embodiments, may in part further securely include and/or reference one or more PERCos identification information set stakeholder quality to purpose and/or effective fact instance attributes.

In some embodiments, EBInet electronic device arrangements' identification information attributes may, for example, respectively securely include revision number information, manufacturing locations (e.g., street addresses, cities and/or countries of origin), and/or manufacturing and/or shipping times and dates information. Such attributes may further include biometrically based information acquired from device arrangements' respective one or more persons, for example, SVCC stakeholder one or more persons. Such biometrically based information instances may respectively comprise one or more employees and/or other agents of a device arrangement's respective one or more manufacturers, wholesalers, distributors, value adding modifiers, retailers, shippers, dispensers, purchasers (e.g., instance owners), and/or other one or more relevant parties, such as SVCC parties. Such information may comprise at least a portion of an EBInet electronic device identification information set and different such biometrically based information may be securely, sequentially acquired as such a device moves through a manufacturing, distribution, acquisition, and usage life cycle.

In some embodiments, EBInet device arrangements (e.g., RIIPU and/or NIIPU arrangements) may be used, for example, in formulating and managing identification information sets in support of, for example, SVCC and/or other serialization management of tangible goods (e.g., goods in shipping transit). Such management may involve creating/publishing one or more identification information sets characterizing, for example, event/activity instances' respective subject matters. Such subject matters may comprise any identifiable tangible object such as clothing, pharmaceuticals, food products, appliances, electronic components, jewelry, raw materials, construction materials, vehicles, machinery and/or components thereof, and/or the like, and/or event/activity respective instances involving the foregoing. Such identification information may be used in such tangible item set SVCC electronic auditing, other administration, distribution, acquisition, and/or other associated activity, e.g., usage/rights, management monitoring and/or control.

In some embodiments, such as various SVCC embodiments, EBInet acquisition and receiving component device arrangements operate in conjunction with network related administrative arrangements. EBInet device arrangements may include, for example, near-existential and/or existential quality biometric identity acquisition and forwarding stations (AFSD arrangements), and mobile receiving, carrying, and forwarding device arrangements (RCFDs), and may further include fixed position device arrangements, such as those embedded into building infrastructure (e.g., for access control and/or rights management, employee and/or other human traffic and/or location auditing/management (e.g., using AFDs), manufacturing control computers, manufacturing and/or other robots, IoT arrangements, household appliances, and/or the like).

Such network connected arrangements can resolve important challenges by providing, for example, highly reliable and practical contemporaneous near-existential and/or existential quality biometric identification implementations in cost effective, adaptable, and user-friendly arrangements. Such device hardware and software arrangements can support, for example, social networking, communications, and cyber security sensitive applications where assessing stakeholder motive(s) and/or suitability may be critical to secure/safe and/or otherwise appropriate use of computing resource and/or event/activity instance sets. Where cyber security, or trustworthy and reliable social and/or commercial networking or communications, is a high priority, the use of such EBInet device arrangements, particularly in conjunction with PERCos one or more stakeholder attribute information sets (where attributes may at least comprise stakeholder Cred and/or EF attributes), can provide motive, intent, and/or other suitability evaluation tools for determining (or estimating) whether any such resource and/or event/activity instances' trustworthiness and/or other suitability satisfies user purpose considerations.

In some embodiments, EBInet at least in part practicalizes existential human identification and liveness information acquisition and authentication by employing biometric emitter and sensor arrangements in biometric identification information acquisition and biometrically based person identity forwarding "stations." Such stations are used to acquire, and then forward, at least in part biometrically sourced, person identifying information and/or information derived therefrom, to one or more EBInet receiving device arrangements. Such receiving arrangements can employ contemporaneous (within a specified time interval and/or other timing condition set) such biometrically acquired information and/or information derived therefrom, and/or forward such information and/or information derived therefrom, to further receiving device arrangements. Such at least in part biometrically based information can be used in the governance and/or auditing of event/activity one or more process sets that require highly reliable user identification information. Such stations (which may, for example, be practically implemented as portable, but not highly mobile arrangements) can employ contemporaneous existential identification, including liveness and/or other existential determination, technologies without the implementation cost (cost to produce), size, packaging, energy considerations (battery power consumption), emitter and sensor placement, plural device (e.g., mobile, laptop, desktop, IoT, larger device, etc.) implementations, and other commercial considerations, that would make widespread, redundant use of costly, existential quality, operatively simultaneous, identification information acquisition systems commercially impractical, and under various circumstances, user unfriendly. Such acquisition and forwarding stations, in conjunction with EBInet near-existential and/or existential quality biometric recognition technologies, provide practical and reliable, in part biometric, composite identification information solutions for highly secure identity assurance necessary for dependable, trustworthy subject matter resource and event/activity instance sets' identification information sets.

In some EBInet embodiments, at least in part stakeholder person and/or other user biometrically based identification information use is at least in part governed in accordance with securely maintained and enforced contemporaneous time interval management respective specifications.

In some such embodiments, existentially reliable (e.g., for a period of time) resource and/or event/activity instance set composite identification information sets can securely include and/or otherwise be securely integrated (e.g., included and/or associated) with time interval and/or other time-based information to form at least in part time-based (e.g., time limited) and secure acquisition, receiving, using, carrying, and/or forwarding related information sets for time-based management. This combining of time, and REAI identification information, supports practical biometric identity acquisition and usage arrangements, wherein acquisition stations (e.g., AFSDs) are designed to, for example, manage the time-based forwarding of identity information to one or more identification carrying and/or using smart device identity arrangements (and/or managing the receiving of, and/or use of, such information) in accordance, at least in part, with securely maintained time related specifications (e.g., using a secure (trusted) clock and tamper resistant hardware logic and memory, e.g., tamper resistance).

In some embodiments, one or more such EBInet device arrangements may function as acquiring, receiving, carrying, using (e.g., evaluating suitability, event/activity governing), and/or forwarding, "hubs", where such hubs may comprise, for example, such users' respective one or more network devices (e.g., smart routers), smart IoT devices, and/or smart mobile devices (e.g., smartphones, smart watches, smart pendants, smart jewelry, smart eyeglasses, and/or the like). Such devices may have respective embedded and/or connected and operatively isolated EBInet compliant components, such as devices' respective EBInet modular component arrangements (e.g., RIIPUs, NIIPUs, and/or the like), the foregoing component arrangements enabling secure, isolated at least in part biometrically based identification information auditing, and/or resource and/or event/activity instance set management (e.g., REAI related authorization and/or other rules and/or controls governance). EBInet smart device, and/or other EBInet, arrangements may function as identifying, carrying, using, and/or forwarding device arrangements that have received user biometric identification information within specified, authorized one or more constrained according to time (and/or context), instances.

In some embodiments, EBInet at least in part biometrically based identification information set one or more instances are embedded, overlaid, and/or otherwise inserted/integrated into digital and/or physical information objects such as documents (e.g., news reports or multi-party contracts), images, audio, video, data streams, webpages, and/or other data files (whether saved or rendered), where such identification information comprises near-existential or existential quality at least in part biometrically based identification information sets. For example, such information sets, when provided as watermark information sets, can be provided in the form of visible and/or concealed watermark (e.g., fingerprint) information sets, such as in the form of one or more overlay information sets printed on a printed page, such as printed as a visible overlay on each page of a digital contract as authentication/certification information set affirming a document's, such as a contract's, contents and/or as integrated into the shape and/or dot pattern of the rendering of text and/or images. Such watermarking can be in the clear and/or in part or in whole encrypted so as to embed at least in part biometrically based information into such a rendered object and where such rendering may provide and/or otherwise employ an EBICert for such an object. Such watermarking can provide biometric authentication of such information objects (through party presence, physically or virtually during creation and/or physical rendering and/or publishing), as demonstrated, for example, by using RCFD carried, contemporaneous at least in part biometrically based identification information to supply such information to reaffirm/authenticate such an object (e.g., reaffirming the authenticity of an already watermarked information object). Such an information supplying and/or affirming process set can occur operatively at the time of saving such an object and/or at periodic and/or otherwise scheduled times, and/or at event/activity associated times such as at signing time(s) of a contract or when affirming/reaffirming the authenticity of a document.

Such watermarks may be visible (e.g., diagonal watermarks, bar code page footers, and/or the like) and/or not evident/visible (e.g., digital watermarks inserted and/or otherwise embedded in digitally stored, and/or physically rendered objects) through, for example, information conveyable through font dot pattern and/or shape modification, and, for example, inserted into (used within) digitally saved and/or printed data files or one or more portions thereof. Such insertion can occur during object saving, editing/modifying, rendering, compiling, using, registering, publishing, and/or communication (such as when communicated for registration with one or more organization and/or cloud object registration and authentication services), and/or can occur during object rendering (or rendering of at least a portion of any such object). Such rendered objects may take the form of physically printed, displayed, and/or played instances provided in the form of PDFs, MS Word documents, presentation materials, image files, videos, and/or audio files (inserted audio watermarks may employ beyond human audio frequency/wavelength range sonic data representations). Such watermarks may be used for object evaluation, including to "prove" the authenticity, applicability, reliability, quality, stakeholder identity, and/or other relevant characteristics of contracts, news reports, scientific studies, and other data representations, and/or to enforce an object's stakeholder rights management. Such watermark information can comprise cryptographically protected, hashed and securely maintained and/or communicated, at least in part nearly existential or existential quality, biometrically based identification information (e.g., contained in an IIS), for example, received from and/or at least in part based upon, an RCFD forwarded contemporaneous, at least in part, existential quality, biometrically based identification information one or more sets.

Such information sets can, when included within a rendered object, provide an associated object identification information set (e.g., a securely rendered object embedded, characterizing/identifying IIS). Such an IIS may include securely acquired and stored time and/or location and/or other process set associated information regarding an object's—such as a contract's, multimedia's, or software code's-creation, modification, communication, rendering, usage, registering, publishing, and/or execution instances. Such identification information can further include one or more portions of an object's one or more EBInet device arrangements' securely recorded creation, modification, communication, rendering, registering, publishing, usage, object content signing, and/or execution event/activity related identification information.

In some embodiments, digital objects and/or tangible instances of such objects (e.g., object content and watermark arrangements) and/or such objects' respective certifying and/or signing at least in part biometrically based identification information set watermarks (e.g., watermarks in the form of EBInet composite device identification information sets provided as an information reductions (e.g., digital hashes)), can be securely registered, for example, with one or more independent parties (e.g., one or more organization administrative and/or cloud service registration utilities) and/or on an EBInet device arrangement using "local" registration, the foregoing for later digital and/or tangible object (and/or portion thereof) signing/certifying authentication and/or other validation (such authentication and/or other validation may include, for example, validation of object content and/or object watermark instances' information content). Printed instances of objects that employ EBInet based watermarked information can be securely scanned and interpreted by a computer scanning arrangement where, for example, a printer/scanner incorporates a hardened EBInet modular component protected processing environment (PPE) arrangement (such as an RUD that incorporates a NIIPU) that can be used to securely identify and/or interpret rights associated with rendered such watermarked objects. A document's watermark can, for example, carry person identifying and associated rights information to discern whether a physically present user identified by the user's RCFD forwarded IIS information satisfies watermark control information identifying the attributes of, and/or specifically who (e.g., biometrically identified person) may copy (and/or otherwise use) a given document. Such PPEs could also, in some embodiments, interpret printable digital objects prior to printing to evaluate and/or otherwise interpret digitally stored watermark information and determine, for example, through the use of a rights management arrangement, a user's right to print such a watermarked object and/or to display at least a portion of such watermark information.

In some embodiments, isolated, protected processing environments can be used to respectively interpret watermarks/fingerprints in files (may be scanned from hard copies of respective tangible paper based documents), where such PPEs interpret clear text and/or encrypted at least in part biometrically based identification information sets, reading/extracting such sets from their respective electronic and/or hard copy watermarks. Such object interpretation can, for example, render for user and/or EBInet device and/or service use as EBInet modular component and/or service, interpretable, e.g., clear, text in usable form, one or more portions of respective such embedded and/or otherwise securely associated at least in part biometrically based watermark identification information sets. In some embodiments, at least in part near existential and/or existential quality at least in part biometrically based identification information may be rendered in the form of, for example, audio information employing encrypted ultrasound signals, where such communication information may be acquired and for example decrypted using an EBInet compliant RD arrangement associated audio ultrasound receiver/sensor arrangement and a secure, hardware isolated PPE modular component arrangement. In some embodiments, video and/or other image rendering of data files may include hidden, encrypted information "video (e.g., video may comprise video image signal and audio signal) subchannels" that provide, at least in part, nearly existential and/or existential quality biometrically based identification information, such as one or more IITs and/or EBICerts. Such channels can be embedded into channels' respective video objects in the form of interpretable and decryptable modifications of source images (e.g., modifications/modulations of, for example, not-normally and/or otherwise specifically specified colors/wavelengths, locations, and/or intensities/brightness, and/or periodicity/frequency of such signal components, within images comprising a video sequence). Such information arrangements can respectively produce, for example, video data file instance embedded information that is not normally or feasibly/practically identifiable and/or is non-interpretable (e.g., encrypted information and absent respective decryption keys) in the absence of an EBInet secure interpretation arrangement. Such EBInet watermark implementations can, for example, be used in identifying and preventing improper use of "fake" objects such as audio, pictures, and/or videos ("Deepfakes").

In some embodiments, such image rendering modifications/modulations can carry at least in part biometrically based at least in part encrypted identification information in the form of embedded image/pattern and/or image/pattern-sequence watermark carried information sets. Identification information for such object watermarks can be securely provided to receiving RD and/or RUS arrangements, such as automatically forwarded by users' respective RCFDs (e.g., using pBIDE), when such objects (to be watermarked) are respectively saved, edited/modified, rendered, compiled, used, registered, published, communicated, and/or the like by their creators, modifiers, distributors, users, and/or other commercial, social, societal, and/or other chain of handling and/or control parties. Such information, in the form of such watermarks, may be subsequently readable and processable, and rendered in cleartext form, by EBInet compliant RD arrangements such as a user's compliant RCFD arrangement.

In some EBInet watermark embodiments, watermarks may, at least in part, not be identifiable by device arrangements' users who are playing or reading watermarked data files—where, for example, at least in part encrypted respective watermarks may be at least in part hidden in such files. For example, an EBInet compliant watermark may be hidden in such a manner that only an authorized stakeholder, user, and/or device arrangement (e.g., such an entity (e.g., a NIIPU or like RD arrangement) having a registered, authorized at least in part biometrically based identity and/or embedded identifying secret) can identify, decrypt, and/or otherwise interpret and render, communicate, and/or save such information in cleartext (unencrypted) form.

In some embodiments, a computer printer (which may be a printer/scanner) can support, for example, an EBInet embedded secure hardware modular component arrangement (e.g., a NIIPU arrangement) within a parent printer arrangement, where a printer's RUD can, for example, receive from an RCFD at least a portion of a user's at least in part biometrically based identification information (e.g., based on contemporaneous biometric information). Such information can, with no user interface "friction", be transparently provided (forwarded) to such a printer's RUD arrangement for secure binding (e.g., object watermarking) to a document that is about to be (or is being) printed. Such forwarding may be performed by, for example, an RCFD communicating an EBInet contemporaneous, at least in part biometrically based, identification information set to such RUD in response to a user selecting a print function, such as selecting "securely print a watermarked document" function. If available and provided, such identification information, or one or more portions thereof, can be at least in part cryptographically embedded into a visible and/or hidden printed watermark, which may be human visually unperceivable, for example, involving very subtle (e.g., not visually apparent) and uninterpretable (encrypted) modification(s) of one or more type fonts in a cryptographically controlled (e.g., requiring a decryption key) manner.

In some embodiments, a printed object (which may be in the form of, and/or include, one or more images) can be scanned (or photocopied) using, for example, a secure scanner (or camera) associated/embedded RUD modular component isolated protected processing environment, such processing environment able to securely interpret/extract watermark cryptographically protected information (e.g., read using cryptographically hashed information for validation purposes, such hash information corresponding to object composition). Such an RUD, an RCFD, and/or an associated network-based authentication service may authenticate/validate such an object (and its associated watermark arrangement) against, for example, a registered instance of such object, and if authentic, and such RUD, RCFD, and/or service, and/or its associated user, has sufficient object associated rights, a display of such authenticity information result can be provided on an RCUFD smartphone or other compliant computing, such as a laptop or tablet, arrangement, in cleartext form, and where such object, in for example digital form, may be securely stored. As with many other EBInet information embodiments, watermark object identification information may securely include time, date, location of signing and/or other stakeholder activity, and/or other object characterizing information, such as history/provenance, object (a) creation, (b) receiving, (c) forwarding, (d) storing, and/or (e) modification, and/or EBInet compliant, associated device arrangement, information.

In some embodiments, such a watermarked object and its embedded identification information, may, for example automatically, at the time of its printing, other rendering, and/or other event/activity, be communicated through an associated EBInet device arrangement (e.g., a printer, smartphone, laptop, tablet, and/or network communication, arrangement) to a cloud and/or organization registration service where such information may be stored, for example, for auditing and/or future document authentication and/or evaluation purposes.

In some embodiments, when an EBInet compliant RUD arrangement enabled image sensor (e.g., in a scanner) reads such an object (e.g., a document), where such a sensor, for example, may be a component of an EBInet compliant parent smartphone or other mobile device viewing such object using its camera arrangement. Such an embedded information instance may be securely interpreted, and one or more portions of such embedded information and/or such document's content (if such object is encrypted) and/or such object's identification information, can be presented in clear, unencrypted form to such a device's user. Such registered information may also be stored (e.g., as a registered instance) on such a parent smart device (e.g., in an at least in part encrypted form), and/or at least a portion of such object (such as its employed watermark's at least in part nearly existential or existential quality contemporaneously acquired, and RCFD carried, biometrically based identification information) can be authenticated and/or otherwise validated through comparison with such organization, device and/or service arrangement, and/or cloud service stored, registered object identification information set. Such stored registration information may be arranged by object type, content, and/or one or more associated organization and/or human specifically identified parties, object purposes, object sensitivities, and/or the like.

In some embodiments, EBInet near existential or existential quality at least in part contemporaneous, biometrically based identification information is received by RD specification compliant printers (for example transparently upon printer request) from RCFD arrangements communicating respective, carried contemporaneously produced at least in part biometrically based identification information sets. Such information sets are used to create printed documents and images that, in some embodiments, respectively include at least in part visible watermarks comprised at least in part of embedded information sets that are used to ensure document integrity, provenance, specified usage governance, stakeholder commitments, and/or otherwise provide pertinent information characterizing a printed, displayed, stored, and/or otherwise manifested/memorialized for visual interpretation, data file, such as a document and/or video. Such watermarks may be visibly displayed on printed pages (and/or other printed items) in one or more standardized manners (e.g., including copyrighted as respective design arrangements and/or distinctly branded) and may convey the identity of one or more parties having a stakeholder interest in any such printed item(s)). Such a watermark may include other content object identification related information, as well as may include the brand of a watermark associated platform, service provider, and/or application and/or other stakeholder, organization.

In some embodiments, a watermark's incorporated identification information may include one or more types of provenance related information securely processed, for example, using an EBInet modular component NIIPU arrangement, such as:

1. A document's location(s) of preparation(s) (including, for example, events/activities, such as modifications) and/or execution(s); time(s) and/or date(s) thereof;
2. Device arrangements and/or network locations employed in document preparation(s) and/or execution (s) thereof;
3. Document event/activity related EBInet users'/other document handling participants' respective at least in part near existential or existential quality biometrically based identification information (such as based upon EBInet AFSD contemporaneously acquired biometric information);
4. One or more identifying information instances (e.g., unique device identifiers, manufacturer identifiers, version numbers, and/or SVCC one or more device stakeholder person identifiers) regarding device arrangements respectively employed in the signing of content instances;
5. Rights respectively associated with one or more REAI event/activity stakeholder persons, for example where such persons are at least in part biometrically identified by such watermarked information;
6. Subject matter (e.g., content) control information, for example, securely managed control information that, when at least a portion of a document's watermark arrangement is interpreted, securely causes one or more content instance secure governance processes (e.g., access rights control and/or communication notifications such as network communicating to an administrative arrangement that such document content is being reproduced, displayed, and/or the like).

In some embodiments, data files (e.g., content instances) rendered for visual interpretation can be at least in part encrypted and carry embedded readily visible and/or normally hidden (not visibly apparent when printed and/or displayed) watermarks, where such information may be encrypted and require one or more key and/or other secret (e.g., embedded unique identifier) information instances for decryption. Such key and/or other secret information instances can be respectively used to enable automatic interpretation and authentication and/or other verification of data file contents, including for example watermarked information sets. Such interpretation and authentication can be performed automatically by an EBInet compliant device and/or cloud service arrangement that reads and interprets such information, and, for example, checks such information against an organization's and/or cloud service's REAIs' registered respective database stored identification information sets and/or subject matter content to determine the authenticity, for example, of data file content. Such checking can include, for example, watermark securely embedded attribute information such as time, date, address, organization/department, and/or subject matter when/where created, and/or such information set's related at least in part near existential and/or existential quality AFD acquired biometric information based stakeholder and/or device composite identification information.

In some embodiments, the registering events of such identification information set, and/or subject matter content, instances can occur during such instances respective secure communication events. Such events can be respectively initiated by EBInet at least in part biometrically based identification information using arrangements (such as RUDs) which communicate to such one or more registration services upon saving, printing, communicating, other using, and/or other event/activity. Any (or plural) such registered instance, one or more instance portions, and/or registration information derived therefrom, can then be used in subsequently authenticating and/or otherwise validating an REAI, or one or more components thereof, when such REA instance is, or one or more portions are, displayed and/or printed and/or otherwise rendered. For example, when an EBInet at least in part biometrically based identification information compliant printer prints a document, the printer, and/or a user's RCFD parent smart device that incorporates an EBInet modular component arrangement, can employ such smart device arrangement to display information regarding whether such identification information set, and/or subject matter content, instances or one or more portions thereof, are authentic based upon an EBInet watermark and/or can display document related attribute information carried by, and extracted from, such watermark, where, for example, an RUD and/or such an RCFD arrangement can at least in part decrypt and extract information from such watermark. In some embodiments, such extracted information may also include, for example, unique alpha and/or numeric identifiers of such identification information set, and/or subject matter content, instances' associated one or more stakeholders and/or such instances' production, modification, and/or communication device arrangements.

In some embodiments, EBInet identification information set, and/or subject matter content, instances' watermarking process set data files can provide an integrated hash of document characteristics and stakeholder (e.g., CertPer signer(s)) characteristics, including at least in part nearly existential or existential quality biometrically based, uniquely identifying information sets. Such information sets may be embedded in an identification information set, and/or subject matter content, instance's data file during document creation, modification, and/or during registration of such data file with a validation service. Such information sets may be also be used in online, and/or physical printed form, document signing using special purpose biometric desk surface/accessory and/or pen arrangement (e.g., having a built in biometric reader arrangement, for example functioning as an operatively simultaneous biometric identification arrangement validating the actual physical presence of a party identified by (and matched to) a near existential or existential quality contemporaneous biometrically based identification information set) and/or associated printers, where instructions to print biometric recognition identification information activity sets cause respective participating persons' biometric information sets (and/or information derived therefrom) to be embedded as respective visible and/or hidden information sets upon and/or into respective documents/data sets during printer printing, communication, and/or saving processes. Subsequently, smart devices such as smart scanners (which may be, for example, printers/scanners) and/or smartphones with, for example, respective embedded EBInet modular component isolated protected processing environment arrangements that process watermark identification interpretative software and respective decryption keys, can use, for example, their respective image sensor (e.g., contact image sensor), and/or CCD and/or CMOS digital camera sensor, arrangements to read documents and produce corresponding, human interpretable data files and/or display visible, human interpretable information content sets, such producing and/or displaying resulting at least in part from decryption of visible and/or a hidden, at least in part encrypted, EBInet watermark arrangements' information content (or one or more respective portions thereof).

In some embodiments, EBInet arrangements can store, communicate, interpret, and/or display at least a portion of both a data file's subject matter content (e.g., a contract), and a data file's hidden watermark information, where, for example, an at least in part encrypted, nearly existential, and/or existential, quality biometrically identified stakeholder party's (document signer's, creator's, distributor's, notary's, and/or the like's) contemporaneous and/or operatively simultaneous at least in part biometrically based identification information set (in part resulting from the use of an AFD to acquire stakeholder party contemporaneous biometric identification information) is a portion of such watermark information. Such information set can be forwarded (communicated) to a printer and/or external computing arrangement (e.g., upon stakeholder authorization and/or specification, for example, transparently providing such information to a computer and/or printer upon request (e.g., using an EBInet arrangement trusted path instruction arrangement)) for preparing and/or printing an identification information set, and/or subject matter content, instance containing such one or more visible and/or hidden, embedded and/or otherwise securely bound, watermark information sets.

In some embodiments, resource and/or event/activity instances (i.e., subject matters) may be securely bound to and/or otherwise securely associated with respective, plural, at least in part biometrically based identification information sets. Such sets can be respectively provided, at least in part, by independent parties (such parties may use the same information set publishing platform (e.g., same secure, compliant publishing framework) supporting standardized, compatible, publishing), and/or at least one of such identification information sets may be at least in part comprised of plural separately delivered identification information sets that serve as component information sets of an aggregate at least in part nearly existential and/or existential quality biometrically based such identification information set, where portions of such component information sets are provided by different parties and at least a portion of such information sets respectively includes contemporaneous nearly existential and/or existential quality at least in part biometrically based identification information. Such an aggregate information set, for example may be structured as a master IIS (e.g., parent super class at least in part biometrically based IIS instance of a subject matter resource and/or event/activity instance (REAI)). Such master identification information sets have respective master IIS subset component (contextually appropriate) child IIS information instances (e.g., managed in accordance with applicable specifications and may, for example, at least in part biometrically identify different persons).

In some embodiments, when and if a child IIS of a master IIS is supplemented with non-master IIS information, the master can be updated (forming a new master version, for example, having the same unique root (e.g., class) identifier) with such supplementing (and/or altered) information to reflect its role as the superset REAI IIS at least in part biometrically based identification information set. Each supplemented/altered child (e.g., augmented) component set may employ at least in part biometrically based identification information where such biometrically based information uniquely identifies one or more stakeholder persons associated with at least a portion of a respective aggregate of information instances. Child IISs may be, at least in part, based on published/specified template frameworks (e.g., as to their respective field types and expressions), such as respectively published by a user's employer, affinity group (AAA, ACLU, NRA, IEEE, and/or the like), family group, social networking group, sovereign government, and/or the like. A user's RCFD may, for example, store such child IISs as individually deployable components of an IIS arrangement.

In some embodiments, an RCFD can store master CIISs and/or CBEIISs for respective device/persons and/or persons, such as individual and/or aggregate human grouping(s) (organization, family, and/or other aggregation of group member information), and a specific person may have a master, child(s), and/or plural individual IISs in an IIS arrangement, where one or more of such IISs may be available for rules and controls rights managed secure forwarding to EBInet arrangement compliant RD and/or RUS arrangements (e.g., based upon secure rules and controls information sets of, and/or securely associated with, individual and/or plural (classes/groupings) of such IISs). In such embodiments, component identification information sets' complementary and/or otherwise augmenting identification attribute information may comprise various forms of information instances, such as REAI characterizing testable effective fact and/or quality to purpose assertion information, and/or REAI audit and/or provenance information relevant to characterizing the subject matter of a master IIS.

In some embodiments, an EBInet device arrangement, such as an RCFD, may carry master IISs for a device, its one or more owners/users, and/or for device/user—and/or other—REAI CIISs, where each such master is a distinct resource object instance. A child IIS forwarded by an RFD (or AFD) may "draw" and compose its information set from any of its master IISs, and, if carried, from a received child that is produced from, for example, two or more master "parent" IISs. Master and child IISs may be globally and/or selectively published and registered as securely, e.g., cryptographically, protected REAI instances having their respective IISs and available from a network, such as cloud and/or other organization administrative identification information service.

In some embodiments, EBInet near existential or existential quality at least in part contemporaneous, biometrically based person identification information supports very convenient (e.g., can be transparently provided) identification information for social and commercial network opportunity, and threat, evaluation and decision making. Such identification information can securely, e.g., cryptographically, include and/or otherwise be securely bound to testable effective fact attribute information, such as a person's age, profession, certification, gender, criminal and/or civil legal background (e.g., lawsuits, indictments, convictions and/or the like), education levels/degrees/concentrations, affinity memberships, country and/or locale (e.g., city) of citizenship/residence(s)/workplace, and/or other non-societally identifying but highly significant attribute information.

In some embodiments, an at least in part contemporaneous, nearly existential or existential quality biometrically based attribute identification information set may include qualities for specified purpose fulfillments (e.g., quality to purpose specifications) and/or societally, and/or organization specifically, identifying information, as may be desirable or selected. Such highly informative identification information sets, for example as may be carried in a mobile parent smartphone's RCFD EBInet NIIPU modular component arrangement, can support transparent, effortless, fundamentally reliable person specific identification supporting informed evaluation and decision making by connected computing participants and/or their EBInet compliant computing arrangements.

In some embodiments, EBInet supports EIFF (Existential Identity Face Forward) (e.g., supplying an IIT) process sets comprising EBInet at least in part nearly existential or existential quality biometrically based identification information sets that are respectively forwarded to requesting or otherwise receiving specification compliant device arrangements in fulfillment of user and/or stakeholder REAI identification information requirements and/or usage functions. Such EIFF identification information provisioning can transmit fundamentally reliable human identity and situationally relevant attributes in a transparent to transmitter-user manner, subject to interacting EBInet arrangements' compliance with identification information forwarding and receiving policy specifications. Such EIFF process sets at least in part employ near existential or existential quality at least in part biometrically based identification information respectively employing secure component arrangements (e.g., NIIPUs) in a highly reliable and tamper resistant manner for use by FD and RD arrangements. Such identification information transferring can take the form of forwarding, from an EIFF supporting parent mobile device RCFD, situationally relevant at least in part contemporaneous biometrically based (for example, at least in part biometrically derived (e.g., determined)), identification information that can be used to securely and reliably authorize actions (events/activities), and/or at least in part be securely associated with and/or integrated into any computing resource's and/or event's/activity's identification/audit information set. Such forwarding EIFF identification infrastructure supports using existentially accurate human identification information sets for computing authorizations for, for example, pass/fail determinations, and/or other information usage consequences such as for enabling specified rights management, suitability assessment, and/or cyber security assurance.

In some EIFF embodiments, "master" identification information sets for respective REAIs are configured to support the extraction of a subset of applicable information elements for inclusion in such master sets' respective REAI child IISs, such child IISs composed by users and/or users' respective computing arrangements in accordance with specifications, and/or as situationally appropriate, for fulfilling respective user and/or stakeholder purposes. Such child identification information sets may be generated to provide contextually appropriate subsets of such master sets, where such subsets provide at least in part biometrically based identification information and may further provide situationally appropriate identification information, such as information consistent with user and/or other stakeholder respective purposes. For example, some contexts may appropriately call for different sets of sensitive personal attributes, such as one or more of social security number, confidential employee and/or other organization ID, age, street address, telephone number, health information (e.g., health disorder and/or genetic information such as blood pressure information, heart function information (e.g., rate, cardiograph and/or related, information), disease and/or accident history), financial information (e.g., credit score, income, debt, and/or donations), legal information (lawsuits, litigation/trial outcomes (e.g., judgements), settlements), family information (e.g., information identifying and/or otherwise describing parents, children, and/or other relations), and/or the like.

In some embodiments, a contextual identification information manager arrangement may determine, based upon, for example, human social networking purposes or organization supply chain management purposes, and their respective contexts, which elements and/or element combinations of an REAI IIS, such as a master REAI or specific child identification information set, should, or shouldn't, be made available in a given situation, for example as a child REAI nearly existentially or existentially accurate, at least in part biometrically based, IIS. In a social networking context, for example, certain one or more portions of user identifying information stored in a master REAI might not be made available to (e.g., if inappropriate, such as specified not to reveal through use in) one or more social networking persistently stored, or ephemerally formed and employed, IISs, for example such information usage regulation based on anticipated context of use of such information, such as purpose class (e.g., social networking with strangers).

In some embodiments, a contextual identification information manager arrangement can securely, contextually manage (e.g., control in response to contextual variables) the appropriateness of an EBInet device arrangement's receiving, forwarding, and/or using one or more portions of an identification information set. Such a contextual identification information manager arrangement can operate, for example, as an EBInet arrangement service set (e.g., operate on RIIPU, or NIIPU, arrangements (Root or Networked, Identification Information Processing Unit arrangements). EBInet modular component arrangements are secure, economic, protected processing environment hardware/software arrangements. They, at least in part, support the use of cryptographically protected IDs that are securely, cryptographically bound (such as in the form of UIDs) to respective intangible information objects comprising identification information sets that correspond to, e.g., identify/characterize, computing resource and/or event/activity instances. Such identification information sets comprise, at least in part, biometrically based identification information of stakeholders of such instances, where such identification information comprises information informing regarding respective such instances. EBInet RIIPUs incorporate secure governance of biometric near-existential and/or existential quality, stakeholder biometric identification information acquisition, securely combining both stakeholder biometric acquisition, and resource and event/activity instance identification information analysis and associated governance, functions into economic, compact, at least in part isolated, secure protected processing hardware/software arrangements. NIIPUs are used to securely govern use of at least in part biometrically based identification information, and may perform, depending on implementation, biometric identification information acquisition when used with, for example, parent arrangement sensor arrangements. In some embodiments, NIIPUs may securely govern the creation of IISs based on such biometrically acquired, or on received biometrically based, identification information.

In some embodiments, EBInet master and/or child IISs are used, as available and/or situationally appropriate, as operatively received, carried, forwarded, and/or processed by EBInet device, information arrangements. For example, mobile RCUFD (receiving, carrying, using, forwarding device) arrangements may receive from nearly existential or existential quality biometric information acquisition arrangements (AFDs), contemporaneous biometric IISs and/or identification information employed for creating at least in part nearly existential or existential biometrically based IISs, and such mobile arrangements may use, carry, and/or forward such information sets and/or portions thereof. Such information can, in some embodiments, be used, for example, by EBInet compliant receiving and using device arrangements (RUDs), where such information is supplied for a given social networking context (e.g., social interacting), a given professional activity (e.g., performing work), a given societal activity (e.g., paying taxes or entering into a commercial or other agreement/transaction), and/or the like.

In some embodiments, master IIS elements may be maintained as conditionally anonymous as described herein, and for example, one or more securely maintained (e.g., societally identifying) identification information elements (e.g., social security number) may be made available for use, such as with a child IIS, only under specified, strictly controlled circumstances, such as based on the circumstances of the exchange of IIS sets, securely in accordance with specified rules and controls, between compliant device and/or service arrangements. Such exchange may require satisfaction of conditions (have appropriate attributes) for another party, service, and/or device arrangement to accept/receive forwarded identification information, and/or be allowed to receive such information, the forgoing based upon circumstances/context of such interaction, including associated device, service, and/or biometrically identified person's rights/attributes and/or other, interaction associated, conditions.

In some embodiments, an EBInet EIFF identification information infrastructure employs a shared information repository arrangement, where information elements can be shared/employed in, and/or by, plural instance identification information sets. For example, a stakeholder person (comprising a resource instance) may be associated with a plurality of different resources, such as different devices, where such person has a stakeholder relationship with, and is a significant attribute of (i.e., a stakeholder regarding), each of plural different resources. In such an embodiment, a master IIS, and/or one or more resources' respective child IISs, descriptive of such stakeholder person, can comprise, that is be used as, a securely bound respective attribute set (e.g., second order) of such attribute set's one or more resources, and can comprise a component element of such one or more resources' identification information sets. Such stakeholder information can inform, for example, regarding the suitability of a stakeholder resource for a specified, and/or otherwise intended, user purpose, e.g., for user computing activity purpose fulfilment.

In some embodiments, an EBInet environment comprises, at least in part, a Pervasive Biometric ID Environment (a pBIDE). Such a pervasive ID environment means that at least in part contemporaneous biometrically based, nearly existential or existential quality identification information sets (IISs) are respectively carried by a variety of persons on their RCFDs for ubiquitous broadcasting to, or other communication to, RD arrangements for such arrangements' respective computing events'/activities' evaluation and/or governance. A pBIDE EBInet instance may be provided, for example, whenever one or more relevant and available IISs (e.g., EBICerts) are required and/or otherwise useful in enabling performance and/or auditing of an event/activity, such as when required for a person/RCFD composite to interact with an RUD, RUS, and/or another RCFD. Such use may be transparent and/or require little or no action and/or knowledge/notification on the part of an IIS carrying RCFD's user. Uses of IISs, such as IITs, for enabling event/activity purposes may include, for example, one or more of: accessing a secure database, visiting a secure website, opening a door lock, starting a vehicle, publishing an REAI IIS, performing a serialization supply chain instance, engaging in social networking, participating in a digital currency transaction (for example, using an EBICoin starting and ending digital coin/owner persons' (fused-identity entities) coin transfer digital coin set), and/or sending and/or receiving an email, text, or other communication (e.g., EBInet publishing and sending an email or text to a recipient person and EBInet RUD governance regarding such authorized person as a, or the only, party authorized to open such communication).

In some embodiments, an EBInet identification information carrying appliance (e.g., a person/RCFD) may be identified through use of a smart device's (e.g., smartphone's) near-field communication (NFC) interface in a process set comparable to "pay by phone" applications, where a smartphone user can walk up to, for example, a check-in desk, a store item set purchase check-out arrangement, or an entry control kiosk, and place/present the smartphone physically near an RD appliance's NFC (or other close range) interface (guided by, for example, a printed target). The smartphone and the appliance can then intercommunicate, and the smartphone's RCFD can communicate contemporaneous carried nearly existential or existential quality biometric identification, relevant other attribute, including any relevant E/A governance, information, and further, as may be required, the user may perform a smartphone-based operatively simultaneous biometric identification for authentication confirmation purposes to authorize an RD appliance to unlock or otherwise operatively respond based upon RCFD transmitted device/person identification information (e.g., in the form of one or more IISs), where such information can comprise both contemporaneous person near existential or existential quality, and operatively simultaneous smartphone biometric, identifying information.

In some embodiments, such use of pBIDE may include hailing other parties, such as through their device arrangements. Such hailing can be used to determine if one or more of other parties' respective IISs (and/or information components thereof) satisfy a search to find/identify who, for example in one's physical proximity, possesses one or more identification information specified attributes. Such attribute matching can satisfy one or more requirements as a precursor function set that needs to be first satisfied for an applicable event/activity to take place. A pBIDE precursor electronic interaction to explore matching attributes/interests, for example, can then lead to a direct electronic and/or person-to-person physically present interaction set. A few examples of such pBIDE launched activities can include RCFD pBIDE broadcasting of IITs and other RCFDs/persons receiving and responding to such broadcasts, this resulting in, for example, interaction between persons or persons/devices, such as those registered as belonging to a specific affinity group (AARP, ACLU, NRA, and/or the like), interaction between season ticket holders of a professional sports team (e.g., sharing a table in a coffee shop), social networking communication between classical music devotees, EBInet device/person interaction between a large company's respective device/employee instances, and/or other shared/common interest and/or attribute set. Communication using pBIDE may be contingent on specified IIS information attribute matching, and may further be contingent on IIS communication and/or usage governance specifications of one or more respective event/activity participating EBInet forwarding and/or receiving device and/or service arrangements, where such governance specifications may be specific to a given event/activity category (e.g., directly meeting with another member of an affinity organization). In such embodiments, one or more IISs (e.g., IITs and/or EBICerts) may be available for use as a user, carrying an RCFD, moves about his/her day, and such IIS information is forwarded to one or more RUDs and/or RUSs, such information made available by such an RCFD in accordance with respective specifications (broadcast at one or more given locations, times, and/or other one or more conditions) and/or direct user instructions. With pBIDE, identification information forwarding can enable the provisioning of such information for receiving party evaluation, response, and/or EBInet related event/activity governance, where such evaluation, response, and/or governance is at least in part based upon IIS content.

EBInet device arrangements can securely carry and/or otherwise securely store (e.g., to a remote secure information store), and can subsequently forward, IIS information, e.g., contemporaneous at least in part biometrically based, existential quality, information made available using pBIDE. In some such embodiments, EBInet RD arrangements may request, or in response to its proffering (for example, periodically broadcast by an EBInet forwarding device) receive, identification information from respective RFD (e.g., RCFD) arrangements. Such information can comprise arrangements' respective device and/or user contemporaneous identification as presence identification tokens, e.g., as respective IITs, other IISs, and/or one or more portions thereof. Such respective requests to receive IISs (or requests to be otherwise informed of the presence of persons and/or other REAIs) may be periodic, and/or may occur based upon, for example, event/activity process set context management, such as based on specified one or more receiving device arrangements' requests (e.g., activated by RD sensor/human identification arrangement recognizing that a person, for example a human, or a specific person, is present), and/or as a result of requests initiated by respective EBInet arrangements' users. Such identification information may comprise, for example, an RCFD provided at least in part contemporaneous nearly existential or existential quality at least in part biometrically based IIS, or one or more portions thereof.

Fake media and other faked person(s) specific presence(s) is emerging as a major societal, as well as cyber security, challenge. Persons using/participating in an EBInet arrangement and carrying an RCFD, can, in some embodiments, address this challenge through securely provided, contextually managed, broadcasting and/or request and response provisioning of, near-existential and/or existential quality root biometric identifying information, coupled in some embodiments, with securely bound—to such root identifying information—credentials and/or other testable/verifiable effective fact information, and, for example, forming an EBInet identification information digital wallet. For example, a person may carry such an RCFD identity information provisioning arrangement (e.g., when carrying a pBIDE implementation), which may involve securely (a) automatically unlocking a door as the person approaches or takes hold of a door knob, (b) automatically signing such person into a secure website such as when using a bank account management portal, and/or (c) addressing a group of persons, such as during a politician's press question and answer session.

Whatever the context, whether writing software code, sending an email, participating in an online social networking session, and/or being observed and recorded by one or more known and approved, and/or unknown, event/action respective parties, an RCFD carrier can, in some embodiments, set their mobile EBInet device arrangement such that it broadcasts certain approved identification information and/or responds to event/activity context received request(s) for such information, and where such information provisioning can be securely governed by context associated rules and controls.

The near-existential and/or existential quality EBInet demonstration of the physical presence of a person as associated with an event/activity, in some embodiments, needs, for personal information privacy and/or participant information complexity governance, a control infrastructure that organizes presence information in accordance with the purpose of such information collection. For example, during a politician's press conference, media attendees may have their broadcast function set to off so that the politician and politician's aides identification information can be securely collected while the press members information is not broadcasted (or received/accepted by a media recording RCFD). As another example, during a politician's political rally attendees comprise various types of participants (have different roles). To limit what may be in context unnecessary information complexity and to ensure contextually appropriate privacy, rally attendees may be instructed to or recommended to keep their RCFD identification information set to off, while instructed the politician, politician's aides, and security and facility personnel may have their devices set to broadcast (or request and respond) on.

In some embodiments, RFDs, RUDs, and/or RUSs that monitor and/or govern rally event activity components may receive and store such EBInet enabled identification information in database arrangements using field-based structures at least in part based on RCFD owner/carrier roles, and may present user configurable interfaces that display information filtered based on the interests of the RCFD user/user employer and the device/user event activity context.

In some embodiments, event/activity monitoring and governance may securely, selectively enable identification of present devices/persons at least in part in accordance with securely associated category/type attribute information such as, for example, (a) a reporter's and/or other attendee's credential and/or other such fact confirmation, and (b) a politician's credential and/or other fact role (e.g., member of US Congress). Such received identification information can be securely associated with its media content (or other applicable content) and/or with such content's CIIS information informing regarding such media event/activity. For example, a camera person recording a political event could be securely identified by his/her broadcasted identification information as the party responsible to recording the event/activity and such identification information can be securely bound to such recorded event information, where such recorded event information further includes the broadcasted identification information, including role type, of event/activity participants.

In some embodiments, pBIDE interactions may involve cryptographic functions and services where, for example, a designated user and/or user class (group or category) may decrypt another person's or person group's/category's pBIDE identification information IITs and/or other IISs (and/or portions thereof). Further, in some embodiments, only during a given specific event/activity instance and/or type can decryption of one or more portions of respective pBIDE identification information sets be performed. Such cryptographic functions and services can involve one or more identity information cloud services that receive and register CIIS and/or CBEIIS information from an AFD and/or RCFD and subsequently perform EBInet device arrangement identification (including performing cryptographic services), including authenticating applicable one or more EBInet devices and/or associated persons. If such one or more devices and/or associated persons are authenticated and satisfy any applicable specifications, such cryptographic services can respectively provide cryptographic keys for securely pairing/grouping of such devices and/or persons. This approach enables EBInet device arrangements and/or associated persons to protect sensitive information that may be communicated as result of broadcasting/polling/hailing by initially unknown to each other parties, since it enables parties to first reliably identify/authenticate other parties prior to exposing such sensitive information, such identification/authentication enabling authorized supplying of encryption keys to identified/authenticated parties. Such identification/authentication, followed by supplying of keys, comprises a two-step process where a person, device, or person/device pair is first identified/authenticated, this satisfying a specified requirement for enabling a second secure process set involving the authorized secure forwarding and/or decrypting of one or more further portions of an identification information set instance.

In some such pBIDE embodiments, ID information may be available through wireless communication and/or through wired connection, and may be received in the form of biometrically based user person identifying information sets, and/or in the form of composite identification information sets comprising at least in part near existential or existential quality biometrically based owner and/or user information sets combined with owner and/or user corresponding RCFD and/or other RD and/or RUS (receiving and using service) arrangement identification information sets. Such information sets may be carried in, and forwarded (e.g., broadcast or otherwise communicated) from, for example, such information sets' respective carrying mobile RCFDs, and/or, in some embodiments, may be available through proffering by and/or retrieval from, one or more non-carried, server-based information stores. Such IIS instances (and/or portions thereof) may be, for example, available when carried by an RCFD and provided for human (e.g., device arrangement owner and/or user) or device/ human presence/identity demonstration for event/activity authorization (e.g., unlocking front door, entering an online database, entering an intermodal shipping container, using EBInet EBICoin digital currency, or sending or receiving a communication such as an email) and/or other event/activity performance/governance (e.g., employing at least a portion of such IIS information for EBInet REAI IIS instance publishing). Such IISs (or one or more portions thereof) may also or alternatively be securely bound to associated, respective REAIs and such bound IIS information and/or one or more portions thereof, may be respectively available from RCFD and/or server-based information storage arrangements, where such information may be used for person and/or other REAI IIS information EBInet arrangement related evaluation, activity governance, identification request or requirement satisfaction, and/or presence auditing.

In some embodiments, such IISs and/or information representing one or more portions of such IISs, may be made available in the form of one or more tokens (IITs) and/or at least in part encrypted IISs. Such tokens may be, for example, generally broadcast for hailing (e.g., identifying possible candidates) IIS and related REAI usage opportunities, and/or such information can be securely forwarded (provided) in a targeted manner to one or more EBInet arrangement compliant RD arrangements, where such targeting is based at least in part on one or more types of receiving device identification information attributes, e.g., a receiving device's NIIPU securely carried IIS demonstrating/specifying its subject matter has one or more specified attributes. Such attributes may comprise specific one or more types of effective facts and/or qualities to respective purposes, where a receiving device's NIIPU would be allowed to decrypt and read/use one or more portions of a broadcasted information set if such receiving arrangement possessed specified one or more attributes. The foregoing attribute dependent access to broadcasted identification and/or associated information effectively can make the secure delivery of such information a delivery targeted to those one or more parties and/or devices that have such one or more attributes, such as one or more stipulated and testable/verifiable effective facts.

In some embodiments, identification information (e.g., IISs, such as IITs) may be broadcast, and/or forwarded when a user's RCFD is in the physical vicinity of one or more RD and/or RUS arrangements, as demonstrated, for example, by an RD wirelessly (e.g., using Bluetooth or other close radius wireless means) projecting a generated output signal (for unpredictable, unique identification, may be in part comprised of pseudorandom signature signal elements) which an RCFD receives, identifies is an EBInet arrangement that such RCFD and/or RCFD user wishes to interact with, and transmits back to such broadcasting/forwarding arrangement to establish time of round-trip (to receive a response signal set) and validate the local one or more presences of potential receiving RD arrangements as being within a physical vicinity, such vicinity parameters securely specified by associated such RCFD and/or other RD and/or RUS arrangements' rules and controls (e.g., rights and identification information management specifications).

In some embodiments, when an RCFD is in close wireless physical (and therefore communications, such as Bluetooth) proximity to one or more RUDs and/or RUSs, it may make its presence (and the availability of such RCFD's identification information) known by broadcasting initial (a) non-encrypted, non-sensitive information, and/or (b) encrypted information that can be received and decrypted by authorized EBInet device arrangements, such information descriptive of such broadcasting RCFD's and/or RCFD user's initial/introductory characterizing information. For example, such RCFD could broadcast an “I am here” message, or a group (e.g., social interaction) interest indication, e.g., “I am interested in professional tennis,” or “I am a physicist and can provide an effective fact regarding my Ph.D. in physics; your IIS declares/demonstrates you are a student, graduate, or professor of physics; is this declaration an effective fact declaration that is testable?” (or, instead of such question, such effective fact declaration may be tested (as to veracity) automatically or at the initiation of a querying party). Such broadcasting of information, including for example, such RCFD requesting of RD and/or RD stakeholder characteristic information, can, if RD characterizing one or more criteria are satisfied, be followed by secure communication between one or more RD (which may include using one or more RCFD secure modular component (e.g., NIIPU)) arrangements, and such user's carrying RCFD (e.g., NIIPU arrangement(s)). In such arrangements, for example, cryptographically protected rights management operations can determine suitability of forwarding (which may include mutual exchanging) of securely protected communicating devices' associated IIS information sets (including, for example, respective user CBEIISs and/or CIISs) and/or one or more portions thereof, such as child IIS device authentication information sets. Such information sets can be communicated between such EBInet compliant device arrangements' respective isolated modular components (e.g., NIIPUs), where, for example, encryption and decryption operations can be securely performed. Such broadcasting and/or forwarding of hailing information when represented by unencrypted or at least in part encrypted, IITs and/or other IIS instances, can be used to demonstrate a user's, and/or user's receiving RD arrangement's, contemporaneous or operatively simultaneous presence. Such broadcasting and/or forwarding can support securely forwarding/providing user and/or device arrangement IIS instance information, or one or more portions thereof, for use, for example, in REAI IIS securely performed publishing and or event/activity authorization and/or other governance (e.g., SVCC, digital currency transaction, social networking, document and/or program and/or communication, and/or other activity (without limitation, creating, publishing, registering, monitoring, using, reading, participating, accessing, editing, deleting, sharing, selling/exchanging, sending, receiving, and/or the like) governance, and/or auditing.

In some embodiments, pBIDE pervasive IIS availability related forwarding, receiving, and/or using of IIS information is at least in part securely governed by participating EBInet device arrangement and/or service applicable and securely enforced rules and controls specifications. Such specifications are processed in respective hardware and software tamper resistant modular components (e.g., NIIPUs) and/or associated network-based service arrangements. Such IISs can comprise carried (e.g., highly mobile) at least in part contemporaneous at least in part nearly existential or existential quality biometrically based identification information sets that can be transparently provided, automatically and without event/activity specific user action, for contexts where there is an EBInet arrangement request or requirement for such identification information and/or where, for example, results from computing events/activities can be optimized due to pBIDE availability of such information.

In some embodiments, a pBIDE arrangement supports enabling technology for securely governing an IoT (Internet of Things) cosmos or other IoT (more limited in scope) arrangement. Such a cosmos, for example, may comprise a vast array of IoT instances (HVAC systems, drones, appliances (e.g., televisions, refrigerators), security systems and door locks, automobiles, embedded systems, wireless sensor networks, control systems, home and building automation, and/or the like), where populations of such IoT instances comprise a distributed arrangement governed, at least in part, by pBIDE pervasive identification information. Such an ecosystem can be governed through use of a fabric of identity rights managed ecosystems and sub-ecosystems, an electronic universe comprising a highly diverse, at least in part biometrically based nearly existential and/or existential quality, rights and associated identity characteristics/attributes managed, commercial and human societal and personal connected computing governance infrastructure. Such an infrastructure can be governed through the use of, for example, fundamentally reliable subject matter identifiers, subject matter attributes, subject matter related rights, and user and stakeholder contextual purpose fulfillment elements as described herein, together comprising a connected computing event/activity management framework.

In some embodiments, pBIDE arrangements can be set to automatically broadcast (e.g., periodically, and for example, in accordance with one or more EBInet devices' respective specifications) an IIS (e.g., a situationally appropriate child (of a master) IIS) employed as a carried "identity wallet" comprised of one or more identity attributes regarding an RCFD's carrying device and its carrier/user. Such an IIS can, for example subject to specified rules and controls, be queried as to whether one or more parties has a specific one or more attributes (e.g., expressed as verifiable PERCos effective facts, as cred assertions, and/or as other at least in part securely managed meta data). Such an attribute might comprise an EF stipulating, or requiring the stipulation of, the broadcaster's and/or receiver's employer, hobby, organization membership, past and/or current occupation, skill as stipulated by a recognized certifying authority (e.g., stipulated (e.g., using an EF) by a recognized utility and/or certifying service (e.g., an educational institution regarding a person's degree type and field)), and/or the like. Such attribute broadcasting may be initiated by an RCFD's carrier/user and/or as a result of determining/recognizing an RCFD's location, specific address and/or general area/neighborhood (e.g., determined through a GPS and/or cellular arrangement), identifying a time instance (e.g., using a NIIPU's secure clock arrangement), identifying a local WiFi network (e.g., the presence of a specific office building, home, or office related arrangement), receiving a "presence" identification information signal (e.g., an IIT) regarding a person's, device's, grouping's, residence and/or workplace arrangement's, location, and/or a person and/or commercial facility arrangement's (e.g., a coffee shop's) location of receiving of an identification information broadcast (e.g., communicated using Bluetooth), and/or the like. Such attribute broadcasting may also be initiated by such RCFD's carrier/user person, where such carrier/user person stipulates one or more testable attributes, and/or provides one or more quality to purpose assertion sets, and where a quality to purpose assertion about, for example, a broadcasting (and/or receiving) person can have an attribute of being asserted by a qualified authority/expert, such authority/expert verifiable through an effective fact test method, such as MIT stipulating that John Doe graduated with a masters' degree in bioengineering, this strongly affirming that Mr. Doe has bioengineering expertise.

In some embodiments, as a result of such a pBIDE broadcast, a similarity/equivalence match is identified by a pBIDE broadcaster's RCFD and/or a receiving RD's (e.g., an RCFD's) arrangement, and is followed by a securely managed process set involving further inter-device and/or inter-user identification based upon identifying one or more other shared attributes/interests. In such an arrangement, identity wallets' contents can be respectively progressively, revealed in a controlled and secure manner, and in accordance with any relevant policies, instructions, and/or context. A determination may then be made, for example, as to whether a specific physical location of broadcaster (and/or other potentially sensitive information) of one or more such broadcasting and/or receiving parties is revealed to one or more other parties, and/or for example, further IIS one or more instances or portions thereof can be communicated, such revealing comprising one or more further steps in an unfolding initial broadcaster person and/or RCFD device, and/or receiver person and/or RCFD receiving device assessment of whether to "authorize" further communication of information and/or to initiate a physical meeting (between the parties). For example, a person carrying a RCFD can walk about and broadcast at appropriate respective times/locations, "I am a member of the ACLU, an IT service manager at Amazon, am middle-aged, my at least in part biometrically based existential quality identity has a societally anonymous identifier XXXX, and all the foregoing is provided as verifiable effective facts."

In some EBInet embodiments, an EBInet ID second factor identity confirmation device arrangement can comprise an at least in part person's biometrically based identification information anti-theft, anti-misuse, and anti-unauthorized identification information modification (ATMUM) prevention pairing, IIS carrying, device arrangement. Such a second factor device arrangement can be paired with an EBInet RCFD to form a tethered device arrangement that provides assurance that an RCFD forwarded person identification information set validly demonstrates such person's presence (e.g., using a tamper and inspection resistant NIIPU). Such an ATMUM arrangement can be employed as a secure pairing arrangement that can be securely registered along with its associated RCFD as a secure operative inter-device/paired arrangement. An ATMUM/RCFD device set implementation can be registered, for example, using an administrative network-based service and/or such pairing can be managed by such devices' reciprocal registration where each of such devices recognizes its corresponding pair mate as a registered partner device. Such a paired, registered, partnered arrangement can securely perform as a tethered identification information validation device arrangement.

Such an ATMUM tether/validation device arrangement may comprise a highly portable device in a FOB or a wallet card like form factor that provides second factor nearly existential or existential quality biometrically based identification and presence information validation, where the ATMUM device arrangement is cryptographically associated with an EBInet modular component included in an RCFD arrangement, such as an EBInet RCFD that includes a NIIPU modular component, such RCFD included in a parent EBInet compliant smartphone or smartwatch or like device arrangement. Such a partnered device arrangement can comprise a "parallel" identification information carrying and forwarding arrangement that provides confirmation that (e.g., person identity confirming/validating of) the same person is carrying such partnered device arrangements, where the biometric identities received and carried by such devices identify the same person (and may have been acquired from the same AFD at operatively the same time). Such devices' respective person identifying information comprises, at least in part, contemporaneous respective identification information that is at least in part biometrically based, and represents nearly existential or existential quality identification information. Such compared identification information is carried by both partnered device arrangements. Such anti-theft and person's presence confirming device arrangement, such as a FOB or card (or a pin/brooch or the like) functioning as a second factor person identity validating arrangement, can confirm a person's contemporaneous identification information that is carried by, and/or forwarded by, a primary identification information providing EBInet device arrangement, such as an RCFD. Such RCFD and ATMUM device arrangement can acquire their corresponding person's biometric identification information from an AFD securely and operatively simultaneously (or at different times) using the same (and/or one or more different (e.g., confirming)) AFD(s) as biometric identification information acquisition one or more sources. Such RCFD and ATMUM device arrangement securely supports the availability of such identification information as a second factor such information reliability assurance arrangement. Such second factor ATMUM device arrangement provided information may, for example, perform identification information forwarding and/or confirming operations independently of its paired first factor parent smart device embedded NIIPU modular component, RCFD arrangement. Such ATMUM device and such RCFD arrangements can, from time to time, such as periodically, compare their respective carried IIS information to assure that they are carrying contemporaneous biometrically based identification information that identifies the same person, and/or such arrangements can forward at least a portion of their biometrically based respective person identifying information to an RUD and/or RUS network identity integrity assurance service, to confirm that the RCFD carried and forwarded person identification information is carried by, and represents, its identified person (and such RCFD carried information is not being carried by an alternative person and/or arrangement and/or such RCFD first factor information has not been modified in an unauthorized manner).

In some embodiments, such ATMUM and RCFD pairing supports one or more EBInet identification information sets use in event/activity authentication, authorization, and/or governance. Such pairing helps ensure that a party using an RCFD has been reliably, securely identified (e.g., accurately) as the IIS forwarding party (e.g., to an RUD arrangement). As a result, a paired ATMUM device and RCFD arrangement identified person, and/or person/device composite, information, can be evaluated by an RUD and/or RUS for identity integrity assurance to ensure that both such paired devices' forwarded information sets that respectively identify (at least in part biometrically and using nearly-existential or existential quality identification information) the same human. An identity integrity assurance service may also ensure that any other required identification information attributes are matching and/or otherwise satisfy specifications, such as time, date, location, and/or, ensuring, for example, a match of biometric identification information of a user person and/or such information's acquiring AFD arrangement. Both such device arrangements can be verified as carrying the same, or appropriately corresponding, person and/or person/device (and/or service) identification information (e.g., CIIS and/or CBEIIS), including, for example, the same information regarding identification information acquisition, such as time, date, location, and/or the like.

In some embodiments, an RCFD can securely receive at least in part biometrically acquired person identification information and/or identification information derived at least in part therefrom (such as an EBInet IIS). Such information receipt can be securely time-stamped with the RCFD's time of receipt of, and/or an AFD creation and/or forwarding time of, such information one or more instances. At approximately the same time, or operatively simultaneously, such same information, and/or a secure token representing at least a material portion of such information, can be provided to both such secure mobile EBInet RCFD arrangement, and a second arrangement, where such second arrangement may be an IIS carrying device arrangement, for example, an electronic, battery powered and securely, wirelessly communicating wallet card, or a key FOB or a pin/brooch or belt clipped device, for example a security hardened EBInet version of an electronic key arrangement used in unlocking an automobile. Such card or FOB (or pin/brooch, bracelet, or other carried/worn device) may be kept on a user's person, or otherwise carried/worn in a manner that the theft or other loss of such a FOB, wallet card, pin/brooch, bracelet, other device such as an RCFD (validating device) would be very unlikely to coincide with theft or loss of its paired EBInet device, since such, for example, FOB or wallet card, and such paired device are carried and/or worn by a user as separate/separated and differently positioned, devices. Such a validating device, for example, may be carried in a pocket, or may be attached to clothing, or worn as a band such as a wrist band, or comprise an eyeglass component, or such a second factor arrangement may be embedded/securely isolated in a smartwatch (or, for example, securely carried by a security card's embedded NIIPU modular component chip carried in a user's wallet, and/or other mobile parent device arrangement). Such second factor carrying and forwarding arrangement may redundantly, separately be supported in an embedded modular component, for example, a secure isolated RCFD/NIIPU arrangement, which can perform confirming/augmenting/authenticating of EBInet identification functions as a primary, and/or ancillary function set on a mobile carried smart device, arrangement, and where such validating device may, in some embodiments, directly communicate with other EBInet device and/or remote/external service arrangements, providing, for example, authenticating/matching/confirming of identification information.

In some embodiments, EBInet RCFD master and/or one or more child IISs are securely, ubiquitously, and can be transparently, available for identity related purposes. Such IISs may be respectively, securely bound to their corresponding subject matter resources and/or resource interfaces. Such IISs can comprise respective resources that are, for example, information instances that have their own, respective IIS instances, such master and/or one or more child IIS sets comprising instances of a nearly boundless population of various and varying intangible and tangible resources. Such IISs, for example, can identify and describe their corresponding subject matter instances, such as identification information sets that identify and characterize respective specific persons.

In some embodiments, IISs may be associated with one or more respective specified purposes, using, for example, specified inferred, core, and/or other PERCos contextual purpose expressions. Such expressed purposes may be respectively identified as associated with one or more subject matter resources by using any applicable one or more IISs that are at least in part nearly existential or existential quality, at least in part biometrically based, where such IISs respectively comprise and/or securely reference REAI characterizing one or more standardized and interoperably interpretable subject matter attributes/attribute classes/types. Such IISs can, in some embodiments, be used to determine the optimality, availability, and/or suitability of a resource and/or event/activity for a specified purpose (such as evaluating a person who situationally comprises a resource for functioning as an advisor who has expertise for a given topic). Such an IIS, such as an IIT, can also be used in determining whether one resource is authorized to interact with one or more other resources (such as determining that a person has the right (e.g., authority) to use a specific, such as web-based, resource, and/or to participate in, and/or employ a resource in, a specific event/activity, such as a right resulting from resource ownership or other securely specified relationship with a resource (e.g., enter and/or operate a vehicle, employ digital currency in a transaction, remove a cargo crate from an SIMC, and/or the like).

In some embodiments, at least a portion of REAI events/activities involve plural parties mutually exchanging at least in part near existential or existential quality at least in part biometrically based identification information, e.g., in the form of IITs (such as CIIS IITs) comprising information regarding such parties' respective event/activity related rights and/or other relevant one or more attributes. In such circumstances, for example, two users may mutually, securely communicate (e.g., exchange using their EBInet embodiment compliant device arrangements) at least in part cryptographically, policy managed IIS information between their respective, for example, smartphones, laptop computers, tablets, smartwatches, and/or other EBInet compliant smart device arrangements. Using such IIS information, each (or a) user can authenticate the genuine identity and live presence of one or more other parties that are intended participants in (or are being assessed as to whether they should be participants in (e.g., as selected, approved, and/or authenticated, one or more parties) a communicating group).

In some embodiments, users and/or their respective computing arrangements, using, for example, users'/devices' respective EBInet smart device, and/or using EBInet dedicated device, arrangement embedded NIIPU secure isolated processing modular components, and/or respective EBInet compliant identity platform service(s), can assess the authenticity of respective candidate resources and/or parties who are participating in, or may participate in, events/activities. For example, candidate and/or participating users and/or their EBInet devices and/or service arrangements can employ an authenticated party's quality to purpose and/or effective fact attributes, where such users and/or EBInet device and/or service arrangements can assess one or more candidate and/or participating resource instances' (e.g., people's and/or device arrangements') suitability for such instances' direct and/or indirect involvement in user respective events/activities.

In some embodiments, EBInet subject matter event/activity instances can respectively comprise/involve, for example, emailing, texting, videoconferencing, manufacturing of electronic devices and components, performing a transaction employing digital currency, publishing of software programs and video presentations, controlling IoT devices, managing SVCC related activities, social and/or commercial networking including affinity group computing related events/activities (e.g., communication interactions), publishing content (such as publishing IIS instances) and/or the like (event/activity instances). One or more E/A related IISs may be carried by an RCFD and respectively made selectively or ubiquitously available to EBInet specification compliant device and/or service arrangements through secure identification information exchanges enabling respective validation/authentication, and/or authorization and/or other governance.

Computer security, rights management, purposeful computing optimization, and the like currently rely on weak specific human identification; this frequently results in problematic, e.g., inefficient, insufficiently productive, and/or untrustworthy computing. The EBInet embodiments described herein provide greatly improved computing identity information reliability, practicability, cost-effectiveness, informativeness/suitability, and ease of use, based in part on root nearly existential and/or existential quality human identification and associated computing resource and/or event/activity instance attribute information.

There are various reasons for today's failure to use human specific, at least in part biometrically based and/or otherwise "anchored/rooted" identification information to securely provide resource and/or event/activity suitability, information, despite the fact that such information can be valuable for, and could at times be essential for, ensuring computer security, optimizing purposeful computing, and reliably enabling computing event/activity authorization and user/participant purpose suitability enforcement.

Reasons for failure to use such at least in part biometrically based identification information include, without limitation:

A. failure to recognize the root importance of, and develop practical methods for, specifically identifying—in an unquestionably reliable manner—persons that are respectively responsible for, and/or otherwise are associated with (e.g., certifying) resource and/or event/activity instances. Failure to evaluate (e.g., recognize) such specific person REAI involvement instances in terms of their associated respective suitability implications based on specific person associations/characteristics (e.g., associated human intentions and capabilities) reflects:

a) a failure to identify the commercial importance of implementing near-existential and/or existential person biometric identification, b) a failure to develop commercially practical methods for implementing near-existential and/or existential quality person biometric identification. Current biometric identification technologies' accuracy and reliability limitations render small, cost-effective, portable and highly accurate biometric identification arrangements impractical to configure, and as a result biometric identification, as currently performed by portable devices, are subject to malicious spoofing and/or other masquerading. To date, cyber security trustworthiness and the situational suitability of resources, processes, and events/activities, are impeded by the absence of practical approaches for commercially reasonably implementing person identification tools that ensure the authenticity of human identity (e.g., asserted or otherwise represented). The performance of biometric identification systems are impeded by, for example, considerations of cost, size, packaging, usability, power consumption, and redundancy factors (where implementations, for example, might require many, if not each and every user computing device, such as smartphones, tablets, computers, smartwatches, IoT arrangements, and/or the like, to perform person identification with near existential or existential quality accuracy). In particular, it has not been technically practical to broadly, commercially implement existentially reliable capabilities into highly mobile device types such as smartphones, smartwatches, smart bracelets, smart pendants, and/or the like, and c) a failure to recognize the informational importance of securely combining such near-existential and/or existential quality person biometric identification with persons' respective, standardized and interoperably interpretable descriptive attributes (such attributes, for example, in the form of verifiable facts and/or certified by persons' (CertPers') quality to purpose attribute assertions).

Such failure to recognize and implement such identity and attribute arrangements (including, for example, purposeful computing attributes) profoundly limits the ability of computer users and computing arrangements to identify and/or manage:

a) optimal resources for such computing users' respective purposes (e.g., identify both resource opportunities and anticipated purpose related resource usage results), b) cyber security threats (e.g., computer security, internet security, and mobile security, threats)

c) communication process threats (e.g., information misappropriation and/or illicit modification of communicated information), d) best, most appropriate, and/or otherwise suitable social and/or commercial networking interaction opportunities, e) human identity associated supply, value, and/or other commercial chain auditing, integrity protection, and/or event/activity governance (e.g., rights management rules and controls, including, for example, event/activity authorization), f) "fake" news and/or fake stipulated information (e.g., represented as facts or as well-developed theories (including, for example, fabricated and/or improperly manipulated news, science, and/or facts, such as rendered in video and/or audio formats and/or proffered in text)), and g) digital currency theft and fraud.

In some embodiments, such limitations can be addressed, at least in part, by providing highly reliable information informing regarding, for example, REAI stakeholder trustworthiness, reliability, motives, competence, and/or rights. Such information is provided, for example, through secure binding of human specific at least in part biometrically based identifying information (of nearly-existential and/or existential quality reliability), with identity related attributes. Such attributes can include one or more of:

1. person associated descriptive facts, e.g., testable effective facts such as age, sex, group membership, educational degree(s), occupation, affiliation, and/or employer, where, for example, one or more of such attributes may be expressed as verifiable information sets, such as John Doe works as a senior engineer for IBM as stipulated on a securely accessible website of IBM. Such descriptive facts may include, for example, other computing resource and/or event/activity instance specific identification information elements, such as unique instance identifiers (embedded secret information, passport numbers, home addresses, web addresses, DOI numbers, and/or other instance associated unique one or more identifiers), revision (e.g., version) numbers, model identifiers, times, dates, physical locations, historical provenance, and/or the like, 2. quality to purpose metrics (e.g., for trustworthiness, competence, cost), expressed through, at least in part, purpose expressions (such as PERCos Creds) and associated relative quality to purpose values, such as quantized values associated with respective standardized purpose expressions, 3. identity related rights (identity associated rights specifications), and 4. identity based human specific interests (e.g., stipulation of personal interests that inform regarding a person's activity objectives, such as interests in cooking, basketball, learning astrophysics, and/or the like, where such interests, for example, may be specified as contextual purpose expressions).

B. failure to answer user and societal concerns regarding user privacy being compromised by theft of, and subsequent misuse of, a person's biometric identification information. Such privacy concerns can, at least in part, be addressed through use of existentially accurate, and liveness validated, identification capabilities. For example, in some EBInet embodiments, stolen biometric pattern information cannot be misused to misrepresent the presence of a given individual since only the genuine presence of a given individual would be existentially valid.

Mitigating historical biometric information privacy concerns, the present specification describes, for some embodiments, support for biometric identification information arrangements that employ biometric identification related anonymity management techniques, where unique humans' specific identification information instances are protected cryptographically and attribute information is managed by rules and controls to prevent inappropriate release of sensitive information, such as societally uniquely identifying information. In some embodiments, such identification information instances are securely associated with such humans' respective trustworthiness and/or other suitability related attributes. Such attributes may comprise, for example, (a) PERCos Creds, EFs, and/or CPEs, other person characterizing attributes, and/or (b) identification information of humans' (e.g., EBInet device arrangement stakeholder persons' and/or users') respective resource and/or event/activity, instances, such as identifying information for their respective, EBInet compliant, RCFD smartphones. With such anonymity technique embodiments, real-world names, address(es), contact information, and/or other privacy sensitive information can be at least in part absent, and/or unavailable (for example, except under control of highly exacting, contextually specific, secure access mechanisms). As a result of such capabilities, various PERCos and/or EBInet embodiments can substantially mitigate the consequences of theft of PERCos and/or EBInet person specific biometric pattern identification information, particularly as regards users' most important privacy information variables.

One recently initiated effort that examines in particular biometric liveness challenges is the IARPA Odin program, whose publicly stated focus is the identification, at least in part, of biometric liveness dynamic properties to be used in anti-spoofing analysis.

In some EBInet embodiments, to mitigate or eliminate person specific biometric identification spoofing, various reality integrity systems and methods are employed. Such systems and methods employ reality integrity testing using (1) laws of physics compliance, (2) person liveness presence substantiation, and/or (3) tangible one or more non-human object set and/or object set feature (e.g., spectroscopic signature) presence and/or absence, positioning, and/or motion (e.g., dynamics).

In some embodiments, an EBInet acquiring and forwarding device arrangement (e.g., an AFSD) performs as a near-existential and/or existential quality, biometric identification acquiring and forwarding device arrangement, where such arrangement identifies and/or authenticates (e.g., validates) and/or otherwise determines to a very high level of confidence the authentic presence of a biometrically identified specific human. Such identification (and/or authentication) processing may include, for example, securely performing identity discrimination (identification of a specific human) and presence authenticity involving (i) acquiring near-existential, and/or existential quality, at least in part biometrically based identification information, and assuring the presence of, a specific human subject; and (ii) processing at least a portion of such acquired information set to produce such specific human subject's biometric identifying information set for at least one of resource and/or event/activity instance related (a) auditing, (b) identification, (c) authorization, (d) evaluation, (e) carrying, (f) governance, and/or (f) other processing, information sets, wherein such information sets may be respectively employed in event/activity computing process management.

In some embodiments, for near-existential or existential identification reliability, an EBInet system (performing identification of a person using biometric acquisition to produce an information set that uniquely distinguishes such person from all other persons) validates, invalidates, and/or provides a risk analysis of invalidity or likelihood of validity (e.g., using reality integrity testing) that a specifically identified human is physically present. Such an identification process set may include operatively simultaneously testing for the presence of such a biometrically "identified" human. Such a validated presence (e.g., verified through internal operations of a RIIPU arrangement), biometrically identified person (if so determined), can then be securely registered, if not previously registered, with an administrative authority such as a cloud identity service, or, if previously registered, a person's acquired biometric (and/or at least in part biometrically based) identification information can be matched and authenticated against a previously registered identification information instance stored within, and using, such an administrative authority's registration and authentication service.

Such presence validity testing techniques, in some EBInet device arrangement embodiments, include one or more methods and systems comprising:

1. human liveness detection analysis as discussed, herein. For example, further discussion herein describes identification acquisition technologies that generate, in response to emissions, respective spatial, temporal, and/or spectral information sets employing one or more physiological information gathering technologies,
2. timing anomaly analysis, such as determining timing inconsistencies between electromagnetic emissions and corresponding sensing events, and
3. biometric acquisition environment's element anomaly analysis, such as recognizing the presence of environment elements that may be/are appropriate and/or elements that may be/are inappropriate (e.g., logically determined, and/or specifically specified, as inappropriate), or apparently inappropriate (e.g., unfamiliar and/or otherwise uncertain), one or more:
   (a) tangible physical objects (e.g., non-living (such as virtual reality emitting device arrangements) and/or living tangible instance arrangement(s)), including, for example, dynamic attributes thereof,
   (b) materials/chemicals/biological substances, and/or
   (c) event/activity instances, and/or any other sensor perceived environmental element and/or law of physics associated anomaly analysis.

PERCos resource identity information arrangements and identity evaluation capabilities are, in some embodiments, based at least in part on highly reliable resource identifier sets produced, at least in part, for example, through the use of assiduous identity techniques. Such techniques may include assiduous biometric identification capabilities, whereby the identity of resources can be very reliably established, maintained, and subsequently authenticated. Such a participant identity instance may be associated with one or more of a resource set's associated CertPers' and/or other stakeholders' identification information sets, where, for example, such stakeholders are identified, or such stakeholders' respective identification information sets, are respectively confirmed, through, for example, the use of liveness tested, near-existential and/or existential quality at least in part biometrically based identification information sets. Such identification information sets can include quantitative and/or semi-quantitative information components expressing spatial, temporal, and/or spectral information describing the person's interaction with light and/or sound. For example, unpredictable emitted light provided to human organic elements/arrangements may be at least in part spatially, temporally, and/or spectrally patterned, and used in respective acquisition process sets. Such light can comprise unpredictable emitted light patterns and frequency intensities that are unique to a biometric information acquisition process set. In some embodiments, these technologies may, at least in part, enable unique and unspoofable determinations of 3D topographic and/or tissue depth information regarding tissue (a) physical structure; (b) qualitative and/or quantitative chemical composition; and/or (c) periodic and/or non-periodic dynamics, where the foregoing, alone or in combination, may provide highly rigorous to existential assurance as to specific human identity and/or liveness, and which can suppress to operatively eliminate susceptibility to known (and/or otherwise feasible) presentation attack methodologies.

Near-existential and/or existential quality at least in part biometrically based identification information sets may be existentially reliable when for example combined with timing anomaly and/or biometric challenge and response and/or the like existential biometric analysis techniques, and where such biometric information may be augmented by environmental and/or historical behavior related pattern information, as well as by, for example, other assiduous biometric techniques such as human chemical molecular pattern set scent sniffing, protein profiling, DNA profiling, and/or other biometric assessments. Such one or more assiduous identity assessment techniques may be further augmented by, and/or may alternatively use, challenge response, multi-factor, and/or other assiduous, for example existential, biometric, and/or user computing arrangement environment techniques, sufficient to an assurance level of rigor situationally required and/or as specified by an EBInet embodiment. Such assiduous capabilities, in some embodiments, may involve further existential biometric liveness testing, including the use of, for example, situationally specific unpredictably (e.g., pseudo-randomly) generated (such as unpredictable sequences, bursts, patterns, and/or the like, of) electromagnetic radiation and/or sound wave emission sets that may transparently "paint" humans and/or at least a portion set of their computing arrangement environments with electromagnetic radiation and/or sound in a form that creates information corresponding to specific such human sets.

In some embodiments, one or more signals produced by one or more emitter sets may be, at least in part, reflected, refracted, diffracted, scattered, partially absorbed, re-emitted, and/or the like by such human and/or human environment portion sets, and where one or more secure sensor sets (e.g., camera sets, microphone sets, and/or the like) may detect some portion of interaction produced signal sets (along with, for example, co-present (i.e., background/ambient) radiation and/or sound) to obtain, for example, human biometric, and human computing environment, information.

Some EBInet embodiments can perform existential biometric identification processing by deploying one or more emitter and sensor sets to capture an individual's existential biometric and/or environmental contextual information sets, securely transmitting captured information to tamper resistant extraction/fusion processing elements, which may, for example, process and/or correlate the captured biometric and/or contextual information so as to correlate feature sets between captured biometric features (e.g., extracted temporal patterns) with assiduously acquired information indicative of veritable human "liveness". This may include monitoring identity-related processing to ensure that such processing complies with its specification sets.

Such analyzed biometric information sets can then be hashed using one or more cryptographic hash functions and securely bound to the individual's identity for storage in one or more locations in accordance with a storage specification set (such storage may be located at a remote cloud service set). In some circumstances, information sets may be stored, such stored information reliability ensured by deploying one or more fault tolerance algorithms, such as, for example, Byzantine algorithms. An information set may be also decomposed and decomposed data sets may be individually hashed and arranged in a hash tree, such as a Merkle tree.

In some embodiments, one or more biometric templates may be extracted by feature data sequence matching to support differing situation-specific contexts (e.g., online banking versus social networking), for example, respectively organizing situation-specific templates based on contexts that characterize, at least in part, respective contextual purpose classes.

In some embodiments, master at least in part biometrically based identification information set may make reference to and/or contain one or more master identification elements, such as, for example, authorizations, personal information/attribute(s) (such as a person's name, address, occupation, academic credentials, skill sets, affinity group memberships, associated event/activity purposes, specified and/or determined preferences in one or more domains, profiles, historical data, and/or the like), contextual information (such as one or more contextual purposes, purpose classes and/or other purpose neighborhoods, Reputes such as Cred Quality to Purpose Facets, and/or other Master Dimension variables such as Facet resource information (for example, in the form of complexity plus a rating, such as 6 on a scale of 1-10, sophistication plus a rating, educational level plus a rating, and/or the like, as may be described by a direct Stakeholder such as a resource publisher)), and/or the like. For example, consider a professor of physics at a well-known university. The professor may have an identification information set that includes the professor's professional identity and one or more attributes that express the professor's level of expertise in his/her specialization, one or more Effective Facts expressing his/her academic credentials and affiliations and peer-reviewed publications, Cred assertions published by indirect Stakeholders expressing the Quality to Purpose of his/her work, and/or the like.

In some embodiments, an EBInet biometric identification device arrangement can recognize time delays produced by a spoofing arrangement's processing overhead by recognizing delays (longer timing periods) that necessarily result from spoofing arrangement processing and emission activities. Such overhead is caused by a spoofing arrangement's processing time set for receiving and analyzing a biometric identification arrangement's emitting signal set, and designing and sending an emission set to a receiving device's emitter-corresponding sensor set. Currently known and anticipated computing (including quantum computing) and sensor/emitter technologies will produce timing delay overhead durations that are longer in duration than the minimum sensing response time of available sensor arrangements (such as when using avalanche photodiode-based sensor arrangements). Since the physics of natural (no spoofing processing overhead) emitter emission and resulting sensor information receipt processes involve no spoofing time-related overhead, delays can be distinguished as, or otherwise can be noted as indicative of, spoofing arrangements' respective spoofing events/activities, and such PERCos and EBInet timing anomaly arrangement systems can defeat both virtual and augmented reality spoofing attempts.

In some embodiments, EBInet anomaly analysis employs virtual and/or augmented reality biometric identification masquerading detection techniques (i.e., identifying the spoofed presentation of a specific person). In such embodiments, EBInet biometric identification acquisition device arrangements can, for example, emit unpredictable (e.g., pseudo random) biometric identification emitter signal sets that are respectively received by virtual and/or augmented reality spoofing arrangements. Such spoofing arrangements must respectively process such received one or more signal sets' respective information in order to determine and emit an acceptable person impersonating signal one or more sets for receipt by one or more pseudo-random signal emitting arrangements' corresponding sensor arrangements. EBInet arrangements using such time delay anomaly analysis, such as an AFD arrangement comprising an identity firewall device, awareness manager device, and/or network service, arrangement (such as a device set using one or more RIIPUs), can identify spoofing related additional time overhead, where such overhead was necessary for a spoofing (i.e., impersonation) arrangement to determine and then emit a falsified person corresponding signal set. Such spoofing arrangement, in order to masquerade as a specific person, must receive such an AFD pseudo-random emitter signal set and calculate and produce a person impersonation signal, spoofing emitter output control information set, and then emit such control information set's emission set, which must travel to, and be received by, one or more of the AFD's sensor arrangements.

In some embodiments, EBInet arrangements (e.g., AFSD or other biometric identification acquisition device arrangements) time stamp both pseudo random signal set emission information and subsequent such EBInet arrangements' respective sensor received apparent biometric identification information, where such sensor received information is produced at least in part by such apparent person's (and/or person's clothing, worn accoutrements, and/or other person bound environment one or more elements) interaction with such emitted emitter signal set. Since virtual or augmented reality spoofing calculation and emitting process sets affect the time of sensor receipt of apparent person biometric identification information, spoofing "round trip" timing information will be inconsistent with the laws of physics, at least in part, due to the needed overhead of the times of respective spoofing arrangements' determination of spoofing signal emitter output control information sets, and the processing/emitting of such spoofing arrangements' respective control information sets' corresponding emitter signal sets. Necessary spoofing arrangement sensing, interpretation, preparation, and emission process sets, identifiably add to the normal overall physics mandated time of emitter signal sets travel to an apparent object, and subsequent object interaction with such emitter signals and return of interaction produced signals from such object(s), such returned signals corresponding, at least in part, to such respective, known EBInet emitted signal sets.

In some EBInet AFD nearly existential or existential biometric identification embodiments, a masquerading information set would be received by, for example, an EBInet biometric identification acquisition device arrangement sensor arrangement at one or more times that are respectively delayed beyond expected one or more times of receipt. Such delays are at least in part due to such described, respective spoofing processes' overheads. Such an overhead time would be added to the mandated (by laws of physics) roundtrip time, such time comprising an initial EBInet biometric identification device arrangement's emitted signal set travel time to a subject, a subject's interaction with such emitted signal set process set time (such interaction time may be negligible), and the travel time of a return signal set (such set comprised of information corresponding to such person's interaction with such emitted signal set), such return signal set travelling "back" for receipt by a biometric identification device arrangement's (e.g., an AFD arrangement's) sensor arrangement. Return of emitted signal signature information may be to sensor arrangement one or more components that are physically packaged with such a sensor arrangement, and/or at some known (necessary for anomaly analysis) other sensor location.

In some embodiments, when spoofing process set overhead causes a receiving biometric identification arrangement's signal receipt delay, such delay may be extended further by spoofing arrangement emitter elements being placed at one or more larger physical distances from such biometric identification sensor set than the apparent position of a misrepresented (masqueraded) person, such distance, for example, being intentionally employed in order to conceal from, and/or obscure, an EBInet AFD's sensing of the presence of some or all components (e.g., sensors, emitters, processing arrangements) of such a spoofing arrangement.

In some embodiments, an EBInet counter-spoofing arrangement involves accounting for the timing of the following process sets:

(a) an anti-spoofing biometric identification arrangement's emission of an initial pseudo-random emission signal set in support of biometric identification device arrangement (e.g., AFD) spoofing analysis,
(b) a spoofing arrangement sensor and emitter set
  i. sensing/recognizing an emission signal set produced by an EBInet emitting arrangement,
  ii. analyzing such signal set (or one or more portions thereof), and
  iii. producing and emitting a masquerading emitter signal set, and
(c) an anti-spoofing biometric identification arrangement sensor set receiving a spoofing arrangement emitted signal set, where times of an EBInet anti-spoofing compliant device arrangement (e.g., an AFD) emission(s), and subsequent returning signal(s) receipt, are respectively and/or collectively analyzed, for example, to either identify and validate human presence representation or identify a spoofing event. Since a spoofing arrangement will inject identifiable and/or otherwise consequential time delay amounts resulting from such spoofing arrangement's processing (including emitting process) time overhead, virtual and augmented reality spoofing activities can be identified (and/or excluded, e.g., due to excessive time (due to overhead) relative to sensor fast shutter speed). Spoofing anomaly analysis processes can operate at approximately the same times (e.g., operatively the same, a portion of the same, and/or the like, times, and/or at one or more overlapping and/or subsequent times) as respective EBInet device arrangement biometric person identification processes, where such timing related anomaly and person identification processes are characterizing the same subject person for determining identification of one or more persons and/or such spoofing (e.g., virtual and/or augmented reality) attempts.

In some embodiments, biometric identification arrangement at least in part pseudo-random emission signal sets securely include and/or otherwise carry (e.g., as cryptographically protected information) one or more respective, various descriptive information instances, such descriptive information instances including, for example, emitter signal set emissions' respective emission times (may further include date and/or location information), and/or may include signal set specification one or more elements (e.g., in the form of emitter emissions' respective composition/pattern identifying signatures), such as unique one or more identifiers, and/or emitted signal wavelength(s), powers, polarizations, directions, pulse duration(s), frequencies, and/or respective emitter devices' identification information. Such descriptive information can be, for example, at least in part, cryptographically bound into (including, for example, obscured/hidden) respective device arrangement at least in part such pseudo-random emission instance, signal sets. Such descriptive information, and/or descriptive information at least in part derived therefrom, can be securely embedded in, and/or otherwise carried by (directly and/or in an at least in part transformed manner), such biometric identification response signal set where such descriptive information may at least in part be securely hidden within such response emission signal sets' respective biometric identification response signal sets.

In some embodiments, such descriptive information sets can then be used by respective signal set response receiving biometric identification information acquisition device arrangements. Non-spoofing (and sensor received) interaction signal sets are at least in part produced in response to identification arrangement emitted signal sets (at least in part as a result of emission signal set interactions with respective subject persons presenting for biometric identification).

Such interactions produce respective relevant response information sets comprised, at least in part, of reflection, refraction, diffraction, interference, scattering, absorption, reemission, and/or the like, process-based information. In some embodiments, such signal sets can carry, for example, EBInet device arrangement emitter securely associated encrypted descriptive information one or more instances, such interaction affected signal sets carrying descriptive information to be sensed by, for example, respective EBInet and/or the like compliant device arrangement sensor sets.

In some embodiments, emitter signal and/or other, for example time coincident, ambient, interaction signal sets can describe descriptive information instances associated with such signal sets. Signal set emissions can respectively securely include in their signal sets interoperably interpretable constituent descriptive information instance elements that characterize their respective pseudo-random emissions (e.g., emitted signal set specification and/or operative information, such as an emission signal set's time(s) and/or periods of emission). Such inclusion of emitter set descriptive information instances can be implemented through the secure, concealed integration of such information instances into at least a portion of the body of such emissions. In one or more such embodiments, for example, a time and/or time instances/period(s) of pseudo-random signal set emission can be cryptographically embedded within such an emission signal set in a manner that such time(s) and/or period(s) (e.g., start/stop times) of, and/or other descriptive information regarding, emission information instances can be "read" by a roundtrip receiving biometric identification acquisition device arrangement, where such reading may involve interpreting, including decrypting, emission signal set elements (which may be in the form of a cryptographic hash of such descriptive information) to extract descriptive information instances. Such time and/or other signal set descriptive (and/or securely associated) information sets can be employed in securely performing spoofing (e.g., person impersonation) analysis and recognition and such time information, for example, may be inserted in an emitting signal set that is streaming from such biometric identification arrangement's anti-spoofing emitter arrangement.

In some embodiments, the securely acquired time of the emission of an emission set, and/or an emission set's one or more other descriptive instances' information, may be securely stored within an emission set's emitter arrangement's dedicated biometric identification acquisition (e.g., AFD) arrangement memory, and/or such information may at least in part be securely stored at one or more network, such as local and/or cloud service, administrative/management one or more locations, and/or securely stored within one more AFD associated other EBInet device arrangements, such as within an RCFD, for example a smartphone or other mobile device's secure operatively isolated, modular component arrangement (e.g., a NIIPU's memory arrangement). Such stored information can be employed in EBInet biometric identification information arrangement impersonation (spoofing) analysis (and/or event/activity auditing and/or rights management). In some embodiments, such analysis may include, for example, determining a spoofing risk factor/trustworthiness/reliability quantification (e.g., 8 out of 10 risk factor indicating high risk), and/or range, that is associated with any given such sensor received signal response signal set.

In some embodiments, when a received signal set and its resulting information set securely carries descriptive information of such biometric identification arrangement's unpredictable (e.g., pseudo-random) emission set (an emission set may, for example, be comprised of both unpredictable and predictable elements), such set's emission time(s) can be precisely and securely identified through at least one of:

(a) operatively embedding emission timing information into such emitted signal set (e.g., as encrypted data and/or as otherwise interpretable, for example, pulsing and/or other varying of at least a portion of such a signal set (e.g., using one or more standardized frequencies as timing signal carrier(s)), and/or communicating the time of emission using a communication back channel, (e.g., directly wireless and/or by electronic trace) where such timing information and emitted signal set signature information is communicated to its corresponding sensor receiving arrangement. The arrival time of a signal set with such unique signature/identity is compared to the embedded and/or communicated emission time to determine whether a spoofing anomaly has been identified; and (b) operatively embedding a signal set unique one or more identifiers (e.g., a unique signature representing such signal set).

In some embodiments, one or more EBInet compliant arrangements can employ such identifiers and/or timing emission information in auditing for, and/or communicating such information to, an administrative and/or other EBInet device arrangement (e.g., an RCFD) for information analysis, the foregoing enabling identification of spoofing timing delay related to biometric identification and/or liveness/presence in support of EBInet device arrangement operational integrity analysis.

In some embodiments, EBInet compliant device arrangement identification (e.g., identifier and/or attribute), and/or other resource, and/or event/activity, identification, information may be embedded in and/or otherwise securely bound to, EBInet device arrangement respective biometric identification emitter signal sets. Such embedded information, securely appended, and/or otherwise securely bound information, may be used to carry one or more information sets specifying and/or otherwise characterizing the composition of one or more unique device, stakeholder, and/or user identifiers, and/or related REAI audit, provenance, and/or associated information characterizing, and/or otherwise informing regarding, a given emitted pseudo-randomly generated signal set, where such identification information is, for example, securely incorporated (e.g., at least in part using encryption) into and/or otherwise securely associated with, such signal set.

In some embodiments, nearly existential and/or existential quality biometric identification acquisition, forwarding, and/or receiving, device and/or network service(s) arrangements may support secure authentication and/or other validation processes matching an operatively currently acquired (e.g., by an AFD) biometric identification information set with a securely stored and contemporaneously, otherwise recently acquired, and/or registered, one or more biometrically based identification information sets, such stored one or more information sets stored on one or more acquisition, receiving, carrying, forwarding, and/or using EBInet specification compliant device arrangements, and/or on one or more at least in part EBInet administrative network service arrangements. Such matching is used to authenticate and/or otherwise validate that previously stored, specifically identified persons' biometrically based identification information represents the same one or more persons' being biometrically identified by an EBInet specification compliant biometric identification information acquisition device arrangement. Such matching can employ information that is based upon biometrically acquired, previously registered one or more information sets, and/or based upon recently acquired biometric identification information sets, for example, as employed in composing a contemporaneous at least in part biometrically based identification information set. A failure to validate the identification information of a person can indicate, or demonstrate, that a spoofing attempt regarding the presence of such an individual has occurred and/or some other failure to perform in compliance with EBInet arrangement specifications has occurred.

For example, in some embodiments, an RCFD (or other RD) and an AFD each can securely internally store in encrypted form in respective secure information "vaults", for example, within secure, at least in part isolated protected processing environment modular component arrangements such as within respective NIIPUs and RIIPUs, at least in part biometrically based information that specifically identifies one or more users of such devices (e.g., user, and/or composite device/user, at least in part biometrically based identification information, where such information may be registered and further stored on a network (e.g., organization and/or cloud administrative) arrangement). Such an embodiment can enable two factor validation of acquired biometric identification information, where, for example, both an acquiring AFD and a receiving RCFD (or other RD) can separately in their respective processing environments authenticate and/or otherwise validate an acquired biometric identification information set of an AFD and RCFD (or other RD) user (e.g., when an AFD identifies a person and passes resulting identification information to such person's RCFD and where both device arrangements authenticate such identification against their respective, locally and/or network stored (e.g., registered) person identification information instances). Such authentication can occur, for example, when a user picks up his/her mobile RCFD enabled smartphone from an EBInet AFSD enabled phone charger arrangement (such as an arrangement using an ESEA (i.e., an Enclosed Sensor and Emitter Arrangement)), such authentication based upon validating resulting nearly-existential or existential quality biometric identification information of such user against AFD, RCFD, and/or remote RUS stored such user biometrically based identification information.

In some embodiments, during such a biometric information acquisition process set, for example, a nearly-existential or existential quality biometric identification information acquisition process identifying such user is performed using one or more sensing modalities, for example using both palm vein recognition and/or facial recognition, and performing liveness determination of such identified user. In this example, such AFD's secure, tamper resistant sensor arrangement can communicate cryptographically protected acquired identification information to both its AFD and such RCFD (and/or other RD and/or an RUS) using, for example, two, at least in part separate, communication process sets. In such an example, the RCFD may perform operatively complementary to at least a portion of AFD processes, including, performing certain one or more analysis functions in its own, separate from the primary AFD's, isolated processing environment. Such complementary authentication processes can enhance authentication reliability by performing independent, for example, redundant authentication operations to confirm an authentication determination performed by such primary AFD. Any authentication determination disparity between such primary AFD determination and an RCFD checking such AFD identification determination by processing at least in part such acquired biometric information can initiate a disparity cause notification to an organization and/or cloud service administration arrangement and/or may disable one or more functions of either or both device arrangements.

In some embodiments, AFD and RCFD associated such communication process sets respectively employ different cryptographic keys and communicate from an AFD's sensor arrangement to such an AFD's processing arrangement using, for example, internal wiring and/or traces (and/or the like internal packaging communication pathways), and communicate to such RCFD (or other RD) wirelessly and/or by I/O port one or more connections. Such AFD and RCFD (or other RD) arrangements can respectively decrypt such information and respectively perform identification matching analysis comparing communicated biometric identification information (and/or information at least in part based thereon) against internally and/or network administrative arrangement and/or other compliant device arrangement securely stored and recently (e.g., contemporaneously) acquired and/or historically registered, such user's at least in part biometrically based identification information. Either or both the AFD and RCFD (or other RD) and/or such secure sensor arrangement and/or the like acquisition and/or receiving arrangements can further securely communicate, at least in part using cryptographic protection, at least a portion of such identification information to an organization and/or cloud service administrative/management arrangement where additional third arrangement authentication/validation processing may be performed through matching analysis of such AFD and/or RD at least in part biometric identification information against at least a portion of user and/or device arrangement(s)' administrative/management arrangement stored at least in part biometrically based identification information.

In some embodiments, if any of plural such AFD and RCFD separate authentication/validation process sets of recently acquired biometrically based identification information results in a failure to match with respective, registered and locally and/or remotely securely stored, such same person at least in part biometrically based contemporaneous and/or device stored registration information (e.g., agree as to representing the same identified person), then such at least in part biometrically based identification information forwarding activities of at least one of such AFD, RCFD (or other RD), and/or EBInet compliant organization and/or cloud service arrangements, can cease to forward and/or use such information. Further or alternatively, one or more such arrangements can instruct one or more of applicable other compliant device and/or service arrangements to cease to forward and/or use one or more portions (for example, any secure and/or sensitive portions) of such at least in part user's biometrically based identification information sets. Such failure to match (such as failure to mutually authenticate and/or otherwise validate) may occur, for example, within any such arrangement, where such failure to match comprises comparing operatively currently acquired biometrically based identification information (biometric data and/or data at least in part based thereon), with, for example, a second set of such user's biometrically based identification information such as one or more stored (e.g., registered) at least in part such user's biometrically based identification information. Any such failure to authenticate/validate and/or otherwise match identification information may cause any one or more of such device arrangements to cease to forward and/or use one or more portions of such user identification information until such failure to match has been subsequently resolved, demonstrated that it can be resolved, and/or until any such arrangements have been at least in part refreshed and/or reset in accordance with organization, owner, user, and/or administrative/management service policy and/or based upon one or more such authorities' instructions.

In some embodiments, person specific acquired, received, and/or carried one or more portions of at least in part person biometric identification information must match and be resolvable to such a person's specific at least one securely maintained and employed unique user identifier information set and/or resolvable to an information set interpretable to such a unique person's identifier, where such information set is shared between, and/or derivable by, plural of such AFD, RCFD (or other RD) and/or organization and/or multiparty cloud service, arrangements. Such securely maintained and employed user identifier may, for example, be previously stored within such AFD and/or such RCFD (or other RD) and/or a network-based identification service. In some embodiments, failure in matching person specific at least in part nearly existential or existential biometrically based identification information (e.g., information one or more sets acquired by and/or received by such arrangements), including, for example, failure to validate currently acquired one or more portions of respective biometric identification information sets, where there is a failure to match one or more relevant portions of such current information with one or more respective portions of contemporaneously acquired and/or persistent, registered such specific to a person at least in part biometrically derived identification information. This failure to match can cause one or more of such arrangements to either provide a notification to at least one of administrative and/or user one or more parties, and/or can cause the respective such information storing one or more such arrangements and/or services to halt further identification acquiring, forwarding, and/or using services, for example, until the cause of such failure to match is determined and/or corrected, and/or to provide information for one or more such arrangements' and/or associated stakeholders' and/or users' and/or events'/activities', respective audit information sets.

In some embodiments, such matching process sets comparing a currently acquired at least in part near existential or existential quality biometrically based identification information set with previously produced contemporaneous and/or registered such one or more information sets can function as multiple factor security integrity assurance of the authenticity of at least in part biometrically based identification information, for example for an operatively current contemporaneous at least in part biometrically based identification information set, since such AFD and RCFD, and organization and/or network service, arrangements can respectively operate as at least in part separate isolated computing arrangements that have user at least in part biometrically based identification information that is, or is resolvable to, the same person's (e.g., arrangement user's) one or more unique identifiers. Such person's identifiers may be independent of the time of a person's biometric information acquisition, the identity of the acquisition device arrangement (EBInet embodiment compliant), and/or the general composition of identifier associated other identification information.

In some embodiments, secure AFD sensor arrangements can securely communicate—at least in part separately to AFD and RCFD processing (and/or other RD) arrangements and further, in some embodiments to a network-based administrative arrangement, respectively using one or more different keys-cryptographically protected at least in part biometrically based identification information (e.g., biometric raw data and/or pattern information and/or information at least in part derived therefrom), such communication, for example, communicating:

(1) within such an AFD, across trace(s) and/or I/O one or more interfaces, to co-packaged and/or an otherwise associated AFD processing arrangement, such as one or more RIIPUs,
(2) through use of wired and/or wireless communication to such AFD processing arrangement if one or more of sensors are packaged externally to such AFD,
(3) wirelessly to a mobile parent smart device RCFD secure modular component arrangement, and/or
(4) wirelessly to an organization and/or cloud service (e.g., RUS) network-based arrangement, In some embodiments, each such communication (each of (1), (2), (3), and (4)) can be performed separately, and such cryptographically protected information may be decryptable only by each such AFD, RCFD, and/or organization and/or cloud service network service arrangement due to, for example, such use of respective arrangements' at least in part different cryptographic keys (and/or, in some embodiments, by using an administrative cryptographic key backdoor and/or other different cryptographic arrangement). After such communication to plural of such arrangements, where plural of such communication receiving arrangements have received such cryptographically protected at least in part nearly existential or existential quality biometrically based information, such receiving arrangements may perform an inter-device information set validation process where each device's biometrically based identification information arrangement validates that each such biometrically based identification information set resolves to the same person's identity, such separate resolving by plural arrangements supporting a multi-factor, fault intolerant, separate isolated processing, biometric identification arrangement. As a result of this multiple factor approach, a malevolent hacker would need to compromise each AFD and RCFD (and/or any combination of participating other RDs) participating in an identification information event/activity interaction process set during the same simultaneous, or otherwise specified, event/activity period, for any one or more of such arrangements to be allowed to improperly forward to, and/or use, for example, one or more arrangements' respective at least in part nearly existential or existential quality biometric identification information sets and/or portions thereof. As a result of a failure to match, for example, an AFD or other applicable EBInet device arrangement would not be allowed to use, or only use under specified conditions, an AFD's acquired, but not matching, contemporaneous biometrically based identification information set.

In some embodiments, an AFD and RCFD (or other RD) and/or related network service administrative/management arrangement that securely participated in and determined an IIS matching/validation failure, and/or securely received notice of a failure to match/validate an IIS (e.g., a person's biometrically AFD acquired and/or otherwise received/produced person's identification information set), could instruct one or more (including all) such AFD, RD, and/or network service arrangements to cease to use and/or communicate (e.g., forward) such at least in part biometrically based acquired identification information and/or any other identification information associated with such person and/or other arrangement users. Such matching of acquired or received IIS information may be performed using a person's corresponding, registered identification information securely stored on one or more of such arrangements and/or an EBInet service arrangement. Such instruction to cease to use and/or communicate may wholly, or in part, securely disable such an acquiring AFD, and/or carrying and/or using local and/or network specification compliant RD and/or RUS arrangement (e.g., disable a RIIPU and/or NIIPU arrangement, as applicable). Such disabling may prevent identification information use and/or communication by one or more, for example, registered for identification information forwarding and/or receiving, AFD and associated RD and/or network arrangements (e.g., organization and/or cloud service RUS arrangements). Such one or more arrangements, after securely refreshing and/or resetting of one or more applicable portions of any such arrangements' respective software and/or other data sets, may be reenabled for operation.

In some embodiments, liveness detection of persons that are being biometrically identified by an AFD arrangement can determine whether an apparently biometrically identified person is authentically being detected. Such liveness detection techniques can include, for example, spectral and/or temporal response properties, and/or 2D and/or 3D human and/or other animal identification information pattern acquisition techniques. Such techniques may at least in part employ the same, or at least a portion of, acquired information sets employed in biometric identification, and/or such liveness detection can observe the same, and/or one or more of, physiological systems and/or tissue types and/or regions and/or process sets, employed in biometric identification information acquisition. Such identification liveness detection is employed to confirm the absence of, or otherwise determine the presence of, spoofing of identification information in the form of biometric presentation attacks. Such liveness detection and identification techniques may employ the same, and/or employ otherwise operatively, securely bound (inextricably interrelated), physiological biometric identification source one or more elements (e.g., same and/or otherwise operatively, inextricably interrelated, monitored tissue, process, organ, system, and/or the like human body element set) for observed person's biometric identification determination operations. In some embodiments, such person liveness detection and biometric identification acquisition techniques may employ, for example, the same and/or variable, and/or different/differing:

1. wavelengths, timing elements (such as timing intervals and/or other timing condition(s), such as timing durations), spectroscopic modalities (e.g., scattering, absorption, and/or emission techniques), light intensities, and/or detection area focus regions (regions of interest), and
2. hardware elements such as sensors and emitters and unpredictable (e.g., pseudo-random) instruction generators and such elements' associated software, and/or the like.

In some embodiments, such inextricable binding of same person liveness determination and identity discrimination, can produce existentially, or near-existentially, reliable information sets. Such information sets are created by binding at least a portion of data used to determine liveness (which may include non-tangible object reality integrity/anomaly analysis) with data used to discriminate identity. Such steps can employ measurements performed at the same time (e.g., operatively the same) and place and human body element(s) (e.g., using secure clock and securely acquired (and maintained for validation and/or other analysis) time and location information sets).

In some embodiments, timing anomaly analysis is employed to establish the real-time presence of biometrically identified one or more persons, where such timing anomaly management involves identifying, and/or preventing the use of, signal information resulting from the spoofing of unpredictable emitter signals interacting with one or more persons resulting in the time of receipt of such interaction's unpredictable emitter information signal information by a corresponding sensor arrangement exceeding the laws of physics prescribed/determined signal travel and interaction time set due to spoofing activity timing overhead, In some embodiments, a single sensor set may be used to perform measurements employed in both liveness determination and identity discrimination, wherein in some instances data for each purpose may be derived from, for example, at least in part shared sets of images (and/or single point measurements). Alternatively, and/or in addition, an individual sensor set may collect data in a sequence, where liveness and identity informing information sets are collected in sufficiently rapid succession (e.g., an identity measurement rapidly (e.g. operatively simultaneously) followed by a liveness measurement (and/or performed in reverse order); in some embodiments, such closely timed and paired measurements can be repeated one or more times to create sets of inter-digitated identity and liveness measurements) so as to preclude substitution of a liveness-evaluated object and/or object element set for a different identity-evaluated object and/or object element set (or vice versa) at the same spatial position. In some embodiments, such time sequence of liveness and identity informing information sets may be securely time-stamped to identify respective times of emitter emissions and/or sensor sensings.

In some embodiments, tangible object presence appropriateness (e.g., absence of anomaly) testing techniques may be used to at least in part evaluate at least a portion of acquired and/or derived biometric information as being, or likely to be, non "artificial", or artificial, in whole or part. Such testing may provide reality integrity evaluation, which may involve evaluating the situational appropriateness of one or more tangible objects in a biometric identification sensor set's field(s) of view. Such tangible object testing may determine, or indicate, whether at least in part identification information presented to a sensor arrangement as authentic biometric identification information was/is at least in part artificially produced so as to impersonate at least a portion of a human's biometric identification information. Such sensor arrangement can, for example, identify sensor sensed, anomalous one or more objects and/or other, physically tangible elements, where one or more of such objects and/or elements are situationally inappropriate in the operating context of a biometric identification process set (i.e., situationally inappropriate and/or otherwise anomalous in the context of an identified person's one or more biometric identification physical environments, such as the apparent presence of inappropriate (e.g., spoofing arrangement) sensor and/or emitter components). Such object/element testing may include analysis of historically acquired environmental tangible instance(s) information regarding appropriate to context physical and/or other environmental tangible items that comprise elements of a field of view of an asserted biometrically identified person's presence for an EBInet biometric identification information acquisition process set.

In some embodiments, one or more tangible elements are recognized as being, or as possibly being, used to produce illegitimate biometric identification information wherein such tangible elements (may be objects or object components) are observed by one or more EBInet AFD and/or other biometric identification arrangement sensors. Such sensors "perceive" such tangible one or more elements—where such elements may be used to produce apparent, but inauthentic, human biometric identification information, and/or such one or more elements may be determined to be questionable as to their genuineness and/or integrity and may be inappropriate as one or more tangible, physical objects/elements occupying space in a given biometric identification context's environment.

In some embodiments, tangible element anomaly analysis associated sensor sets and associated processing arrangements (such arrangements may employ secure component tamper and inspection resistant hardware packaging) can securely employ one or more fields of view for analysis of respective tangible object/element attributes. Such analysis is used to determine tangible object/element and/or object/element attributes' respective possible relevance to/involvement in the production of biometric and/or spoofed, sensed information. One or more of such one or more fields of view can supply sensed information for recognizing pattern information consistent with the presence of one or more anomalous, tangible objects and/or other physical environment elements. Such arrangements can respectively function as EBInet and/or PERCos reality integrity arrangements that identify, for example, anomalous, unidentified tangible spoofing emitter set elements positioned to produce and/or otherwise provide emitter signals, where the foregoing elements at least in part misrepresent, and/or otherwise contribute to (produce signal information for) the misrepresentation of, the presence of a specific tangible human person's one or more biometric identification emitter-signal-response patterns (and/or other signal responses information sets). Such emitter set and/or other signal presentation arrangements can have physical properties and/or emissions that appear "out-of-place" due, for example, to their respective positions, compositions, relationships, and/or the like, where such out of place signal presentation arrangements represent (e.g., present) or indicate one or more anomalous (e.g., inappropriate) tangible object compositions and/or behaviors (e.g., respectively presenting physical and/or chemical properties, and/or at least in part respective consequences of such physical and/or chemical properties), and/or other attributes inconsistent with a biometrically monitored context/environment. Such tangible object testing may involve both comparing at least a portion of biometric identification arrangements' respective operatively currently acquired, sensed raw data, and/or at least in part derived, information sets, with one or more securely stored and registered, and/or contemporaneous and carried, at least in part biometrically based same person (and, in some embodiments, same environment, location, and/or other contextual characteristics) identification information data sets, the foregoing used to, for example, determine or estimate a confidence metric (e.g., a quantized value) regarding the quality of such currently acquired biometric identification information results. Such determinations or estimations may, for example, depend, at least in part, on evaluating the situational suitability of sensed biometric identification information acquisition environment one or more tangible items, observed activities, and/or the like, and such determinations or estimations may be respectively expressed as quantized values.

2 Spatial, Temporal, and Spectral Biometric Monitoring and Analysis

EBInet arrangements, in some embodiments, support highly rigorous and discriminating, existentially reliable biometric identification determinations employing operatively simultaneous performance of both individual human identification and such human's liveness and/or other anti-spoofing analysis. Use of one or more implementations of analysis technologies described herein will, under many circumstances, provide higher performance and greater biometric identification and evaluation practicality (e.g., lower cost, improved user usability, improved mobility, and/or the like) in identity acquisition and liveness/reality integrity validation than currently available biometric identification mobile and consumer device implementations. Many such embodiments also provide significantly improved person identity attribute and policy information.

In some embodiments, certain acquiring device arrangement EBInet near-existential to existential quality biometric identification methods and analytical techniques can extend and/or replace known biometric identification techniques. Such methods and analytical techniques include new forms of biometric anti-spoofing liveness assessment technologies that demonstrate the actual presence of ostensibly identified persons, as well as, in some embodiments, providing new, highly useful formulations of user descriptive information.

In some embodiments, EBInet technologies can, for example, generate human biometric and/or liveness data sets that include quantitative and/or semi-quantitative information components representing spatially, temporally, and/or spectrally at least in part encoded information regarding a biometrically monitored/assessed person's tissue set (and/or one or more fluids and/or other materials of biological origin) interaction(s) with electromagnetic radiation (e.g., light) and/or sound, where, for example, light and/or other radiation provided to human biologic and/or biologically related element arrangements may, for example, be at least in part spatially, temporally, and/or spectrally patterned. In some embodiments, such technologies may, at least in part, enable determinations of 3D topographic and/or tissue depth information regarding tissue physical structure, as well as qualitative and/or quantitative chemical composition, and/or periodic and/or non-periodic dynamics, the foregoing which, alone, in combination, and/or in combination with other biometric and/or contextual/situational variables, may provide rigorous to existential assurance as to specific human identity and/or liveness, and which may suppress to operatively eliminate susceptibility to known (and/or unknown) presentation attack methodologies. When information regarding both identity and liveness are entwined or otherwise included within the same or overlapping such spatially, temporally, and/or spectrally encoded information sets regarding the same, overlapping, and/or otherwise inextricably bound, person's biometrically assessed element(s), such anti-spoofing capabilities may, in some instances, provide exceedingly rigorous presentation attack suppression.

In some embodiments, EBInet existentially reliable biometric identification techniques support added dimensions and analytic perspectives enabling substantially improved discrimination analysis to determine both individual human identity and such human's live presence. Using one or more implementations that make use of at least a portion of the described spatial, temporal, and/or spectral analysis technologies can provide higher performance and/or greater practicality, for example when employed in biometric acquisition and identity information forwarding devices (e.g., AFSDs) that provide contemporaneous near-existential to existential quality, secure and trustworthy, identification information provisioning.

Biometric identification information acquiring AFSD implementations can support contemporaneous identification information carrying and forwarding device arrangements using practically sized station instances, such AFSD acquiring device arrangements for "root" existential (or near-existential) quality person specific identification information acquisition, while supporting, for example, mobile contemporaneous identification information storing and forwarding device arrangements for identification information provisioning. Such EBInet, for example, AFD and RCFD device arrangements (where RCFD devices may also employ their own, native biometric identification arrangements and comprise ARCFDs) can substantially lower the cost, and improve the practicality, of providing smart (and other) device arrangement existential, or near existential, quality identity provisioning functions. For example, in various embodiments, EBInet implementations will substantially reduce user system wide costs, including, for example, eliminating the need for plural device, existential biometric acquisition technology redundancy and resultant additional costs—thus, for example, providing existential quality identification without having to provide such sophisticated biometric identification capabilities in each of a person's relevant (e.g., smartphone, laptop, tablet, and/or the like) computing arrangements while substantially improving identification reliability and REAI (and REAI associated stakeholder) suitability evaluation effectiveness and convenience, the foregoing enhancing, for example, user cyber security protection, object certification, and person specific suitability/authorization evaluation. Further, such EBInet arrangements improve, over current technology implementations, the ease of use/transparency of identification operations, and the practicality of, for example, deploying, highly mobile, ubiquitous, nearly existential and/or existential quality identification availability by using smart device (such as smartphone) EBInet compliant arrangement implementations. Such arrangements provide respective contemporaneous, device arrangement carried, contextually applicable near existential or existential quality identification information sets for identity provisioning, evaluation, authorization, and validation operations.

In some embodiments, EBInet arrangements may employ identification acquisition technologies that generate spatial, temporal, and/or spectral information sets employing one or more of the following physiological information gathering technologies, where such information is analyzed, for example, in complementary spatial, temporal, and/or spectral dimensions. One or more of such operations can provide significantly more informative biometric human specific identification information sets than existing approaches. For example, such operations may include acquiring three-dimensional vein and microvasculature information that correlates with traditionally acquired two-dimensional pattern information (such as with human vein pattern identification) to provide far more discriminating both identification and liveness complementary information sets. These methods can be used to acquire quantitative, reproducible information that can be used for determining uniqueness and liveness in human subjects. In some embodiments, near-existential to existential quality human identity determination may be supported by multi-modal biometric analysis, where a plurality of correlated data sets are acquired at contemporaneous (e.g., within seconds to hours (and/or longer as may be specified) of one another) to operatively simultaneous times to provide identifying and/or liveness information, for example, spanning multiple length scales (e.g., from microscopic to mesoscopic to macroscopic dimensions). Such technology implementations may include, but are not limited to, one or more of:

1. SFDI: In some embodiments, spatial frequency domain imaging (SFDI) may be performed using a plurality of wavelengths. As an example, embodiments using available SFDI systems may include implementations using 10 discrete wavelengths that span visible to near-IR spectral regions. Such systems can perform specific human identifying and/or liveness scans to acquire information from one or multiple locations of the same anatomical feature (e.g., different locations on a palm), and/or from one or more locations, including, for example, acquiring simultaneously and bilaterally from two locations' comparable anatomical features (e.g., right/left wrists, right/left palms). In some embodiments, implementations may acquire SFDI data using, for example, a multi-frequency, three-phase projection technique for each wavelength, thus producing a rich data set for obtaining sub-surface optical, structural, chemical, and/or physiological properties, such as, for example, those relating to tissue, including, for example, mesoscopic vasculature. Such measurements provide information contributing to highly discriminating human specific biometric identification, as well as highly assiduous testing of human liveness "presence" that may be integrally correlated with such biometric identification acquisition and/or discrimination.

In some embodiments, human identification and/or liveness may be rigorously ascertained using SFDI to acquire spatial, temporal, and/or spectral pattern information. Such information may, for example, describe identity information and/or content level of one or more components, including human specific melanin, oxy- and/or deoxy-hemoglobin (including, for example, oxy- to deoxy-hemoglobin ratios), lipids, and/or other scattering and/or other absorbing tissue components. Such components may be monitorable within facial/neck regions, wrists, palms, fingers, and/or other tissues. In some embodiments, time varying changes in human specific patterns (for example, melanin facial patterns) may be ascertained periodically by re-acquisition of template patterns to ensure appropriate reliability of pattern correlation during authentication events. Some SFDI implementations may employ single rather than multiple wavelength imaging.

In some embodiments, human-specific identifying information may be obtained by imaging face and/or neck and/or other body region, for example punctate and/or diffuse, distributions, for example to determine dermal melanin levels using multi-wavelength SFDI. Such determination of melanin distributions may, in some embodiments, be used as a component in a multi-factor biometric determination, such use, for example, in combination with measurements of vasculature patterns, sweat gland distributions, and/or the like. Such melanin distribution information may be inextricably bound to one or more liveness determination methods (e.g., pupillary responses to unpredictable illumination conditions, spectral and/or spatial variations in vasculature indicative of changes in oxygenation, blood pressure, other cardio one or more functions (e.g., heart rhythm pattern information), and/or the like). Other combinations of multi-factor biometric determinations (e.g., of iris patterns with facial dermal features) may, in some embodiments provide existential or near-existential quality human-specific determinations when used with highly rigorous liveness such SFDI related determinations.

2. TOF CMOS: Topographic 3D scans of one or more locations (e.g., face, wrist, palm, and/or finger(s)) may be obtained using time of flight (TOF) CMOS and/or other TOF implementation one or more sensor variants. TOF CMOS phase data can provide spatial maps, which can be used to acquire amplitude data that are employed, for example, in photoplethysmogram (PPG) maps, providing 3D pattern information for biometric human specific identification discrimination. TOF CMOS, in some embodiments, may be employed to acquire polarization contrast images for subsurface time of flight information by, for example, looking at wave scattering variables, such as timing differentials, to provide pattern and/or composition identification/discrimination and/or liveness information sets (such as to augment other biometric identification pattern information sets). For example, in some EBInet AFD device arrangement implementations, TOF CMOS may be used to provide human identification information pattern sets describing visualizations and/or other information representations of 3D topography, dynamics, distance relationships, and/or subsurface compositions as input into person identity determinations and/or liveness evaluations
3. OCT: Fourier-domain speckle variance/Doppler optical coherence tomography (OCT) may be obtained from, for example, wrist and palm regions in order to image microvascular structure. This approach may provide both structural and dynamic (pulsatile) information for establishing and/or augmenting biometric identification information data for assiduous discrimination of individuals and/or liveness testing and evaluation. OCT, in some embodiments, may be used to acquire 3D microvascular structure information representing pattern information comprising and/or contributing to, for example, AFD arrangements' respective unique to human descriptive pattern information sets. In some embodiments, OCT may be used in combination with, for example, SFDI, to acquire multi-scale (i.e., micro- to meso-scale) structural vasculature human-specific identification and liveness informing information.
4. TOS: Tissue optical spectroscopy (TOS), for example, wrist hyperspectral scans (VIS/NIR), may, in some embodiments, be performed using one or more miniaturized, for example chip-based, spectrometers to measure, for example, the efficiency/quantity of absorption, emission, and/or scattering of light across one or more ranges of light wavelengths and/or across time as periodic and/or aperiodic signals. In some embodiments, one or more detector locations may be employed in combination with one or more source (i.e., emitter) locations and/or source emission angles to examine and acquire data regarding one or more specific human body locations. In some embodiments, deterministic source illumination patterns may be used to create one or more unique spatial-spectral-temporal matrixes.
5. Waveform Acquisition: Waveform data may be acquired using electrocardiogram (ECG) methods and/or optical methods that measure one or more PPGs and/or speckle plethysmograms (SPGs). In some embodiments, simultaneous two or more of ECG, SPG, and PPG may be obtained from dual fingertip sensors and/or bilateral body regions, such as right and left wrists, to obtain, for example, information regarding temporal correlation. As a result, time dependent information content of individual waveforms, as well as two or more waveforms in combination, can be used to create a unique signature corresponding to a specific individual, and/or to provide enhanced rigor in ensuring subject liveness. Similarly, spatial-temporal (e.g., left vs right side) waveform correlations can be acquired for biometrically observed one or more factors and evaluated for composite information sets that represent the identity, and/or liveness, of respective individuals.
6. FDPM: Frequency domain photon migration (FDPM) technology implementations may be employed where emissions are intensity-modulated across time, and changes in amplitude and phase of resulting photon density waves are measured after their propagation from an emission source through tissue to one or more detectors. FDPM may, in some embodiments, be used alone or in combination with other technologies, such as continuous-wave near-IR spectroscopy (CW-NIRS), to measure absorption and scattering spectra at one or more spatial sites (as performed, for example using, diffuse optical spectroscopic imaging (DOSI)), where such singular or combined FDPM usage may provide, or enhance assurance of, human specific identifying information and/or liveness determination.

In some embodiments, anti-spoofing capabilities of biometric identification technology implementations may be enhanced to nearly existential or existential quality by selecting the spatial relationship(s) of two or more tissue regions of interest (ROIs) in a hardware secured random, pseudo-random, and/or other operatively unpredictable manner (for example, by using a pseudo-random generator to generate absolute and/or relative coordinates of a plurality of ROIs), where, for example, correlation of spatial, temporal, and/or spectral characteristics across such a plurality of ROIs can provide characteristic human identifying information and/or highly rigorous assurance of liveness. For example, a specific human individual may have characteristic delays in timing of PPG waveforms measured between two different spatial positions on such individual's fingers, where such a delay depends at least in part on the secret, random and/or pseudo-random selection of such positions. Forming a template of such human specific delay information during biometric enrollment would therefore enable biometric identification and/or provide enhanced identification rigor, while hardware secured random or pseudo-random selection of ROIs would suppress the capability of bad actors to appropriately spoof expected waveform delays. Employing randomly or pseudo-randomly selected ROIs may support improved efficiencies of, for example, time, usability, and/or energy consumption, where multiple small areas provide practical benefits versus monitoring large area sizes (the foregoing in order to provide sufficient data for achieving very high discrimination accuracy). Further, using multiple (two or more) smaller areas in a random or pseudo-random manner (that is, selected from a larger preformulated group) introduces unpredictability of results and enhances the difficulty of attack, thus providing system security benefits.

In some embodiments, one or more of the preceding and/or other biometric identification and/or liveness technology implementations (using, for example, face, wrist, palm, ears, finger(s), iris and/or retina, and/or other anatomical and/or physiological portions thereof (e.g., cardiovascular)) may be used in service of EBInet near-existential and/or existential quality biometric identification implementations. Such technologies may be employed individually, in combination, and/or in combination with one or more other technologies, to optimize accuracy and reliability, including resistance to spoofing, of human identity evaluation. Such other technologies may include, for example, methods based at least in part on optical techniques such as optical imaging, ultrasonic and/or other audio imaging, radar techniques, voice analysis, gait analysis, typing cadence, posture analysis, facial muscle dynamics, and/or contextual variables such as GPS and/or cellular triangulation location, Wi-Fi network identity, commercial activities such as use of credit and/or debit purchases and/or other events/activities such as commercial and/or interpersonal transactions/interactions, and/or the like.

One or more of aforementioned techniques, in some embodiments, can be used to acquire biometric data elements that are intentionally structured to probe/monitor human specific attributes across spatial and temporal one or more scales. For example, microscopic vascular structure and dynamics can be obtained using OCT, mesoscopic vascular and tissue structure from SFDI, macroscopic 3D topography from TOF CMOS, and/or molecular signatures from TOS and/or SFDI. Hemodynamic flow and volume components and cardiac function (electrophysiology) can be obtained from SPG, PPG, and ECG, respectively. Such information can be analyzed according to one or more observable human identity distinctive "diagnostic" variables.

Fundamental contrast elements can be derived from spatial, spectral and temporal data, individually or in any combination, to enhance biometric data analysis outcomes. For example, because SFDI, in some embodiments, uses three phases to acquire data at each frequency, demodulated pixel values can provide qualitative and/or quantitative tissue scattering and/or absorption attributes. This is not the case for simple photography which is typically a qualitative reflectance imaging method (may also be based on transmission of light), and thus provides conventional pixel values that are more susceptible to random value variation that may obscure human identifying features that confer information set uniqueness in SFDI. Further, using SFDI can provide a second information dimension formed from one or more transformations of demodulated images of pixel intensity that are used to derive quantitative absorption and scattering coefficients, thereby providing spatially mapped tissue molecular and/or structural composition. Moreover, SFDI spectral and spatial frequency information content may, in some embodiments, be evaluated using fast analytic solvers developed for calculating SFDI tomographic information that support reconstruction of 3D mesoscopic physiological and/or structural (including vasculature) properties.

In some embodiments, determination of human specific identity with existential or near-existential certainty can, at least in part, be achieved by using one or more secure, tamper and inspection resistant hardware EBInet device arrangements and/or components for:

(a) acquiring biometric information with sufficient (i) spatial resolution, (ii) temporal resolution, (iii) spectral resolution and/or spectral breadth (e.g., wavelength range), (iv) bit depth of acquired and/or processed information, and/or (v) signal-to-noise of information representing person characterizing features, during registration and authentication events, to enable correlation of such registration events' and authentication events' respective at least in part biometrically (and may further include acquiring sensor sets field of view environmentally) based respective information sets to operatively preclude inaccurate correlation of one human's authentication information with a different human's registration information, and (b) ensuring, with operative certainty (or near certainty), that such registration events and/or authentication events interrogate the same, specific living human when acquiring (i) biometric human specific identifying information, and (ii) human liveness information. In some embodiments, such operative certainty of the integrity of both human specific identifying information set and human liveness information can be achieved through operative integration of sensor sensing of such information sets, where such sensor sensing may employ a sensor arrangement that includes one or more relevant sensor types acquiring different biological parameter information, wherein such integration may include identifying, and liveness, information derived from the same and/or correlated information sets, and/or overlapping information sets (e.g., both from the same one or more, or overlapping, images), and/or from inextricably interrelated information sets resulting from inextricably interrelated (e.g., intertwined) anatomical components and/or physiological processes.

For example, in some embodiments, light originating/emerging from the same, and/or overlapping, body areas (e.g., the same 1 square-millimeter region of a palm) may be divided into two or more portions and detected by different sensors operating in parallel. For example, an emitter set may simultaneously emit (or emit in close temporal sequence) light of two spectral components, component1 and component2, which are directed at such palm region, where component1's interaction with the palm results in light modulations revealing of human-specific identity and component2's interaction with the palm results in light modulations revealing of liveness. In some embodiments, one or more portions of component1 and one or more portions of component2 light may be redirected from, and, for example modulated by, such palm region's tissue along the same spatial path, before being divided, for example, using a dichroic mirror capable of differentially directing component1 and component2 modulated light portions to respective sensors, sensor1 and sensor2, which may securely time-stamp component1 and component2 sensing events' information sets. In some embodiments, acquisition periods for individual sensing events can be specified to be sufficiently short to operatively preclude substitution of a liveness-evaluated object for an identity-evaluated (different) object (or vice versa) at the same position in space, and where such sensors may differ in composition as to sensor type and/or specification set and where emitters that differ in design and emission specifications may respectively operate as output originating sources for their respective sensors.

In some embodiments, EBInet and/or other biometric arrangements may report on, and/or record, the reliability of, and/or information otherwise associated with, the real or apparent physical presence (liveness) of respective specific human individuals. Such real or apparent physical presence recognition is achieved by acquiring and processing the real and/or apparent (spoofed) respective responses to electromagnetic, ultrasonic, and/or the like, such individuals' respective biometric identification device arrangement process set emissions. Such emissions, for example, may comprise pseudorandom (and/or other operatively unpredictable function) timings, wavelengths, spatial patterns/positions/angles, and/or the like that evoke biometrically identified persons' physical person caused response information sets, such information sets respectively comprising reflections, refractions, diffractions, re-emissions, partial absorptions, scatterings, and/or the like, for example, responses to emitter (and/or other environmental) signal sets. Such information sets may comprise spatial (e.g., 2D and/or 3D), spectral, temporal, and/or other forms of identification information pattern information sets that respectively correspond to, and/or identify, respective biometric identification subject persons and/or recognize field of view non-human, environment tangible one or more instances. In some embodiments, such an arrangement may observe one or more attributes specific to mammalian living entities, such as, for example, time-dependent venous attributes (e.g., as determined using, for example, PPG and/or speckle SPG recordings, in some embodiments at a plurality of human body positions), thermal/gas content fluctuations in the vicinity of the nose and/or mouth, pupillary fluctuations, microsaccades, and/or the like such, physiological signatures. Such arrangements may further observe emitter signal set interaction responses produced by interaction of one or more emitter signals with one or more physical characteristics and/or chemical compositions of non-human tangible objects, which can produce signal interaction pattern information regarding tangible item emitter signal interaction in the form of reflection, absorption, emission, diffraction, scattering, and/or the like.

In some embodiments, at least a portion of such liveness and/or other reality integrity testing may be operatively simultaneous with such identity discrimination determination. Liveness and/or other reality integrity testing information may be derived from data acquisition sets that are employed as part of an identification and liveness process set. Both such identification and liveness information sets, in some embodiments, are integrally, intrinsically associated with (e.g., such information operatively results from monitoring operations securely associated with) at least a portion of the same person's identification discrimination one or more human physiological components and/or functions used to produce at least a portion of at least in part securely produced biometric identification (e.g., person near-existentially or existentially discriminating) information sets. Such operatively simultaneous and integrally associated data acquisition sets can enable existential (and/or near existential) identification and/or authentication of human individuals. This is achieved, at least in part, for example, by virtue of a very strong to inextricable relationship of liveness and identity validation (subject person authenticity) determination processes (those used in generating biometric liveness/identity analysis information sets) at least with respective same subject biometric identification acquisition biological processes to establish both the identity and undisputed presence of a biometrically identified living subject person.

In some embodiments, EBInet and/or other biometric related identification arrangements described herein provide mechanisms to identify, and/or prevent, an attempt by one or more imposters to spoof a human person's near-existential or existential quality identification information and/or related authentication processes. Such mechanisms can used in identifying, and/or estimating, a risk factor regarding the potential performance of a human-presence spoofing event resulting from, for example, (a) mounting picture and/or video replay attacks, (b) presenting tangible (e.g., at least in part synthetic) forgeries of a tissue arrangement set of a human person, and/or (c) generating and provisioning virtual and/or augmented reality based forgeries (may be holographic) of a human individual through at least the use of one or more emitting devices that produce apparent, but at least in part false, biometric information sets for acquisition by a biometric identification information acquisition sensor arrangement.

In some embodiments, method sets capable of generating inextricably bound liveness and identity measurements indicative of the existential, or near-existential, presence of a given human may take various forms. In one embodiment, 3D and/or 2D imaging of palm, finger, wrist, and/or facial vasculature, and/or other sub-surface (and/or surface) elements, such as the spatial and/or temporal attributes of sweat glands, melanin deposits, vasculature structures, and/or the like, in some embodiments across a plurality of spatial dimensions (e.g., mesoscale and microscale) and/or time instances (e.g., scales), may be performed to acquire operatively unique, human-specific registration and authentication, at least in part biometrically based information sets. Such imaging may be performed using, for example, one or more of reflectance, absorbance, SFDI, OCT, and/or the like techniques. Specific human-identifying information at least in part acquired with such one or more methods may be inextricably bound with same-human liveness determinations made, for example, by observing blood flow, blood pressure changes, heart waveforms (may include spatial distribution of waveform activity (e.g., spatiotemporal pattern identification)), and/or the like, within the same and/or overlapping imaging fields using, for example, (a) one or more pulse-waveform method, such as SPG and/or PPG, signals across time, and/or (b) absolute and/or relative size, and patterns, of specific vasculature elements. Alternately and/or in addition, liveness information regarding a tangible object may be ascertained by determining the interaction of one or more spectral components with such object in a manner revealing of one or more human tissue, such as scattering, absorbance, and/or other, attributes, as would be performed, for example, using SFDI. In some embodiments, liveness determinations may involve correlating one or more challenges and responses, such as observing changes in vasculature dilation in response to, for example, unpredictable (e.g., pseudo-randomly selected) wavelength, spatial, and/or temporal illumination (e.g., patterns), such as through using infrared light.

FIG. 61A-61B is a non-limiting illustrative example of a system and method for highly assiduous assurance of live presentation of a specific human using biometric pattern set identification and dynamic biologic process set timing relationships between human body multiple positions.

FIG. 62 is a non-limiting illustrative example of an AFD container for highly assiduous liveness and biometric pattern set determination, wherein one or more sensor emitter arrangements, such as environment anomaly detectors (EADs), are employed to identify the presence of one or more container environment anomalous objects, such as unauthorized emitter one or more arrangements and/or other inappropriate tangible objects, that may be employed in a spoofing arrangement.

In some embodiments, biometric identification, physiological liveness, and timing-anomaly-based human presence ExID analyses are performed in a physically/operatively secured emitting and sensing enclosed (e.g., 5-sided) environment arrangement. Such in part enclosed (and/or at least in part virtually enclosed) environment arrangement is used to establish the irrefutable presence of a specific, live human. An embodiment of such a contained environment sensor-emitter arrangement (CESEA) environment arrangement, shown in FIG. 62 (enlarged scale for ease of viewing), may, for example, support a charger for an identification information smartphone device arrangement, and include the following device component set in support of existential biometric identification:

(1) One or more palm, back-of-hand, wrist, and/or finger blood-vessel pattern determination sensor-emitter sets, including near-infrared (and/or visible) light emitters and one or more CMOS imaging sensors that provide the ability to discern a specific human in a population of ~10 billion (or more) humans. Such sensor/emitter components may be contained within an enclosure of constrained volume into which a subject's hand is inserted, thereby minimizing the opportunity for bad actors to position extraneous objects for use in advanced spoofing attacks (e.g., sensors, emitters, prosthetics, cables, thermal regulators, etc.). Further, such an enclosure arrangement provides an increased geometric positioning surface area for multi-sensor-emitter biometric analysis to improve biometric identification resolution, accuracy, and reliability.

(2) Sensors and associated emitters used to assess physiological liveness through one or more mechanisms, such as through observations of cyclic spectroscopic signatures indicative of oxygenation/deoxygenation phases of cardiac rhythms, other spectroscopic signatures, and/or structural changes corresponding to blood vessel and/or other dynamics associated with a live human subject. Such sensor-emitter sets may in some embodiments be the same sensor-emitter sets used in blood vessel pattern determinations described in (1). Securely employing the same or overlapping body regions for liveness and blood vessel pattern characterizations can bind such person-identification determinations with their associated liveness assessments (which can be further bound to such person's non-biometric identification attributes).

(3) One or more timing-anomaly-based human presence/liveness sensor-emitter sets. In addition to physiological liveness sensors such as those described in (2), existential determination of a specific human may employ a presence/liveness sensor-emitter set that ensures the presence of physical materials indicative of human tissue at one or more positions within the sensor enclosure environment, where such one or more positions generally include at least a portion of positions where biometric feature identification and physiological liveness determinations are performed. Such a timing-anomaly sensor-emitter set measures the time required for emitter emissions to travel to an object that has been inserted into the sensor enclosure, and for electromagnetic radiation resulting from interaction of such emission with the object to return to a sensing element. Anomalies in the time difference between emitter emission and sensor detection—i.e., time periods that are greater than the expected round-trip travel time of radiation from the emitter to the user and back to the detector plus radiation interaction time with the user—are interpreted as revealing that a claimed human body portion is not occupying the correct enclosure-specified region for biometric analysis.

Furthermore, to ensure that a biometrically observed object causing return of radiation to a timing anomaly sensor arrangement inherently represents authentically identified human tissue, as opposed to non-human material (e.g., reflective/scattering metal, silicone, glass, etc.), use of such a sensor/emitter set also may include using visible and/or near-IR emitter emissions that interact in a characteristic manner with human tissue and carry operatively unpredictable information (e.g., in the form of embedded cryptographic signatures) within such emitter signals (e.g., respectively selected through random or pseudo-random processes). For example, in one such embodiment, the polarization and/or wavelengths of emitter signals may be pseudo-randomly selected, where changes in polarization, wavelengths, and/or intensity in the radiation component returned to the sensor are different for human tissue versus other materials and where such changes in polarization/wavelengths/intensity wouldn't be possible to accurately spoof (within acceptable timing parameters) using counterfeit (calculated) emissions or provided by interaction with a prosthetic object without knowing, in advance, what the pseudo-randomly selected radiation components will be. Timing anomaly determinations may or may not employ the same sensor-emitter sets used in blood vessel pattern and dynamics/other presence/liveness determinations described, respectively, in (1) and (2), where one or more such sensors and/or emitters can provide capabilities for characterizing spatial, spectral, and/or temporal human identifying attributes.

(4) Environment anomaly detectors (which may employ environment painting/observation emitters). For example, in some embodiments, security against potential spoofing attempts can be enhanced by outfitting interior and/or exterior positions of the sensor enclosure space with one or more monitoring devices, such as one or more video cameras, metal/magnetic detectors, microphones, thermal sensors, chemical/molecular environment sensors, and/or the like. Such monitoring devices can be used to guard against spoofing implemented through the use of person-spoofing light emission devices, and/or prosthetic objects, that, absent such monitoring devices, may be improperly inserted into the biometric sensor-emitter enclosure space without notice or detection. In addition, in some embodiments the mechanical integrity of the biometric sensing environment container can be monitored through the use of trip wires (e.g., physical wires, laser beam arrangements, etc.). Disruption of trip wire signal continuity, for example, may indicate an anomalous condition set and cause an audit report, and/or an interruption of normal function of one or more sensor-emitter sets. Enclosure environment security can constitute an important consideration in countering spoofing methodologies that employ advanced misrepresentation projection and/or prosthetic systems.

The systems and methods described herein support highly assiduous, including near existentially to existentially accurate, secure determination that a live, specific human being has presented himself/herself for biometric feature information acquisition. Such a determination supports the secure forwarding, receiving, carrying, and using of authentic person or person/other entity identifying information (an entity may comprise any identifiable tangible or intangible object set). Such determination can be performed at times operatively simultaneous to acquisition of such person's biometrically identifying pattern information, during such information's registration, and/or subsequent to its acquisition such as operatively simultaneous to its use during event/activity governance processing. Such determination can be performed by, for example, one or more of an AFD, RCFD, RUD, and/or RUS, such as a TIIRS, where such determination may be performed by more than one of such EBInet arrangements to provide plural arrangement authentication process sets.

A key aspect of this technology is its capacity to provide high confidence in the authenticity of the live presence of a biometrically identified individual at the time(s) that identifying biometric information is acquired, such as when acquired using an AFD. Such confidence in the accuracy of the acquired identifying biometric information can in addition or alternatively be confirmed, for example, at the time of such information registration with a TIIRS or receipt by an RCFD. Such an arrangement can support contemporaneous or operatively simultaneous-to-acquisition secure delivery of such biometric identification information, for example for contemporaneous use and/or authenticity determination at one or more times subsequent to identification information acquisition, such as when provided by an RCFD for operatively simultaneous to associated event/activity governance by an RUD and/or RUS, such as when authorizing a web banking activity, opening one's home front door, entering a research lab at work, and/or publishing/signing software code.

These methods can provide mobile, ubiquitously available, human and other entity existentially reliable contemporaneously acquired biometric root and suitability-attribute identification information. Such information can greatly mitigate or eliminate risks of person-identifying information being misrepresented by, for example, (a) malicious employment of replay information, and/or information produced using virtual (and/or augmented) reality methodologies, and/or (b) through the use of prosthetic (tangible) models of such individuals.

The current inventions provide means for obtaining assurance in an individual's live presence (at the time of near existential to existential biometric pattern acquisition) through one or more methods. This includes, for example and as described herein, the use of timing anomaly determination methods for greatly mitigating or eliminating risks caused by spoofing using generated image or image enhancing/augmented reality representation methods.

Risks caused by tangible spoofing methods are also addressed by describing systems and methods for eliminating, or greatly increasing the barriers to, using prosthetic devices that can effectively masquerade as representing the live presence of an individual.

In some embodiments, the EBInet liveness and authenticity ensuring embodiments described herein are based on determining and then registering information that includes the timing relationships of dynamic biological process sets, where such dynamic biological process sets can have any combination/portion of periodic and/or aperiodic components (comprising one or more portions of one or more dynamic process sets) occurring at separate or contiguous and/or overlapping positions on a human's body (such temporal and spatial information may be based at least in part on spectral related data). For example, such dynamic biological process set timing relationships may result from the relative timing (e.g., phases and/or discrete times) of PPG, SPG, ECG, SFDI, and/or thermal signals that are measured at a given body position (e.g., position location and/or position continuum, such as located on and/or within a person's body, such as a palm vein vasculature location set) and one or more other body positions. Such timing relationships may be obtained from one or more timing measurements of dynamic biological process sets regarding position-related observed signal intensity, wavelength, polarization, and/or structural relationships sensed by one or more optical, ultrasound, capacitance and/or thermal sensors, and may, for example, be obtained, at least in part, from measurements of position-specific timing of blood flow through vasculature, and/or position-specific timing of blood chemical composition (such as oxy and/or de-oxyhemoglobin levels). In some embodiments, a secure clock arrangement and a signal sensing and signal information processing arrangement are configured to measure position-specific timing of blood flow through vasculature. In some instances, such timing information may also comprise and/or securely reference related person-identifying (biometric identification) pattern information. Whether or not such timing information comprises both person-identifying pattern information and liveness information, such biometric identification information can be inextricably correlated with liveness-informing information at least in part by deriving pattern and timing information from the same and/or logically correlated, inherently related information sets resulting from operatively interrelated anatomical components and/or physiological processes. Such correlation can effectively address spoofing risks associated with differently sourced (ostensible) biometric identification (pattern) information and liveness-informing information.

In some embodiments, such systems and methods will include securely acquiring, using a biometric signal sensing and signal information processing arrangement for a biometric identification information registration process set, such person-identifying pattern information from a biometrically evaluated human body feature arrangement (including, for example, one or more portions of one or more blood vessels, irises, retinas, other facial components, hands, wrists, dermal components, and/or fingerprints), and measuring, using a secure clock arrangement and a signal sensing and signal information processing arrangement, timing of at least a dynamic biological process set occurring at a first position on a registering human's body and the timing of one or more corresponding dynamic biological process sets occurring at one or more other positions on such human's body. Such systems and methods can be used to determine, from such registration timing measurements of such biological process sets' one or more physical event sets, timing-relationship information of such biological process sets at such first and one or more other body positions, wherein such timing-relationship information is configured for subsequent use during an authentication process set to determine whether a tangible object that is presented for biometric evaluation represents a living, physically present identified human. In some embodiments, one or more secure clocks within, and/or securely associated with, such biometric signal sensing and signal information processing arrangement are used for time and/or date stamping of one or more acquisition, signal information processing, and/or authentication process set information sets.

At a time subsequent to such registration process set, an authentication process set may be performed regarding an object presented as (e.g., asserted to be) such a human body feature arrangement, in which information is acquired that characterizes (a) the timing relationship of physical event process sets at positions corresponding to such enrolled human's first and one or more other body positions, and (b) one or more position-corresponding, person-identifying patterns.

In some embodiments, secure binding of timing relationship information and person-identifying pattern information can be performed to ensure that inauthentic liveness information cannot be fraudulently associated with person-identifying information to deceptively represent the live presence of a specific person during an authentication, and/or registration, process set.

In some embodiments, the similarity of (a) such timing-relationship liveness information acquired for such registration process set to timing-relationship related information acquired for such authentication process set, and (b) such registration process set person-identifying pattern information to such authentication process set person-identifying pattern information, can be compared, and if both liveness and pattern information (determined separately or as combined parameter information) are determined to comply with required similarity matching one or more thresholds (i.e., similarity between registration and authentication process sets information), the live presence of a specific individual can be validated if, for example, currently evaluated identification and liveness information satisfies given specification one or more parameters. In some embodiments, such authentication validation determination provides the basis (e.g., authorization, such as when using contemporaneously, and/or operatively simultaneously, acquired biometric identification information or information derived therefrom) for secure governing of a person identification related event/activity process set.

In some embodiments, biometric identification information sets attesting to such verified live presence of a specific individual at the time of biometric data acquisition, and/or information derived therefrom, can be securely bound to one or more securely maintained credentials, and/or one or more other such securely maintained characterizing fact attributes, associated with such specific individual, where such securely bound information, or one or more portions thereof, can be used as contextual parameters in such secure governing (e.g., suitability management) of a person identification related event/activity process set.

In some embodiments, such acquisition of information characterizing (a) the timing relationship of physical event process sets and (b) position corresponding, person-identifying pattern information, can be performed at least in part within an enclosure comprised of at least three walls and at least one environment anomaly sensing arrangement, such enclosure for insertion of a human body feature arrangement. Such enclosure may enable employing at least one sensor for securely monitoring the introduction of a tangible object presented as a human body feature arrangement into such enclosure, and using at least one enclosure wall-embedded or attached sensor arrangement to enable determining whether an enclosure inserted object is an authentic human body feature arrangement and/or anomalous, inappropriately present object.

2.1 Anti-Spoofing Capabilities

By definition, contemporaneously acquired existential quality, biometrically based identification information provides unspoofable biometric information, given known technologies (or, in other embodiments, within certain spoofing costs and practicality limits). Such unspoofable identification information can provide considerable advantages in mitigating or eliminating cyber security malware and networking identity fraud (and can support substantially improved social and commercial networking, supply, value, and/or other commercial chain (SVCC, e.g., serialization), digital currency, and other computing arrangement users' purposeful computing fulfillment and/or rights management).

Existential, or nearly existential, quality EBInet biometric identification systems are by design and operation, either:

not subject to spoofing (existential quality biometric identification systems, where the biometric information is not subject to direct spoofing, theft, or misuse and will not lead to compromising of personal information protected by biometric identification access control), unless successfully suborned by unanticipated, for example, newly developed technologies, or extremely unlikely to be spoofed (near existential quality identification systems), since spoofing of EBInet nearly existential quality biometric identification may require contextually impractical technologies and/or methods that are, for example, very expensive and/or operatively highly impractical to use and/or practice.

In some embodiments, EBInet technologies can, for example, generate human biometric and/or liveness data sets that include quantitative and/or semi-quantitative information components representing spatially, temporally, and/or spectrally at least in part encoded information regarding a biometrically monitored person's tissues' (and/or fluids' and/or other biological materials') interaction(s) with light and/or sound (including ultrasound), where, for example, light provided to human (e.g., organic) elements/arrangements may be at least in part spatially, temporally, and/or spectrally patterned. Such provided light can cause human elements'/arrangements' light interaction that is sensed and may provide, for example, biometric pattern, and/or human bodily function activity, information. In some embodiments, these technologies may, at least in part, enable determinations of 3D topographic and/or tissue depth information regarding tissue (a) physical structure; (b) qualitative and/or quantitative chemical composition; and/or (c) periodic and/or non-periodic dynamics, the foregoing which, alone or in combination, may provide rigorous to existential quality assurance as to specific human identity and/or liveness, and which may suppress or eliminate susceptibility to known (and/or unknown) presentation attack methodologies. When information regarding both identity and liveness are entwined or otherwise included within the same or overlapping such spatially, temporally, and/or spectrally encoded information sets regarding the same, overlapping, and/or otherwise inextricably bound person's specific biometrically assessed feature(s), such anti-spoofing capabilities may provide exceedingly rigorous presentation attack suppression.

In some embodiments, to preclude production of seemingly inextricably bound counterfeit liveness and identity information sets using spoofing based at least in part on virtual and/or augmented reality, an emitter set may generate emissions having pseudorandom (and/or other unpredictable function, and/or truly random) timings, wavelengths, spatial patterns/positions/angles, and/or the like. The timing of elements of unpredictable emission composition sets, for example comprising intensity(ies), wavelength(s) and/or the like, can be securely recorded using a secure, tamper and inspection resistant, hardware processing, memory arrangement, and one or more secure clocks (for such timing information). The presence of such unpredictable one or more emissions within such one or more regions of space may be established with operative certainty by detecting specific, for example, redirected such emissions (or more generally, light resulting from human interactions with such emissions). Such detection, for example, can use one or more sensor sets employed in acquiring liveness determination and/or identity discrimination, data sets. In some embodiments, unique unpredictable emissions and/or embedded in such emissions' secrets can function as liveness determination process sets', and identity discrimination process sets', shared secret and/or other information elements, such as emitter set unique identity information (unique identifier(s)). Further, sensor sets' internal and/or external respective trusted clocks can securely and accurately record (e.g., time-stamp) one or more detection events of such one or more emissions, such secure recording, for example, enabling comparison of detection times (or absence of detection) with corresponding emission times to evaluate data for the presence of timing anomalies (inappropriately long delays between corresponding emission and detection events (and/or evaluate the timing regarding presence (or identify the absence) of one or more emitter identifier information sets as may be carried by respective detected signal sets)). Such comparison (and/or identifier absence) would reveal potential insertion of seemingly bound identity and/or liveness data. In embodiments where such emission and detection events are known with sufficiently high temporal resolution, the possibility will be precluded that inextricably bound liveness and identity measurements can be derived from virtual reality forgeries, since they would require longer periods than genuine delays between emission and detection.

3 Cryptographic Services

EBInet technologies include EBICerts, cryptographic certificates used uniquely in both performing certification by signing data and establishing the authenticity of data signing persons through the providing of at least in part nearly existential or existential quality biometrically based identification information. Such identification information enables EBICerts—in contrast to traditional certificates—to specifically inform regarding such a person's one or more characteristics concerning suitability of such signing person, and in some embodiments such person's signing associated device arrangements, in providing signing and associated cryptographic services. EBICert signing requires the verification of the live presence during contemporaneous and/or operatively simultaneous acquisition biometric identification information of such a person as demonstrated by the secure provisioning of a contemporaneous and/or operatively simultaneous at least in part nearly existential or existential quality biometrically based identification information.

Current technologies for certificate related cryptographic services and associated operations, such as secure communications and/or other computing activity operations, are not securely associated with highly reliable at least in part biometrically based identification information sets. Such current technologies do not support person specific identification information sets that identify, with existential accuracy/reliability, and characterize, who performed, is performing, may perform, and/or is otherwise consequentially associated with (e.g., as a CertPer), one or more computing objects and/or events/activities. Such current technologies do not inform regarding, for example, persons associated with (a) contemplated for use, or used, resources (e.g., software, documents, websites, IoT, digital currency, and/or other device arrangements, human participants), and/or (b) events/activities such as resource publishing, online banking, and/or messaging and/or other electronic communications (e.g., email). Further, current cryptographically protected, such as certificate, information sets do not identify persons who are securely associated with specifications of why (e.g., for which respective purposes) such respective operations were, are, and/or may be, performed. Currently, such cryptographic operations do not include and/or associate information that describes, in a standardized and interoperable manner, one or more suitability and/or existentially identifying attribute specifications. Such current cryptographic approaches do not provide at least in part existential quality identification information set attributes of one or more cryptographic operations' respective REAI stakeholder, user, and/or CertPer persons. By contrast with current technologies, EBInet cryptographic arrangements, such as EBICerts, can include respective, for example suitability to user purpose informing, attributes, such as Cred (e.g., quality to purpose assertion) and/or EF, specifications, where, depending on context, such suitability attributes may provide critical REAI suitability (e.g., authenticity, quality in fulfilling user purpose, and/or the like) information.

It is important to enable assessment of the suitability, for example the trustworthiness, of computing resources employed in, to be employed in, and/or otherwise associated with, computing operations. While current technologies use cryptographic certificates to support signature and/or other cryptographic operations, they lack very important identification information types that are essential in resource and other REAI suitability assessment, and such certificates often fail to ensure secure, reliable, and productive computing. In particular, current technologies do not support REAI securely associated and reliable person-specific at least in part nearly existential or existential quality biometrically based identification information sets that securely include, for example, specific human person associated REAI suitability informing information (e.g., regarding threat, expertise, competence, trustworthiness, relevant fact, and/or the like, attribute information relevant to assessing suitability).

Using current technology, for example, when a user/stakeholder signs a document using an X.509 certificate, an independent validator examining such signature cannot determine with any surety who actually is the owner (e.g., specific human) of such signing certificate and, significantly and specifically, who is/are the owner and/or other person(s) directly participating in a computing resource set chain of handling and control (e.g., a supply, value, and/or commercial and/or other chain of handling and control), and/or, for example, initiating, and/or participating in, an event/activity instance. In addition, current certificate embodiments of computing signature operations, for example, are not associated with respective specifications describing the one or more purposes of respective signatory parties. For example, members of the core Kernel Linux development team do not sign (i.e., with certificates) non-Kernel team provided device drivers. Non-Kernel team parties do not sign such non-Kernel team drivers in a manner supported by the Kernel and cannot, using current technology, include a specification demonstrating that a driver is a proprietary driver from a trusted party, and for example, from an existentially verified, reliably stipulated, and attribute characterized (e.g., using EFs and Creds), source. Current technologies limit identification information to, for example, certificate information (when an item is signed) that informs that a device driver was implemented by a Linux team and certificate information does not indicate, much less securely and near existentially or existentially demonstrate, which one or more team members (if any) may have actually performed the signing. Similar considerations apply to current embodiments of virtual private networks. Such VPNs do not employ specifications (much less employ secure specifications) stipulating the identity of one or more at least in part nearly existential or existential quality biometrically identified humans, nor do VPNs stipulate who, at least in part, created and/or is/are creating (and/or certifying/validating) such virtual private networks. Unlike certain EBInet embodiments, current specifications for VPNs (and/or device drivers and/or other computing resources and/or event/activity instances) do not include specifications of the one or more session intended purposes, and/or other qualities, such as associated security and/or performance one or more qualities, other suitability attributes and/or constraints, regarding the operation of, and/or suitability considerations of, such virtual private networks.

Currently, computing systems generally use certificates, such as X.509 certificates, to establish secure communication and/or to perform other cryptographic operations. In current embodiments, a certificate provides minimal and often operatively inadequate identification information; further, such provided information is often of questionable reliability, and simply indicates who may (is claimed to) be the owner of the certificate and may also include very limited attribute information of the certificate system owner/provider, as well as may include a standardized assertion of degree of security implementation rigor associated with (and, for example, attached to) such a certificate.

Current certificate systems may publish a certificate and associated public key in a distributed directory arrangement. Subsequently, a device arrangement can appear to validate that it is the holder of (i.e., corresponding entity to) such a certificate to independent third parties by demonstrating that the device has the certificate's corresponding private key. While such certificate implementations are useful, they unfortunately, have, for example, various vulnerabilities, including the following:

- Vulnerability #1 results from a lack of surety of the identity of a certificate's device's owner human person and/or owner's human agent person, i.e., the lack of nearly existential or existential quality biometrically based identification information that establishes contemporaneously, or operatively simultaneously, the actual presence of such a person.
- Vulnerability #2 results from a failure to provide users with important (at times critical) information regarding candidate or actively employed REAI respective characteristics, e.g., information about REAIs, and/or their respective stakeholders, such as stakeholder CertPers, who are respectively associated with REAIs, and/or an REAI's operating context, characteristics, and/or associated policies.

Significant vulnerabilities of conventional certificates result from insufficiently providing knowledge regarding the source(s) of, and potential consequences of use of, resource and event/activity instances. Such knowledge requires strong and reliable identification information that can inform users and/or their systems regarding REAI subject matter suitability to user interests. Current broadly used certificates (such as X.509) offer only weak identification information and lack a standardized and interoperably interpretable identification infrastructure. For example, when a user signs a document using an X.509 certificate, an independent validator examining such signature cannot determine with any surety who is the owner of the device that uses the certificate to sign an information set, and further cannot determine with any surety who the user may be. For example, an X.509 certificate may identify a company (the certificate owner), but not also a user (much less identify with existential quality rigor), as an EBICert (EBInet certificate) can, such as a person at an organization that is responsible for, or whose "presence" otherwise demonstrates the authenticity of, the specific instance use of such a certificate. Such an EBICert certificate model can be achieved through use of a certificate that securely names an organization and identifies a signature initiating (actively or passively by presence) user (identifying the user with nearly existential or existential quality biometrically based identification information), or with the use of securely linked certificates for both the organization and the user. Currently, certificates provided to human persons (e.g., provided to their respective devices) often are given out based on a minimal test of the user's identity, such as a test demonstrating that the user can receive an email at a specified address. Even for institutions, such as banks or online stores, checks of the identity of an institution receiving a certificate may be quite limited, such as checks that an institution has control over the site referenced by a DNS lookup, and any such check is not performed using a near existential or existential quality biometric identification set. For example, a certificate may be issued for "*.yahoo.com" if the recipient of such certificate can pass a check showing that the recipient appears to have control over the specified yahoo.com site, or that the entity referenced by such a certificate appears to be a valid legal entity, but such checking can provide inadequate results. Further, no current (non-EBInet) model ensures the actual physical presence of a certificate's authorizing party during the operation set of biometric identity acquisition, and/or during certificate issuance. Consequently, when an independent third party or a computing system employed by such a party checks such a traditional certificate, unlike with an EBICert, little or nothing can be learned about the integrity, security, purpose suitability, and/or reputation of an institution and/or person, and there is no testing for the actual presence of a certificate sender (e.g., an acquisition of biometrically identifying information of an authorizing person) to demonstrate such person's reliable presence during (e.g., biometrically existentially), for example, a certificate issuance authorized by such person as an owner-party person or owner-party-agent.

Surety of REAI identification information, as well as such information's implications and usefulness, can be critical to meaningful assessment of certificates, but existing certificates based at least in part on biometrics fail to identify the actual human whose biometrics provide basis for such biometric information in a manner that is informative and sufficiently (for many contexts) reliable. For example, unreliability of certificate identification information enables hacker exploitations, such as when a certificate misrepresents its alleged operating/owning party. Such exploitation can occur when a user receives a signed email or document from an "outside" party, or when such user inadvertently misspells the name of a website (e.g., mistypes a URL), or follows a link proffered as a result of such a misspelling (both common hacker exploits). In the absence of a biometrically (e.g., existential quality) demonstrated proof of a providing person, a user can fail to recognize a misspelling and proceed into a hacker implemented trap. Such alleged operating/owning party is not reliably and securely associated with such biometric information and neither such operating/owning party nor such biometric providing human is characterized by suitability (e.g., trustworthiness, competence, expertise, and/or the like) to a user's purpose informing identification information attribute infrastructure.

Depending upon context, using a traditional X.509 certificate for a website may be validly issued by an authorized party, but may provide the user with no reliable information as to a signing person's reputation and/or the reputation of the website owner associated with such certificate. The absence of such information comprises threats to users, e.g., when malicious parties were respectively issued certificates for unused web addresses and use such websites to exploit visitors. In an example, a user intending to go to a Bank of America website may mistype the URL of the bank's website (typing or otherwise entering a commonly, incorrectly specified web address), which may direct the user to a website that appears to be a legitimate Bank of America website and has a legitimately issued certificate used for illegitimate purposes. For various reasons, such as mistyping URLs and/or selecting from search engine results sites that include websites that are not legitimate, users too frequently visit web pages implemented with malevolent intent. An EBInet compliant user interface can automatically display suitability/trustworthiness information, e.g., displaying a symbol and/or email directory instance colorization regarding emails (or texts, and/or the like information instances). This representation to a user can encourage the user to scrutinize respective instances' identification information, such as the absence of an email's securely associated IIS providing an effective fact stipulation establishing, in this example, that an actual employee of Bank of America sent an email to a user, that is, such effective fact information establishes that the email is truly a Bank of America authentic communication.

Some EBInet embodiments address traditional systems' lack of surety of the identity of the owner human person and/or owner human agent person of a certificate's device by providing EBInet certificates, EBICerts, which are in the form of respective composite identification information tokens (IITs that, for example, are respective CIISs and/or CBEIISs (such CBEIISs may be cryptographically signed, for example, using respective AFD CIISs)), where an EBICert may at least comprise:

(1) the EBICert composite corresponding human person's and/or other REAI EBICert Stakeholder or CertPer human person's near existential or existential quality, at least in part biometrically based person identification information;

(2) one or more descriptive attributes, such as one or more EFs and/or Creds, that are unique to the EBICert corresponding human person and/or other REAI EBICert Stakeholder human person;

(3) one or more sets of identification information respectively describing one or more device arrangements that generated, and/or are carrying, the IIT EBICert; and (4) One or more public keys corresponding to one or more securely maintained private keys, such one or more public keys used in decryption of signed data.

In some embodiments, such IITs may securely bind nearly existential or existential quality, biometrically based identification information of such EBICerts' respective owners and/or users (i.e., holder/subject, e.g., stakeholder human person/agent and/or other party person) with other identity elements of respective EBICerts' associated person and device identity subject matters. EBInet certificates can be employed, for example, in a highly distributed, certificate and cryptographic signing infrastructure that is fundamentally more reliable and contextually informative when compared to traditional certificate arrangements.

In such embodiments, a sequence of process sets may securely, incrementally release/reveal identification information as appropriate given the applicable context, while retaining at least a portion of an EBICert's identification information as encrypted and confidential. When an EBICert is used in a given context, its revealing of such retained, protected information can be performed in a logical sequence (as situationally applicable), and additional attribute information can be securely released in accordance with EBICert arrangement policy and/or user/machine instruction, so as to support subject matter instance unfolding evaluation and governance and any related decisions. Such evaluation and governance can be performed in accordance with such released/revealed information and associated inter-device and/or service arrangement process sets, including, for example, in accordance with policy/decision instructions that may be received from EBICert information receiving event/activity participating person/device/service instances.

In some EBInet embodiments, through use of an EBICert (e.g., as used in cryptographic signing), highly accurate biometrically based identification information is securely bound to an REAI, e.g., a person, software, information set, and/or device/tangible object arrangement, attribute information instance. Such bound information can be used to evaluate REAI suitability to user purpose(s) (e.g., for evaluating REAI suitability to a user's/Stakeholder's machine-implemented purpose (which may be expressed as a machine instruction)). For example, such use of EBICerts can support EBInet cryptographic information delivery techniques that are tightly integrated with (e.g., respectively reflect the value and sensitivity of) REAI identification information attribute categories/types and related information management, thereby greatly improving the surety of the identity of EBInet arrangement certificates and the availability and reliability of certificates' respective subject matter attributes.

An EBInet arrangement's deployment of an existential or nearly existential quality, at least in part biometrically based signing infrastructure can enable the secure and highly reliable identification of computing related REAIs, such as documents, internet websites, software, authorizations, and/or the like. In some embodiments, using EBICerts to cryptographically sign and/or otherwise certify such REAIs can enable reliable and informed user evaluation of, and/or a user's computing arrangement appropriate interaction with, an REAI, such as evaluation of, and/or interaction/usage based upon, website suitability one or more qualities.

In some embodiments, REAIs comprise subject matter instances (such as persons, device arrangements, websites, communication instances (e.g., emails or texts), documents, event/activity process sets, and/or rights management governance of process sets), and/or subject matters' respective interface instances. Such instances are securely bound to, at least in part, biometrically based identification information of subject matter associated one or more persons. Such person specific identifying information can be complemented through the secure at least in part cryptographic binding of such at least in part biometrically based identifying information with trustworthiness and/or other suitability at least in part standardized and interoperably interpretable attributes. Such securely bound attributes can employ/provide specified formally expressed assertions, such as PERCos Creds, and/or testable facts, such as PERCos Effective Facts. In support of REAI subject matter instance identification, evaluation, and/or selection, such identifying and attribute information, when used in the context of an EBInet certificate system, can be securely tested/validated/matched against corresponding information registered with, and stored in information management arrangements of, relevant one or more organization and/or cloud, such as platform, service arrangements.

In some embodiments, an at least in part biometrically based identification information set, securely bound to (e.g., included within) an EBICert, can include uniquely reliable and informative identification information that can greatly improve an independent party's ability to evaluate an REAI, e.g., determine the suitability of, for example, such identification information set's REAI subject matter for a user set purpose fulfillment set. Such identification information can include liveness/proof of specific human presence, e.g., human and/or human's organization subject matter association, validation. It further can include attribute information regarding such human, such information in the form of, for example, Quality to Purpose, Effective Fact, and/or person associated contextual purpose, attribute information. For example, an EBInet embodiment provides support for assessing REAI integrity and/or suitability by supporting a human stakeholder person (as an REAI and/or REAI stakeholder attribute) cryptographically signing an "intangible" (e.g., digital) resource (for example, signing an interface to a tangible resource, a document, a website service (signing its interface, program code, digital currency instance(s), and/or executing code, such as signing checkpoints, as part of a process set unfolding), a communication instance, a computer application, an IIS for an EBInet event/activity, and/or the like). Such cryptographic signing can employ an at least in part biometrically based, nearly existential or existential quality identification information set, such as when a user carrying an RCUFD (e.g., parent mobile device carrier) makes available an EBICert CIIS and/or CBEIIS for such signing. Such signature can, for example, be validated by an independent party (e.g., when validating through the use of an EBInet trusted identification information registration service's (TIIRS's) trusted identification information database (TIIDB) arrangement. Such a TIIRS can securely store registered EBICerts (used to confirm authenticity of the signatures) thereby at least in part validating a certificate associated REAI, where such REAI, e.g., a document, can be verified as being cryptographically bound together with such an REAI's associated one or more descriptive IISs. Such an IIS can include information stipulating the contemporaneous (and/or operatively simultaneous) presence of a signing, human person, such stipulating performed to certify the REAI's subject matter's identity integrity and/or other specified attributes. Such identification information and associated subject matter and/or subject matter interface resources can be cryptographically protected against tampering, and such resources' respective signings can be performed as a result of (e.g., in response to existential quality biometric information regarding) stakeholder party persons' respective contemporaneous and/or operatively simultaneous presence.

In some embodiments, EBInet cryptographic, including EBICert related, operations may employ the following elements:

- One or more cryptographic and communication service arrangements that manage one or more of: (i) encryption and decryption of IISs, and when applicable, may perform encryption and decryption of REAI subject matters and/or subject matter interfaces, (ii) secure communication protocol (e.g., TLS) execution; and (iii) operations based at least in part on near existential and/or existential quality, biometrically produced identification information employed in EBInet private key, and/or other secret key, generation and management.
- One or more TIIRS platform, utility, organization and/or the like arrangements providing secure and reliable registration, locating, evaluation, selection, and/or prescriptive and descriptive similarity matching of REAI IISs, such arrangements providing IIS (and may provide resource subject matter) analysis, storage, and/or provisioning, infrastructures where in some embodiments, such arrangements may include a trusted identification information database (TIIDB) arrangement that holds/supports at least in part biometrically based IISs for resource and event/activity instances, and where at least a portion of each such IIS includes at least in part nearly existential and/or existential quality biometrically based one or more identification information instances. Such IISs can include, for example, descriptive information regarding REAI respective signed subject matters and/or subject matter interface information sets, such as for respective stakeholder parties and/or stakeholder agents, EBInet device arrangements and/or their respective users, and certificates and/or other cryptographic materials (e.g., public, symmetric, and/or other cryptographic key instances).
- A plurality of distributed nodes wherein such nodes comprise EBInet device arrangements and RUSs, where such device arrangements and/or RUSs: (a) perform local cryptographic and secure communication operations, and (b) are member arrangements (along with their associated respective persons (owners, users, and/or the like)) of one or more EBInet cosmoses. For example, EBInet compliant device arrangements, such as RCFDs, may securely create, hold, and use secret cryptographic materials such as secret keys. In some embodiments, such EBInet device arrangements may store such secret cryptographic materials in respective PPEs (such as in PPEs' respective memory and/or secure external HSMs). For example, an RCFD arrangement may store such secure cryptographic materials, and secure cryptographically protected information processing and communication, in an EBInet modular component arrangement NIIPU PPE arrangement, which can be: (a) configured as a generally functioning NIIPU, or, for example, as a dedicated BPU (a biometric processing unit, which performs with limited functionality comprising biometric data acquisition, analysis, and related cryptographic operations); and/or (b) dedicated to one or more other NIIPU function sets. In some embodiments, one or more such secret keys may be destroyed or supplanted at some policy specified interval(s) (e.g., through refreshing, upgrading, and/or repairing operations) and reconstituted/replaced based at least in part on biometrically acquired data, acquired through use of an AFD.

In some such embodiments, a resource and/or event/activity instance must satisfy contextually relevant policy requirements before performing one or more cryptographic operations. With such a policy requirement set, for example, a stakeholder and/or user person must demonstrate through use of such person's CBEIIS and/or CIIS (e.g., through use of an IIT) that such person is a registered owner and/or user of the EBInet device arrangement that is being employed in an event/activity set. Such person, for example, may be subject to a second factor native (e.g., an RCUFD's/NIIPU's parent smart device arrangement's native biometric information acquisition arrangement to produce operatively current biometric acquisition) biometric challenge where such person biometrically demonstrates his/her operatively current physical presence as a pre-condition for performing one or more at least in part cryptographic (and any related dependent) operations, such as, for example, cryptographically signing (or encrypting or decrypting) a document. The public cryptographic materials and/or associated cryptographically bound identification information may then be used by an independent party to evaluate such signature given its usage context, such as in relationship to such independent party's computing activity set one or more purposes.

Traditional certificate systems fail to provide identification information informing regarding:

(1) certificate owner Stakeholder persons, where such identification information associated with a certificate includes the certificate owner Stakeholder person's near existential and/or existential quality, one or more at least in part biometrically based identification information, (2) REAI suitability informing attributes (e.g., EFs and/or Creds) for respective subject matters (such as documents, software, email messages, device and/or service arrangements, persons (such as stakeholders), events/activities (such as social networking or online banking), and/or the like) and/or subject matter interface specifications (such as hardware interface specifications, VPN communication specifications, and/or the like). (By contrast, EBInet device arrangements can include device arrangements that respectively generate, use, and/or secure/protect certificates' respective private keys, where such identification information may for example include device arrangement and/or device arrangement relevant first order (e.g., subject matter and/or subject matter interface specification, a stipulation of time, date, location, and/or other contextually relevant device arrangement identification information) and/or other relevant order (e.g., attribute of attributes, such as stakeholder EF) attribute information), and (3) essential policy specifications employed in secure governance of certificate associated event/activity instances, where such policy specifications may include methods and/or requirements for respectively using generating, and/or securing/protecting, private keys and/or one or more event/activity processes.

In some embodiments, EBICert infrastructure may provide EBICerts that users, and/or EBInet device arrangements operating on behalf of such users, may use to at least in part perform REAI-related cryptographic operations. An EBICert, EBICert1, may contain and/or securely reference one or more of the following:

(1) EBICert1 public key of EBICert1 public/private key pair, (2) One or more composite identification information sets of a device arrangement that generated EBICert1, where each such composite IIS contains and/or securely references the device arrangement's IIS and near existential and/or existential quality, at least in part biometrically based IISs of one or more situationally relevant Stakeholder human and/or human agent persons (such as the device arrangement's owner, manufacturer human agent, retailer, distributor, and/or the like).

(3) One or more composite identification information sets of a device arrangement that is holding EBICert1, where each such composite IIS contains at least device identifying one or more portions of the one or more device arrangement's composite IIS(s) and further contains near existential and/or existential quality, at least in part biometrically based IISs of one or more situationally relevant Stakeholder human or human agent persons (such as the device arrangement's owner, manufacturer human agent, retailer, distributor, and/or the like).

(4) Near existential or existential quality, at least in part biometrically based identification information set used in part to generate EBICert1's private key. In some embodiments, EBICert1's private key may be generated using at least one such relevant person's respective near existential or existential quality, at least in part biometrically based IIS, at least a portion of secret (e.g., identifying) information securely stored in the device arrangement that is generating EBICert1, and other identification information (such as biometrically based data acquired operatively simultaneously to generating EBICert1, such as using the biometric acquisition functions of an RCFD to provide second factor identification information for the generation of EBICert1, such RCFD then carrying such EBICert).

In some embodiments, EBICerts include respective composite identification information sets, where each EBICert comprises (may securely reference so as to virtually contain) one or more of the following:

(1) One or more CIISs, and/or one or more identifying portions thereof, where such one or more CIISs in part include as subject matter the device arrangement that generated and/or holds such an EBICert, (2) Such an EBICert's public key, (3) Contemporaneously and/or operatively simultaneously acquired near existential and/or existential quality biometrically based identification information instance(s) of such an EBICert's user (and/or owner) person (e.g., in the form of at least a portion of such person's IIS's information), where such identification information is used at least in part to identify/authenticate such person and/or generate such EBICert's private key, (4) One or more Repute EFs and/or Creds providing and/or assertions (such as an EBICert's one or more quality to purpose expressions), and (5) One or more policy sets for governing such an EBICert's usage.

In some embodiments, an EBICert infrastructure supports EBInet device arrangements use of one or more policy sets for at least in part governing their identification related operations (including cryptographic operations), such as secure governance of:

1. Generating private keys of respective certificates, where such governance can include governing the use of methods that generate private keys, such as using methods of specified rigor level(s) (e.g., reliability, trustworthiness) to generate private keys, where biometrically based identification information instances meet respective specified rigor levels (such as satisfying near existential or existential quality performance requirements), 2. Use of such certificates' respective private keys to digitally sign resources, where such governance may include requiring verification of presence of contextually specific one or more types/instances (as specified) of Effective Facts and/or Creds to use certificates' respective private keys.

3. Securing/protecting certificates' respective private keys. Currently, certificate systems protect certificates' respective keys using strategies, such as:

(a) Storing such private keys in a partially secured storage or memory, on machines (e.g., in a keyring, for example, which may be inaccessible when the user is not logged in) of device arrangements of certificates' respective human owners and/or human agents.

(b) Storing private keys on a dongle and/or in a device such as a TPM or HSM. Keys managed in this way by a secure hardware crypto-device are more secure than keys that are held and used in insecure memory, but still have uncertainties regarding provenance and therefore certificates' respective human owners and/or human agents (e.g., a human user) reliability.

Moreover, this strategy, while protecting private keys, is vulnerable to the TPM or HSM being a single point of failure.

4. Employing fault tolerant technology of storing private keys in plural component device sets and using encryption technology to avoid a single point of failure.
5. Employing biometrics (suggested in literature) to re-generate same private keys each time such a key is used. Instead of storing in a repository arrangement, such a system may use palm cardiovascular, and/or facial structure biometrics (e.g., iris and/or other facial/head biometric implementations, for example, as described herein) to re-generate private keys as needed—must be the same key each time to match its distributed public key. Such a conventional system (including such a system that employs biometrics to formulate keys) is vulnerable to attacks where an attacker uses biometric information that the attacker acquired, for example, by assembling from publicly available information sets (such as facial images, iris recognition, and/or voice imprints and/or the like). The attacker would use such acquired biometric information in conjunction with the private key regeneration algorithm used by the compromised device to re-generate the private keys. The attacker can be successful only when such party has access to both the user's biometric information, as well as the algorithm set used by the device. Once a biometric information set has been disclosed, the required precedent information set is postulate to forming regenerated keys, as such it may be impossible to change such biometric information set and the corresponding generated private keys. In order for current technologies to counter such attacks, they can try combining private key generation with a salt (secret) held in the attacked device, and/or a password supplied as a key generation second factor by a user. Using salt held in the device ensures that an attacker needs to, and a determined attacker is likely to get access to, the user's applicable biometric information, the memory of the compromised device (to get the salt), and the algorithm used by the device. While passwords make it more difficult for an attacker to compromise a private key since the attacker might need, for example, a keystroke logger to acquire password information, an attacker's use of a keystroke logger defeats the usefulness of passwords. Further, using a password supplied by a user has other disadvantages, for example, the user has to remember a password, the passwords generally need to be highly distinctive to reduce risk, and they need to be changed often enough to mitigate compromise resulting from passwords being stolen and improperly used).

Without such policy sets for governance of generating, using, and/or securing certificates, receivers of digitally signed REAI instances' respective subject matter and/or subject matter interface may not, for example depending on context, have sufficient information to determine whether a subject matter and/or subject matter interface's is suitable to purpose.

4 EBICert Systems

Traditional certificate systems fail to provide identification information informing regarding:

1. certificate owner Stakeholder persons, where such identification information associated with a certificate includes the certificate owner Stakeholder person's near existential and/or existential quality, one or more at least in part biometrically based identification information.
2. REAI suitability informing attributes (e.g., EFs and/or Creds) for respective subject matters (such as documents, software, email messages, device and/or service arrangements, persons (such as stakeholders), events/activities (such as social networking or online banking), and/or the like) and/or subject matter interface specifications (such as hardware interface specifications, VPN communication specifications, and/or the like). (By contrast, EBInet device arrangements can include device arrangements that respectively generate, use, and/or secure/protect certificates' respective private keys, where such identification information may for example include device arrangement and/or device arrangement relevant first order (e.g., subject matter and/or subject matter interface specification, a stipulation of time, date, location, and/or other contextually relevant device arrangement identification information) and/or other relevant order (e.g., attribute of attributes, such as stakeholder EF) attribute information).
3. essential policy specifications employed in secure governance of certificate associated event/activity instances, where such policy specifications may include methods and/or requirements for respectively using generating, and/or securing/protecting, private keys and/or one or more event/activity processes.

In some embodiments, EBICert infrastructure may provide EBICerts that users, and/or EBInet device arrangements operating on behalf of such users, may use to at least in part perform REAI-related cryptographic operations. An EBICert, EBICert1, may contain and/or securely reference one or more of the following:

1. EBICert1 public key of EBICert1 public/private key pair,
2. One or more composite identification information sets of a fused-identity entity representing an EBICert1 user human person and such user person's device and/or associated service arrangement that generated and/or is carrying EBICert1, where each such composite IIS contains and/or securely references:
   a. Such EBICert1 user human person's near existential or existential quality, at least in part biometrically based identification information,
   b. Such device and/or service arrangement unique identifying information, and in some embodiments:

c. At least one such device and/or service arrangement's antecedent identification information set comprising, such as near existential and/or existential quality, at least in part biometrically based IISs of one or more situationally relevant Stakeholder human and/or human agent persons (such as the device and/or service arrangement's owner, manufacturer human agent, retailer, distributor, and/or the like).

In some embodiments, EBICert1's private key may be generated using such human person's near existential or existential quality, at least in part biometrically based IIS, at least a portion of secret (e.g., identifying) information securely stored in the device arrangement that is generating EBICert1, and other identification information (such as biometrically based data acquired operatively simultaneously to generating EBICert1, such as using the biometric acquisition functions of an RCFD to provide second factor identification information for the generation of EBICert1, such RCFD then carrying such EBICert).

In some embodiments, EBICerts include respective composite identification information sets, where each EBICert comprises (may securely reference so as to virtually contain) one or more of the following:

1. One or more CIISs, and/or one or more identifying portions thereof, where such one or more CIISs in part include as subject matter the device arrangement that generated and/or holds such an EBICert,
2. Such an EBICert's public key,
3. Contemporaneously and/or operatively simultaneously acquired near existential and/or existential quality biometrically based identification information instance(s) of such an EBICert's user (and/or owner) person (e.g., in the form of at least a portion of such person's IIS's information), where such identification information is used at least in part to identify/authenticate such person and/or generate such EBICert's private key,
4. One or more Repute EFs and/or Creds providing and/or assertions (such as an EBICert's one or more quality to purpose expressions), and
5. One or more policy sets for governing such an EBICert's usage and/or one or more portions of such EBICert signed information.

In some embodiments, an EBICert infrastructure supports EBInet device arrangements use of one or more policy sets for at least in part governing their identification related operations (including cryptographic operations), such as secure governance of:

1. Generating private keys of respective certificates, where such governance can include governing the use of methods that generate private keys, such as using methods of specified rigor level(s) (e.g., reliability, trustworthiness) to generate private keys, where biometrically based identification information instances meet respective specified rigor levels (such as satisfying near existential or existential quality performance requirements),
2. Use of such certificates' respective private keys to digitally sign resources, where such governance may include requiring verification of presence of contextually specific one or more types/instances (as specified) of Effective Facts and/or Creds to use certificates' respective private keys.
3. Securing/protecting certificates' respective private keys. Currently, certificate systems protect certificates' respective keys using strategies, such as storing such private keys:
   - (c) in a partially secured storage or memory, on machines (e.g., in a keyring, for example, which may be inaccessible when the user is not logged in) of device arrangements of certificates' respective human owners and/or human agents.
   - (d) on a dongle and/or in a device such as a TPM or HSM. Keys managed in this way by a secure hardware crypto-device are more secure than keys that are held and used in insecure memory, but still have uncertainties regarding provenance and therefore certificates' respective human owners and/or human agents (e.g., a human user) reliability. Moreover, this strategy, while protecting private keys, is vulnerable to the TPM or HSM being a single point of failure.
4. Employing fault tolerant technology of storing private keys in plural component device sets and using encryption technology to avoid a single point of failure.
5. Employing biometrics (suggested in literature) to re-generate same private keys each time such a key is used. Instead of storing in a repository arrangement, such a system may use palm cardiovascular, and/or facial structure biometrics (e.g., iris and/or other facial/head biometric implementations, for example, as described herein) to re-generate private keys as needed-must be the same key each time to match its distributed public key. Such a conventional system (including such a system that employs biometrics to formulate keys) is vulnerable to attacks where an attacker uses biometric information that the attacker acquired, for example, by assembling from publicly available information sets (such as facial images, iris recognition, and/or voice imprints and/or the like). The attacker would use such acquired biometric information in conjunction with the private key regeneration algorithm used by the compromised device to re-generate the private keys. The attacker can be successful only when such party has access to both the user's biometric information, as well as the algorithm set used by the device. Once a biometric information set has been disclosed, the required precedent information set is postulate to forming regenerated keys, as such it may be impossible to change such biometric information set and the corresponding generated private keys. In order for current technologies to counter such attacks, they can try combining private key generation with a salt (secret) held in the attacked device, and/or a password supplied as a key generation second factor by a user. Using salt held in the device ensures that an attacker needs to, and a determined attacker is likely to get access to, the user's applicable biometric information, the memory of the compromised device (to get the salt), and the algorithm used by the device. While passwords make it more difficult for an attacker to compromise a private key since the attacker might need, for example, a keystroke logger to acquire password information, an attacker's use of a keystroke logger defeats the usefulness of passwords. Further, using a password supplied by a user has other disadvantages, for example, the user has to remember a password, the passwords generally need to be highly distinctive to reduce risk, and they need to be changed often enough to mitigate compromise resulting from passwords being stolen and improperly used.

Without such policy sets for governance of generating, using, and/or securing certificates, receivers of digitally signed REAI instances' respective subject matter and/or subject matter interface may not, for example depending on context, have sufficient information to determine whether a subject matter and/or subject matter interface's is suitable to purpose.

In some embodiments, a CIIS of a fused-identity entity, representing a human user, U1, and U1's EBINet device, such as RCFD1, can be represented by:

CIIS1{[SM: (U1/AFD1)/RCFD1],
  [AS: AFD1 and RCFD1 SVCC antecedent sources]},
  where:
    AFD1 is the AFD that acquired and provisioned U1's one or more at least in part biometrically based identification information sets; and
    AFD1 and RCFD1 SVCC antecedent source identification information can include near existential and/or existential quality, at least in part biometrically based identification information of relevant one or more CertPers (such as AFD1's and RCFD1's respective manufacturing certifiers (ManPers), distribution certifiers, retail certifiers, and/or the like) and EBInet devices (such as AFDs) that acquired such biometrically based identification information.

For example, FIG. 46A-46C provides more extended CIISs that have more extensive antecedent source identification information as part of their fused identities. For example, FIG. 46A has:

CIIS1{[SM: (CertPer1/AFD1)/RCUFD1],

[AS: (AFD1: O1, #CertPer3/(AFD5: O7, #CertPer12)), (RCUFD1: O2=CertPer1, #CertPer4/(AFD6: O8, #CertPer13) &/or other AFD1's & RCUFD1's SVCC related identifiers, such as identifiers of additional CertPer(s) & respective biometric information acquiring AFD(s)]}

And for another example, FIG. 46C has:

CIIS3{[SM: RS1(3)/U1, (U1/AFD3)/RCUFD2],

[AS: (AFD3: O3, #CertPer8), (RCUFD2: O4=U1, #CertPer9), (#RS1(1) Prov1, #RS1(2) Prov1, #RS1 (3) Prov1]}, where #RS1(1) Prov1, #RS1(2) Prov1, and #RS1(3) Prov1 identification information can respectively include and/or reference RS1(1)-, RS1(2)-, and RS1 (3)-related IISs, such as RS1(3)-related IIS can include identification information associated with RCUFD2 receiving RS1(3) event/activity instances.

However, due to space limitations, this application uses a notation, CIIS1(O1/AFD1, #CertPer1), to represent a CIIS of a fused identity entity, O1/AFD1, that AFD1, an AFD owned by an O-Per, O1, produced, and certified by CertPer1 using CertPer1's at least in part nearly existential or existential quality, biometrically based identification information and any associated attributes.

For another example, CIIS1((U1/AFD1)/RCFD1), #CertPer1) represents a CIIS of a fused identity entity ((U1/AFD1)/RCFD1), in which CertPer1 is a set of CertPers who certified, through the use of their respective EBInet near existential and/or existential at least in part biometrically based identification information sets (such as EBICerts), the respective authenticity of RCFD1's and AFD1's respective manufacturing, retailing, and/or ownership.

FIG. 15A-15C illustrates a non-limiting example, wherein two users, U1 and U2, using their respective RCUFDs to exchange respective EBICerts in anticipation of user U1 sending user U2 a signed document that, after demonstrating U2's liveness/presence during biometric acquisition, only U2 can decrypt. Such exchange includes using one or more specified methods for generating EBICerts and such EBICerts' respective private keys. For example, RCUFD1 can generate an EBICert, EBICert3, for a fused-identity entity representing a human user, U1 and RCUFD1. RCUFD1's policy set may specify, for example, whenever RCUFD1 signs the subject matter and/or subject matter interface of an REAI, REAI1 (such as a document, Doc1), using aEBICert3, RCUFD1 generate a composite IIS for signed REAI1, such IIS including the following:

1. REAI1 subject matter and/or subject matter interface.
2. A cryptographic signature of REAI1 subject matter and/or subject matter interface, where such signature securely binds EBICert3 to REAI1's subject matter and/or subject matter interface.
3. At least one EBICert3 CIIS, where such EBICert3 CIIS includes: (i) near existential and/or existential quality, at least in part biometrically based identification information of U1, and (ii) RCUFD1 identification information, including one or more unique device identifiers. Such EBICert3 CIIS can also include one or more other attributes of U1, and/or one or more of RCUFD1's other stakeholder persons' (such as an RCUFD1 manufacturer person CertPer) biometrically based identification information. For example, such attributes may include U1's, RCUFD1's, and/or such other stakeholder persons' respective Repute EFs, Creds, and/or other attributes characterizing U1, RCUFD1, and/or such other stakeholder one or more persons.

In some embodiments, policy sets associated with an EBInet device arrangement, DEV1 (as for example, RCUFD1 as illustrated by FIG. 15A-15C) may specify that whenever DEV1 generates a private key for use with an EBICert (as for example, EBICert3 as illustrated by FIG. 15A-15C), DEV1 uses a combination of:

1. highly reliable near existential and/or existential quality, at least in part biometrically based IIS information that includes assurance of such EBICert's owner's or owner agent person's physical presence during biometric identification information acquisition; and
2. secret information that is encrypted and securely stored in DEV1's protected processing environment (PPE) that DEV1 can decrypt using a passcode that such EBICert's owner person or owner agent person provides using an EBInet trusted path.

In some embodiments, such policy sets can also include a specification set that requires DEV1 to securely delete or otherwise remove such private key after each use and validate such EBICert's human owner's and/or owner agent's current physical presence (liveness) prior to regenerating private keys for each use. Such validation of liveness and such highly reliable nearly existential or existential quality biometric identification information of the owner person and/or owner agent person can provide assurance that an attacker, such as a thief who stole RCFD1, cannot spoof such human person's presence.

An EBICert being carried by RCUFD1/U1 comprises one or more CIIS that specifically and uniquely identify such EBICert's human owners or users by including near existential and/or existential quality at least in part biometrically based identification information sets. In addition, as an EBInet device arrangement that holds, for example, one or more generated private keys for an RCUFD/U1 EBICert, RCUFD1/U1 can enable a reliable at least in part biometrically based identification information set which securely includes and/or references (is securely bound with) its cryptographically protected private key management policies, a combination of a key set and other IIS identification information used in forming at least one RCUFD1/U1 CIIS, such as an EBICert. Such identification information sets can include such policies and may be examined by an independent evaluator to reliably determine that such an EBICert represents a fused entity such as RCFD1/O1, where O1 is, for example, RCFD1's owner human or owner human agent.

In some EBInet embodiments, an SVCC Stakeholder human agent, CertPer1, is contemporaneously, biometrically identified by an EBInet device arrangement, e.g., AFSD1, where AFSD1 creates a CIIS/EBICert for identifying CertPer1, such CIIS comprising a composite combination of (a) CertPer1's near existential or existential quality, at least in part biometrically based identification information derived from AFSD1 identification of CertPer1, and (b) AFSD1 identification information. Such CIIS may further include carrying device arrangement (e.g., RCFD1) device identification information, such device information in the form of a composite identification information set that includes both such device identifying information and its stakeholder representing manufacturing verifying CertPer's biometrically based identification information. Such identified CertPer then can certify an event/activity involving manufacturing a "new" device arrangement DEV2, using a CertPer1's (e.g., ManPer1's) RCFD carried such CIIS/EBICert to attest to the authenticity of an EBInet device (e.g., DEV1) at, for example, DEV1's manufacture time, point of sale time, and/or the like operative time. Such certifying can be performed by a CertPer1 signing, and/or otherwise providing CertPer IIS information for DEV1's CIIS. CertPer1 may, for example, also initiate a publishing event/activity instance to publish a composite identification information set representing the fused entity, DEV1/ManPer1+. Such composite CIIS may comprise, for example, CIIS1(DEV1/(ManPer1/(AFSD1/O1, #ManPer2))), where AFSD1 (owned by an O-Per, O1, and certified by ManPer2) is an AFD that acquired ManPer1's near existential or existential quality at least in part biometrically based IIS. Such CIIS can be securely bound to its primary subject matter, DEV1, and/or a DEV1 interface.

DEV1's manufacturer's policy set may specify requirement(s) for, and govern the performing of, publishing a CIIS for a manufactured item (e.g., CIIS1 of DEV1), where such CIIS can, for example, include:

(1) one or more DEV1 manufacturing persons' (ManPers') respective nearly existential and/or existential quality, at least in part biometrically based CIISs, used to demonstrate the presence of, for example, a specifically device validating/authorizing, authorized person (person authorization may be EF testable) at the time of manufacturing, such presence demonstrated through the use of contemporaneously acquired, and/or operatively simultaneously acquired, biometric identification information;

(2) DEV1's uniquely identifying information; and (3) one or more RCFD1 identification information instances, comprising the EBInet IIS carrying device arrangement information of ManPer1, who can perform as the, for example, certifier of DEV1's manufacturing, where RCFD1 carries and provisions such manufacturing person's respective nearly existential and/or existential quality, at least in part biometrically based one or more IISs, where RCFD1's one or more users and manufacturing persons may include, for example: (a) ManPer1, who is the human user of RCFD1, (RCFD1 biometrically identified ManPer1 and provided one or more MantPer1 IISs), who employed RCFD1, to serve as a certifier of DEV1's certifier, CertPer1), (b) O1, RCFD1 owner, who may be DEV1 manufacturing owner agent; and (c) ManPer2, a human agent who certified RCFD1, where ManPer2 may be a manufacturing human and/or human agent of RCFD1.

The described CIIS1 (of DEV1/ManPer1) can comprise a spectrum of information that supports a validation of trusted provenance of a device arrangement based at least in part on biometrically based provenance associated person identification, complemented by, for example, associated device arrangement information, and one or more EFs and/or Creds. Such provenance information can include any germane SVCC PERCos/EBInet identification information for any historically and/or currently material one or more persons (and respective devices), where such information may be germane for the identification, authenticity and/or suitability evaluation, use of, and/or participation in, an REAI set.

An identification information set for a CertPer (e.g., an SVCC, and/or a social chain event/activity certifier), in some embodiments, comprises a composite identification information set, wherein such composite identification information set can, for example, include both near existential or existential quality at least in part biometrically based certifying person identification information and uniquely identifying such biometrically based information acquiring device identification information, and may further include such a CertPer's carrying device arrangement identification information, such composite identification information set forming a "fused" identification information set for a subject instance, such as a person/AFD entity combination. Such information can inform regarding, for example, the suitability, such as respective trustworthiness of, a manufactured, retailed, or used EBInet device arrangement, such as DEV1 (and/or any other resource type).

In some embodiments, including Repute information of one or more Stakeholder human agent as part of DEV1's composite IIS, supports securely providing highly reliable, device arrangement identification information related suitability information through the secure association/combination of nearly existential and/or existential quality biometrically based identification information of Stakeholder, CertPer, and/or other human, with securely associated/combined Repute information. Such information can inform regarding, for example, the suitability, such as respective trustworthiness of, respective device arrangements (and/or any other resource type).

In some EBInet embodiments, a manufacturer provides a device arrangement with means for validating its identity. In support of this functionality, a manufacturer may cause such a device arrangement to generate one or more public/private key pairs. Such device may place such pairs' respective one or more private keys in securely managed memory and supply the manufacturer with such pairs' one or more respective public keys. Such manufacturer may sign such one or more public keys and include such one or more signed public keys in one or more of such device's identification information sets, such as one or more EBICerts. Once such inclusion has been done, such a device arrangement can prove, for example, that it is the owner of a private key associated with a public key in its identification information set and thereby validate that it is the device arrangement identified by such an identification information set. If such a device arrangement is involved in the storage or use of cryptographic materials (such as, for example, using private keys) and/or EBInet token-related operations (such as, for example, acquiring, carrying, forwarding and/or using IIT information), then at least in part biometrically based identification information sets for such device arrangement may be used to inform an independent evaluator with evidence of suitability, such as the trustworthiness rigor of such device arrangements, result sets.

In some embodiments, such public/private key pairs may be amended with other key pairs employed in identifying a device/person. For example, at time of sale or when a user registers a device, a device arrangement may securely generate one or more public/private key pairs and create one or more composite device/person arrangement identification information sets, for a device/person IIS subject matter, where such registration IIS information may include, for example:

1. Such generated one or more public keys,
2. One or more instances of at least in part near existential and/or existential quality biometrically based identification information of a new owner/acquirer owner person agent, and/or device arrangement user, 3. One or more standardized and interoperably interpretable suitability attributes regarding such device arrangement and/or device arrangement owner/acquirer, owner person agent, and/or device user, such as Cred, EF, and/or other descriptive information, such information for employment in suitability to purpose assessment by one or more other parties and/or their device arrangements,
4. One or more instances of such device arrangement's one or more CertPers' respective at least in part near existential and/or existential quality biometrically based identification information sets identifying/describing the manufacturer and/or one or more past retailers, distributors, and/or owners selling, and/or who have sold, such device arrangement,
5. One or more instances of SVCC at least in part near existential and/or existential quality biometrically based identification information employed in event/activity related device arrangement provenance information. Such information can comprise information identifying the composite AFD/CertPer informing regarding a device arrangement's provenance instance such as an identification information set for the fused identity AFD/CertPer that identified the subject matter device arrangement's manufacturing CertPer, e.g., the composite device/person CIIS for the arrangement that generated the biometrically based identifying information for the subject matter device arrangement, and/or
6. Time, date, and location of the sale, delivery, and/or activation of such device to the new owner, owner person agent, and/or user.

In some embodiments, EBInet arrangement public/private key pairs may enable EBInet device arrangements to perform various cryptographic operations (such as signing documents or other data sets, configuring secure communications, and/or the like), the foregoing performed using one or more private at least in part biometrically derived keys that are cryptographically associated with, and/or otherwise securely incorporate and/or employ, at least in part near existential and/or existential quality biometrically based identification information. Signing documents can allow such device/person arrangements to attest statements, supported by such device/person arrangements' respective composite IIS sets. For example, a device/person arrangement can attest that the device arrangement user, U1 (who may also be the arrangement's owner), was actually present at a certain time, T1, (e.g., determined using a secure clock in an EBInet RIIPU) and/or an identification information token (IIT), IIT1, was received from an AFSD, AFSD1, at a time, T2 (e.g., as securely determined by a secure clock arrangement in a NIIPU), and/or that U1 initiated a signing operation on document, Doc1, at time T3 using an RCUFD, RCUFD1, (e.g., securely determined using a secure NIIPU clock arrangement) where T1, followed by T2, are earlier than T3. In some embodiments, the degree of rigor to be associated with such signed documents may be determined from, and/or otherwise evaluated through the use of, such attested statements and/or device/person arrangement's composite identification information set(s), which, for example in some embodiments, may be accessed using the device arrangement's public key, such key used when validating such signature.

In some embodiments, a private key associated with an EBICert that represents a fused identity entity, U1/RCUFD1, can be generated at least in part using a near existential or existential quality biometric information set of such EBICert's owner person and/or owner agent person. Such private key can be securely and reliably deleted between uses and regenerated when needed to sign an REAI, REAI1, on behalf, for example, of such EBICert's owner person and/or such EBICert's owner agent person. For example, in a non-limiting example (illustrated by FIG. 15A-15C), a user, U1, uses RCUFD1 to sign a document, Doc1, where RCUFD1 generates/regenerates the private key associated with such EBICert, EBICert3 (connecting lines/arrows in such figures are selective, not comprehensive). In this example EBICert3 may include:

- one or more portions of a composite IIS representing a fused identity entity, U1/RCUFD1, and
- one or more EFs and/or Creds, such as an EF stipulating, and/or a Cred asserting, that RCUFD1 securely and reliably deletes EBICert3's private key after use (such one or more EFs and/or Creds may be part of such composite IIS as a component of RCUFD1's identification information).

In addition, such embodiments may ensure that the signature of REAI1 subject matter (Doc1 in the example illustrated by FIG. 15A-15C) or subject matter interface securely includes (e.g., securely references) such IITs (e.g., when used to regenerate a private key) and/or at least a portion of such IITs' biometrically based identification information sets. In addition, protection and/or use of private keys may be dependent on securely stored and processed user and/or user resource (e.g., device such as RCFD) respective attributes, for example, use and/or storage of such keys may require verified presence of one or more keys' respective Effective Facts and/or Creds, such presence antecedent to the key generation.

In some embodiments, such as shown in FIG. 15A, an EBICert, EBICert3, comprising a composite IIS, is an REAI identification information set used, at least in part, for signing an REAI subject matter (e.g., Doc1) to form an EBIDoc. Such an IIS is an IIT EBICert. EBICert3 in this example, contains:

- One or more portions of a composite IIS that represents a fused entity, U1/RCUFD1, and where such fused entity carries EBICert3 comprising CIIS portions suitable for such signing. Such one or more portions of such composite IIS can include (e.g., securely reference and virtually include):
  - One or more composite IISs and/or portions thereof for respective subject matters (U1 and AFSD1) comprising: (i) AFSD1 acquired and provided near existential and/or existential quality, at least in part biometrically based information that identifies U1 and (ii) identification information characterizing AFSD1/O1, where such identification information includes near existential and/or existential quality, at least in part biometrically based information set of O1, who is AFSD1's O-Per, one or more near existential and/or existential quality at least in part biometrically based identification information identifying one or more other AFSD1 provenance SVCC stakeholder persons (e.g., manufacturing, distributing, and/or retailing persons).
  - One or more composite IISs of RCUFD1/O2, where RCUFD1 is an EBInet device that is using EBICert3's private key to sign REAI1 subject matter and/or subject matter interface) and O2 is RCUFD1's O-Per, who may be the same person as U1. Such composite IISs may include one or more near existential and/or existential quality, at least in part biometrically based IIS of RCUFD1's SVCC Stakeholders.

A policy set that governs usage of EBICert3's private key, where such usage may be dependent on securely stored and processed attributes of U1/RCUFD1, where U1 may be EBICert3 owner person and RCUFD1 is the EBInet device arrangement that is carrying EBICert3. For example, the policy set may specify validation of one or more Effective Facts and/or Creds before a private key can be used.

4.1 A Non-Limiting Illustrative Example of EBICert Generation and Usage

Currently, computer certificates (such as X.509), due to their inherent vulnerabilities, have a functionally quite limited range of use. The following example set describes a much broader content and use set for EBInet computer certificates, where (a) the reliable validation of the sourcing of certificates, and (b) the identification information (suitability attributes) informing regarding the consequence of use of tokens, are securely bound to provide multi-function/purpose, securely delivered identification information sets, and where such identification information sets respectively include associated nearly existential and/or existential quality identification of EBICert associated persons and can provide assertions/stipulations regarding signing persons and/or their signing device arrangements. Such EBICert arrangements enable/deliver a wide range of innovative certificate and/or certificate subject matter characterizing and security hardening features that transform the current reality of certificates and tokens into a rich, highly reliable/verifiable identification information infrastructure arrangement.

An EBICert, in the following example, is a form of an IIT that includes a public key of a public/private key pair of a securely associated and uniquely identified device and/or service arrangement, such as a public key as is traditionally held in a conventional computer certificate. An EBICert provides one or more types of attributes of a subject matter (such as a person), for example, one or more real world name(s), address(es), employer names, employment position (e.g., title, responsibilities, rights, and/or the like), and/or ID(s), and/or other forms of information (e.g., as data), and where such information may be provided as PERCos testable/verifiable Effective Fact(s) and/or Cred(s). Such information can be used in very highly reliable suitability evaluations performed prior to respective computing events/activities, where an EBICert/IIT data set employed with a securely maintained private key, can function as an information proxy for a user.

In some embodiments, evaluation of an EBICert employed in a computing event/activity instance (such as, for example, signing a document) may include assessing factors, such as suitability to purpose, and/or other considerations, of one or more of:

Characteristics of one or more portions of the EBICert that were generated using an antecedent IIT, wherein one or more portions of such antecedent IIT information (e.g., biometric person identifying, EF, Cred, other person and/or device characterizing meta data, and/or the like, attribute information) may comprise one or more portions of such EBICert. Such EBICert's IIT information may provide a rigor level information set that determines, or contributes to, the trustworthiness rigor of the EBICert. Such a rigor level's information set may be derived from provenance information (inherited or otherwise) derived from an AFSD REAI IIS(s) that determined the biometric identification of an EBICert subject matter person. This example may apply to situations where an EBICert is securely associated with one or more EBInet device and/or service arrangements. Such secure association can take the form an EBICert being used to identity, authenticate, perform cryptographic operations (such as validating/signing, encrypting, establishing secure communication connections), and/or the like, wherein an EBICert is securely associated with one or more EBInet device and/or service, and/or associated identification information, arrangements that create, use, and/or securely reference such EBICert, such as one or more of an AFD, RCFD, RUD, RUS, and/or other EBInet, arrangement In the associated non-limiting example, illustrated by FIG. 13, RCUFD1 creates a private key for an EBICert, EBICert3, using, at least in part (a) an IIS, IIS1 (e.g., using one or more portions of IIS1), where IIS1 is at least in part based on contemporaneous at least in part AFSD acquired/provided near existential or existential quality, at least in part biometrically based information; and (b) a secret information set, S1, securely stored in NIIPU1's hardened memory. Such information (a and b) may, at least in part, be employed in user and/or device suitability to purpose analysis. In some embodiments, such a private key can be securely shared by plural device arrangements in a given EBICert usage arrangement.

An EBInet device arrangement(s) that generated and/or used the EBICert (such as used it to sign (i.e., encrypt a cryptographic hash of) a document and/or convey encrypted information). In the example illustrated by FIG. 13, RCUFD1 is such device arrangement.

An EBInet entity arrangement(s) that carries the EBICert, where such entity arrangement comprises a composite (fused identity) EBInet device arrangement and Stakeholder and/or relevant person(s) (represented by relevant at least in part biometrically based identification information), where such entity used the EBICert (e.g., signing) in performing the computing event/activity instance (i.e., employed an EBICert or an EBInet EBICert device arrangement. For example, in the example illustrated by FIG. 13, such EBInet device arrangement is RCUFD1.

A set of hardware and software capabilities that protect EBICert arrangement information, such as the EBICert's private key and/or sensitive IIS information. For example, some EBInet device arrangements may use one or more hardened tamper and inspection resistant memory arrangements to store cryptographic keys (such as private and/or symmetric keys) and other sensitive IIS information. In the example illustrated by FIG. 13, RCUFD1 protects EBICert3's private key in NIIPU1's hardened memory.

And/or the like.

Such EBICerts (such as EBICert3) can provide highly rigorous validation of human identity by: (i) respectively including and/or securely referencing one or more EBInet at least in part nearly existential or existential quality, biometrically based identification information sets; and (ii) providing a highly reliable demonstration that such EBICerts' respective one or more human persons were physically present during, and initiated, an EBICert signing event/activity instance. In some embodiments, for example, such EBICerts can further provide respective validatable Effective Fact, quantified Quality to Purpose, and/or the like, attribute information. For example, the signing of an information set, such as a document or multimedia, can enable not only the validation/authentication of such information set by a CertPer/EBInet device arrangement, but can further provide useful and at times, critically important attribute information about such CertPer, EBInet device arrangement, and/or signed subject matter, where such information may, for example, be automatically presented to a signed information set receiving party. For example, such presented information may stipulate a fact that the CertPer has certain attributes, such as, is a board-certified neurologist, and is a professor of neurology at Weill Medical College of Cornell University.

In some embodiments, EBICerts are in part created using respective contemporaneously acquired near existential and/or existential quality at least in part biometrically based IISs and/or operatively simultaneously acquired near existential and/or existential quality biometrically identifying information.

In such embodiments, an EBICert may be independently authenticated and/or otherwise evaluated at least in part through the validation of liveness presence of its one or more CertPers, where such CertPers, for example, are physically present (or their contemporaneous CBEIIS or CIIS being operatively present) operatively simultaneously to an activity instance of creating such EBICert and generation of a private key, and/or regeneration of a private key, securely associated to such EBICert. Such evaluation may further make use of, for example, Quality to Purpose specifications and Effective Facts, included in and/or securely referenced by such an EBICert.

In some embodiments, generating such EBICerts enables EBInet device arrangements respectively carrying/holding such EBICerts to securely and reliably delete such EBICerts' respective private keys after each use (or periodically, and/or otherwise in accordance with specified use terms), thereby as a result of such deletion, preventing private keys from being stolen and/or compromised.

FIGS. 13-15C illustrate a non-limiting example of an EBInet embodiment that enables a user, U1, to protect, certify, and distribute a document, Doc1, using an EBInet arrangement. In such example, RCUFD1/O2 on behalf of U1 generates an EBICert, EBICert3, that U1/RUCFD1 can use to sign an encrypted Doc1 (an REAI subject matter, such as a document or multimedia) that only an intended user, U2, can retrieve and decrypt, and where such decryption occurs only when U2 is physically, personally present. U1/RCUFD1 uses EBICert3 in the creation of an EBIbox, EBIbox1, that contains an EBInet arrangement encrypted and signed, EBInet governed, and identified Doc1 and associated information, such EBInet protected and identified Doc1 comprising EBIDoc1.

- FIG. 13 illustrates such EBInet embodiment enabling a fused-identity entity, RCUFD1/O2 creating an EBICert, EBICert3(U1/RCUFD1) that has a policy set that specifies RCUFD1/O2 to securely delete EBICert3's private key and regenerate it as required. Such creation is at least in part based on a contemporaneous composite IIS, CIIS1(U1/AFSD1), provided by AFSD1, where CIIS1(U1/AFSD1) securely contains and/or references U1's near existential or existential quality at least in part biometrically based identification information. RCUFD1/O2, on behalf of U1, creates such EBICert after validating U1's presence/liveness using SE2/RCUFD1 acquired U1 biometric information, where SE2 is a sensor/emitter set that RCUFD1 shares with RCUFD1's parent device, PD2.
- FIG. 14 illustrates such EBInet embodiment enabling RCUFD1/O2 to regenerate EBICert3's private key, on behalf of U1, using at least in part a contemporaneous composite IIS, CIIS2 (U1/AFD1), provided by an AFD that is different than the AFSD that provided CIIS1 (U1/AFSD1) that RCUFD1 (illustrated in FIG. 13) to create both EBICert3, and securely associated private key, EBICert3K1Priv.
- FIG. 15A illustrate a non-limiting EBInet embodiment, wherein U1/RCUFD1 and U2/RCUFD2, using their respective RCUFDs, exchange respective EBICerts in anticipation of user U1/RCUFD1 sending to U2/RCUFD2 an encrypted document, Doc1 (contained in a secure EBIbox package) that only U2/RCUFD2 can decrypt after determining U2's liveness/presence during biometric acquisition.
- FIG. 15B illustrates a non-limiting example embodiment showing U1/RCUFD1: (i) creating a secure EBIbox package containing signed and encrypted Doc1 that only an intended user, U2, can retrieve after demonstrating U2's liveness and (ii) sending such EBIbox package to U2/RCUFD2. Such EBIbox package, EBIbox1, comprises
  - EBICert3(U1/RCUFD1).
  - EBIDoc1, an EBInet protected and identified Doc1 (EBIDoc1 is a transmutation of Doc1 that is at least in part encrypted, signed, and EBInet identified) governed by Policy1 (such as a DRM policy component of Doc1 IIS information).
  - U1/RCUFD1 produces EBIDoc1 by: (i) creating a symmetric key, SymmKey1; (ii) encrypting Doc1 using a symmetric key, SymmKey1; (iii) encrypting SymmKey1 using a public key, EBICert6K1Pub (an EBICert representing U2/RCUFD2); and (iv) signing encrypted Doc1 using EBICert3K1priv.
  - Signed and at least in part encrypted other relevant material, such as, one or more portions, and/or all of, Doc1 IIS information (such as an IIT/IIS containing Doc1 related Creds, EFs, interface info, Policy1, EBIbox1 provenance information, and/or the like). Policy 1, for example, can specify rights management governance specification, such as specifying that EBIDoc1 can only be decrypted in the presence of U2 and used in accordance with Policy1).
  - Signed and encrypted SymmKey1.
- FIG. 15C illustrates a non-limiting example embodiment showing U2/RCUFD2 unpacking of EBIbox1 sent by U1/RCUFD1 and presenting Doc1 in cleartext to U2 to enable U2 to utilize Doc1 in fulfillment of U2's purpose(s), where such unpacking includes:
  - Confirming presence of (U2/RCUFD2)'s contemporaneous CIIS, where such confirming can include: (i) validating U2's identity near existential or existential quality at least in part biometrically based identification information and (ii) confirming physical liveness using a biometric information acquired using a sensor/emitter set, SE5, that RCUFD2/O5 shares with PD4, RCUFD2/O5 parent device.
  - Validating EBIbox1 signature to determine that EBIbox1 was sent by U1/RCUFD1.
  - Decrypting encrypted Doc1 IIS information and then validating and/or otherwise evaluating Doc1 IIS information, and/or portions thereof, to determine Doc1's suitability to U2's purpose(s), in accordance with a policy(ies), such as DRMPolicy1 and/or U2/RCUFD2 policy). In some embodiment, U2/RCUFD2 may perform such validation at least in part using TIIRS1 registered information similarity matching services.

Using SymmKey1 to decrypt Doc1 and presenting Doc1 in cleartext to U1.

The example embodiment shown in FIGS. 13 and 14 includes the following components:

PD1, a parent device arrangement, such as a home-based mobile device charging unit that has an embedded AFSD1. AFSD1 acquires near existential and/or existential quality, at least in part, biometrically based identification information sets for users, such as, for example, U1. In some cases, AFSD1 generates one or more IISs (such as CBEIISs, CIISs, and/or other IIS information) for U1, based on at least in part SE1 acquired biometrically based identification information and, in accordance with AFSD1 specification set, forwards U1's generated IISs to one or more receiving device arrangements, such as U1's RCUFD device arrangement, RCUFD1.

PD1 comprises:

AFSD1/O1, an AFSD, owned by O1. AFSD1/O1 includes one or more trusted, tamper and inspection, resistant modular component arrangements, comprising:

RIIPU1/O1, a secure hardened EBInet modular component arrangement, where RIIPU1/O1 includes a hardened memory arrangement for maintaining one or more EBICerts and associated private keys generated by, and/or otherwise created for (and provided to) RIIPU1/O1, during AFSD1 manufacturing (manufacturing may, herein, include post fabrication product preparation), and/or during subsequent situationally relevant SVCC event/activity instances, such as, for example, registering a change in AFSD1 ownership. Such memory arrangement can also hold one or more IISs/IITs generated by, and/or for, RIIPU1 and/or parent AFSD1 arrangement. Further, one or more RIIPU1/O1 private keys may be cryptographically bound to at least a portion of one or more manufacturers' (and/or other SVCC parties') personnel's respective biometrically based (e.g., contemporaneous CBEIIS) identification information. Such information combination may be employed to enable other parties/device arrangements to authenticate AFSD1, for example through the use of a CIIS and/or EBICert. In some embodiments, an applicable stakeholder human and/or human agent, using a computing arrangement, may register AFSD1's one or more CIISs and/or EBICerts with one or more trusted identification information database arrangements (such as TIIRS1). In the example illustrated by FIG. 13, AFSD1, registers CIIS1(AFSD1 #CertPer1/O1) and EBICert1 with TIIRS1 as part of AFSD1 registration, in accordance with O1's instruction.

SE1, (AFSD1/O1)'s secure hardened sensor/emitter set that AFSD1/O1 employs to acquire U1's near existential or existential quality biometric data that AFSD1/O1 processes to provision IISs/IITs, such as, for example, CIIS1 and CIIS3.

Shared components that AFSD1/O1 shares with and/or integral components of PD1, such as packaging, power supply, communication components (such as antennae, ports, network components, and/or the like), and/or the like.

PD2, a parent device arrangement, such as a smartphone, smartwatch, tablet, laptop, and/or other portable computing appliance, owned by O2, who is the same person as U1. PD2 comprises:

RCUFD1/O2, a tamper resistant, modular RCFD device arrangement integrated in PD2, shares one or more capabilities of PD2 to enable U1/RCUFD1 to pursue U1/RCUFD1 event/activity instances. RCUFD1/O2 includes one or more NIIPUs, such as NIIPU1/O2 that has:

a hardened memory arrangement for storing, for example:

CBEIISs, CIISs, IITs, and/or other IIS information, such as, for example, CIIS1(U1/AFSD1), CIIS1((RCUFD1 #CertPer3)/O2), and/or the like.

EBICerts and respective private keys created during manufacturing, and/or subsequent SVCC event/activity instances (such as at the time of sale of PD2) for: (i) subsequent SVCC event/activity instance uses (such as registering the change in RCUFD1 ownership (such as at time of sale of RCUFD1 to O2) to represent the new fused O2/RCUFD1 composite identification information set); and/or (ii) RCUFD1/O2 to validate/authenticate, and/or inform regarding, its fused identity attributes to other parties. Such private keys may be cryptographically, securely bound at least in part with one or more manufacturer (and/or other SVCC) personnel's biometrically based identification information (e.g., contemporaneous CBEIISs) and/or manufacturer personnel/device arrangement composite IISs, wherein the combination of the private key and IIS may be employed in securely verifiable/authenticatable form (e.g., matchable against a registered, cryptographically hashed IIS that has a public key information set, such as an EBICert).

EBICerts created for personal and/or other party's use, such as, for example, U1, to pursue U1 event/activity instances. In the embodiment shown in FIG. 13, RCUFD1 uses (at least in part) CIIS1 information content for the generation of an EBICert, EBICert3, on behalf of U1/RCUFD1, where EBICert3 has an associated private key/public key pair, EBICert3K1Priv/EBICert3K1Pub. In some embodiments, as shown in this example, such memory can also store one or more IISs received from AFSD1 and/or AFD1.

PPE1, a PPE that securely generates/regenerates private keys, such as EBICert3K1Priv, securely associated/referenced with EBICert3.

PPE2, a PPE that securely evaluates apparent and/or existential quality (such quality type depending on cost and/or implementation practicality), identification and liveness information of RCUFD1 users, such as U1, using at least in part biometric data acquired by SE2 in combination with carried contemporaneous nearly existential or existential quality, at least in part biometrically based IIS.

PPE3, a PPE that securely manages secret information, such as S1, stored securely in NIIPU1's hardened memory arrangement.

PPE4, a PPE that securely governs EBInet communication and IIS (for example, other EBInet arrangements' respective identification information) usage.

EBInet embodiment PPE arrangements in various embodiments may be designed to be implemented as one or more isolated secure protected processing environments, such number and associated design based on practical cost, engineering, and security/reliability considerations. Such PPEs may, under certain circumstances and depending on implementation, at least in part be designed to respectively perform operations of other same device arrangement's PPEs.

SE2, a PD2 native secure hardened sensor/emitter arrangement (associated one or more secure communication pathways, encrypted and/or otherwise secured) that PD2 shares with RCUFD1/O2. SE2 acquires user biometric identification data, employs SE2's, and/or a securely associated, trusted clock arrangement to time stamp at least a portion of emitter emission and sensor acquiring of emission's associated data (and/or information derived therefrom), and securely forwards acquired biometric information to one or more PPEs, such as PPE2 and PPE4.

AFD1/O3, a workplace AFD, such as, for example, a secure entryway biometric identification device arrangement. AFD1, owned by O3 has:

RIIPU2, a trusted computing, isolated and tamper and inspection resistant RIIPU arrangement for: (i) processing SE3 acquired near existential and/or existential quality biometrically based identification data to create one or more IISs (such as CBEIISs, CIISs and/or other IIS information), such as CIIS2 representing a fused identity entity, U1/AFD1; and (ii) forwarding to EBInet arrangements, such as RCUFD1, in accordance with its policy specification set.

SE3, a secure hardened AFD1 sensor/emitter arrangement (which may at least in part comprise a contained-environment sensor/emitter arrangement (CESEA)) that acquires near existential or existential quality biometric data for human users and securely forwards acquired data to RIIPU2.

TIIRS1, a trusted identification information registration and publishing service arrangement that operates, for example, in the cloud (e.g., as an internet cloud service), or as an organization's information management arrangement (local and/or remote). TIIRS1 includes:

RUS1, a receiving and using service arrangement comprising software and hardware components that securely provides a functionality set (e.g., a set of operations) that is comparable/equivalent to the functionality set provided by an RUD arrangement, and/or an operatively comparable, EBInet arrangement compliant capability set, to handle the authorization of requested operations by a user and/or Stakeholder, such as by U1, using an EBInet device arrangement.

TIIDB1, a secure repository arrangement for managing identity related information, such as:

CIIS1((AFSD1/O1, #CertPer1), a composite IIS representing a fused-identity entity, AFSD1/O1, where AFSD1 is an AFSD1 located at U1's residence, O1 is an AFSD1 owner who may or may not be the same person as U1, and an CertPer3 is an AFSD1 certifier (such as, for example, an AFSD1 manufacturer human agent, distributor, retailer, and/or other relevant person (e.g., SVCC Stakeholder), set).

CIIS1((AFSD1/O1, #CertPer1) in this example contains and/or securely references:

One or more portions of near existential and/or existential quality at least in part biometrically based IISs of O1 and CertPer1, and Identification information attributes characterizing AFSD1's components, capabilities, and/or suitability, such as AFSD1's tamper and inspection resistance, secure communication capabilities, secure hardened memory, AFSD1 QtPs and/or EFs, and/or the like, CIIS1(RCUFD1/O2(=U1), #CertPer2), a composite IIS representing a fused-identity entity, RCUFD1/O2, where O2 is an RCUFD1 owner who is the same person U1 and an CertPer2 is an RCUFD1 certifier (such as, for example, an RCUFD1 manufacturer human agent, distributor, retailer, and/or other relevant person (e.g., SVCC Stakeholder), set). Since O2 in this example is the same person as U1, CIIS1(RCUFD1/O2 (U1), #CertPer2) could be expressed as CIIS1(RCUFD1/U1, #CertPer2), where the role of the person biometrically identified by a composite IIS is expressed as a user subject matter role, instead of, or in addition to, an owner subject matter role. In such a circumstance, the identification information content of a user role versus an owner role identifying CIIS may be the same, other than identification information specifying differing roles, unless other additional and/or subtracted information is respectively included and/or removed, in accordance with respective roles and/or other specifications and/or instructions.

CIIS1(RCUFD1/O2(=U1), #CertPer2) can include and/or securely reference:

one or more portions O2's near existential or existential quality at least in part biometrically based identification information, and identification information characterizing RCUFD1, where such information may include near existential and/or existential quality at least in part biometrically based IISs of RCUFD1's one or more CertPers (such as CertPer2) and/or the like in addition to RCUFD1 device identification information.

In some embodiments, CIIS1(RCUFD1/O2, #CertPer2) may include O2's non-biometrically based identification information, such as, for example, one or more O2's societally characterizing attributes, such as, for example, O2's employer, title at work (such as a professor of physics, a member of technical staff, professional memberships, and/or the like), EFs and/or Creds, and/or the like.

In some embodiments, CIIS1(RCUFD1/O2(=U1), #CertPer2) may include RCUFD1 provenance biometrically based identification information of, for example, SVCC stakeholders and/or stakeholder agents (e.g., CertPers), such as manufacturing, distribution, and/or retail, certifying personnel. Such information (for example, at least a portion of RCUFD1's and/or U1's IIS information) may be signed by RCUFD1's private key generated by RCUFD1 at manufacture time, at wholesale time, at retail (e.g., sale), and/or the like, SVCC instance, and/or signed by a relevant other RUD, such as, manufacturing RUD identified CertPer1, a person who certified manufacturing event/activity (e.g., interim step, completion).

CIIS1(U1/AFSD1), a CIIS representing a fused-identity entity, U1/AFSD1, created by AFSD1, an AFSD1 that is located at U1's residence. AFSD1 created CIIS1(U1/AFSD1) at time T1 by acquiring and processing U1's near existential or existential quality at least in part biometrically based data. RCUFD1 used CIIS1(U1/AFSD1) to create an EBICert, EBICert3(U1/RCUFD1) and generated an associated private key, EBICert3K1Priv, on behalf of U1. In this example, RCUFD1 securely and reliably deletes EBICert3K1Priv "soon" after its generation, where "soon" may be within an hour, day, and/or some other time duration specified by RCUFD1's policy specification and/or U1 instruction.

CIIS1(AFD1/O3, #CertPer3), a CIIS representing a fused-identity entity, AFD1/O3, where AFD1 is an AFD that is located at U1's employer's facility, O3 is AFD1's owner, and CertPer3 is a CertPer who certified AFD1, such as a manufacturer human agent, distributor, retailer, and/or other relevant person (e.g., SVCC Stakeholder), set).

CIIS2 (U1/AFD1) a CIIS representing a fused-identity entity, U1/AFSD1, created by AFD1 at time T2>T1 (T2 is later than T1) by acquiring and processing U1's near existential or existential quality at least in part biometrically based data.

EBICert1(AFSD1/O1), EBICert2(RCUFD1/O2) and EBICert4(AFD1/O3) are EBICerts that fused-identity instances, AFSD1/O1, RCUFD1/O2, AFD1/O3, can use to validate/authenticate their respective fused-identities. For example, AFSD1/O1 and RCUFD1/O2 use their respective EBICerts, EBICert1(AFSD1/O1) and EBICert2 (RCUFD1/O2), to mutually authenticate each other so that they can establish a secure communication path between AFSD1 and RCUFD1.

Such EBICerts were created at the time when AFSD1's, RCUFD1's, and AFD1's, respective ownerships were transferred to O1, O2, and O3, respectively and/or at a later time when O1, O2, and O3, respectively register AFSD1/O1, RCUFD1/O2, and AFD1/O3, with one or more TIIRS arrangements, such as TIIRS1.

In some embodiments, EBICert1, EBICert2, and EBICert4, may be respectively signed by EBICerts representing fused-identity entities, CertPer1/AFD2, CertPer2/AFD3, and CertPer3/AFD4, respectively, where AFD2, AFD3, and AFD4, are AFDs that respectively provided near existential and/or existential quality, at least in part biometrically based IISs for CertPer1, CertPer2, and CertPer3.

AFSD1/O1, RCUFD1/O2, and AFD1/O3, can respectively use EBICert1(AFSD1/O1), EBICert2 (RCUFD1/O2), and EBICert4(AFD1/O3), to authenticate/validate their respective fused-identities for operations, such as establishing a secure communication path with another EBInet device and/or service arrangement, such as TIIRS1.

EBICert3(U1/RCUFD1) is an EBICert that a fused-identity entity, U1/RCUFD1 can use to perform event/activity instances, such as banking on-line, signing/certifying REAI subject matters (such as for example information documents, multimedia, and/or the like), receiving and/or sending email messages and/or text messages, signing on to social networks, and/or the like. In the example illustrated by FIG. 15A-15C, U1/RCUFD1 uses EBICert3(U1/RCUFD1) to sign an information document, Doc1, that U1/RCUFD1 forwards to U2/RCUFD2.

EBICert3(U1/RCUFD1) contains and/or securely references:

CIIS1(U1/AFSD1)

U1's non-biometric attributes, such as Repute EFs, Creds and/or other characterizing attributes. For example, EBICert3 may include an EF, EF1, stipulating that U1 is a professor of physics at MIT. Such EFs can enable a party to validate trustworthiness of an EBICert3 signed research paper on quantum physics, by validating/testing the test method associated with EF1.

An audit log/record of PPE2's validation of U1's existential identity and liveness/presence, where such validation of U1's existential identity is based on CIIS1(U1/AFSD1) and liveness/presence is based on non-existential, at least in part biometrically based identification data acquired by SE2 and processed by PPE2 using PD2's native biometric capabilities, where SE2 is RCUFD1's parent device's native sensor/emitter set.

CIIS1(AFSD1/O1, #CertPer1) and CIIS1(RCUFD1/O2, #CertPer2).

CIIS1(EBICert3/(U1/RCUFD1)) a composite IIS for EBICert3/(U1/RCUFD1), containing and/or referencing identification attribute sets that characterize EBICert3, such as, for example, RCUFD1 securely and reliably delete its private keys securely associated with such keys' respective EBICerts.

4.2 FIGS. 13 and 14

FIGS. 13 and 14 illustrate non-limiting examples of generating a private key of a private key/public key pair associated with an EBICert for a user, U1, where such private key can be deleted after use and regenerated as needed. FIG. 13 illustrates an EBInet device, RCUFD, RCUFD1, creating an EBICert for a fused entity comprising U1 and RCUFD1, after determining U1's live presence, where RCUFD1 generates the private key for such EBICert's private/public key pair using at least in part U1's contemporaneously acquired near existential or existential quality at least in part biometrically based identification information. FIG. 14 illustrates RCUFD1, after determining the live presence of U1, regenerating the EBICert's private key using at least in part U1's contemporaneously acquired near existential or existential quality at least in part biometrically based identification information, where such identification information can be acquired by different AFD arrangements, such as, an AFSD that is part of a home-based personal device in FIG. 13 and an AFD located at U1's workplace in FIG. 14.

4.2.1 FIG. 13

FIG. 13 illustrates the following sequence of steps leading to the registration of an EBICert, EBICert3, with TIIRS1:

Step 1: SE1 senses presence (such as sensing presence of a person's hand in SE1's contained-environment sensor/emitter arrangement) of a person, acquires the person's at least in part biometrically based identification information and forwards the acquired data to RIIPU1/O2. RIIPU1/O2, receiving such data, activates a biometric acquisition event/activity instance to securely generate CIIS1(U1/AFSD1), a composite IIS for a fused-identity entity, U1/AFSD1. Such event/activity instance can include RIIPU1/O1 securely:

Interacting with SE1 to acquire near existential or existential quality at least in part biometrically based data, and Confirming the person is U1 by processing the SE1 acquired data to securely match the processed data with a registered, previously acquired corresponding U1 biometrically based identification information. In some cases, such determination may include determining U1's liveness.

In some embodiments, operations (such as acquiring biometrically based data and generating IISs, and/or the like) may be governed by policy specifications. For example, for acquiring biometrically based data and generating IIS operations, such specification can state, for example, how often (e.g., how frequently, and/or other timing instance and/or period specification) such operations are stipulated to occur, one or more circumstances (e.g., conditions) under which an AFSD1/O1 generated IIS should be valid for contemporaneous authentication purposes, and/or the like.

In some embodiments, nearly existential or existential quality at least in part biometrically based identification information included in and/or securely referenced by CIIS1 (U1/AFSD1) may can be based at least in part on liveness (i.e., physical presence) determination of U1, performed during its biometric identification information acquisition process.

In some embodiments, CIIS1(U1/AFSD1) can include and/or securely reference U1's non-biometric identification information attributes (such as Effective Facts and/or Quality to Purpose assertions related with U1; societally, socially, and/or commercially descriptive information; and/or the like), where such non-biometric identification information attributes be retrieved from RIIPU1's secure repository arrangement and/or acquired by securely interacting with TIIRS1.

AFSD1/O1 securely registers CIIS1(U1/AFSD1) with TIIRS1.

Step 2: AFSD1 securely forwards CIIS1(U1/AFSD1) to RCUFD1, by invoking an event/activity instance, SecureCommE/A1, for establishing a secure communication link between AFSD1/O1 and RCUFD1/O2. SecureCommE/A1 includes the following activities:

AFSD1/O1 and RCUFD1/O2 mutually authenticating/validating each other's identities. Such mutual authentication/validation includes AFSD1/O1 and RCUFD1/O2 securely exchanging their respective EBICerts, EBICert1(AFSD1/O1) and EBICert2 (RCUFD1/O2), which are securely associated with EBICert1K1Priv and EBICert2K1Priv, respectively, so that they can respectively evaluate each other's EBICert (i.e., EBICert2 and EBICert1) for suitability to purpose. Such respective evaluation may include AFSD1 and/or RCUFD1 interacting with RUS1, operating as part of TIIRS1, to obtain situationally relevant CIISs (and/or other relevant such device arrangement registered IIS information) for authenticity and/or other suitability evaluation.

For example, AFSD1/O1 and RCUFD1/O2 may respectively determine whether establishing a communication link with meets policy and/or user instruction criterion, by:

RCUFD1/O2 evaluating CIIS1((AFSD1/O1, #CertPer1), where O1 is AFSD1's owner, who may or may not be the same as U1) and CertPer1 may be an AFSD1 manufacturer Stakeholder human agent, retailer, and/or other associated SVCC Stakeholder, set; and AFSD1/O1 evaluating CIIS1(RCUFD1/O2, #CertPer3), where O2 is RCUFD1's owner, who is the same person as U1, and CertPer3 is RCUFD1's manufacturer Stakeholder human agent, retailer, and/or other associated SVCC Stakeholder, set.

Alternatively, if AFSD1/O1 and RCUFD1/O2 have a historical relationship, such as belonging to the same organization and/or cloud service registered group, AFSD1/O1 and RCUFD1/O2 may establish a secure communication link using a shared symmetric key, where such key is stored in respective isolated PPEs.

If mutual authentication is successful, AFSD1/O1 and RCUFD1/O2 establishing a secure communication path.

Once a secure communication path is established, AFSD1/O1 forwarding CIIS1(U1/AFSD1) to RCUFD1/O2, in accordance with (AFSD1/O1)'s and (RCUFD/O2)'s respective policy sets.

RCUFD1/O2 receiving CIIS1(U1/AFSD1) and storing it in (NIIPU1/O2)'s secure hardened memory arrangement.

Step 3: U1 uses a trusted path user interface arrangement to instruct RCUFD1/O2 to securely create an EBICert, including a private and public key pair, in accordance with a secure policy specification (such as creating an EBICert only after validating U1's live presence) and/or U1 specified instruction, set.

Step 4: RCUFD1/O2 confirms U1's liveness presence using SE2 acquired biometrically based data of U1, where such confirmation may include similarity matching SE2 acquired biometric data with one or more portions of U1's biometrically based identification information securely: (i) contained in CIIS1(U1/AFSD1), (ii) stored in NIIPU1's secure hardened memory, and/or (iii) registered with TIIRS1.

If the confirmation is successful, RCUFD1/O2 generates a public/private key pair, EBICert3K1Pub and EBICert3K1Priv, where EBICert3K1Priv is derived at least in part using:

one or more portions of U1's biometrically based identification information, contained in, referenced by, and/or derived from CIIS1(U1/AFSD1), and S1, a secret information stored in NIIPU1's hardened, secure memory where, for example, S1 is not used by NIIPU1 for any other purpose. In some embodiments, RCUFD1/O2

RCUFD1/O2 then creates an EBICert, EBICert3(U1/RCUFD1), in a form of a CIIS, where EBICert3 may contain and/or securely reference:

Policy compliant one or more portions of one or more biometrically based identification information characterizing U1, where such identification information includes at least one or more portions of U1 near existential or existential quality, at least in part biometrically based identification information derived from CIIS1(U1/AFSD1), where such information may include information demonstrating, at least in part, U1's presence, thereby ensuring a high level of EBICert3's trustworthiness/reliability;

U1 characterizing identification information, where such information, in some embodiments, may include one or more non-biometric attributes of U1, such as U1's one or more Creds and/or EFs and/or societally, socially, and/or commercially descriptive information, and/or one or more EBICert3 holding device arrangements' respective IISs;

Situationally relevant information, such as governance policy information, for managing events/activities that are governed in accordance with securely provided policy information specified by and/or otherwise implementing user and/or device policies (e.g., policies of AFSD1/O1, RCUFD1/O1, and/or AFSD1's and/or RCUFD1's owner/administrator/user). Such governance policy information may operate in accordance with one or more portions sourced from one or more previously specified IISs;

Policy compliant one or more portions of CIIS1 (RCUFD1/O2, #CertPer3), where such portions may include and/or securely reference one or more portions of O2's and CertPer2's respective near existential or existential quality at least in part biometrically based IISs;

Policy compliant one or more portions of CIIS1(AFSD1/O1, #CertPer1), where such portions may include and/or securely reference O1's and/or CertPer1's respective one or more portions of near existential or existential quality at least in part biometrically based IISs;

EBICert2(RCUFD1/O2) signature, generated employing RCUFD1's private key, EBICert2K1Priv (which was installed in RCUFD1 at its time of manufacture and/or other SVCC instance event, such as when O2 registered RCUFD1 after acquiring it);

An audit log/record of PPE2's validation of U1's existential identity and liveness/presence, where such validation of U1's existential identity is based on CIIS1 (U1/AFSD1) and liveness/presence is based on non-existential, at least in part biometrically based identification data acquired by SE2 and processed by PPE2 using PD2's native biometric capabilities;

And/or the like.

RCUFD1/O2 generates a composite IIS for EBICert3, CIIS1(EBICert3/(U1/RCUFD1)), where CIIS1(EBICert3/(U1/RCFUD1)) comprises one or more attributes characterizing EBICert3 that independent parties may evaluate and/or validate to determine the suitability of (including for example, trustworthiness of) EBICert3 (such as, for example, suitability of documents that were signed by EBICert3 based at least in part on RCUFD1's and U1's composite and respective identities. For example, CIIS1 (EBICert3/(U1/RCFD1)) may include one or more EFs, Creds, one or more logs of event/activity instances RCUFD1/O2 performed to create EBICert3, and/or the like.

In some embodiments, RCUFD1/O2 may store EBICert3K1Pub and/or EBICert3 in its secure, hardened, tamper and inspection resistant store arrangement, but may securely and reliably delete EBICert3K1Priv after the completion of its use in accordance with device arrangement, organization, and/or platform, policy, and regenerate EBICert3K1Priv when needed.

Step 5: RCUFD1/O2 invokes an event/activity instance, registerE/A1, to securely register EBICert3(U1/RCUFD1) and CIIS1(EBICert3/(U1/RCUFD1)) with TIIRS1. As part of such invocation, RCUFD1/O2 signs one or more portions of EBICert3's and CIIS1 (EBICert3/(U1/RCUFD1))'s respective contents using an RCUFD1/O2 EBICert, EBICert2, where such signed EBICert3 contents can include CIISs for AFSD1/O1 & RCUFD1/O2 (and/or some or all of their information elements, such as purpose suitability informing attributes (such as EFs, Creds, metadata, and/or the like) for U1, O1, O2, RCUFD1/O2, AFSD1/O1, CertPer1, CertPer2, and/or other SVCC CertPers of RCUFD1/O2 and/or AFSD1/O1.

In some embodiments, RCUFD1/O2 may, as part of requesting to register EBICert3, request TIIRS1 and/or its administrative arrangement to sign EBICert3 and CIIS1 (EBICert3). RUS1, operating as part of TIIRS1, may evaluate/authenticate EBICert3 and CIIS1(EBICert3). If EBICert3 and CIIS1(EBICert3) are determined to be valid, TIIRS1 and/or its administrative arrangement, performing as an EBICert authority, signs EBICert3 and CIIS1(EBICert3), where such signing, may involve the use of contemporaneous and/or operatively simultaneous nearly existential or existential quality biometrically based identification information of one or more persons (e.g., one or more CertPers of such administrative authority agent), where such information is incorporated into such signing's associated information set.

Step 6: RUS1 stores EBICert3(U1/RCUFD1) and CIIS1 (EBICer3/(U1/RCUFD1)) as resources in TIIDB1, TIIRS1's secure repository. RUS1 then securely associates EBICert3 with at least in part signed one or more portions of a log of registerE/A1 and/or registerE/A1 grouping (an event/activity instance grouping representing a group type of events/activities, which may be organized based on their purpose specification), and/or one or more CPEs, where biometrically based identification information sets identifying such user, owner, and/or CertPer may be securely included in and/or otherwise securely referenced by EBICert3).

In this example, a private key, EBICert3K1Priv, is securely associated with EBICert3, where EBICert3 is securely bound (e.g., securely associated) to (and may include) identification information of a fused-identity entity comprising U1 and RCUFD1. Such information may comprise a RCUFD1 composite device identification information set that includes RCUFD1's securely identifying information, and an associated person's (stakeholder's, stakeholder agent's, and/or user's) at least in part nearly existential and/or existential quality biometrically based identification information set. In some embodiments, an independent evaluator may use at least a portion of such biometrically based identification information included in, and/or securely referenced by, EBICert3 to at least in part evaluate the degree of rigor/reliability of the association of EBICert3 and U1/RCUFD1. At U1's instruction and/or based upon policy specification, RCUFD1 may use EBICert3's private key, EBICert3K1Priv, which may be stored internally or regenerated, to sign and/or encrypt documents, and/or, for example, to open a secure communication link, secure email communications, and/or the like. If RCUFD1, for example, signs a document upon instruction from U1, then such signature may be independently validated by an independent party using at least in part biometrically based one or more IISs (e.g., registered IITs and/or information derived therefrom) for U1, RCUFD1, and/or composite U1/RCUFD1, contained in TIIDB1's RUS1.

FIG. 14 illustrates the second part of the example illustrated by FIG. 13 to describe RCUFD1/O2 regenerating EBICert3's private key, EBICert3KPriv, as needed. In this example, RCUFD1/O2, in accordance with RCUFD1/O2's policy specification, does not persistently store EBICert3K1Priv. Instead, when required, RCUFD1/O2 regenerates the key based, at least in part, on nearly existential or existential quality biometrically based information for U1, and then securely and reliably delete the private key after the completion of its use (e.g., immediately or at a specified time and/or other condition set), in accordance with RCUFD1/O2 policy specification. Such secure and reliable deletion of EBICert3K1Priv can optimize information security by preventing the misappropriation of stored private keys (e.g., keys are only stored ephemerally during use; such keys are erased after such usage).

4.2.2 FIG. 14

FIG. 14 illustrates the following steps:

Step 1: (AFD1/O3)'s sensor and emitter arrangement, SE3, senses a person's, in this example U1's, physical presence (such as U1's hand) and notifies RIIPU2/O3, a RIIPU embedded in AFD1/O3. RIIPU2/O3, receiving such notification, initiates acquisition of U1's near existential or existential quality at least in part biometrically based identification data. In some embodiments, RIIPU2/O3 can employ PRG1, a pseudo random (instruction) generator, operating as part of RIIPU2/O3, to generate operatively unpredictable emission instructions to determine/confirm U1's physical liveness.

RIIPU2/O3 processes SE3 acquired biometrically based data to generate one or more an at least in part nearly existential and/or existential quality biometrically based IISs (such as CBEIISs and/or CIISs). Such processing can include securely similarity matching acquired U1 biometrically based data against:

- one or more biometric template identification information stored in RIIPU2's secure hardened memory; and/or
- one or more biometric template identification information previously registered with TIIRS1.

In some embodiments, RIIPU2/O3 may securely interact with TIIRS1 to obtain U1's identification attributes (such as U1 one or more biometric templates, Effective Facts, Quality to Purpose, and/or the like).

If similarity matching is successful, RIIPU2/O3 can generate one or more IISs, such as CIIS2 (U1/(AFD1/O3, #CertPer3)), where such IISs can include nearly existential or existential quality biometrically based identification information based at least in part on U1's liveness determination. Such generation enables U1 to subsequently demonstrate, and/or inform regarding suitability considerations of, U1's presence.

In some embodiments, acquiring biometrically based data, and generating one or more IISs, may be governed by policies that state, for example for respective contexts of use, how often such acquiring operations should occur, one or more circumstances (e.g., conditions) under which an AFD1/O3 generated IIS should be valid for contemporaneous authentication purposes, and/or the like.

Step 2: AFD1/O3 initiates SecureCommE/A1, an event/activity instance for establishing a secure communication path between AFD1/O3 and RCUFD1/O2, where part of establishing and using such secure communication path involves:

- AFD1/O3 and RCUFD1/O2 exchanging their respective EBICerts, EBICert4(AFD1/O3) and EBICert2 (RCUFD1/O2), which are securely associated with EBICert4K1Priv and EBICert2K1Priv, respectively; and
- AFD1/O3 and RCUFD1/O2 evaluating EBICert2 (RCUFD1/O2) and EBICert4(AFD1/O3), respectively, and/or evaluating other associated device arrangement information, and/or Stakeholder person information, for suitability to purpose, where respective such evaluations may include interacting with TIIRS1 to obtain situationally relevant device arrangement and/or person, registered information, where each may include one or more portions of a registered CIIS (and/or other relevant such device arrangement and/or person registered IIS information), such information for determining token transfer suitability, and/or evaluation of device and/or person authenticity. For example, RCUFD1/O2 may retrieve from TIIRS1 at least a portion of CIIS1 ((AFD1/O3, #CertPer3) as suitable for informing regarding forwarding one or more IISs, where O3 is AFD1's owner and CertPer3 is AFD1's manufacturer Stakeholder human agent. AFD1 may retrieve CIIS1((RCUFD1/O2(=U1), #CertPer3), where CertPer3 is RCUFD1's manufacturer Stakeholder human agent. Such obtained information is then evaluated to determine whether its stipulated characteristics satisfy policy and/or user one or more instruction criterions.

Alternatively, if AFD1/O3 and RCUFD1/O2 arrangements have an historical and/or registered grouping relationship, such as belonging to the same group, AFD1/O3 and RCUFD1/O2 arrangements may establish a secure communication path using a shared symmetric key, where such key is stored in respective isolated PPEs of the respective devices.

Once AFD1/O3 and RCUFD1/O2 (herein comprising respective device arrangements) establish a secure communication path, AFD1/O3 forwards CIIS2 (U1/AFD1) to RCUFD1/O2. RCUFD1/O2 then securely carries CIIS2 (U1/AFD1) by storing it in (NIIPU1/O2)'s secure hardened memory Step 3: U1 requests, using a trusted path, that RCUFD1/O2 perform a cryptographic operation requiring the use of EBICert3K1Priv such as, for example, signing a document.

Step 4: RCUFD1/O2, in accordance with policy, determines that EBICert3K1Priv (a private key needed for such requested cryptographic operation) is not stored in its secure hardened memory. RCUFD1/O2 employs SE2 to acquire U1's biometrically based identification data to confirm U1's physical liveness. If the confirmation is successful, RCUFD1/O2 regenerates EBICert3K1Priv, employing a combination of one or more of:

- at least a portion of biometric information contained in and/or referenced by CIIS2 (U1/AFD1); and
- one or more secrets, S1, that is/are stored in (NIIPU1/O2)'s secure hardened memory, where S1 is not used by NIIPU1/O2 for any other purpose.

As is understood by those familiar with the art, such regenerated private key is operatively identical accordance with securely maintained specifications (i.e., is bit for bit identical, or is otherwise sufficiently the same) to the private key generated when EBICert3 was created and published, even though: (i) biometric information contained in and/or referenced by CIIS2 (U1/AFD1) may have differing (but operatively equivalent to in representing/identifying the same person) biometric information contained in and/or referenced by the U1's biometrically based identification information used during EBICert creation, and (ii) sensor/ emitter data obtained from biometric sensing of U1 differs (but is operatively equivalent in identifying/representing the same person) from that obtained during the creation of EBICert3.

Step 5: RCUFD1/O2, having regenerated EBICert3K1Priv, employs EBICert3 to perform cryptographic operations, such as signing documents. Once such cryptographic operations have been completed in accordance with policy, RCUFD1/O2 may securely and reliably delete EBICert3K1Priv so as to optimize key security; EBICert3K1Priv may then be regenerated later, as required (e.g., compliant with associated specification, for example in accordance with key governance policy).

FIG. 15A-15C illustrates a non-limiting example U1/RCUFD1 using EBICert3 and EBICert7 to create an EBIDoc comprising a signed and encrypted document, Doc1, that only an intended fused-identity entity, U2/RCUFD2 can retrieve after demonstrating U2's liveness.

This example has the following:

PD1 is the same PD1 described in the example illustrated by FIGS. 13 and 14. AFSD1/O1 contained in PD1 has a RIIPU1/O1 that contains in its secure repository:

CIIS3(U1/AFSD1), a CIIS, representing a fused-identity entity, U1/AFSD1, created by an AFSD1 at time T3>T2.

EBICert1(AFSD1/O1), an EBICert described in the example illustrated by FIGS. 13 and 14 and associated private key, EBICert1K1Priv.

PD2 is the same PD2 described in the example illustrated by FIGS. 13 and 14. RCUFD1/O2 contained in PD1 has a NIIPU1/O2 that contains in its secure repository:

EBICert2(RCUFD1/O2), an EBICert described in the example illustrated by FIGS. 13 and 14 and associated private key, EBICert2K1Priv.

EBICert3(U1/RCUFD1), an EBICert described in the example illustrated by FIGS. 13 and 14 and associated private key, EBICert3K1Priv.

CIIS3(U1/AFSD1), a CIIS representing a fused-identity entity, U1/AFSD1, that AFSD1 forwarded to RCUFD1/O2. RCUFD1/O2 uses CIIS3(U1/AFSD1) to regenerate EBICert3K1Priv.

EBICert7(U2/AFSD2), an EBICert representing a fused-identity entity, U2/AFSD2, whose public key, EBICert6K1Pub that U1/RCUFD1 employs to ensure that EBIDoc1 RCUFD1 forwards to U2/RCUFD2 can only be decrypted by U2/RCUFD2 in the presence of U2.

PD3, a parent device arrangement such as a home-based mobile device charging unit that has AFSD2/O4, a trusted computing, isolated and tamper resistant AFSD arrangement owned by an O-Per, O4, and certified by a CertPer, CertPer4, a human person who certified AFSD2's authenticity, where such certifying human person may be AFSD2 manufacturing Stakeholder human and/or human agent. In this example, O4 may be the same person as U2. AFSD2/O4 comprises:

RIIPU3/O4, a RIIPU that processes SE4 acquired biometric data to create one or more IISs, such as, IIS1, where IIS1 may be a CBEIIS (representing U2) or CIIS (representing U2/AFSD2), and forwards such IISs to EBInet receiving device arrangements, such as RCUFD2/O5, in accordance with (AFSD2/O4)'s policy specification set. RIIPU3/O4 has a hardened memory for managing identity related information, such as:

EBICert5 (RIIPU3/O4), an EBICert generated at the time of sale of AFSD3 to O4 or at a later time when O4 registered AFSD3/O4 with a TIIRS1. In some embodiments, such EBICert may also be an IIT comprising: (i) one or more portions of near existential and/or existential quality, at least in part biometrically based IISs of O4; (ii) identification information comprising one or more attributes characterizing AFSD2; and (iii) a public key, EBICert4K1Pub, of EBICert4K1Priv/EBICert4K1Pub key pair.

CIIS1(AFSD2/O4, #CertPer4), a composite IIS representing a fused-identity entity, AFSD2/O4.

CIIS1(U2/AFSD2), a composite IIS representing a fused-identity entity, U2/AFSD2 that includes a nearly existential or existential quality, at least in part biometrically based IIS for U2 and identification information comprising one or more attributes characterizing AFSD2. In some embodiments, CIIS1(U2/AFSD2) may also U2's non-biometric attributes, such as Repute EFs (such as an EF stipulating that U2 is a professor of physics at MIT), Creds and/or other characterizing attributes, SE4, a secure hardened sensor/emitter set that acquires near existential and/or existential quality biometric data and securely forwards such data to RIIPU3.

PD4, a parent device arrangement, such as a smartphone, smartwatch, tablet, laptop and/or other portable appliance arrangement comprising:

RCUFD2/O5, a tamper resistant RCUFD device arrangement, owned by an O-Per, O5, and certified by CertPer5, a human person who may be RCUFD2 manufacturing Stakeholder human and/or human agent. In this example, O5 and U2 are the same person. RCUFD2/O5 includes one or more NIIPUs, including NIIPU2/O5. NIIPU2O5 has a hardened memory arrangement for managing IISs, such as:

EBICert6(RCUFD2/O5), an EBICert generated at the time of sale of RCUFD2 to O5 or at a later time when O5 registered RCUFD2/O5 with TIIRS1. In this example, O5 is the same person as U2. In some embodiments, such EBICert may also be a composite IIS, comprising: (i) one or more portions of near existential and/or existential quality, at least in part biometrically based IISs of O5 and CertPer5; (ii) RCUFD2's IIS, comprising one or more attributes characterizing RCUFD2; and (iii) EBICert1K6Priv/EBICert1K6Pub key pair.

EBICert7(U2/RCUFD2), an EBICert representing a fused-identity entity, U2/RCUFD2, and associated private/public key, EBICert1K7Priv/EBICert1K7Pub key pair.

CIIS1((RCUFD2/O5(=U2), #CertPer5), a composite IIS representing a fused-identity entity, RCUFD2/O5.

CIIS1(U2/AFSD2), a CIIS forwarded by AFSD2/O4.

An audit log/record of (NIIPU2/O5)'s validation of U2's existential identity and liveness/presence, where such validation of U2's existential identity is based on CIIS1(U2/AFSD2) and liveness/presence is based on at least in part biometrically based identification data acquired by SE5 and processed by NIIPU2 using PD4's native biometric capabilities that NIIPU2 shares with PD4's other components.

S2, a secret, stored in NIIPU2/O5 hardened memory, to be used in the generation of private keys (such as EBICert3K1Priv) on an as-needed (e.g., on valid on-demand) basis and in accordance with policy.

SE5, a secure hardened PD4 sensor/emitter set, which RCUFD2 is used in part to generate biometric information sets used in the regeneration of and/or unlocking the use of EBICert6K1Priv.

TIIRS1, a trusted identification information registration service arrangement described in the example illustrated by FIGS. 13 and 14. TIIDB1, operating as part of TIIRS1 in this example, securely stores and manages identification related information, such as:

EBICerts, such as EBICert1(AFSD1/O1), EBICert2 (RCUFD1/O2), EBICert3(U1/AFSD1), EBICert4 (AFD1/O3), EBICer5(AFSD2/O4), EBICert6 (RCUFD2/O5), and EBICert7(U2/RCFD2);

CIISs whose respective primary subject matters are fused-identity entities (representing respective EBI-net devices and their O-Pers), such as CIIS1(AFSD1/O1, #CertPer1), CIIS1(RCUFD1/O2, #CertPer2), CIIS1(AFD1/O3, #CertPer3), CIIS1(AFSD2/O4, #CertPer4), and CIIS1(RCUFD2/O5, #CertPer5);

CIISs whose respective primary subject matters are fused entities representing respective EBInet devices and their users, such as CIIS3(U1/AFSD1), CIIS1 (U2/AFSD2);

CIISs that are EBICerts, such as

CIIS1(EBICert3) a composite, at least in part biometrically based IIS, comprising and/or sharing at least a portion of EBICert3 (includes its public key). CIIS1(EBICert3), in some embodiments, can comprise a U1's at least in part biometrically based EBInet device/owner composite identification information arrangements, such as:

CIIS1(RCUFD1/U1),

CIIS1(AFSD1/O1, #CertPer1)), where CertPer1 is registered as a AFSD1 specific manufacturer's human agent person and O1 is AFSD1's O-Per), CIIS1(U1/AFSD1), and/or the like.

CIIS1(EBICert7), a composite, at least in part biometrically based IIS, comprising and/or sharing at least a portion of EBICert7 (includes its public key). CIIS1(EBICert7) can comprise one or more at least in part biometrically based EBInet device/owner composite identification information arrangements, such as

CIIS1(U2/RCUFD2),

CIIS1(RCUFD2/O5, #CertPer5), where CertPer5 is registered as a RCUFD2 specific manufacturer's human agent person and O5 is RCUFD1's O-Per), CIIS2 (AFSD3, O4, #CertPer4), where CertPer4 is registered as a AFSD3 specific manufacturer's human agent person and O4 is AFSD3's O-Per).

CIIS1(SignEncryptE/A1), a composite, at least in part biometrically based identification information set for SignEncryptE/A1, a signing and encrypting event/activity for Doc1. CIIS1(SignEncryptE/A1) can comprise an audit log of SignEncryptE/A1 process operations that can be used to demonstrate, for example, confirmation of the physical presence of the signer (U1) at the time Doc1 is signed and encrypted, the signing performance (action) of the fused-identity entity, RCUFD1/O2, and may further describe one or more other attributes of U1 and/or RCUFD1 and/or one or more of RCUFD1/O2 Stakeholders (for example, such attributes may include RCUFD1 related at least in part one or more information instances regarding SVCC personnel's respective provenance and associated attribute information).

EBIbox1, a secure EBIbox package comprising, for example, EBIDoc1, EBICert3, signed and encrypted SymmKey1, and signed and encrypted other relevant material. EBIbox contains:

EBIDoc1, a signed and encrypted Doc1, where Doc1 is encrypted using SymmKey1 and encrypted Doc1 and other relevant material are signed using EBICert3K1Priv.

Signed and at least in part encrypted other relevant material such as one or more portions, and/or all of, Doc1 IIS information (e.g., Creds, EFs, Policy1, and/or interface, info), and EBIbox1 provenance information. In some embodiments, such material may include:

CIIS1(SignEncryptE/A1), a composite, at least in part biometrically based identification information set for a signing-encrypting event/activity, SignEncryptE/A1, for Doc1, that demonstrates, for example, the physical presence of the signer (U1), the signing performance (action) of the device (RCUFD1).

Doc1 related IIS information sets, such as, one or more Doc1 Stakeholders' respective IISs.

DRMPolicy1, a DRM policy comprising rules and controls for governing the handling of Doc1.

One or more attributes of U1 and/or RCUFD1 and/or one or more of their Stakeholders (for example, such attributes may include RCUFD1 related at least in part one or more information instances regarding RCUFD1 SVCC personnel's respective provenance and associated attribute information).

Signed and encrypted SymmKey1, where SymmKey1 is encrypted using EBICert7K1Pub (ensuring that only U2/RCUFD2 can decrypt SymmKey1); and signed using EBICert3K1Priv (to enable U2/RCUFD2) to validate SymmKey1 's authenticity.

A hash set of encrypted Doc1 and other relevant material.

EBICert3, the certificate used to sign Doc1.

4.3 FIG. 15A-15C

FIG. 15A-15C illustrates a non-limiting example U1/RCUFD1 using EBICert3 and EBICert7 to create an EBIDoc comprising a signed and encrypted document, Doc1, that only an intended fused-identity entity, U2/RCUFD2 can retrieve after demonstrating U2's liveness.

4.3.1 FIG. 15A

FIG. 15A illustrates the following steps:

Step 1: In anticipation of sending a security sensitive (e.g., confidential) document, Doc1, to a user, U2, U1/RCUFD1 sends a secure message to U2/RCUFD2, requesting an EBICert representing U2/RCUFD2, whose private key can only be used in U2's physical presence. In some cases, U1/RCUFD1 may interact with TIIRS1 to check if U2/RCUFD2 has registered an EBICert that U1/RCUFD1 can use for its purpose (which is to send U2/RCUFD2 Doc1 that RCUFD2/O2 presents to U2 in cleartext only after it confirms U2's physical liveness. The ability to securely lookup U2's biometrically based existential or near existential quality identification information sets including EBICert7 distinguishes such an embodiment from systems that require an insecure lookup and/or previous interactions between U1/RCUFD1 and U2/RCUFD2 before encryption may be performed.

During this step, RCUFD1/O1 may check:

One or more CIISs of U2/RCUFD2 are suitability to U1's purpose. In particular, CIIS1(RCUFD2/O5, #CertPer5) may be validated to determine (RCUFD2/O5)'s trustworthiness, including (RCUFD2/O5)'s rigor level. For example, in this embodiment, U1/RCUFD1 may validate one or more CIISs of RCUFD2/O5 to determine if RCUFD2/O5 will comply with EBICert7 policy set that requires, for example, RCUFD2/O5 will only use the private key for EBICert7 after RCUFD2/O5 confirms U2's existential quality contemporaneous presence and near existential quality operatively simultaneous presence.

In some embodiments, U1/RCUFD1 may evaluate EBICert7's policy set to determine such policy set is suitable for U1's purpose. Such determination can include checking whether EBICert7 has a DRM policy set that controls the set of users who may access Doc1 and conditions under which they may access it. In some embodiments, RCUFD1/O1 may interact with TIIRS1 to obtain a DRM policy such as DRMPolicy1.

U1/RCUFD1 may also verify that U2/RCUFD2 will comply with stipulations in a DRM policy such as DRMPolicy1. For example, DRMPolicy1 may stipulate that Doc1 be destroyed after U2 has seen it for a DRMPolicy1-specified period of time (e.g., five minutes). In order to enforce such a constraint, U2/RCUFD2 must not only be ready to delete the document to make it unavailable after the specified time, but must also check the identity of any application used to display the document to determine that such application will not copy and save the contents of such document for a later time in a way that is inconsistent with such stipulated constraint. U2/RCUFD2's biometrically based identification information set may have specifications indicating the care or degree of rigor that U2/RCUFD2 applies to these tasks which may be evaluated by U1/RCUFD1.

In other cases, U1/RCUFD1 may already have an U2/RCUFD2 EBICert that U1/RCUFD1 can use to fulfill U1's purpose.

Step 2: If U2/RCUFD2 receives U1's request, it creates an EBICert, EBICert7, and associated CIIS that stipulates that EBICert7's private key can only be used after operatively simultaneously confirming U2's physical presence.

Step 3: If U1/RCUFD1 and/or U2/RCUFD2 had not registered their respective EBICerts (i.e., EBICert3 and EBICert7), they register them with TIIRS1.

Step 3a: U1/RCUFD1 securely registers EBICert3(U1/RCUFD1) with TIIRS1 by securely forwarding EBICert3 and associated CIIS to TIIRS1; and Step 3b: U1/RCUFD1 securely registers EBICert3(U1/RCUFD1) with TIIRS1 by securely forwarding EBICert3 and associated CIIS to TIIRS1.

Step 4: U2/RCUFD2 sends a message containing EBICert7 and associated CIIS to U1/RCUFD1.

Step 5: U1/RCUFD1 interacts with TIIRS1 to validate EBICert7, where such interaction can be:

retrieving EBICert7 from TIIRS1 and comparing the copy of EBICert7 U1/RCUFD1 received from U2/RCUFD2 with the copy it retrieved from TIIRS1 and/or.

sending the copy of EBICert U1/RCUFD1 received from U2/RCUFD2 to RUS1 and have RUS1 compare/match the copy with a registered copy.

4.3.2 FIG. 15B

FIG. 15B continues the illustration and describes the following steps:

Step 6: To regenerate EBICert3's private key, U1 employs AFSD1/O1 to securely acquire and process U1's biometric identification data to at least in part, generate a CIIS, CIIS3(U1/AFSD1), that includes a nearly existential or existential quality, at least in part biometrically based identification information set. In some embodiments, CIIS3(U1/AFSD1) can be based at least in part on U1's liveness determination.

AFSD1/O1, in accordance with applicable one or more policy sets (e.g., of AFSD1/O1 and/or TIIRS1), register CIIS3(U1/AFSD1) with TIIRS1.

Step 7: AFSD1/O1 and RCUFD1/O2 establish a secure communication path to enable AFSD1 to securely forward CIIS3 to RCUFD1, where part of establishing such secure connection path involves:

AFSD1/O1 and RCUFD1/O2 arrangements exchanging their respective EBICerts, EBICert1 and EBICert2, which are securely associated with private keys, EBICert1K1Priv and EBICert2K1Priv, respectively.

AFSD1/O1 and RCUFD1/O2 arrangements evaluating, respectively the other device's EBICerts (i.e., RCUFD1's and AFSD1's respective EBICerts, EBICert2 and EBICert1) for suitability to purpose, where such respective evaluations may include respectively interacting with TIIRS1 to obtain situationally relevant CIISs (and/or portions thereof and/or other relevant such device arrangement related registered IIS information) for suitability and/or authenticity evaluation. For example, RCUFD1 may retrieve CIIS1(AFSD1/O1, #CertPer1), where O1 is AFSD1's owner and CertPer1 is AFSD1's manufacturer Stakeholder human agent; AFSD1 may retrieve CIIS1(RCUFD1/O2, #CertPer2), where O2 is RCUFD1's owner (may be the same human as U1) and CertPer2 is RCUFD1's manufacturer Stakeholder human agent. Such obtained information is then evaluated to determine whether it meets policy and/or user instruction criterion.

Alternatively, if AFSD1/O1 and RCUFD1/O2 have a historical relationship (e.g., a history of previous one or more secure identification information exchanges) and/or registered as belonging to the same group and have been, at least in part, pre-evaluated for suitability to purpose, AFSD1/O1 and RCUFD1/O2 may establish a secure communication path using a shared symmetric key, where such key is securely stored in respective isolated PPEs.

In this example, once a secure communication path is established, AFSD1 forwards CIIS3(U1/AFSD1) to RCUFD1/O2 for contemporaneous use.

Step 8: U1/RCUFD1 initiates an event/activity instance, SignEncryptE/A1, an event/activity instance for creating an EBIbox, a DRM policy governed secure EBIbox package comprising, for example, EBIDoc1, sign and encrypt a document Doc1 (such as an email message), in such a way that U2/RCUFD2 needs to confirm U2's physical liveness prior to presenting Doc1 in cleartext to U2. Such initiation may be made directly by U1 using, for example, a trusted path mechanism to stipulate that he or she is initiating a signing and encrypting document event/activity instance. Such initiation may be enabled, in some embodiments, through use of an application, such as an email client, that determines or observes that a signature is needed (or desired). U1's initiation response may be, for example, prompted by an email application displaying a user option "sign-encrypt email", such option displayed using an email application interface mechanism securely linked to an RCUFD1/O2 compliant user interface. Such initiation by U1 may employ an RCUFD1 trusted path signing button used to sign information instances, such button functioning as a user interface option that can initiate, and result in a secure confirmation (e.g., display of a confirmation) of, such signing. Such a trusted path button can function, for example, as an integrated user interface option of one or more software applications, such as an email client application. Such email client may be operating on, for example, an RCUFD1/O2 parent smart device and/or at least in part operating in a PERCos CPFF (contextual purpose firewall framework) (or the like) running as an operating component of a, for example, NIIPU modular component arrangement. The use of a trusted path may, for example, be required to ensure a sufficient level of rigor for SignEncryptE/A1 (a signing and encrypting event/activity instance), such as a standardized rigor level of 8 on a scale of 1 to 10, and U1 may further be required to use a trusted path to ensure such signing operation, where such signing event can be recorded by creating CIIS1 (SignEncryptE/A1) and/or other IIS set.

In response to U1 initiating an event/activity instance to sign and encrypt Doc1 (e.g., SignEncryptE/A1), U1/RCUFD1 creates a CIIS, CIIS1(SignEncryptE/A1), that includes: (i) CIIS3(U1/AFSD1); and (ii) one or more identification information sets describing one or more SignEncryptE/A1 activities, such as U1/RCUFD1 validating U1's presence, signing Doc1 on behalf of U1, encrypting Doc1 for delivery to U2/RCUFD2, and/or the like. U1/RCUFD1 may forward one or more portions of CIIS1(SignEncryptE/A1) in TIIRS1.

- Step 9: U1/RCUFD1 regenerates the private key for EBICert3, based at least in part on CIIS3(U1/AFSD1), sensor data acquired by SE2 and/or S1, as shown in FIG. 13.
- Step 10: U1/RCUFD1 signs and encrypts Doc1 and other relevant material. U1/RCUFD1 Doc1 performs the following:
  - generates a symmetric key, SymmKey1, for the encryption process.
  - encrypts Doc1 and other relevant material with SymmKey1 where other relevant material may include:
    - CIIS1(SignEncryptE/A1), prepared by RCUFD1 to represent SignEncryptE/A1 and which may include, for example, CIIS3(U1/AFSD1)
    - Doc1's one or more IISs
    - DRMPolicy1, a DRM policy for handing Doc1 after it has been decrypted.
    - And/or the like.
  - creates a hash of encrypted Doc1 and other relevant material.
  - signs SymmKey1 using EBICertKey1 Priv and encrypts signed SymmKey1 using EBICert6K1Pub. By encrypting SymmKey1 with EBICert6's public key means that only U2/RCUFD2 can decrypt SymmKey1 using EBICert6's private key that only U2/RCUFD2 knows.
  - signs and encrypts DRMPolicy1.
  - creates an EBIbox, EBIbox1, which can only be unpackaged by U2/RCUFD2 in the presence of U2.

Other embodiments may configure EBIbox1 to be accessed by more than one recipient. In such embodiments, EBIbox1 can contain multiple copies of SymmKey1, one copy for each recipient, where such copy is SymmKey1 encrypted using a public key representing such recipient. For example, EBIbox1 may contain two copies of SymmKey1, one copy encrypted using public key1 of recipient1's EBICert and another copy encrypted using public key2 of recipeint2's EBICert, In some embodiments, such signed encrypted documents may have DRM rules governing how the data in such a document may be used by a possible recipient. For example, a DRM policy may specify which parties may create, sign and/or encrypt a Doc1-derived document. In some embodiments, such set of recipients may be members of a class of Participants. The test of whether a Participant is a member of such a class may take many forms including, for example:

- The presence of a secret in Participant's device where a Participant human's or human agent's presence regenerates and/or unlocks the use of such secret and such secret is cryptographically bound to such class of Participants.
- The presence of a secret in a Participant's device where, for example, such device may be a dongle and/or such device may be held by such Participant's human or human agent.
- An effective fact about a Participant (e.g., Participant X is a member of class Y or Participant X is employed by Stakeholder, Z).

In some embodiments, different users may be subject to differing policies. For example, an embodiment may have policies of the form:

- Members of Participant class X1 can only see portions Y of document Z1.
- Members of Participant class X2 only have read-only access to document Z2.
- Members of Participant class X3 have read-write access to document Z3.
- User, U1, has read-only access to document Z4.
- And/or the like.

In some embodiments, policies associated with a document may be configured when or after such document has been created and/or published. For example, a user sending an e-mail may be able to set policies for the e-mail, where such policies may include who can read such e-mail or requirements that the sending user and/or administrator may be notified when the message is read. In some embodiments, policy may require that a user or an administrator be notified when an encrypted document has been decrypted. Such notification may be enabled and/or triggered when provenance information for such encrypted document is updated. In some embodiments, policies may state that certain encrypted documents cannot be decrypted after a certain date, in particular, an encrypted document may be revoked. For example, an e-mail client may be able to unsend an encrypted message after it has been sent and/or set a limit on how long the recipient has to read such a message.

In some embodiments, the choice to encrypt data in EncryptedCompositeDoc1 as opposed to keeping it clear-text in SignedEncryptedDoc1 may be determined by policies indicating what information should be kept private. For example, in one embodiment, SignedEncryptedDoc1 may contain a clear-text manifest describing what it is and who is able to decrypt its contents. Alternatively, depending on, for example, system, user and/or Stakeholder policies, no such clear-text manifest may exist or such manifest may only exist in encrypted form.

In some embodiments, more than one symmetric key may be used. For example, Doc1 may have two parts, Doc2 and Doc3, where Doc2 is encrypted with a symmetric key, Key1, and Doc3 is encrypted with a different symmetric key, Key2. Such embodiments may be used in support of access control, for example, allowing RCUFD1 to formulate a policy set that specifies who can access Doc2, Doc3 or both depending on how the associated symmetric keys are distributed.

Step 11: U1/RCUFD1: (i) creates EBIbox1 that includes EBIBlock1 and EBICert3 and (ii) sends EBIbox1 to U2/RCUFD2.

4.3.3 FIG. 15C

FIG. 15C continues the illustration to show how U2/RCUFD2 unpackages EBIbox1, validates and/or decrypts EBIDoc1 by performing the following steps:

Step 12: AFSD2/O4, sensing U2's presence, acquires U2's near existential or existential quality at least in part biometrically based identification data to generate CIIS1(U2/AFSD2), where such generation may include AFSD2/O2, in accordance with applicable one or more policy sets (e.g., of AFSD2/O2 and/or TIIRS1), interacting with TIIRS1 to, for example, optionally (i) obtain U2's near existential or existential quality, at least in part biometrically based registered template, where such registered template includes U2's biometric information set, and one or more U2 attributes (such as for example Creds and/or EFs); and (ii) register CIIS1 (U2/AFSD2).

In some embodiments, users participating in REAIs that require a high degree of trust (such as working on highly sensitive IP document, classified government work, and/or the like) may employ EBInet device arrangements that employ a plurality of PPEs to compartmentalize and/or use fault-tolerant algorithms, such as Byzantine algorithms, to perform critical operations. For example, EBInet device arrangements may employ a plurality of PPEs, manufactured by different manufacturers and each PPE configured differently from other PPEs, to perform critical operations, such as determination of identification and liveness. Such EBInet device arrangements may then compare PPEs' respective identification and liveness determination results to detect faulting PPEs, if any.

Step 13: AFSD2/O4 and RCUFD2/O5 establish a secure communication path, where such establishing may include:

AFSD2/O4 and RCUFD2/O5 arrangements exchanging their respective EBICerts, EBICert5 and EBICert6, which are securely associated with private keys, EBICert5K1Priv and EBICert6K1Priv, respectively, where public and private key pairs of AFSD2/O4 and RCUFD2/O5 arrangements are used to establish a secure communication path; and AFSD2/O4 and RCUFD2/O5 arrangements evaluating, respectively the other device's EBICerts (i.e., (AFSD2/O4)'s and (RCUFD2/O5)'s respective EBICerts, EBICert5 and EBICert6) for suitability to purpose, where such respective evaluations may include respectively interacting with TIIRB1 to obtain situationally relevant CIISs (and/or portions thereof and/or other relevant such device arrangement related registered IIS information) for suitability and/or authenticity evaluation. For example, RCUFD2/O5 may retrieve CIIS1(AFSD2/O4, #CertPer4), where O4 is AFSD2's O-Per and CertPer4 is AFSD2's manufacturer Stakeholder human agent; AFSD2/O4 may retrieve CIIS1(RCUFD2/O5, #CertPer5), where O5 is RCUFD2's O-Per (who may be the same human as U2) and CertPer5 is RCUFD2's manufacturer Stakeholder human agent. Such obtained information is then evaluated to determine whether it meets policy and/or user instruction criterion.

Such AFSD2's and RCUFD2's evaluation, in preparation for identification information communication activity, enables each participating device arrangement to evaluate the identity of the other device arrangement and/or owner and/or participating user person to determine if an inter-device arrangement communication link is suitable/acceptable (e.g., in compliance with specification(s)), for example, for a specified purpose, such as the forwarding of Tok6.

Alternatively, if AFSD2 and RCUFD2 have an historical relationship (e.g., history of previous one or more secure identification information exchanges) and/or registered as belonging to the same group and have been, at least in part, pre-evaluated for suitability to purpose, AFSD3 and RCUFD2 may establish secure communication using a shared symmetric key, where such key is stored in respective isolated PPEs.

In this example, once a secure communication link is established, AFSD2 securely forwards CIIS1(U2/AFSD1) to RCUFD2.

Step 14: U2/RCUFD2, receiving EBIbox1, validates EBICert3, where such validation may include retrieving a copy of EBICert3 from TIIRS1 and similarity matching to determine integrity of the copy of EBICert3 received from U1/RCUFD1.

Step 15: If validation of EBICert3 is successful, then U2/RCUFD2 initiates UnpackEBIboxE/A1, an event/activity instance for unpackaging EBIbox1. Such initiation may be a result of U2, using, for example, a trusted path mechanism to stipulate that he or she wishes to activate the validation and decryption of a particular document. Such stipulation may be enabled through use of an application, such as an email client, that determines or observes that a decryption is needed (or desired). A response to U2's stipulation may be, for example, prompted by an email application displaying a user option "validate-decrypt email", such option displayed using an email application interface mechanism securely linked to an RCUFD2 compliant user interface. Such stipulating by U2 may employ an RCUFD trusted path signing button used to sign information instances, such button functioning as a user interface option that can initiate, and result in a secure confirmation (e.g., display of a confirmation) of, such signing. Such a trusted path button can function, for example, as an integrated user interface option of one or more software applications, such as an email client application. Such email client may be operating on, for example, an RCUFD2 parent smart device and/or at least in part operating in a PERCos CPFF (contextual purpose firewall framework) (or the like) running as an operating component of a, for example, NIIPU modular component arrangement. The use of a trusted path may, for example, be required to ensure a sufficient level of rigor for UnpackEBIboxE/A1 (the validating and decryption event), such as a standardized rigor level of 8 on a scale of 1 to 10, and U2 may further be required to use a trusted path to ensure such decryption operation, which such decryption event can be recorded by creating CIIS1(UnpackEBIboxE/A1) and/or other IIS set.

Step 16: U2/RCUFD2 performs UnpackEBIboxE/A1 by:

regenerating (as shown in FIG. 14), and/or otherwise gaining access to EBICert7's private key (EBICert7K1Priv) based on, at least in part, an existential quality demonstration of contemporaneous of U2's presence (provided by CIIS1(U2/AFSD2) as generated by AFSD2/O4 and a near existential quality demonstration of operatively simultaneous presence as acquired by SE5 (a sensor/emitter arrangement that is part of RCUFD2's parent device, PD4) and as processed by RCUFD2/O5.

using EBICert3K1Pub to verify the signature of encrypted Doc1 & other relevant material such as DRMPolicy1.

creating a hash set of encrypted Doc1 and other relevant material and comparing the created hash set with the hash set sent by U1/RCUFD1.

using EBCert6K1Priv, if the hash sets match, to decrypt the encrypted SymmKey1.

decrypting Doc1's suitability determination material (such as one or more Doc1 related IIS information sets) using SymmKey1 to evaluate and/or validate Doc1's suitability, where such evaluation/validation may include similarity matching Doc1 related IISs with TIIRS1 registered information.

using SymmKey1 to decrypt Doc1 to enable U2 to utilize Doc1 in fulfillment of U2's purpose, in accordance with Policy1, and in accordance with other applicable one or more specifications.

provisioning Doc1 to a contextual purpose firewall framework isolated (sandbox/virtual machine) purposeful computing secure session.

4.4 FIG. 16

FIG. 16 illustrates a non-limiting example of a secure, tamper and inspection resistant, EBInet device arrangement that can highly rigorously generate/regenerate EBICerts' respective private keys U1/RCUFD1 uses to securely sign REAI subject matters (e.g., information sets). Such highly rigorously generated/regenerated private keys are securely associated with respective EBICerts and enable such EBICerts' respective fused-identity entities to certify REAIs with great reliability; such EBICert signing can be used to ensure the integrity, and inform regarding the suitability, of communicated information sets.

This non-limiting example includes:

AFSD1/O1, a tamper and inspection resistant AFSD, owned by an O-Per, O1 and certified by CertPer1. AFSD1/O1 comprises:

SE1, a sensor/emitter arrangement comprising a plurality of sensors and emitters installed in an open on one-side, three dimensional contained-environment (a CESEA) for contemporaneously and/or operatively-simultaneously acquiring a plurality of correlated at least in part biometrically based data sets (e.g., acquired within milliseconds to minutes (and/or shorter and/or longer as may be specified) of one another). In addition to a sensor/emitter arrangement, SE1 includes a secure clock & cryptographic services arrangement comprising:

a secure clock arrangement comprising one or more secure clocks, where clocks may, depending upon design priority (e.g., to optimize timing overhead), be respectively located at one or more sensor and/or emitter component sub-arrangements. SE1 employs such secure clocks for securely time-stamping situationally relevant emission and/or at least in part biometrically based data acquisition sensor event information.

a cryptographic service arrangement comprising one or more instances of cryptographic services, where such instances, depending upon design priority (e.g., to optimize timing overhead), may be sub-components of respective sensor and/or emitter component sub-arrangements. SE1 employs such instances of cryptographic services to securely communicate with PPE1 and PPE2, such as sending acquired biometric data and receiving operatively unpredictable emission instructions. PPE1 are designed differently than PPE2.

RIIPU1/O1, a root IIPU comprising:

PPE1 and PPE2, tamper and inspection resistant PPEs, manufactured by Manufacturer1 and Manufacturer2, respectively, where Manufacturer1 and Manufacturer2 may be different manufacturers or different at least in part isolated groups within a manufacturer. PPE1 and PPE2 respectively provide secure environments, where PPE1 and PPE2 respectively comprise:

PRG1 and PRG2, two instances of pseudo random instruction generator services. PRG1 and PRG2 have different designs and/or implementations, where such designs and/or implementations may be implemented by different at least in part isolated implementation groups within the same organization or different organizations.

BIPS1 and BIPS2, two instances of biometric identity services. BIPS and BIPS2 are at least in part developed by different at least in part isolated implementation groups within the same organization or different organizations. BIPS1 and BIPS2 respectively generate U1 biometrically identifying information, Info1 and Info2, based on SE1 acquired near existential or existential quality, at least in part biometrically based data.

Secure clock arrangement1 and Secure clock arrangement2, comprising one or more clocks manufactured by different clock manufacturers. For example, Secure clock arrangement1 is manufactured by ClockManufacturer1 and Secure clock arrangement1 is manufactured by ClockManufacturer2, where ClockManufacturer1 and ClockManufacturer2 may be different manufacturers or different at least in part isolated groups within a manufacturer.

S/E data analyzer1 and S/E data analyzer2, two instances of S/E data analysis services, where such two instances may have been implemented by two different at least in part isolated implementation groups within the same organization or different organizations, for analyzing SE1 acquired near existential and/or existential quality, at least in part biometrically based data to, for example, authorize the generation of Info1 and Info2, respectively.

PPE3, a tamper and inspection resistant PPE that compares PPE1's Info1 and PPE2's Info2 to determine their operative equivalency of results, where Info1 and Info2 respectively include secure time stamped information provided by secure clock arrangement1 and secure clock arrangement2 in PPE1 and PPE2, respectively and/or secure clock and cryptographic services arrangement1 in SE1. In some cases, PPE3 may employ a secure clock arrangement, secure clock arrangement3, to check Info1's and Info2's respective time stamps to validate that Info1 and Info2 were generated operatively simultaneously and within the time interval specified by PPE3 policy set, such as for example, within for example, a few milliseconds. In addition, or alternatively, such comparison may be performed by a remote service such as TIIRS1. In such alternative case, AFSD1/O1 would forward Info1 and Info2 to the remote service, which would determine operative equivalency between Info1 and Info2.

If PPE3 (or the remote service) determines that Info1 and Info2 operatively match (sufficiently similar in accordance with a policy set), PPE3 generates an IIT, IIT1, containing: (i) near existential or existential quality at least in part biometrically based identification information characterizing U1; (ii) one or more information sets for uniquely identifying AFSD1 (e.g., one or more identifiers, Creds, EFs, and/or other attributes); and (iii) one or more near existential and/or existential quality at least in part biometrically based identification information characterizing CertPer1 (e.g., O1, AFSD1's O-Per, and/or other SVCC human party, such as AFSD1 manufacturer human and/or human agent, distributor, vendor, and/or the like who certified AFSD1's authenticity). PPE3 signs IIT1 using CIIS1(AFSD1/O1), and then forwards signed IIT1 to TIIRS1, PPE4, PPE5, and PPE6.

A secure datastore arrangement for managing identity-related information, such as, for example, CIIS1((AFSD1/O1, #CertPer1), CIIS1(U1/AFSD1), Info1, Info2, IIT1, and/or the like.

TIIRS1, a trusted identification information registration service arrangement, wherein such a TIIRS may include at least one of REAI identification, evaluation, and/or publishing service arrangements for managing REAI identity related information sets (e.g., identity related information sets of EBInet network members and related EBInet device arrangements). EBInet device arrangements on behalf of network members may register IISs (such as CIISs, CBEIISs and/or other IIS information) and/or request TIIRS services. TIIRS arrangements may, in some embodiments, securely enforce EBInet device arrangements' compliance with respective EBInet arrangement policies.

TIIRS1 includes, for example:

Secure clock arrangement4, a secure clock arrangement manufactured by a clock manufacturer, Manufacturer4, RUS1, an instance of receiving and using service arrangement, and TIIDB1, a trusted identification information database arrangement for managing registered identity-related information PD1, a parent device comprising:

SE2, a sensor/emitter arrangement comprising: (i) one or more sensors and emitters that RCUFD1/O2 shares with PD1, and (ii) secure clock and cryptographic service arrangement2 comprising a secure clock arrangement and an instance of cryptographic services (may, in some embodiments, be supplied by NIIPU1).

RCUFD1, an RCUFD device that is integrated in PD1 and has an embedded NIIPU1 comprising:

PPE4 and PPE5, tamper and inspection resistant PPEs, manufactured by manufacturers, Manufacturer3 and Manufacturer4, respectively, where Manufacturer3 and Manufacturer4 may be different manufacturers or different at least in part isolated manufacturing groups within the same manufacturer. PPE4 and PPE5 can respectively comprise the following:

IIT prep service1 and IIT prep service2, two instances of IIT preparation services. Such instances of IIT preparation services are at least in part implemented by different at least in part isolated implementation groups within the same organization or different organizations.

IIT prep service1 and IIT prep service2 can respectively process IIS information content (such as IIT1 elements received from AFSD1/O1) NIIPU1/O2 had received to extract and/or otherwise employ situationally relevant identification information elements, including one or more at least in part biometrically based identification information elements. IIT prep service1 and IIT prep service2 then send the results to Analysis set1 and Analysis set2, respectively.

Analysis set1 and Analysis set2, two EBInet process sets that respectively analyze:

IIT1 to identify U1. And if supported, Analysis set1 and Analysis set2, can respectively confirm or not confirm U1's liveness presence, using at least in part biometrically based data acquired by SE2.

results forwarded by IIT prep service1 and IIT prep service2, to confirm or not confirm that IIT1 identifies the same person (i.e., U1) as the person whose presence was determined using SE2 acquired biometric data biometrically based data.

non-biometric identification information elements extracted and/or otherwise employed by IIT prep service1 and IIT prep service2, where such analysis can include whether extracted and/or otherwise employed one or more IIT1 elements match any required such identified person's attributes stored in NIIPU1's (and/or a remote service's, such as TIIRS1's) repository arrangement, such as one or more EF stipulations, Cred assertions, and/or other attribute information, respectively.

Based on their analysis, Analysis set1 and Analysis set2 respectively: (i) use clocks in secure clock arrangement5 and secure clock arrangement6 to securely timestamp the results of their confirmation analysis, and (ii) create info3 and info4 that contain the timestamped analysis results.

Analysis set1 and Analysis set2 implemented by different at least in part isolated implementation groups within the same organization or different organizations.

Secure clock arrangement5 and Secure clock arrangement6, clock arrangements comprising one or more clocks manufactured by Manufacturer5 and Manufacturer6, where Manufacturer5 and Manufacturer6 may be different manufacturers or different groups within the same manufacturer.

PPE4Conf1 and PPE5Conf2 components use secure clocks in Secure clock arrangement5 and Secure clock arrangement6, respectively to securely time stamp situationally relevant information sets. For example, Analysis set1 and Analysis set2 may respectively securely time stamp Info3 and Info4 when produced and/or forwarded to PPE6.

PRG3 and PRG4, two instances of pseudo random instruction generator services that are implemented by different at least in part isolated implementation groups within the same organization or different organizations. NIIPU1, in this example, interacts with PRG3 and PRIG4 to generate operatively unpredictable emission instructions and send them to emitters in SE2 to acquire U1 to response to determine U1's physical presence (i.e., liveness).

PPE6, a tamper and inspection resistant PPE that compares Info3 and Info4 to determine whether they provide the same operative results (satisfies specification for sameness). In some cases, PPE6 may employ a secure clock arrangement, secure clock arrangement7, to check Info3's and Info4's respective time stamps to validate that Info3 and Info4 were generated operatively simultaneously and within the time interval specified by PPE6 policy set. In addition, or alternatively, such comparison may be performed by a remote service such as TIIRS1. In such additional or alternative case, RCUFD1/O2 would forward Info3 and Info4 to a remote service (such as TIIRS1), which would determine operative equivalency between Info3 and Info4.

Before, as, or after, PPE6 (or the remote services) determines that Info3 and Info4 operatively match (sufficiently similar in accordance with a policy set), PPE6 may: (i) similarity match such Info3 and Info4 results with registered U1 identification information set managed by TIIRS1, and (ii) if supported, validate U1's liveness presence timing requirements (i.e., liveness presence was determined within PPE6's policy requirement). If Info3 results and Info4 results operatively match and U1's liveness presence is established, PPE6 generates an IIT, IIT2 and forwards IIT2 to PPE7.

PPE7, a tamper and inspection resistant PPE that has a private key generator that generates private keys associated with EBICerts using IIS information (such as IIT2) forwarded by PPE6 and secret1. PPE7 then forwards the generated private keys to NIIPU1 hardened memory.

NIIPU1 hardened memory stores and manages identity-related information sets, such as private keys for respective EBICerts.

The above device arrangement elements may, depending upon design considerations (e.g., cost, size, heat and/or power consumption, and/or other considerations), be distributed as represented and/or functionally consolidated as desired (such as one secure clock per NIIPU or per RIIPU.

FIG. 6 is a non-limiting example of a distributed AFD arrangement used by an organization for provisioning highly reliable, fault tolerant, (near) existential quality IISs (such as CBEIISs of the organization's employees, CIISs of AFDA1/Owner components, & CIISs of employees & their respective RCFDs).

FIG. 7 is a non-limiting example of a distributed AFD arrangement used by an organization for provisioning highly reliable, fault tolerant, (near) existential quality IISs (such as CBEIISs of the organization's employees, CIISs of AFDA1/Owner components, & CIISs of employees & their respective RCFDs).

5 IITokens

In some EBInet embodiments, IITokens ("IITs"), are IISs used as identification tokens, such IITs including respective person identifying near existential and/or existential quality at least in part biometrically based identification information sets, and are different from conventional computer tokens that are primarily used as "tickets" to authorize, and/or otherwise govern, activities. Traditional token implementations do not provide a near existentially and/or existentially reliable at least in part biometrically based identification information sets, and further do not provide identification information arrangements enabling suitability evaluation/determination based on such arrangements' respective subject matter attributes. They do not provide sufficient information that computing arrangements and/or their users can meaningfully and securely determine such traditional tokens' respective users (or computing arrangements such users are using).

In contrast with traditional tokens, IITs employ an EBInet identity informing infrastructure that enables highly rigorous, existential quality, biometrically based identification of REAIs. IITs are IISs, created, forwarded, carried and/or otherwise maintained, in support of the proffering of identity relevant information used in the enabling, and/or other governing/auditing of, respective event/activity instances. IITs are supplied as a new form of tokens that can, in a highly informative (as to rights and/or other suitability) manner, exploit the capabilities of EBInet embodiment's REAI identification information infrastructure. IITs can include purpose information that characterizes associated respective event/activity instances, such purpose information enabling proffering of IIT information to be matched with appropriate event/activity instances' respective specified, and/or otherwise desired, purpose information. Such IITs may be presented in the form of information carrying templates structured for respectively enabling and/or otherwise governing event/activity instances, based upon, for example, irrefutable person(s) and/or other subject matter identifying and/or other subject matter attribute(s). At least a portion of such subject matter characterizing attributes may take the form of respective contextual purpose specifications, where, for example, an IIT used to open a research lab (LAB X) security door at a person's employer facility can include an event/activity contextual purpose specification (open door to securely managed LAB X), such as when such an IIT is communicated (e.g., pBIDE broadcast) to such LAB X's door RUD, and/or associated RUS, entry control arrangement, such door automatically unlocks, allowing such person's entry into LAB X.

In some embodiments, IITs are a means to convey and enable use of identification information regarding auditing and/or governance of REAIs. Such IITs may be controlled by EBInet policy sets. Such policies may be, at least in part, included within their respective IITs, respectively stored within, and/or otherwise network available to, IIT sending and receiving arrangements. Such receiving arrangements, such as RUDs and/or RUSs, can employ such policy information at least in part based upon received IIT subject matter identification information (e.g., an existentially identified subject matter), e.g., party X can do Y but not Z. Such policy information may state, for example, when and how a new IIT may be generated based on an old IIT (such as, for example, using the old IIT's information set), how such IIT information may be used (such as allowed IIT forwarding, receiving, and/or using operations, including, for example, securely governing one or more conditions for IITs' respective subject matters' use in respective associated event/activity instances). Such event/activity instances may be respectively identified/specified in part through use of descriptive contextual purpose expressions, and such IITs may identify/specify what information is acquired/maintained (including auditing and related provenance information) and the format (e.g., content elements and organization) of such policy information, how and/or where an IIT and/or related information is securely maintained and/or communicated, refreshed/updated, replaced, and/or the like.

In some embodiments, IIT related policies may also be used to determine if a received IIT is valid, e.g., includes, as may be required by policy, a real-time (operatively simultaneous) and/or contemporaneous, human nearly existential and/or existential quality at least in part biometrically based identification information set regarding a registered specific person. For example, in some embodiments, even if an attacker tries to spoof the certification of an REAI and can replicate the non-biometrically based identification information of an IIT, such attacker should fail in reproducing the full contents of an IIT, since with EBInet embodiments, such attacker cannot reproduce, i.e., satisfy, a cryptographically secure IIT's demonstration of the existential presence of a spoofed stakeholder. If an attacker is remote (e.g., one who has not illicitly taken physical possession of an RCFD), such attacker will not be able to spoof contemporaneously acquired existential biometric identification information; if an attacker has a physical possession of an EBInet enabled device, an operatively simultaneous biometrically acquired identification information set can prevent spoofing, particularly if used in combination with a contemporaneously acquired nearly existential or existential quality at least in part biometrically based identification information set (when such operatively simultaneous and contemporaneously acquired biometric identification information sets identify the same party).

Given such embodiments' designs that require for forwarding the demonstration of the presence of a nearly existential or existential quality at least in part biometrically identified stakeholder/user person, such a remote to an EBInet RCFD arrangement attacker cannot satisfy specified identification information requirements for an event/activity set, such as satisfying such presence requirement(s), for example, for an IIT (or one or more portions thereof) being forwarded, received, used, carried, registered, associated with any one or more policy sets, and/or the like. These IITs and/or associated policies may specify a list of one or more specific device arrangements that, in accordance with securely managed operations, require the provisioning and use of policy satisfying person/device arrangements' respective CIISs, CBEIISs, and/or other IISs.

In some embodiments, an IIT that includes, and/or is otherwise securely associated with, a public and private key pair is an EBICert. Such IIT/EBICert can be used in identification and validation/authorization and generally is securely maintained for a persistent period as a reusable object (certain embodiments may employ ephemeral or otherwise short lived EBICerts). EBICert IITs are, in general, valid for a specified time period during which they may be reused. Non EBICert IITs, such as token CIISs, are valid for a short duration, such as contemporaneous duration.

In some embodiments, governance of an IIT/EBICert, for example, an IIT1, for a fused identity entity, P1/EBInet1, where EBInet1 is an EBInet device and/or service arrangement and P1 is a person (such as EBInet1 user, and/or EBInet1 O-Per), is based at least in part on nearly existentially and/or existentially reliable identification information, and further may be based on associated subject matter(s)' (e.g., stakeholders, signing EBInet device arrangements, signed documents, and/or the like) one or more attributes and/or germane one or more policies, the foregoing operatively including and/or securely referencing, and/or otherwise securely employing, for example:

1. Nearly existential or existential quality direct and/or derived person specific identification information resulting in person (versus only service) highly reliable, unique at least in part biometrically based identifying/identifier information (e.g., a CBEIIS). Such person identification information can represent unique and securely maintained and communicated person identity information that can be used to validate/authenticate the person's identity, such authentication stipulated by a signing of CBEIIS by (i) a TIIRS/Agent1 and/or (ii) P1's biometric identification information acquiring AFD/O1, using a certificate, such as an EBICert of such respective entity.
2. Composite IIS (CIIS) representing P1/RCFD1, such CIIS comprises:
   a. CIIS1(P1/(AFD1/O1, #CertPer1)), comprising P1's nearly existential or existential quality at least in part biometrically based direct and/or derived person specific identification information and AFD1's identification information, where AFD1 is an AFD that acquired P1's biometrically based identification data to generate CIIS1(P1/(AFD1/O1, #CertPer1))'s person information one or more portions, and O1 is AFD1's O-Per.
   b. RCFD1's identification information, such as cryptographically protected unique identifiers and/or associated public keys for respective private keys that are securely and respectively bound to, and/or included within, RCFD1. Such device information can represent unique and securely maintained and communicated device identity information that can be used, for example, to authenticate RCFD1's identity, such authenticity stipulated, for example, by signing P1/RCFD1 CIIS(s) by a TIIRS's RUS/TIIRSPersonAgent using an RUS/TIIRS Person Agent EBICert.
3. One or more EFs, Creds and/or other asserted or stipulated attribute information instances regarding P1/RCFD1, and/or regarding one or more attributes of one or more P1/RCFD1 attributes. For example, certain provenance information can comprise an attribute of P1/RCFD1, such as the CertPer is an authenticating party of P1/RCFD1 and the CertPer constitute a P1/RCFD1 IIS attribute. Such attribute itself has an attribute comprising an EF stipulating such CertPer's employment by such CertPer's employer organization, such EF establishing such CertPer's role in certifying RCFD1's authenticity.

In some embodiments, such information above may incorporate and/or otherwise securely employ, for example, one or more of:

1. IIT1 associated subject matter suitability to purpose informing attribute information instances, such as Cred quantized assertions and Effective Fact verifiable fact stipulations.
2. REAI identification information, for example, a CIIS for one or more device arrangements employed in the manufacturing of EBInet1.
3. General infrastructure event/activity instance authorization and/or other governance securely maintained policy information where an identification information set of an identified subject matter has associated one or more conditions affecting event/activity processing control, such as subject matter location, subject matter rights, IIT issuance time and date, and/or if applicable, IIT copying location, time, and date. An IIT may provide operative "active" policy one or more instructions that, for example, stipulate if policy condition set X occurs (e.g., executed as an applet), output Y value, and/or, for example, output a further control instruction set (e.g., producing as a result comprising a specified instruction that is an interim or outcome instruction set that has resulted from such policy specified condition set X).

Such an IIT subject matter characterizing information set, and/or information set derived therefrom, is registered with one or more trusted identification information registration service (TIIRS) arrangements, so that such information can be independently authenticated/verified as registered and authentic.

In some embodiments, TIIRS1 may sign a P1 CBEIIS and/or P1/EBInet1 CIIS(s) at the time of their registration and/or subsequently (such as upon request and/or use).

In some embodiments, an EBInet arrangement (such as device and/or service arrangement) may, for example, create a new IIT in response to acquiring, receiving, forwarding, carrying, and/or using, an IIT, where new IIT's information content may be an update and/or expansion of an originating IIT's information content. For example, an EBInet arrangement using an IIT, IIT1, in an event/activity instance, such as transferring the ownership of an EBInet device arrangement, may result in a new IIT, IIT2, to include and/or securely reference one or more REAI device arrangement and/or person and/or other event/activity identification information (such as including an REAI device arrangement's SVCC event/activity IIS information). Such EBInet device arrangement may create IIT2, where, for example, IIT2:

- includes an event/activity instance information set that specifies applicable such event/activity and/or such event/activity associated one or more resources and processes, and resource and/or process associated conditions and/or consequences (such as process requirements, condition based process inputs, and/or process output consequences, as may be required by specifications), and further includes a purpose specification that describes at least one event/activity usage purpose and where such specification may be in the form of a standardized and interoperably interpretable contextual purpose expression.
- specifies IIT2's "current" operative degree of rigor once a receiving device arrangement is carrying it, e.g., degree of rigor reflecting rigor (e.g., trustworthiness) of the receiving device arrangement.
- includes, removes, replaces and/or augments, one or more policy-controlled confidential/sensitive information portions carried by IIT1 when creating IIT2 that is:
  - protected by a forwarding and/or receiving device and/or service arrangement; and
  - used by such forwarding and/or receiving device and/or service arrangement and/or such arrangement's user in accordance with policy (such as accessing certain IIT such as an EBICert's information components may be selectively controlled in accordance with securely enforced policy (i.e., a given device and/or service arrangement qualify in accessing a certain information set)).
  - For example, such one or more securely protected confidential/sensitive information portions carried by IIT1 may include one or more respective private keys for use by a device and/or service arrangement, and/or composite entity (where a composite entity has a fused-identity comprising a device or service arrangement and a person and when such private keys are kept secret from respective composite entity persons), set (one or more). For example, such private keys can be generated or regenerated at least in part from an owner and/or human user's nearly existential or existential quality biometrically based identification information and may require such owner's and/or human user's physical presence. A decision whether to forward, receive, carry, and/or use IIT2 that includes one or more such secrets that may depend on one or more policies for IIT2's respective secrets, device and/or service arrangements, and/or associated persons, such as owners and/or users and/or other Stakeholders. For example, certain IITs respectively containing specified secrets may only be forwarded to devices and/or services that are registered as grouped for the purpose of forwarding and/or receiving of such information generally and/or under specific conditions. Such forwarding, receiving, carrying and using may be conditioned upon device and/or service arrangements having certain respectively specified degrees of rigor and/or other specified contextual one or more variables, such as arrangements respectively specified standardized and interoperably interpretable purpose expressions.
- is compliant with policy sets appropriate to such one or more relevant acquiring, forwarding, receiving, carrying and/or using device and/or service arrangements, such as EBInet device and/or service arrangements.
- provides, when IIT2 comprises an EBICert, signature information for cryptographic signing REAI information (such as providing information for validating the signature and decrypting content), for example, for use by EBInet respective forwarding, receiving, carrying, and/or using device and/or service arrangements.
- and/or the like.

In some embodiments, EBInet arrangement policy information may, for example, specify securely enforced rules and controls for using device, service, and/or person identification information respective IITs, such rules and controls for secure:

- communication (e.g., inter-device and/or network arrangement intercommunication),
- event/activity authorization and/or suitability evaluation,
- other governance/administration, including, for example, enforcing operative requirements/conditions,
- creation/formulation of new IITs using existing IITs for signing and/or otherwise certifying information resources,
- and/or the like.

In some embodiments, some or all information used in conjunction with an IIT set may, instead of being included in the IIT set, be securely referenced by such IIT set and such secure reference information could be forwarded to any EBInet compliant receiving device and/or service arrangement to be securely stored and/or used in combination with (e.g., as component information of and/or as a response to a request for) such IIT set. In some embodiments, information added by an EBInet arrangement (such as device and/or service arrangement) to an REAI information set that is securely associated with an IIT set may be securely signed and/or encrypted by such EBInet arrangement.

In some embodiments, EBInet event/activity information may include Creds and/or Effective Facts about historical (e.g., provenance relevant) Stakeholders, device arrangement users, and/or other REAI's, where such event/activity information may have value in the identification and/or evaluation of respective such REAIs and/or their associated token information, regarding, for example, their respective trustworthiness and/or suitability characteristics.

In some embodiments, in support of independent evaluation of an EBInet REAI IIT, such IIT may provide its origination information by including and/or otherwise securely referencing, for example when created, a biometrically based near existential or existential quality identification information set of a user, owner, and/or other Stakeholder (see FIG. 18A-18B). For example, an at least in part biometrically based identification information set identifying a human Stakeholder (such as a purchaser/owner) of an AFSD may be included in such an AFSD created IIT. Such IIT represents a fused-identity entity comprising such AFSD and associated human Stakeholder(s) used, as an EBICert, in cryptographic signing processes.

In some embodiments, identification information sets for a human Stakeholder may securely include, for example, one or more QtPs asserting, and/or Effective Facts stipulating respective testable facts, that such human Stakeholder works for such AFSD's manufacturer and such worker's biometric identification information supplies a certification that the device arrangement is genuine and manufactured by such worker's employer, e.g., a company X, at a location, date, and time, where such Stakeholder employment, location, and time periods are stipulated as a verifiable Effective Fact set and/or is registered with a manufacturer and/or internet service (such as a TIIRS) so that, by association and using stakeholder person's physical and/or contemporaneous IIS presence, authenticity of a manufactured and/or otherwise produced object (e.g., tangible and/or intangible) is presumed to be verified.

In some embodiments, forwarding, carrying, receiving, and/or using of IITs and/or other IISs, may be governed by a variety of respective IIT and/or other IIS related policies. Policies may be context specific; for example, policies regarding use of IIS information in force in a work environment, such as applied to work related activities, may be quite different from policies that govern similar types of information (e.g., a person's personal confidential information) usage in a person's home for personal activities. Such policy information may be maintained external to, and/or may be incorporated within, respective IITs, and such different policies may govern different IITs and/or other IISs that, for example, meet specified requirements of similarity. In addition, for example, an IIT and/or other IIS may be subject to different policy conditions, and/or different one or more policies when used in different contexts. For example, a policy instance may be changed to another policy instance based upon an anticipated or otherwise determined threat level, and/or, for example, in accordance with the day of the week, the identity of the user of a device arrangement, the implications of identities of a given set of different devices and/or stakeholders, and/or the like. In addition, an IIT and/or other IIS may be generated in response, at least in part, to anticipated usage context(s) (e.g., contemplated operating conditions), such IIT created in response to applicable securely managed one or more policies.

In some embodiments, at least certain sensitive components of an IIT's and/or other IIS's contents are policy controlled, such as requiring device arrangements that carry such sensitive components to protect them using encryption that employs their respective public/private key pairs. Such policies may further stipulate that such sensitive components are only provided to, or made available for use by, trusted EBInet device arrangements as specified by policy information of forwarding, receiving, and/or administrating EBInet device and/or service arrangements. For example, suppose an EBInet device/service arrangement has an IIT, IIT1, containing policy-controlled sensitive elements that it is protected using its public/private key pair. Further suppose that a device, DEV1, is allowed to access one or more portions of IIT1's sensitive elements. In such a case, such EBInet device/service arrangement may:

- create a symmetric key; and
- create a new IIT, IIT2, whose content is a modified, uniquely identified transformation of IIT1, where such modification includes (i) removing those portions of IIT1's sensitive elements that DEV1 is not allowed to access, (ii) encrypting the rest of IIT1's content with such symmetric key and including the symmetric key encrypted IIT1's content, and (iii) encrypting the symmetric key using DEV1's public key and including the encrypted symmetric key.

Alternatively, particularly where sensitive information instances do not comprise a large amount of data, such EBInet device/service arrangement may encrypt the sensitive information using DEV1's public key so that only DEV1 using its private key can decrypt the sensitive elements.

In some embodiments, a fused-identity entity's at least in part contemporaneously acquired at least in part biometrically based identification IIT and/or its policy information set(s) can be cryptographically signed using an EBInet creating/updating, using, receiving, carrying, and/or forwarding device and/or service arrangement's CIIS, and/or other IIS (that include manufacturer/creator and/or acquirer at least in part biometrically based identification information and/or other relevant IIS information).

In some EBInet embodiments, as illustrated in FIGS. 18A and 19A, when a fused-identity entity, representing a human person, U1, and U1's EBInet device arrangement, RCUFD1, receives an IIT, IIT1(U1/AFSD1) from a fused-identity entity, AFSD1/O1 (representing a human person, O1, and O1's EBInet device arrangement, AFSD1), RCUFD1/O2 (representing RCUFD1 and RCUFD1's O-Per, O2, who is the same person as U1), in accordance with (RCUFD1/O2)'s policy set, creates a new IIT, IIT2, based on IIT1, where IIT1 and IIT2 may have the same stem identifier to reflect that IIT2's information content is an evolved form of IIT1's information content (i.e., RCFUD1/O2 creates IIT2's information content by adding to, removing from, and/or otherwise modifying IIT1's information content). Such evolved form of IIT1's content may include, for example, RCUFD1/O2 modified one or more portions of IIT1 information content, signed (characterized and validated) by (AFSD1/O1, #ManPer1), where signed portions of IIT1(U1/AFSD1) may include, for example, securely stored policy information, security elements' respective information, and/or other U1/AFSD1 related REAI identification information, instances. (RCUFD1/O2, #ManPer2) may, as part of creating IIT2 ((U1/AFSD1)/RCFUD1), sign one or more portions of IIT2's information content (including modified portions), where such signed portions may include and/or securely reference (AFSD1/O1, #ManPer1) signed portions of IIT1.

In some embodiments, a path that an IIT copy (itself an IIT instance) takes through forwarding and receiving device arrangements, may, for example, be recorded in one or more IIT usage event/activity identification information sets (including, for example, associated one or more REAI IIS Stakeholders' and/or owners' respective at least in part biometrically based identification information, provenance information sets, and/or the like) incorporated within and/or securely associated with such an IIT copy. Such information may be securely stored in one or more event/activity instance related EBInet device and/or service arrangements. Such an IIT copy usage event/activity information may at least in part be governed by policy information and, for example, such policy information may be used to enforce rules that ensure an IIT's context relevant rigor and/or validity.

For example, a policy may state that the degree of rigor of a new IIT will not exceed the one or more degrees of rigor of its respective source one or more IITs and/or other EBInet compliant information instances (e.g., not exceed the maximum applicable trustworthiness rigor level of its lowest rated current and historical (provenance) device and/or service arrangement, Stakeholder, and/or associated other EBInet REAI information set and/or such set's respective device and/or service environments). For example, a policy may specify that when an IIT is forwarded from an RCFD arrangement to a target EBInet device and/or service arrangement (such as an RFD or RUS), the rigor level of a new IIT that is produced/provided from such IIT may be specified not to exceed a cryptographically signed rigor level, where such not to be exceeded rigor level is, for example, 7 out of 10. In some embodiment, such policies may be stipulated/specified by a platform utility and/or by another administrative organization using at least in part one or more stakeholder persons' at least in part nearly existential and/or existential quality at least in part biometrically based identification information.

In some embodiments, depending on required level of rigor, a policy may specify that an EBInet device and/or service arrangement check, or cause the checking of (e.g., by a cloud and/or organization service) one or more portions of the provenance information (e.g., stakeholder party and/or event/activity history) of an IIT (e.g., information regarding one or more IIT antecedent REAIs), in order to evaluate and/or determine the suitability and/or accuracy of such provenance information. In such embodiments, when an EBInet device and/or service arrangement receives an IIT, such device and/or service arrangement may check at least a portion of such IIT's provenance information to validate that such IIT was only forwarded and received by one or more qualified devices, services, and/or parties (e.g., persons and/or organizations) allowed to receive, use, carry, forward, and/or the like such IIT (and securely associated provenance information set) and/or a successor IIT (e.g., modified) as it travelled on a path from its nearly existential or existential quality at least in part biometrically based identification information acquiring AFD, through one or more receiving, carrying, using, and/or forwarding EBInet compliant device and/or service arrangements.

In some embodiments, policies that govern an IIT may specify, for example:

One or more requirements and/or other conditions regarding creation, forwarding, receiving, carrying/storing, using, refreshing, and/or the like, of such IIT. For example, a policy may specify contextual conditions, such as time of day, location, network ID, device, service, and/or party (e.g., organization and/or person) arrangement ID, and/or the like, under which such policy and/or a policy element is active (i.e., currently applicable/operable) (i.e., to be enforced). For example, a policy may state that such IIT may only be forwarded between specified devices and/or services at specified one or more times, frequencies (e.g., budget-based limitation on usage, for example, how many times it may be used within a time period) and/or usage performed through use of a specified physical and/or network location and/or how many forwarding hops (forwarding and receiving pairs) such IIT can make and still remain valid. In some embodiments, the number of new IITs that can be created on a given device and/or service arrangement at least in part based on an originating IIT (by expanding and/or otherwise modifying the contents of such originating IIT) can be limited as to their respective number (e.g., of (limited by specified budget) modified, newly created IITs). For example, a fused-identity entity, representing a human person and such person's device and/or service arrangement, may have policies specifying requirements and/or other conditions regarding:

Generating IITs for a fused-identity entity, representing a specific user, U1, and U1's EBInet device arrangement, at a specified rigor level by: (i) acquiring U1's at least in part near existential or existential quality biometrically based data employing U1's EBInet device arrangement's sensor/emitter set (such as a contained-environment EBInet compliant sensor/emitter arrangement (CESEA)) and (ii) processing the sensor/emitter set acquired near existential and/or existential quality, at least in part biometrically based data. Such generated IITs may include and/or securely reference one or more IISs (such as U1's device and/or service arrangement's one or more CIISs' respective U1's identification information instances that include, for example, one or more U1's non-biometric attributes, such as Creds and/or EFs, obtained from a trusted identification information database arrangement, and/or the like).

Forwarding and/or receiving IITs only through/to specific one or more device and/or service arrangements and/or human set, and/or device and/or service arrangement and/or human set registered classes and/or other groups (e.g., humans who have degrees in physics), the foregoing constituting at least under certain specified conditions, and/or such as specifying a time after which an IIT (and/or its progeny) cannot be, or can be, forwarded and/or received, and/or opened and/or decrypted. With such embodiments, a policy (and/or a user upon instruction) can specify that such an IIT can only be forwarded to explicitly specified (e.g., registered) one or more EBInet device arrangements and/or arrangement groupings. In some embodiments, policies may state, for example, that one or more pairs and/or other groupings of device and/or service arrangements and/or parties may forward an IIT from one device and/or service to one or more respective intended device and/or service arrangements. In some embodiments, policies may, for example, state that (1) a forwarding device arrangement must be, at least under certain specified conditions, an AFD that performed the acquisition of a person's nearly existential or existential quality at least in part biometrically based identification information set and used such acquired biometric information to generate the IIT being forwarded, and (2) the corresponding receiving device and/or service is an RUD and/or RUS, which can use, and may be required to securely destroy, such IIT after receipt and use and/or upon the occurrence of one or more other conditions.

- Carrying/storing one or more IITs in a secure tamper resistant identification information processing unit (an IIPU chip arrangement such as an IF NIIPU or an AM or IF RIIPU) for a given period of time, such as a day, after which the device and/or service arrangement must securely destroy and/or modify them by erasing one or more content portions of one or more of such IITs.
- Using IITs under a specified set of operative conditions, such as requiring the use of second factor validation.
- Refreshing an IIT after a specified time, such as, 24 hours after the device and/or service arrangement provisioned such IIT.
- Securely registering and maintaining such IT and/or IT related identification information (such as event/activity instance and/or policy information) on an organization's network and/or with one or more trusted identification information registration service (TIIRS) arrangements. In some embodiments, a user, EBInet device, service and/or composite entity arrangement registers such IIT.
- In some embodiments, an event/activity instance and/or policy information set associated with an IIT may at least in part form a provenance information set for such IIT. For example, a forwarding device and/or service arrangement may generate an event/activity instance information set associated with such forwarding of an IIT event/activity. Such forwarding event/activity instance information set may be based at least in part on one or more audit logs of forwarding operations related to forwarding of an IIT to a receiving device and/or service arrangement, such as logs of when operations started, were conducted, and/or had completed. Once such event/activity instance is completed, such forwarding event/activity instance information set can: (i) securely be stored on an organization's network and/or registered with one or more trusted identification information registration service (TIIRS) arrangements and (ii) be formed to be a part of such IIT's provenance information set.

In some embodiments, when a forwarding device and/or service arrangement initiates a forwarding an IIT event/activity instance to forward an IIT, IIT1, to a device and/or service arrangement, such device and/or service arrangement receiving such IIT may validate identification information that is securely associated with such forwarding an IIT event/activity instance using, for example, information (stored on an organization's network and/or registered with one or more trusted identification information registration service (TIIRS) arrangements) to determine whether:

- such forwarding device and/or service arrangement was/is permitted to carry and forward IIT1,
- such forwarding an IIT event/activity information is consistent with stored/registered such IIT related information; and
- such device and/or service arrangement receiving IIT1 is permitted to receive it, where such permission includes determining the suitability of IIT1 to the arrangement and its user's purpose(s).

If validation is successful, such device and/or service arrangement receiving IIT1 may securely store on an organization's network and/or register with one or more trusted identification information registration service (TIIRS) arrangements a receiving IIT1 event/activity instance information set, where such receiving IIT1 event/activity instance information:

- Characterizes a receiving IIT1 event/activity instance that corresponds to such forwarding IIT1 event/activity instance.
- Stipulates that such device and/or service arrangement receiving IIT1 had received, evaluated, stored, used, and/or forwarded such IIT and/or generated a newer IIT based on the received IIT, in accordance with such IIT's and/or such arrangement's respective policy specification sets.

In some embodiments, an IIT may have a policy set specifying a set of contextual requirements that need to be satisfied for such IIT to be validly used. For example, an IIT can have contextual requirements for its forwarding, receiving, carrying, using, and/or the like, such as:

- before such IIT can be forwarded, one or more specified persons must securely perform operatively simultaneous, rigorous, for example, biometric identification (e.g., as a second factor native parent device provided identification information complementing an EBInet device arrangement provided CBEIIS and/or CIIS), or
- such IIT may only be used after validating/authenticating composite IIS of the device arrangement presenting and authenticated device arrangement stakeholder person.

For example, a fused-identity entity's use an IIT is valid only if such entity satisfies relevant networking policy specifications where such specifications enumerate contextual requirements that must be satisfied. Such requirements may include, for example, a fused-identity entity (representing, for example, P1/RCFD1) having a relationship history of such IIT forwarding with a fused-identity entity (representing, for example, P2/RUD1) and/or where such fused-identity entities are registered as grouped together for such forwarding and/or receiving of such IIT, and/or such forwarding fused-identity entity is registered to interact with other EBInet arrangement compliant fused-identity entities at a certain specified security rigor level (or higher (more rigorous) level) and/or have certain specified one or more other characteristics, and where such forwarding and receiving fused-identity entities can mutually and/or individually demonstrate that they satisfy such a specified rigor level requirement.

In some embodiments, when an IIT is forwarded from one (forwarding) device and/or service arrangement (for example, an AFSD) to a (receiving) device arrangement (for example, an RCUFD), the communications associated with such forwarding operation may be protected, at least in part, by private keys securely placed in such forwarding device and service arrangement and receiving device and/or service arrangement, respectively. For example, such private keys may be securely placed in respective device arrangements, at the time such device arrangements were manufactured, and/or at some point during an SVCC and/or other administrative/governance event/activity. Such protection of communication may, in some embodiments, allow such receiving (and/or forwarding) device arrangements to evaluate and validate the identity of a, for example, given forwarding (and/or receiving) device arrangement, for suitability to receiving (and/or forwarding) device arrangement (and/or associated stakeholder and/or user) purpose (e.g., applicable policy satisfaction). In particular, if such a forwarding device arrangement is not allowed by one or more employed policies to carry, forward, modify to produce a new version of, use, and/or the like to, an IIT, the receiving device may reject the IIT as invalid based on policy information (where such policy information may be enforced based at least in part on such receiving and/or forwarding device arrangement's and/or token's, REAI information).

5.1 FIG. 17

FIG. 17 illustrates a non-limiting example of EBInet device and/or service arrangements generating, forwarding, receiving, carrying, evaluating, governing, and/or the like near existential and/or existential quality at least in part biometrically based IITs, where generated IITs provide sufficient authorization for their users to participate in respective E/A activities.

The example embodiment includes the following components:

- AFD1/O1, a tamper and inspection resistant identity determination arrangement, owned by an O-Per, O1, who is the same person as a human user, U1. AFD1/O1 acquires near existential and/or existential quality at least biometrically based identification information of human users, producing respective one or more IISs (such as CIISs, IITs, EBICerts, and/or other IISs), and forwarding produced IISs to such users' respective RCFDs. AFD1/O1 stores in its secure repository the following IISs:
  - CIIS1(O1/AFD1, #CertPer1) comprising one or more portions of CBEIIS (O1), IIS1(AFD1), & CBEIIS1 (CertPer1), information.
  - CIIS1(U2/AFD1, #CertPer1) comprising one or more portions of CBEIIS (U2), IIS1(AFD1), & CBEIIS1 (CertPer1), information.
  - CIIS1(U3/AFD1, #CertPer1) comprising one or more portions of CBEIIS (U3), IIS1(AFD1), & CBEIIS1 (CertPer1), information.
  - IIT1(U1/AFD1), IIT1(U2/AFD1), IIT1(U3/AFD1), IITs (such as master IISs, and/or child IISs, &/or EBICerts) respectively derived from IIT1(U1/AFD1), IIT1(U2/AFD1), IIT1(U3/AFD1).
- RCFD1/U1, RCFD2/U2, and RCFD3/U3, tamper and inspection resistant identity carrying RCFD arrangements respectively owned by U1, U2, and U3. Such RCFD arrangements can carry securely associated one or more groupings of respective AFDs' (e.g., AFD1's) and/or respective RCFDs' produced IISs in the form of IITs &/or EBICerts. Such IITs, for example, can in part comprise different child IISs that comprise respective fused identity entities' (such as (U1/RCFD)'s, (U2/RCFD2)'s, and (U3/RCFD3)'s) respective CIISs that include their respective RCFDs identifiers.
- RUD1/O2, RUD2/O3, and RUS1/O4, tamper and inspection resistant, securely monitoring and/or governing identity usage RUD and/or RUS arrangements, such as:
  - RUDs that monitor and/or govern SVCC intermodal container event/activity operations;
  - RUDs that control access to restricted facilities, homes, rooms, cars, and/or the like;
  - RUDs that monitor and/or govern IoT instances, such as home security systems;
  - RUSs that monitor and/or govern social and/or commercial network interactions and consequences;
  - RUDs and/or RUSs that monitor and/or govern the use and/or consequences of use of data objects (such as document, video, software, and/or any other information resources);
  - And/or the like.

Step 1: AFD1/O1 acquires near existential and/or existential quality, at least in part biometrically based information of U1, U2, and U3. AFD1/O1, a remote service arrangement (such as an RUS arrangement operating as part of a TIIRS), and/or other EBInet device arrangement(s) (such as one or more RCFDs), processes acquired biometric data to generate respective CIISs. Such EBInet device and/or service arrangement(s) can then securely combine IIS contents to generate respective variously composed identifying EBICerts and/or other IITs (such as master IISs and/or child IISs), as policy specified, contextually required, and/or requested for identifying U1, U2, and U3, such as their IIT1(U1/AFD1), IIT1(U2/AFD1), and IIT1 (U3/AFD1).

Step 2: AFD1/O1 respectively establishes secure communication links with RCFD1/U1, RCFD2/U2, and RCFD3/U3. For example, AFD1/O1 and RCFD1/U1 establish a secure communication link by exchanging and validating respective EBICerts. After such communication links are established, AFD1/O1 respectively forwards:
- CIIS1(U1/AFD1, $CertPer1) and IIT1(U1/AFD1) to RCFD1/U1;
- CIIS1(U2/AFD1, $CertPer1) and IIT1(U2/AFD1) to RCFD2/U2;
- CIIS1(U3/AFD1, $CertPer1) and IIT1(U3/AFD1) to RCFD3/U3.

Step 3: RCFD1/U1, RCFD2/U2, and RCFD3/U3, receiving IISs from AFD1/O1, respectively perform the following steps:
- Step 3a: RCFD1/U1 securely generates one or more IITs, such as IIT1((U1/AFD1)/RCFD1), by securely using one or more portions of (CIIS1(RCFD1/U1, #CertPer2), IIT1(U1/AFD1), and CIIS1(U1/AFD1, #CertPer1);
- Step 3b: RCFD2/U2 securely generates one or more IITs, such as IIT1((U2/AFD1)/RCFD2), by securely using one or more portions of (CIIS1(RCFD2/U2, #CertPer3), IIT1(U2/AFD1), and CIIS1(U2/AFD1, #CertPer1); and
- Step 3c: RCFD3/U3 securely generates one or more IITs, such as IIT1((U3/AFD1)/RCFD3), by securely using one or more portions of (CIIS1(RCFD3/U3, #CertPer4), IIT1(U3/AFD1), and CIIS1(U3/AFD1, #CertPer1).

Step 4: RCFD1/U1, RCFD2/U2, and RCFD3/U3 respectively enable U1, U2, and U3 to participate in respective E/A instances, by respectively performing the following steps:
- Step 4a: RCFD1/U1 securely forwards one or more master and/or child IITs (such as IIT1((U1/AFD1)/RCFD1)) to RUD1/O2;
- Step 4b: RCFD2/U2 securely forwards one or more master and/or child IITs to RUD2/O3; and
- Step 4c: RCFD3/U3 securely forwards one or more master and/or child IITs to RUS1/O4 and RUD1/O2.

Step 5: RUD1/O2, RUD2/O3, and RUS1/O4, receiving forwarded IITs, respectively evaluate/validate received IITs to determine whether such IITs provide rights and/or control authorization required for associated event/activity instances, such as accessing their respective employers' email servers, entering their respective homes, loading cargos to an SIMC at work, driving their respective automobiles, and/or the like.

5.2 FIG. 18A-18B

FIG. 18A-18B illustrates a non-limiting example of EBInet device and/or service arrangements, such as RCFDs, RUDs, and/or RUSs that receive IITs: (i) generating respective new IITs based on respective received IITs, and (ii) forwarding new generated IITs to other EBInet device and/or service arrangements.

In FIG. 18A, a fused-identity entity, AFSD1/O1, generates an IIT, IIT1, for a fused-identity entity, U1/AFSD1, signs one or more portions of IIT1 using EBICert1(AFSD1/O1), and forwards IIT1 to a fused-identity entity, RCUFD1/O2. RCUFD1/O2, in turn, generates a new IIT, IIT2, based on IIT1, containing an RCUFD1/O2 signed portion that includes the signed IIT1 portion set contained in IIT1. FIG. 18B continues to describe the example by illustrating an RUD, RUD1, receiving from RCUFD1 IIT2 that contains a nested signed IIT portion set and generating a new IIT, IIT3, based on IIT2, containing an RUD1 signed portion set that includes the nested signed IIT set contained in IIT2.

In some embodiments, such signed IIT portion sets may form a chain comprising a sequence IIT portion set blocks. When a device arrangement, receiving a chain, Chain1, comprising a sequence of IIT portion set blocks may create a new signed IIT portion set block that includes and/or securely references the last signed IIT portion set block in the chain's sequence. Such device arrangement may then: (i) form a new chain, Chain2, comprising new signed IIT portion set block appended to Chain1's sequence of IIT portion set blocks (see FIG. 18A-18B) or (ii) extend the received chain by adding a new IIT portion set (see FIG. 20).

In some embodiments, each IIT portion set block may include and/or securely reference provenance information and/or provenance related event/activity components to form a new portion set block.

In some embodiments, an EBInet device arrangement's at least in part contemporaneously acquired at least in part biometrically based IIT and/or its policy information set(s) can be cryptographically signed using its updating/creating, using, receiving, and/or forwarding device arrangement's CIIS, CBEIIS, and/or other IIS (that include, for example, manufacturer, and/or acquirer at least in part biometrically based identification information and/or other relevant IIS information).

In some embodiments, provenance and/or policy information regarding an IIT, may be securely stored on an organization's network and/or in the cloud, by, for example, an organization and/or platform utility service arrangement. For example, a forwarding device might update such provenance information indicating that it was starting, was conducting, and/or had completed, a forwarding operation to send an IIT to a receiving device and/or service arrangement. After such operation, such a web service may, if earlier notified, be "expecting" an update from a receiving device and/or service arrangement where such receiving device and/or service arrangement sends an information update stipulating that it had received, evaluated, stored, used, and/or forwarded such IIT and/or a modified newer IIT version. When an IIT is, has, or may be received from a forwarding device arrangement, such IIT may be validated using stored IIT information that is consulted to determine whether such a forwarding device was/is allowed to carry and forward such IIT and that received or available for forwarding token information is consistent with reported (e.g., registered) IIS related information such as token and/or provenance instance information set(s).

FIG. 23 is a non-limiting example of a provenance/validation authority chain of IISs that supports identification authorization sequence for provenance information used in certifying SVCC EBInet device arrangement audit sequence for RFD1 (using devices' respective manufacturing and retail persons' respective near existential and/or existential quality at least in part biometrically based IISs), such audit sequence comprised of sets of contextually appropriate SVCC sequence instances' audit relevant IISs.

FIG. 24 is a non-limiting example of information instances of a provenance/validation authority chain of IISs that supports identification authorization sequence for provenance information used in certifying SVCC EBInet device arrangement audit sequence for RFD1 (using devices' respective manufacturing and retail persons' respective near existential and/or existential quality at least in part biometrically based IISs), such audit sequence comprised of sets of contextually appropriate SVCC sequence instances' audit relevant IISs.

In some EBInet embodiments, if IITs' respective contents are modified as such IITs are received, carried, used, and/or forwarded, any such modifications would require respective renaming of IITs where, for example, a stem identifier of an original identifier may be retained, but such identifier is altered by use of a new version identifier that reflects modification to an IIT's information content, such as adding to, removing from, and/or otherwise changing an IIT's content. Such modification may involve, for example, modifying one or more securely stored policy information, security elements' information (e.g., keys), and/or provenance information, instances. Such a modified token can, for example in an "evolved form," be forwarded, received, and/or carried again, where the stem remains the same, but augmenting information is included as may be indicated by changed information one or more portions, and such token's new unique identifier version information. In some embodiments, at least certain sensitive components of an IIT's contents are secret, where such components' secrets are only provided to, or made available for use by, trusted EBInet device arrangements as specified by policy information of forwarding, receiving, and/or administrating EBInet device and/or service arrangements.

In the top half of FIG. 18A, AFSD1/O1 is carrying an IIT, IIT1, of a fused-identity entity, U1/(AFSD1/O1), in its hardened and secure storage, where U1 is a human user of AFSD1/O1, and O1 is AFSD1's O-Per. (O1 and U1 may or may not be the same person). IIT1 is in part based on a near existential or existential biometric information acquired by AFSD1/O1. In this example, IIT1 is signed by (AFSD1/O1, #ManPer1) using EBICert1(AFSD1/O1), where ManPer1 is a manufacturer agent that certified AFSD1.

Such IIT1 includes an at least in part secure, cryptographically protected information set, for example, comprising:

- A CIIS of person/device primary subject matter (i.e., U1/AFSD1), comprising
  - U1's near existential or existential quality at least in part biometrically based IS information, where such information can further include attributes such as U1's PERCos QtP (e.g., Cred), EF, and/or the like attribute information instances (such as societally identifying information, including, for example, human person name, address, company ID and employer name, profession, and/or the like, which may be clustered into facet and/or dimension types reflecting, for example, respective classes of attributes and information arrangements associated with respective user purpose types (e.g., social networking, work related, financially related, and/or the like).

AFSD1's IS comprising situationally relevant attributes characterizing AFSD1, such as:

AFSD1's PERCos QtP (e.g., Cred), EF, and/or the like attribute information instances;

AFSD1 manufacturer (and/or other SVCC stakeholder type(s)), make and/or model, version number, firmware version number, and/or the like, which may be clustered into facet and/or dimension types reflecting, for example, respective classes of attributes and information arrangements associated with respective user purpose types (e.g., social networking, work related, financially related, and/or the like).

Antecedent source information, where such information can include: (i) IIT1 provenance related E/A instances, and (ii) AFSD1 provenance E/A identification information (e.g., IISs and/or portions thereof) signed using a ManPer1 fused identity EBICert representing an identity validation chain, such as ((ManPer1/(AFSD2/O4, #ManPer4))/(RCUFD2/O4, #ManPer5)), where:

ManPer1 is manufacturer human agent who certified AFSD1 using RCUFD2/O4;

AFSD2 is an AFSD that acquired ManPer1's near existential or existential quality at least in part biometrically based IIS information;

O4 is AFSD2's and RCUFD2's O-Per (i.e., AFSD1's manufacturer) owner agent person, who may or may not be the same person as ManPer1, who certified AFSD1;

ManPer4 is an AFSD2 manufacturer human agent who certified AFSD2; and

ManPer5 is an RCUFD2 manufacturer human agent who certified RCUFD2. O2 may be the same person as ManPer1.

In some embodiments, AFSD1/O1 provenance identification information can contain at least in part biometrically based near existential and/or existential identification information sets for AFSD1 identifying/authenticating/authorizing one or more CertPers, such as AFSD1's manufacturer's human agents, where such identifying/authenticating/authorizing may employ such one or more agents' respective biometrically based identifying information, which may be provided in the form of one or more composite IISs, such as IITs, that respectively include at least a portion of such agents' respective AFSD, RCUFD, RUS, and/or RUD arrangements' respective identification information instances.

IIT1 creation E/A instance identification information can comprise antecedent REAI information representing generation of IIT1, including generation of one or more U1's near existential and/or existential quality, at least in part biometrically based IISs, and E/A instances for preparing IIT1 to be forward to RCUFD1/O2. Such antecedent REAI information set may include, and/or securely reference, one or more logs associated with operations related to IIT1 generation and/or information derived therefrom, where such logs may include and/or securely reference, one or more nearly existential or existential quality at least in part biometrically based identification information sets of one or more persons who personally certified (through use of their at least in part biometrically identifying respective EBICerts) IIT1's creation device arrangement, AFSD1/O1. Such antecedent REAI information set may further include IISs regarding one or more persons who certified one or more of AFSD1's antecedent to manufacture and/or antecedent to end-user acquisition, REAIs' respective IISs and/or REAI IISs' respective subject matters (where such subject matters respectively constitute the REAIs). Such respective antecedent REAI IISs comprise relevant to REAI subject matter identification and/or evaluation information instances. Such instances may be included within and/or securely bound (e.g., through secure database reference) to one or more such AFSD1/O1 IISs, and such one or more antecedent IISs may comprise REAIs of an SVCC arrangement. Such antecedent REAI IISs may comprise, for example, near existential or existential at least in part biometrically based identification information for event/activity instances representing the creation of IIT1. IIT1 may also include and/or securely reference REAI information representing one or more antecedent persons, and/or EBInet compliant device arrangements, operatively relevant to IIT1's creation and material to its evaluation. When created, IIT1 may include and/or securely reference, for example, near existential or existential at least in part biometrically based identification information as component information (e.g., a CIIS) of an IIT identifying, for example, AFSD1/O1. Such antecedent REAI IISs can include composite biometrically identifying and/device identifying information for AFSD1's EBInet device arrangements, where such arrangements were used by manufacturer, retailer, owner, and/or the like, where such identified persons' biometric information instances were respectively used to certify at least a portion of one or more IIS instances, such IISs being antecedent to, and may contribute IIS information for, a current REAI's IIS creation. IIS instances descriptive of their subject matter event/activity instances may also include and/or securely reference, in some embodiments, near existential or existential at least in part biometrically based identification information sets and/or other IIS information of one or more event/activity participating, and/or resource, stakeholder person.

In some embodiments, at the time of AFSD1's manufacturing (and/or at a later, for example key updating, time and date) AFSD1 may generate, and/or be provided, one or more EBICerts for performing cryptographic operations (such as, for example, authenticate/validate (AFSD1/O1)'s identity to other device arrangements, cryptographically signed IITs, such as IIT1, and/or the like). Such EBICerts may include at least in part biometrically based identification information set of AFSD1 manufacturer human person agent, and have respective private keys stored/embedded in hardened AFSD1 memory when AFSD1 was manufactured (and/or securely stored/embedded at a later, for example key updating, time).

One or more IIT1 policy sets, including, for example, one or more policies stating one or more requirements and/or other conditions regarding creation, forwarding, receiving, carrying/storing, using, refreshing, and/or the like, of an IIT, such as for example, which device arrangements are allowed to receive, use, and/or carry IIT1 and/or IIT1 derived at least in part from IIT1, how a device arrangement carrying IIT1 may use it, and/or the like. AFSD1/O1 may formulate such IIT1 policies, in accordance with (AFSD1/O1)'s policy specification for generating IITs. Such policies are individually signed by policies' respective policy authorities. In this example, one IIT1 policy may specify that a set of EBInet device arrangements, such as AFSD1, RCUFD1, RUD1, RD3—home, RUD4—office, RD5—socnet, are allowed to acquire, receive, carry, forward, and/or use IIT1 and/or tokens derived from IIT1. Such policy may be signed by EBICert1, an EBICert representing a fused identity entity, AFSD1/O1, and/or by an administrative O1 based EBICert. Another IIT1 policy may specify that requirements on IIT formulation, such as, what information must be included and/or referenced, what information sets must be signed, and/or the like. For example, AFSD1/O1 must include IIT1 creation event/activity instance information and sign such information. Such policy may be signed by O1 related EBICert and/or a human agent of a trusted administration service arrangement responsible for managing AFSD1.

FIG. 18A also shows in the bottom half of the figure an IIT, IIT2, based on IIT1 (e.g., a CBEIIS or composite IIS) that AFSD1/O1 forwarded to RCUFD1/O2, where such IIT2 comprises: (i) IIT2 information signed using EBICert2(U1/(AFSD1/O1))/(RCUFD1/O2)) and (ii) policy information specifying devices that are allowed to receive, carry, use and/or forward IIT2, where such policy information is signed by RCUFD2/O2 using EBICert2(U1/(AFSD1/O1))/(RCUFD1/O2)) and/or by an administrative O2 based EBICert.

In some embodiments, such IIT2 information signed using EBICert2(U1/(AFSD1/O1))/(RCUFD1/O2)) can comprise:

- CIIS1(U1/(AFSD1/O1))/(RCUFD1/O2), a CIIS of a fused-identity entity, U1/RCUFD1, where such CIIS1 comprises identification information identifying/characterizing RCUFD1/O2, U1, and AFSD1/O1. Such information can further include provenance identifying/characterizing information, such as AFSD1's and RCUFD1's respective manufacturer parties'/persons' respective attribute QtPs and/or EFs, and other manufacturing information (e.g., time/date, and location).
- IIT1 portion set (indicated by the dotted line in FIG. 18A) signed by (AFSD1/O1, #ManPer1), where ManPer1 is a CertPer who certified AFSD1's authenticity. Such IIT1 portion set includes:
  - a CIIS of a fused-identity entity comprising U1 and AFSD1/O1 arrangement, comprising near existential or existential quality at least in part biometrically based IIS information and other attribute information identifying/characterizing such fused-identity entity, such information comprising identifying/characterizing such device manufacturer (and/or other SVCC) party(ies)/person(s), attribute information identifying/characterizing such user (e.g., QtPs &/or EFs) and
  - antecedent generation of IIT1 E/A instance information, including generation of U1's near existential or existential quality at least in part biometrically based identification information, E/A instances for preparing IIT1 to be forwarded to RCUFD1, and/or the like.
- At least in part near existential or existential quality biometrically based identification information sets as, for example, CIIS biometrically identifying elements securely bound to AFSD1/O1 and RCUFD1/O2 and/or their device IIS information instances, which may in turn include at least biometrically based identification information sets for AFSD1/O1 and/or RCUFD1/O2 (SVCC) stakeholder sets including, for example, AFSD1's and/or RCUFD1's manufacturer, transit (e.g., shipper) and/or retailer personnel, owner, and/or user set.
- IIT2 antecedent event/activity instance information, where such information set describes event/activity instance (comprising instructions, processes, component resources, and/or results) RCUFD1/O2 performs (employing identified, for example, one or more EBInet compliant device arrangements and stakeholder persons) to receive IIT1 from AFSD1/O1. Such information set may include:
  - One or more information sets representing audit logs generated by AFSD1/O1, RCUFD1/O2, and/or an associated administrative/governance service one or more server arrangements, during the forwarding operation signed respectively by AFSD1/O1 and/or RCUFD1/O2 using their respective EBICerts. Such information sets may include a portion of AFSD1/O1 signed IIT1 portion set comprising a CIIS of IIT1 primary subject matter (e.g., U1/AFSD1) and antecedent REAI information comprising generation of IIT1, including generation of O1's CBEIIS, E/A instances for preparing IIT1 to be forwarded to RCUFD1/O2, and/or the like.
  - Antecedent REAI information comprising generation of IIT2, including RCUFD1 receiving IIT1 from AFSD1, where such receiving includes checking that IIT1 is signed by AFSD1 and/or other E/A instances (such as E/A instances of preparing IIT2 to be forwarded to RUD1).
- At least a portion of one or more policy information sets and other governance/specification rules, such as, policy information set that specifies requirements/conditions RCUFD1/O2 needs to comply with (and/or satisfy) to receive, carry, use and/or forward IITs, where such requirements include checking that RCUFD1 is allowed to receive from, and/or forward to, an EBInet device arrangement. In this example, one such policy information set may specify that such policy specify that RCUFD1 is allowed to receive from AFSD1 and forward to AFSD1, RUD1, RD3-home, RUD4-office, and RD5-socnet. In some embodiments, such policies and other rules may specify that forwarding and/or receiving operations must be performed using, for example, TLS encryption. Such policies may be examined by an independent evaluator (independent of a relevant activity, and, for example, where such evaluator is a utility cloud service) to evaluate the Quality to Purpose Trustworthiness value and/or rigor level value (as stipulated, by a security authority such as an EBInet arrangement governance authority) of an IIT such as IIT2, and/or one or more IITs derived from and/or may be derived from IIT2 carried by a device.
- In some embodiments, such policy information may be provided, and/or signed by, EBICert1(U1/(AFSD1/O1))/(RCUFD1/O2)) and/or an administrative O2 based EBICert.
- in some embodiments, such policies and other rules may specify that forwarding and/or receiving operations must be performed using, for example, TLS encryption. Such policies may be examined by an independent evaluator (independent of a relevant activity, and, for example, where such evaluator is a utility cloud service) to evaluate the Quality to Purpose Trustworthiness value and/or rigor level value (as stipulated, by a security authority such as an EBInet arrangement governance authority) of an IIT such as IIT2, and/or one or more IITs derived from and/or may be derived from IIT2 carried by a device.

IIT information acquisition, formulation, forwarding, and receiving processing for the event/activity set shown in FIG. 18A-18B proceed through the following non-limiting, example steps:

Step 1: AFSD1/O1, sensing U1's physical presence, acquires and processes U1's near existential or existential biometrically based data to: (i) rigorously identify U1 and U1's physical presence near AFSD1/O1; (ii) generate one or more nearly existential or existential quality, at least in part biometrically based IITs; and (iii) sign using one of (AFSD1/O1)'s EBICerts and forward generated IITs, such as IIT1, to RCUFD1/O2.

Each such IIT securely identifies U1, confirming U1's contemporaneous presence as determined by AFSD1/O1.

In some embodiments, AFSD1/O1 may sign such generated IIT using an EBICert that includes, for example, an AFSD1 manufacturer supplied secret and one or more manufacturer personnel and/or an AFSD1 acquirer nearly existential or existential biometrically based identification information instances (such secret may only be available to other device arrangements in the form, for example, of a unique corresponding public information instances).

Step 2: RCUFD1/O2 securely receives IIT1 forwarded by AFSD1. In order to perform such receiving operation, AFSD1/O1 and RCUFD1/O2 securely employ their respective EBICerts (such as EBICert1(AFSD1/O1) and EBICert2((U1/AFSD1/O1)/RCUFD1/O2) to mutually validate each other's identity. Once such validation is successful, in accordance with (AFSD1/O1)'s and (RCUFD1/O2)'s respective policy sets, RCUFD1/O2 securely receives IIT1 from AFSD1/O1, where IIT1 is in the form of an encrypted data set and/or employing a secure communications channel. As part of such secure communications, such IIT receiving event/activity may be securely, respectively associated with near existential or existential at least in part biometrically based identification information sets for AFSD1/O1 and RCUFD1/O2, e.g., through information set at least in part biometrically based signing (e.g., by using device a manufacturer's secret and manufacturer person(s)' and/or acquirer's biometrically based CIIS) of information communicated by forwarding device arrangements to receiving device arrangements.

AFSD1/O1 may use such identification information to validate that RCUFD1/O2 is allowed, in accordance with registered one or more policies, to receive IIT1 from AFSD1/O1 before forwarding IIT1. Similarly, RCUFD1/O2 may use such identification information to validate that AFSD1/O1 is permitted to acquire U1's biometric based identification information and to generate and forward IIT1 before receiving and/or using IIT1 as an IIT supplied by AFSD1/O1.

Step 3: RCUFD1/O2 generates IIT2 based on IIT1, where such generation includes event/activity instances in which: (i) RCUFD1/O2 securely receiving IIT1 from AFSD1/O1; (ii) RCUFD1/O2 signing a portion of IIT2 using EBICert2((U1/AFSD1/O1)/RCUFD1/O2) comprising CIIS information comprising, for example, an RCUFD1 manufacturer supplied secret and one or more manufacturer personnel and/or an RCUFD1 acquirer (e.g., purchaser) nearly existential or existential biometrically based identification information instances (such secret may only be available to other device arrangements in the form, for example, of a corresponding public information instances); and (iii) RCUFD1/O2 preparing IIT2 to be forwarded to other EBInet compliant device arrangements.

IIT2 contains and/or securely references:

An IIT2 portion set signed by RCUFD1/O2, where such portion set comprises:

CIIS of a fused-identity entity, (U1/(AFSD1/O1))/(RCUFD1/O2), where such CIIS can contain identification information characterizing U1, AFSD1, and RCUFD1, where such characterizing identification information includes: (i) attributes such as EFs, Creds, and/or the like characterizing U1, AFSD1, and RCUFD1; and (ii) identification information characterizing AFSD1's and RCFD1's respective manufacturer (and/or other SVCC) party(ies)/person(s), attribute information identifying/characterizing such user (e.g., QtPs &/or EFs).

An AFSD1/O1 signed IIT1 portion set (indicated by the dotted line in FIG. 18A) included in IIT2.

IIT2 creation event/activity information set that includes information comprising:

- IIT1 antecedent E/A information that is part of the AFSD1 signed IIT1 portion set indicated by the dotted line in FIG. 18A. Such antecedent REAI information set includes identification information regarding E/A instances for: (i) generating U1/AFSD1 one or more IITs, such as IIT1; (ii) preparing IIT1 to be forwarded to RCUFD1/O2; (iii) establishing a secure communication path between AFSD1/O1 and RCUFD1/O2; and/or (iv) the like.
- IIT2 antecedent E/A information, where such information can include:
  - a log of E/A instances for creating IIT2, where such creating IIT2 E/A instances include:
    - AFSD1 and RCUFD1 establishing a secure communication link between AFSD1 and RCUFD1 and determining that AFSD1's and RCUFD1's respective policy sets allow AFSD1 to forward and RCUFD1 to receive IIT1;
    - RCUFD1 receiving IIT1 from AFSD1,
    - validating that IIT1 is signed using an EBICert for U1/AFSD1;
    - registering IIT2; and
    - preparing IIT2 to be forwarded to RUD1; and
  - an RCUFD1 provenance manufacturing E/A IIS signed by ManPer4/RCUFD3 using such fused-identity entity's EBICert.
  - In some embodiments, such IIT2 antecedent E/A information comprising generation of IIT2 can include near existential or existential at least in part biometrically based Identification information one or more sets (e.g., manufacturer's and/or acquirer's) that are, for example, part of a composite IIT (e.g., CIIS) of RCUFD1, RCUFD1 contextually relevant Stakeholder sets' respective IISs (such as Stk2's CBEIIS), and/or the like. Such antecedent REAI information is securely associated with such event/activity instance of receiving IIT1 from AFSD1.

Policy information set for device arrangements that are allowed to receive, carry, use and/or forward an IIT based IIT2. Such policy information set may specify that an EBInet compliant device arrangement, Dev1, may forward, receive, use, and/or carry one or more portions of the information comprising IIT2 if Dev1 is a member of a registered and/or otherwise defined group (and may be securely identified as such a member). Policy statements in such policy information set are individually signed by such statements' respective policy authorities.

In some embodiments, an EBInet arrangement eligible device arrangement may be certified to perform operations at a specified security rigor level (or range of levels), where such device arrangement is:

- registered as a certified to perform one or more specified operations compliant device arrangement type,
- a device arrangement that is authorized by a person, party, for performing one or more such operations, and/or
- a device arrangement that can participate in an IIT exchange (e.g., when registered as a group member).

In some embodiments, one or more of such EBInet arrangement may be registered with an administrative, such as a cloud, service, to perform certified operations.

FIG. 18B continues to illustrate the example by showing a process set instance that can occur when RCUFD1/O2 forwards IIT2 to a fused-identity entity, RUD1/O3, where such process set instance can be treated as components of one or more event/activity instances with respective IIS(s), and/or may be represented by an identification information set as component information sets of REAIs). In this example illustrated by FIG. 18B, RCUFD1/O2 carries an IIT, IIT2, as described in the discussion of FIG. 18. RCUFD1/O2 forwards IIT2 to RUD1/O3, such as, for example, an SVCC intermodal container seal (e.g., an EBI-Seal) with a secure RUD modular component NIIPU and associated container locking mechanism) that controls the accessing, e.g., opening and closing of such container and associated auditing of content removal and addition. (Alternatively, for example, RUD1/O3 might be used to audit and/or at least in part control an EBInet arrangement compliant REAI related event/activity, such as using RUD1/O3 to govern the opening of an office's secure filing cabinet at U1's place of work.) In another example, RUD1/O3 might alternatively comprise an RCUFD that employs a modular component for carrying and governing one or more forwarded IIS instances, such modular component located in a smart watch, phone, and/or laptop. In the example illustrated by FIG. 18B, RUD1/O3, receiving IIT2 from RCUFD1/O2, can use IIT2 to create IIT3 comprising:

- An IIT3 portion set signed by RUD1/O3 using EBICert3 (RUD1/O3), where such portion set comprises:
  - CIIS for a fused-identity entity, RUD1/O3, RUD1 identification information & one or more persons' respective near existential &/or existential quality at least in part biometrically based identification information, where such CIIS comprises attribute information identifying/characterizing device arrangement & fused-identity person(s) (e.g., attribute QtPs and/or EFs), including biometric & other characterizing information regarding such device arrangement manufacturer party/person(s), & other manufacturing E/A attribute information (e.g., time/date &/or location)
  - A IIT2 portion set signed by RCUFD1 comprising:
    - CIIS of (U1/(AFSD1/O1))/(RCUFD1/O2)
    - A IIT1 portion set signed by AFSD1 comprising Stakeholder device user human person(s) (Stk1) CBEIIS and AFSD1 arrangement CIIS, comprising an IIT component
    - Antecedent REAI information comprising generation of IIT1, included as part of IIT3 creation E/A information
    - Antecedent REAI information comprising generation of IIT2, included as part of IIT3 creation E/A information.
  - Antecedent REAI information comprising IIT3 creation E/A information comprising
    - Antecedent REAL information comprising generation of IIT1,
    - Antecedent REAI information comprising generation of IIT2, and
    - Antecedent REAI information of RUD1/O3 receiving IIT2 from RCUFD1/O2, where such receiving includes checking that IIT2 is signed by RCUFD1/O2 and E/A instances for using IIT3.
  - Policy information set for devices allowed to receive, carry, use and/or forward an IIT based IIT3. Such policy information may specify that an EBInet compliant device arrangement, Dev1, may forward, receive, use, and/or carry one or more portions of the information comprising IIT3 if Dev1 is a member of a registered and/or otherwise defined group (and may be securely identified as such a member). Policy statements in such policy information set are individually signed by respective policy authorities.

The event/activity instance shown in FIG. 18B proceeds through the following steps (numbering is a continuation of FIG. 18A):

- Step 4: RUD1/O3 receives IIT2 from RCUFD1, where such receiving may, in some embodiments, be performed as a step of an event/activity instance comprising a secure communications process set involving intercommunication between RCUFD1/O2 and RUD1/O3. An IIS of such event/activity instance may include CIIS information (such as the CIISs and/or one or more portions of interacting EBInet device and/or service arrangements), and such E/A IIS may include and/or securely reference event/activity instance's participating fused-identity entity's biometrically based identification information set (e.g., CIISs of (U1/(AFSD1/O1))/(RCUFD1/O2) and/or CIISs of RUD1/O3).
- Step 5: RUD1/O3 creates IIT3 based on IIT2, where IIT3 includes desired one or more (e.g., all) portions of IIT2 (which includes one or more (e.g., all) portions of IIT1), and where one or more portions of IIT3 may be cryptographically signed by RUD1/O3 using EBICert3 (RUD1/O3). Such signature certifies that IIT3 was based on IIT2 and represents RUD1/O3. IIT3 may be subsequently employed (e.g., during event/activity instance(s)) and such employment may be audited to produce provenance information that is securely bound to IIT3 and/or RUD1/O3, and/or may be included as information element(s) in one or more subsequent IITs and/or other IISs.

In some embodiments, tokens (see FIG. 18A-18B), which have been employed as information components in subsequent tokens (such as incorporation of IIT1's information in IIT2 and IIT3), can be subsequently employed, e.g., analyzed and/or used, as may be consistent with policy and/or instruction, as representations of their respective corresponding original subject matters, such as IIT1 after formulation of IIT3 being used and/or analyzed as an IIT representing AFSD1/O1.

In some embodiments, creation of IIT3 includes IIT3 creation event/activity instance information, created by adding antecedent REAI information of RUD1/O3 receiving IIT2 from RCUFD1/O2 to at least a portion of antecedent REAI information comprising generation of IIT1 and antecedent REAI information comprising generation IIT2, where such antecedent REAI information of RUD1/O3 receiving IIT2 from RCUFD1/O2 includes checking that IIT2 is signed by RCUFD1/O2 and using IIT3 in event/activity instances (such as using IIT3 to authorize and/or govern event/activity instances).

Such IIT3 creation event/activity information may:

comprise, for example, one or more CIISs of IIT3 subject matter instances for use in respectively evaluating the quality and/or suitability of, and/or in auditing and/or governing, such subject matter instances.

include and/or securely reference portions of such forwarded secure communications event/activity instance's identification information sets, where such forwarded sets may respectively include historically antecedent one or more IISs germane to identifying and/or evaluating a current event/activity, in this example such secure communications. Such antecedent IISs may be included in a "current" token and/or such information may be securely referenced, and such information may be stored in a database arrangement so as to form a specified IIS upon demand. Each such antecedent identification information set may include stakeholder subject matter at least in part biometrically based near existential or existential identification information sets, such as such information as provided in an AFSD1/O1 IIT. Once IIT3's content has been created, RUD1/O3 signs one or more portions of IIT3 using EBICert3(RUD3/O3). Such signing can demonstrate that RUD1/O3 received IIT2 from RCUFD1/O2 and RUD1/O3 is directly certifying all portions of IIT3 not included in IIT2. In alternate embodiments, RUD1/O3 can communicate, for example, with a securely managed identification information service whereby RUD1/O3 confirms the suitability/integrity of (AFSD1/O1)'s IIT1 information that was incorporated in IIT2 and RUD1/O3 may, through interaction with such service, also evaluate other (other than AFSD1 and/or IIT1) IIS information antecedent to RCUFD1/O2 and/or one or more elements of IIT2, including, for example, using Creds and/or EFs associated with such IIS information elements to evaluate the integrity and/or other suitability of stakeholders of antecedent REAIs included in provenance information sets.

In some embodiments, the chain of forwarding-receiving devices may be determined through an examination of the nesting of the signatures. In the example illustrated by FIG. 18A-18B, an RUD1/O3 signed portion set of IIT3 includes an RCUFD1/O2 signed portion set of IIT2 which in turn can include an AFSD1/O1 signed portion set of IIT1. In some embodiments, such nesting of signed IIT portions may be taken to represent the sequence of devices that have been employed in an evolving chain of IITs, even in the case where provenance information is not added to an IIT. In such an embodiment, a receiving device may, for example, perform one or more of the following validation steps on receiving an IIT from a forwarding fused-identity entity, where such steps include securely checking (locally (e.g., device internally) and/or with an organization and/or cloud administrative service arrangement) that:

such forwarding device is the same as the device that performed the outermost signature of such token.

each of the signatures is cryptographically valid.

each of the nested signatures associated with an IIT's nested one or more tokens represent a pairing/grouping of an applicable EBInet device and near existentially or existentially biometrically identified one or more relevant device stakeholders, where such device/stakeholder grouping is registered to allow, and/or satisfies one or more policies for, carrying and/or forwarding such nested token (and therefore trusted to correctly (authoritatively, authentically) sign such token).

all policies were employed to govern such sequence of carrying devices as inferred from the sequence of nested signatures.

If such checks pass, such receiving device may sign such IIT, carry it, and/or use one or more portions of it, for example, in event/activity instance governance and/or to provision further provenance, and/or token (IIT) and/or other IIS instances.

5.3 FIG. 19A-19B

In some embodiments, an EBInet device arrangement may, receiving a token containing a signed token portion set, which may, or may not, be nested, create a new token based on the received token in accordance with the arrangement's policy set, where such created token may securely reference the received token's one or more signed portions but does not include them as part of the newly created token. FIG. 19A-19B illustrates a non-limiting example that is very similar to the example illustrated by FIG. 18A-18B. Both examples have the same EBInet device arrangements, where whenever a device arrangement receives an IIT, the device arrangement creates a new token based on the received token in accordance with the device arrangement's policy set. The main difference between two examples is in the formulation such new IITs. In the example illustrated by FIG. 19A-19B, policy statements specify that receiving fused-identity entities must create new IITs that include one or more situationally relevant signed portions of respective received IITs, whereas in the example illustrated by FIG. 19A-19B, policy statements specify that fused-identity entities must create new IITs that securely reference one or more situationally relevant portions of respective received IITs but do not include them.

U1, AFSD1/O1, RCUFD1/O2, and RUD1/O3 in the example illustrated by FIG. 19A-19B are the same as U1, AFSD1/O1, RCUFD1/O2, and RUD1/O3 in the example illustrated by FIGS. 18A-18B. Moreover, steps 1 and 2 are also the same. In step 1, AFSD1/O1, like the example illustrated by FIG. 18A, securely acquires biometric and other identification information and generates an IIT, IIT1, where IIT1 has operatively equivalent identification information content as IIT1 in the example illustrated by FIG. 18A-18B, including a portion set signed by AFSD1/O1. AFSD1/O1 then securely forwards IIT1 to RCUFD1/O2. In Step 2, RCUFD1/O2 securely receives IIT1.

The differences between these two examples start at step 3, where:

in step 3 of the example illustrated by FIG. 19A-19B, RCUFD1/O2 creates an IIT, IIT2, that securely references IIT1 portion set signed by AFSD1/O1 but does not include it as part of IIT2, in accordance with (RCUFD1/O2)'s policy set. Instead, RCUFD1/O2 creates an IIT, IIT2, comprising:

A IIT2 portion set signed by RCUFD1/O2 in part using EBICert2(U1/(AFSD1/O1))/RCUFD1/O2)), where such portion set: (i) securely references the IIT1 portion set signed by AFSD1/O1; and (ii) specifies that RCUFD1/O2 is carrying IIT1. Such IIT2 portion set comprises:

CIIS of a fused-identity entity, (U1/(AFSD1/O1))/(RCUFD1/O2), such CIIS comprising identification information identifying/characterizing U1, AFSD1/O1, and RCUFD1/O2, including attribute information (such as QtPs and/or EFs) identifying/ characterizing such composite device/person(s) arrangement. Such information further includes provenance identifying/characterizing information, such as, for example, (AFSD1/O1)'s and (RCUFD1/O2)'s respective manufacturer parties'/persons' respective QtPs and/or EFs, and other manufacturing relevant, attribute information (e.g., time/date, and location). where IIT1 includes IIT2 creation E/A provenance information, comprising antecedent REAI information comprising E/A instance information, where E/A instances include:

E/A1: generation of IIT2, including RCUFD1 receiving IIT1 from AFSD1, where such receiving includes checking that IIT1 is signed by AFSD1

E/A2: secure association (such as cryptographically binding) IIT1 and IIT2 and forwarding of IIT1 and IIT2 individually, and/or collectively as a composite information set, to RUD1.

Policy information for devices allowed to receive, carry, use and/or forward an IIT (such as IIT3), based on IIT1 and IIT2.

In the example illustrated by FIG. 18A-18B, IIT2 included one or more relevant IIT1 portions signed by AFSD1, whereas in this example, IIT2 securely references such one or more relevant IIT1 portions but does not include them. In this example, RCUFD1/O2 forwards both IIT1 and IIT2 to RUD1/O3.

In step 4, RUD1/O3 receives IIT1 and IIT2, either individually and/or collectively from RCUFD1/O2.

In step 5, RUD1/O3 forms an IIT IIT3 comprising: (i) an assertion stating that RUD1/O3 is using IIT1 to govern E/A instances, based on (U1/AFSD1) CIISs included in IIT1; (ii) CIIS of RUD1/O3; and (iii) securely references signed IIT1 portion set and signed IIT2 portion set. IIT3 comprises:

A IIT3 portion set signed by RUD1/O3 in part using CIIS1((U1/(AFSD1/O1))/(RCUFD1/O2)), where such portion set: (i) securely references the IIT1 portion set signed by AFSD1; (ii) specifies that RUD1 is carrying IIT1; and (iii) comprises:

CIIS comprising CIIS of ((U1/(AFSD1/O1))/(RCUFD1/O2)) and CIIS of RUD1/O3 comprising an IIT component comprising attribute information identifying/characterizing such composite device/person(s) arrangement, such information comprising identifying/characterizing such device manufacturer (and/or other SVCC) party(ies)/person(s), attribute information identifying/characterizing such user.

RUD1 provenance information comprising antecedent REAI information comprising E/A instance information regarding generation of IIT3, including RUD1/O3 receiving IIT1 and IIT2 either individually and/or collectively from RCUFD1/O2, where such receiving includes checking that IIT1 is signed by AFSD1/O1.

Policy information for device arrangements allowed to receive, generate, carry, use and/or forward an IIT based on IIT1, IIT2, and IIT3, where such device arrangements may include: AFSD1, RCUFD1, RUD1, RUD2, and RUD3.

5.4 FIG. 20

FIG. 20 shows an example non-limiting illustrative embodiment of EBInet devices that store token provenance information sets in the cloud and/or local cloud and employ such provenance information sets in the enforcement of policy and/or the evaluation of information set related REAIs. FIG. 20 illustrates such provenance storage and policy enforcement through example event/activity instances involving the acquisition of an at least in part existentially based biometric identification information set (e.g., a CBEIIS) by AFSD1, the generation of an IIT, Tok1, at least in part based on such acquired biometrically based identification information set, the forwarding of such Tok1 by AFSD1, and receiving of Tok1 by RCUFD1. FIG. 20 shows the following devices, services, and information instances:

AFSD1/O1, an AFSD1, owned by an O-Per, O1. AFSD1/O1, sensing U1's presence, acquires an existential biometrically based identification data and process such data to generate an IIT, IIT1, for U1/AFSD1. AFSD1/O1 then forwards it to RCUFD1/O2.

RCUFD1/O2, an RCUFD carried and used by U1, who may be the same person as O2. In this example, RCUFD1/O2 receives IIT1 from AFSD1/O1.

TIIRS1, A trusted identification information registration service arrangement that enables parties to register, evaluate/validate, publish, store, and/or the like, identification related information, such as:

at least in part biometrically based near existential or existential identification information sets for REAIs, policies specifying allowed behaviors of event/activity instances, provenance information sets, and/or the like.

TIIRS1, in this example, manages the following information sets:

CIIS1(AFSD1/O1, #ManPer1): a CIIS of a fused-identity entity, AFSD1/O1, comprising: (i) near existential and/or existential quality, at least in part biometrically based identification information sets for O1 and ManPer1, respectively, where O1 is an O-Per of AFSD1, and ManPer1 is AFSD1's manufacturing human agent; and (ii) AFSD1's IIS. CIIS1 (AFSD1/O1) includes or securely references one or more policy sets for AFSD1/O1 and RCUFD1/O2, where such policy sets may include a combined policy set for the pairing of such device arrangements). In this description, when there is no possibility of confusion, CIIS1(AFSD1/O1) may be used as a shorthand for CIIS1(AFSD1/O1, #ManPer1).

CIIS1(RCUFD1/O2, #ManPer2): a CIIS of a fused-identity entity, RCUFD1/O2, comprising: (i) near existential and/or existential quality, at least in part biometrically based identification information sets for O2 and ManPer2, where O2 is an O-Per of RCUFD1 and ManPer2 is RCUFD1's manufacturing human agent; and (ii) RCUFD1's IIS. CIIS1 (RCFUD1/O2, ManPer2) includes or securely references one or more policy sets for AFSD1/O1 and RCUFD1/O2, where such policy sets may include a combined policy set for the pairing of such device arrangements), where such policy sets may specify, for example, conditions under which IITs and/or other IISs may be transferred between AFSD1/O1 to RCUFD1/O2. In this description, when there is no possibility of confusion, CIIS1(RCUFD1/O2) may be used as a shorthand for CIIS1(RCUFD1/O2, #ManPer2).

As a result of the event/activity set illustrated in FIG. 20, the following information sets are stored and maintained by TIIRS1:

Prov1 info EBIBlock identification information set regarding E/A1, an event/activity instance in which AFSD1/O1 creates IIT1. Such information can include and/or securely reference E/A1 related identification information, such as (i) a log of AFSD1/O1 acquiring U1's near existential or existential quality at least in part biometrically based IIS, (ii) a log of AFSD1/O1 generating Prov1 info EBIBlock, (iii) CIIS1(AFSD1/O1, #ManPer1), and/or (iv) the like.

Having Prov1 info securely forwarded to TIIRS1 enables independent parties, evaluating IIT1's suitability to their respective purposes, to validate AFSD1/O1, IIT1 creator, where such validation can include examining attributes AFSD1/O1 (such as one or more Creds and/or EFs).

Prov2 info EBIBlock identification information set regarding E/A2, an event/activity instance in which AFSD1/O1 forwards IIT1 to RCUFD1/O2. Such information can include and/or securely reference E/A2 related identification information, such as: (i) a log of AFSD1/O1 securely establishing a secure communication path with RCUFD1/O2 and forwarding IIT1 to RCUFD1/O2, (ii) a log of AFSD1/O1 generating Prov2 info EBIBlock, (iii) CIIS1(AFSD1/O1, #ManPer1) (representing the initiating device of the forwarding E/A2), and CIIS1(RCUFD1/O2, #ManPer2) (representing the target device and securely associated person of such E/A2), and/or (iv) the like.

Prov3 info EBIBlock identification information set regarding E/A3, an event/activity instance in which RCUFD1/O2 securely receives IIT1 from AFSD1/O1. Such identification information set can include and/or securely reference E/A3 related identification information, such as: (i) a log of RCUFD1/O2 securely receiving IIT1, (ii) a log of RCUFD1/O2 generating Prov3 info EBIBlock; (iii) CIIS1(AFSD1/O1, #ManPer1) (representing the AFSD arrangement that sent IIT1 to RCUFD1/O2) and CIIS1(RCUFD1/O2, #ManPer2) (representing the device that received IIT1 and generated Prov3 info EBIBlock), and/or (iv) the like.

Prov4 info EBIBlock identification information set regarding E/A instance associated with IIT1 subsequent to RCUFD1/O2 receiving IIT1 from AFSD1/O1. Such identification information can include and/or securely reference logs of one or more event/activity processing associated with IIT1. Such logs can describe subject matter instances such as generating alerts involving vulnerabilities to IIT1), updating policy sets concerning IIT1, and/or the like. In this example, Prov4 info EBIBlock identification information includes and/or securely references Prov3 info EBIBlock identification information (representing events that occurred prior to IIT1 being received by and carried by RCUFD1/O1) and is included in and/or securely referenced by an event/activity for RCUFD1/O2 comprising CIIS1 (RCUFD1/O2, #ManPer2)

FIG. 20 proceeds with the following steps:

Step 1: AFSD1/O1 acquires U1's contemporaneous existential biometric information and uses such biometric information to generate an IIT, IIT1, in accordance with policy.

Step 2: AFSD1/O1 and TIIRS1 establish a secure communication link by exchanging their respective EBICerts, where an EBICert may be an identification information IIT that has private/public key pair. AFSD1/O1 forwards EBICert1(AFSD1/O1) to TIIRS1, and TIIRS1 forwards EBICert1(TIIRS1/O3) to AFSD1/O1. AFSD1/O1 and TIIRS1 validate received EBICerts. If the validation is successful and if their respective policies and/or combined policy permits the establishment of such secure communication link, then AFSD1/O1 and TIIRS1 establish a secure communication link.

Step 3: AFSD1/O1 generates E/A1 information set for step 1 event/activity instance (Prov1 info EBIBlock) and registers it with TIIRS1.

Step 4: AFSD1/O1 and RCUFD1/O2 establish a secure communication link by having: (i) RCUFD1/O2 send EBICert1(RCUFD1/O2) to AFSD1/O1 and (ii) AFSD1/O1 send EBICert1(AFSD1/O1) to RCUFD1/O2. AFSD1/O1 and RCUFD1/O2 validate received EBICerts.

If the validation is successful and if their respective policies and/or combined policy permits the establishment of such secure communication link, then AFSD1/O1 and RCUFD1/O2 establish a secure communication link.

Step 5: AFSD1/O1 and RCUFD1/O2 check their respective policies and/or combined policy to determine if AFSD1/O1 can forward IIT1 to RCUFD1/O2 and RCUFD1/O2 can receive IIT1 from AFSD1/O1.

Steps 6a: RCUFD1/O2 performs E/A3 processes, such as securely receiving IIT1 from AFSD1.

Step 6b: U1/(RCUFD1/O2) and TIIRS1 establish a secure communication link as a result of exchanging and validating their respective EBICerts.

Step 6c: U1/(RCUFD1/O2) generates E/A3 identification information & registers it with TIIRS1 as Prov3 info EBIBlock.

Step 7: U1/(RCUFD1/O2), while carrying IIT1, may generate further E/A info sets. U1/(RCUFD1/O2), registers one or more such E/A identification information with TIIRS1 as respective Prov info EBIBlock identification information sets.

6 Biometric Identification Information: Sensitive Information, Privacy, and Anonymity In some embodiments, specifically identifying resource and/or event/activity instances' one or more associated persons (such as instance stakeholders) can be fundamentally important in ensuring desirable computer usage outcomes/consequences. EBInet arrangements can provide, for example, as issued by a cloud service EBInet implementation authority, and/or as otherwise algorithmically produced by an EBInet platform arrangement, unique to each person at least in part nearly existential and/or existential quality biometrically based identification information sets that can be used as rigorously unique, at least in part biometrically person identifying, information instance labels that may include, for example, persons' respective numeric identifier instances. Such instances may be only or primarily associated (system internally and/or from the standpoint of system users) with non-specifically identifying social, societal, and/or commercial person attributes where such attributes may be, or may be selectively, securely stored and/or processed as user, and/or user organization/group, private information, and/or all, or selectively, such non-specifically identifying attribute identification information may be maintained as non-private.

In some embodiments, from a privacy standpoint, there are circumstances when biometrically identified individuals want to retain as confidential, that is, protect and sensibly not disclose, certain specific person identifying information. For example, a person may not want to, prematurely in a social network context, reveal certain sensitive personal information, and/or not make available, certain, or all, of their personally identifying and/or otherwise descriptive information, such as specific to person social, societal, commercial, and/or other sensitive identification information attribute instances. To support such information availability, and ensure that users are appropriately informed about stakeholders and/or other REAI associated persons, EBInet systems may employ REAI IISs where respective REAIs' associated persons' societally unique and/or otherwise sensitive identification information instances may not be exposed and such persons are not respectively "real-world" societally identified by, or from, their biometrically based information and associated descriptive attributes, and where generalized, non-specific real-world identifying attributes are employed to inform regarding such individuals' respective trustworthiness, reliability, expertise, quality to purpose, and/or the like (e.g., anonymously identified person H3562AN3 is a college graduate, has a law degree, is a baseball little league coach, and is a licensed pilot).

In some embodiments, EBInet systems may provide generalized, non-real-world identifying attributes by, at least in part, employing approximation abstractions that are, for example, non-individually resource device arrangement and/or such device arrangement stakeholder, specifically identifying, but provide approximate, characterizing information that expresses, for example, standardized and interoperably interpretable PERCos cred quality to purpose (e.g., value in fulfilling a user purpose) and/or effective fact (for example, an EF providing both a statement that a person is an employee who works at a certain corporation, along with a secure test validation method) information sets. Such informative resource stakeholder characterizing attributes, as approximately but not specifically person identifying information instances, are, in some embodiments, selected and/or managed so as not to be specific person identifying in a manner that may be commercially, and/or irresponsibly, exploited so as to harm or otherwise be in conflict with the interests of an associated, characterized person. Such approximation information can inform regarding the suitability of a resource associated stakeholder, without providing information specifically identifying such an individual.

In some EBInet embodiments, such attributes can be entirely, or primarily, associated with, or otherwise comprise, purpose related approximation abstractions that denote an identified person as a member of a type or class, e.g., of trustworthy individuals, where such trustworthiness may be expressed as a rating for humans, for example, 8 out of 10 (ascending trustworthiness scale, and, for example, sufficiently trustworthy for a certain specified trustworthiness rigor level class or other specification). Such approximation abstractions can be at least in part expressed in the form of standardized and interoperably interpretable quality expressions for general purposes (e.g., trustworthiness), or for specific purposes (e.g., trustworthiness of one or more programmers, and/or software provider human agents, related to using his/her/their provided software program). Such approximation attributes may be securely associated with, and/or included within, at least in part nearly existential and/or existential biometrically based identification information in a manner that is authenticable as to an individual person but can't, or is maintained as very difficult to, be used to uniquely identify such an individual, either directly as an information element or in combination with other information elements. In some embodiments, a person class might involve being an executive employee of IBM or a professor at MIT and expressed in the form of a securely testable, effective fact. Such approximation abstraction attributes can comprise, for example, at least in part standardized and interoperably interpretable quantized trustworthiness ratings, such as a given identifier being associated with a quality to purpose rating of 7 out of 10 (which may be stated as "quality of trustworthiness, 7 out of 10"). Such attributes may express one or more rights held by an at least in part biometrically identified individual, where such attributes indicate respective qualities of usefulness, rights to access or use (e.g., a product, service, and/or the like), and/or other indications of appropriateness of a specific human for a specified event/activity instance, type/category, or in general, but where such attribute information is not associated with certain, or any, sensitive, non-biometrically, individually (other than biometrically based) identifying human person specific, attributes.

In some embodiments, biometrically based individually identifying information may be provided in "abstracted" one or more forms, where such identifying information forms are associated with factual (which may be testable/verifiable) and/or reputational attributes that together at least in part form identification information sets. Such anonymous, characterizing information sets, if properly formulated as information aggregates, are designed not to be used to specifically identify persons but can be used to respectively characterize such persons, each in a highly reliable and informative manner. Such anonymized person corresponding information sets can, for example, comprise IISs that are uniquely identifying tokens (e.g., IITs), such as may be used in forming EBICert certificates. Such EBInet identifying tokens can be securely associated with, such as be securely bound to and/or otherwise include, PERCos and/or the like person characterizing one or more attributes, such as standardized and interoperably interpretable quality to purpose and/or testable effective fact information sets (serving as suitability and/or other usefulness/appropriateness informing attributes). Such secure association (e.g., secure binding) may be performed within a biometric identification acquiring AFSD, other AFD, RUS, and/or an RCD and/or any other EBInet device arrangement and/or network administrative node enabled for such binding processes, where device arrangements and/or network administrative service arrangements can securely store and/or receive from a secure store such attribute information for binding with acquired biometrically based identification information to, for example, create at least in part encrypted identification tokens (e.g., IITs, for example EBICerts), that are uniquely person at least in part biometrically identifying but not "real world" societally identifying.

FIG. 3 is a non-limiting example of a tamper and inspection resistant acquiring and forwarding station device at least for acquiring near existential, or existential quality, biometric identification information sets of human individuals for contemporaneous use.

In some embodiments, EBInet systems can conceal, not acquire, and/or not determine, "real-world" specific person identifying information that is or would be combined with biometric pattern information and/or other biometrically acquired information, and/or non-biometric attributes, for example persons' respective names, addresses, specific physical locations, Social Security numbers, organization ID designations, and/or other non-biometric attribute, specific person identifying information. In some such embodiments, non-biometrically identifying, for example class attribute, information sets are designed/selected so as not to comprise sets that individually, and/or combinatorically, provide sufficient information to specifically identify respective individuals. In some embodiments, specific person identifying information (one or more components of identification information sets) can be commercially, personally, and/or societally, under some circumstances, unfairly, otherwise inappropriately, and/or irresponsibly, exploited and/or otherwise potentially used in a manner not congruent with a user's intent. To ensure operation consistent with user interests, EBInet and/or PERCos and/or the like arrangements' person specific non-biometric identifying information instances can be, or are, at least in part securely, cryptographically protected, and, for example, concealed within, and/or not directly included in (but securely associated with), corresponding identification information sets stored on respective EBInet device and/or service arrangements. Such non-biometric identifying information (e.g., societally identifying information components, individually and/or in combination) can be maintained as concealed (hidden) using, that is, selectively governed in accordance with, rules/controls specifications (regarding such information components exposure, and generally and/or where such rules/controls may be specifically applied to content type and/or person instance, class, and/or other grouping). In some embodiments, such governance can manage information instance exposure with respect to (e.g., in contextual response to), for example, instances' respective REAI auditing, evaluating, selecting, and/or using, such exposure based on one or more parties' and/or systems' respective rights and/or other contextual, specified control information. Such identification information sets may be stored in the form of cryptographically protected watermarks/fingerprints that are embedded in tangibly rendered (e.g., printed pages) and/or intangible electronic content objects, where at least a portion of such information may be released in accordance with such governance.

In some embodiments, EBInet identification information attributes can respectively indicate/stipulate the suitability of respective REAIs using purpose specified suitability informing information sets such as Creds and EFs. Such information sets' real-world anonymous, or conditionally real-world anonymous, identification information can enable, at least in part, user evaluation of REAI associated persons, such as resources' and/or events'/activities' respective stakeholders (such as participants, creators, publishers, modifiers, providers, and/or the like) where such stakeholders respectively have sufficiently high trustworthiness and/or otherwise have one or more specified qualities (e.g., to respective purposes). Such qualities may, for example, be expressed as relevant attributes stipulated as facts, and/or suitability assertions, as may be required and/or desired for respective user purposes (for example, as a requirement for a trustworthiness quality of 8 out of 10 specified as a standardized quality to purpose that uses, for example, a contextual purpose expression). Such one or more ratings and/or factual stipulations may be associated with a person or party who is identified anonymously, that is, in a uniquely, specifically identifying manner (e.g., no real world specifically identifying naming information of such person or party) in accordance with EBInet capabilities described herein. In some embodiments, purpose associated (e.g., where purpose is expressed as a PERCos contextual purpose expression) at least in part biometrically based, suitability informing identification information may, for example, be carried by RCUFD (or other RCFD) EBInet device arrangements within their stored EBInet contemporaneous identification information sets (CBEIISs, CIISs and/or the like).

In some embodiments, one or more such identification information sets carried by an RCFD arrangement (e.g., an owner and/or user, and device, arrangement composite IIS) may have different content broadcast to other RD arrangements that may comprise/constitute different classes and/or otherwise identified groups or instances of EBInet RD and/or RUS and/or associated fused device/person identity arrangements (that have different respective IISs). Such arrangements, for example, may be registered as securely associated with such RCFD and/or one or more of such RCFD's stakeholders/users. Such broadcasting of one or more portions of IIS and/or related, such as characterizing, information may be based on, e.g., governed by, securely stored inter-device, service, and/or inter-person, communication and/or information usage policies. Such implementations may, in some embodiments, support conditional anonymity wherein certain groups and/or individual persons and/or device arrangements may, based on policy/specification, be authorized to receive (e.g., selectively as to specific identification one or more elements) identification information sets and/or portions that characterize a person, and/or device and/or service arrangement (e.g., characterized by their forwarded IISs), but do not societally identify such a person and/or device and/or service arrangement, while other device and/or person arrangements (e.g., groupings) may be treated as trusted, and/or otherwise authorized, to receive a full or broader and more informative set of available societally identifying, non-anonymous REAI characterizing identification information.

In some embodiments, EBInet systems may provide securely managed, cryptographically protected identity tokens (IITs) that securely contain and/or reference both at least in part biometrically based person's identification information and at least a portion of such person's associated non-specifically real-world identifying attributes. Such, for example, PERCos Repute, attributes can provide competence, motive and/or other at least in part suitability informing information sets that characterize such person and, by association, can characterize one or more of such person's associated REAIs. Such suitability and/or other usefulness/appropriateness identifying attributes can be invaluable in determining whether REAI set instances (and/or their associated device and/or service arrangements, and/or associated or subject matter persons) are suitable for respective users' use as resources, and/or for user participation in, and/or other association with, events/activities. Such suitability and/or other usefulness attributes can inform REAI users/participants regarding instance appropriateness to user objectives without compromising the anonymity of (e.g., without specifically, societally identifying) associated persons, such as stakeholders, users, and/or participants. Given the generalized, person characterizing nature of many of, for example, such quality to purpose attributes (for example, a person is trustworthy, or trustworthy for a certain purpose) and many testable effective fact attributes (e.g., a person is a licensed physician or electrician, or has a Ph.D. in physics, or is a professor of sociology at a top 100 university), such attributes, if properly employed, will not individually identify, or materially contribute to individually identifying, specific persons so long as the aggregate of attributes (in a given transaction set or aggregated or otherwise accumulated and/or projected over time) does not include, in its totality, sufficient information to determine an individual's name or address or other societally specifically identifying information.

In some embodiments, EBInet systems may securely bind EBInet near-existential or existential quality contemporaneously acquired at least in part biometrically based and conditionally anonymous identities with respective attribute information sets to inform persons and/or persons' computing arrangements regarding opportunities to interact with, use, and/or further evaluate, other one or more persons and/or their respective associated REAIs. With social networking, for example, such secure binding provides enhanced/expanded electronic networking opportunities by enabling secure and reliably managed suitability evaluation/exploration pinging/hailing based upon identity attribute(s). For example, electronic hailing can enhance a process set regarding determining whether anyone who receives the hailing using an EBInet RCFD arrangement has person identification information attribute(s) that satisfy one or more broadcasted identity variables (such broadcasting may occur, locally (e.g., using Bluetooth) and/or across a communications network (e.g., cellular or WiFi)). Such broadcasting can communicate that a broadcaster seeks someone with such attributes, e.g., someone who professionally plays a certain type of music, such as jazz, and/or a type of instrument, such as piano, and/or belongs to a certain affinity group (e.g., ACLU or NRA), for example, as demonstrated by one or more effective facts. Such effective facts may be augmented by cred quality to purpose assertions. Such hailing/pinging can initiate a process set that determines whether such a person, for example, is available for, and/or interested in, interaction (e.g., whether such person is physically available or will become physically available, and/or is interested in network based electronic interaction).

In some embodiments, one or more portions of EBInet anonymous at least in part biometrically based identification information one or more sets can, for example, when securely stored within one or more EBInet modular component arrangement embedded within a smartphone, smartwatch, and/or other smart device arrangement, be at least in part broadcasted and/or otherwise be communicated as such a smart device arrangement's one or more, for example, conditionally available, owner identification information sets (e.g., a contextually appropriate child/purpose securely associated IIS). For example, a person may carry an EBInet device arrangement that broadcasts and/or otherwise communicates certain non-specifically real-world identifying information regarding such person, as the person moves through their day. Such a smart device arrangement may broadcast one or more signals (e.g., expressing "I am here and have certain attributes") as an instance, periodically, continually, and/or based on one or more event conditions, where such broadcast (and/or other communication) may comprise at least in part societally anonymous one or more identification information sets, where such sets may have associated and/or included contextual purpose expressions regarding user intention(s). Such a device arrangement may communicate in response to a query, such as broadcasted from another EBInet RCUFD arrangement, of "who are you" or "is anyone there" or "is anyone there with attributes X and Y", and may respond with, for example, "I have attributes X and Y", or may respond with a differing or entirely different set of attributes, such as "I have attributes X and R, "are you interested in interacting (digitally or in person) or do you have attribute N and/or M?".

In some embodiments, EBInet arrangement hailing/pinging can also be directed to one or more persons through the use of their respective EBInet compliant device arrangements, where directionality of signal emission may be at least in part electronically controlled and/or contextually characterized (e.g., describing and/or inquiring regarding a location, one or more persons, and/or one or more characteristics, within a room and/or building complex and/or a neighborhood, such as "person at the last table on the north end of the room against the wall" or "person wearing the red sneakers and blue shirt" or "are you John Smith who is a reporter for the San Francisco Chronicle?"). Some embodiments may support directionality through a pointing arrangement (e.g., within a line of sight location) where a broadcast signal can be directed to a location by, for example, pointing an RCUFD parent smartphone's "top" towards an individual or group of persons and/or providing an RCFD with verbal description of positional information (e.g., the second table on the left of RCFD's device front) which such device arrangement interprets and uses to direct its signal energy directionality/output.

In some embodiments, an EBInet compliant receiving device arrangement (receiving such a broadcasted ping or hail) can operate with a range of filters, such that, for example, a parent smartphone arrangement would only ring and/or otherwise notify its user/person carrier if certain filter type one or more conditions were satisfied, such as an identity and/or purpose request/inquiry coming from, and/or received only by, registered, certified professional jazz musicians or physical therapists, as for example established by one or more IIS's verifiable one or more (securely testable) effective facts and/or attested to by quality to purpose creds. A receiving device can, in response to a ping or hail, query for further information from the initial sending device arrangement and/or person, such as query as to one or more characterizing further pieces of information (e.g., meta data) regarding the sender and/or sender's device arrangement, such as requesting more specific information and/or new one or more categories of effective fact and/or cred assertion and/or societally specifically identifying, information. Such an initial sending arrangement may then further query such receiver in a comparable manner. Such an interaction between sending and receiving device arrangements may employ, at least in part, artificial intelligence tools to assist in qualitative framing and/or analysis of requests and/or opportunities, such A1 tools employing machine learning and/or large, cloud service and/or device based knowledge bases. Such smart, such as A1 automated, interviewing regarding candidate parties and/or their associated device arrangements, for example using CIIS subject matter characterizing information designed for EBInet social networking support, can be performed as inter-device background interaction processes, hidden from (if desired), or at least not intruding upon, participating device arrangement users until, if and when, one or more candidate parties respectively elect to directly participate in such interaction process sets and/or such candidate parties respective attributes match certain meeting conditions (e.g., one or more variables have been satisfied).

In some embodiments, such a pinging and/or hailing arrangement communication platform can be augmented with free text and/or standardized text and/or visual communication elements (e.g., emojis and/or emoji like textual and/or vocal expressions), where user arrangements of such platform can integrate into the communication stream voice, music, video, image, and/or textual directed and/or device arrangement/user stored communication elements that can range from simple query and/or personal expression elements, to phrases, concepts, contexts, and/or the like informing communication portions and/or compositions. For example, interactions between societally anonymous communicating users/device arrangements may include voice communication and/or other communication elements that give the evaluating device arrangement and/or user persons an opportunity to "hear" or "see" the other person in at least a limited context, using the information conveyed, for example, by image and/or vocalization and/or other contextual information, to assist in establishing, and/or developing upon, an interaction between a pinger/hailer and one or more responders.

In some embodiments, an EBInet broadcasting/communicating device arrangement can, if received identification information satisfies policy/specifications and/or an applicable user's discretion/determination, provide further, conditionally anonymous at least in part biometrically based (including, for example, authenticated/validated) identification information that comprises, at least in part, communicated one or more facts (e.g., effective facts) and/or assertions regarding such user (may be an applicable EBInet device owner). Such facts might include, for example, describing such user as being an employee or member of a given organization, holding/having earned a Ph.D. in social or hard sciences in a given field, having a given professional accreditation, and/or, for example, where such person is also a professor or researcher at a registered, accredited, and/or otherwise formally recognized institution such as an accredited college or university or at an established research institution or major corporation. Such information can further or alternatively include, for example, a user's age or age range, height or height range, weight or weight range, and/or that the person is or an amateur or professional athlete as "recognized" by a formal organization such as the NFL, NCAA, AAU, and/or other entities, a type of amateur and/or professional athletic activity, and/or other securely validatable effective facts and/or characterizing assertions. Such asserted traits and/or effective fact attributes can provide highly informing one or more attributes indicating the suitability of one or more types of possible person interactions. Such informing information can, for example, include collective characterization of one or more interests, accomplishments, professional information (e.g., job type/position, income, employer (particularly, for example, if a large organization)), hobbies and/or associated hobby (and/or other affinity group) memberships, health (e.g., medical status and/or type of medical condition, information), and/or other descriptive aspects of a person's life, and/or the like. Such informing attributes may comprise a combination of facts that can be validated (such as effective facts) and/or other characterizations/assertions (such as Creds) that are not subject to fact validation methods but represent assertions of and/or about, for example, respective persons whose unique but societally anonymous, identity can be established with at least in part near existential or existential quality (and which, in some embodiments or instances, can be highly reliable because, for example, of the assertions' respective providers', for example, effective fact established professional expertise (e.g., a full professor of American history at University of Maryland)). Attributes of such uniquely, but societally anonymously identified parties can, at least in part, comprise EF stipulations and/or Cred assertions provided by societally identified and/or societally anonymous other persons.

In some embodiments, EBInet device arrangements and/or their users may respectively perform steps to respond to received non-specifically identifying identification information sets, such responses respectively comprising, for example, texting and/or voice communication and/or other signaling, to respectively arrange for further interaction(s) if identification information of other one or more parties is determined to be suitable for respective parties' given interaction types. Such signaling between users using their respective EBInet compliant smart devices (e.g., mobile phones with respective RCUFDs) can allow such users to physically, if desired by such parties, move into closer proximity of each other through using device plural party approach instructions/signaling (for example, may be operatively similar to GPS destination driving instructions), such as viewing a map and/or a diagram to identify an explicit location, and/or giving written and/or audio/verbal instructions such as "walk straight ahead fifty steps (and/or the phone may instruct "walk ahead" and then "turn left and enter the coffee shop"), turn left in the shop, go ten steps to the proximate one or more tables (or to a specific table as marked by a locator signal, and/or providing other locating information such as describing one or more persons wearing one or more certain colored and/or type of clothing and/or having (and/or displaying) a certain set of other, visually perceptible characteristics, and/or the like) and where such directing may be, in some embodiments, at least in part managed through use of a situationally adaptive artificial intelligence arrangement. Such directions may include/provide one or more drawings respectively representing, for example, meeting halls/rooms, restaurant dining rooms, and/or apartment buildings, other housing, parks, zoos, stadiums/arenas, and/or office complex layouts, business facilities (e.g., office and/or manufacturing/warehouse arrangements) and/or the like, displayed using map, picture, and/or video arrangements (where, for example, such a picture and/or video arrangement can provide an unfolding flow and/or sequence of images moving in response to user and/or machine-based instructions). For example, an EBInet carried device arrangement, in some embodiments, could provide an unfolding set of images (e.g., 2 dimensional video and/or 3 dimensional virtual enhanced reality) based on the direction a person is heading and an intended destination for person-to-person interaction resulting from a signaling/hailing event/activity set.

In some embodiments, other EBInet compliant device arrangements may recognize a person's broadcast and/or other communication, and, for example, in response to an interaction instigating process set, recognize the sharing of one or more attributes. Such attributes may comprise, for example, one or more common memberships in organizations, ancestry shared persons, traits and/or languages, shared types of degrees and/or degree subjects, common political and/or other issue associations and/or interests (e.g., hobbies, politics, concerns, music and/or other entertainment enjoyed). Broadcast and/or other communication receiving EBInet compliant device arrangements (e.g., RCFDs) can communicate a broadcasting/communicating person/EBInet device arrangement's non-specifically real-world identifying information that provides respective person/device arrangements' policy, and/or user, satisfying informing attribute information. Such receiving device's broadcasted/communicated information can characterize such device arrangement's associated owner, user, and/or other stakeholder (employer, affinity organization, and/or the like).

In some embodiments, RCUFDs (or other EBInet device and/or service arrangements) may respond to social and/or commercial networking broadcasting, polling, pinging, hailing, and/or other querying/soliciting (herein such list may be, for example, identified by either the shorthand "polling, pinging, and/or hailing" or, as may be appropriate in context, the shorthand "broadcasting"), where such actions are performed by one or more other EBInet device and/or service arrangements such as by RUSs, RUDs and/or other RDs (including, for example, RCFDs). Such polling, pinging, and/or hailing, for example, can request the forwarding (e.g., provisioning) of available other, for example, RCFD arrangements' (and/or other EBInet device arrangements') respective at least in part biometrically based, but real-world societally anonymous, IISs, where such sets are compliant with respective receiving RD one or more securely stored and enforced policy sets and/or request sets. In such implementations, forwarding societally anonymous identity, identification information sets can be responsive to one or more requesting EBInet device arrangement (such as stakeholder expressed) purposes and/or condition sets. Such EBInet device arrangements can respectively securely receive (e.g., mutually receive/exchange), for example, EBInet contemporaneous at least in part biometrically based IISs carried by EBInet device arrangements. For example, an RCFD embedded in a smartphone or smartwatch may notify (e.g., poll) other device arrangements regarding its (or a different) physical location by broadcast use of local Wi-Fi, cellular, Bluetooth, and/or the like. Such notification may ask if any RCFD(s) is (are) within range, and further ask for a response based at least in part on whether such device owner(s) and/or user(s) possess certain one or more characterizing attributes that respectively satisfy policy requirements, where such attributes may be non-specifically identifying of the device, and/or device arrangement owner and/or user.

In some embodiments, such non-societally, non-specifically (e.g., uniquely) identifying but person characterizing one or more attributes may comprise person respective one or more organization (such as professional and/or union) memberships, specific employers and/or employment position certifications, professional and/or talent certifications, languages, ages, heights, weights, education degrees and/or collegiate major and/or minor fields, awards, competition results, religious preferences and/or practices, ethnicities, sexual practices or orientations, country or other locale of origin, athletic accomplishments (e.g., certifications such as certified as a judo brown belt), dietary preferences, avocations, disabilities, diseases, numeric age and/or ages of one or more of persons' respective children and/or other family factual and/or assertion information, and/or the like. For example, non-specifically identifying attributes may include whether a person is an organization (such as an IBM) employee, a member of the ACLU, NRA, IEEE, ACM, UAW, and/or the like, and/or is, or was, a student at a specific institution or type/category of college/university/ other educational facility. In some embodiments, characterizing attributes may include, for example any combination of PERCos effective facts, quality to purpose creds, and/or any other asserted attributes/qualities (may be at least in part standardized and inter-operably interpretable), such as non-specific person identifying information (unless a participating person and/or device arrangement elects to shed their anonymity, e.g., disclose personally, specifically identifying information when they believe it is contextually appropriate). In some embodiments, RCFD receiving arrangements-such receiving arrangements within range of broadcasting EBInet device arrangements—that respectively receive such broadcasts and have one or more, e.g., all, of the requested or required attributes (as specified/required by polling, or reciprocally identifying, EBInet arrangements) can respectively respond with conditionally or fully anonymized person non-specifically identifying, identification information attribute sets, as may in accordance with such responding device arrangements' respective policy sets and/or as instructed by such device arrangements' respective users.

In some embodiments, such specific person real-world anonymous EBInet compliant identification information exchanging device arrangements and/or their respective owners and/or users, may after a preliminary exchange, and as respective owners and/or users and/or their respective device arrangements determine appropriate, initiate direct communication of location information; initiate direct voice, texting, video meeting/teleconferencing, and/or emailing device owner/user interactions; and/or disclose (e.g., exchange) further identification information (such as may be requested or required), while for example, maintaining real-world anonymity.

In some embodiments, EBInet supports establishing system wide, per each human, at least in part biometrically based one or more unique identifiers. Such identifiers may take the form of societally anonymous information sets that employ specific to a human, uniquely identifying abstract tags (e.g., alpha-numeric labels) for REAI stakeholders/ owners, users, participants, and/or other instance associated parties, where such tag identifiers are respectively at least one of:

1. securely included in and/or associated with (e.g., securely bound to) class and/or such other group identification one or more attributes, where, for example, a specific such human is an identified person who has a bachelor's degree in physics (e.g., a degree in physics from MIT) and/or is professor of physics at an accredited US university and/or is a member of the ACLU and/or NRA (the foregoing, for example, in the form of PERCos securely verifiable/testable one or more effective facts),
2. not associated with social, societal, and/or commercial, private and/or otherwise sensitive and/or specifically identifying (and/or in combination specifically identifying) attributes (e.g., passport number, specific corporate ID identifier, state/city/street address), telephone number, web address, and
3. selectively associated with conditionally available, securely maintained and managed, one or more sensitive/private social, societal, and/or commercial, identification attributes, where such attributes are respectively maintained and managed as conditionally private (accessible only under specific, allowed conditions) information instances.

In some embodiments, such abstract identifying instances may, respectively, for example depending on specification(s), be only, selectively, or primarily associated with non-specifically identifying social, societal, and/or commercial attributes. Such attributes may be (e.g., managed contextually based on specification requirements) securely stored, processed, and maintained (such as within a NIIPU protected processing environment), and used, as user, user organization, and/or other user group, conditionally private information.

In some embodiments, an EBInet system could maintain, generally and/or selectively (e.g., as may be specified by a subject user), the privacy of such socially, societally, and/or commercially sensitive information attributes of respective parties using very highly secure system hardware and software designs (e.g., using EBInet modular component (e.g., NIIPU), and/or secure server, arrangements), so as to support highly controlled, selective information access only under very carefully managed circumstances. Such person specifically identifying information may be, at least in part, securely maintained in, and/or otherwise securely employ, HSM (Hardware Security Module) and/or crypto anchor, (and/or other highly secure data storage) arrangements, for example where HSM arrangements protect such information (for example, when stored within an EBInet device and/or RUS server arrangement) using hardened, isolated, at least in part database encryption, decryption, and in some embodiments, HSM internal secure storage, arrangements.

In some embodiments, anonymity may be maintained in a contextual, frictionless (user transparent) manner, where, for example, whistleblowers and/or other parties reasonably (or otherwise) concerned regarding disclosure of their respective identities can maintain conditional or complete anonymity through, for example, their use of respective organization, and/or their personally specified, conditional or full, anonymity policy sets, where such policy managed respective information sets are comprised, at least in part of abstract tag identifiers and their associated non-specifically identifying one or more attributes. Such policy sets can govern the availability of identification information attribute types that can be securely managed, i.e., obtained and/or disclosed, where such policy sets may specify attribute information that must be concealed, or is conditionally and/or selectively revealed or otherwise made available.

In some embodiments, such EBInet arrangements enable the proffering of social and/or commercial networking interaction opportunities among real (not spoofed/virtual), nearly existentially or existentially biometrically, though anonymously, identified parties who are (or may be) mutual strangers. Facts, for example, regarding such respective individuals, in combination, for example with such respective individuals' self-descriptions and/or other party descriptions of (e.g., assertions regarding, such as Creds on, or effective facts characterizing) such individuals, can provide informing information for parties to securely evaluate and decide to, or decline to, or seek further information to determine whether to, interact opportunistically (e.g., engage in conversation) in mutual physical and/or electronic venues, such as at a coffee shop or using an internet social media video arrangement. Such deciding can, for example, be based upon the content of such provided information, including, for example, existentially reliable non-specific to persons' respective real-world (e.g., non-societally locating) near existential or existential quality biometrically based identification information instances that are securely, cryptographically bound to such persons' one or more suitability informing respective factual attributes, where the foregoing embodiments operate in compliance with associated platform and/or respective such persons' and/or participating EBInet device arrangements' interaction policies. For example, smart device arrangements carrying EBInet contemporaneous identification information in their respective secure modular component (and/or the like) arrangements (e.g., in NIIPU arrangements), can broadcast "I am XYZ" conditionally anonymous identification information that can, or will, be available only to parties satisfying one or more (e.g., all) specified conditions (e.g., information items), where such broadcasted information satisfies policy information requirements of one or more other parties' EBInet device arrangements. Such policy information can, at least in part, specify one or more conditions regarding, for example, required respective testable/authenticatable, securely maintained repute (e.g., cred assertion and/or effective fact) elements, where such elements are required in evaluating and/or determining polling, pinging, and/or hailing related activity participation suitability.

In some embodiments, an RCFD carried identification information set may, in the form of one or more of its available child IIS purpose associated "templates," provide abstracted, person characteristic, anonymized as to specific person, identification information, where one or more portions of such information may be augmented and/or replaced, upon instruction of such anonymized person, with non-anonymous such person's "real world" specifically identifying information. For example, if such person (and/or such person's EBInet device arrangement and/or other compliant system) is satisfied that releasing one or more instances of such person's real-world attribute information is suitable when (e.g., during) directly relating to another person on the internet (e.g., social networking and/or in-person interactions), such identified person can determine that it is appropriate to more specifically identify himself/herself and instruct that such information be revealed/communicated.

In some embodiments, organizations can specify what persons and/or person groups are associated with their respective anonymity policy sets and associated information templates. Such anonymity policy sets may, for example, differently specify rules and controls based on respective types of purposes for computing sessions (e.g., event/activity associated types/classes of purposes such as social networking interacting with strangers, or interacting with one's workplace employee secure research document database). EBInet anonymous resource and/or event/activity instances can be operated in CPFF (contextual purpose firewall framework) secure and isolated computing sessions, where the specified purposes and related policies of respective such CPFF's sessions support or otherwise enable a participating person's conditional or full anonymity (e.g., through session specified, user associated, and/or organization respective, purposeful computing related policy and/or directly stipulated instructions) for use of, and/or participating in, one or more REAIs. Such CPFF implementations provide respective purposeful, isolated, secure computing sessions, each of which can support anonymization for at least one applicable session participating stakeholder and/or stakeholder identified class/grouping type.

In some such embodiments, person specific suitability to computing purposes can be understood, evaluated, expressed, and/or otherwise communicated, through the use of suitability informing attributes. In some EBInet embodiments, such attributes are securely bound to, and/or otherwise associated with, at least in part near existential or existential quality (e.g., unique to respective persons') biometrically based one or more specific persons' identification information that are anonymous from a societally identifying perspective. For example, such identification information's instances may comprise respective EBInet RCFD carried, at least in part biometrically based CBEIISs and/or CIISs, where the foregoing may respectively comprise partially or fully societally anonymized IITs. Such information sets can securely include one or more purpose specifications (such as PERCos contextual purpose expressions), and one or more user purpose informing, contextually applicable attributes regarding first or second order subject matters (e.g., REAIs as direct, first order subject matters, and/or such first order instances' respective stakeholder information sets employed as second order subject matter information, where a second order attribute comprises an attribute of an attribute (e.g., an attribute of a stakeholder) of its first order subject matter. For example, if a subject matter is a document, a document's stakeholder/author can be treated as an attribute of the document, and an effective fact regarding the stakeholder/author can constitute a second order attribute of the document, since it is an attribute of such a document's attribute, the stakeholder/author)). Such first and second order subject matters' attribute information sets may comprise PERCos quality to purpose expressions and/or effective facts, and/or other interoperably interpretable suitability informing information sets. Such information sets' stakeholder identification information can comprise at least in part anonymous (or conditionally anonymous) as to real world specific person, identifying attributes. Such at least in part biometrically based identity, purpose, and attribute information sets can be securely associated, for example, with respective REAIs, and can be respectively associated with, for example, stakeholder persons based on such persons' respective class membership attributes, and they can be provided to RUD device and/or RUS arrangements for user, device, and/or service arrangement REAI evaluation purposes. For example, such identification information set associated attributes can indicate qualities of usefulness and/or otherwise the suitability of specific humans for respective specific user and/or user organization specified (and/or otherwise desired) purposes.

Some embodiments of EBInet support anonymization of human stakeholder relationship with an EBInet compliant device. In such embodiments, one or more identification information sets or portions thereof, for example, identification information carried by respective RCFDs, do not include, or if included, do not forward, human owner and/or user specifically and/or societally identifying naming/identification information that persistently and specifically identifies a device arrangement's owner and/or user through use of one or more attributes that are unique to such owner and/or user person. Such use of EBInet anonymization implementations provides information that is not, and/or is conditionally not, resolvable to a human's societally identifying information, including, for example, one or more addresses, telephone numbers, given names, social security numbers, person's biometric and/or biometrically based information, and/or the like specific person identifier and/or person identification attribute combinations.

In some embodiments, owner, user, device, and/or service EBInet arrangement identification information may be generated/provided as a one-way representative information set (e.g., a unique alphanumeric ID that can't be reverse engineered) that changes with the occurrence of an event (event driven) or periodically, such as once each day in the morning, employing at least in part biometrically based identification information bound to non-specifically identifying owner and/or user one or more non-biometric characteristics in the form, for example, of testable facts and/or assertions, so as, for example, to produce an EBInet arrangement composite identification information set that is non-specifically identifying of a specific person or family unit. One-way identity representation may involve securely creating, for example, a non-specifically identifying unique "anchor ID" as a core information element of one or more contemporaneous at least in part biometrically based composite identification information sets. Such anchor ID can be securely bound to one or more associated, but not explicitly identifying, attributes of a person (e.g., abstract tags in the form of person characterizing information) and such an anchor ID can be modified/replaced as policy and/or circumstances require and anchor ID information can be used in the generation of such a one-way representative information set.

In some embodiments, EBInet systems can support switchable/selectable user and/or EBInet arrangement identification information set mode parameter requirements. For example, in a first mode an EBInet arrangement (e.g., an RCFD) user can, for example, as a default condition, require a contemporaneously acquired (e.g., acquired within the last twelve-hour period) at least in part near-existential or existential quality biometrically based identification information set as a resource's certifying, and/or subject matter component identifying, identification information set, e.g., requiring the providing, along with a received email, the email's securely associated/bound CIIS. Alternatively, in the absence of such a required default IIs, in a second mode a user's EBInet arrangement may require a societally non-specific person and/or location identifying anonymous IIS when receiving or using specified REAI related one or more instances, such as requiring certain basic information regarding social networking session participant attributes. Such a societally anonymous IIS can provide, for example, effective fact one or more attributes regarding a participant's professional occupation and/or age, sex, and/or political affiliation information (e.g., organization membership). In a third mode, for example in the absence of satisfying modes one and two, if a user receives a resource, such as a document, where the resource's creator and/or provider declines/declined to provide an at least in part near existential or existential quality, biometrically based identification information set (for example, failed to provide an acceptable societally identifying or societally anonymous IIS), then such a resource, such as a document or computer program, may, in accordance with specification one or more requirements, be provisioned into a receiving user's CPFF or other isolated minimalist (e.g., to purpose) secure operating session, such as a session based on a capability arrangement (such as the CHERI capability architecture) and/or a session that employs a virtual machine or other sandbox isolation arrangement. In some embodiments, the second mode, depending on EBInet arrangement default and/or other specified operating one or more conditions (e.g., number and/or specific one or more types of specified IIS EF and/or Cred attributes) may operate automatically in such a described isolated operating environment if the IIS disclosed identification information fails to meet security/trustworthiness specified one or more requirements.

In some embodiments, alternative, for example, default IIS modes supports both sender and receiver flexibility and user specific control where, due to provenance or current participant/stakeholder considerations/concerns, less well known, or unfamiliar, resources/participants can operate in security enforcing, but less efficient, computer operating environments that employ isolation and/or other operating component minimalist, tamper and inspection resistant designs, where resource providers and/or event/activity participants have the option to not associate their at least in part biometrically based, societally identifying, identification information with their resource stakeholder and/or event/activity participation instances, subject to their respectively accepting and/or otherwise understanding the use of additional other security requirements. Selecting and managing such multiple IIS type requirement modes can be performed by EBInet compliant secure, tamper and inspection resistant modular component arrangements, such as NIIPUs, RIIPUs, IFs, and/or AMs. Such switchable identification information modes may be enforced in accordance with EBInet device and/or service and/or platform wide policy specifications, enabling, as might be required by some users and/or systems, flexible and contextually configurable use of, and management in the event of absence of, nearly existential or existential quality, biometrically based identification information.

In some embodiments, attributes, such as effective facts characterizing an AFD's owner and/or user, and/or such AFD device, can be stored on such an AFD (e.g., within a RIIPU) and/or stored on a network administrative arrangement, with stipulated effective facts validated by checking/validating with fact stipulation respective root (e.g., source) of fact authority sources and/or using updated (e.g., maintained as currently valid facts) administrative fact checking arrangement information bases, e.g., using, PERCos effective fact, fact testing techniques. Such checking may involve rechecking facts once every day, week, month, month set, year, and/or the like, and where an AFD's information verification source may be at least in part the referenced AFD fact (and/or quality to purpose assertion) one or more originating sources.

Such AFD stored facts may be validated using testing methods involving their respective "root" sources that stipulate such facts, such as using one or more secure test methods to check that such a fact is stipulated on a "root" source stipulator's webpage and/or interrogating a stipulator's database arrangement to identify/evaluate a stipulator's declared fact.

In some embodiments, EBInet arrangements' respective identification information sets may be validated by cryptographic signing. For example, an EBInet device arrangement may forward cryptographically signed information sets to an RD arrangement, where such sets may respectively be signed using, at least in part, at least a portion of an AFD arrangement's EBICert, CIIS, and/or signed by an EBInet arrangement platform identification information service (e.g., cloud service) using such a service's EBICert. Such signing can employ a device arrangement root identification information set (e.g., identification information for its manufacturer and/or manufacturer personnel) using, for example, a manufacturing process (e.g., a fused-identity device and ManPer) CIIS EBICert, and/or such information set may be signed by a CIIS EBICert of a network and/or other administrative service. Such manufacturing and/or administrative service signing can validate the authenticity and other germane identity attributes of such an AFD arrangement, and such AFD arrangement can further provide its own signing of a nearly existential or existential quality at least in part biometrically based identification information set, such as an AFD producing and cryptographically signing, for example, a contemporaneous at least in part biometrically based, anonymous as to a specific user's identity, IIS.

In some embodiments, a forwarded to RD arrangement contemporaneous identification information set can comprise an AFSD's identification information and such AFSD's user's at least in part nearly existential or existential quality biometrically based information, where such information combination may comprise one or more CIISs, for example, one or more device manufacturer and/or other SVCC arrangement produced IISs. Such a forwarded IIS can provide/comprise multiple signed respective component identification information sets (e.g., of an owner user and/or non-owner user(s), of the EBInet device arrangement, and/or of an administrative governing party (e.g., employer, device owner (including, for example, represented by an owner's agent)), and/or other organization. Such signings can be provided by respective, situationally applicable EBInet device arrangement one or more services and may employ one or more signing associated stakeholder biometrically based, nearly existential and/or existential quality identification information sets (and/or one or more portions thereof). With the foregoing signing, applicable one or more parties (e.g., owners and/or users, platform authorities, and/or device and/or service arrangements), using their associated certificates, such as EBICerts, can respectively sign one or more portions (or all) of an IIS (including portions of multiple IIS sets) and plural of such signings may be provided for any such signed portions and portions may be differently signed using different certificates (e.g., EBICerts) representing different entities. Such signings may employ biometrically based stakeholder information, such as biometric pattern information, and may be securely bound to any such corresponding IIS and/or may be used in the generation of such signings.

In some embodiments, an EBInet and/or PERCos arrangement, for example, a CPFF (e.g., a PERCos contextual purpose firewall framework secure, isolated, processing and storage instance, can, in conjunction with other capabilities described herein, ameliorate or eliminate risks associated with stakeholder and/or other person REAI related anonymity. A CPFF arrangement can allow or require computing sessions employing component objects and/or processes that have unknown provenance to be executed in secure spaces that won't, or are highly unlikely to, infect the CPFF's broader computing arrangement with viruses and/or otherwise cause undesirable consequences. Such risks include consequences resulting from user, and/or user computing arrangement, inadequate awareness of REAI respective stakeholders' and/or other associated persons' (and/or organizations'/groups') respective trustworthiness, competence, motives, and/or the like attributes. In some embodiments, for computing security purposes, an EBInet arrangement can recognize, for example, an RCFD carried at least in part biometrically based anonymous identification information set. When recognized, such a recognizing EBInet arrangement may, for example, based upon policy information, automatically initiate an isolated, secure computing CPFF session. Such a session can employ or otherwise involve (e.g., subject to securely enforced, e.g., NIIPU governed, policies and/or direct user interface provided instructions) one or more REAIs having associated one or more anonymous stakeholders identified by one or more at least in part biometrically based identification information sets, securely identifying, for example, a resource instance publisher, author, and/or provider person. Such an identification information set can further include, for example, a hash securely identifying such a person's associated resource content instance, such hash for securely authenticating such content instance. In some such sessions, one or more of such REAIs are associated with one or more stakeholder parties (e.g., persons and/or organizations) who are societally anonymous and one or more who aren't societally anonymous, where such one or more REAIs', and associated one or more anonymous and non-anonymous stakeholders', identification information can together comprise securely provided CIISs.

EBInet, biometrically based identification cyber security management relies, in part, on the fact that most cyberattacks and cyber identity misappropriations are introduced by parties remotely located from an attacked computing arrangement (e.g., initiated from a distant location such as a foreign country). As a result, there are very limited benefits to simultaneous acquisition of a user's biometric identification information for cyber security and associated remotely sourced identity fraud prevention. By contrast, there are far greater benefits in performance, cost, and usability, to be realized from existentially reliable biometric identification information acquisition that is made contemporaneously available for, for example, user social and/or commercial networking, supply and/or value chain auditing and governance, and computer security risk management/suppression, such as for cyber security and identity fraud applications.

EBInet embodiments can defend against cyber-attacks by ensuring that remotely located stakeholder persons personally, and biometrically in a nearly or wholly existentially reliable manner, certify (e.g., using EBICerts) and/or otherwise sign and/or securely associate with REAI IISs and/or such instances' subject matters (e.g., their content, if such content is in the form of data). Such subject matter content and securely associated identification information sets may be co-packaged and both signed to establish signing persons' biometrically, near existentially or existentially, demonstrated presence, where such presence association validates such identification information sets and/or subject matter instances. In some embodiments, such signing information may be securely bound to (a) secure time (e.g., as provided by secure clocks in EBInet arrangements such as respective EBInet RCFDs' NIIPUs), and/or (b) securely identified location information (a person can only be existentially present at one specific location at one specific time set) using, for example, one or more locator and/or related secure time monitoring/recognition techniques as elsewhere described herein.

In some embodiments, by performing at least in part biometrically based identification information set based certifying and/or otherwise signing, stakeholders can make representations regarding the appropriateness (e.g., in context) to/for a potential user regarding using, and/or participating in, an REAI set. Such representations may in an explicit (or implicit) manner convey that signed respective REAI sets are reliable, trustworthy, and/or have certain one or more relevant to user purpose related attributes, such as instance related, for example specified, stakeholder and/or user rights and/or other attributes. The foregoing signing can enable rights management, for example, due to the assessment of such a stakeholder signer's subject matter instance rights to access a secure website, or retrieve and/or open an encrypted document, or enter a secured room or operate a home appliance or use an object (but, for example, only a specified number of times and/or at a specified cost, such as a cost per use instance). Such signing provides users with important evaluation information regarding the suitability and/or other conditions of use of such respective REAIs, and users can, and/or their computing arrangements can, make usage and/or participation decisions based upon the suitability implications of one or more attributes associated with such stakeholder persons' signing.

In some embodiments, resource and/or event/activity one or more instances' suitability for involvement in a given user's computing one or more events/activities can be evaluated, at least in part, based upon "responsible" (e.g., certifying) one or more human such signing parties' respective reputation, and/or other germane, one or more attributes. Any such REAI set may be considered unsuitable for a given user's computing one or more events/activities if such instance set's one or more at least in part biometrically identified stakeholders are not parties who should be involved directly (e.g., participating in a social or commercial networking/communication activity set) and/or indirectly (e.g., through such user's use of associated cryptographically signed one or more resources) in such given user's associated one or more computing events/activities. EBInet enables inappropriate stakeholder signing persons and/or their associated resources (and/or their computing processes, such as communication process instances) to be identified and rejected and/or otherwise managed based on their stakeholder associated one or more (e.g., quality to purpose and/or effective fact) attributes that inform regarding REAIs' suitability to respective user purposes.

In some embodiments, EBInet contemporaneous, at least in part biometrically based identification information provides considerable computer security improvement at low cost and with few, and in many contexts no, disadvantages and some important advantages over conventional, distributed device at least in part biometrically based identification approaches. Further, EBInet arrangements can, in some embodiments, augment their contemporaneous near-existential to existential quality at least in part biometrically based identification information through use of one or more native to parent device arrangements' respective biometric acquisition sensor or sensor/biometric data analysis arrangements (sensor information may be, for example, analyzed within a mobile device's native processing arrangement, and/or within an RCUFD's secure isolated RIIPU). Such use of a parent device's sensor or sensor/data analysis arrangement can provide a second biometric information set acquired within a specified timing window (for example, specified to be performed within a time period that is related to an EBInet AFD arrangement biometric acquisition process set (that is, may be performed before, operatively simultaneous with, and/or shortly after)).

In some embodiments, an EBInet identification information, such as EBICert, signing of an REAI, as well as such a second factor biometric acquisition set process set, may be initiated through use of a trusted path arrangement with a parent device biometric acquisition feature set that can be employed operatively simultaneous to such signing. Such trusted path feature sets can be employed to demonstrate that biometrically based identification information signings are performed as users' respectively intended actions, and as a result, for example, botnets impersonating users' respective intents can be identified and filtered out and/or securely contained.

In some embodiments, EBInet arrangement implementations can greatly mitigate or eliminate most opportunistic computing REAI set identity related misrepresentations, e.g., such implementations can minimize or eliminate REAI stakeholder and/or subject matter identity spoofing that result from (at least in part) (a) the physical theft and control of biometrically based identification information carrying, and contemporaneously forwarding and/or using, device arrangements, and/or (b) malicious communication components (software and/or other information sets) that produce an environment that supports/creates malicious botnets, for example where such environment results at least in part from a device arrangement security compromise such as a zero day attack.

In some embodiments, trusted path sets may respectively comprise secure, isolated trusted path device arrangements that are at least one of (a) at least in part embedded in one or more smart device arrangements, and (b) implemented as a trusted path dedicated device arrangement. Such smart device and/or dedicated trusted path device arrangements can comprise highly mobile arrangements (separate (e.g., dedicated trust path) component and/or embedded arrangements) which can be used to convey, and/or confirm, EBInet arrangement user instructions. Such devices can comprise, respectively and for example, wrist bracelets, pins, and/or belt clipped, user worn devices, and/or other highly mobile arrangements, for example, a smart device (such as a smartphone) with surface buttons, switches, sensitive pressure areas, microphones, video cameras, and/or other known instruction receiving and responsive one or more control arrangements. Such control arrangement buttons and/or other control one or more arrangements can, for example, respond to operatively simultaneous user instruction to perform a function type (e.g., initiate an activity), where such type may include instructing the trusted path arrangement to communicate "publish email", and/or to publish (e.g., send) email subtypes (subtypes such as "publish confidential email", "publish commercially sensitive email", and/or other organization email types).

In some embodiments, such button and/or other one or more instruction control instances (e.g., performing a visually monitored gesture motion such as positioning a hand "over" a video sensor activated control arrangement where such positioning causes an instruction event) can initiate respective identification information sets', and/or such sets' subject matters', respective EBInet publishing activities. For example, such an activity can include producing cryptographically protected emails that respectively and securely bind, and/or can be combined with, at least a portion of at least in part contemporaneous nearly existential or existential quality biometrically based identification information sets' respective subject matter email instances. As with emails, one or more buttons of such button sets and/or the like control arrangements can, when selectively activated, securely publish at least in part biometrically based identification information sets and/or as applicable their respective securely associated subject matter documents, software program instances, webpages, videos, electronic device arrangement interfaces, human curriculum vitae and/or other human specific attribute information sets (e.g., cred quality to purposes and/or effective facts), and/or the like descriptive information sets.

Such publishing may, for example, associate one or more types (e.g., categories) and/or subtypes comprising instructions for characterizing/managing identification information sets and/or such information sets' associated subject matters.

In some embodiments, for example, an email containing US military secrets may be specified through use of such a trusted path arrangement that implements the email as a secret government information set. Similarly, an email containing a corporation's sensitive intellectual property document can be specified and published by selecting a trusted path arrangement's corresponding instruction button, such selecting causing the publishing of such document and its associated IIS as a sensitive, securely bound, protected subject matter and IIS information arrangement, and/or the like. Such different types of information set instructions may be associated with the activating of trusted path "type" respective control instances, such instances activated by pressing of one or more buttons (and/or other comparable instruction initiating elements), and where, if plural, such pressing may in different button pressing orders activate different event/activity instance types in accordance with securely managed (e.g., managed by a NIIPU arrangement) trusted path policy information, and/or the like. Such use of a type and/or subtype trusted path (way) instruction activation button arrangement, and/or the like, can enable easy selection from a broad choice of subject matter types and/or subtypes, and/or associated activity authorizations. Such a trusted path arrangement can be used to publish at least in part secure and EBInet compliant, REAI at least in part near existential or existential quality, biometrically based IISs. For example, with such a trusted path arrangement, "press button A" can initiate the publishing of a personal email, and "press shift button and button A" can initiate the publishing of a commercial and/or other workplace email (e.g., sensitive (e.g., a confidential) organization email). Such trusted path button and/or other one or more control instances can enhance computer security by helping ensure that a given event/activity was intentionally initiated by a stakeholder and such stakeholder's device arrangement, in an EBInet arrangement compliant (i.e., authenticating) manner, including, for example, initiating an RCFD's publishing of an EBICert signed IIS and/or subject matter, and/or initiating any other policy/specification governed process (i.e., event/activity) set. Such a trusted path arrangement can help ensure that an initiating instruction wasn't performed by malicious computer code, such as a botnet arrangement that has sufficiently misappropriated a user's computing arrangement so as to, despite one or more applied levels of tamper-resistance measures, acquired a contemporaneous existential (and/or operatively simultaneous) at least in part biometrically based identification information set.

EBInet compliant at least in part biometrically based identification information sets can be securely associated with their respective tangible subject matters. Such identification information sets support secure referencing, interfacing with, evaluating, discovering, and/or governing (e.g., activating, authorizing, and/or otherwise controlling), tangible resources (e.g., at least in part tangible resources that comprise identification information sets' respective subject matters). Such identification information may include, for example, tangible item access addresses, interface software, and/or, for humans, personal identifying information, such as respective drivers' license numbers and pictures, social security numbers, telephone numbers, names and addresses, email addresses, web addresses, organization unique identifiers, and/or the like information. One or more portions of respective such identification information instances may be associated with, and/or may include, corresponding tangible items' embedded identifying information. Such embedded information may comprise one or more of a tangible item's manufacturer's secret(s) (e.g., securely stored, cryptographically protected secret information, and/or one or more SVCC parties', such as a manufacturer's, one or more human agents' (e.g., organization workers') at least in part near existential or existential quality biometrically based EBInet compliant identifying information). In some embodiments, a tangible instance may comprise a human participant where such human has an embedded chip set identification information arrangement (e.g., an arrangement for carrying personal identification information, including attribute information such as medical condition and/or medical record/status, authorized medications, and/or the like, the foregoing at least in part stored on, for example, a hardened, secure NIIPU modular component chip arrangement). Such an embedded chip set arrangement may respectively support tamper and inspection resistant RFID device arrangements and/or comprise uniquely identified hardware tamper and inspection resistant EBInet modular component arrangements (such as comprising crypto anchor, Awareness Manager, Identity Firewall, HSM, NNP, NIIPU, RIIPU, and/or the like, one or more component arrangements).

In some EBInet embodiments, involvement of computing items (resources) in computing events/activities can be determined based on at least in part standardized and interoperably interpretable reputation and/or other relevant, such as effective fact and/or quality to purpose, attribute information, and/or can be determined at least in part based on the absence of, and/or absence of the specification of, specific attribute information (as may be specified as required, desired, and/or as otherwise decided). Such determination can also be based on second order information, such as based on attribute information concerning a stakeholder, where the stakeholder is a resource attribute of an REAI (i.e., a subject matter) and the stakeholder has one or more germane attributes, such as a testable, validatable effective fact (such as employed as a professor at MIT) and/or Cred quality to purpose (e.g., a rating of 9 out of 10 in repairing plumbing problems). If stakeholder parties' respective attributes indicate or establish an REAI's (e.g., resource's) stakeholder party as unsuitable for one or more computing activities, and/or unsuitable in general, then such party, and/or the party's associated one or more REAIs, may be identifiable as unsuitable in a highly efficient manner and at low or no burden to computing users. EBInet embodiments can provide a highly user-friendly and effective, human reputation and motive-based framework for determining whether respective computing items are untrustworthy for a given usage context and/or otherwise deficient or unsuitable for a user's one or more relevant computing activities such as deficient or unsuitable for such a user's one or more computing usage purposes.

In some EBInet embodiments, at least a portion of an owner's and/or user's RD's (receiving device's) identification information and/or associated one or more internal and/or external (e.g., platform) services can, for example, be cancelled/deleted or suspended if such an owner's and/or user's identification information:

(a) wasn't renewed/refreshed or otherwise replaced through an EBInet compliant biometric identification information acquisition and/or receiving process, for example in compliance with renewal or other replacement one or more specifications, (b) wasn't renewed/refreshed or otherwise replaced using a properly registered biometric identification acquisition, forwarding, and/or receiving device arrangement that is authorized for such renewal, replacing, and/or the like of biometric identification information (e.g., registered for authorized information forwarding and/or receiving as paired and/or other communication group members), (c) was moved from the presence of a supervising or otherwise paired/grouped administrative EBInet device arrangement (e.g., such identification information's carrying device was moved so as to cause a weak or failed wireless group inter-device signal strength, thus activating, for example, a tether violation and resulting in device and/or device associated identification information set cancellation or suspension), (d) associated device arrangement and/or associated one or more services recognized an actual (or suspected) threat and/or malicious event, whereby, for example, an EBInet security management arrangement identified an attempt to tamper with, improperly inspect, and/or misrepresent one or more EBInet device arrangement related packaging, processing, identification information, storage arrangement(s), communication one or more activities, and/or the like, including attempts at biometric identification misrepresentations (e.g., spoofing and/or the like), (e) wasn't at least in part properly (as required by policy) cryptographically signed by an authority such as an EBInet registration platform service (e.g., a TIIRS) and/or by one or more persons using respective EBICerts, and/or by an EBInet arrangement compliant AFD and/or AFD/person arrangement and/or RCFD and/or RFD/person arrangement that acquired and/or forwarded at least in part biometric identification information (e.g., one or more CBEIIs and/or CIISs), and/or (f) was subject to a violation of a continuity-of-connection (e.g., physical and/or wireless) testing arrangement, such as recognizing the opening of an electronically connected wrist clasp producing a breaking of a circuit connection.

Such triggering of cancellation or suspension may, in some embodiments, be based, at least in part, on time contexts and associated conditions, such as one or more such cancellation or suspension conditions occurring on a specified and/or same day, same multiple hour period, the next morning, and/or as otherwise may be specified by time elapsed, time period, and/or absolute time and/or other specified (including algorithm and/or context derived) time event.

In some embodiments, from a cyber security standpoint, a contemporaneous refreshing (e.g., through forwarding and receiving) of an at least in part, biometrically acquired, near existential or existential quality identification information set can provide identification information that is just as, or nearly as, secure, and contextually effective, as performing a simultaneous to an event/activity identification information related control process set, such as for an authentication process and/or rights management event/activity enforcement.

EBInet sunsetting of identification information may comprise, for example, revoking, erasing, and/or otherwise operatively restricting the availability of at least a portion of such arrangement's relevant owner and/or user at least in part device carried, biometrically based identification information and/or such identification information associated one or more EBInet device arrangement functions.

In some embodiments, identity misappropriation risk regarding contemporaneous EBInet device arrangement carried identification information resulting from EBInet compliant physical device theft can be mitigated through use of a tethered biometric identity continuity arrangement, and/or can be mitigated when there is a requirement for simultaneous to an event/activity second factor identity authentication. Such second factor authentication can use an EBInet compliant smart device arrangement's native, non-existential biometric identification acquisition arrangement to produce a biometric identification information result that is evaluated as having a specified sufficiency of identity match with a carried EBInet contemporaneous existential (or near-existential) quality biometric identification information set. Use of such a native parent device's non-existential arrangement biometric identification second factor results can demonstrate (non-existentially), for example, the presence (liveness) or lack of presence of an RCFD contemporaneously, existentially identified user's actual operatively current physical presence.

Short contemporaneous from time of acquisition biometric identification information usage one or more time windows can greatly attenuate the risk presented by remotely sourced cyber security attacks. Almost all such cyber malware attacks are launched from locations physically remote to the attacked parties and their devices and consequently a system that contemporaneously stores existential (or near-existential) quality biometrically based EBInet identity information can prevent most identity related cyber security risks, in particular in conjunction with the use of:

(a) EBInet modular components employing isolated EBInet operating environments (for example, a NIIPU modular component, operatively isolated, and embedded in respective smart device arrangements), and (b) second factor trusted path (1) user intention validation arrangements, (2) continuity tethering arrangements, and/or (3) native parent device arrangement biometric identification acquisition and matching initiating and secure processing.

For example, in some embodiments, a stolen EBInet RCUFD, such as an RCUFD that uses an EBInet compliant parent smartphone (or other smart device), can at least in part be protected through use of its inherent, non-existential biometric identification capability set. Such capability set may have sufficient rigor and associated technical and equipment complexity to prevent thieves (versus highly sophisticated black hat hackers) from misusing an RCUFD's carried user and/or owner identification information within the limited sunset/refresh specified requirements (e.g., hours remaining of a day period) of such an EBInet device arrangement's, for example, embedded secure, isolated modular component arrangement.

In some embodiments, security rigor levels of an EBInet identification information carrying device arrangement may specify requirements for availability for use and/or forwarding of one or more of its carried, contemporaneous at least in part near existential or existential quality biometrically based identification information sets. For example, such a specified requirement may comprise availability for a specific continuous time interval period (e.g., 24 hours) after which such information set, or one or more portions thereof, availability expires. Alternatively, such availability may require, for example, expiration after a time interval, such as five hours, after departure from an owner's and/or user's home and/or workplace and/or other specified location, and/or from being within range of specified local one or more Wi-Fi installations (and/or cellular tower, and/or other network connection(s)). Such availability parameters may vary and, for example, be based on a location, such as a current location, of a device arrangement (acquired through wireless means using, for example, GPS, secure Bluetooth wireless, and/or cellular phone tower location(s) informing regarding device arrangement location, such as using triangulation and/or presence and signal strength, and/or the like information considerations). For example, such a device arrangement may use recognition of one or more specified Wi-Fi networks as required criteria to perform sensitive EBInet operations such as information forwarding, receiving, and/or using (e.g., by "seeing" such a network and/or by recognizing specified sufficient network arrangement signal strength).

In some embodiments, EBInet policies and/or other related specifications may be specified by authorized EBInet user organization and/or other affinity group and/or individual person (e.g., stakeholder person). Inter-party, platform, and/or societal rules and controls may govern certain specification options. Such specifications' parameters may comprise, for example, an EBInet RCUFD smart device being within signal strength range of one or more registered Wi-Fi, cellular tower, Bluetooth, and/or other communication arrangement networking location (including signal strength resulting from an EBInet compliant broadcasting arrangement location), and/or recognizing an owner and/or user's voice through voice recognition during one or more phone calls and/or during non-phone use, wherein such arrangement operates in accordance with an instruction set regarding one or more requirements for operating all, or one or more portions, of an EBInet device arrangement functions. Such requirements may include specified frequency of observing and/or otherwise sampling the presence of one or more registered, specified communication networks, EBInet device arrangements, and/or persons (identified, for example, from EBInet device arrangement human voice communications, and/or owner/user gait (movement) recognition and/or using other at least in part biometric identification techniques). Such requirements may require, for example, the presence of specified (a) smart device (e.g., smartphone or smartphone class (based, for example, upon a device being registered as authorized to engage in E/As for a specified company's department X)), (b) keyboard usage dynamics, and/or (c) other smart device and/or device user identifying attribute information (e.g., usage patterns of a device's user), and/or may require demonstrating the presence of a device arrangement user through monitoring of biometric cardio and/or other physiologic function (e.g., using a smartwatch ppg and/or other function sensor set), and/or the like.

EBInet may further, in some embodiments, specify a set of one or more conditions, such as one or more non-contiguous time periods and/or contiguous time periods wherein if, for example, a given acquiring, receiving, carrying, and/or forwarding identification information EBInet device arrangement satisfied a given contextual one or more conditions, such as was within range of a given one or more network communication locations (e.g., Wi-Fi router locations), then a stored (carried) for contemporaneous use identification information set or at least a portion thereof, would be available for forwarding to an authorized receiving device arrangement so long as the timing of such contextual condition event occurrence, such as a period for out-of-range of a given one or more identified network instances, did not exceed a certain time period, e.g., 30 minutes, or any other specified time period of, or specific time at which there is, no network contact.

In some embodiments, EBInet, specific human associated, resource identification information sets, such as device arrangement composite identification information sets (or information derived therefrom), can be made available for use by forwarding such information to respective authorized and/or otherwise operatively compliant receiving devices. Such human, at least in part biometrically based identification information set (e.g., human and device composite other identifying information) secure forwarding, receiving, and/or using, in some EBInet embodiments, is performed within "near-term" identification information associated time windows, wherein such time windows are "contemporaneous" with, but not operatively simultaneous with, the time of such forwarded identification information's associated biometric information acquisition. Such contemporaneous time windows may be fixed by user selection and/or other specification, such as specification by a network administrator and/or receiving device arrangement. Such window defining/limiting specifications may include, for example, computing activity context one or more variables. Such variables may specify respective event one or more occurrences that cause contemporaneous time windows to close and/or block and/or otherwise modify associated one or more EBInet device and/or service processes and/or affect (e.g., limit and/or otherwise modify) the availability of process associated identification information sets. Such context variables may cause requests for further input and/or other actions from respective user sets and/or device arrangements, and/or require other, similar process management and/or stakeholder interaction governance, such as requesting one or more instructions from respective REAI stakeholders.

In some embodiments, EBInet tamper resistant, near existential and/or existential quality, biometric information acquiring device arrangements forward at least a portion of biometrically acquired information sets, and/or information sets at least in part derived therefrom, to respective identity information receiving EBInet compliant device arrangements, such compliant device arrangements employing secure, at least in part hardware tamper and inspection resistant communications and information storage processing and memory arrangements, such as respective NIIPUs and/or RIIPUs. Such received information sets can be respectively at least one of securely (a) used in receiving device arrangements, at least in part, as identity information in one or more respective receiving device arrangements' computing processes (such as REAI governance, e.g., access control, and/or publishing an at least in part biometrically based resource and/or event/activity instance identification information sets), and (b) carried in and/or streamed through respective receiving device arrangements wherein at least a portion of such identity information and/or information derived therefrom is securely forwarded to other receiving device arrangements.

In various embodiments, an EBInet AFD arrangement may be portable, but respectively primarily placed in convenient locations to function as existential and/or near-existential quality biometric identification acquisition stations (where such stations may be physically small and portable for relocation as may be desired by users, but practically large enough to accommodate cost effective and practically sized arrangements that enable near-existential and/or existential quality biometric identification capability sets, such as described herein). In some embodiments, such stations comprise tamper resistant, high performance sensor arrangements (e.g., provided by avalanche photodiode, and/or CMOS array, detectors), and emitter arrangements, for very user-friendly (e.g., low operative burden) and highly accurate identification information acquisition and liveness anti-spoofing analysis so as to produce existentially reliable results that may be stored for later, contemporaneous, but near-term, use.

FIG. 4 is a non-limiting example of steps a time-delay anomaly system takes in respond to emissions of an unpredictable emission signal set.

In some embodiments, receiving, carrying, forwarding, and/or using EBInet device arrangements may be respectively and variously designed to be (i) mobile, (ii) primarily in a consistent location but portable, and/or (iii) fixed to a location (a device arrangement may be composed of plural component device arrangements) such as adhered to a wall or attached/embedded in a desk.

In some embodiments, (a) acquiring, receiving, carrying, using, and/or forwarding EBInet device arrangements, and/or (b) EBInet acquiring device arrangements' respective users' identification information comprising, at least in part, such users' at least in part biometrically based respective IISs and/or information derived therefrom, are respectively registered through secure processes with at least one registration administrative and/or cloud service arrangement. Such registered identification information sets may further respectively include and/or securely reference uniquely identifying interoperably interpretable societal (e.g., names, addresses, government and organization persons' respective unique identifiers), and/or suitability (e.g., effective facts, other items asserted as "facts", and/or quality to purpose and/or other purpose fulfillment suitability information sets, and/or the like), one or more attributes.

In some embodiments, identification information sets may be used for enabling, otherwise managing, and/or auditing EBInet device arrangement one or more operations, e.g., for event/activity instances, such as enabling an event/activity instance identification information publishing event. For example, an authorizing process set for a computing activity might comprise authorizing or not authorizing (1) an online banking event, (2) an SVCC auditing, management, and/or product instance interaction, event, and/or (3) a telephone robocall (i.e., answering or not answering), for example, based on one or more characteristics associated with a robocall instance such as the presence or absence of a required robocall stakeholder at least in part biometrically based identification information set and/or one or more characteristics, such as existential quality biometrically based identification information securely associated with such call's initiating person and/or call event/activity instance, and securely including an effective fact stipulating the caller's employer's name. Such enabling, otherwise managing, and/or auditing may function in accordance with applicable resource and/or event/activity instance user/participant and/or REAI stakeholder person specified policies and/or operatively real-time (e.g., current) instructions, such as not answering such a potential spam robocall or opening a potential spam email.

In some embodiments, EBInet registered acquiring and/or forwarding, and EBInet registered receiving, device arrangements, may be securely registered and/or otherwise securely associated, as at least one of (1) paired, (2) otherwise EBInet (e.g., affinity organization) grouped, and/or (3) otherwise specification authorized, to at least in part use, share, and/or otherwise interact regarding, at least in part biometrically based identification information sets. The foregoing, in some embodiments, may support receiving device arrangements' respective related one or more human, and/or device, identity provisioning, validating and/or authorizing (e.g., event) processes.

FIG. 5 is a non-limiting example of a tamper and inspection resistant acquiring and forwarding station device at least one of: (a) employing acquired near existential and/or existential quality biometric identification information to create one or more IISs (e.g., IITs that may be EBICerts and/or CIISs); and (b) forwarding such acquired biometric identification information and/or such one or more IISs to one or more EBInet arrangement compliant identification information registration and/or publishing services. Such acquired biometric identification information, and/or IISs, may alternatively and/or in addition be respectively forwarded to one or more RCFDs and/or RUSs.

FIG. 8 is a non-limiting example of an EBInet embodiment that supports RUD and RUS arrangements receiving IISs, such IISs used to respectively detect and prevent replay attacks.

In some EBInet embodiments, device arrangements may be registered as at least one of (1) grouped, and/or (2) otherwise policy compliant (e.g., policy managed), EBInet device arrangements. Such grouping and/or otherwise compliant device arrangements' registration can support management of communications between registered such device arrangements. Such device arrangements, e.g., as a group, may respectively receive at least a portion of stakeholder person, and/or stakeholder person and device CIISs, and respectively store and/or reuse at least a portion of such received identification information sets (and/or identification information derived therefrom).

In some embodiments, EBInet device arrangement use of one or more portions of at least in part human biometrically based contemporaneous identification information sets and/or information sets respectively derived therefrom, at least in part occurs within specified acquisition subsequent one or more time windows and/or time associated event parameter sets, at times of use (e.g., processing) subsequent to acquisition of associated identification information sets' respective biometric identification information (e.g., by an AFS). Further, in some embodiments and/or under certain circumstances, such use of such at least in part biometrically based identification information occurs after communication by AFDs to respective receiving device arrangement RDs, and/or to RUSs, such as to an RUD or to an RCFD then to an RUD and/or RUS). For example, a receiving device (e.g., an RUD) may be programmed to store an instance of at least in part nearly existential or existential quality biometrically based identification information acquired from an AFD, such instance stored (and may be further processed) for subsequent "contemporaneous" (e.g., for a later time within specified expiration conditions) usage by such receiving device as human and/or human/device identification information. Since cyber security risks are normally performed by bad actors who are, at a given time, physically remotely located from a resource arrangement publishing environment, short time period contemporaneous use of existential identification information may provide the same benefits as existential biometric acquisition simultaneous use, but provide superior practical (e.g., commercial, usage transparency/convenience) advantages.

In some embodiments, contemporaneous storing of an instance of existential or near-existential quality at least in part biometrically based identification information may effectively support obstructing and/or otherwise preventing successful cyber security attacks that result in resource and/or event/activity instance malicious modification. Such malicious modification obstruction and/or other prevention is enabled, at least in part, through binding EBInet devices' respective at least one of users' and/or composite device arrangements' at least in part biometrically based contemporaneous identification information sets to one or more of such REAIs' respective subject matters and/or interfaces. In such embodiments, at least in part biometrically based identification information is securely published then securely stored and/or communicated/forwarded, and/or otherwise securely employed, within a contemporaneous time related information arrangement comprising one or more specified and/or standardized identification information usage limitation conditions. Such usage limitation conditions may comprise, for example, use within a 24 hour (or, for example, 27 hour period for flexibility (overlapping time)) "day" period, a specified portion of a day or other time period (e.g., elapsed), and/or such at least in part biometrically based identification information can be used up to, i.e., until the time of, one or more event/activity conditions, such as instance, user, and/or EBInet device arrangement related one or more conditions (e.g., numbers of times of use by a user of at least a portion of one or more instances of such an identification information set).

In some embodiments, such an at least in part biometrically based identification information contemporaneous availability period might allow IIS use until, for example, 9 in the morning after its acquisition or receipt by an acquiring or receiving device arrangement. After an elapsed contemporaneous period subsequent to acquisition or receipt, a requirement that a given such identification information set be refreshed and/or otherwise replaced (e.g., through modification) can be securely enforced, for example, through use of an EBInet smart device compliant arrangement, such as using a secure clock packaged within, or securely associated with, a RIIPU or NIIPU. For example, in some embodiments, a receiving device arrangement's settings may require a refresh through receipt of a further or replacing, person's updated at least in part biometrically based identification information set from a communicating AFD arrangement (or for example, from another registered and authorized acquiring, and/or carrying, and forwarding arrangement). Such arrangement, for example, may be registered and authorized to communicate with one or more specifically, at least in part stakeholder biometrically, identified receiving EBInet device and/or service one or more arrangements. In such an example, such stored for contemporaneous use at least in part biometrically based information set may be specified to expire at 10:17 AM on the day after such information set's receipt, and/or refreshing may be required in accordance with some other time event and/or identification related information receiving event condition set, as may be defined by one or more specifications. Securely maintained contemporaneous identification information policy specifications may be cryptographically protected and securely associated with, and/or specified by, one or more of (1) specific one or more stakeholder device arrangement owners and/or one or more stakeholder users, (2) EBInet compliant device arrangements (e.g., RCUFDs), (3) specific subject matter resource and/or event/activity instances, and/or (4) one or more administrative service arrangements (e.g., RUSs), such as one or more remotely located organization, and/or platform administrative, service arrangements.

In some embodiments, for example, a person may perform sensitive services for an organization and/or other party, and such sensitive work services may at least in part be managed by rules and controls securely associated with their at least in part near existential or existential quality biometrically based identification information. Such sensitive services may comprise, for example, one or more of (1) intellectual property, (2) business, family, and/or other planning entity, strategy, operations, administration, and/or management, (3) manufacturing and/or supply and/or other value chain control (e.g., SVCC), (4) rights management (e.g., chain of handling and control), (5) digital currency, and (6) societal entity activities such as justice, defense, research, and/or other planning, auditing, and/or management, work, social, and/or personal activity types. Such sensitive services may have associated EBInet policy secure rules and controls as specified for, and securely associated with, specific activities (and may further include such one or more other portions of one or more persons' identification and/or associated information). Such sensitive services may, in some embodiments, be at least in part managed in response to information variables (e.g., specified requirements and/or other control variables) specified by policy information regarding using contemporaneous at least in part biometrically based identification information, where such variables may comprise, for example, location, time, presence of other at least in part biometrically (such as existential quality) identified one or more parties and/or composite device and/or service arrangements, and/or presence of one or more other resources and/or events/activities (e.g., presence of a specific smart device, event occurrence trigger such as a communication process, and/or the like). Such variables (e.g., conditions' specifications) may be securely associated with (e.g., bound to) stakeholders' and/or persons' respective EBInet device arrangement (such as composite device arrangement), and/or other resource and/or event/activity instance identifiers and/or identification information sets, and/or other variables.

In some embodiments, plural different AFSD and/or other AFD arrangements may be specifically associated with stakeholder, person, resource and/or event/activity instance, at specific one or more times and/or specified circumstances. For example, an employee at a defense firm may employ an AFSD at home in the morning before leaving for work (e.g., by moving his/her palm over an existentially accurate palm vein reader incorporated into his smartphone charging arrangement and/or placing his/her palm in an existential quality, multi-dimensional sensor/emitter biometric acquisition enclosure arrangement). Such employee's nearly existential or existential quality identification information may be communicated to, and securely stored within, such employee's smartphone's RCUFD and may be used to activate a process (and/or, for example, to participate in (e.g., gain access to) an event/activity). Such information set (and/or existential quality, biometrically based information one or more portions thereof) may be refreshed when such employee, for example, enters his/her place of employment, specific work area, and/or when entering a high security area within his/her organization. As a result, near-existential and/or existential quality identification information of such employee may be stored within an RCFD arrangement and may be updated, that is, refreshed and/or supplemented (e.g., aggregated together as audited, accumulated multiple identification recognition events) by, for example, further, more recently acquired at least in part biometrically based identification information. Such newer identification information, and/or a collection of most recently acquired identification information sets (a collection, for example, may comprise a specified number (e.g., 6) of most recently past identification information acquisition events/activities, and/or time period(s) and/or other contextually initiated—for example sets of acquired from each of plural AFD arrangements respectively produced CBEIISs and/or CIISs—and/or information derived therefrom) may be employed in EBInet person related at least in part biometrically based identification information process sets. For example, such process sets may comprise secure, event/activity related identification information authentication (e.g., identity confirmation and/or person identification, as well as liveness (person's physical presence) testing) for event/activity authorization, where an EBInet contemporaneous and/or operatively simultaneous forwarding, receiving, authorizing, and/or publishing and/or other usage, process set may employ the most recently acquired, and/or a plural set of recently acquired, at least in part biometrically based identification information set, and where such plural set members are evaluated to determine whether they individually and/or collectively identify the same person.

In some embodiments, one or more AFD arrangements may internally, and/or with a remote EBInet device arrangement, and/or a service arrangement (such as a TIIRS), register plural, different human body portion arrangements' biometrically based identification information sets of a person, (e.g., different biometric pattern information arrangements) such as registering biometric information of a left palm, wrist, and/or hand, and a right palm, wrist, and/or hand, and/or registering a composite of facial characteristics. One or more of such plural, different biometrically identified, registered instances can respectively be employed as alternative, such as employed as backup, at least in part biometrically based identification information sets, for use if, for example, a primary body part of such person is not available for biometric identification use or fails to, upon performance of a biometric identification process set, provide desired biometric identification information results. Such use of plural different registered biometrically based registered body portion arrangements can support body portion arrangement substitution, where, for example, such person's right hand (or other body part arrangement) has, due to aging, accident, and/or other one or more variables, failed to be available or successfully produce, desired biometrically based identification results. Such registration of plural body portion arrangements supports, for example, over-time biometric evolution management.

In some embodiments, a given RCFD device may carry plural different identification information sets for at least in part providing biometrically based identification information of respective plural different, for example securely registered with cloud service, owners and/or users and/or their device arrangements, and/or associated CertPers (e.g., for provenance information), and such plural different identification information sets may have securely bound and/or otherwise securely associated policy rules and/or controls that govern the behavior of interacting EBInet compliant device and/or service arrangements, such governance respectively in accordance with, for example, such different respective owners' and/or users' (and/or, as may be applicable, associated one or more stakeholder organizations') and/or fused person/device and/or service identity entity rights associated rules and controls. Such rights rules and controls may, in some embodiments, comprise rights management chain of handling and control, such as for secure auditing and/or management of respective SVCC related (e.g., supply chain serialization management) and/or digital currency activities.

Some EBInet embodiments may employ resource and/or event/activity instance identification information acquiring, receiving, and evaluation/determination of suitability for use, device arrangements including AFD and/or other EBInet acquiring, forwarding, receiving, carrying, and/or using device arrangements. Such arrangements are used to securely acquire, forward, receive, carry, and/or use human specific, nearly existentially and/or existentially reliable at least one of biometric identifying information and information derived at least in part therefrom. Such biometric identifying and/or other biometrically based identification information uniquely and reliably identifies any such information set corresponding specific human, including recognizing, and/or rejecting and/or otherwise indicating, any attempts to biometrically masquerade (e.g., spoof) as a specific human, including, for example, indicating that a masquerade may be, is, and/or has been, attempted.

EBInet device arrangements may comprise, in some non-limiting embodiments, one or more of the following arrangements that employ secure identification information acquiring, forwarding, carrying, and/or managing modular components:

- AFD—acquiring, forwarding device arrangement may comprise one or more of:
  - AUFD—acquiring, using, forwarding device arrangement
  - ACFD—acquiring, carrying, forwarding device arrangement
  - ACUD—acquiring, carrying, using device arrangement
  - ACUFD—acquiring, carrying, using, forwarding device arrangement
  - ARCUFD—acquiring, receiving, carrying, using, forwarding device arrangement;
    - The above acquiring device arrangements may take the form of AFSD (station) permutations, which adds an "S" to the acronym. In some embodiments, an AFSD and/or its at least one RIIPU modular component arrangement can be embedded into, inserted into, attached to, and/or configured to securely communicate with, a frequently used parent device arrangement such as a mobile device charger arrangement. Such a station may be a component of a physically portable (e.g., transportable) composite parent/AFD arrangement, but such station, in some such embodiments, is not primarily designed to function as an EBInet compliant highly mobile arrangement. An AFD, including such an AFSD, may include one or more PERCos identity firewall or awareness manager secure identification information device arrangements.

Such an AFSD or the like can be incorporated into, and/or otherwise be operatively attached to, a device arrangement supporting one or more non-EBInet functions. In such embodiments, an AFD arrangement is integrated into/with an EBInet arrangement (EBInet compliant for AFD integration) such as a smartphone charger arrangement, an alarm clock arrangement, a radio and/or streaming and/or computing and/or televising arrangement, a refrigerator or other kitchen appliance, a smart door lock and/or knob, a house smart control (e.g., Control4) and/or security panel arrangement (e.g., Vivint Smart Home, ADT Pulse), vehicle door handle, and/or the like personal, home, and/or work appliance.

RD—receiving device arrangement, which may comprise one or more of:

RUD—receiving, using device arrangement

RCFD—receiving, carrying, forwarding device arrangement

RCUD—receiving, carrying, using, device arrangement

RCUFD—receiving, carrying, using, forwarding device arrangement

ARCUFD—acquiring, receiving, carrying, using, forwarding device arrangement

In some embodiments, EBInet modular component arrangements such as NIIPUs in RD arrangements and RIIPUs in AFDs may employ parent device arrangement shared function secure processing and memory hardware components, such as hardware supporting Intel SGX or Apple Secure Enclave functionality, where at least a portion of EBInet operations is performed using such shared, processing and memory isolation capabilities.

In some embodiments, such AFD, as well as RD, arrangements include respective secure clock arrangements (e.g., securely maintaining time and date), and in some embodiments at least in part biometrically based identification information sets include one or more actual (absolute) time information sets and/or other reliably interpretable timing information sets for providing recorded times of (e.g., date and time of) (1) biometric identification information acquisitions, and (2) EBInet secure publishing of REAIs' respective identification information sets. Such actual time and/or other reliably interpretable time and date indicator information sets, in some embodiments, are securely, cryptographically included in, and/or otherwise securely associated with, respective such at least in part biometrically based identification information sets, including, for example, EBInet device arrangement forwarded identification information sets. Such information sets can comprise, as policy specified, resource (such as EBInet device arrangement) stakeholder person participant information sets and/or other resource and/or event/activity instance identification information sets. In some embodiments, such timing information may be securely associated with one or more near-existential and/or existential quality biometric identification acquisition (and/or other) EBInet arrangement device and/or service arrangements' (and/or one or more such device and/or service arrangement portions') respective implementation specific version numbers and/or other one or more other technology version identifiers (e.g., alpha and/or numeric unique identifiers, embedded secret information, and/or the like), wherein such identifiers correspond to operative one or more version information sets of an EBInet identification acquisition, receiving, using, carrying, and/or forwarding device and/or service arrangement.

Such timing information, when associated with a biometric acquisition related security and/or other trustworthiness/security and/or reliability variable, such as a version (e.g., revision numbered) information set and/or unique instance identifier, may inform a user, user administrator, user EBInet device arrangement, user computing arrangement, and/or other computing and/or service arrangement, as to, for example, time historical and/or other time information for a resource and/or event/activity instance, and further as to security, other trustworthiness, and/or reliability of such instance. In some embodiments, time and/or other timing information may be provided by a secure EBInet device arrangement capability set for binding with at least a portion of corresponding device arrangement version information for establishing audit information and/or evaluate/determine device and/or service trustworthiness and/or reliability at a given time instance and/or historical period. For example, when employing a database arrangement of EBInet related identification information instances, an RD arrangement and/or related EBInet administrative arrangement can query the database to assess the historical, current, and/or predicted quality of its own suitability, or the suitability of another EBInet device arrangement. For example, such appropriateness may be represented by a securely maintained expression of the reliability (e.g., rigor level) of a given version at a given, securely established time and/or time period (where such expression may be securely tested if stipulated as an effective fact). Such appropriateness information may, for example, at least in part, be (1) expressed in the form of resource instance one or more quality to purposes (QtPs) at a given time, and/or (2) informed by using, for example, PERCos effective facts regarding a resource at a given time.

In some embodiments, EBInet device arrangement at least in part biometrically based identification information may be securely associated (e.g., securely bound) both with securely acquired time information and with security and/or other trustworthiness related information sets such as device arrangement one or more cryptographic keys, certificates (e.g., EBICerts), tokens (e.g., IITs), and/or other security and/or performance methodology implementations (e.g., obfuscation software, intrusion monitoring software, biometric acquisition software such as emitter and/or sensor driver version information, biometric analytic (e.g., pattern recognition) software, communication software, and/or the like). Such securely acquired time information can be provided by a secure time calibration process set wherein an EBInet clock arrangement communicates with an EBInet arrangement compliant secure time provisioning and/or validating service arrangement. Such secure time provisioning, monitoring, and/or drift correction/time synchronization service can monitor such an EBInet clock's accuracy over time and recalibrate to a desired or required specified real and/or operating time accuracy specification, disable (e.g., until rectified) one or more of a specification violating clock's associated EBInet device and/or service functions, and/or securely report monitored clock performance information, such as a failing to satisfy specified time related performance, to an administrative arrangement.

When an EBInet device and/or service arrangement (e.g., a tamper and inspection resistant AFD, RCFD, and/or RUS) securely creates a nearly existential or existential quality at least in part biometrically based REAI identification information set, such identification information set, and/or a representation thereof, may be securely time stamped by an AFD or RCFD secure clock arrangement at the operative time of such one or more information sets creation and/or proffering for registration (e.g., with a TIIRS, using a secure modular component NIIPU and/or RIIPU arrangement). Such time of creation and/or proffering for registration (time information being securely integrated within and/or securely associated with its created identification information set) may be inspected by a TIIRS registration authority upon receipt for registration of such identification information set and/or identification information set that represents such identification information set (such as a cryptographic hash). Such inspection can involve comparing such received time stamp information to secure clock information provided by the receiving TIIRS's secure clock arrangement (e.g., a secure clock arrangement within a TIIRS's securely operating RUS) to determine whether the provided for registration identification information was securely created within a specified time range (e.g., with respect to the current receipt time at a service, such as a TIIRS) and/or published for registration at operatively the same time as its receipt for registration at the TIIRS. Such a comparing of the time of an IIS's publishing for registration with a registration authority service's operatively current time of information set receiving for registration can help ensure that a malicious party attack to subvert the contents of such an information set would be unsuccessful due to insufficient time necessary for an attacker's analysis and misappropriation/alteration of the identification information set, and production and presentation of a counterfeit and/or otherwise misrepresented information set. Such registration of an REAI identification information set may employ cryptographic/hashing techniques such that an REAI subject matter is represented, and can be authenticated, by comparing an IIS and/or IIS-representing (e.g., hashed) information set with the subject matter's registered IIS and/or IIS-representing information set. Such a time stamping arrangement's secure EBInet device arrangement and service arrangement secure clocks can be periodically, such as during a registration process set, evaluated as to the accuracy of such clocks' time functions, and a platform or other network service secure clock arrangement may manage synchronizing such clocks to assure compliance with clock performance specifications.

In some EBInet embodiments, activity related time information, such as actual time, relative time, and/or time interval, information, provide important information variables for maintaining/optimizing identification information integrity. In such embodiments, securely embedding and/or otherwise securely including and/or securely associating such time related information (which may further include date and/or location information) with existentially reliable (biometrically identified and liveness tested) at least in part, biometrically based resource and/or event/activity instance identification information, ensures/provides unique event/activity identification information sets, in part because a human individual is described/identified biometrically as a unique instance, and further such human instance can perform a given specific instance of an activity, such as an identification information publishing event regarding a resource and/or event/activity, during only one set of time conditions (including such individual being in only one physical location during one activity set at one time). Securely combining near-existentially or existentially accurate biometric identification recognition with a unique device arrangement identifying secret (e.g., manufacturer's embedded) set (which may be augmented by such a device's EBInet CertPer certification, during a securely identified time set (which may in some embodiments be augmented by activity/device arrangement physical location information), assures the uniqueness of publishing event identification information sets comprising both secure audited time related information and, for example, one or more subject matter identifiers, device and/or service arrangement identifiers, associated attributes, respective associated persons' nearly existential or existential quality identifiers, and date, and/or location, and/or other contextual information.

In some embodiments, time may be used in EBInet cryptographic key generation/use. Since a human can be physically in only one location at a given time, existentially identified humans' associated respective timings of their events/activities can be used to produce highly specific audit information regarding event/activity times, as well as, for example, date, specific human's participation, and/or location, information. Such information, in addition to, or alternately to, stakeholder biometrically based information, can be used as input for cryptographic key generation, for example by employing cryptographically pseudo-random, shared, highly protected key, and/or public key/private key based, one or more encrypted and inspection resistant permutations and/or sequences of time and/or date and/or location information, such key information used for encrypting EBInet system and/or identification information and securing EBInet system integrity. For example, such time and/or date information can be employed through cryptographic hashing of such time and date information with at least in part biometrically based human identification information to form secure and highly reliable, highly spoof resistant, near existential or existential quality biometrically signed information sets, which such sets may also be used in signing subject matter and/or IIS information sets.

In some embodiments, when EBInet information sets use highly secure time and date auditing, replay attacks using at least in part biometrically based identification information sets can be matched against highly secure actual time and/or date spoof recognition information in an EBInet device and/or service arrangement (e.g., a receiving EBInet device arrangement and/or EBInet network service). Such replay attempts can be identified and monitored, audited, controlled, and/or related information and/or consequence corrected and/or otherwise managed, due to timing (and date) anomaly recognition. Time and date information may be cryptographically processed, and/or may be embedded and/or otherwise integrated and/or associated with, at least in part biometrically acquired (and/or otherwise biometrically based) human identification information. For example, such information may be integrated into a biometric sensor information data stream (e.g., integrated within a secure sensor arrangement as data is acquired/received, communicated, and/or the like) through pseudo-random data stream composition and/or location insertion that presents a unique information stream pattern composition of biometrically acquired data and time/date, where such information stream pattern can be identified by an EBInet device arrangement and/or network based service using a shared pseudo-random composition secret/key.

Biometrically based identification information set authenticity and related biometrically based identification information trustworthiness and/or reliability may, over time, be challenged by the development of new spoofing technology arrangements that undermine the reliability of identity determinations based on near-existential or existential quality identification information. In response to such potential challenges, some EBInet embodiments support EBInet device arrangement technology elements' one or more respective software, firmware, replaceable hardware module, and/or rules and controls policy specifications refreshing, revoking, updating, and/or other modifying, in support of maintaining near-existential or existential quality biometric identification performance and reliability.

In some embodiments, stakeholders' EBInet device arrangements' one or more related identification information event/activity information sets may comprise, for example, REAI control information sets such as for SVCC manufacturing process control and auditing. Such information sets can provide instructions for event/activity control and/or audit/provenance information management. For example, such event/activity information sets may include access control information instances such as control information regarding access to documents, web sites, data stores, digital currency, persons' entries into respective facilities and/or facility areas, access into respective SVCC container arrangements such as into an intermodal container and/or into a cargo crate, and/or persons' access to respective machines/devices, social networking interaction instances, and/or publishing and/or other processing and/or event/activity identification information instances.

In some embodiments, EBInet control information instances may securely include and/or be securely associated with time of event/activity (e.g., software processing occurrence) real (i.e., absolute) time information, elapsed time information, and/or time related triggering events such as the operation of specified software and/or the occurrence of specified input data. Such time of event/activity related information may have securely bound cryptographic (e.g., decryption), and/or other use management control (e.g., policy), information wherein, for example, an at least in part biometrically based identification information set may have securely associated context-based expiration control information instructions (for example, if X occurs, terminate or otherwise make unavailable such information set). Such an information set may only be, for example, decrypted and/or used in compliance with certain time related security/reliability policy specified rigor levels (e.g., respective condition sets expressed through the use of security/reliability specifications).

In some embodiments, such expiration control information may require an EBInet device and/or network based administrative arrangement to "check" with an identification information environment integrity management service (e.g., a cloud service EBInet utility) within a specified time interval and/or at an otherwise determined point in time and/or other expressed set of one or more contextual conditions, such check performed to evaluate the validity/integrity of one or more portions of an EBInet identification information set (such as the integrity of a device arrangement version at a given time and date) and/or evaluate such set's associated one or more IIS subject matters. Such checking process may include a securely maintained (e.g., encrypted and/or signed) policy information set, and may be employed to evaluate one or more EBInet device arrangement software, hardware, and/or specification performance parameters for such device arrangement and/or one or more components thereof.

Checking with an EBInet arrangement compliant administrative, cloud, and/or other service arrangement regarding stakeholder and/or device and/or service arrangement hardware and/or software component one or more attributes (regarding, for example, performance, trustworthiness/security, and/or other suitability parameters) can inform regarding, and/or provide input for determining, compliance with device and/or service arrangement, organization, group, and/or platform policy EBInet arrangement associated specification(s). Such checking can enable the determination of whether an identification information set, and/or one or more portions thereof, satisfies policy parameters (e.g., performance, trustworthiness, and/or reliability), for example, in general or associated with a specified rigor level and/or contextual purpose. For example, such determination may involve policy specifications for evaluating and/or enforcing EBInet device arrangement rigor level compliance and/or performance for specified one or more contextual purposes and/or in relation to one or more other specified conditions. Such determination may result in updating, refreshing, modifying, terminating, suspending use of, and/or replacing of one or more portions of one or more EBInet device and/or service arrangement technology hardware and/or software components. Such management of EBInet components can help ensure compliance with required security/trustworthiness, reliability, and/or other suitability for general and/or specified one or more purposes, such as EBInet device arrangement use conditions including, for example, associated one or more policy sets.

In some embodiments, one or more AFD arrangements may securely store acquired near existential and/or existential quality biometric identification information and/or information derived therefrom and may further store other identification information, including, for example, storing a portion of identification information in secure/trustworthy information management bases remote to such one or more respective AFD arrangements' locations. Such stored information can comprise attribute information, such as EFs, Creds, and/or societally identifying information sets, securely associated with respective AFD biometrically identified persons' at least in part biometrically based identification information. Such stored biometric related information may support, and/or be used to securely inform regarding, at least one of (i) timing of biometric identification information acquisition, communication, and/or refreshing, embargoing, and/or timing of resetting/refreshing/updating, deleting, and/or embargoing, of associated software and/or firmware (e.g., occurrence of such event(s)), (ii) subsequent to acquisition, contemporaneous secure communication of at least a portion of such identification information and/or information derived therefrom to a tamper resistant EBInet arrangement compliant receiving device and/or service arrangement, (iii) auditing of such identification information acquisition, communication, receipt, and/or related processes, and wherein at least a portion of such audit information may further be securely communicated to a network administrative and/or cloud service arrangement, and (iv) preparation/creation of identification information sets, such as CBEIISs, where such stored information is used to supplement such an AFD's biometrically acquired/based information, for example to produce a CBEIIS (or CIIS) that includes such stored EFs, Creds, and/or other person's attribute information.

In some embodiments, an AFSD arrangement may, for cost, packaging, power, physical placement optimization, and/or other considerations be co-packaged and/or otherwise integrated with or within, for example, (1) a smart device power charging portable and/or other adapter arrangement, (2) a network router, and/or (3) an Internet of Things device arrangement, such as an IoT connected refrigerator, coffee maker, oven and/or burner arrangement, television and/or other at least in part video and/or audio based at least in part entertainment arrangement, smart house security and/or environment (e.g., control mechanism for lights, heat, shades/curtains) control arrangement, and/or the like. An AFSD arrangement may be constructed so as to allow highly convenient acquisition of near-existential and/or existential quality biometric identification information, wherein, for example, an owner and/or user may, when removing a smartphone from its charging arrangement, hold his/her hand for a brief interval, e.g. one second, over an existential quality palm two and/or three dimensional blood vessel (vein, micro-vein, capillary, artery) pattern reader (or where such hand is inserted into a biometric identification multi-dimensional emitter/reader/enclosure to read cardiovascular and/or other hand dimension characteristics) where acquired biometric data is processed by associated EBInet arrangement software/firmware, and which may, in some embodiments, acquire dynamic readings of one or more of blood flow, heart waveform, blood oxygenation, blood vessel diameter, subject's one or more other time varying body element(s) (e.g. structure (e.g., shape) and/or volume, tissue, breath, secretion, organic detritus, and/or the like), related chemical composition (e.g., using a chemical and/or protein sniffer and/or other person identifying, and/or liveness determining, physiological signature acquisition technique set), and/or time related spatial and/or spectral information. The foregoing can be used to acquire both highly discriminating person identifying information as well as information for liveness (physical presence) validation for such identification information acquisition process's biometrically identified person.

For ease of use and/or depending on specific user, owner, and/or organization administrator, in some embodiments, an AFSD existential biometric identification information acquisition process set might, for example, be performed once in the morning when a user retrieves his/her RCFD's parent smartphone (and/or smartwatch and/or other mobile and/or wearable smart device) from its charger arrangement, and such AFSD biometric acquired identification information and/or information derived at least in part therefrom may be, at such a time, acquired and then forwarded to such RCFD for use as contemporaneous biometrically based identification information. Such an RCFD arrangement (e.g., using a NIIPU modular component arrangement securely embedded in its parent smart device) can thereafter carry such identification information for, as may be applicable, forwarding to subsequent receiving devices later in the day, such biometric identification information acquisition and forwarding process sets occurring with very little, or essentially no, user burden (e.g., may occur transparently from an RCFD carrying person's perspective). Such biometric information acquisition process sets can be performed before such devices' respective owners and/or users proceed through the activities of their day. As long as no forwarding and/or receiving device specification criterion requires a refresh or reset of such information, such as not being within a certain one or more Wi-Fi network coverage areas (e.g., determined using a router's identifier combined with reception strength, and/or being compliant with specified network security attributes, for such a router's connection) and/or not having timed-out in accordance with, for example, securely NIIPU stored and managed time duration specification requirements, such carried identification information can be available for use.

In some embodiments, a start of the day (morning) existential quality acquisition of biometric identification information can be part of a very user-friendly and nearly operatively transparent to user automatic gesture that is an integral part of a user picking up his/her smart device (e.g., smartphone) from its charging cradle arrangement (e.g., enclosure). In such an example, a user's palm or wrist may momentarily pause over an existential recognition palm vein and/or wrist vein reader arrangement and/or within a reader enclosure arrangement as the user reaches for his/her smartphone (may alternatively or additionally employ other enclosure, hand or finger set and/or face, and/or other biometric and liveness factor acquisition arrangement(s)).

In some embodiments, such an AFSD arrangement can share one or more capabilities of a "parent" device arrangement, exploiting such capabilities in support of EBInet functions by using, for example, a parent device's biometric sensor arrangement, power supply, and/or communication capabilities (e.g., antenna). In addition, EBInet provisioning of contemporaneously acquired near existential or existential quality identification information enables biometric acquisition that couldn't be performed without additional packaging, device size, mobile device battery power consumption, emitter and/or sensor requirements, environmental noise considerations, multiple device redundancy costs, and/or other considerations if existential quality biometric identity acquisition was implemented as a ubiquitous technology capability of smartphones and/or other highly mobile user smart devices.

EBInet receiving device arrangements ("RDs") are, in some embodiments, at least in part employed for securely receiving at least a portion of a device arrangement owner's and/or user's at least in part biometric identification information and/or identification information derived therefrom and may further receive (securely and/or otherwise) other such owner and/or user identification information, such as such owner and/or user attribute information (e.g., expertise, trustworthiness, suitability to specified purpose, and/or the like information). Such other identification information is received from one or more AFD, RFD, and/or the like forwarding arrangements. Such identification information comprises at least in part near-existentially and/or existentially reliable at least in part biometrically based identification information of one or more biometrically identified AFD, and/or the like device, arrangement owner, owner agent, and/or user, parties. In some embodiments a device arrangement for identification information receiving may comprise, at least in part, at least one portable device arrangement, such as a smartphone, smartwatch, smart bracelet, smart ring, smart glasses, wearable pin/brooch, smart identity modular component, and/or the like.

In some embodiments, each such RD arrangement (where an RD arrangement may comprise, for example, an RCFD receiving-carrying-forwarding device arrangement) includes at least one secure clock arrangement for securely including and/or otherwise associating, for example, real-time (that is, absolute time) information of a secure receiving event/activity set into, and/or with, its one or more associated (a) stakeholder owners', agents', and/or device users', (b) EBInet resource devices', (c) stakeholder owners', agents', and/or users' composite person/EBInet device arrangement sets', and/or (d) EBInet event/activity related resource subject matters', respective identification information sets.

In some embodiments, EBInet receiving device arrangements are each at least one of generally enabled, and selectively enabled (e.g., as a result of being members of one or more, for example, registered groupings of device and/or user arrangements), to support securely receiving resource and/or event/activity set identification information comprising at least in part human specific near-existential and/or existential quality at least in part biometrically based identification information received from one or more EBInet AFD arrangements and/or from one or more, for example, EBInet RFD arrangements (such as one or more RCFD arrangements and/or the like, and/or from an RUS arrangement). Such received identification information set may further include securely bound and/or otherwise securely associated forwarding arrangement identification information including at least in part biometrically based uniquely identifying identification information of, for example, at least one of a forwarding device's stakeholder one or more persons and/or device arrangement one or more users (e.g., "current" biometrically identified user(s)). Such at least in part biometrically based identifying identification information can be, for example, made available as managed by at least in part forwarding and/or receiving devices' specified, respective policies' rules and controls, and/or by direct stakeholder person and/or user instruction (e.g., by user interface).

In some embodiments, EBInet arrangements securely recognize and authenticate the identity of one or more such forwarding and/or receiving device and/or service arrangements, and/or their stakeholder one or more persons and/or users. Such recognizing and authenticating can be performed at least in part to enable (or terminate or otherwise disallow) at least a portion of device and/or service arrangement identification information intercommunication (e.g., as, for example, enabling, terminating, or disallowing communication performance by one or more communicating EBInet device arrangements). An EBInet device arrangement, such as an FD, may by policy and/or direct user instruction, be authorized to communicate such information to an RD and such RD can be authorized to receive, and/or use, at least a portion of an identification information set provided by such FD. The foregoing may be policy authorized in accordance with EBInet compliant device, owner, and/or user registered groupings. Such authorizing may comprise authenticating at least a portion of at least in part biometrically based identification information sets for owners and/or users of respective such device arrangements (e.g., authenticating one or more portions of device arrangement, and associated stakeholder person (e.g., a CertPer), and/or user respective descriptive identification information sets). Such RD and FD EBInet device (and/or service) arrangements may have been previously registered with an administrative and/or cloud (e.g., utility) registration and authentication service and such device arrangement registration information may include one or more portions of such biometrically identified persons' and/or persons'/devices' (and/or services') respective uniquely identifying identification information sets, as well as may further include one or more portions of EBInet device and/or service arrangement, and/or associated stakeholder and/or user one or more persons', associated device rights management rules and controls policy information.

Forwarded device and/or service arrangement identification information may, in some embodiments, further include one or more attributes of any one or more of such forwarding device and/or service arrangement associated biometrically identified individuals, such as, for example, one or more PERCos repute QtP (Cred) and/or EF, attributes, which are descriptive attributes of such forwarding arrangement's biometrically identified one or more persons, such as users, stakeholder owners and/or agents (for example including an SVCC's, such as a manufacturer's, CertPer(s)). At least a portion of such received identification information can be used, for example, to supply at least in part biometrically based identification information for associated event/activity instances' governance (an event/activity instance may be performed, for example, to satisfy a user purpose, where such an event/activity can include plural processes as related to a purpose, such as performing electronic banking and/or shopping as an Amazon Prime member). For example, such governance may be required and/or requested by an RD and/or RD associated computing arrangement one or more services, programs, rules, and/or policies. Such identification information can be requested or required by, for example, respective (1) receiving device (RD) arrangements, (2) such RD arrangements' respective associated computing arrangements, and/or (3) such RD arrangements' associated network based, service (e.g., administrative) arrangements such as respective organization administration and/or cloud service (e.g., registration and/or governance/administration), arrangements. Any of the foregoing EBInet device and/or service arrangements may respectively request or require at least in part biometrically based identification information to enable authorization, initiation, and/or completion of any specified and/or otherwise stipulated computing event/activity set. One or more such EBInet arrangements may further at least in part control one or more compliant devices (e.g., commercial, home, and/or personal appliances, computing control device arrangements, electronically controlled containers, vehicles, and/or other device types).

In some embodiments, EBInet event/activity management may employ, for example, cryptographically protected and securely managed rules and controls for governing event/activity resources and operations (e.g., for event activity authorization, rights management, and/or auditing functions). Such an EBInet event/activity may comprise, for example, saving, publishing, using, governing/administering, auditing, and/or transmitting at least a portion of, for example, a computer program, document, communication instance (e.g., text, email), digital currency, database, web page, and/or tangible item "resource" interface and/or operation (such as for an SVCC operation). An EBInet event/activity management set includes, without limitation, using at least in part nearly existential or existential quality biometrically based stakeholder and/or user identification information in such governing/administering saving, publishing, using, maintaining, auditing, and/or transmitting of an E/A identification information set. Some non-limiting examples of such use include:

1. authorizing and/or otherwise governing/administering entry to a physical resource (e.g., facility, vehicle, and/or other entity), including, for example, securely publishing descriptive information regarding, and/or auditing, event/activity and resource usage associated processes, and publishing an information set (e.g., an IIS) regarding such an event/activity. Such auditing and publishing create an audit of event/activity associated at least in part descriptive elements, including, for example, at least in part nearly existential or existential quality biometrically based, identification information regarding such event/activity's one or more participating, certifying, and/or otherwise associated, (e.g., owning and/or authorizing) persons,
2. authorizing and/or otherwise governing/administering decrypting a document, and securely publishing and/or auditing an event/activity associated at least in part descriptive element information set that includes an at least in part nearly existential or existential quality biometrically based, identification information set,
3. authorizing and/or otherwise governing/administering access to a digital resource (such as a database or web service) and securely publishing and/or auditing associated at least in part descriptive element information set that includes an at least in part nearly existential or existential quality biometrically based, identification information set, 4. authorizing and/or otherwise governing/administering an SVCC event/activity (e.g., entry into an SVCC intermodal container, and/or the adding and/or removing of an object set thereto/therefrom) and securely publishing and/or auditing associated at least in part descriptive element information that includes an at least in part nearly existential or existential quality, biometrically based, identification information set,
5. authorizing participating, and/or otherwise governing/administering participation in, a web-based teleconference and/or social/societal/commercial networking event/activity and securely publishing and/or auditing associated at least in part descriptive event/activity element information that includes an at least in part nearly existential or existential quality biometrically based, identification information set of one or more participating persons,
6. authorizing and/or otherwise governing/administering digital currency storage and transaction activity including binding digital currency (e.g., digital coins) to at least in part nearly existential or existential quality biometrically based identification information of a digital currency set's one or more owners and requiring such owners to be biometrically demonstrated to be contemporaneously and/or operatively simultaneously present to authorize a digital currency transaction employing such owner'(s) digital currency, and
7. other authorizing and/or otherwise governing/administering events/activities, element one or more portions thereof, and/or their related descriptive information sets.

In some embodiments, at least a portion of at least one of such at least in part biometrically based identification information and information derived therefrom, is employed using a tamper resistant and highly secure modular component arrangement (e.g., a secure NIIPU) and/or other component arrangement, where such modular component form factor is at least one of embeddable in, and/or insertable in and/or otherwise securely, operatively connectable to, at least one of at least one (i) an EBInet unaware (e.g., passively supporting) device arrangement that, in conjunction with the attachment and/or other connection of such a modular component arrangement, can provide power and/or communication interface capabilities to such a NIIPU arrangement, and (ii) EBInet smart device arrangement (e.g., an EBInet compliant smart phone) where such device is designed to securely perform at least a portion of EBInet functions in compliance with EBInet arrangement specifications, the foregoing device arrangement(s) respectively comprising, for example, at least one of:

a. smartphone, smart watch, tablet, smart glasses (e.g., eyeglasses), smart pendant, ring, identity bracelet, pin/brooch and/or other jewelry, clothing and/or accessory instance, laptop, and/or human body implant and/or accessory,
b. desktop computer,
c. fixed position and/or portable client arrangement of a client/server arrangement,
d. computer at least in part enabled device arrangement, such as an IoT device (e.g., vehicle, outside (or internal) door of home or facility, etc.), manufacturing and/or other SVCC device arrangement, robot (e.g., land based and drone), and/or the like,
e. EBInet dedicated (e.g., standalone) device arrangement using one or more EBInet modular components, and/or the like.

In some embodiments, an EBInet receiving arrangement, using a modular component arrangement such as a NIIPU, is used to securely receive from at least one of (i) an at least in part near-existential and/or existential quality biometric identification information AFD arrangement (such as an AFSD arrangement), and (ii) an RCFD arrangement, at least a portion of specific human, identifying biometric identification information and/or information at least in part derived therefrom, wherein such modular component arrangement is operatively isolated from the receiving device arrangement's general purpose operating environment at least one of processing and storage arrangements.

In some embodiments such modular component RCFD identity device arrangement may be packaged as an at least in part insertable (e.g., into a smart device's corresponding card slot), or embedded (within a parent arrangement), standardized component arrangement. Such component arrangement can be, for example, inserted or embedded into a SIM card, micro or other SD card, flash RAM stick, and/or the like arrangement. Such modular component RCFD may be implemented, at least in part, in a form factor operatively compatible with a parent smart device arrangement such as provided in the form of an EBInet secure modular component embeddable/integrable hardware chip arrangement. Such chip arrangement may, for example, at least in part, employ and be integrated into, one or more of: a secure, monitoring for failure of continuity event (e.g., a detaching event monitoring arrangement) wrist band, and/or other wearable, removeable items such as eyeglass arrangements, pendants, pins/brooches, carriable "smart" RCFD identity device arrangement wallet and/or billfold and/or purse identity card, or embeddable/insertable (e.g., modular) identity components, for example, using a credit card format, and/or the like. One or more such implementations using parent device arrangements, in some embodiments, may have one or more built in (e.g., native) less assiduous (than EBInet near-existential or existential quality) acquiring biometric identification information capability sets, such as a built-in fingerprint identification recognition/authorization capability set integrated into an identity card format for use by such card's one or more owners and/or users to prevent a card's misuse given its unauthorized physical possession. In some embodiments, such a biometric identification incorporating card (e.g., credit card format and carried in a wallet or purse, and using, for example, a magnetic strip, NFC, RFID, and/or the like communication means) and/or other EBInet parent smart identity device compliant arrangement (e.g., a parent device arrangement that includes an EBInet device arrangement that securely receives, carries, and forwards at least in part biometrically based identification information) can incorporate access control and physical theft and related misuse impeding user identity biometric identification capabilities that are less assiduous, for example, than the near-existential and/or existential quality biometric identification technologies of EBInet AFD arrangements.

In some embodiments, modular NIIPU components, may perform as non-existential quality biometric identification information ARCF and/or the like arrangements as a result of being integrated into, and/or inserted into, and/or otherwise operatively integrated with, at least a portion of a parent smart device arrangement's capabilities, including, for example, being associated with such device's native sensor or sensor/emitter arrangement. Given the capabilities of current smart mobile device arrangements, the foregoing can enable mobile, but not near-existential (or existential) quality, smart device arrangement contemporaneous and/or operatively simultaneous biometric identification. To achieve near-existential or existential quality biometrically based identification using embedding and/or other employing of an EBInet contemporaneous biometrically based identification information arrangement would necessitate a mobile smart arrangement to have greater size, weight, cost, energy consumption, and/or other overhead factors that reduce the usability and/or other commercial acceptability of such arrangements. This is in comparison to EBInet implementations that, for example, employ RCFD arrangement contemporaneous, at least in part, biometrically based identification information receiving, carrying, using, and/or forwarding, where such contemporaneous biometrically based identification information has been previously acquired by an AFD using nearly existential or existential quality acquisition techniques, and forwarded (e.g., transmitted in the form of acquired and/or derived identification information sets) to such a modular component, highly secure carrying arrangement. Such integration of an EBInet RD receiving, carrying, using, and/or forwarding modular component device arrangement may in some embodiments support secure isolation of user identification information storage, and management and other processing. Such modular component isolation, in some embodiments, can employ hardware and/or software tamper and inspection resistant security techniques (such as described herein), including employing its own operating system/environment and/or specialized sandboxing techniques, protecting such modular component operations and information from parent smart device and/or external to parent device processes and inspection, wherein, for example, compromise of a parent smart device would not, if such modular component is properly operatively isolated and securely interfaced with the parent device, lead to compromise of a modular component's identification information environment, such as its information components and/or processes.

In some embodiments, such a modular component, e.g., RCFD identification information arrangement, may securely operate cooperatively with a parent smart device arrangement to at least in part ensure the integrity and/or authenticity of a one or more portions of a parent smart receiving device arrangement's information sets (e.g., identification information and related specification/policy sets) by using such modular component for at least a portion of such parent device identification information sets' processing related operations. For example, such modular component can validate the authenticity of, and/or interaction parameters with, a parent arrangement by engaging in a protocol (e.g., communications) that verifies one or more parent protected secrets, where such one or more secrets may comprise a private key of a public key/private key pair, and/or shared secrets (i.e., shared between such a parent and its modular component). Alternatively, or in addition, an EBInet modular component (e.g., a NIIPU) can validate a signature of a parent provided information set using cryptographic techniques, where such signature may be maintained in a parent device secure storage location and/or in such modular component's memory arrangement.

In some embodiments, the quality of biometrically based identification information may vary during periods of time (e.g., as time elapses) as a party, for example, carries an RCFD that acquired initial such identification information early in the day from an AFSD. As the day transpires, the party carrying such RCFD may pass by (physically move by) and/or otherwise interact with (and sensor information is acquired) other near-existential and/or existential quality one or more other AFSDs and/or pass by smart device and/or other less assiduous biometric identification arrangements (e.g., a sensor/emitter arrangement), where the party's RCFD can transparently acquire and/or receive further biometrically based identification information sets, and accumulate/aggregate, for example, to a certain number of identification instances (e.g., EBInet and/or native smart device generated) or refreshing to one or more current instances, to form a more current and/or rigorous biometric information instance/array used to form at least in part biometrically based identification information one or more sets. Such aggregate information formation and/or usage may be performed, alternatively, and/or in addition, at network administrative organization, and/or internet (or the like) cloud service locations, employing secure communication techniques.

In some embodiments, authentication of at least in part biometrically based identification information (e.g., an IIT) to validate a person's identity may be performed at (e.g., approximately at) the time of biometric identification information acquisition (e.g., within an AFS and/or securely by an AFS associated network administrative arrangement). Biometrically based identification authentication of a party may also, or alternatively, be performed by an RCF and/or RUD and/or by an RCF and/or RUD network-based associated organization and/or cloud service administrative arrangement. In some embodiments, such authentication is performed by comparing some or all elements of acquired EBInet biometric identification pattern information and/or an at least in part biometrically based identification information set with a previously registered information set corresponding to such party, where such authentication processes and associated communication activities are performed in a secure manner.

In some embodiments, a biometric identification information set acquisition process set may unfold in an adaptive manner. For example, an EBInet biometric acquisition arrangement (e.g., an AFSD that employs, at least in part, emitter generated, and sensor acquired, signal information) may analyze acquired such information and determine that noise and/or other uncertainty introducing variables (e.g., spoofing attempts) may require, or otherwise indicate use of, subsequent pseudo-random emitter signal sets (e.g., using differing wavelengths, signal strengths, periodicity and/or combination sets, direction, temporal elements, and/or the like). Such additional biometric identification information acquisition sets can be acquired and analyzed to improve identification information reliability and/or to support at least in part biometrically based identification information sets' usage decision process sets, including, for example, deciding yes, no, or perform further one or more processes, given, for example, respective purposes and/or specified condition sets.

In some embodiments, a modular component EBInet identity device arrangement may comprise a hardware and software tamper resistant highly mobile device arrangement for performing, at least in part, identity information receiving, carrying, forwarding, communicating, authenticating, and/or other identity information using, provisioning, and/or validating functions. In some embodiments, such a secure modular component device arrangement may be operated to redundantly authenticate its parent (e.g., perform a contemporaneous (carried) identity related operation, to validate a parent device identification process). With such an arrangement, the parent, for example, an EBInet compliant smartphone, can perform a biometric identification and authentication process set. The results then can be compared to contemporaneous (previously acquired by an AF) near-existential or existential quality identity information supplied (and carried) by a device arrangement's secure EBInet modular component so that the component (e.g., a NIIPU and/or a related EBInet device arrangement) can perform comparative matching verification between such smart device operatively simultaneous (i.e., currently acquired) biometric identification result set and such modular component carried, contemporaneous nearly existential or existential quality biometrically based, identification information. Such EBInet modular component and EBInet compliant parent concurrent identification information process sets may provide results that are complementary to, and more secure (e.g., more reliably accurate) than, identity information processes and/or other functions of a parent mobile smart device arrangement operating alone. Further, such a complementary comparison/matching process set can be invoked when, for example, a parent smart device initiates an application which requests an identity verification process, for example, managed by an EBInet modular component and using a component's carried, contemporaneous nearly existential or existential quality biometrically based identification information. Such a verification process may further require such smart parent device enabling or performing an operatively current biometrically based identification of a user when initiating such a parent device application, and may further operate or otherwise participate in a matching/validation process set using such EBInet modular component's, carried biometrically based contemporaneous user identification information.

In some embodiments—particularly embodiments where a modular component is, for example, easily insertable and removable into an EBInet compliant smart device arrangement such as a smartphone with an EBInet compliant card slot—a modular component EBInet arrangement can be replaced daily, weekly, monthly and/or on one or more other periodic and/or on an event driven basis (e.g., events based on security concerns such as the presence of known one or more vulnerabilities and/or occurrence of one or more human, machine, and/or programmatic behaviors). Such a modular component can be replaced with a new or factory reset modular component, where such hardware arrangement may include one or more NIIPUs functioning, at least in part, as respective Identity Firewalls. Such provisioning of, for example, a clean, up-to-date, and "factory set" modular component on such periodic and/or event driven basis can help ensure that if any such EBInet device arrangement instance and/or design version is compromised or otherwise vulnerable, it can be replaced with an uncompromised instance. Such insertion and replacement process sets may involve plugging an EBInet modular component (e.g., a NIIPU and/or RIIPU arrangement) into, and/or removing it from, a standard EBInet compliant I/O interface slot, such as an EBInet compliant authorized permutation of a USB port or SD (e.g., microSD) card slot.

In some embodiments, an EBInet forwarding device arrangement, such as an EBInet compliant smartphone RCUFD, can operate as a transparent to device arrangement user, mobile and carriable/wearable, identity information source. When operating as an identity information source, such an RCUFD arrangement can enable transparent to user providing of (e.g., communicating of) at least in part biometrically based (e.g., existential quality based) contemporaneous identification information in satisfaction of a candidate receiving device's computer resource and/or event/activity identification information related requirements. Such identification information may, for example, be transmitted from an RCFD to a receiving RD in satisfaction of RD communicated receiving device requirements, such as in response to a received from an RD polling or hailing message requesting or requiring identification information to be communicated by a carrying device (e.g., such carrying RCFD) to such polling or hailing RD. Such identification information can be, in an EBInet arrangement, based, at least in part, on relevant at least in part biometrically based EBInet device arrangement stakeholder person (e.g., owner and/or CertPer) and/or user identification information comprising one or more securely maintained and contemporaneously available unique at least in part nearly existential or existential quality, at least in part biometrically based identifiers and securely related one or more identified subject matter's (e.g., owner's and/or CertPer's) attributes. Such identification information can further be provided in an information set that securely includes policy rules and controls, which may be at least in part contextual, such as responsive to respective identification information receiving devices' respective event/activity set requirements/requests, where at least a portion of policy rules and controls can, for example, comprise rights management rules and controls for such identification information usage related computing event/activity governance.

In some embodiments, a given EBInet forwarding device arrangement can carry a plurality of persons' at least in part biometrically (near-existential or existential quality) based identification information sets, where such plurality of persons may comprise (1) two or more stakeholder person owners and/or agents (e.g., owners, and/or CertPers), (2) two or more non-stakeholder device person users, and/or (3) at least one stakeholder person and at least one device non-stakeholder user (a stakeholder person can also be a device user, though such person may only be represented by one at least in part biometrically based identification information set). When an EBInet arrangement employs, for example, an inserted in, embedded in, and/or wirelessly connected to, parent one or more device, hardware modular component arrangements integrated with a smart device such as a smartphone, and/or alternatively uses, for example, an iPhone sandboxed and Secure Enclave supported on IOS, or an Android ARM TrustZone trusted execution environment, RCF application, and/or the like, the contemporaneously carried identification information set stored in/for the smartphone modular component and/or such an RCF phone application can be confirmed (though not existentially confirmed) by use of a smart device's (e.g., a smartphone's) native biometric identification arrangement. For example, such an arrangement can use the Touch ID and/or Face ID capabilities found on an Apple iPhone.

In some embodiments, storing of contemporaneous, assiduous, device-native, at least in part biometrically based identification one or more sets before multiple, anticipated uses, enables respective matchings (e.g., in accordance with EBInet arrangement specification) between such native, more recent biometrically based identification and stored, EBInet near-existential or existential quality contemporaneous at least in part biometrically based identification information. This process set enables determining which of device stored (e.g., registered and EBInet identification information identified) users' respective contemporaneous information sets match such more recent at least in part biometrically based identification information. EBInet arrangements can further support, in some embodiments, transparently acquiring, providing, carrying, and/or using EBInet at least in part biometrically based identification information of a device arrangement user (based, for example, on such matched information sets) during a specified time period, for a number of events, and/or for one or more specified types of events/activities, without operatively current user intervention and in accordance with an EBInet arrangement's specified policies. For example, an EBInet RUD arrangement can receive identification information from an RCFD and automatically, at least in part biometrically, sign all emails sent for a following short contemporaneous period, such as one hour or day, and/or for a certain budgeted number of REAIs, such as 20 emails, and/or as managed by other, context-based policy one or more sets.

In some embodiments, use of both EBInet, and smart device-native, biometric identification capabilities can provide improved security through:

(1) the greater accuracy/rigor of a contemporaneously acquired EBInet AFD arrangement produced, RCFD arrangement carried, near-existential or existential quality biometrically based person identifying identification information set that is securely associated with securely maintained attributes such as EFs and/or Creds, and when desired or required, such as specified:

(2) the use of smart device native (e.g., operatively simultaneous) to provide a liveness evaluation/confirmation that the person identified by such contemporaneously nearly existential or existential quality acquired biometric identification information carried by an RCFD is the same person having physical possession of such device.

In (2) of the preceding paragraph, such smart device information can provide more recent testing (than a contemporaneous biometric identification) regarding the identity of a device user and therefore the device and its carried information is less likely to have been physically misappropriated. Such security capabilities can respectively, or in combination, be used in authorizing and/or otherwise governing one or more computing processes and/or event/activity sets, such as used in creating/publishing an REAI identification information set. Combined use of AFD biometric identification capabilities in the form of RCFD carried such biometric and attribute identification capabilities and the RCFD's respective smart parent device-native biometric identification capabilities, can, in some embodiments, be used to directionally validate (where one device authenticates and/or otherwise validates another), or to mutually validate (where validation can comprise validating EBInet and parent smart device, user and/or device identities (and/or, for example, securely associated one or more attributes)).

In some embodiments, an EBInet arrangement combined use of biometrically based identification information employs (1) contemporaneous biometrically based information acquired by an EBInet AFD arrangement and forwarded to an RCFD receiving, carrying, and further forwarding arrangement; and (2) biometrically based information produced during native smart device sign on (e.g., sign-in, unlocking device) and/or otherwise acquired. Such combined use of biometrically based identification information can be employed (i.e., can be used, carried, and/or forwarded to an RD arrangement) to control, such as satisfy specification(s) requirements for, one or more aspects of REAIs, such as permissions to perform respective events/activities (e.g., accessing a database, opening a document or a secured door, executing a program, authorizing a transaction (banking, shopping, and/or the like), for example in accordance with securely enforced REAI rights management specifications).

In some embodiments, combined use of such biometrically based identification information can also be used to authorize and/or otherwise enable producing REAI at least in part PERCos and/or EBInet biometric identification information sets. For example, a smart device arrangement's contemporaneous and/or operatively simultaneous biometric identification information, and EBInet device (e.g., RCFD) carried contemporaneous information set, can include and/or be securely associated with policy information that requires matching (cross validation/authentication) to authorize and/or use associated EBInet near existential or existential quality identification information's RCFD arrangement such information carrying, usage, forwarding, storage, and/or the like events/activities. Such a configuration can provide more "current" to usage event validation one or more factors that demonstrate, for example, that a smart device arrangement's modular component contemporaneous near-existential or existential quality biometrically based identification information is in the possession of the contemporaneously, existentially, identified person. The preceding allows/supports EBInet contemporaneous near-existential or existential quality biometrically based identification information to be employed in accordance with user/stakeholder desired, selected, and/or specified one or more reliability rigor levels, where such rigor levels may have associated rules and controls for governing respective native smart devices' and/or respective associated EBInet device arrangements' biometrically based identification/authentication capabilities.

In some embodiments, EBInet contemporaneously carried biometrically based identification information can be used (e.g., required to securely provide an RCFD user's identity) for a device arrangement's, such as a smart device's (e.g., smartphone's or smartwatch's, and/or the like), sign-in, usage in payment authorization, and/or other user identification related device event/activity related control and/or auditing. For example, in some embodiments, EBInet biometric acquisition can be used in combination with native biometric identification functions of a smart device (e.g., smartphone) to enable smart device sign-in (such as biometric sign in) by matching the identity of an EBInet modular component user's CBEIIS or CIIS identity token (an IIT), with corresponding user identity information (e.g., corresponding to or comprising an IIT) stored within such smart device (when such identity information (e.g., tokens) match, they may mutually authenticate). In such embodiments, the sign in biometric identification process of a smart device can confirm identification information regarding the identity of an RCFD, and/or its user's identifier and one or more associated identification attributes (such attributes comprising stakeholder, user, and/or composite entity (e.g., fused person/device) identity components). Such identity confirmation can involve at least in part matching biometrically based identification information, and/or information derived therefrom, of a smart device's user, with an EBInet modular component arrangement's contemporaneous, carried component, corresponding user biometric identification information set, whereby, for example, the smart device and the modular component user's at least in part biometrically based identification information sets' matching is used to at least in part authorize/allow an event/activity instance (failure to match may disallow an event/activity instance). Such combined EBInet identification information, for example, may be used for login (i.e., interchangeably means sign on, sign in, log on, and/or the like), and may be augmented with other authentication/authorization methods such as combined use with password and/or time-based passcode information, the foregoing for enabling authorization processes for, and/or the other governing of, computing arrangement event/activity instances.

In some embodiments, such sign on biometric, password, and/or other provisioning of authentication/governance information can, for example, provide second factor (or second and third factor) in conjunction with such smart device's RCFD or other EBInet device arrangement's at least in part contemporaneous biometrically based nearly existential or existential quality identification information set, such combination of identification factors used for confirmation of the identity of an EBInet compliant, smart device arrangement. Such multiple factor use can provide information requisite for a login process to be successfully performed. Such a plural, separate factor arrangement can provide identification/authentication of a "current" smart device's (e.g., smartphone's) user. In such circumstances, a login identity can be securely acquired and maintained for contemporaneous, subsequent use, e.g., until device sign-out (e.g., terminate an event/activity) or otherwise for a specified time period. Such a use of biometric identification as a login component can provide a recent contemporaneous and/or operatively simultaneous at least in part biometrically based identification information set which may be retained (e.g., during a session and/or as audit information).

In some embodiments, an EBInet parent device arrangement's, such as a smartphone's, use of native login/sign-on biometric operations that identify such device arrangement's user, may be used to match with an EBInet RCFD (and/or, for example, NIIPU) arrangement's registered and carried user's EBInet corresponding IIS information. Such matching can confirm device "contemporaneously current" possession by, for example, an EBInet arrangement contemporaneous, biometrically based, composite at least in part biometrically based IIS registered user, where user registration information at least in part can for example comprise near existential or existential quality user identification information, device identification information, and stakeholder identification information for a relevant device and/or user. Such information can include device and/or stakeholder/user pairing and/or other grouping information and such registering may be conducted with a registration organization administrative authority and/or cloud service.

In some embodiments, such confirmation may be required to enable an RCFD arrangement to forward to an RUD, or a receiving RUD to use, EBInet at least in part biometrically based identification information, where such biometrically based identification information may take the form of, for example, a token (such as an IIT) and may or may not carry biometric user, owner, and/or CertPer (e.g., stakeholder agent) information per se (but may take the form of a confirmed, encrypted, representative identity information set such as a unique identifier number and/or other code representing, at least in part, such forwarding RCFD arrangement's user). Such use of both smart device-native, and modular component, biometric identification information representation capabilities, can provide two or more factor recognition and/or confirmation/authentication of a smart device's current user, owner, and/or the like, and enable or otherwise support authorizing, for example, device, application, and/or event/activity instances, such as communication of at least in part biometrically based identification information and/or device activation login.

In some embodiments, EBInet multiple biometric factor identification and/or authentication can be employed in accordance with policies that are situationally dependent, which may satisfy a specified, required, security condition set, such as a rigor level (e.g., a 9 out of 10 for highly sensitive intellectual property work, a 7 out of 10 for corporate business planning emails, or a 67 out of 100 to open an SIMC's locked door and physically enter a serialization EBInet managed container). For example, an EBInet RCFD and/or other RD arrangement can enable an at least in part EBInet device arrangement managed event/activity set that supports at least in part biometrically based identification information event/activity governance of provisioning, decrypting, auditing, accessing, charging/transacting payment for, and/or other related event/activity functions, in satisfaction of user and/or stakeholder (e.g., administrators, and/or owners) specification (e.g., policy) requirements (for example, compliance with stakeholder purpose specified rules and controls). For example, for a given type of email activity—e.g., in accordance with a secure specified event/activity contextual purpose—an EBInet RCFD forwarding arrangement and/or RD receiving arrangement might require, for example, two factor security validation, such as the availability of: (1) a smart device-native non-existential biometric information set based identification information set acquired by a smart device for a session sign on (sign-in) process and subsequent identification confirmation, and where such sign on was performed within a specified time frame such as within four hours of a current time, as well as (2) an EBInet AFD acquired near-existential or existential quality, at least in part biometrically based identification information set, acquired previous to such smart device biometric information acquisition, but during a specified, longer contemporaneous time window, such as during the same calendar day or within a 24 hour period of current time. For more sensitive, such as corporate commercial, confidential intellectual property related, activities, the same policy set for a user might require the native biometrically based information to have been acquired with the last 15 minutes, and the EBInet AFD biometrically based identification information within the last 5 hours or elsewise as specified, and/or acquired by one or more AFDs, such as AFDs that meet certain ownership (such as a specified corporate employer), specified rigor (e.g., reliability, trustworthiness) level, and/or other specifiable criteria.

EBInet identity arrangements, such as modular component RIIPU and NIIPU arrangements, can be employed with, including for example wirelessly connected to and/or network interfaced with, and/or, as applicable, embedded or otherwise inserted within, EBInet compliant device one or more arrangements. Such device arrangements can comprise, in some embodiments, compliant laptops, tablets, mobile phones, desktop computers, servers, robots, manufacturing control and/or process arrangements, vehicles, household and/or commercial—such as home and business—appliances, including, for example, physical object usage governance arrangements. Such arrangements may include smart door locks and/or usage auditing arrangements, refrigerator control mechanisms, filing cabinet locks, turnstiles, elevators, escalators, medicine and/or chemical and/or other sensitive items containment access/usage management arrangements, sensor-based security and/or other traffic monitoring and/or governance systems, SVCC container access, storage, and conveyance arrangements, and/or other such arrangements' respective operations' auditing and/or management instances. Such appliances and/or other EBInet compliant arrangements can further perform, in some embodiments, less rigorous (than EBInet) non-near-existential user/stakeholder biometric identification to ensure that, for example, RCFD forwarded identification information (e.g., a CIIS IIT or an EBIDoc delivered in an EBIbox) corresponds to a real-time recognized identity (to govern events/activities and minimize and/or identify RCFD arrangement theft). For example, a door knob and/or lock (e.g., a door lock) could support ultrasound and/or other biometric identification information capabilities (e.g., spectral, temporal, and/or spatial), such capabilities used (as an additional factor) to confirm RCFD contemporaneous, e.g., composite RCFD IIS/IIT carried biometrically based and other device identification information.

In some embodiments, EBInet device arrangement operations can be governed in accordance with user and/or device contextual variables, such as locking down (e.g., at least in part or permanently terminating) a user's laptop and/or its EBInet (e.g., RCFD or NIIPU) arrangement) if the user moves to one or more certain physical locations/areas, such as to a specific room or facility location, and/or to a specified distance from and/or in a signal strength lowering to/passing below a specified threshold (e.g., Bluetooth) received from, for example, an EBInet RCFD (e.g., EBInet compliant smartphone) carrying/broadcasting contemporaneous at least in part biometric identification information. Such contextual variables can include receiving certain broadcast identity information from a WiFi, cellular, and/or like wireless arrangement demonstrating a distance from the broadcast source and where, for example, a certain signal strength instance or signal strength persistency can cause a disabling, in part or in whole, of any such RD arrangement and/or function and/or program thereof and/or an associated, governed device's (e.g., laptop's) function. Such distance and/or positioning can be measured, for example, by signal strength, GPS locator information, Wi-Fi router triangulation, and/or other locating/positioning EBInet arrangement's information. Such position information may comprise physical location/position RCFD's relationship with one or more "linked", such as securely registered as a pair or other group, RD arrangements. For example, an RCFD's NIIPU modular component in a laptop or other smart device, such as cell phone or other portable RCFD arrangement, can incorporate or operate a device arrangement mobile carried or worn RCFD motion detection arrangement, such that if a user and his/her RCFD are moving away from a specified RD arrangement, a signal strength detector and/or other signal variable measuring arrangement in either or both device arrangements can measure and/or otherwise recognize such movement and/or other measured variable(s) and cause one or both of such RD arrangements to go into a secure "sleep", or otherwise limit one or more operations if a specified parameter set is observed/monitored. Such limiting or termination of operations can result from one or more at least periodically interacting/identifying EBInet device arrangements recognizing distance and/or inappropriate movement away from (conflicting with specified one or more requirements) a user who's carrying or wearing an RCFD. Such a violation of a specification set can at least in part trigger one or more relative position arrangement transition responses, resulting in limiting or termination of one or more operations of one or more interacting device arrangements based upon one or more change in positioning variables and/or other conditions. This RD arrangement activation/deactivation capability can be employed with a wide range of RD, such as RUD, arrangement types and can be used to control, that is, for example, turn on and/or off, compliant EBInet associated, electronically controlled device arrangements (e.g., one or more computers, manufacturing machines, vehicles, communication devices, household and/or commercial appliances, robots/drones, and/or the like).

In some embodiments, EBInet supports one or more EBInet hardened device arrangements, and/or EBInet related secure organization and/or cloud service arrangements, providing resource and/or event/activity instance suitability management for securely publishing, otherwise preparing, and/or using, one or more portions of at least in part biometrically based identification information for identifying, prioritizing, evaluating, authorizing, authenticating, provisioning, and/or otherwise managing processing of resource and/or event/activity instances—by and/or for users and/or users' respective computing arrangements.

In some embodiments, EBInet hardened device arrangements' resource and/or event/activity set (an EBInet set is one or more) suitability management employs security hardened, tamper and inspection resistant, modular component protected processing and storage arrangements, where such arrangements can, at least in part, for example, comprise IF, AM, NIIPU, RIIPU, and/or the like arrangements and may support, for example, one or more of virtual machine and/or other sandbox operating environments. Such security hardened arrangements respectively enable secure EBInet computing isolation arrangements, that support, in some embodiments, CPFF (contextual purpose firewall framework) arrangement implementations.

In some embodiments, such processing and/or information storage includes support for:

(a) Secure publishing of resource and/or event/activity instances' at least in part respective biometrically based identification information sets, including securely publishing:
   i. EBInet identification information sets for intangible (i.e., information in the form of computer digital information) subject matter instances regarding their respective documents, programs, database instances and data modifications, videos, images, audio, digital currency, and/or the like, and/or
   ii. EBInet tangible subject matters' respective identification information sets (where a subject matter is an at least in part physical entity). Intangible identification information data instances may enable, interact with, and/or locate their respective subject matter tangible physical embodiments (e.g., respective devices, components, humans, and/or the like). Such identification information instances may, for example, be incorporated within, and/or be operated in conjunction with, and may be used to at least in part describe, locate, and/or initiate (start, activate, instantiate, and/or the like), tangible subject matters' respective interfaces, device drivers, participant web addresses, operative content, and/or the like.

(b) Secure processing of at least a portion of such identification information sets and/or information derived therefrom, for, as responsive to user instructions, identifying, prioritizing, evaluating, selecting, authorizing, authenticating, provisioning, process managing, matching, publishing, and/or registering, as applicable, at least a portion of:
   i. such identification information sets,
   ii. information sets derived from one or more of such identification information sets, and/or
   iii. respective information sets' subject matter instances (resource and/or event/activity instances) and/or portions thereof, and/or subject matter associated operative (e.g., for processing and/or auditing management) information.

7 Trusted Path

In some embodiments, EBInet arrangements employ smart device and/or other non-EBInet arrangement computing devices, such as a smartphone, smartwatch, laptop, and/or the like, one or more trusted path implementations. Such trusted path implementations provide additional tamper resistant reliability-isolating user instructions from remotely sourced malware and helping ensure that user provided instructions to users' respective smart devices reliably reflect respective authorized and/or otherwise identified users' intents. Such use of trusted path implementations, when combined with operatively simultaneous biometric identification user presence-demonstrating process sets, establishes user-instructions as authentic, i.e., as having been provided by specific one or more authorized and/or otherwise valid users.

In some embodiments, where an EBInet RCFD arrangement, AFSD acquired and/or derived contemporaneous at least in part biometrically based identification information set is bound to a resource's publishing event/activity information set, where such biometrically based identification information is, for example, securely included within such set's information that characterizes such publishing event/activity instance. Such binding can result from an intentional certification of such an REA instance set by a user. Under these circumstances, it may be important to ensure that the user has explicitly authorized such certification. In particular, if a user's computing arrangement has been in some manner "hijacked" by malware, the computing arrangement may falsely represent a user's intention to certify. In the event of, for example, a zero-day attack on a user's EBInet compliant smartphone or laptop or other computing arrangement, a remote, malicious computing arrangement may control a user's computing arrangement and use a contemporaneously acquired biometric identification information set when the user is not actually present and intending such use. An EBInet trusted path implementation can avoid such an improper use of a user's identity information to falsely, maliciously certify a resource and/or event/activity set.

Such a misuse of contemporaneous identification information (for example, when a device is controlled by a malevolent party) may be prevented through a combination of one or more proactive user processes that combine, for example, the use of a trusted path with operatively simultaneous, smart device (e.g., parent device arrangement) biometric identification. Such identification processes can employ respective smart devices' native biometric identification capabilities and, within the accuracy/rigor capabilities/limitations of such arrangements, prevent improper use of EBInet carried identification information. Such a user presence/trusted path capability set can serve as a significant trusted computing function, combining contemporaneous at least in part near existential or existential quality biometric identification information with subversion resistant expression of user intent.

Under some circumstances, if an EBInet at least in part biometrically activated trusted path is not implemented or used, information such as a user's personally identifying contemporaneous at least in part biometrically based identification information carried (e.g., as an IIT) by an EBInet RCFD might be misused (e.g., if the RCFD's user didn't fully exploit other EBInet and PERCos capabilities) and, for example, be maliciously bound to an email that incorporates, directly and/or indirectly, malware (e.g., a malicious bot) using malicious content substitution or a malicious content production event. This misuse could occur if a user's computing arrangement is remotely controlled and is used to produce one or more malicious emails sent to other parties/computing arrangements.

EBInet, in some embodiments, can employ an interface path that involves a user performing a very simple, easy gesture, such as a thumbs up, shown to a smart device's biometric sensing smart device "native" camera arrangement, and/or such user may express a verbal passphrase/word that is monitored by a microphone (such as expressing a natural language word or phrase such as "go", "smart dolphin", "publish", "save" and/or "event," and/or employing an oral symbolic expression that doesn't correspond to a word in a user's natural language, e.g., "glyxx"). Such user's one or more monitored actions' information sets can be content/intent interpreted and biometrically authenticated by one or more device arrangement native sensor arrangements, and/or, for example, may result from the use of a trusted path dedicated standalone, or integrated into, smart device arrangement, where such device may have one or more pressure and/or position (e.g., capacitance and/or image) sensitive input "keys", where use of such keys represents one or more specific user intended actions for one or more computing events, such as sending an email. In an embodiment, one or more keys could be pressed (activated) at a time to instruct the conducting of different activity categories (e.g., saving a document, sending a text, publishing software, and a user interacting with a user's secure banking transaction website).

In some embodiments, such a trusted path arrangement's keys can be user programmable for their respective correspondence to activity related instruction, and can require the presence of an EBInet contemporaneous biometrically based identification information instance (e.g., of such user) for such programmed keys use. It may further require the presence of one or more at least in part biometrically based identification instances associated with a user's smart device (e.g., smartphone), where such device's identification information set may comprise, at least in part, at least one owner's—and/or owner's, manufacturer's and/or other value chain party's employee(s)/agent(s)—biometrically based information (e.g., provided as CertPers during their performing one or more SVCC roles during manufacturing and/or other commercial one or more events/activities), and/or such user's biometrically based contemporaneous, and/or user's native operatively simultaneous, information sets, where the foregoing biometrically based information may be bound to one or more device identifying secrets.

In some embodiments, a trusted path intent interpretation may be part of a challenge and response process set where an EBInet compliant device arrangement secure trusted path display requests, for example, "confirm send email" on an EBInet isolated small display screen and the user then acts accordingly by giving (or not giving) a confirming response, such as described herein and where such challenge may be unpredictably (e.g., pseudo randomly) selected or otherwise generated. In such a special purpose keys implementation, the keys may employ a secure, isolated circuit pathway to such a modular component embedded arrangement to support a highly secure trusted path implementation and help prevent malware from miscommunicating user intentions.

In some embodiments, an EBInet trusted path confirmation of a user's intentional use of such user's at least in part contemporaneous biometrically based identification information as biometric certification of a resource and/or event/activity set may enhance reliability by employing a trusted path design element in conjunction with operatively simultaneous biometrically based identification information, where operatively simultaneous identification information is acquired using a parent device (and/or EBInet device dedicated) EBInet compliant internally packaged sensor and/or emitter arrangement, and/or a sensor and/or emitter arrangement that is external to its securely associated EBInet device package arrangement (e.g., may be located somewhere else in the user's environment). Such sensor and/or emitter arrangements, in some arrangements, can be designed to provide highly tamper resistant secure processing, sensitive information communication, and information storage (secure sensors may, for example, "internally" store at least a portion of sensed, audited, biometrically acquired signal information). Such sensor and/or emitter arrangements can be employed as part of an EBInet trusted path arrangement (e.g., as compliant with policy). Trusted path arrangements can be securely registered with a network arrangement administrative authority, and/or a cloud service, such as registered as securely grouped (e.g., paired or otherwise associated) with one or more EBInet arrangement device, service, user, and/or, for example, administrative, implementations. In some embodiments, such use of an EBInet compliant, highly secure pathway establishes a trusted path existentially or near-existentially identified device arrangement user, who is a biometrically verified and/or otherwise authenticated person, as responsible for, and biometrically observed and/or audited as performing, a resource and/or event/activity instance verification/certification process set, such as validating an REAI IIS publishing event/activity resulting content set. In some embodiments, such as certain embodiments that employ an EBInet embedded or inserted modular component arrangement, an external sensor and/or emitter arrangement trusted pathway hardware and/or process set may be hardened against attack and implemented using a very small operative surface (from a computing security standpoint presenting minimal attack opportunity) and providing isolation from, for example, a smart parent device's operations. For example, an audio, image, and/or pressure responsive (e.g., button/key) sensor can, in some embodiments, employ a trusted, hardened hardware and software design that implements a protected pathway to an EBInet security hardened arrangement (e.g., a RIIPU and/or NIIPU and/or other protected processing and/or clock arrangement), providing a highly secure, trusted pathway for communicating user activity affirmation/certification.

EBInet trusted path implementations are based upon secure, direct communication of a user's intentional signaling to a secure EBInet device arrangement that an event/activity instance will occur, is occurring, and/or has occurred, as applicable. Such signaling demonstrates that a user is initiating, and certifying, an event/activity, such as publishing a resource and/or event/activity identification information set. In some embodiments, such signaling may involve a very low overhead to user action whereby a user presses, for example, a button/key that signals such user's affirmation of an event/activity. Information regarding (e.g., signaling/declaring) the initiation and/or confirmation of an event/activity may be displayed on some form of a user informing display (and/or signaled audibly, conveyed by a vibration set, and/or the like), where such user's device screen and/or other display may display (and/or the device may audibly and/or otherwise communicate) information indicative of the performance of, or directly descriptive of, an event/activity instance. Such indication may comprise, for example, displaying information regarding the type of certification performed (publishing a specific document and/or an IIS for such document), and/or other affirming of an EBInet arrangement related action set, such as publishing/sending an email or publishing/saving a file, where, for example, such event/activity involves the secure creation of an at least in part biometrically based email IIS or document IIS that documents (e.g., for auditing and/or evaluation of) such an event/activity and/or otherwise describes such document or email descriptive and suitability informing information.

For example, such signaling that a publishing or saving event/activity was, is being, and/or will be, conducted, can confirm to a user that their intention to initiate an event/activity was, is being, and/or will be fulfilled. Such user intention and/or certification can be demonstrated/recorded by the secure cryptographic binding of at least a portion of user's identification information set (including at least in part, at least a portion of such user's biometrically based identification information) with such an event's/activity's REAI identification information set. Such binding of information can create, for example, a CIIS comprising identification information of both the event/activity REA instance and an associated user biometrically based identification information set, where such biometric identification information is used to certify the associated REAI information.

In some embodiments, a trusted path signaling EBInet arrangement employs special purpose trusted path hardware providing, for example, a special purpose user intent one or more signaling buttons. For example, a smart device, such as a smartphone, can support a case surface button (which may, for example, be a capacitance responsive key) that is conveniently available for pressing once, or using a code arrangement (e.g., a shorter timing and/or longer timing pressing action set and/or a sequence of such button pushes) indicating such user has initiated an EBInet or other PERCos email (and/or other) communication process set. Such button signaling may be performed, in some embodiments, while a user is looking at his/her smart device's, such as his/her smartphone's, screen. In some embodiments, such signaling can employ display-based one or more virtual buttons designed such that a portion of the screen is consistently, or temporarily, operating (and was designed to operate) in a secure trusted path mode using such one or more dedicated, screen-based keys. Such signaling can be performed to instruct an EBInet device arrangement to use an at least in part nearly existential or existential quality EBInet contemporaneously acquired, or such an EBInet contemporaneously acquired and a device's native operatively simultaneous, at least in part biometrically based identification information set, in performing an REAI related EBInet identification information related trusted path instruction operation, such as a computing event/activity authorization authorizing the performance of IIS publishing to, and/or authorizing registration of such IIS with, a TIIRS arrangement, or authorizing the entering of an SVCC EBInet managed shipping container.

In some such embodiments, at operatively the same time, a user can be viewed by his/her smartphone's video sensor arrangement, which can acquire, and, for authentication, affirm a party's biometric identification information, coincident with the pressing and/or other activating of a trusted path, security hardened button/key mechanism. Such activating may occur, for example, approximately concurrent with the completion of a device arrangement (smart device) event/activity, application function, for example performing a "send" email or text, or "save" document, or "publish" code, or "access/play" a video. In some embodiments such an application function result, such as sending an email, can be operatively concurrently held as pending while an EBInet compliant process set takes place, such as securely acquiring and/or employing user at least in part operatively current biometrically based identification information and cryptographically binding such information, or information at least in part derived therefrom, with at least a portion of:

1. the output of such application function (e.g., subject matter produced by an event/activity),
2. an at least in part encrypted, contemporaneously at least in part biometrically based user identification information set, and/or an EBInet device arrangement's composite (human and device) fused-identity identification information set, and/or
3. an identification information set representative of at least a portion of a corresponding event/activity (e.g., published or emailed) application output.

In some embodiments, a button/key user-intention-conveying trusted path arrangement securely operates with, and/or includes, for example, one or more camera and/or microphone and/or screen based (e.g., capacitance), sensor arrangements (e.g., facial, and/or finger or palm vein, biometric identification arrangements). Such sensors can comprise one or more cameras, microphones, and/or other sensors, as respectively found on, for example, mobile communication devices such as tablets and/or smartphones. Such sensor arrangements may be, for example, designed to be used selectively, and/or collectively, with EBInet compliant (e.g., EBInet dedicated and/or smart device-native) protected processing environments (such as for processing sensed information within PPEs operating within respective RIIPUs and/or NIIPUs) to ensure secure processes for sensor trusted path delivered user instructions. Such trusted path delivered instructions can, in some embodiments, be enabled through the use of smart device-native user biometric identification sensor arrangements (e.g., facial, finger vein, and/or cardio signal). Trusted path arrangements can employ at least a portion of an EBInet parent device's general purpose biometric identification and/or authentication related hardware and software capabilities including, for example, such device's processing and storage tamper and inspection resistance techniques such as a smartphone's native secure sandbox and secure enclave (and/or the like) capabilities. Such device-native capabilities can be employed to recognize and process user trusted path communicated instructions and/or to authenticate a user's presence and the authenticity of a provided trusted path instruction set (e.g., to send/launch a secure, usage governed EBInet subject matter email and IIS in an EBIbox).

In some embodiments, an EBInet device arrangement can employ a limited set of smart device native resources, such as (a) sensor and/or emitter one or more arrangements, and/or at least a portion of its (b) network and/or other communication arrangement element(s) (e.g., antenna, networking/communication hardware), and/or (c) device arrangement power source(s) (e.g., for supplying battery energy to the EBInet device arrangement), and/or the like. Such arrangement smart device native resources can cooperatively operate with a secure, for example, EBInet modular component arrangement (such as a NIIPU), and can employ a smart device at least in part EBInet dedicated, operatively isolated trusted path for conveying trusted path instructions to such modular component arrangement (e.g., through pressing a button/key, video capture of a user performing a thumbs-up motion/activity, microphone sensing a user saying "yes" in response to rendering of "send mail?", and/or the like).

In some embodiments, trusted path intent communication can communicate biometric identification information directly, using a secure isolated pathway, to (and/or from) an EBInet smart device embedded, hardened identity firewall modular component. Such component can employ an at least in part security hardened EBInet modular component identification arrangement supporting hardened, secure and isolated, biometric identification related trusted path functions that support authentication/verification that an EBInet related activity was confirmed by a party whose at least in part biometrically based nearly existential or existential quality identification information matches anticipated, stipulated, registered and stored, and/or authorized identification information of an activity confirming human.

In some embodiments, a parent smart device (e.g., smartphone) EBInet compliant arrangement and an EBInet dedicated, embedded and/or otherwise included modular component and/or the like isolated, tamper resistant, and highly secure device arrangement, can share one or more security hardened smart device component technology arrangements and/or each can employ parallel (i.e., same function) respective such one or more component technology arrangements. Such shared and/or operatively duplicative one or more component technologies may include:

1. facial, fingerprint and/or other sensor, and/or emitter, one or more arrangements, where, for example, cryptographic capabilities are securely embedded into respective, physically and operatively hardened sensor and/or emitter arrangements, supporting secure operations and encryption of communications between sensors, emitters, and/or protected processing environments (sensor and/or emitter arrangements may respectively include respective protected processing environments, secure clocks, and/or communicate with respective EBInet modular components such as RIIPUs and/or NIIPUs),
2. one or more energy arrangements, such as battery arrangements, that provide power to such native and/or EBInet device arrangements,
3. one or more HSMs and/or other secure memory arrangements,
4. trusted path communication one or more pathways (e.g., trace pathways) and/or information display arrangements, and/or
5. one or more cellular, Bluetooth, Wi-Fi, NFC, RFID, physical antenna, and/or the like communication technology arrangements.

In some embodiments, shared and/or operatively duplicative resources, such as smart device sensors and emitters and/or modular component EBInet dedicated sensors and emitters, can be used in tamper resistant, secure shared and/or redundant/comparative modes. In such embodiments, the same trusted path instruction arrangement can operate in conjunction with one or more of such sensor and/or emitter arrangements and securely communicate, for example, to both native device EBInet compliant, and EBInet modular component dedicated, arrangements. Such arrangements' identification determination results can be similarity matched to assess whether they produce the same biometric identification result. Such use of redundant/comparative modes supports EBInet modular component and native parent smart device operations, where, for example, a trusted path arrangement (and/or respective sensors, emitters, communication modules, and/or antennas) is switched between a general purpose smart device mode, and a very small exposed operating surface, limited function, secure EBInet modular component governed mode. The use of differently implemented biometric identification/analysis arrangements provides a multi-factor tamper recognition design.

In some embodiments, activation of a button/key to express user intention may take place immediately preceding, concurrent with, and/or immediately subsequent to, a user's initiation of an event/activity (e.g., such instruction by user action, such as selecting a publishing command option on a menu). Such event/activity might constitute, for example, a user initiating a file save (whereby such saving comprises, for example, preparing a secure, cryptographically published information set in the form of an EBIbox that has both such file and a securely associated IIS). Alternatively, such event/activity could constitute a communication process set. In either case, confirmation of such publishing and/or communication event/activity may in part employ a display signal, vibration signal, and/or audible signal reliably communicating to such initiating user that such an event, and/or event type, has occurred.

EBInet trusted path implementations may, in some embodiments, be employed with EBInet and/or other PERCos compliant one or more applications operating using an EBInet smart device arrangement's native sandboxing and/or other security capabilities. Such an implementation helps ensure context appropriate, protected (including isolated), and/or governed, operation of resource and/or event/activity instance sets including, for example, REAI associated stakeholder and/or user and/or device, identity related operations such as auditing/provenance, and/or rights management and/or other rules and controls management. Such designs can be implemented as securely as is practical for a given implementation context and have as small an exposure pathway from a trusted path sensor arrangement to its associated securely isolated, modular component (such as NIIPU internally processing sandboxed operations) as is contextually practical.

In some embodiments, an EBInet device arrangement, such as a parent smartphone with an embedded and/or otherwise securely integrated, hardened and secure EBInet modular component arrangement, can, for example, in response to the presence of a contemporaneous at least in part biometrically based IIS and/or an operatively simultaneous user biometric authentication, display on such a smart device's own display and/or on an embedded and/or otherwise included modular component arrangement's own secure, dedicated display (such as a primary display or an auxiliary display, where such display may be physically external to an EBInet device's modular component packaging arrangement), a password and/or other instruction set, where such instruction set pseudo-randomly, or otherwise unpredictably, changes over time and/or changes based on one or more other variables. Such an arrangement can specify an instruction, for example, to enter a one-time password or other key entered information set, that the user must enter using a trusted path key arrangement in order to authorize/perform an event/activity. Alternatively, such instruction set may instruct a user to make a gesture that is biometrically sensed. Such instruction sets may augment respective EBInet at least in part biometrically based (e.g., contemporaneous) identification information sets where both such at least in part biometrically based identification information sets and such instruction sets (as well as, in some embodiments, operatively simultaneous parent device arrangement biometric identification information) are used to authorize and/or initiate respective event/activity instances (e.g., enabling user entry to a room or facility, publishing an REAI IIS, entering a web based data store, performing an online purchase transaction, authorizing an SVCC action, decrypting a received email, and/or the like). Such instruction set action information, for example displaying a word to be vocalized by a user and/or providing a human gesture information set to instruct a user to perform a gesture, supports confirmation of users' respective intents to publish, communicate, audit, authorize, and/or otherwise initiate and/or manage, resource and/or event/activity instances.

In some embodiments, trusted path process sets support user to device arrangement instructions that may be used to perform resource and/or event/activity instances' at least in part biometrically based certifications in accordance with, for example, such instances' respective rigor level secure computing and/or rights management requirements. Such specific to rigor level and/or rights management publishing, auditing, communicating, and/or other event/activity authorizing and/or otherwise managing specifications can be set by respective users and/or user organizations' respective administrative arrangements, such as by one or more administrators who specify context (such as user, device arrangement type, REAI, and/or specified purpose) specific policies regarding event/activity intent identification information authorization requirements for fulfilling rigor level (e.g., security factor) specifications for associated EBInet and/or PERCos related events/activities. Such specifications may require, for example, such trusted path use of unpredictable event/activity authorization instructions and/or other governance instructions. In some embodiments, an EBInet and/or other PERCos arrangement can decline to perform at least in part biometrically certified event/activity confirmation one or more functions unless a user's organization and/or web service/platform policies mandated by an administrator and/or other one or more parties' rights management and/or other policy specification sets are satisfied.

In some embodiments, a parent smart device arrangement's incorporated (native), less assiduous biometric identification acquisition arrangement (less assiduous, for example, compared to an EBInet AFSD) can produce an at least in part biometrically based user identification information set that can be authenticated and/or otherwise validated against a corresponding to same user at least in part biometrically based identification information set carried by a modular component and/or other EBInet RCD arrangement, such as an EBInet modular component arrangement that is integrated into, and/or inserted into, and/or otherwise operatively integrated with, such a parent smart device arrangement. Such a validation process set can determine whether such user's parent smart device's, for example, less assiduously acquired, contemporaneous and/or operatively simultaneous biometric identification information set corresponds to, and can be authenticated by, the more rigorous near-existential or existential identification information set of such user that is stored/carried for contemporaneous identification purposes on such user's, for example, smartphone's or other device arrangement's, embedded, inserted and/or otherwise connected/connectable, modular component, such as a NIIPU. For example, a biometric identification arrangement for access control incorporated into an RD governed ATM (teller machine), or into a user's laptop, can both biometrically authenticate a user, and validate such authentication by matching such RD governed ATM or laptop authenticated identification results information against identification information carried by a portable EBInet device arrangement, such as an RCFD's carried, contemporaneous near existential or existential quality identification information set, where such matching can be used as a second factor by such ATM's or laptop's native user authentication capability set.

In some embodiments, contemporaneous user EBInet identification information may be stored by, and/or be accessible to, an EBInet compliant smart device's (e.g., smartphone's) sandboxed, at least in part biometrically based identification information employing, EBInet RCFD application. Such application (an EBInet software arrangement) may employ, for example, an iPhone's native Secure Enclave for protection of such EBInet compliant device arrangement's EBInet related secrets (e.g., one or more at least in part biometrically based tokens (e.g., IITs) and/or other at least in part biometrically based device, owner and/or user identification information), where such parent smartphone operates a sandboxed implementation of an RCFD or other EBInet device arrangement operating as an application. Such application may carry and securely make available to other EBInet arrangement compliant device, service, and/or software arrangements, for example, one or more contemporaneous, near existential or existential quality, at least in part biometrically based identification information sets, such as one or more CIISs, subject to situationally satisfying rigor level and/or other relevant governance specifications.

In some embodiments, EBInet identification information can be used to enable and/or otherwise support users' respective EBInet device and/or service arrangements' biometrically based identification information acquisition, receiving, using, carrying, forwarding, provisioning, expiration, refreshing, and/or other, related identification process operations. Such respective operations may include at least in part biometric identification information acquisition, forwarding, and/or other process, one or more sets initiated by such EBInet device and/or service arrangements' respective users associated device arrangements' owners, and/or other associated stakeholder one or more groups, and/or the like. At least a portion of such identification information, such as in the form of audit information, and/or information derived therefrom, may be securely communicated to a network administrative and/or cloud service arrangement.

In some embodiments, EBInet one or more device arrangements (e.g., ADs, RDs, RUSs, and/or the like) may respectively comprise technology enabling, and/or, for example, including, one or more of:

1. NIIPUs and/or RIIPUs and/or other modular component arrangements, wherein such arrangements may comprise one or more PPEs, for example embedded within respective modular component arrangements,
2. Cryptographic engines,
3. Pseudo-random generators,
4. Biometric and/or environmental sensors
5. Electromagnetic and/or sonic (e.g., ultrasound) emitters,
6. Secure clocks,
7. Secure, e.g., at least in part cryptographically protected, communication arrangements,
8. Hardened packaging (e.g., employing epoxy and/or other hardening one or more materials),
9. Secure, packaging employing internal component and/or component portion disabling (operatively or destructively) trip-wires,
10. Software obfuscation, misdirection, and/or other attack/analysis mitigation and/or prevention, techniques,
11. Hardware anti-decomposition, anti-decapsulation, and/or other anti-(hardware composition attacker) misdirection and/or expropriation (e.g., for theft), techniques/implementations,
12. Anti-inspection arrangements, for example for obstructing internal process monitoring and/or data inspection, including implementations for one or more of anti-optical imaging, micro-probing, and anti-power analysis (such as for impeding or preventing differential power analysis and/or the like),
13. One or more features that comprise \Identity Firewall and/or Awareness Manager arrangements,
14. One or more SIM card attributes, for example, subscriber (user) identity information, and security authentication and ciphering information,
15. One or more Secure Digital (SD) capability arrangements including, for example, smartSD and smart microSD capability arrangements with Secure Element, NFC support, secure communication, and/or secure authentication,
16. Secure memory and information management arrangements, such as one or more HSMs, and
17. Trusted path intention/instruction user interface arrangements.

In some embodiments, one or more secure organization network and/or cloud service arrangements (e.g., TIIRSs) receive information for registering and subsequently storing human person (e.g., stakeholder and/or user) identification information, and/or EBInet computing device arrangement, and/or other resource and/or event/activity identification information, such as an EBInet compliant composite at least in part biometrically based resource identification information set. Such identification information may comprise at least in part biometrically based 1. human identification information, and/or
2. human and (i) device, (ii) other resource arrangement, and/or (ii) event/activity, instance, composite identification information (e.g., biometrically based information sets and other, respective uniquely identifying resource (or other REAI identification information sets)).

In some embodiments, at least one such organization network and/or cloud service arrangement performs at least one of (a) REAI authentication and/or other validation, (b) human person and/or device and/or other REAI identification information integrity, and/or associated purpose, testing and/or analysis, and (c) other centralized one or more service function sets (e.g., IIS and/or REAI subject matter governance, including for example, rules and controls (e.g., rights management)) related to at least a portion of such stored, registered REAI identification information.

EBInet arrangements, in some embodiments, may support, at least in part through organization specific network, organization grouping, and/or cloud service one or more arrangements, securely communicating, and/or managing, EBInet arrangement device and/or other REAI:

1. stakeholder (e.g., owner and/or stakeholder agent), participant, and/or user, event/activity and/or historical provenance/audit, processes and/or information,
2. stakeholder's and/or stakeholder agent's and/or related user's (e.g., SVCC participant) privacy, rights, and/or related management, processes and/or information,
3. identification information, including for example contemporaneous at least in part biometrically based identification information set one or more portions, timeout related (expiration, suspension, refresh, revocation, modification, and/or the like), processes and/or information,
4. security management (including, for example, establishing and enforcing cryptographic and/or trustworthiness rigor level and/or rights management policies), processes and/or information, and/or 5. relevant EBInet standardization, interoperability, common interpretability, communication, and/or system updating management (e.g., EBInet device, component, and/or application and/or system arrangement software (e.g., device drivers, application software, platform software, firmware, and/or the like)), operational components' and/or operations'/processes' respective policy information sets.

Such organization one or more EBInet arrangements' activities may include using group and/or one or more EBInet arrangement environment (e.g., platform wide) management, policy sets for authenticating and/or otherwise validating, integrity analyzing, managing, and/or enforcing, internal to an organization, other grouping, and/or EBInet platform, policies. For example, in some embodiments, such management policy sets may ensure:

1. EBInet device arrangement and/or service relevant rigor level (e.g., security hardness/trustworthiness) policy standardization and compliance,
2. identification information integrity standardization and compliance,
3. identification information privacy and/or anonymization (securing against societally identifying a given individual, in part or in whole and/or conditionally),
4. restricting access to, and/or otherwise managing (such as maintaining the privacy of), identification related information that is biometrically based at least in part resource and/or event/activity set provenance/audit information and/or related processes, and/or
5. identification information usage commercialization governance policies (e.g., for marketing, security, identification of individuals and/or groups, government regulation and/or inspection, and/or other the like).

In some embodiments, EBInet inter-device and/or between person(s) and/or other parties, relationships are securely registered and/or otherwise securely recorded and maintained over time as device arrangement groups. Such groups can be based on, for example, their anticipated and/or authorized inter-device and/or inter-party communication and/or other REAI relationships. Such relationships may comprise EBInet device and/or service arrangement communication pairing (of forwarding device and/or service set to eligible-to-receive secured identification information one or more devices and/or service sets) for the transmission of secured, sensitive information elements, and/or provisioning of identification information, for REAI authorizations and/or other such REAI management.

Secure registering and/or otherwise recording of device and/or service relationship sets may, in some embodiments, be enabled through the use of secure communications, and operate, at least in part, in accordance with relationship(s), and/or platform, associated policy (e.g., rules and/or controls) sets. Such policy sets can be used, at least in part, to manage the behavior of participating EBInet organization network, cloud service, and/or grouping arrangements of device and/or service arrangements, whereby, for example, an RD, AFSD, RUS, and/or other EBInet device and/or service arrangement, can specify the required security rigor level (and/or other one or more policy requirements) of EBInet one or more other device arrangements during a group activity. Such specifying may, for example, require the presence of a specified attribute set as specified in EBInet administrative arrangements' respective attribute information sets. Such a set may include specified, required one or more attributes (e.g., one or more subject matter attributes) of one or more other EBInet device and/or service arrangements in order for arrangement grouping and/or inter-communication to occur and/or be registered, that is, whether one or more of such arrangements can, for example automatically, accept and/or use identification information and/or other data from such one or more other EBInet device and/or service arrangements.

In some embodiments, an EBInet grouping that shares information between device and/or service arrangements (e.g., AFSDs, RCFDs, various other RDs, and/or RUSs) may operatively share respective policy specifications. For example, policy information communicated from an RCFD to an RD arrangement may be employed in management of at least a portion of device arrangement stakeholder person, user, and/or other device related REAI identification information that is communicated by such RCFD to such RD. In such an example, such identification information may be securely bound to, and at least in part controlled through the use of, such communicated policy information, and may be employed in such communication related event/activity.

In some embodiments, an AFSD arrangement that a device associated, registered specified security level may require in general, or for a specified resource usage event/activity instance set, that a candidate receiving arrangement, such as an RCFD or RUS, have an equivalent or superior security level. Such an AFSD would not provide (or not provide for one or more specified purposes and/or functions and/or in specified contexts) an EBInet contemporaneous near-existential or existential quality biometrically based identification information if a receiving device did not have a certified, tested, and/or evaluated, compliant and equivalent (or superior) rigor level, such as both device arrangements having 8 out of 10 certified values. Such requirements may be expressed through rules and controls that manage at least in part biometrically based identification information related acquiring, receiving, carrying, forwarding, and/or using process sets, such as managing the communication and/or identification information usage behavior of receiving, carrying, forwarding, and/or using EBInet device and/or service arrangements.

In some embodiments, inter-device arrangement EBInet identification information communications (e.g., forwarding and/or receiving) may at least in part be managed, such as allowed, restricted, or terminated/denied, by one or more candidate or interacting EBInet device and/or service communicating arrangements based at least in part on securely bound rights associated with, and/or non-rights attributes of, one or more specific such EBInet arrangements' respective stakeholders and/or users biometrically based identification information. In some embodiments, user and/or stakeholder, and/or device and/or service arrangement, identification information communication process sets may employ automatic and/or transparent to users, and/or very low burden to users, one or more process sets that enable, for example, automatic and/or transparent to users and/or very low burden to users, secure communication from an EBInet biometric identification information acquiring AFD arrangement to (1) an EBInet receiving, carrying, and forwarding RCFD arrangement, and subsequently to (2) an RUD and/or RUS contemporaneous identification information receiving and using device and/or service arrangement. Such a system arrangement securely supports at least in part forwarding (providing) at least in part near existential or existential quality biometrically based identification information for secure use of at least a portion of such provided information by such a receiving and using RUD and/or RUS arrangement. In some embodiments, such received information comprises at least one of human user at least in part biometrically based human identification information, and device and/or service arrangement at least in part biometrically based identification information (such as biometrically based identification information of a device manufacturer's, distributor's, and/or vendor's human agent(s) (e.g., one or more CertPers) and a device instance's unique, manufacturer provided identifier (which together may be in the form of a user/device "system" unique identifier)). Such combination of biometric and device (and/or service) identifying information may form at least a portion of a device (and/or service) arrangement's composite identification information set. Receiving device and/or service arrangements can carry and/or employ at least a portion of such received identification information for use, or for transmission to one or more other receiving device and/or service arrangements.

In some embodiments, EBInet arrangements can, at least in part, enable identity based, computing related process control, such as event/activity management control. Such process control can include REAI identification and/or management, such as information access control management (e.g., to a database, website, document, and/or the like), based, for example, on the established presence of a registered, authorized person and/or such person's nearly existential or existential quality, at least in part biometrically based, IIS. Such person's presence can be asserted by an RCUFD forwarding such person's identification information, for example in the form of an IIT, and where an RUD (and/or RUS), in response to such forwarding of identification information, at least in part enables or fails to (doesn't) enable one or more event/activity instances (or one or more event/activity portions) based at least in part on the content of such contemporaneously acquired, and RCFD carried and forwarded, at least in part biometrically based identification information set.

EBInet event/activity management control can, in some embodiments, at least in part manage a resource instance as it moves through a distribution chain of handling, where use of such resource instance may be audited and/or controlled through the use of at least in part human biometrically based SVCC serialization management (e.g., using biometrically based information of users and/or CertPers). For example, such supply, value, and/or other commercial chain handling management can provide an alert to an administrative and/or other auditing and/or process management authority that an authorized party who has been identified in part through such party's use of an RCFD provided at least in part biometrically based device user near-existential or existential quality identification information set, has accessed, that is, opened, a shipping container (e.g., an intermodal container) and/or other item transit packaging and/or a storage arrangement/area, during a product distribution process set. Such opening, for example, may be audited by, and/or at least in part controlled by, an EBInet identity-based access management arrangement. Such user can, for example in some embodiments, satisfy RUD (and/or RUS) biometric serialization of one or more seal (e.g., EBISeal) "unlock" requirements on any such container and/or other item box when such user provides, using his/her RCFD arrangement, an at least in part EBInet contemporaneous, and/or a, for example, smart device-native operatively simultaneous, nearly existential or existential quality biometric identification information set, and/or an EBInet composite device arrangement identification information set comprised, in part, of contemporaneous or persistent (e.g., provided by an SVCC CertPer, such as an EBInet device arrangement owner and/or device ManPer, DistPer, and/or RetailPer (respectively manufacturer, distributor, and/or retailer persons)), biometric identification based one or more information sets.

In some embodiments, communication between an EBInet RD and/or RUS receiving arrangement and an EBInet identification information FD forwarding device arrangement may involve the RD and/or RUS arrangement's request to communicate with the FD arrangement to enable receiving, or the RD and/or RUS receiving a request from the FD arrangement to accept (receive), an at least in part contemporaneous biometrically based identification information set. Such requesting supports determining such RD and/or RUS, and/or such FD, arrangements' respective availabilities (e.g., according to policy compliance) to intercommunicate and transfer and receive such identification information. This arrangement supports a process set enabling an authorized RD and/or RUS arrangement to, for example, receive at least one of a stakeholder's (e.g., owner's) and user's, biometrically based IIS, and a user and/or owner in part biometrically based device composite, identification information set, from a policy compliant AFD and/or RCFD arrangement. Such identification information requested communication and/or use can be, for example, allowed or denied/terminated or otherwise be condition based, at least in part, on one or more of such receiving device and/or service arrangements' compliance with one or more of such forwarding device arrangements', and/or devices' (and any services') grouping relationship(s) EBInet policies. Such device and/or services arrangements' respective policies may include information regarding, for example, trustworthiness rigor level requirements and/or other required device arrangement attributes, including, for example, registered device and/or service arrangement grouping membership(s), and/or Cred, EF, and/or other registered attributes of such EBInet forwarding device, and/or receiving device and/or service arrangements (and/or their respective stakeholder persons (e.g., owners) and/or users) and/or one or more persons' respective stakeholder entities. Such policy attribute information can be employed in determining whether and how devices, or devices and services, may intercommunicate.

In some embodiments, an AFD arrangement can comprise a distributed network where, for example, a person's contemporaneous near-existential and/or existential quality biometrically based identification may be performed transparently to such person as, for example, such person sits in his/her office in the field of view of an appropriate sensor set, and as such person moves about an organization's space that is in part populated by other AFD arrangements. Such arrangement may acquire biometric identification information for such person as he/she passes within range of an appropriate sensor set, for example identifying such person as an authorized employee registered to be present in a certain location, and where such person's contemporaneous at least in part biometric identification information carried by such person's RCFD (and/or stored on an EBInet arrangement's network storage arrangement) is updated, refreshed, supplemented, and/or the like (e.g., based upon such person being registered with an organization or other affinity group (e.g., organization member)).

In some embodiments, requested, surveyed, evaluated, received, and/or sampled as available (e.g., as a result of being polled or hailed), at least in part biometrically based identification information can include at least one of device and/or service CertPers', such as EBInet device and/or service arrangement one or more manufacturers', distributors', retailers', owners', users', and/or other stakeholders' and/or stakeholder agents', identification information sets. One or more of such requests and/or other operations may be initiated and/or satisfied when, or if, a receiving EBInet device and/or service arrangement and, for example, an AFSD and/or RCFD arrangement, are within effective and/or specified communication range and/or communication location (such communication using, for example, encrypted data communicated through the use of Bluetooth, Wi-Fi, NFC, RFID, cellular connection, and/or the like arrangement). In some embodiments, such forwarding and receiving device and/or service arrangements can share one or more secrets, such as one or more shared keys and/or secure registration pairing information and/or other plural devices' (and/or services') grouping related certificates, encrypted tokens (e.g., IITs), and/or respective keys, and/or other at least in part secret/confidential information, that enable and/or are used in trusted, tamper-resistant inter-device and/or service arrangement communications. Such shared secret information may, in some embodiments, be further shared with one or more network arrangements, including for example, local, organization, and/or cloud (e.g., EBInet arrangement platform), administrative service arrangements.

In some EBInet embodiments, at least one of manufacturer, creator, owner, retailer/vender, modifier, user, and/or other stakeholder and/or stakeholder agent, at least in part biometrically based identification information is acquired and/or received, and stored (e.g., carried), for future "contemporaneous" use, where at least a portion of such contemporaneous, identification information, can be proffered, for:

1. authorizing and/or otherwise managing EBInet inter-device and/or service arrangement event/activity sets (e.g., controlling acquiring, carrying, using, forwarding, and/or the like, resource, and/or event/activity related instances' respective process sets), and/or
2. employing an EBInet RFD arrangement for enabling process sets that receive at least a portion of such at least in part EBInet biometrically acquired identification information and/or identification information derived therefrom, that enable EBInet compliant resource and/or event/activity instances' (such as EBInet compliant device and/or service arrangement resources') one or more functions, for example, using an EBInet governed door lock resource for opening a user's home front door. Such an opening of a door can operate in response to the presence of, for example, a stakeholder person's RCFD carried contemporaneous at least in part near existential or existential quality biometrically based identification information, where such opening is performed in response to the presence (e.g., broadcasting, including, for example, directed communication) of at least a portion of such identification information. Such information can be employed for such opening, and related identity-based authorization, authentication/validation, auditing, certifying, and/or other managing/administering of such a resource and/or event/activity EBInet arrangement compliant instance set (e.g., opening such front door).

In some EBInet embodiments, at least a portion of biometric identification information, or information at least in part derived from such biometric identification information, is acquired prior (contemporaneously) to its specific one or more times of use. In some embodiments, EBInet arrangements' respective one or more times of use of such information can occur during respective approximately contemporaneous time periods (which may be, for example, within one hour, a day, a month, and/or other as specified "in context, relatively near-term" one or more timing specified instances) of such identification information acquisition (and/or forwarding/issuance) by an EBInet AFD arrangement (that forwards such information to an RD arrangement). For example, at least in part contemporaneously acquired, and used within a contemporaneous time period, human and/or human/device arrangement composite identification information set, can enable, at least in part, processes comprising auditing, authorizing, certifying, authenticating (and/or otherwise validating), evaluating (e.g., assessing suitability attributes such as trustworthiness, performance, and/or competence), and/or otherwise managing/administering, at least one of resource and event/activity instances. Such processes can employ resource and/or event/activity instance identification information one or more attributes of such instances' respective one or more stakeholders and/or stakeholder person agents (e.g., CertPers), to at least in part enable the evaluation of such stakeholders' respective REAIs (e.g., evaluating such REAIs' respective suitability).

In some embodiments, an RD arrangement requesting an identification information set (or one or more portions thereof) may be securely registered, and/or otherwise securely identified as paired and/or otherwise grouped, with one or more AFDs (e.g., may comprise one or more AFSDs) and/or one or more RCFDs and/or the like one or more EBInet device and/or service arrangements. In some embodiments, such paired and/or otherwise grouped device and/or service arrangements may be identified through use of a group (e.g., a pair) identification information set where such set of EBInet arrangements may represent an EBInet arrangement system, and where arrangement information may include one or more portions of group members' respective device and/or service arrangements' identification information sets and/or information derived therefrom. Such group identification information may be registered, for example, with network administrative, such as organization and/or cloud service, one or more arrangements, and such identification information set can be securely maintained and cryptographically bound to at least a portion of one or more such device and/or service arrangements' at least in part biometrically based identification information one or more sets (e.g., IISs for CertPers for such device and/or service arrangements), such as including such grouping identification information within an EBInet device arrangement's composite identification information set.

In some embodiments, such group identification information sets may securely include and/or securely reference one or more previously registered (e.g., with an organization network administrator and/or cloud service) device arrangement stakeholder person and/or device arrangement user, at least in part biometric identification information sets, and/or identification information derived therefrom, such as a group aggregated identification information set referencing one or more such stakeholders and/or users. Such securely registered and/or otherwise securely identified as paired and/or otherwise grouped device arrangements' registration processes may employ, in part as registration information, AFD and/or RFD and/or the like device and/or service arrangement identification information. Such identification information may comprise, for example, at least in part, such device and/or service arrangements' respective at least in part nearly existential and/or existential quality biometrically acquired human stakeholder, user, and/or service and/or device arrangement (using identifying service and/or device one or more CertPers), specific person identifying, identification information sets and/or information at least in part derived therefrom.

In some embodiments, a request for authentication and/or other validation of an EBInet forwarding and/or receiving device and/or service arrangement set may initiate an at least in part identification information authorization process involving authentication and/or other validation analysis of one or more device and/or service arrangements as members of a group that have been securely registered and/or paired and/or otherwise securely grouped and/or otherwise authorized (based on other one or more conditions) to forward and/or receive, for example, at least in part biometrically based device identification information, such as CIISs.

Some embodiments can employ one or more EBInet device and/or service arrangements' composite identification information sets to extract at least in part stakeholder persons' and/or users' biometrically based identification information sets to identify such persons related to such arrangements involved in, or evaluating involvement in, respective one or more event/activity sets for EBInet identification information use by/in respective receiving arrangements, where, for example, such use includes authorizing and/or publishing event/activity sets' respective EBInet identification information sets.

In some embodiments, resource instance at least in part biometrically based identification information sets may respectively identify EBInet device and/or service arrangements, where such arrangements may comprise:

1. devices and/or services substantially or fully dedicated to EBInet, for example contemporaneous, identification information related functions, such devices and/or services compliant with appropriate EBInet standards specifications, for example, "independent" EBInet device arrangements substantially limited to performing EBInet at least in part contemporaneous, biometrically based identification information functions,
2. smart devices and/or services that perform EBInet functions using, at least substantially, non-EBInet specific, device element arrangements, such as smart device central processing and memory component arrangements, where, for example, elements are shared between smart device functions and EBInet specific functions (e.g., functions enabled by respective native processor and memory and/or network based server), and where such shared elements can perform as EBInet device contemporaneous identification information "virtual machine" arrangements, such arrangements respectively operating (a) as EBInet specification compliant, and (b) cooperatively with EBInet compliant sensor and/or emitter arrangements that provide near existential and/or existential quality biometric identification performance,
3. EBInet one or more inserted into, and/or embedded in, and/or otherwise securely integrated with, parent smart device dedicated EBInet function modular component arrangements that perform secure contemporaneous EBInet identification information functions (e.g., NIIPUs that perform RCUF functions), and, that, for example, may share one or more "auxiliary" components such as smartphone antennas/network communication arrangements and/or power sources, and/or
4. EBInet arrangement compliant tether/second RCFD factor worn and/or carried device arrangements that provide continuity/presence assurance when used in tandem with a primary RCFD, such as an RCFD embedded in a mobile device arrangement such as a cellphone or tablet. Such an arrangement may provide transparent to user, automatic trusted path affirmation that the primary RCFD is for example, within specified parameters of "distance" (e.g., inter-device signal strength) from the primary device, this demonstrating the physical presence of such device and its possession by its specified, registered, contemporaneously nearly existentially or existentially identified user.

In some embodiments, EBInet compliant device arrangements may be characterized/identified by at least in part biometrically based identification information sets that comprise, in part, one or more component identification information sets. Such component identification information sets may comprise, describe, and/or otherwise be associated with, one or more device and/or service arrangement component one or more of: types/models, version numbers, reliably (e.g., securely) maintained serial numbers, and/or associated device and/or service specific securely maintained information sets (e.g. certificates, unique identifying secrets such as secrets embedded by manufacturers in their respective device instances, internally generated "private" secrets such as key information, and/or the like).

In some embodiments, composite identification information sets can carry resource arrangement initial registration information comprising, at least in part, (1) at least in part near existential and/or existential quality biometrically based identification information, such as provenance SVCC CertPer information, such as a device's certifying manufacturer's and/or one or more other value chain parties' identification information where such information is registered with an administrative and/or cloud service utility, and (2) biometrically based existential and/or near existential quality identification information acquired on a recurring (e.g., periodic) basis for contemporaneous identification of a resource and/or one or more of such resource's current stakeholders (e.g., current resource owners) and/or users. This arrangement comprises at least two different types of at least in part biometric identification information sets and/or information at least in part derived therefrom (e.g., identification information sets of respective resource SVCC provenance parties (e.g., manufacturers, distributors, and/or retailers), and contemporaneously acquired resource current user) that are stored and carried by such device arrangement. Such identification information can be carried, for example, within a smartphone's or other smart device's EBInet modular component/memory arrangement, and such modular component device arrangement and/or parent smart device arrangement (encrypted for secure storage) may further carry information of past such biometric acquisition identification information sets and/or information derived therefrom, for example as audit information, where such information may be employed in analyzing security attack related possible one or more vulnerabilities and/or occurrences.

In some EBInet embodiments enable contemporaneous acquiring (within a "recent" quantity of time), and secure storing of, at least in part biometrically determined human individual-identifying information one or more sets, wherein such contemporaneous identifying information is then at least in part reset at specified one or more intervals and/or otherwise within specified time and/or event/activity related one or more time periods and/or in response to other event/activity one or more conditions. Such information sets may comprise one or more securely stored, separate at least in part biometrically based identification information sets securely bound/associated with one or more of a device arrangement's SVCC parties, such as a device manufacturer's human agent's provenance and/or other one or more CertPer's, device arrangement owner's, and/or user's, identification information sets.

Some embodiments may further or alternatively include a device and/or service identification information set comprising an aggregation of at least a portion from each of a group's respective members' identification information sets (for humans and/or other REAIs). Such information set may comprise an aggregation that evolves over time, comprising one or more portions of one or more of successive such identification information sets. For example, such an aggregation may be modified over time based upon the forward-going evolving (with IIS unique identifier evolving) of one or more resource and/or event/activity instances' respective identification information sets. Such identification information aggregation over time may involve collection of at least one or more portions of such at least in part biometrically based identification information sets and may be used in EBInet and/or the like identification information process sets at least in part as information set corresponding device arrangement identification provenance audit information sets (and, for example, where one or more portions of such aggregated information sets may be selectively used). Such EBInet device arrangement identification information may over time incorporate, at least in part, device arrangement usage event/activity auditing information, including auditing information regarding publishing of resource and/or event/activity provenance information. In some embodiments, EBInet device arrangement identification information sets may include information regarding identity and/or identification information set registration, and/or identification information acquisition, forwarding, receiving, and/or the like events/activities. Such identification information REAI provenance auditing may employ EBIBlockChain sets, where EBIBlocks comprise EBIBlockChain identification information components that describe REAI subject matter one or more events/activities (e.g., where EBIBlocks comprise discrete event/activity instances that together as sequence groupings constitute respective EBIBlockChains). Such EBIBlockChains can be formed by respective evolving sequences of EBIBlocks that are identified as sequences of version-updated EBIBlockChains. For example, such EBIBlockChains can comprise collections of EBIBlocks that contain event/activity respective IISs (e.g., CIISs) that are EBIBlock sequences that constitute evolving EBIBlockChains, where such EBIBlockChains are uniquely identified to reflect their respective evolving (e.g., sequence) compositions.

In some embodiments, at least in part biometrically based identifying owner and/or user information is provisioned (e.g., forwarded and made available), for example, in an operatively transparent (or nearly transparent) to user manner, employing communication from an AFD or RCFD arrangement to an RUD arrangement. Such transparent or nearly transparent (low or no user overhead and/or distraction/involvement) identification information provisioning enables at least one of device arrangement CertPer (e.g., a ManPer manufacturer agent), owner, and/or user initiated one or more identity related EBInet biometrically certifying, and/or authorizing and/or other governing, of computing operations, such as creating, and then publishing, a resource (e.g., a document, program, text, email, and/or the like) (e.g., when performing a secure, PERCos biometrically certified resource publishing (and/or communications) event/activity), opening an SVCC shipping container and removing a carton, authorizing a manufacturing process set occurring on a factory floor, or performing other EBInet arrangement related events/activities.

EBInet smart device arrangements (e.g., AFDs, mobile device RCFDs) may combine the performance of multiple, for example, differing biometric identity acquisition device arrangements, such arrangements for example differing as to composition of biometric analysis, trustworthiness (e.g., rigor/reliability), and/or location of sensors. Such a device arrangement can employ, for example, an EBInet compliant smartphone and/or other smart device (e.g., one that incorporates a NIIPU) and/or secure service as a resource and/or event/activity instance stakeholder at least in part biometrically based identification information receiving, forwarding, monitoring, and/or governance "hub" (e.g., local network hub). Such a smart device hub, in some embodiments, using, for example, compliant native and/or modular component (e.g., NIIPU highly secure, isolated processing and memory) capabilities, can acquire, manage, and/or collect information from, and/or otherwise use, EBInet contemporaneous at least in part biometrically based person identification information, and/or EBInet person/device arrangement at least in part biometric contemporaneous (i.e., biometrically based identifying) composite identification information (CIIS), where such a hub employs plural different biometric identification sources and/or analysis arrangement components (e.g., such as using plural source EBInet AFDs and/or other EBInet arrangement components, such as plural sensor and emitter sets, and/or biometric sensor information analysis arrangements, such as in, for example, identifying the same person and/or plural persons). Such plural, different sources of biometric identification information may be used, for example, for authentication, authorization (of an event/activity instance), liveness measurement/determination, continuity monitoring, and/or content-specific and/or organization-specific security, rights, and/or process management policy enforcement. In such embodiments, such smartphone (or other smart device and/or network administrative (e.g., organization and/or cloud) service EBInet compliant arrangement) hub can function as a network administrative control node, enforcing and/or otherwise managing specified rules and controls for at least a portion of EBInet device arrangements operating, for example, as one or more organized, registered group arrangements available on a local and/or platform network service one or more arrangements.

8 Contemporaneous Identification Information Continuity Assurance

Continuity (of person's presence) monitoring may, in some embodiments, comprise "observing" uninterrupted/continuous or specified, such as frequent periodic, at least in part biometric, electronic, and/or physical association/observation/interaction between a user, such as a smart watch wearer, and an EBInet RCFD device arrangement, which may be implemented in a smart watch, otherwise be a, for example, wrist-band device communicating with a smart device, such as a smartphone, and/or comprise another one or more forms of association/observation/interaction response/monitoring. For example, such continuity monitoring can, in a smart watch, employ an arrangement, such as a locking bracelet clasp and/or a continual (e.g., uninterrupted or frequent periodic) biometric liveness detection monitoring arrangement wherein either and/or both such approaches (locking and/or liveness comprising a continuity monitoring arrangement) can recognize detachment of the smartwatch or other EBInet device arrangement smart device from a wrist. Such continuity monitoring can provide operatively continuous/continual (e.g., at a sufficient timing for continuity demonstration) biometric sensor sensing of, and/or continuous (e.g., uninterrupted) attachment (or adherence) to, a user, wherein such operatively continuous biometric sensing and/or continuous attachment (or adherence) monitoring supports reliably providing contemporaneous, biometrically based identification information for continuous identification and/or tracking of a user. Such continuity monitoring device arrangement may be an "all in one" RCFD smart watch arrangement, for example, having a locking, monitored clasp, and/or can take the form of an RCFD smartphone or other mobile arrangement tethered electronically to a secure, for example, wristband or pin/brooch or pocketable or other wearable device, where such device may carry sufficient identification information for identification matching, and where such information matches one or more of the mobile arrangement's IIS portions and/or other mobile arrangement continuity/tethering identification information and/or other continuity maintenance, information. The foregoing can assure, for example, that contemporaneous identification information securely acquired by an AFD, and securely forwarded to and carried in an RCFD, authentically represents the carrying party. After an EBInet, for example, RCFD arrangement in the form of an EBInet smartwatch, has been "attached" to a user's wrist, and if the smartwatch has not been detached, such continuity pairing assures that the user of the smartwatch is the person who is identified by such contemporaneous biometrically based identification information (e.g., in the form of an IIS).

In some embodiments, such continuity monitoring can ensure that an EBInet smart device arrangement that is worn and/or carried by, and/or physically embedded within (e.g., an embedded chipset) a user, can confirm the presence of such a user when using such user's contemporaneously acquired, at least in part, biometrically based identification information. In such embodiments, the foregoing smart device arrangements can maintain operatively uninterrupted, secure monitoring of, such as monitoring the attachment to, respective human subjects, for example, when using continuously "securely worn" bracelets that are not detached or otherwise removed prior to or during respective at least in part near-existential or existential quality biometrically based identification information set forwarding, receiving, and/or using events/activities (e.g., RUD arrangements receiving from respective AFD and/or RCFD device arrangements).

In some embodiments, such carrying of received identification information sets are, for example, time limited in accordance with respective specified and/or default wearing/carrying (and/or other presence demonstrating/validating) periods (and/or in accordance with other identification information forwarding and/or using time limiting rules and controls). In some embodiments, monitoring of continuity involves the ability to recognize that a set of continuity demonstrating conditions has been altered, such as breaking an electronic connection created by a closed bracelet clasp by opening such clasp, or physically moving a continuity arrangement in its physical relationship with its user in a manner that causes a change (e.g., decrease) in signal strength of a wireless connection between such continuity arrangement and the parent RCFD arrangement. When such a continuity arrangement indicates that a specified change in monitored performance has occurred, the parent RCFD or other parent/grouped EBInet device arrangement may be at least in part deactivated, and, for example, going forward, no longer able to communicate sensitive at least in part biometrically based user identification information.

In some embodiments, as long as identification information continuity is maintained (e.g., a device carrying such identification information is continuously attached/adhered/embedded) for one or more specified time instances (intervals, durations, and/or other instance sets) and/or event/activity conditions, forwarding EBInet device arrangements can provide, in compliance with applicable policy specifications, corresponding one or more portions of device arrangements', and/or associated stakeholders' and/or user persons', respective identification information sets (which may be required by respective receiving EBInet device arrangements). Such forwarding and receiving EBInet device arrangements may, in some embodiments, comprise forwarding and receiving registered EBInet device arrangements respectively belonging to the same device arrangement, and/or device arrangement user, registered groups (such groups may be registered as associated with groups' respective specified purposes). Such continuity of wearing by, and/or other forms of demonstrating presence of, an EBInet device arrangement user, enhances anti-theft and/or other EBInet device arrangement misuse prevention, for example, misuse within an EBInet carrying device arrangement's contemporaneous time and/or event/activity related identification information authorized availability periods. Such misuse prevention may extend, in accordance with EBInet device and/or service arrangement and/or platform policies, to the governance of continuity managed associated one or more registered and/or otherwise grouped EBInet device arrangements, by, for example, deactivating one or more of such a grouped device arrangement's functions (e.g., to prohibit use of a resource or communicating confidential identification information).

In some embodiments, a continuity factor device arrangement may be worn, or otherwise reliably attached, to a user, and such device can be tamper resistant and security hardened to ensure reliability. Such continuity factor device arrangement may be, for example, a securely closed and monitored for detachment wristband that is securely worn. A detachment event may be securely identified and/or otherwise securely audited and event managed by such device arrangement, and/or information regarding a detachment event can be communicated to a local (e.g., EBInet arrangement hub) RD management arrangement, and/or to an EBInet network remotely located administrative arrangement. Such a wristband, for example, may be securely, wirelessly bound to (and, for example, can securely exchange unique identity information with), and/or otherwise be securely associated with, one or more RCFDs and/or other RDs (and/or where such wristband itself may be, for example, an RCFD). Such wristband may have a very limited set of functions, such as identifying a detachment and communicating such event/activity to a securely associated RCFD and/or other EBInet arrangement (e.g., network service), and/or where such wristband may perform some or all of an RCFD's functions, e.g., securely providing at least in part biometrically based contemporaneous and/or device composite identification information, and where such performance of functions may serve as second factor, redundant secure EBInet arrangement identification information, and/or related event/activity, management.

In some embodiments, such wireless worn and/or otherwise carried EBInet continuity device arrangement, and/or a network monitoring arrangement and/or RCFD arrangement, can monitor the proximity of the RCFD to one or more continuity factor devices. Such monitoring can ensure that, when and if such an RCFD arrangement is requested or positioned to provide contemporaneous, at least in part, biometrically based identification information, such RCFD is at least one of (a) within a specified distance limit and/or satisfies other specified distance conditions and/or signal strength of such continuity factor device arrangement, and/or (b) physically located (e.g., specific room set as determined by WiFi signal strength and/or triangulation) in a location that is consistent with any location specifications associated with such continuity factor device arrangement and/or RCFD device arrangement. Such a continuity device arrangement may be a small, unobtrusive security fob (small package using one or more of human-object continuous closure and/or otherwise human-object associating/tethering technologies) or other small device carried in a pocket, wallet, or the like; worn on a belt clip; pinned onto clothing; embedded into eyewear such as glasses; or worn on an appendage such as a wrist (as a wristband and/or smartwatch continuity arrangement), and communicating with, for example, an RCFD using Bluetooth and/or NFC and/or other wireless communication, where, for example, a continuity device and RCFD "group" members intercommunicate to determine compliance with distance and/or other parameters of continuity (and/or non-threat) assurance. In such embodiments, a distance limit and/or other range conditions may be subject to time related variables requirements. For example, an allowed maximum distance of separation between an RCFD and a corresponding continuity arrangement may vary within one or more portions of time. For example, within an overall time range (e.g., 24 hours), one or more different distance requirements can be applied during one or more different time periods (and/or applied based on other specified one or more variables), such as applying distance and/or signal strength limitations to different time segments and/or other time and/or location related conditions (e.g., at work versus at home). In such embodiments, an RCFD's monitored physical location distance (between RCFD and continuity arrangement) criteria limitations/requirements can, for example, vary during certain specified time periods, within specified over time aggregate monitored distances, at certain one or more specified locations, and/or within specified time periods.

In some embodiments, pairing or other grouping of EBInet RCFD and/or AFD arrangements with EBInet continuity devices, such as continuity bracelets/wristbands, affixed pins/brooches, or otherwise worn or carried continuity/tethering monitoring arrangements (the foregoing CMDs (Continuity Monitoring Devices)), requires secure matching of at least a portion of such devices' at least in part contemporaneously acquired, biometrically based nearly existential or existential quality, identification information and/or such grouped devices' other respectively associated at least in part biometrically based identification information to determine that such grouped devices share a common stakeholder and/or user. Such shared biometrically based information can be securely stored within respective such device arrangements' respective memory arrangements and such devices can mutually authenticate or otherwise validate that such paired or otherwise grouped EBInet device arrangements have matching (e.g., at least sufficiently matching, as may be specified) at least in part biometrically based identification information. Such identification information may be registered with any or all such device group members (e.g., such information securely stored within and/or otherwise stored and available to their respective group members) and/or registered with a grouping's organization, cloud service, and/or other administrative arrangement.

In some embodiments, EBInet continuity functions may involve one or more electronic and/or physical mechanisms that inform regarding continuity of a relationship condition (e.g., physical proximity) between a near-existentially, and/or existentially, identified and authenticatable against registered information user, and such user's mobile carried, worn, and/or implanted, as applicable, EBInet device (e.g., an RCFD) one or more arrangements. Such EBInet device arrangement continuity assurance one or more management implementations may respectively employ one or both of:

1. electronic continuity trip wires and/or other electronically monitored disengagement recognition arrangement (e.g., embedded into a wrist or arm band and/or integrated into a clasp mechanism (of a smartwatch and/or other arrangement)) for demonstrating detaching/uncoupling of such device continuity monitoring arrangement, such arrangement, for example, supporting connected/closed and disconnected/opened contact monitoring, and
2. EBInet device arrangement embedded one or more sensor and/or sensor and emitter arrangements, for example, for biometric monitoring of a user, and/or signal pairing of grouped devices such as an RCFD and CMD, wherein, for example, one or more sensors, and/or sensors and emitters, are embedded into a smart watch case and/or wrist bracelet and electronically monitored by/coupled with, for example, a smartphone embedded RCFD modular component device arrangement, and where each such device (e.g., RCFD and CMD) group member shares unique group member identifying identification information and where such information comprises contemporaneous and/or operatively simultaneous biometrically based identification information that at least in part identifies the same person.

Such arrangements can monitor device physical contact and/or near field presence (i.e., in close proximity) of an EBInet device arrangement with a corresponding user, such as may be identified as a user and device arrangement registered group. Such monitoring, e.g., provided by a wireless connection between an RCFD and a continuity assurance device, may use NFC and/or Bluetooth and/or other, for example, RF (e.g., WiFi), ultrasound, and/or the like, electronic tethering coupling of worn and/or otherwise mobile and/or implanted RD arrangements pairing/grouping.

In some embodiments, certain EBInet continuity functions may employ (e.g., include and/or be based upon) environmental sensor and/or sensor and emitter arrangement monitoring of the presence of a mobile carried and/or worn EBInet device arrangement, such monitoring performed in conjunction with monitoring the presence of a corresponding such device arrangement user. For example, a Wi-Fi, Bluetooth, ultrasound, and/or other local wireless networking arrangement, may in some embodiments, identify one or more EBInet device arrangements by employing polling initiated by an available network and/or one or more other EBInet device arrangements. Such implementations may employ multiple factors using plural, separate EBInet device mobile and/or worn device arrangements as prerequisite for an EBInet identification information communication and/or use process to occur, where a determination is made that specified and/or registered members of a group of device arrangements are in physical proximity of each (e.g., any specified) other. Such determination can employ a visual and/or other electromagnetic, sound, and/or electronic device signal recognition and validation/authentication, and/ or biometric recognition of such user, the foregoing securely performed at an operatively assiduous and/or existential level of reliability.

In some EBInet embodiments, biometric acquisition includes acquiring human biometrically based identifying information sets at least in part using at least one of near-existentially or existentially accurate (e.g., existential meaning no error in recognition—no known technical methods for successfully spoofing) biometric identification information device arrangements. Such biometrically based identification information is, at least in part, acquired through the use of, for example, EBInet AFD arrangements, such as AFSD and/or ACFD acquiring and forwarding device arrangements. In some embodiments, at least portions of respective such identification information sets and/or human specific identifying information derived therefrom, are securely (a) forwarded from such an AFD to one or more RD arrangements, and (b) stored (i.e., for carrying) on one or more RCFDs for later forwarding to EBInet biometric identification information receiving and using device arrangements (e.g., RUDs) for specified one or more contemporaneous lengths of time, in accordance with associated owner, user, standards body, organization, administrator, and/or cloud service specifications, such information communicated (forwarded) as contemporaneous identification information sets to one or more component member RD arrangements of such an EBInet arrangement, wherein such identification information set may comprise a composite human/device arrangement identification information set. Such human/device arrangement identifying information may include, for example, one or more device arrangement identifying certificates (e.g., EBICerts) and at least one arrangement unique identifier code. In some embodiments, to form a human/device information set, such device identifying information is securely bound to (securely included with), and/or otherwise securely associated with, biometrically based owner, agent, user, and/or other CertPer/subject matter human identifying information for such device (resource) arrangement, and where, for example, such at least in part biometrically based human (e.g., CertPer, user, and/or owner) subject matter identifying information, and device arrangement identifying information, comprises a combined resource entity identifier information set. Such information sets comprise device arrangement composite identification information sets and such composite sets may further include, be bound to, and/or otherwise securely be associated with, one or more such persons' (e.g., stakeholders' and/or CertPers') respective attribute sets, and/or one or more device arrangements' respective attribute sets. Such attributes may comprise, for example, at least a portion of PERCos repute Cred and/or EF attributes of such device arrangement and/or one or more identified persons.

For ease of user use and various other considerations, performing near-existential to existential quality biometric identification information acquisition, for example, once a day in the morning, using a convenient base station, versus operatively simultaneously acquiring a human biometrically based identification information set each time such identification information is required (or otherwise useful), is operatively more practical for many usage contexts. Such various considerations may include advantages in cost, size and/or other packaging, weight, portability, power consumption, physical configuration (for example, sensor and emitter location and/or positioning for optimized near-existential or existential level performance), and/or operative environment and/or connectivity considerations. Using contemporaneous biometrically based identification information as a component of (e.g., to certify the contents of) an associated computing related event/activity identification information set, such as used for an intangible subject matter resource IIS publishing or other event/activity, EBInet can enable practical deployment, and/or other use, of existential quality biometrics in a manner previously unavailable, that is, in a more cost-effective, user-friendly (e.g., transparent and/or otherwise automatic in operation (as appropriate)), manner than previously available. EBInet contemporaneous at least in part near-existential or existential quality identification information can be, for example, transparently bound to such user's or user associated computing events/activities to identify/inform regarding computing related work product. Such information can be used to authorize and/or otherwise govern and/or suitability analyze computing resources and events/activities, supporting basic improvements in computing identity based cyber security, and computing event/activity reliability, suitability, and productivity. EBInet improvements in computing REAI identification may include, in some embodiments, easily using—and in some embodiments transparently using—such identification information when a user initiates a computing event/activity and/or produces work product (e.g., sending an email; participating in a social networking social media supported session; performing a digital currency transaction, saving and/or communicating a document or software code; auditing a person's entry into a EBInet SVCC supply chain serialization managed shipping container; authorizing and auditing a manufacturing plant event/activity such as a computer controlled manufacturing line process set; authorizing use of an online database, access to a website, or decryption of a document; securely publishing a resource and/or event/activity instance associated at least in part biometrically based, identification information set such as a CIIS; and/or the like event/activity).

In some embodiments, RCFD (e.g., RCUFD, ARCFD, and/or the like) arrangements can enable practical availability of portable, nearly existentially to existentially reliable human specific identification information for deployment in very broad to an unlimited variety (e.g., unbounded number) of circumstances. RCFD arrangements can employ highly mobile EBInet compliant smart devices, such as EBInet compliant smartphones, and such device and/or modular EBInet component arrangements (when used in parent smart device arrangements) can provide previously unavailable degrees of human person specific identification information reliability and trustworthiness, as well as ease of use and operative transparency for identity provisioning activities, of users and organizations. EBInet's support of contemporaneously acquired identification information can provide existential level biometric identification reliability and discrimination accuracy, as well as practically necessary improvements in cost-effectiveness. In contrast, such support for providing near existential or existential quality, biometrically based identification information has been unattainable in any commercially practical to implement, small, highly mobile, smart device arrangement using existing technology methods.

Current smart device arrangements, when used for identification purposes, rely on substantially inferior to EBInet arrangement biometric identification discrimination and liveness testing performance (if any). Further, current identification implementations often require biometric identification information sets to be acquired and provided operatively simultaneously with (i.e., operatively when) turning on and authorizing a computing device for ensuing activities. Such activities can also require provisioning of users' respective identification information sets for activating desired specific process sets (such as requiring such an identification information set to operate a device arrangement to enable and/or otherwise govern events/activities such as accessing a bank-account, performing an internet purchase, controlling an IoT device, and/or the like).

In some embodiments, EBInet arrangements can enable existential quality human identity and human identity related attribute and/or identifier information sets' to automatically, and operatively transparently for users, be bound and/or otherwise securely associated with any number and sequence of resource and/or event/activity instances, including, for example, access and/or process control instances supporting stakeholder human party identity based certification and/or attribute evaluation.

In some embodiments, to help ensure against smart device theft and/or in support of multiple factor identification capabilities for increased trustworthiness rigor, an EBInet RCFD arrangement (which may be an ARCFD or other situationally appropriate EBInet device arrangement) can use both its parent smart device arrangement's native biometric information processing arrangement and, for example, its own embedded EBInet modular component biometric processing arrangement. Such an RCFD modular component may provide existential quality biometrically based identification to a component corresponding parent RD hosting smart device arrangement for contemporaneous provisioning (e.g., using and/or forwarding for using) of identification information of a user. Such information should, or must, complement (should or must person identity match) the native to such smart device biometrically acquired identification information. Such multiple, separately acquired and/or formulated, biometric identification information sets at least in part can enable multi-same biometric parameter and/or different parameter biometric identification process sets to be used to cross check a smart device's and/or an EBInet device's factor's and/or formulation's output result (e.g., identifying a specific person). Such a biometric arrangement configuration can help ensure EBInet smart device arrangement (parent device and modular component) biometric identification performance/results integrity. Such RCFD, ARCFD, modular component, smart parent device arrangement, and/or the like multi-same parameter and/or different parameter biometric identification process sets can support comparing of identification information results, enabling an analysis process set to identify compromising of an EBInet compliant parent smart device (and/or compromising of a parent device's modular component) by bad actor malware and/or related resource and/or event/activity instance misbehavior.

In certain embodiments that employ a biometric information acquiring parent device arrangement having an embedded, inserted, and/or otherwise securely integrated modular component and/or the like highly secure EBInet device arrangement, such a parent arrangement's biometric identification arrangement, and such an arrangement's near-existential or existential quality identification capable component arrangement, could share the same, and/or use different, one or more sensors and/or emitters.

In some embodiments, AFDs and/or RFDs can communicate biometrically based person identifying information (including, for example, raw biometric pattern information) and/or can create and communicate resource and/or event/activity identification information sets, such as owner and device composite at least in part contemporaneous in part biometrically based identification information sets. Such communication of identification information may, at least in part, depend upon whether an AFD generates a person's, and/or person's/device's composite, contemporaneous at least in part biometrically based identification information set, or whether it simply acquires a person's biometrically based ((e.g., raw) information and communicates such information to either a network service, such as an organization's administration and/or a cloud platform identification information processing arrangement, and/or communicates such information to an RD, such as an RFD, arrangement. Such AFD, service, and/or RFD arrangement can formulate such a person's, for example, contemporaneous at least in part biometrically based IIS (e.g., a CBEIIS) and/or a corresponding composite REAI instance IIS (where such an RFD arrangement may employ, for example, a parent smart device RFCD arrangement embedded, isolated modular component one or more arrangements, such as a NIIPU (or having, for example, plural modular components employing differing/different sets of cryptographic and/or identifying secrets and/or software NIIPU/PPE implementations and/or isolation techniques in support of fault tolerant and/or fault intolerant operations)).

In some embodiments, a smart device EBInet arrangement (e.g., an AFD or RCFD) can serve as an existentially (or nearly existentially) reliable identification information carrying, provisioning (automatically, transparently, and/or upon user instruction), and operations management "hub." Such a hub can carry, and at least in part manage, human, and/or EBInet compliant device (e.g., non-hub RFD, RUD, and/or the like) arrangement composite, near-existential and/or existential quality at least in part biometrically based identification information sets, and/or associated resource and/or event/activity instances' identification information sets. Such a hub can, in some embodiments, perform, for example, continuity monitoring and/or resource and/or event/activity instance certification, auditing, and/or governance, such as access control, rights management, and/or other user and/or device identity related process sets. Such hub managed identification information sets may, in some embodiments, store and/or employ specifically identified user and/or other participant one or more non-biometrically based attributes (for example, address(es), passport number(s), social security number(s), and/or other government and/or organization issued identifier(s), employer, profession/occupation and/or position, affiliation(s) (e.g., membership(s)), and/or quality to purpose and/or effective fact information sets (where effective fact information (a stipulated effective fact) may include one or more testable instances of one or more of the foregoing attributes)), wherein at least a portion of such information is employed for identified device arrangement related person's (e.g., user's) (a) eligibility, (b) trustworthiness, (c) rights management, and/or (d) other suitability, evaluations, and/or authorization determinations, regarding such device arrangement and/or person use of a subject matter resource and/or participation in, and/or use of, an event/activity instance.

In some embodiments, EBInet hub operations may include, for example, performing instance related rights and/or purpose fulfillment management, such as coordinating and/or cohering policies of different participating device arrangements and/or respective device arrangements' stakeholders and/or users, resolving to respective operating models. Such models can include device arrangement and/or person evaluation, E/A management, and/or auditing, and/or the like, in accordance with specified, for example cohered multi-arrangement, policies.

In some embodiments, one or more EBInet hub audit resource and/or event/activity information sets may be securely related (e.g., securely bound) to one or more at least in part biometrically identified EBInet compliant device and/or service arrangements' respective owners, agents, and/or users, and/or other, for example, resource and/or event/activity instance certifying parties' identification information. One or more portions of securely maintained such hub identification information, in some embodiments, may be required by specific person, group of persons, content, organization, governmental body, and/or EBInet arrangement wide (e.g., platform), security and/or other rights and/or purpose fulfillment management policies for evaluating, certifying, authenticating, authorizing, communicating, and/or otherwise managing information regarding using of respective resource and/or performing event/activity (e.g., access, identification information publishing, auditing, and/or other process set), instances.

In some embodiments, one or more such RD arrangements can operate with, and/or "virtually" include, one or more network administrative and/or cloud service EBInet compliant device arrangement components, for example, that are physically operatively remote from such an RD arrangement, wherein such one or more remote components may operatively evaluate (for example, RD arrangements' respective) identification information sets and/or one or more information subsets thereof. For example, such a distributed arrangement may, at a network location remote from an RD arrangement, perform, at least in part, authentication of RD arrangement identification information, and/or evaluation of suitability to user purpose of one or more such RD instances (and/or other REAIs and/or respective stakeholder, user, and/or other party type, CertPer instances) based, at least in part, on at least one of authenticity, security rigor level, quality to purpose, effective fact, and/or the like, attributes of, and/or attributes of attributes of, respective such instances. Such evaluation can be based on respective one or more at least in part biometrically identified humans such as stakeholders, stakeholder agents, and/or users associated with (and/or entities/other resources employed in) such resources and/or event/activity instances who effectively comprise one or more attributes of respective such instances, where suitability of a resource and/or event/activity instance is at least in part determined by evaluating, for example, identification information attributes securely associated with an EBInet RD arrangement's at least in part biometrically based composite identification information set)).

In some embodiments, a network and/or cloud service may at least in part perform evaluation of at least a portion of one or more of an RCFD's and/or other RD arrangement's and/or other REAI set's securely and at least in part biometrically identified, respective stakeholder, user, and/or participant, one or more persons, where such persons' respective IISs are securely bound to (e.g., securely associated with) and/or incorporated within, respective such RCFD and/or other RD and/or other REAI, arrangements (e.g., using composite IISs stored within respective secure NIIPUs). For example, in some embodiments, RCFD, other RD, or RUS, arrangement stakeholder, user, and/or participant quality to purpose and/or effective fact attribute information may have been, at least in part, previously registered with a cloud service and/or other administrative party as component information of such a party's identification information set, available for independent, other party evaluation of the suitability for use by users of such person's associated RCFD and/or other RD, and/or other REAI, such as resource, arrangements. For example, an RCFD's stakeholder and/or user, and another device arrangement's RD stakeholder and/or user, can mutually, that is, for example, reciprocally, evaluate the suitability of each other for one or more of their respective purposes, such as communicating between an RCFD and an RD using respective device arrangement IISs, to respectively authenticate such device arrangements and/or their owners and/or users, and, for example, to authorize an event/activity instance.

In some embodiments, cryptographic binding can be used to operatively form resource cryptographically, securely associated, at least in part (1) resource secrets' information sets and/or secret information sets' respective, corresponding public information, the foregoing produced by manufacturers' respective process sets for resource secret insertion/formulation for uniquely identifying respective resources and/or resource model/group/class instances, and/or the like, and (2) manufacturers' respective agents' biometrically based serialization event/activity auditing information, the foregoing providing at least in part nearly existential or existential quality at least in part biometrically based identification information sets (e.g., in the form of EBInet transparently forwarded RCFD to other RD, contemporaneous identification information). Such securely associated information sets can demonstrate/stipulate such agents' respective biometrically based certifications of such manufacturers' and/or other SVCC parties' respective resource manufacturing and/or other SVCC serialization related process sets. In some embodiments, public information corresponding to such secrets (e.g., a public name that represents the same device as a cryptographic private key and/or other identifier), and such associated biometrically based identification information, may be used in resource arrangement, and/or resource owner and/or user, authentication and/or other evaluation by other parties.

In some embodiments, a manufacturing production line device arrangement (for example, an EBInet AFD, RD, and/or other EBInet device arrangement) can acquire and/or receive a manufacturer human agent's at least in part nearly existential or existential quality biometric identification information set and/or information at least in part derived therefrom, such acquiring and/or receiving occurring one or more times during, subsequent to, and/or preceding (e.g., in close time proximity to) the times of manufacturing of respective resources (wherein resources may respectively comprise, for example, both tangible matters and their respective, associated computer software interface arrangements). Such biometric identification information, and/or information at least in part derived therefrom, can then be forwarded to, and/or otherwise associated with (such as used in auditing of), manufactured resources during, preceding and/or following respective such resource manufacturing instances (process sets). In some embodiments, such at least in part biometrically based identification information sets and/or information derived therefrom may be bound to, and/or inserted/embedded within, respective tangible manufactured resources at least in part through the use of cryptographically protected and/or securely stored, tamper resistant secrets, respective such secrets securely embedded in such resources at the respective times of (before, during, and/or after) such resources' manufacturing. Such secrets may be securely stored within, for example, hardware hardened tamper resistant processing and memory, for example, as found in PERCos identity firewall arrangements (IFs) and EBInet modular components (e.g., NIIPUs, RIIPUs, and/or other PPE secure memory arrangement). In some embodiments, at least a portion of such resources' (e.g., device arrangements') respective secrets' associated information sets may be cryptographically bound to at least in part such biometrically based manufacturers' respective human agent identification information sets.

In some embodiments, protecting such embedded resource secrets may be based on public key encryption standards that allow a certificate authority (e.g., a manufacturer's agent), together with a resource's key preparation arrangement, to generate a public-private key pair and embed such key pair's private key as a secret in such resource without exposing such private key to such certificate authority. Such resource-embedded secrets may be securely stored in manufactured resources' respective secure storage areas where such secure storage areas may employ, for example, hardware and software tamper and inspection resistant arrangements to internally, securely vault such resources' respective secrets' information. In some embodiments, such manufactured resources may be EBInet device arrangements (e.g., AFDs, RCFDs, RUDs, and/or the like) that include secure storage device capabilities (e.g., within NIIPUs, RIIPUs, HSMs, and/or the like) which may securely store such resource secrets and such manufacturers' human agent at least in part biometrically based identification information sets.

In some embodiments, protected by a tamper resistant arrangement, such secrets can include or otherwise securely reference, and/or be used to discover, at least in part, uniquely identifying information of respective one or more human at least in part biometrically identified SVCC process persons (e.g., one or more stakeholder, such as stakeholder manufacturer employee, contractor, supplier, and/or the like, agents) who certify, and/or otherwise make assertions regarding, each of, or each group of, such resources. In such embodiments, such SVCC person identifying at least in part biometrically based identification information can be EBInet arrangement compliant, registered with a remote service, bound to one or more EBInet device arrangements, and contemporaneously and/or operatively simultaneously (in relationship to one or more such resources' corresponding manufacturing events) acquired, authenticated, and/or audited.

In some embodiments, manufactured EBInet arrangement resources' respective component portions (e.g., manufactured resources' respective embedded component device arrangements such as EBInet tamper and inspection resistant modular component arrangements) may employ secure, such as cryptographic, protocols that prove their possession of respective identifying/validating resource secrets to an independent party. Such protocol use can securely result in the revealing to such independent party at least a portion of such resources' respective at least in part biometrically based, identification information sets.

In some embodiments, such manufactured resources' respective secrets and/or protocols may at least in part be based on public key/private key and/or symmetric key techniques known to those familiar with the art. For example, in some embodiments, when a resource is manufactured, an AFD and/or RCFD and/or the like device (e.g., an ARCFD) arrangement, for example, may engage in a public key cryptographic secure protocol with such manufactured resource, for example, using a secure communication arrangement for communicating between such resource and the manufacturing (e.g., production) arrangement, to embed in such manufactured resource one or more respective private keys and to reveal such private keys' associated public key information to such AFD's RIIPU and/or RCFD's NIIPU and/or the like device arrangement. Such EBInet devices may then cryptographically associate at least in part biometrically based identification information sets with such public key information.

Some EBInet embodiments may use a range of technique arrangements to protect resource-identifying secret information. Such arrangements for protecting secret materials may include, for example, storage of secrets in tamper and inspection resistant storage areas that may use protected processing environments, sandboxing and access control mechanisms, HSMs, obfuscation, and/or the like. Such arrangements may be used separately or be combined as commercially and/or otherwise contextually appropriate/desired/policy-required. Such arrangements may include, for example, memory space for storing the same secrets and/or different secrets for the same operating requirements/conditions, where such arrangements, in some embodiments, use plural different cryptographic and/or other protection techniques for different sets of secrets provided for the same or overlapping purposes, such that a compromised set of one or more secrets can be "turned off" and, for example, be replaced using a newly employed different set of secrets that have new (e.g., previously unactivated/non-operative) associated access and/or use governance policies.

In some embodiments, an EBInet system may sandbox a process that requires access to secrets, and use access control to protect secret information sets. Such a system, for example an embodiment using sandboxes, may use obfuscation to make it more difficult for an attacker to identify such secrets if the attacker determines how to bypass the sandboxing mechanisms and/or the access control. An EBInet arrangement may use a hardened tamper and inspection resistant PPE to isolate/protect processing (e.g., processes), accessing, and using secure secrets (e.g., keys) and may use sandboxing and access control to isolate processes operating in such a secure PPE from each other. In some embodiments, for example, in some contexts, all the processes operating within an EBInet PPE are minimal, highly rigorous, and warrant protection by a PPE, but only a carefully identified, limited number of process sets have a compelling need to access secrets maintained in such PPE. As a result, in some embodiments such secrets may be variously maintained, accessed, and/or used by different process sets using different policy sets. Different processes and policy sets may use/specify different EBInet device arrangements and/or EBInet device arrangement stakeholder and/or user access and/or use rights. Such access and/or use rights may be, for example, dependent on device arrangement, stakeholder, and/or user specific process set one or more types and/or have different associated one or more keys and/or employ different, securely compartmentalized storage and/or processing areas. In some such EBInet embodiments, different operating environments may employ different operating systems that can be conditionally activated to produce respective different operating sessions, where such different isolated operating sessions use different operating variables, policies, and/or secrets. Activating such different/differing operating systems can enable EBInet arrangements to adapt to identified, and/or avoid possible, malware threats and/or intrusion by "switching", for example, a purposeful session to, and/or between, different isolated, differently policy managed, operating session sets. Such session sets may employ tamper resistant hardware processing and memory environments that operate policies in tamper, inspection, and decomposition resistant arrangements comprising, for example, NIIPU and/or RIIPU and/or the like arrangements.

In some embodiments, an independent party, and/or such party's EBInet device arrangement, holding both a public key and such a device arrangement's cryptographically bound at least in part nearly existential or existential quality biometrically based identification information set, may validate that a manufactured resource (e.g., IoT, household appliance, computing device, shipping container, vehicle, and/or the like) holds the public key's associated private key in order to support/create cryptographically bound one or more identification information sets for such manufactured resource. In some embodiments, such validation may result in a secure communication channel to such manufactured resource, and/or published and/or otherwise produced resource, ensuring that such independent party and/or device arrangement may directly communicate/interact (e.g., without an intervening participating other party arrangement) with such resource identified by such at least in part biometrically based one or more identification information sets. In some embodiments, an independent party and/or device arrangement may retrieve a public key and one or more associated biometrically based identification information sets from the resource being evaluated and/or some other convenient, for example, public and "untrusted" database. If such public key and associated one or more biometrically based identification information sets are properly signed using an EBICert and/or by a known and/or knowable independent certificate authority (with its own associated at least in part biometrically based identification information set(s)), then such signature can provide tamper-resistance and/or authenticity validation for such public key and associated at least in part biometrically based identification information set(s).

9 Supply, Value, and/or Other Commercial Chain (SVCC) Management

In some embodiments, EBInet biometric identification information can be acquired and/or authenticated, at least one of operatively simultaneously and/or contemporaneously, as associated with a publishing or communication EBInet audited and/or managed supply, value, and/or other commercial chain (SVCC) event/activity. Plural stakeholder persons'/agents' (e.g., CertPers' at different points/operations in an SVCC sequence) at least in part, nearly existential and/or existential quality biometrically based identification information sets can be acquired, operatively simultaneously and/or contemporaneously, respectively at plural points in an SVCC (including, for example, points internal to an organization's own manufacturing process chain). Such biometrically based identification information can be acquired contemporaneously (e.g., within a defined time period of its contemplated use), and/or operatively simultaneously at one or more points before, during/at, and/or after, the completion of EBInet identity compliant device arrangement SVCC one or more respective process events/activities (e.g., steps). Such EBInet operations can monitor, and may enable, SVCC activities as they relate to manufacturing company and/or other supply and/or value and/or other commercial chain parties' personnel (personnel (including, for example, agents) of, for example, wholesalers, distributors, retailers, end owners and/or users, and/or the like, whose presence is used to at least in part certify and/or otherwise validate and/or administer such activities). Such personnel's respective at least in part nearly existential or existential quality biometrically based identification information sets can be, in some embodiments, acquired at different times and/or physical locations and/or using different EBInet biometrically person identifying information acquiring device arrangements (AFDs). Such information can be used for (1) a given device's manufacturing process set (e.g., production line), and/or other auditing, authorization, management, and/or the like SVCC activities, and (2) associated such resources' (e.g., device arrangements') IIS publishing of process step event/activity audit and/or control information.

In some embodiments, such SVCC personnel biometric identification information relating to commercial activity is acquired, with respect to an event/activity instance, at least one of operatively simultaneously and contemporaneously. For example, plural stakeholder agents' and/or other value chain parties' (e.g., CertPers) biometric identification information can be acquired, respectively for such agents and/or parties, operatively simultaneously and/or contemporaneously to manufacturing and/or other SVCC process event/activity step points, such as completion of a device arrangement (and/or other resource arrangement at the end of its product creation cycle), and/or receipt, storing, unloading, further loading, departure, and/or transiting of such a device arrangement and/or other resource arrangement at, or to/from, a wholesaler's storage warehouse, a distributor's shipping storage facility, a retailer's place of business, and/or a purchaser's/owner's and/or user's place of occupation, home, and/or the like. A progressing SVCC sequence, and sequence auditing, may comprise aggregating event/activity EBIBlocks that comprise an EBIBlockChain. Such EBIBlockChain can comprise a description of SVCC events/activities, which may include remote sale and/or point-of-sale event/activity descriptive information that, for example, comprise the SVCC auditing and acquisition and/or inclusion of purchaser and/or retailer near existential or existential at least in part biometrically based identification information.

In some embodiments, plural resources' stakeholder personnel identification information, such as device arrangements' EBInet biometrically identified SVCC participating organization(s)' personnel such information, may comprise, and/or provide and/or securely bind, at least in part nearly existential and/or existential quality biometrically based identification information for:

(1) one or more executives/managers/supervisors, where such personnel are respectively represented by, at least in part, biometrically based identification information and such information is acquired (and/or is used) for a device arrangement's and/or other resource's SVCC event/activity set. (Generally, an event occurs at a point in time, an activity involves a series of events, whether or not continuous, periodic, and/or otherwise.) Such identification information can be used contemporaneously and/or operatively simultaneously for SVCC associated stakeholder human identification information related secure processing sets, such information used in such processing sets for certifying and/or otherwise identifying, and auditing and/or otherwise managing, an SVCC event/activity and/or event/activity component, and/or (2) one or more "line" personnel serving in the role of directly performing controlling, initiating, supervising/administering, certifying, receiving, storing, securing, transporting/delivering, selling, buying, and/or intangible item forwarding, where such performing comprises an:

a. SVCC event/activity (e.g., that comprise one or more event/activity process sets that employ associated one or more resource arrangements (e.g., resources)), which can include, for example, an event/activity audit/verification of the event activity set outcome (e.g., resource item was produced and/or modified (a manufactured item or item component), transported to a forwarding location, received at a receiving location, removed from its ESAM specified container, and/or the like), and/or b. SVCC event/activity component process subset (e.g., comprising one or more processes (including related information) of an event/activity).

An EBInet at least in part biometric identification process set can be used, at least in part, to demonstrate that management and/or line personnel have participated in, authorized, or otherwise been associated with, respective EBInet compliant events/activities, where, for example, a manager's at least in part nearly existential or existential quality biometrically based identification information is used in satisfying a requirement that EBInet authorizing/certifying one or more personnel persons (CertPers) provide their contemporaneous and/or operatively simultaneous at least in part biometrically based identification information to demonstrate, for example, that they are production line one or more participants whose presence (and/or IIS presence as carried in, and forwarded from, an RCFD) certifies a manufacturing event/activity process set. Such personnel person's biometrically based identification information can be acquired in a contemporaneous and/or operatively simultaneous manner with respect to such an event/activity set, where such a set can comprise a component event/activity of a larger event/activity set comprising plural such components.

Such identification information sets and associated processes can be used to certify and/or otherwise demonstrate, for example, such a line and/or management person's at least one of:

1. contemporaneously acquired biometric identification information's presence during, and/or operatively simultaneous biometrically acquired identification information's presence during (and where such identification information can be registered with a registration authority and can include such person's location), and
2. approval/acceptance (e.g., before, during, and/or after) of, such event/activity, such as a device arrangement's manufacturing process (and/or other SVCC) step set, event/activity completion, and/or other such specified (manufacturer and/or cloud or other service) SVCC one or more event/activity instances' performance.

In some EBInet embodiments, humans can certify events/activities (e.g., manufacturing one or more SVCC events/steps) through the use of at least in part nearly existential and/or existential quality biometrically based identification information contained, for example, in EBICerts and/or other IITs, and such certifying information may be securely appended and/or otherwise attached to, and/or incorporated in, a manufactured object such as a device and/or other resource arrangement (e.g., a shipping container), such attaching to and/or incorporating in performed, for example, using an EBInet device arrangement packaging "seal," (e.g., an EBISeal). In some embodiments, at least a portion of such identification information and its associated one or more objects', and/or events'/activities', identifying information may also be, or may alternatively be, securely stored on personnel (e.g., supply chain personnel) carried RCFDs (and/or other carried EBInet device arrangements) and/or at administrative one or more information management locations. Such attachment to or incorporation in, in some embodiments, can support an at least in part electronic control arrangement, such arrangement replacing, or supplementing, more traditional physical authorization steps involving signing, stamping, non-electronically sealing, and/or inserting a written control sheet. Such steps can represent, for example, a quality control inspector's certification/approval of successful completion of one or more manufacturing event/activity steps.

In some embodiments, a set of one or more process steps may, for example, with a manufactured device arrangement, involve securely inserting cryptographically protected composite at least in part biometrically based identification information, such as an IIS, within, or reliably appended to, a manufactured tangible item. Such information may, for example, at least in part be inserted in the information set of a serialization (such as a pharmaceutical) seal, for example, as part of a sheet (e.g., paper) and/or hardware, seal barcode serialization information set, and/or within an at least in part biometrically based EBInet hardware tamper resistant identity seal/provenance management arrangement.

EBInet device arrangements can, in some embodiments, employ electronic and physical seal properties, e.g., using an EBISeal, with device arrangement SVCC shipping container locking and/or other anti-intrusion mechanisms, such as security hardened hardware/software alarm device arrangements. Such EBInet container and/or other mobile object activity governance device arrangements may be respectively, temporarily integrated with facility and/or transport vehicle and/or other local network security systems when, for example, "on-site". Such EBInet device arrangements can function respectively as security zones temporarily integrated with respective local security auditing/governing control and/or alarm systems involving containers and/or container content object (e.g., crate, carton, and/or other content) activity (e.g., movement auditing and/or governance), and/or container, crate, carton, and/or the like, location(s) and/or in proximity to, and/or inter-communication with (e.g., hailing/polling, and authenticating), physically local security systems. Such temporary integration may be based on, and/or augmented by, other EBInet arrangement security control management variables such as container access and/or content governance (e.g., rights management) instructions received from one or more remote non-site specific, security monitoring/alarm communications arrangements (e.g., SVCC event/activity governance utility) that employ secure cryptographic communication/networking capabilities. Such proximity to container recognition/requirement may employ RCFD arrangements that include continuity assurance EBInet arrangements, such as SVCC personnel wearing continuity bracelets grouped with respective carried smart device RCFD arrangements and respectively assuring the presence of SVCC party persons.

Such an EBInet seal and provenance arrangement can support unit, package, crate, carton, intermodal shipping container (e.g., reusable steel boxes) and/or the like (1) event (e.g., unloading and/or movement) auditing, (2) event/activity rights control management, and/or (3) SVCC stakeholder personnel authentication and/or other validation of one or more portions of SVCC personnel associated at least in part biometrically based identification information sets, and/or (4) other management by governing SVCC personnel conduct as they and/or associated items move through an SVCC sequence. Such management arrangements can be used in controlling physical access to containers, crates, barrels, and/or cartons and/or other items (e.g., opening a carton and/or other container) in accordance with SVCC arrangement specifications such as stakeholder personnel at least in part biometrically based identification information and/or respective associated rights management (e.g., contemporaneously acquired biometric identification information as a portion of a CIIS).

EBInet (and/or PERCos) at least in part nearly existential or existential quality biometrically based identification information may, in some embodiments, be cryptographically, securely bound to a manufactured device's identification one or more secrets. Such binding may occur, for example, at a device arrangement's point of sale and/or may be performed online, for example, using a cloud service arrangement during a sale or activation of a product arrangement (e.g., during a resource event/activity set), for example, during a new owner's online setup and registration of such a product arrangement. Such a bound information set can be registered through an EBInet registration process set, wherein registration is performed at least in part through a sales related process set that securely communicates registration information regarding an acquisition of at least a portion of a composite identification information set comprising a human purchaser's, and a device arrangement's, identification information, and/or information derived at least in part therefrom. Such an event/activity can include, for example, acquiring and communicating (e.g., for performing a device/person system's registration at an identification information utility) a new owner's and/or user's at least in part biometrically based near existential or existential quality identification information set, and one or more manufacturers' respective device arrangements' embedded uniquely identifying secrets and/or other such device arrangements' uniquely identifying information.

In some embodiments, a user's and/or owner's at least in part biometrically based identification information can be bound and registered at such time of sale or setup (or other specified context) where the registration process set employs at least a portion of such product's (e.g., a resource's, such as a device arrangement's) identification information set (e.g., provided secret associated information set, one or more certificates, unique identifying code, and/or the like) in formulating such product's registration identification information set. Such registered information may, in some embodiments, comprise stakeholder at least in part nearly existential or existential quality biometrically based identification information and respective device specific, for example, manufacturer supplied, uniquely identifying information sets, that together represent a person/device or person/service arrangement system (e.g., a fused person/device arrangement entity). Such arrangement specific and biometrically based information sets can comprise composite identification information sets that identify information sets' respective products and associated one or more stakeholders.

In some embodiments and/or contexts, such as before, during, and/or subsequent to, respective product sales, device identification information sets may be modified (e.g., respectively updated as new IIS versions and where, for example, new device IIS versions are respectively provided with different one or more unique IIS identifiers) to include sales' acquisition respective, related information (e.g., manufacturer, shipper, seller, buyer, location, time, date, price, version, serial number, and/or the like information). In such circumstances, in some embodiments, such at least in part biometrically acquired identification information of a product's buyer:

(1) is obtained by use of an EBInet compliant AFD arrangement, such as an AFSD arrangement, and where biometrically based information is securely aggregated, and/or otherwise employed, with at least a portion of such a product's identifying secret(s) (such as one or more private and/or symmetric keys), and/or other unique identifier information (such unique identifier information may be formed from two or more other identifier information "pieces" to a form a uniquely identifying instance), and
(2) may be aggregated with one or more manufacturers' and/or other SVCC stakeholder one or more parties' respective at least in part biometric human identification sets, such as at least in part biometrically based identification information of one or more device manufacturers' respective employees and/or other agents (e.g., one or more CertPers, such as ManPers).

In some embodiments, such an AFD arrangement can perform "root" identification (e.g., initial, baseline) biometric identity services by providing AFD capabilities for identifying and/or otherwise characterizing device arrangement and/or other SVCC events/activities, including, for example, resource instance manufacturing completion, by providing existential (or near-existential) biometric identifying information that can supplement device arrangement unique secrets to form (along with any other identification information, such as QtPs and/or EFs) respective composite at least in part biometrically based identification information sets. Such EBInet information sets can provide superior manufacturing process set contextual event/activity identification/characterizing information by augmenting device unique secrets with such at least in part biometric identification information (e.g., a CertPer's information, such as signed using a CertPer's EBICert). Such providing can be enabled by an EBInet arrangement's support for near-existential and/or existential quality, human identification associated SVCC event/activity instance at least in part one or more respective participants' and/or other associated persons' identification information. Such providing enables at least in part biometrically based auditing, authentication, and rights and/or other management activities.

In some EBInet embodiments, device arrangement identification information sets of respective product registration event/activity sets may further securely include and/or otherwise be securely associated with such products' respective "new" (purchasing or otherwise receiving) owner(s) and/or one or more users' respective at least in part biometrically based identification information. In some EBInet embodiments, a collection of identification information elements for a product that has been purchased or otherwise acquired, for example, a device arrangement, may comprise at least:

(1) one or more manufacturers' (i.e., stakeholders') agents' (e.g., employees', contractors', and/or the like) and/or other SVCC parties' at least in part biometrically based identification information,
(2) one or more owners' and/or users' at least in part biometrically based identification information, and
(3) one or more manufacturers' uniquely identifying device arrangement identification information, where portions thereof may be respectively public or private instances.

In some embodiments, product identification information sets including such identification information can further include one or more other SVCC parties' at least in part nearly existential and/or existential quality biometrically based identification information sets, such as wholesaler, distributor, modifier, retailer, dispenser, and/or the like one or more employees' and/or other agents' at least in part biometrically based identification information. Such information may further include other SVCC provenance information, such as securely acquired and stored time and date information (instance and/or range/period) of one or more SVCC events/activities (e.g., receipt, shipping and/or other transferring/transporting, repositioning (e.g., moving from one intermodal container to another), sale, modification, damage, rerouting, and/or the like), securely acquired and stored location information of respective such SVCC events/activities, and/or any securely provided and/or included rules and/or controls regarding SVCC process sets, such as constraints (e.g., policy rights management) regarding opening, shipping, operating, selling, moving (e.g., relocating a container and/or its contents within a shipping yard/containment area), and/or the like of any such product arrangement instance and/or product arrangement cargo container, carton and/or other shipping box, and/or product units and/or unit sets.

In some embodiments, such EBInet device arrangement in part biometrically based composite IISs may, using respective one or more EBInet AFD biometric acquisition arrangements, can acquire and employ one or more additional to initial (or replacing of original) CertPer biometrically based SVCC identification information sets that respectively identify new, for any given device arrangement, owners (e.g., updated) and/or other SVCC human parties. Such identification information may, for example, replace, supplement, and/or extend previous owner and/or other SVCC party identification information. Newer at least in part biometrically based identification information for a device or other resource acquirer (new owner) may, for example, replace older, for example, selling owner(s)' and/or corresponding one or more SVCCs' other parties' one or more persons' SVCC identification information, and/or may supplement such previous identification information, to form, for example, a more comprehensive ownership, handling, and/or other supply, value, and/or commercial chain participating one or more relevant parties' at least in part biometrically based, product provenance information set(s). Such information set(s) may, for example, be employed in counterfeiting prevention and/or monitoring/mitigation/management, and can form at least in part biometrically based, securely provided and maintained product provenance information set(s). For example, as content moves through an EBInet SVCC E/A sequence, accumulating identification information of SVCC persons may be required to be consistent with a, for example, cloud service registered, and/or locally carried (in an EBISeal and/or RCFD) ESAM.

In some embodiments, such an EBInet SVCC in part biometrically based device arrangement identification information set can have a minimum of three basic identification information types: (1) both (a) owner and/or user, and (b) one or more of manufacturer and/or other stakeholder CertPer agents biometrically based identification information, (2) one or more device arrangement secure, unique identifying secrets (e.g., where such one or more secrets are securely included and/or securely associated with respective such device arrangements), and (3) secure times and dates of such identification information instances' respective specified (such as ESAM specified) acquisitions and/or associated manufacturing, purchasing, transporting, storing, using, registering, publishing, modifying, and/or other relevant events/activities.

In some embodiments, an EBInet device arrangement, such as an AFD acquiring and forwarding biometrically based identification information device arrangement, or an RCFD receiving, carrying, and forwarding, device arrangement, communicates identification information to one or more at least in part biometrically based identification information processing related RD and/or RUS arrangements. Such forwarding and receiving device, and/or organization, network, and/or cloud, service, EBInet arrangements, may create communication and/or other transaction identification information (e.g., IIS) audit records. Such records may (1) be stored on such one or more device and/or service arrangements, for example, in an ESAM template that is periodically updated/filled-out with event/activity completion and/or other process audit information, and (2) securely include device and/or service arrangement(s)' related composite identification information sets for such one or more device and/or service arrangements. Further, in some embodiments, such forwarding and receiving device arrangements' respective composite identification information sets can be securely communicated to, and stored upon, an organization's network EBInet compliant administrative arrangement and/or an EBInet cloud service arrangement, and/or such information sets may be at least in part securely communicated to, and authenticated and/or otherwise validated by, such administrative and/or cloud service arrangement. In some embodiments, information regarding such authentication and/or other validation may be securely communicated to one or more of EBInet forwarding and/or receiving mutually communicating device arrangements.

In some EBInet embodiments, an RUD arrangement may comprise at least in part a physical resource seal arrangement that includes, at least in part, tamper resistance features (e.g., trip wires, electromagnetic field interference, epoxy and/or other material hardening/anti-intrusion potting, and/or other device tamper resistance and/or anti-inspection capabilities (e.g., as described herein)), employed to enable prevention of SVCC related undesirable activities (e.g., inconsistent with an SVCC ESAM), for example: unauthorized access to, misdirection of (e.g., shipping to an unauthorized destination), malicious modification of, counterfeiting of, theft from and/or of, and/or the like, resource (e.g., device/component, clothing, pharmaceutical, software packages, and/or the like) one or more items, and/or their packaging, cartons, crates, barrels, shipping containers, and/or the like. Such RUD seal arrangements may receive from one or more EBInet RCFD and/or AFD arrangements, at least one of (1) at least in part biometrically acquired identification information of one or more person's associated with respective one or more EBInet device arrangements and/or information at least in part derived therefrom, and (2) composite resource identification information (for example, identification information (e.g., an IIT) including biometrically based, for example SVCC RCFD user and/or other SVCC party and EBInet device identification information).

In some embodiments, such seal arrangements' identification information sets may be at least in part stored using a crypto anchor and/or the like component (such as an IBM or other secure hardware modular component EBInet arrangement and further, in some embodiments, may include an HSM (Hardware Security Module that can perform key management and related encryption and decryption)). Such a seal arrangement may at least in part securely store and/or communicate EBInet device arrangement user and/or composite at least in part biometrically based identification information, and may further communicate seal related, event/activity specific descriptive information to a network administrative service arrangement and/or to an EBInet RD arrangement. Such information may at least in part identify one or more EBInet device arrangement at least in part biometrically identified stakeholder and/or CertPer and/or associated parties (e.g., corporate parties and/or SVCC persons, including, for example, owners, employees and/or other agents, and/or users (e.g., renters)). Such secure storing and/or communicating may include at least a portion of such identification information and/or identification information at least in part derived therefrom, as well as in some embodiments, associated event/activity descriptive anticipated event/activity and/or audit information (e.g., regarding seal opening, container movement, location information, and/or other event/activity such as associated times and dates). Such seal arrangement's stored content's (e.g., one or more items', packages', crates', barrels', cartons', other containers) identification information (e.g., IISs) may, in some embodiments, include event/activity ESAM related:

1. authorized physical location information, e.g., geographic, explicit real-world address, cellular and/or other wireless network location/area/signal strength/ID and/or the like, and/or GPS location, and/or timing (e.g., time and/or date) and/or timing periods/intervals of any such event/activity, information,
2. authorized, other allowable, and/or anticipated one or more items' and/or item packaging's, cartons', and/or other containers' (e.g., SIMCs'), future respective event/activity types, associated authorized human stakeholder agent and/or other CertPer identification information, which may include, for example, authorized event/activity related SVCC stakeholders' and/or stakeholder agents' respective at least in part biometrically based identification information sets, including, for example, pertinent associated rights/privileges including, for example, associated contextual information,
3. anticipated and/or historical-item, single-item, and/or plural-packaging (e.g., cartons), and/or or other item set container, provenance related SVCC and/or other chain of handling event/activity information sets (e.g., such sets including SVCC person(s) at least in part biometrically based identification). Such sets may describe such SVCC, and/or other chain of handling, provenance/audit information describing item respective movements and handling through SVCC, interpersonal, and/or other chain of progression and timing sequences for items' respective packaging such as SIMCs, cartons, crates, other containers, and/or the like related audit information,
4. individual and/or class seal corresponding information describing seal related instance, carton, container, and/or other storage/transport/manufacture content information, such as model descriptive names, model numbers, version numbers, serial numbers and/or other unique identifiers, weights, safe operating ranges and/or other handling specifications (e.g., temperature, moisture, and/or altitude) and/or the like, and/or audit and provenance information regarding the foregoing, and/or regarding changes to, and/or exception reports regarding, specified instances of the foregoing such information instances, and/or
5. stakeholder SVCC and/or other chain of handling policy management information one or more sets for respective chains and/or chain portions, including for example, one or more attribute information sets stipulating trustworthiness rigor level(s) and/or other security attributes and/or related handling and processing requirements.

Such one or more information types can comprise information descriptive of at least a portion of one or more respective resources' and/or resource containers' handling, ownership, storage, shipping, receiving, dispensing and/or otherwise providing, item and/or container security management (e.g., anti-counterfeiting, anti-theft, anti-modification, and/or associated container/packaging content information security), and/or other SVCC and/or other chain of handling transiting and/or other event/activity auditing and/or management related process sets.

In some embodiments, such an EBInet seal RUD (e.g., an RUD that is an EBISeal for managing physical objects that traverse through a chain of handling and control) arrangement may comprise, at least in part, attachable instances, which may when attached be fixed position seals, and which may be removeable and/or openable by authorized, EBInet arrangement biometrically identified one or more persons, and/or in accordance with one or more seal physical location and/or other one or more conditions. For example, such EBISeals may at least in part audit, manage, and/or otherwise enable secure management of goods and/or information through SVCC and/or other chain of handling object position/location traversing, unloading and/or unpacking, and/or other event/activity (including non-movement "activity" such as storage) auditing and management steps. For example, a shipping container RUD EBISeal arrangement (there may be plural lockable seals securely associated (e.g., securely grouped) with an EBInet RD modular device arrangement) may recognize and communicate with and/or within an EBInet RD arrangement and/or securely associated EBInet network and/or cloud service administrative node arrangement, that it has been broken, removed, and/or electronically tripped and/or otherwise disturbed/violated (including, for example, had a seal integrity violation or attempted violation incident), and/or its associated container has been opened and/or otherwise entered, for example by (or not by) a specifically identified (through use of a person's IIS, such as a device's/user's CIIS carried by an RCFD) party. Such communication may also or alternatively include audit of at least in part biometrically based identification information regarding one or more persons who interacted with, e.g., opened and/or took another action regarding, including attempting to interact/communicate with, and/or change a state attribute of, a container and/or other shipping item packaging arrangement. For example, such an EBInet seal arrangement may audit parties (and/or or their device arrangements (e.g., RCFDs, such as included in tablets, smartphones, smartwatches, and/or smart bracelets)) who are at least in part biometrically recognized/registered (e.g., included, as contextually applicable, in an SVCC ESAM). Such a seal arrangement and/or an associated administrative (e.g., network based) arrangement (other EBInet RD and/or server arrangement) may determine, for example based on a relevant ESAM, whether a recognized party is authorized to take one or more monitored specific actions. Such an identified person may be identified by an RUD as a result of a received by EBInet RD (e.g., seal) arrangement request to initiate an event/activity, and a relevant RCFD forwarding its user's IIS (such as a composite EBInet person/device arrangement's CIIS, and/or respective such device arrangement's associated stakeholder's/user's CBEIIS) to such EBInet seal RUD arrangement.

In some embodiments, such identification may cause an encrypted, secure communication from, for example, an SVCC RD (e.g., within/securely bound to, a seal arrangement) and/or associated device arrangement that signals to one or more network administrative parties (e.g., cloud service and/or organization network administrator) that an event/activity related audit information set has been created and/or edited, and may communicate one or more pieces of such event/activity/notifying information. Such an event/activity information set may describe, for example, authorized and/or unauthorized moving, opening, breaking into, unpacking (partially or fully), otherwise accessing, and/or the performing of another event/activity involving, a given intermodal and/or other shipping container and/or shipping content one or more instances' crate, barrel, carton, and/or the like packaging/containment arrangement, at a given location, at a given time and date. Such event location may be specified, and for example, satisfaction of a required location (for example within a given time period) can be monitored and confirmed by use of an EBInet GPS device arrangement generated location information set, cellular (e.g., using cellular tower(s)) based location determination, and/or associated change in location information and/or the like wireless network communication related position determination, such as based on specific one or more WiFi network signal strengths. EBInet event/activity identification information sets, such as an SVCC event/activity IIS, can be communicated by an EBInet forwarding device arrangement to an RD arrangement, and/or other EBInet receiving arrangement instance (e.g., network administrative node), where such communication may notify one or more relevant (e.g., commercial) stakeholders (and/or stakeholder agents) and/or administrative parties, that such one or more events have occurred.

In some embodiments, such a stakeholder may communicate one or more instructions to such a forwarding device arrangement (e.g., a seal arrangement) using a secure communication networking arrangement, where such one or more instructions may include "do not open", or "open", and/or "sound an alarm", and/or other relevant instruction.

In some embodiments, one or more EBInet seals may store information regarding stakeholder related parties and authenticate and/or otherwise validate that one or more such stakeholder parties (individually and/or as a group) are authorized to receive, open, at least in part unpack, and/or move and/or ship, a container (e.g., an intermodal shipping container and/or carton and/or the like) of resource instances (and/or such container's one or more resource instance packages (e.g., crates, cartons, content items, and/or the like). Such validation/authentication, for example, can occur when a stakeholder registered RCFD implementation, employing a stakeholder party's EBInet compliant smartphone and/or other smart device arrangement, communicates to an SVCC participating RD arrangement such as an EBInet compliant container, carton, and/or instance, seal. Such communication, for example, may employ an RCFD EBInet compliant smart device implementation and/or an RCFD EBInet modular component inserted into, or embedded within, and/or otherwise securely associated with, an EBInet modular component compliant smart device parent and/or other EBInet compliant highly mobile arrangement (e.g., a wrist worn, continuity monitoring, security hardened smart identification information bracelet). Such implementations can provide required and/or requested registered stakeholder agent at least in part nearly existential and/or existential quality biometrically based identification information to tamper resistant EBInet RD seals. Such seals may be tamper resistant and may incorporate, for example and in part, an EBInet compliant or modular component embedded PPE arrangement (e.g., a NIIPU) (and may, for example, include a crypto anchor and/or HSM one or more components). Such tamper resistant RD seals may, for example, communicate "back" to forwarding RCFDs, audit provenance information that incorporates such forwarding RCFD stakeholder and/or stakeholder agent (e.g., owner and/or user) at least in part biometrically based identifying information sets as a portion of such a seal's monitored event/activity information, and/or such a seal may communicate such information to other one or more RD EBInet device arrangements, such as network integrated and/or other one or more wirelessly connected RFDs. For example, such RD arrangements may further (or alternatively) communicate to one or more network and/or cloud service EBInet compliant service and/or other administrative arrangements, SVCC auditing and/or other management information (e.g., for EBInet platform and/or device arrangement audit and other management services, and in compliance with such arrangement's applicable one or more ESAMs). Such communication may occur as a response to an authorized or unauthorized product instance's container and/or product carton and/or, for example, other package related event/activity instance(s). Such communicated at least in part near existential and/or existential quality at least in part biometrically based identification information can be used in identifying and/or governing product commercial chain handing event/activity representing counterfeiting, insertion, and/or other product mishandling and/or SVCC product origination, handling, and/or distribution movement, other history/provenance, and/or other information regarding authorized and/or suspect/suspicious activity sets.

In some EBInet embodiments, HSM database encryption keys, and data encryption and decryption related processing functions, can be used, for example, (1) to enable at least a portion of an EBInet arrangement's REAI identifier and/or attribute, identification information set data protection encryption and decryption, and/or (2) for enabling an additional encryption HSM key and/or encryption/decryption based layer. Such an additional key may be at least in part securely generated using, and/or a rules and controls layer may require the secure providing of, for example and at least in part, a relevant stakeholder's (e.g., user's) at least in part near existential or existential quality biometrically based acquired identification information. Such HSM encryption layer can be employed in addition to an EBInet and/or the like device arrangement's database arrangement's non-HSM data encryption/decryption one or more cryptographic layers, such as enabled by data encryption operations performed by an EBInet smart device arrangement's (e.g., smartphone's and/or smartphone's tamper and inspection resistant EBInet modular component arrangement's) built-in cryptographic capability set. In such embodiments, an HSM arrangement may securely at least in part perform (e.g., internally to such HSM) identification information data encryption and subsequent data decryption functions. In some embodiments, an HSM may securely employ rate limiting to ensure that only authorized quantities of data (versus potentially harmful, operatively unnecessarily large quantities) can be decrypted within specified time intervals and/or subject to other rate limited decryption condition sets (such as limits on decrypting logically related information sets and/or specified user purpose related information sets).

In some EBInet embodiments, sensitive one or more portions of EBInet REAI database and/or the like stored at least in part biometrically based identification information, are accessed, at least in part, through use of such HSM decryption processing functions. Further, in some embodiments, such HSM arrangements may, at least in part, internally perform encryption key creation and/or encryption key refreshing and/or augmentation functions.

In some embodiments, storing such EBInet and/or the like identification information internally in an HSM (an HSM with integrated data (e.g., database) storage arrangement) and/or the like arrangement supports preventing reverse engineering of EBInet (and/or the like) encrypted identification information. Employing a highly tamper resistant hardware component arrangement that includes both the encryption and decryption of internal to such component arrangement stored REAI identification information, can prevent inspection and analysis of before and after information states, that is, correlation analysis of encrypted state and corresponding decrypted state, identification information instances, since the encrypted information is not exposed to external inspection and comparison with decrypted such information. Such an embodiment can prevent database and/or other sensitive information decryption inspection and analysis by bad actors who are attempting to determine one or more encryption keys used for, and/or other sensitive key generation information.

In some embodiments, such an EBInet HSM and database (and/or other information storage) arrangement, for example, can include a hardened, tamper-resistant processor/processing and memory arrangement for, for example, both protecting such encryption and decryption functions and for storing at least a portion of an EBInet and/or like at least in part biometrically based identification information database and/or discrete record sets and/or other identification information arrangements, such as using an HSM information storage arrangement security hardened cryptographic processing and memory chip arrangement employing one or more computing component security technologies described in this specification, such as hardened anti-intrusion/anti-inspection packaging technologies. In some embodiments, at least a portion of such identification information is, at least in part, internally stored within such a hardware hardened HSM arrangement using, at least in part, for example, dynamic RAM and/or other memory data cache for storing likely to be used, and/or frequently used, data (e.g., one or more particular data types) and/or one or more portions of any such information storage arrangement information may be stored at one or more network administrative and/or cloud service arrangements. Such information's data types may include REAI identifier types and/or instance characterizing attribute types, where such types constitute type groupings (e.g., type classes). Types selected for such HSM storage may be selected, at least in part, for their sensitivity (need to be protected and confidential) and/or at least in part selected for their functional importance in EBInet operations, such as information one or more types used in protecting data (e.g., information related to encryption/decryption keys and/or their usage and/or other information governance such as communications management). In some EBInet arrangements, HSM internally stored and protected information may include, for example, secure obfuscated one or more secrets (e.g., algorithms) employed by an EBInet arrangement in obfuscating encrypted, HSM protected information (such as at least in part biometrically based identification information, secret device identifying information, quality to purpose and/or effective fact information sets, and/or device and/or identification information usage and administrative policy information (e.g., rights management), where obfuscation is used by an EBInet arrangement for enabling further protection against encrypted database information analysis/decomposition/inspection.

In some embodiments, for the purpose of securing at least a portion of such stored EBInet arrangement information, such internal to an HSM and database hardened component processing and memory storage arrangement stored information may include, and/or be limited to, for example, encrypted one or more portions of database information instances selected so as to make respective database content instances (e.g., identification information associated with a biometrically identified and registered stakeholder and/or stakeholder agent person) not practically usable, or less usable, by bad actors. Such securing can, at least in some contexts, be achieved by protecting certain key elements of identification information sets (e.g., through partial information set encryption and/or obfuscation), such as one or more portions of an at least in part biometrically based identification information set (e.g., sufficient one or more portions for desired level of information security), so as to make such information sets and/or respective one or more components thereof, more difficult or impossible to interpret, while contextually optimizing system operational efficiency and/or ease of use.

In some EBInet embodiments, REAI IIS instance data (including, for example, instance stakeholder agent, owner, and/or device/resource user and/or CertPer, cred quality to purpose, and/or testable effective fact, attribute information) can be at least in part securely stored within an HSM arrangement hardware and software, tamper and inspection resistant database storage arrangement. Such an arrangement can protect data, in part, by employing a secure, cryptographic environment that prevents database content encryption/decryption observation/analysis. In some embodiments, database cryptographic keys (and/or respective associated one or more secrets) are at least in part refreshed and/or otherwise modified so as to enable providing unique new, and/or modified, database protection information instances (e.g., encrypted using new, replacement, one or more keys), such refreshing and/or otherwise modifying securely performed in accordance with time period and/or other EBInet arrangement database information protection specifications established by EBInet device arrangement service providers, owners, users, and/or agents thereof (such as administrative and/or platform and/or cloud service management employees).

EBInet arrangement identification information protection technologies may, in some embodiments, employ secure key management anomalous behavior management involving, for example, encryption and/or decryption. Such behavior management may involve time duration of usage, and/or database (and/or database one or more portions) usage amount, management. Such a behavior management arrangement may, for example, employ a usage restriction or cessation based on, at least in part, context specific conditions for managing identification information amounts accessed, decrypted, and/or used. For example, such context specific conditions may trigger a system response based upon one or more specific and/or otherwise calculated database record, field, and/or other information portion (e.g., logically related) usage (e.g., frequency), and/or related EBInet identification information amounts, where specification information may require, for example and based on such behavior, an encryption key refreshing/modification. For example, in response to monitored behavior of attempted improper identification information database use (which may be stopped by EBInet administrative monitoring and operative control of identification information access requests/selections), EBInet arrangements can, in some embodiments, respond to suspicious or improper activity by ensuring that stolen and/or otherwise maliciously acquired/used cryptographic keys are no longer useable or are only temporarily effective, such as for an ephemerally or otherwise short period, by requiring timely identification information encryption key refreshing/modification.

In some embodiments, EBInet key management arrangements may further employ respective database key refreshing/modification and/or the like based on specifications for database encryption elapsed time, usage timing amount, amount of logically related content quantity, and/or other desired one or more conditions. Failing to satisfy any such specified amounts and/or other specified conditions may cause refreshing, modification, expiration, and/or other change of at least a portion of encryption keys employed, for example, in inter-EBInet device arrangement communication functions such as inter-device forwarding (or exchanging) of at least in part biometrically based nearly existential or existential quality identification information sets (such as a CIIS). For example, EBInet device arrangement communication related functions may monitor at least in part biometrically based REAI identification information data export and/or import. Such identification information usage monitoring and communication instances may include, for example, REAI related SVCC and/or other handling chain's stakeholder related at least in part biometrically based provenance, related EBInet device arrangement, and/or other audit, information.

In some embodiments, EBInet services can employ user and/or device arrangement behavior monitoring (or otherwise enable the use of user and/or device arrangement activity monitoring information) as input for identification information, and can, in response to monitored violations of usage policy and/or abnormal behavior, restrict or halt further database use by a device and/or service arrangement, user, user group, and/or in general, and/or otherwise in response to access/usage exceeding one or more budgets for one or more logical and/or contiguous portions of an information set such as a database. In some embodiments, such an EBInet auditing and/or management arrangement can communicate with, such as issue an exception report to, for example, an administrative authority, such report describing one or more abnormal/inappropriate behavior (e.g., violation of policy) instances.

In some embodiments, an EBInet at least in part biometrically based REAI identification information arrangement can employ hardened HSM and secure database storage as components of a hardware/software component data-flow arrangement. Such arrangements can include, for example, EBInet employed crypto anchor and HSM arrangements respectively comprising single or multiple tamper and inspection resistant hardware and software components.

FIGS. 59A-60C illustrate two examples of private SVCC EBIBLockChain network using EBIBlockChains to provide unforgeable provenance information regarding such EBInet devices, auditing and governing manufacturing, distribution, retailing and ownership of two EBInet devices, an AFSD and an RCFD, by creating EBIBlocks to record transaction related information, such as,

- manufacturers securely transporting EBInet devices to regional distributors;
- regional distributors securely acknowledging the receipt of the EBInet devices and then sending them to local distributors;
- local distributors securely acknowledging the receipt of the EBInet devices and sending them to their retailers; and
- retailers securely acknowledge the receipt of sent EBInet devices.

When a customer purchases an EBInet device from a retailer, such retailer creates an EBIBlock EBInet stipulating that such customer is the owner of such EBInet device. Such customer securely registers the ownership information with one or more TIIRS arrangements.

10 Crypto Anchor

In some embodiments, instances of crypto anchors can employ at least in part respective non-bypassable data-flow arrangements, where cryptographically protected data are encrypted and decrypted through use of such crypto anchors (which may include and/or be complemented by HSM arrangement sets). Such crypto anchors respectively use at least in part biometrically based identification information sets regarding, for example, respective one or more individuals and their associated, respective device arrangements to provide access and/or control information for:

(1) performing matching process sets with crypto anchor and/or HSM stored at least in part biometrically based stakeholder person at least in part biometrically based nearly existential and/or existential quality identification information (e.g., as registered information), such matching employing, for example, an, authorized, identified person's contemporaneous and/or operatively simultaneous presence (demonstrated through provisioning of one or more stakeholders' respective at least in part biometrically based identification information sets). Such matching can be employed as a prerequisite to performing and/or otherwise enabling one or more database and/or other information set decryptions, where such decryptions are based, at least in part, on such one or more persons' demonstrated presence (demonstrated through the use, at least in part, of, for example, securely maintained and provided EBInet compliant, contemporaneous (and/or operatively simultaneously acquired) identification information), and/or (2) providing at least a portion of such EBInet at least in part biometrically based identification information as source input (or contributing source input in addition, for example, to securely maintained secret/key information) for producing an encryption at least in part "bio-key," where such key is employed in encrypting sensitive information. An EBInet device and/or service arrangement's policy set may then stipulate that such a bio-key can then be employed in decrypting such encrypted information, for example, only when one or more required persons' identifying biometrically based near existential or existential quality identification information's IIS(s) is/are provided, and where such decrypting produces clear text enabling access to data such as content and/or associated policy set information, and where such encrypting and decrypting employs, for example, HSM data-flow decryption. In some embodiments, such encrypting and decrypting may involve other factor processing, such as such content being further encrypted using a password, such password used as a second required condition for decrypting data.

In some EBInet embodiments, the presence of biometrically based identification information sets can demonstrate the physical presence of such instances' corresponding one or more stakeholder and/or user persons during a biometric identification information acquisition process, where such demonstration can include authentication/validation one or more processes of such acquired identification information. Such identification information, when contemporaneously acquired, can be used to demonstrate the contemporaneous presence of one or more such persons for respective use of, and/or participation in, REAIs, where such identification information comprises (and/or is at least in part derived from) contemporaneously acquired near-existential or existential quality, including liveness assurance, biometrically based identification information of stakeholder person and/or user respective instances. Such contemporaneous presence of one or more persons is demonstrated through providing at least in part such biometrically based identification information, where such providing can be used to at least in part (i) authorize use of, and/or (ii) cause providing of, decryption key input information required for decryption of one or more portions of (a) one or more REAIs' respective encrypted identification information sets, and/or (b) encrypted, identification information sets' corresponding subject matter resource and/or event/activity instances. Such identification information providing, for example, can enable access to a securely stored document and/or authorize the initiating of one or more processes that may produce one or more event/activity results such as accessing a secure website function (e.g., online banking access and/or opening (having access to) a supply chain seal managed product shipping container).

In some embodiments, EBInet modular components can support requiring REAI existential quality IIS availability for use in monitoring, auditing, authentication, activation and/or other enabling and/or governing, of respective event/activity instances, such IIS availability demonstrating the presence (at time of biometric information contemporaneous acquisition and/or operatively simultaneous to time of an event/activity) of respective instances' stakeholder/user humans (e.g., made such identification information available using their respective RCFD (e.g., RCUFD and/or ARCFD) arrangements). Such instances' respective presence demonstrations, for example, can be required in order to enable (in response to specified requirements) authorized one or more rightful such stakeholder humans' (e.g., SVCC authorized parties') respective actions. Such one or more stakeholder humans, for example, can participate in a product chain of handling and control serialization auditing, and/or management, process set.

In some embodiments, EBInet modular component arrangements (e.g., NIIPUs) can be employed to prevent exfiltration (e.g., password and/or content stealing), by forming an exfiltration resistant, hardware tamper resistant crypto anchor, and protected database and/or other hardened information, arrangement, where such arrangement uses at least in part nearly existential or existential quality biometrically based authentication of stakeholder related parties (e.g., owners, users, administrators, other commercial, such as SVCC, persons, and/or the like, where the foregoing may comprise CertPers) and/or related authorization as prerequisite process sets to accessing and/or using respective, securely maintained information sets and/or for allowing respective one or more stakeholder other event/activity instances. Such an arrangement can, for example, involve a stakeholder party's (e.g., an authorized stakeholder user's) resource usage management by limiting, through policy specification, such a user and/or user's group to, for example, logically related and/or contiguous one or more database information set content usage and/or access budgets. Such an arrangement can limit users to, for example, one or more records, field types, percentage of content (e.g., logically related content one or more portions), access events, time period(s) (e.g., aggregate amount within a time period) of access and/or usage and/or the like, which may be further managed by budgets for logically related content groupings (e.g., same information types) and/or time periods, such as per day, week, month, year and/or the like, usage amount(s).

In some embodiments, such a modular component arrangement can be employed to limit and/or otherwise control database and/or other information set (such as an EBInet identification information set arrangement) usage through monitoring and control of usage of logically related and/or logically contiguous portions/amounts of one or more such information sets, such as databases and/or portions thereof. Such control can be respectively prescribed by, and/or apply to, stakeholder individuals (e.g., EBInet arrangement owners and/or users) and/or groups of such individuals (e.g., classes) to protect their rights and/or other interests as regards to use, for example, of their respective resources (or participation in events/activities) by users (e.g., where rights are applied, at least in part, based on information from user individuals' and/or groups' (including, for example, classes') respective at least in part biometrically based identification information sets).

In some embodiments, such an arrangement may limit the downloading of identification information database records, and/or otherwise logically related data sets, to, for example, some number (e.g., 1, 2, or 30 records) at a time (e.g., limiting the number of records and/or other one or more content portions (e.g., logically related) of database arrangements), within a specified time period, and/or as otherwise specified and applied to a defined collection or class of information content. For example, resource stakeholders may assign to near-existentially and/or existentially identified stakeholders and/or stakeholder groups/classes (e.g., types), such parties' respective information download budget rights for access to, and/or usage governance of, an EBInet related identification information database, one or more portions thereof, and/or other information storage/management arrangement(s). In some embodiments, at least in part biometrically based identification information instances' respective subject matter persons and/or device arrangements (e.g., smart devices) may have policy information (e.g., budgets and/or conditions based rules) specifying the rules and controls, such as limitation budgets, selective access, and/or conditional rights for accessing, using, receiving, carrying, forwarding, modifying, and/or the like, of one or more portions of respective resources, such policy information, for example, cryptographically, securely bound to such persons' and/or device arrangements' respective at least in part biometrically based nearly existential or existential quality identification information sets.

In some embodiments, EBInet identification information associated policy information may be used, for example, for REAI related stakeholder and/or user rights management and/or identification information publishing. Such policy information may specify, for example, how many times within a given time period, such as a day, a given identification information set and/or portions thereof may be used for a specified EBInet event/activity set/type (e.g., class). For example, such rights may enforce budgets that limit a user's ability to access information from one or more data stores, such as limiting the retrieval of records and/or other data sets. As a result, a (a) user, and/or (b) user and/or device arrangement group, might be limited to retrieving up to 10 logically related (e.g., by class and/or other pertinent information logical organization) records and/or other data sets an hour and 100 records (and/or other data segments) a week and/or other one or more quantities per time period and/or data class, where information classes may be respectively, for example logical, formal, and/or otherwise specified member composition, classes. Such an arrangement can limit the number of individual and/or aggregate records retrieved, for example, using database query methods, and/or other amounts specified by, for example, budgets of information set elements that can be downloaded, e.g., decrypted and/or provisioned for access and/or user use (wherein such elements are downloaded, for example, from a secure, encrypted identification information computer memory, at least in part encrypted storage arrangement, such as securely maintained database arrangements and/or the like). Such stakeholder and/or other entity (e.g., fused-identity person/device and/or service arrangement) rights and related secure auditing, reporting, and/or management arrangements are, in some EBInet embodiments, enabled at least in part through use of secure hardware and software arrangements, such as EBInet modular component device and/or EBInet network server administrative implementations, that at least in part comprise tamper and inspection resistant, secure arrangements such as operatively isolated and protected network information storage arrangements.

In some embodiments, respective secure EBInet identification information management systems may variably (e.g., selectively and/or contextually) manage and/or store stakeholder persons' respective identification information one or more content portions. Such managing can comprise, for example, access control and/or other usage control of sensitive information content, such as stakeholder persons' respective sensitive attribute information sets (such as regarding financial, reputational, vocational, educational, membership, and/or other personal, arrangement, and/or group related attributes). Such identification information attribute types (e.g., social security number, passport number, residence address, employer and/or employment location, annual salary and/or taxable income, credit rating, legal and/or civil and/or criminal history, and/or one or more affiliations (e.g., political, societal, and/or social) and/or the like), can be, for example, managed through use of platform, cloud service, organization, administrative, governmental, person, and/or person group, specific EBInet compliant policy sets. In some embodiments, such EBInet compliant policy sets are at least in part biometrically based, validated (e.g., sanctioned, approved, endorsed, authenticated, and/or certified), for example, at least in part by EBInet composite device arrangement contemporaneous and/or operatively simultaneous at least in part biometric signing (e.g., using an EBICert) by one or more associated CertPers, such as stakeholder persons (e.g., SVCC one or more stakeholder agents and/or other chain of handling persons, and/or one or more organization administrative, cloud service, platform, and/or governmental regulatory parties). Such policy sets can be at least in part securely associated with, and/or can be included in, such identification information set persons' and/or persons' device arrangements' information sets.

Storing of persons' respective one or more IISs may, in some embodiments, employ differing such persons' respective rights management policies (differing as to various persons and/or persons' IIS information portions). Such management policies can, for any such person and/or person grouping, vary as to information component types and/or respective type and/or person sensitivities (e.g., security related). Such policies may control the management of validation/authentication, storage, usage (e.g., REAI use governance), communication, and/or the like, of respective such IISs and/or portions thereof. In some such embodiments, differing attribute, person specific information sets may be securely managed; for example, attribute information one or more instances may be access and/or usage controlled, such as through encryption and decryption of such information. Such access and/or usage control can operate in accordance with one or more EBInet stakeholder and/or administrative persons' and/or device arrangements', for example, respective control specifications for managing interaction (e.g., communication) between RCFDs and respective event/activity corresponding one or more RD arrangements. Such arrangements may satisfy requirements to exchange (e.g., directly) IIS and/or other sensitive, information between a first EBInet device and/or service arrangement and a second device and/or service arrangement by such arrangements being registered as directly grouped such arrangements, and/or as being respective members of paired group sets that are comprised of arrangement members. In either circumstance, such arrangements, e.g., EBInet device arrangements, can be authorized to exchange IIS information between a first person's first device arrangement, a first person's second device arrangement, and/or a second person's one or more device arrangements.

In some embodiments, EBInet compliant device arrangement modular component secure information management at least in part controls, and/or otherwise enables, selective, secure, intercommunication between plural EBInet device arrangements, where each such arrangement is securely provided, and/or requests to securely receive (from another EBInet identification information communicating device) at least one of (1) at least in part biometrically based identification information of at least one stakeholder or CertPer of the other communicating device, and (2) at least a portion of the composite identification information from such other communicating device. In some embodiments, such received composite identification information can at least in part comprise, and/or is derived at least in part from, such other device's at least in part biometrically identified stakeholder's identification information and at least one securely deployed unique device arrangement one or more device identifying secrets. In some embodiments, communication of selectively managed and/or accessed composite person/device arrangement, and/or device's stakeholder, identification information is governed in accordance with the communication policy sets respectively specified by such EBInet inter-communicating devices, where, for example, plural device arrangements' policy sets are mutually compliant (e.g., where each device is at least in part managed for intercommunications by policy information received from such other device and/or negotiated between such devices). Such device inter-communication may, in some embodiments, be at least in part managed and/or otherwise supported by a PERCos and/or the like coherence service.

In some embodiments, two communicating EBInet device arrangements may operate respectively as forwarding and/or receiving device arrangements, each device forwarding and/or receiving at least a portion of its own IIS (e.g., IIT) information, and/or receiving and using at least a portion of the other device arrangement's IIS information, and where such communicating may be dependent on such device arrangements satisfying applicable one or more instances of their respective policy requirements regarding authorizing communication of at least in part biometrically based identification information. In such circumstances, authorized, communicated identification information sets may be used to attest to REAI stakeholder persons' "bio-certification" and/or other at least in part "bio-validation" of stakeholder persons' respective, associated REAIs.

Such EBInet compliant device arrangement secured identification information, in some embodiments, is managed at least in part through use of an integrated and/or securely associated HSM, and where such identification information may comprise one or more portions of EBInet compliant device arrangements' stakeholder and/or stakeholder agent biometrically based identification information. Such at least in part biometrically based identification information may further include such stakeholder and/or stakeholder agent (e.g., CertPers) one or more suitability attribute information elements. In some embodiments, such suitability attribute elements comprise, at least in part, one or more effective fact (subject to applicable one or more secure validation test methods), quality to purpose (for example, including standardized metrics asserting such respective qualities) attributes, and/or contextual purpose (or the like) user purpose (e.g., objectives) specifications, such attributes (such as PERCos attribute types) characterizing REAIs, and/or one or more of applicable such REAI stakeholders (and/or agents and/or other CertPers thereof), and wherein such attribute information elements are stored within an information store arrangement and where such elements are encrypted and decrypted using, at least in part, such an HSM.

In some embodiments, EBInet device arrangement, and/or device arrangement associated stakeholder and/or CertPer, identification information, including, for example, device arrangement unique, embedded one or more secrets (in encrypted form) and/or such secrets' related information, in whole or part, may be provided by (or at least in part exchanged between) an EBInet FD forwarding (for identification information RD usage) device arrangement and such an EBInet RUD receiving device arrangement. Such identification information one or more portions may be provided in encrypted and decryptable, and/or in decrypted/unencrypted, form. Such providing of identification information by an EBInet FD arrangement, and receiving by an EBInet RUD arrangement is, in some embodiments, performed in satisfaction of a prerequisite condition (e.g., policy) set requiring the supplying of certain identification information before performing one or more events/activities. In such embodiments, use of such EBInet biometric identification information and/or such EBInet device non-biometric identification information may have a specified requirement set. For example, such one or both forwarding and receiving EBInet device arrangements (and/or one or more of their users and/or administrative arrangements) may require the sending and receiving, and/or use of, contemporaneous and/or operatively simultaneous device stakeholder and/or CertPer associated identification information (e.g., IITs) that meet situation specific requirements for a specific event/activity set to be performed, such as performing an event/activity subject matter, subject matter interface, and/or subject matter IIS registration, publishing, and/or other usage instance, for example provisioning a resource, validating a right to perform an event/activity, removing a shipping package/carton from an SVCC governed container, and/or certifying (e.g., by using an EBICert) a resource identification information set.

In some embodiments, communication by EBInet device arrangements of devices' respective identification information sets (such as IITs and/or EBICerts) prior to an EBInet biometrically based certification, for example of an EBInet and/or PERCos publishing REAI event/activity information set (e.g., certification of an EBInet event/activity identification information set), can enable EBInet device arrangements, and/or EBInet network based one or more services, to determine whether forwarding and/or receiving/using device arrangements are compliant with certain FD, RD, organization, and/or platform, policy sets. Such preliminary to certification event/activity determination of compliance with EBInet policy information, in some embodiments, can be a necessary prerequisite to identification information usage for certifying an information set, and may, if required, be a prerequisite to any such identification information forwarding and/or receiving. Such an arrangement can allow an EBInet device and/or service arrangement and/or device and/or service arrangement group to determine whether to further communicate identification information and/or whether to use such identification information, for example, in a REAL information set publishing and/or in authorizing and/or otherwise governing an event/activity.

In some embodiments, an RFD or AFD arrangement may require a requesting or otherwise candidate EBInet RD arrangement to provide sufficient (such as to type and/or form of) RD arrangement at least in part biometrically based stakeholder and/or composite device arrangement identification information prior to the FD arrangement determining it should securely "share" carried, contemporaneous stakeholder at least in part biometrically based identification information with a receiving such RD arrangement. Similarly, in some embodiments, an RD arrangement may require (or may also require in addition to such an RFD or AFD arrangement requirement), certain type and/or form (e.g., certain attribute and/or specific template) of one or more instances of at least in part biometrically based RFD's or AFD's unique identifying device and stakeholder and/or other CertPer (e.g., one or more SVCC chain members, and/or an end-user REAI publisher) identification information. Such identification information's associated policy set, may for example, require the provisioning of device arrangement specific non-biometric IIS information, such as a device unique identifier and associated device arrangement Creds and/or EFs, in order to reliably identify, and satisfy relevant arrangement policy requirements. Such policy requirements can specify conditions for whether one or more components of the identification information of a communicating/forwarding RFD or AFD arrangement satisfies its (the RD's) policy information for receiving from such RFD or AFD arrangement an appropriate (e.g., appropriate to context as per specification) at least in part biometrically based stakeholder identification information set for resource and/or event/activity identification information instance certification and/or other validation process(es) and/or event/activity authorization/governance. In some embodiments, when requested or required to provide identification information, such an AFD or RFD and/or service arrangement may provide to another EBInet device and/or service arrangement identification information comprising manufacturer and/or other one or more commercial parties' provided and embedded one or more concealed (e.g., encrypted and may be hidden) secrets and/or secret related information that uniquely respectively identify such RFD or AFD and/or service one or more arrangements.

In some embodiments, EBInet rules and controls for securely producing, auditing, managing, and/or communicating IISs (e.g., IITs) and/or associated REAIs are established by EBInet device arrangement owner and/or user, device group (including, for example, organization (e.g., company and/or other party)), and/or are defined as platform wide policies, such as by a platform utility or platform resource commercial provider. For example, in some embodiments, inter-device identification information communication can require compliance with all, or a portion of, participating device arrangements' securely maintained policy information sets, and, for example, such information sets can be, at least in part, protected and/or otherwise managed by device and/or service arrangements' respective modular components, such as NIIPUs, and/or HSM and/or other component, arrangements, and can be subject to seniority (e.g., chain of handling and control) rules and controls, for example, as enabled by SVCC arrangements to enforce multi-party respective rights management.

In some embodiments, for example, with EBInet hailing/signaling regarding notifying as to a hailing/signaling EBInet device arrangement's availability for interacting with one or more other device arrangements and/or arrangements' users, PERCos approximation information attribute instances can be employed to filter REAI device (e.g., RCFD), device's person (e.g., user), and/or fused-identity entity identification information sets to identify prioritized "candidate" EBInet device arrangements and/or respective such arrangements' one or more CertPers and/or users. Such filtering results can be specifically, respectively prioritized to such arrangements' users' one or more respective specified or inferred priorities/purposes. In such embodiments, candidate REAIs, such as resource instances, can be identified, evaluated, and/or selected (e.g., for use with, and/or for participation in, respective E/As) through use of their identification information sets' subject matter characterizing and/or otherwise informing attribute information (e.g., quality to purpose quantifications and/or verifiable effective facts). Such REAIs can be evaluated and/or selected based at least in part on the reputations and/or other approximately expressed attributes regarding the suitability (e.g., expertise, trustworthiness, and/or the like) of one or more of such resources, for example based upon suitability attributes of their respective stakeholders, such as a document's author or a computer program's CertPer(s) (e.g., its one or more programmers).

In some embodiments, identifying profile and/or characteristic approximating attribute information necessary for identifying and evaluating the trustworthiness and/or other suitability one or more factors of respective persons' (e.g., stakeholder persons' and/or CertPers) and/or respective EBInet device and/or service arrangements, supports suitability evaluation and/or filtering for respective computing activities/purposes. Such approximation attributes inform regarding security and/or expertise and/or personality attributes and/or other characteristics of EBInet device arrangement owners/users and/or other REAI stakeholder/CertPer parties. Such approximation attributes may be acquired and/or stored, as may be suitable to, and/or specified and/or approved by, EBInet system users, stakeholder persons, stakeholder organizations, and/or other groups such as EBInet platform (e.g., standards defining utilities) one or more organizations. In such embodiments, such attribute information can include identification information mandated by stakeholder persons' respective employment and/or other commercial, societal, and/or affinity organizations, including, for example, government agencies, corporate employers, and/or the like. Such person's identification information attribute information can include certain general informational attributes, such as a person's age (e.g., for identifying persons for relationships/activities), gender, and/or attributes specifically informing about suitability of one or more specific individuals' involvement, directly or indirectly, with respective computing activities, such as being an employee of an organization (e.g., professor at MIT, employee at Google), being a member of an organization (e.g., ACLU, Republican or Democratic Party, American Medical Association), and/or being licensed, and/or otherwise certified, as a professional (e.g., field specific instances such as, for example, plumber, contractor, surgeon, chemist, programmer, lawyer, congressperson, therapist).

In some embodiments, an EBInet arrangement employs end-to-end encryption to ensure the secure passage of information sets through communication networks, such as one or more of SS7 (Signaling System 7), GSM, and/or EPC (Electronic Product Code) implementations, so that sensitive, communicated EBInet information (e.g., identification, audit, rules and controls, and/or event/activity information) cannot be inspected, interpreted, copied, tampered with, and/or otherwise altered in an unauthorized manner. Further, access to such communicated information can be restricted to such information sets' respective sending, and/or respective specified, intended receiving, parties and their respective device and/or service arrangements, if so specified and when such parties' at least in part contemporaneous and/or operatively simultaneous (to such communication) biometrically based identification information is securely available for device and/or service respective authentications. In some embodiments, such communicated information and/or associated communication event attributes may be accessed by governmental and/or other expressly authorized parties (for example when such governmental and/or societal parties are identified and authenticated through the use of EBInet IIS and/or securely associated, at least in part biometrically based, near existential or existential quality identification information sets). Such authorized parties may include corporations (for their corporate communications), for example, when authorized to use "backdoor", such as key escrow, access functions built into an EBInet cryptosystem arrangement.

In some embodiments, an IIT, such as an EBICert, may be used to securely authenticate one or more receiving and/or sending parties, and based at least in part on such authentication, validate their specified rights to access and/or otherwise use/direct their respective, communicated REAI IISs and/or REAI subject matter content. At least in part nearly existential or existential quality at least in part biometric person, or device composite, identification information may be at least in part employed in generating, or otherwise enabling/authorizing, a communication of an at least in part cryptographic key set and/or an EBICert certificate for authentication. A person's existential presence, such as the presence of a receiving party, and/or a corresponding sending party, may then be used in a cryptographic arrangement for ensuring that no non-participating (e.g., non-specified/authorized) one or more parties and/or party group members can intercept, interpret, copy, and/or alter, including for example, maliciously tamper with, an information set (e.g., data set such as an email) when such information is communicated between two or more parties along an information set biometrically authenticated "handling" chain, and/or among members of another securely specified grouping, arrangement. Such an arrangement does not allow (e.g., prevents) a non-participating/non-authorized party to access an information set (e.g., read an email, open a document), unless such a party is authorized by specification, such as by policy's and/or user's and/or sender's and/or sender associated administrating authority's, express specification.

In some embodiments, EBInet one or more identification information set data store and service arrangements are created for organization, other group, and/or platform wide facilitation of EBInet related computing operations, such as REAI secure communications, access, and/or usage management. Such data store arrangements, such as relational data base arrangements, can include REAIs' respective securely associated IISs, such IISs including, and/or having securely associated respective persons', groups of persons' (e.g., classes/types), and/or respective such persons' and/or groups' EBInet device arrangements' provenance related (e.g., past stakeholders' respective persons'), nearly existential or existential quality, identifying at least in part biometrically based identification information sets. Such IISs may include contemporaneously acquired biometrically based identification information sets, and may further respectively include, for example, (1) previous to current contemporaneous, historically acquired such IIS biometrically based information sets, and/or (2) such information sets' respective associated device arrangement, and/or event/activity, audit and/or other identifying information. Such information sets' information (or one or more portions thereof) may be securely stored locally on a user's and/or owner's, and/or user group's, EBInet one or more device and/or service arrangements (e.g., using AFSDs, RCFDs, RUSs, and/or the like EBInet arrangement one or more administrative service hubs, for example one or more smart device (e.g., smartphone) EBInet hub arrangements), and/or on one or more other administration service arrangements, such as on one or more household (e.g., family administration, as performed by one or more parents), employer, other organization, and/or platform cloud, service server based arrangements.

In some embodiments, such one or more identification information data store and service arrangement store information for characterizing/identifying parties who are registered for interparty, at least in part biometric authenticity-assurance-of-resource communication services (e.g., using cell phone, landline, and/or internet voice and/or other data (e.g., for sending documents, software, email, pictures, video, data records, and/or the like)). For example, such data store identification information can be intended for at least in part securing the communication of information sets through use of authenticated, and/or otherwise validated, at least in part nearly existential and/or existential quality, at least in part biometrically based identification information. Such at least in part biometrically based authentication and/or other validation based assurance that access to communicated data is limited to one or more intended receiving and/or sending parties, can be based on demonstrating such parties are, for example, represented (e.g., during an event/activity such as access to a remote web data base or publishing a REAI IIS) as operatively present through the use of a carried, at least in part contemporaneous, at least in part nearly existential or existential quality biometrically based identification information set, and/or through the use of operatively simultaneous at least in part biometrically based identification information. Such information, and/or information used in authenticating such information, in some embodiments, is stored as at least a portion of registered communication parties', devices', and/or services' fused entity identification information sets, where such information is used, at least in part for ensuring trustworthy, secure interparty information set communications.

In some embodiments, each registration of plural parties' respective grouped contemporaneous IIS sets may take place, transparently to group members (e.g., automatically), each day (at some, for example, specified one or more respective times and/or time intervals/periods for members). For such registration, each member of a user set (one or more senders and receivers) respectively performs his/her contemporaneous AFD biometric recognition process set, and, for example, a unique key set is generated for the day for a sender and receiver group. Such key set is employed when group member IIS biometric information is matched with group member registration information, such registered information used to demonstrate that requests to communicate involve valid group members. Such matching with registration information of group members can initiate a cryptographic process set for encrypting by a sender, and decrypting by a receiver, communicated information; as a result, communicated information access is controlled and limited to authorized group member one or more senders and receivers. Such unique key set can support secure bio-identity adaptive security coupling where each of plural EBInet arrangement users can participate in one or more registered, unique groups supporting mutually authenticated and encrypted subject matter and/or IIS communications and/or usage management. Different such process set keys for a given person and/or device/service grouping may be securely correlated with a master one or more secrets, for example, as managed locally in persons' respective EBInet modular component arrangements (e.g., NIIPU arrangements), and/or at one or more network administrative service arrangements, where such arrangements securely bind successively encrypted data to their respective groupings and persons, and where, in some embodiments, such secrets can be securely stored and respectively employed to decrypt such encrypted data.

In some embodiments, RD (e.g., RCUFD) EBInet device arrangements may report audit information of, for example, SVCC arrangements' participating persons' biometric identification process sets, to one or more EBInet network and/or cloud service arrangements for administration and/or management purposes, such as identity authentication, other validation, end-user and/or other party/person policy, e.g., ESAM, compliance assurance, and/or the like. Such reporting for administrative and/or management purposes, through the use of secure, at least in part encrypted communications, can significantly reduce, for example, prescription drug illicit, or error-based, misuse, through such identification associated drug container EBInet device arrangement rights management, audit, and reporting mechanisms, and related administrative services that can identify error and/or illicit misuse.

In some embodiments, resources accessed and/or sold through SVCC arrangements, whether (1) intangible, such as software code, electronically stored documents, emails, webpages, and databases, or (2) tangible, such as humans, devices, hardware components, printed documents, vehicles, appliances, food products, chemical compositions (e.g. pharmaceuticals, paint, and other primarily chemical compositions), clothing, other materials, and/or the like, including any combination thereof, comprise resource instances of Big Resource. Most such resource items are manufactured and/or published, and whether tangible and/or intangible in nature, such manufactured and/or published resources are respectively can be passed at least in part through distribution infrastructures, for example involving being carried by transporters who deliver:

- to distributors,
- to retailers, and/or
- directly from resources' respective manufacturers and/or other creators, to consumers/buyers/users.

Such distribution can occur, for example, physically through use of trucks, trains, planes, ships, and/or the like, and/or electronically, such as downloaded and/or streamed. The foregoing resource items are normally distributed through a commercial chain arrangement and may be subject to counterfeiting and/or malicious and/or otherwise unauthorized modification and/or theft.

Such theft, counterfeiting, and/or unauthorized modification of products imposes a very large and disruptive burden on modern commerce, and in various instances, can impose financial group and/or personal and/or other risk to individual humans, families, organizations, other affinity groups, and other civil entities. For example, the direct costs to global commerce in counterfeit goods substitution for legitimate goods was, in 2016 according to the International Trademark Association, $460 billion dollars (as quoted in ADWEEK Feb. 13, 2017, and estimated by the IEC to be higher ($650 billion in 2008)), while the consequential damages of defective counterfeit goods, such as fake pharmaceuticals, and fake electronic goods such as components in cars, medical devices, military weapons, aircraft, and/or the like (where non genuine goods' defects can result in incalculable primary, and other, such as supply and/or value chain downstream, damages) is motivating a global technology and standards effort to control SVCC distribution disruption. The large, current scale of damages is a relatively recent problem set that is significantly the result of both global trade and the internet. Such distributed trade chain activities are very difficult to audit. As IBM stated on an April 2018 research.ibm.com webpage: "fraud costs the global economy more than $600 billion a year. And in some countries, nearly 70 percent of certain life-saving drugs are counterfeit." Further, prescription pharmaceutical counterfeiting of pharmaceutical manufacturing products was, in early 2015 (Jan. 20, 2015) estimated to be $75 billion, worldwide.

Market areas of particular concern involving counterfeiting include technology products; IHS Market Global estimated counterfeit semiconductor losses alone to be up to $169 billion annually (ZDNet Apr. 4, 2012). In addition, according to Joe Longon in Manufacturing Business Technology, Sep. 2, 2015, "counterfeits and obsolete electronics components contribute to dangerous business exposure for manufacturer's customers, and compromise health and safety for consumers. Clearly, new solutions are needed to improve electronics supply chain integrity and stability . . . . The notion of a commercial supply chain laden with counterfeit parts is truly sobering. Counterfeit parts have been found in servers, routers, storage hardware and other electronics systems. These systems enable communications, transportation, power and critical infrastructure to run our daily lives . . . . Unethical suppliers need to be identified and shut down."

Similar to the problems resulting from counterfeit drugs and electronic components, serious supply chain issues beset food packaging and its related supply chain provenance, event, and time factors, where improper supply chain management in the handling of food through its distribution chain is a major reason why 420,000 people die annually from contaminated food, much of which should be preventable if food chain (an SVCC arrangement) contamination source identification was adequately implemented. Such SVCC identification management, as, for example, supported by EBInet SVCC implementation, should also significantly suppress "counterfeit" food misrepresentation/substitution (e.g., misrepresented species and/or source location/provider and/or supply chain handling (time, location, and/or the like)). Such monitoring would be most reliably and effectively implemented when employed with SVCC provenance EBInet arrangement capabilities, for example, employed using modular component arrangement NIIPUs (which may use crypto anchors and/or HSMs and/or secure blockchains (EBIBlockChains), such configurations providing reliable SVCC audit information updating and maintenance.

Considering the annual losses due to loss of goods through street and home theft of electronics and other valuable products, and associated personal, organizational, and societal costs from all these factors, SVCC and related ownership rights and associated provenance audit information, distribution management and usage management, and information authentication/validation, effective technologies can be quite important to modern commerce.

Overall, the anti-counterfeit packaging market alone is estimated to grow from "$109.35 billion in 2017 to $230.70 billion in 2022" (Grand View Research), and from "$106.726 in 2016 to $206.57 billion in 2021" (Markets and Markets), and from "$36.064 billion in 2016 to $128.338 billion in 2025" (Inkwood Research).

Currently emerging solutions for counterfeiting mitigation management rely substantially on serialization, a technology that assigns unique, predetermined coding to each instance (e.g., package) of a tangible resource distributed through a serialization audited/managed supply chain. This technology is a response to product counterfeiting in various market areas, for example, management of supply chain distribution of medicinal drugs, where it is known as pharmaceutical serialization. Generally, serialization is applied to each shipping container and/or other packing container (e.g., reusable steel shipping container box, covered pallet, carton) and/or at least a portion of resource instances (e.g., multipack, single pack, device, component, vial, and/or the like) in an SVCC shipping and/or storage and/or retailing and/or other commercial chain resource distribution context. Serialization coding can in part also take the form of tags that are affixed to manufactured items and/or containers, where such coding tags are respectively altered (e.g., split) when packaging instances are opened and therefore can physically demonstrate when entry has occurred. Such items may, for example, comprise shipping containers, multipacks, and/or item single packs, and/or other packaging and/or shipping and/or storage arrangements that employ such tamper demonstrating (and/or resisting) seals, where such seals present, for example, printed SVCC encoded information in the form of authenticatable information instances. Such instances can be authenticated through respective instances' interactions with local network administration, manufacturer, and/or cloud, secure service arrangements. Such seals, in some embodiments, include unique identification information, for example, in the form of globally unique codes assigned and physically marked on shipped instances' packaging, such information being presented in the form of a Data Matrix barcode containing, for example, black and white "cells" in a square or rectangular pattern. Such Data Matrix barcodes can be marked into, such as etched onto or otherwise affixed to, their associated, respective tangible resource items such as pharmaceutical bottles or electronic components. For example, such barcodes can be chemically etched into such an item and/or item container to produce a permanent mark. Such barcodes can carry various forms of information beyond, for example, a unique serial number. Value chain authentication packaging technologies can alternatively take the form of taggants (such as RFID tags), holograms, watermarks, inks, and/or dye compositions.

Serialization arrangements may involve, for example, a comprehensive track and trace system that enables the following of drugs and/or other sensitive items as they move through their respective supply chains. The EU, for example, issued regulations requiring from February 2019, with certain pharmaceuticals, a start (manufacture) and use (customer or last stop in a commercial supply chain distribution) serialization implementation arrangement. The United States has issued regulations for a multi-stop approach where serialization instances are audited and/or authenticated as they move from manufacturer, for example, through intermediate, and destination, steps in a product's distribution chain, starting with manufacturers, followed by repackagers, wholesale distributors, and dispensers, with the objective of an overall interoperable "enhanced product tracing system" fully operating in 2023 (US Drug Supply Chain Security Act).

Serialization information, may, for instance, comprise resources' respective unique serial numbers, where, for example, pharmaceutical products moving through supply chains in, or to, the United States, by regulation will (according to the Supply Chain Security Act) require transaction and identity information (e.g., unique serial numbers) as they move through their supply chain steps, such information being, in some embodiments, available for product validation through authentication at each stage of the evolving "ownership" or other possession of product. An example of a Supply Chain Security Act information set embodiment may comprise a US pharmaceutical serialization identification information set that includes:

1. Proprietary or Established Name of the Product
2. Strength and Dosage Form of the Product
3. National Drug Code Number of the Product
4. Container Size
5. Number of Containers (number of individual saleable units of the same lot)
6. Lot Number of the Product (set of alphanumeric characters assigned by the manufacturer or repackager to identify a batch or specified portion)
7. Date of the Transaction (the date on which ownership of the product involved is transferred between trading partners)
8. Date of Shipment (if more than 24 hours after the date of the transaction)
9. Business Name and Address of the Person From Whom Ownership is Being Transferred, and
10. Business Name and Address of the Person to Whom Ownership is Being Transferred EBInet arrangements can transform the quality of serialization information sets by, for example, using near-existential and/or existential quality biometric identification information employed through the use of EBInet acquiring, receiving, using, carrying, and/or forwarding device and/or service arrangements. EBInet arrangements can monitor, audit, manage and/or otherwise support stakeholder manufacturer(s)', distributor(s)', and/or retailer(s)', agent(s)' thereof (e.g., CertPer(s)', such as SVCC stakeholder agent(s)'), and/or resource owner(s)', respective SVCC related events/activities and associated rights management and/or other policies. EBInet can also apply PERCos effective fact and/or quality to purpose attribute information sets regarding respective such SVCC stakeholders and/or associated, respective resource instances, such as medicines, electronic components and devices, vehicles, appliances, food, jewelry, and clothing. EBInet enables near-existentially to existentially reliable (a) tracking of SVCC stakeholder persons'/agents' and SVCC product instances' identities and/or attributes (e.g., PERCos Repute attributes), and/or E/A times, dates, and/or locations, and (b) management of such stakeholder persons'/agents' associated respective authorizations/rights to perform event/activity types (e.g., engaging in the acceptance of goods (tangible and/or intangible resources), transferring goods, redirection of goods, application of one or more rules to goods, and/or modification of goods, and/or the like).

Since a given human can be physically located at only one physical site at a given moment in time, performing a highly tamper-resistant contemporaneous (or operatively simultaneous) existential or near-existential quality biometric identification acquisition and authentication set (for example acquired at a known location) can significantly improve the tamper-resistance, quality of provenance information, management, and quality of goods/authenticity assurance of an SVCC governed resource, thereby greatly limiting the various financial losses and other negative consequences associated with SVCC product tampering and misrepresentations. Such a system can employ time, date, and place authentication of REAIs, for example, using locally, network administrative, cloud service, and/or the like, stored (e.g., registered and/or otherwise specified) information. Such a system may use, for example, pre-specified, authorized personnel respective attributes, including, for example, personnel respective rights to perform certain SVCC actions, such as specified in a container's respective schedule, electronic manifests/rights one or more specifications sets (such as specified in an ESAM, an existentially signed anticipatory/audit manifest), for example, for managing SVCC intermodal container events/activities). Such sets can stipulate the rights of respective individuals and/or group/class members (e.g., using a stipulation (such as a stipulate, testable effective fact) regarding a corporation's employees (or defined group thereof)) to access and/or remove items from, and/or add items to, and/or move, specific containers and/or container one or more classes/types/groups related objects during specified time windows and/or at and/or to specific one or more localities.

In some embodiments, EBInet and PERCos capabilities securely support the use of SVCC at least in part near existential or existential quality biometrically based provenance and authorization related identification information. For example, EBInet enables tamper-resistant, stakeholder person and/or CertPer at least in part biometric identification information based event/activity authorization and/or authentication and/or auditing, by storing such identification information for anticipated, subsequent SVCC one or more parties' inspection and/or for anticipating and authorizing "expected" (e.g., ESAM manifest/rights specification stipulated) one or more parties (and their rights, for example to perform respective actions) who are explicitly authorized and authenticated based on unique at least in part near-existentially or existentially based biometric identification information. For example, such information can be used for identifying parties as belonging to respective parties' identified groups who are authorized to receive, store, separate, repack, modify, sell, and/or ship and/or otherwise transfer goods. As a result, in some embodiments of EBInet, only trusted, explicitly authorized humans, such as registered one or more stakeholder agents for their respective organizations and/or as specific human end-users (e.g., patients regarding use of their medication) can satisfy EBInet enforced rules and controls regarding access, use, storage, movement, and/or other, handling/interacting. Such rules and controls may, for example, be at least in part enforced through the use of EBInet smart device RCFD and associated RUD seal based modular component (e.g., NIIPU) arrangements and/or through the use of network based administrative/management services. Such rules and controls and/or associated auditing can be, for example, used for receiving and for storing, moving, unpacking, transferring, and/or the like, as well as opening, dividing, repackaging, modifying, using, and/or the like, of tangible and/or intangible resources.

In some embodiments, for example, for sensitive tangible items, such as types of drugs (e.g., controlled substance pharmaceuticals), specialized EBInet compatible shipping containers, pallets, cartons, and/or the like, can function as, and/or be controlled through the use of, tamper resistant RD tamper/inspection resistant container arrangements (such as EBInet container and/or other shipping and/or product instance EBISeal device and enclosure security arrangements). Such EBISeal and other container security/governance arrangements may, in some embodiments, be openable solely by EBInet device arrangement and/or network (local and/or cloud) arrangement access control authorized one or more persons and/or specified group-person members, where EBInet enclosure security arrangement access process sets are respectively managed through the use of at least in part biometrically based, seal event/activity related persons' respective rights (e.g., privileges) identification and event/activity management respective rules and controls.

In some embodiments, an EBISeal is an RUD arrangement for EBInet content governance of physical and/or digital one or more objects, wherein such an arrangement comprises a seal that controls access to, and/or modification and/or movement of, such object content, such seal managing, for example, physical shipping arrangements such as SIMCs, crates, cartons, pallets, boxes, and/or the like), a medical pharmaceutical dispensing arrangement, and/or digital information (e.g., software, data, and/or the like) control mechanisms, where such an EBISeal employs identification information (e.g., CIIS and/or CBEIIS information) to monitor and manage event/activity instances associated with such objects. EBISeals operate using secure tamper resistant hardware, such as seals' respective NIIPUs and can wirelessly communicate with EBInet device and/or service arrangements, such as RCFDs that carry and forward respective, for example, person and device composite IISs, including, for example, policy/rights information for use in EBISeal E/A management.

In some embodiments, an EBInet RUD seal control (EBISeal) arrangement's modular component is incorporated into a medicine container cap or container rim or other container structure along with an electronically controlled locking mechanism, where, for example, a medicine bottle cap is locked in place by, for example, an in part electronically controlled (positioned) locking tooth arrangement. Such an arrangement can be incorporated into, for example, such cap and/or bottle rim in the form of a tooth mechanism located in the rim or cap and a corresponding hole in the opposing rim or cap (a locking arrangement). For example, such a container cap's locking and unlocking can be governed by such a cap's seal RUD control arrangement, where such cap and/or other control arrangement remains locked in place until it is unlocked in response to the providing, and authentication, of an appropriate (e.g., specified and required) at least in part nearly existential or existential quality biometrically based identification information set of a registered and/or otherwise specified, authorized to open the container, party (e.g., identified patient and/or nurse), where such biometrically based information's contemporaneously stored IIS(s) can be carried on, and provided by, respective RCFD arrangements. In addition, or alternatively, an IIS may employ operatively simultaneously acquired at least in part biometrically based information that can be used to identify a medicine container user, such information acquired using a sensor arrangement of such RCFD arrangement and/or an RCFD/parent device shared sensor arrangement (and/or a sensor arrangement built into a medicine container, such as into a bottle frame and/or cap). Such an authentication may cause a bottle's cap arrangement to unlock, for example, automatically withdrawing a locking tooth using a stepper motor, when an RCFD authorized (to open such bottle) user is within a specified distance range and/or time period, e.g., as a result of sensing a securely provided wireless identification communication signal (e.g., using a pBIDE implementation) that satisfies, or for example is of sufficient strength to satisfy, a securely specified authorized person or person type (e.g., being a class member) whose, for example, RCUFD may be providing a sufficiently strong signal as recognized by a, for example, NIIPU modular component arrangement, built into a medicine container, where such a bottle and cap EBInet arrangement governs container access. Such an access control arrangement container opening can be at least in part governed by contextual variables such as time of day, date, physical location, and/or frequency and/or quantity of opening, and/or the like variables.

Unlocking of a securely managed medicine container can occur when a user's RCFD provides the user's contemporaneous (and/or operatively simultaneous) at least in part biometrically based nearly existential or existential quality identification information set to such a tooth based secure container locking (and/or friction, magnet, and/or the like locking control arrangement) RUD arrangement. Alternatively, and/or in addition to contemporaneous identification locking management, a locking mechanism may employ a sensor arrangement, such as a fingerprint reader, built into the container packaging, such as the cap, where, for example, operatively simultaneous but less than near existential or existential biometric identification information is acquired and used for at least in part authenticating authorized medicine container one or more users. For example, one or more medicine containers' respective one or more authorized users' and/or medical personnel's and/or caregivers', at least in part biometrically based identification information process sets can, through the communication of such contemporaneous and/or operatively simultaneous identification information sets and subject to satisfaction of any relevant securely enforced rules and controls, cause their pharmaceutical caps to respectively unlock.

In some embodiments, in addition, or alternatively, an EBInet RCFD device arrangement such as a patient's and/or patient's caregiver's parent EBInet enabled smartphone with embedded secure EBInet modular component arrangement (e.g., NIIPU) may be used to identify its authorized device user and/or owner and be employed to transparently provide EBInet compliant at least in part biometrically based identification information to such unlocking process set arrangement, causing such locking mechanism to unlock at a prescribed time, or within a time period, for appropriate dispensing, such as when a dispensing instance (e.g., dispenser arrangement) is being held by such an authorized party and dispensing is within prescribed medication dispensing timing/time period, and/or medication amount/quantity, and/or location of dispensing (absolute or relative to relevant RCFD arrangement). In some embodiments, providing of contemporaneous and/or operatively simultaneous biometrically based identification information for medicine container (or other container, e.g., a safe) access may be provided, using secure encrypted communications means, by an authorized person from a remote to such a container's location (e.g., to such a container's RUD's built-in network communications receiver). Such a remote authorization for opening such a container may further require the local presence of a container using party, such as a container medicine's patient, and where such presence can be demonstrated by such local person's RCFD providing his/her at least in part contemporaneous or operatively simultaneous near existential or existential quality biometrically based identification information.

In some embodiments, RUD seal managed carton arrangements (or other shipping package/content arrangements) may, for example, be removed and transferred from an RUD seal managed shipping arrangement such as an intermodal steel box container, to another shipping arrangement (e.g., such as a different intermodal shipping container or other shipping packaging arrangement). Such shipping arrangements, e.g., using their respective EBISeals, may inter-communicate, for example using such shipping arrangements' respective EBInet RUD seal arrangements and/or administrative EBInet device hub arrangements and/or network service arrangements that perform supervisory administrative/management services for interacting RUDs. Such interacting, such as governing a first SIMC communicating to "release", that is "check out" and transfer, a crate that is to be received by a second SIMC, where such second SIMC "checks in" such crate or files an error report if such crate wasn't received, and where such a crate's EBISeal communicates its location, such as within the first SIMC, then can report its transfer movement to the second SIMC, where it is loaded within. Such container content management can, for example, at least in part govern SVCC events/activities, and/or store events'/activities' information such as item removal and/or transfer audit/status information (e.g., regarding respective locations and times). Such arrangements may report at least a portion of such audit/status information, governance related information, and/or information derived therefrom, to respective network administrative and/or cloud service arrangements. Alternatively, and/or in addition, audit and/or audit derived provenance information can be internally stored within one or more of such inter-communicating RUD seal (and/or to network hub (e.g., local administrative) management) arrangements and/or at least a portion of such information can be communicated to, for example, one or more mobile RCFD tamper resistant EBInet arrangements of respective SVCC persons.

In some embodiments, such audit information may include, for example, at least in part near existential or existential quality biometrically based user/participant (e.g., CertPer) one or more IISs associated with item removal and/or transfer activity, e.g., item removal and/or transfer by one or more SVCC personnel. Such audit information sets, for example, can be received by and/or from, stakeholder personnel and/or stakeholder robot/agent carrying respective RCFDs and/or such information receiving RUDs (e.g., carrying a CertPers', for example, current CBEIIS or carried fused-identity CIIS), and such audit information may be identified through the use of event/activity associated fused-identity composite device arrangement uniquely identifying information (IISs of respective intercommunicating person/device arrangements).

In some embodiments, intercommunicating EBInet device arrangements, including for example, one or more RCFD arrangements carrying such at least in part near existential or existential quality biometrically based, contemporaneous identification information sets may, in accordance with, for example, SVCC specifications, store stakeholder personnel and/or device arrangement and/or event/activity identification (e.g., descriptive) audit information. Such RD information auditing and communication hub arrangements can support respective arrangements' audit information storage, evaluation, and/or event/activity governance. Such intercommunication event/activity auditing and identification and activity information communication can be employed by a multi-EBInet device arrangement event/activity auditing and/or management instance set, such as for SVCC governance of movement, modification, storage, and/or use of containers, such as intermodal containers, crates, cartons, packages, product instances. Such governance may be performed, for example, at a specific location (e.g., a specific warehouse).

With EBInet arrangements, in some embodiments, a biometric identification SVCC medication usage management arrangement can be used by an SVCC end-user such as a recipient of a prescription (e.g., an applicable patient). For example, a locking mechanism arrangement employed for medication misuse management as described herein, can, for example, be controlled by an EBInet micro-component hardware tamper resistant modular component arrangement (e.g., a NIIPU) employing a very small (e.g., one or more square millimeters), prescription bottle embedded, inexpensive protected processor and memory arrangement. Such an arrangement can employ one or more cryptographic keys that, for example, can at least in part be derived from a stakeholder person's e.g., a commercial chain product end-user's (e.g., such as a prescription's corresponding patient's) at least in part biometrically based identification information, such one or more keys employed in encrypting SVCC rules and controls for medication access/usage event/activity and related auditing management.

In some embodiments, such an EBInet micro-component arrangement can be employed by a prescription receiving SVCC pharmaceutical end-user, where access to prescription medicine may be protected/managed using a container (with cap) arrangement that incorporates, for example, an embedded AUFD and/or RUD (e.g., an RCUFD) and/or the like at least in part biometrically based identification arrangement. Such an arrangement may securely work in conjunction with EBInet device arrangement multiple containers (containers may be separate objects and/or component sub containers of a single, hub administration/governance medication management arrangement). While each such locking cap arrangement may be limited to managing of medication(s)' in a container vial instance, it would result in an arrangement that would be far more mobile, and often more convenient and significantly less costly, than securely locking automatic pill dispenser arrangements, such as a monitored MedSmart MD2 Plus. Further, a secure EBInet smart device arrangement, such as a secure smartphone control arrangement, could, through an associated smartphone application set, manage the locking arrangements of one or more different vial device arrangement instances, each employing an EBInet seal arrangement for auditing and/or at least in part managing devices' respective vial container contents' usage.

Plural EBInet arrangement compliant containers can respectively provide different medications for their respective individuals and/or for their multiple person family units, thus providing an individual and/or family unit (i.e., with individual and/or family and/or family member specific rules and controls) with a pharmaceutical dispensing and administrative pharmaceutical management arrangement. In some embodiments, such an arrangement can report audit information to, and/or receive policy rules and controls specification information from:

(1) (a) an end-user person (e.g., a patient), (b) a family unit's one or more person members, (c) a physician, nurse, nurse practitioner, physician assistant, pharmacist, and/or other medical services human agent, and/or other caregiver or care manager, and/or (2) an organization such as (a) pharmaceutical dispensary (drug store/pharmacy), (b) government agency, (c) social service organization, (d) research organization, (e) pharmaceutical company, (f) medical services organization, and/or an agent person of one or more such organizations, and/or the like.

In some embodiments, one or more of the foregoing persons (e.g., a physician who prescribes medication, a nurse and/or a patient for medication dispensing, a pharmacist who dispenses authorized medication drug access arrangements) can carry and/or wear an EBInet RCFD arrangement. Such an arrangement may perform as a secure EBInet identification continuously worn, and event/activity continuity monitoring, EBInet device and/or auxiliary device arrangement, such as an EBInet arrangement wristband, smartwatch, and/or pin/brooch, and/or carry an EBInet identification information host smartphone, tablet, and/or like smart device (which may be used in conjunction with one or more continuity and/or EBInet second factor anti-theft arrangements, and for ease of use/efficiency employ a pBIDE arrangement that can broadcast relevant identification information one or more sets). Such a device arrangement can provide role related person's identification information (e.g., contemporaneously acquired, at least in part biometrically based nearly existential or existential quality identification information) for rights management related to such person's corresponding event/activity (e.g., prescribing a medicine, supplying a medicine dispensing container (such as for the dispensing of a prescription medicine by a pharmacist), regulating drug release from an EBInet compliant container, accessing an EBInet seal managed medicine containing carton or other containment arrangement).

In some embodiments, a specialized EBInet modular component (e.g., a NIIPU or RIIPU) of an RUD (and/or the like) pharmaceutical dispensing control arrangement can employ one or more video and/or other sensors (e.g., photodiodes and/or ultrasonic sensors) for observing pill/capsule removal for dosage control management and information acquisition (and may also use such one or more video and/or other sensors for biometric identification functions). Such a container, for example, can employ a small exit aperture near or in the top end of the container, such aperture serving as a single (or other number as specified) pill dispensing staging and/or pill provisioning area, and such aperture area having a mechanism for performing pill dispensing. Such a dispensing pill access area, including the one or more openings of such a staging/exit aperture (and consequently controls the release, that is the availability, of a defined number of pills), can be controlled by a small secure device seal (e.g., an EBISeal) auditing and control arrangement. Such an arrangement can perform in accordance with physician and/or other medical authority, pharmacy, government authority, EBInet pharmaceutical seal platform, and/or user (and/or other authorized party) specified and/or otherwise associated, specific pharmaceutical dispensing, expiration, and/or refilling, requirement rules and controls specifications. Such a seal platform can further, for example, employ a secure modular component arrangement (e.g., a NIIPU or other tamper resistant protected processing environment) that includes and/or "drives" (e.g., securely instructs) a visual display arrangement (and/or in some embodiments an auditory signal set, and/or other signal type communication (e.g., vibration)), that provides information to a user, other family member, and/or family agent (such as a caregiver and/or medical personnel), regarding one or more portions of such control and/or related medicine dispensing information, including audit and/or notification information (e.g., warnings regarding expirations and/or refill schedule, notifications that a medication (or medication set) was removed, or not removed, for example at a given, such as a securely specified, point-in-time and/or interval and/or location). Such provided information may be forwarded to, and received by, a receiving party's smart device arrangement (e.g., smartphone, smart watch, EBInet modular component bracelet, and/or the like) and/or such device arrangement's one or more associated network administrative arrangements, and such receiving device arrangement may store an audit arrangement of such information and may function as a pharmaceutical alerting, administrative, and/or management arrangement.

In some embodiments, an EBInet RD arrangement, e.g., an ARUFD acquiring, receiving, using, and forwarding device arrangement, may have further medicine and/or other item controlled administrative and/or dispensing and/or other usage related capabilities. EBInet arrangement audit information regarding pharmaceutical dispensing, or failure to perform dispensing in accordance, for example, with a physician's or other medical practitioner's prescription and/or pharmacist's instructions, may be monitored in support of dosage and/or other compliance control management. Such auditing of EBInet device event/activity information, for example, comprising dispensing time and/or date, storage temperature and/or humidity, e.g., with or without associated one or more time and/or date periods.

In some embodiments, an EBInet device arrangement's secure modular component arrangement seal arrangement can include one or more secure clocks and/or securely implemented and audited (may be event/activity based) temperature and/or humidity sensors and/or vibration, motion, and/or impact sensors, and where such capabilities and their output may be specifically securely associated with (for event/activity auditing and/or governance) encrypted user at least in part biometrically based identification information, such as a device arrangement's patient's contemporaneous at least in part biometrically based (e.g., based on near existential or existential quality biometric) patient carried IIS information. Such information sets can at least in part be communicated wirelessly to, for example, an EBInet RCFD and/or other EBInet device arrangement and/or to a medication auditing and/or management cloud service, physician, other medical practitioner/service provider person, medical organization, other one or more specific family members, and/or other network based, and/or locally monitored, recipients.

EBInet medication monitoring, control, and administration arrangements can, in some embodiments, forward event/activity audited, and/or operatively real-time, information to a remote medical supervisory arrangement, such as a patient's doctor's local and/or cloud service managed (e.g., by a utility) information management and patient support arrangement. Such auditing and management arrangement, for example, can be at least in part managed by a patient's smartphone's RCFD and/or other EBInet compliant smart device, which can at least in part audit and govern (for example, automatically, as a prescription requirement and/or per medication type, and/or as selected by a patient and/or medical professional (such as an MD)) dispensing one or more status information, audit histories (such as including contemporaneous at least in part biometrically based identification information of relevant respective event/activity participating persons and/or EBInet device arrangements), and/or other event/activity requirements. Status, auditing, and/or governance related (and, for example, NIIPU acquired/managed) information can include state information, for example, open, locked, dispensing ready, empty, temperature inappropriate, and/or the like container (e.g., vial) characterizing information. Such auditing and governance assistance information comprises, for example, information informing/alerting regarding respective patients', and/or patient supporting parties', activities/responsibilities related to, and/or policy information regarding one or more information sets associated with, patients' respective pharmaceutical containers.

In some embodiments, such identification information and such information management may respectively comprise and/or employ audited (e.g., event/activity related) identification information of a patient and/or other smart device user (e.g., caregiver, medical personnel, family member), regarding patient past medications taken (including monitored quantities, dates, times (real and/or frequency) during day, location(s), and/or intervals between medication consumptions). Such identification information event/activity and/or status auditing information may include plural persons', such as a user's (patient's), and/or one or more caregivers' and/or medical personnel's, respective unique ID(s) (e.g., IISs), the foregoing received from, for example, such persons' respective EBInet carrying and forwarding devices (provided through the use of their respective contemporaneous at least in part biometrically based near existential or existential quality (may be augmented by operatively simultaneous) identification information). Further, patient and/or patient caregiving personnel attribute information, such as medication information, GPS location, internet based (e.g., email) address, home address, patient diagnostic information, social security number, employment ID, other party contact information, and/or the like may, for example, be stored in such an EBInet medication information management arrangement.

In some embodiments, such EBInet arrangement provided and/or audited and/or otherwise monitored information may include information related to patient IDs, such as respective pill and/or other medication quantities dispensed, remaining and/or next recommended or required time(s) of dispensing, medication contraindications and/or warnings, and/or medication dispensing alerts, for example, as may be communicated to patients (and/or family member(s), caregivers, and/or medical personnel) from their respective pharmaceutical companies, pharmacies, doctors, other caregivers, family members, insurance companies, and/or the like. Such an information auditing, communication, and management arrangement, in some embodiments, can employ tamper resistant EBInet hardware arrangements, such as arrangements' respective modular smart device embedded or inserted components (e.g., NIIPUs). In some embodiments, such information, for example through use of an EBInet compliant smart device such as a smartphone or smartwatch, can be integrated into medication supply chain serialization information and/or container medication dispensing and/or other management arrangement auditing, control, and/or other information sets such as a human body embedded RD (e.g., an RUD or RCFD) modular component. Such information arrangements can support, for example at least in part locally managed, physiological monitoring of one or more human bodily parameters such as heart rate, blood pressure, blood oxygenation, temperature, heart rhythm, and/or glucose and/or other blood constituent levels.

In some embodiments, EBInet information management arrangements, such as container, dedicated, or parent embedded RCUFDs, can receive, carry, and forward arrangements' respective medical ESAMs that provide anticipatory control information and antecedent (provenance) journey auditing information, the latter stored, for example, using EBIBlockChains of EBIBlocks that characterize medication arrangement respective "journeys". Such a device arrangement, such as a human body embedded modular component, may perform both EBInet arrangement identification information functions, and in response to its monitoring of physiological one or more signals and/or a governing authority's (e.g., physician's) instruction set regarding a therapeutic event/activity, may also cause a therapeutic, and/or other, input to such monitored body and/or provide an information instruction/notification to such an arrangement's patient and/or caregiver. Such therapeutic input may, for example, take the form of a locally released/provisioned physiological parameter responsive medication, and/or an initiation of an electrical signal causing a light, audible signal, smart device information alert, therapeutic electrical input, and/or the like.

In some embodiments, one or more portions of such monitored and/or provided information may be securely associated with medication dispensing, such as suggesting or instructing that a provided pharmaceutical managed in an EBInet arrangement be dispensed (or otherwise made available, such as placed in an available staging area (e.g., within such arrangement packaging)) in response to, for example, a change in such human body parameter information. Such information may communicate (e.g., in the form of a specification set), for example, that such a provided pharmaceutical be made available in a specific amount (e.g., number of pills) and/or at specific times and/or within specific time windows, for example as may be responsive to remote secure instructions communicated to an EBInet compliant smart device arrangement that has an embedded and/or inserted EBInet modular component such as a NIIPU or RIIPU. Such secure communicating (e.g., from an RCUFD smart device and/or EBInet arrangement service to a receiving RUD (e.g., an RCUFD) using encrypted communications) can provide medication specification instructions from respective remotely located and near existentially or existentially biometrically identified medical and/or pharmacy personnel, such as physicians, nurses, pharmacists, doctors' offices' and/or clinics' and/or hospitals' personnel, and or the like. In such circumstances, such medical and/or pharmacy personnel may, for example, stipulate the identity of a participating party (for example, including biometrically based person identification information), such as the identity of a pharmacist authorized to dispense, and/or who has dispensed, medication, and/or a patient authorized to purchase and take such medication (and/or who has purchased such medication) in accordance with such instructions. In such an embodiment, such a medication container may have securely associated one or more at least in part biometrically based IISs (e.g., CIISs) that include, for example, physician, pharmacist, and/or end patient at least in part nearly existential and/or existential quality IIS (e.g., CIIS) information and/or such information requirements, where such information, for respective steps of a medication supply chain, stipulate the required at least in part biometrically based identification information for corresponding such supply chain participating parties (may include ESAM specification of a specific person type category for a specific step in an SVCC handling chain, such as requiring EFs stipulating manufacturer, transporter, warehouser, pharmacist/physician, patient, and/or the like) where for example such identification information is carried by such persons on their respective RCFDs and comprises person/RCFD fused identity respective CIISs. Such medication container IISs may contain and/or be securely associated with progressively acquired event/activity audit information where supply chain participating parties' respective RCFD carried IIS information is at least in part supplied (e.g., transparently and automatically) to one or more administrative network services and/or such container's RUD and/or other EBInet RUD arrangement. Such identification information can be securely associated with such end-user patient's medication container's RUD arrangement as an audit information set that can include respective participating supply chain parties' at least in part near existential or existential quality contemporaneous biometrically based identification information.

In some embodiments, remotely provided medication container patient informing and/or usage governance instructions may, for example, be provided at least in part in response to one or more observed functional, physiological, and/or psychological/behavioral readings of physical, chemical, electromagnetic, sonic, and/or the like patient monitored one or more attributes and/or one or more aggregations thereof. Such an instruction can instruct a patient to take a medication in response to a heart arrhythmia and/or blood pressure level, fever level, blood chemical measurement such as of glucose and/or pH and/or oxygenation, and/or medication metabolite level, auditory input, person movement dynamics, and/or other physiologically and/or functionally monitored readings, and where such instructions and readings may be associated with respective EBInet biometrically based identification person specific identifying instances.

In some embodiments, communication of instruction and/or related information, for example, by a physician who may use his/her RCFD to securely communicate at least in part biometrically based identification information of such physician and a prescription/medication/therapy receiving patient) to a pharmacy (e.g., to a pharmacist's, and/or pharmacy network administration's, RUD and/or RUS one or more arrangements) as one or more information components in authorizing the dispensing/retailer of a medical treatment (e.g., medication), and enabling the identification of a patient as the authorized recipient of, a patient's prescription. Such a physician (or physician's medical organization) and/or a receiving pharmacist may further forward such information of such patient or patient, physician, and/or pharmacist to other one or more relevant, other authorized parties, such as one or more patients' other physicians, and/or nurses, family members, caregivers, and/or the like.

In some embodiments, any such instructions, and/or other information regarding a prescription medication dispensing event/activity and/or medication/other therapy usage consequence may include authorized parties (e.g., TIIRS registered physician, pharmacist, patient, other caregiver, and/or the like) persistently registered, contemporaneously acquired, and/or operatively simultaneous, at least in part nearly existential and/or existential quality biometrically based identification information (e.g., an applicable CIIS of a party/RCUFD), as well as secure time and further may have the location, of one or more of relevant events/activities. Such events/activities may include a physician authorizing a prescription, the prescription's preparation (packaging for patient), a pharmacy dispensing/retailing transaction for such prescription, and/or an authorized party agreeing to be an authorized caretaking party who may access and dispense a prescription's medication to an identified/authorized patient.

In some embodiments, EBInet SVCC technologies described for pharmaceutical application alerting, administrative, reporting, and/or management technology arrangements described and/or referenced herein may also, or alternatively, be employed for managing, auditing, and/or reporting activities regarding other tangible items and/or persons. For example, an EBInet arrangement, in some embodiments, may integrate some or all of EBInet auditing, alerting, administrative, and management capabilities with one or more of refrigerators, automobiles and/or other vehicle types (e.g., land transports such as trucks, as well as planes, ships, drones, and/or the like), alarm clocks (e.g., such as alarm clocks that integrate at least some form of biometric and/or environment monitoring), radios, exercise equipment (and/or exercise activity monitors), smart devices such as smartphones and/or watches, conferencing and/or other communication equipment, and/or the like. For example, in response to an identified medical and/or stress and/or other health related, observed event/activity and/or parameter (taking a pain medication, sensor observed voice and/or video stress expression, heart arrhythmia monitoring), a user of an EBInet smartphone alerting RCUFD governance arrangement may make a telephone or video call (and/or send a text and/or email), or a call and/or other message communication may be automatically made by such smart device to a family member and/or other party (e.g., calling a patient's physician, emergency services, friend, and/or the like). Such an EBInet arrangement can function as a component of, and/or general arrangement for, a person and/or family unit health and/or activity alerting, administrative, reporting, and/or management arrangement. Such activities can be, for example, securely associated (e.g., by policies) with near-existential and/or existential quality human specific at least in part biometrically based identities of respective sending and/or receiving parties. Such an arrangement can be managed using a mobile EBInet compliant smart device and/or a family and/or other social relationship unit EBInet network (e.g., RUS hub) arrangement supporting at least in part administration of the medicinal/medical dispensing and other personal health administration for family members (and/or other identified persons).

In some embodiments, such EBInet arrangements may include active control mechanisms, such as EBInet locking mechanisms, where, for example, a container, radio, refrigerator, vehicle, and/or the like is, in response to one or more specified conditions, disabled in one or more ways (e.g., won't operate, won't open, etc.), such as if a monitored health specified parameter condition (e.g., physiological event) occurred, or occurred within a specified time period and/or in combination with one or more other variables, causing messaging to one or more specified parties, and/or caused policy specified governance of an EBInet arrangement controlled one or more device arrangements. For example, such EBInet enabled control may cause the locking of a refrigerator between certain hours applied to certain one or more IIS identified parties or the disabling of a vehicle's operation if certain one or more EBInet device arrangement monitored health or performance parameters indicate driver or prospective driver intoxication and/or other one or more risk factors.

In some EBInet embodiments, EBInet modular components may employ secure blockchains (e.g., EBIBlocks) for ensuring SVCC, other handling and control, and/or anonymized chain, integrity using distributed networks of validation nodes. In some embodiments, a blockchain may employ at least in part nearly existential and/or existential quality biometrically acquired and/or otherwise biometrically based identification information as contributing input to chain corresponding pharmaceutical and/or other resource instances' cryptographic key generation (e.g., where such key generation is based at least in part on EBInet device arrangement related person (user, owner, at least in part biometrically based cryptographic key information input). Such key input, for example, can be used for encryption and decryption of SVCC (for example, including other commercial, and/or at least in part anonymized (e.g., person identity anonymized)) participating human and/or EBInet device arrangement instance identification, policy, audit, control/management, and/or the like information.

In some embodiments, such cryptographic key input can be employed with HSM cryptographic data encryption and decryption arrangements. In some embodiments, such stakeholder at least in part biometrically based key information input can differ at some or all of blockchain sequence instances as it reflects, for example, different instances of one or more stakeholder or otherwise participating persons, and where such blockchain sequence instances' respective creating stakeholder/participant and/or composite person/device arrangement identification information sets include, and/or are securely associated with, their respective chain sequence instances (e.g., where block instance key management is based, at least in part, on one or more block respective stakeholders'/participants' contemporaneous biometric nearly existential and/or existential quality identification information). Such biometrically based identification information is, in some embodiments, securely employed to, at least in part, provide encryption and decryption key information input for cryptographic management of blockchain instances' respective associated control, provenance and/or other audit, and/or rights management information sets. For example, in some embodiments, only the respective one or more parties whose biometrically based information was employed, at least in part, in cryptographic key generation for a blockchain instance (and/or was otherwise specified as allowed specific person and/or person group), would be able to decrypt, or authorize the decryption of, such instance, such decryption for example requiring the providing of an EBInet contemporaneous RCFD carried nearly existential or existential quality (including liveness tested), and/or operatively simultaneous (may be liveness tested), at least in part biometric identification process set. Such a blockchain or the like arrangement can enable in some embodiments EBInet implementations that support anonymous users and/or known users (e.g., chain instance stakeholders) to maintain the privacy of blockchain information instances, and/or information respectively securely associated with such blockchain information instances, where the presence of nearly existential and/or existential quality contemporaneous, and/or operatively simultaneous, at least in part biometrically based blockchain stakeholder identification information (e.g., as carried by an RCFD) is required to access and/or to authorize the access of respective one or more such private and securely maintained information instances.

In some embodiments, EBInet blockchain arrangements can be used in supporting non-fungible tokens (NFTs), where the identity of a person (or party, through one or more person agents) is represented by EBInet arrangement nearly existential and/or existential quality at least in part biometrically based identification information, for example, in the form of a composite IIS that fuses such owning party's at least in part biometric identification information with the NFT subject matter, such as the original instance of a digitally rendered data set. In some EBInet embodiments, NFT blockchain uniqueness validation techniques (e.g., using EBIBlocks) may be used to assure/authenticate that at least in part biometrically based identification information sets, and/or components thereof, are respectively unique information instances.

In some embodiments, EBInet device secure communication to one or more administrative arrangements can assist patients, and/or their medical professionals and/or caregivers, in assuring appropriate medication use. Smart EBInet container at least in part biometric identification-based auditing and managing arrangements, for example for food, pharmaceutical, and/or other product applications, can have smart functions for managing drug or food or other product expiration. For example, in response to an expiration event (and/or other event, such as content reaching or persisting for a period at a certain temperature and/or humidity and/or impact/energy reading), an EBInet seal won't open to allow content access and/or use. Such seal device may be specified to provide or otherwise enable an alert at, in anticipation of, and/or after, an expiration date and/or other condition set. Such a seal device arrangement may also provide notice to refill or resupply, and/or, for example, provide other content administration and/or related seal action information (e.g., drug dosage regulation, such as notifying a responsible party (e.g., family member, caretaker, doctor, etc., using secure network communications) regarding patient under-medicating, or that a container won't open until a certain time has elapsed or a specific time point has been reached, such control information prescribed and/or otherwise specified by a health professional or other caretaker for a given individual, thus helping to prevent patient overmedication, and/or the like).

In some embodiments, EBInet SVCC arrangements can be used to integrate smart product usage management into consumer/customer buying activities, where for example, a customer purchases items (that respectively have RUD instances) at a supermarket and where such items are identified as authentic as to brand and content origination, and/or identify supply chain transit details, dates, refrigeration history, and/or the like. Such governance information for purchased product may be communicated from item or item arrangement to a purchaser's RCUFD modular component, and where such information may notify a user as to the timing of, and/or the approaching of, a Best By Date/Expiration Date, refrigeration requirements, removal and/or consumption activities, restocking opportunities/objectives, and/or the like.

For example, in some embodiments, EBInet SVCC arrangement at least in part biometrically identified, registered one or more humans at Company X may use an ACFD (or RCFD) to authorize, and audit the use of, respective EBInet RD seal arrangements' events/activities. Such EBInet device use can include, for example, the steps of receiving a shipment of at least in part tangible goods, then opening a shipping container containing such goods, removing one or more of the container's multi-instance resource (goods containing) boxes, and then transferring (e.g., shipping) any such removed boxes to their respective receiving parties (e.g., organizations such as companies and/or other affinity groups, e.g., associations and/or family units and/or specific individuals), and/or transfer goods to one or more other containers for storage and/or further shipment and/or movement to a non-container storage arrangement. In such EBInet SVCC arrangements, ESAM arrangements may be employed to specify rules and controls information for anticipated event/activity instances and EBIBlocks comprising respective SVCC or other content event/activity instances' history/audit information may securely be maintained in content instance respective EBIBlockChains and communicated to respective, applicable EBInet SVCC arrangement device and/or service (such as administrative) arrangements.

For example, in some embodiments, an EBInet secure, tamper resistant RUD (or other RD) component that is embedded in, and/or otherwise tamper-resistantly attached to, a given resource crate, carton, pallet, SIMC, or other shipping container (e.g., in the form of an embedded EBInet tamper resistant hardware seal arrangement having a NIIPU securely incorporated in such seal arrangement) such as a seal arrangement attached to an intermodal shipping container for secure content governance of such container's shipping carton and/or other packaging arrangement(s), for example, a container carrying and protecting prescription pharmaceuticals. Such seal arrangement set could, for example, receive an AFD arrangement acquired existential quality, biometrically based identification information set and securely carry such information set for inclusion in (e.g., securely incorporated in and/or bound to) a serialization event/activity identification information set. Such a serialization event/activity information set can be produced within a hardware NIIPU managed EBISeal arrangement, and/or within an RFD arrangement carried by an SVCC related administrative person and/or produced by a network service administrative instance (e.g., at a network server RUS and/or in an RCFD arrangement that securely receives input from such a managed EBISeal), and/or such seal arrangement set may perform, based at least in part on such biometrically based (such as composite) identification information, control and/or monitoring functions such as for container and/or carton secure locking/unlocking and/or container cargo content removal and/or supplementation. Such control and/or monitoring functions may also be, alternatively be, or at least in part be, performed with such an RCFD and/or RUS arrangements.

Seal arrangement operations' management may be, in some embodiments, at least in part performed within such an RD (e.g., an RUD or RCFD) smart device arrangement and/or at one or more smart network administrative arrangements (such as on an organization's network server arrangement), and such a seal arrangement may employ plural EBInet compliant device distributed arrangements (e.g., container seal RUD, user's RCFD, and organization's or service's network administrative RUS arrangement) functioning together as an at least in part virtual EBInet seal arrangement.

In some embodiments, SVCC serialization information sets can comprise specified anticipated event/activity related handling and control information instances, such as specified in one or more respective ESAMs. Such information can describe manufacturing origination/certification and eligible SVCC "pathway" locations, specific event/activity options (optional "downstream" steps), and/or associated companies' identities (may include company and/or company entity/person attribute information (e.g., biometric, EF, and Cred)), and/or associated one or more stakeholder and/or user persons and/or persons' one or more person classes/types (e.g., authorized groups of persons, such as employees/other agents for respective organizations, other entities', and/or departments thereof, for example where such an employee is stipulated by an EF as being an employee of Company X, Department Y). Such individuals, entities, types, and/or groups may be authorized to perform respective one or more events/activities involving respective, for example, cartons (and/or associated shipping intermodal containers, crates, boxes, barrels, secured pallets (e.g., with respective secured coverings, such as a tight covering/content protecting tarps), multiproduct instance packs, individual products' instance packaging, and/or the like). Such anticipated stakeholder persons and/or other authorized and/or otherwise eligible parties can be securely, near existentially or existentially, biometrically identified and monitored as to their activities involving interaction with SVCC, and/or other handling and control chain managed, products and/or their shipping/packaging one or more arrangements. In some embodiments, serialization seal (e.g., EBISeal) network administrative arrangements may employ embedded, attached, and/or the like seal arrangements that are specific to shipping one or more vehicles (any transportation shipping means, such as ships, motor vehicles, e.g., trucks, trains, drones, planes, and/or the like, such vehicles while respectively at storage facilities and/or in transit), shipping containers, specific shipped item instances, and/or storage facility storage instances (e.g., location specific identified storage buildings (e.g., warehouses), room arrangements, garage arrangements, and/or the like). Such seal arrangements may be administratively controlled as specified by an electronic manifest (e.g., an ESAM) employed during an SVCC shipping process. Such vehicle, container, and storage facility instances can carry and/or have embedded EBInet device arrangement seals that have network administrative management functions. Such network administrative arrangements, for example, can comprise respective secure RCFD arrangements that recognize and communicate with their respective physically local, for example, seal managed containers and/or cartons (which may be moving and/or stored), for monitoring and managing cargo (e.g., content) movement, access, unpacking, and/or other item SVCC and/or other handling chain event/activity control and/or auditing functions.

In some embodiments, EBInet device arrangement seals can securely receive (from other EBInet compliant arrangements), and/or directly securely acquire (by performing EBInet biometric identification information acquisition, using, for example, a RIIPU and a sensor/emitter arrangement), at least in part biometrically based near existential and/or existential quality identification information sets of respective stakeholder, user, and/or CertPer persons who are, or can be, associated with respective EBInet serialization seal events/activities. Such identification information sets can be used for EBISeal event/activity associated information may comprise event/activity (or SVCC inactivity, for example, where an SVCC item continues to be stored in the same position/location) audit information receiving, storing, locking, unlocking, and/or shipping, packing and/or unpacking, and/or moving/further shipping of relevant items (e.g., event/activity involving cargo containers, cartons and other multi-instance packages, and/or individual cargo content product instances). Such cargo activity information may also include secure clock provided real and/or relative time and location information and associated E/A information for one or more of such activities/inactivity states, where such secure clock information sets can be embedded in respective RUD EBISeals and/or securely provided by (a) respective EBInet network administrative (e.g., RUS) arrangements, and/or (b) EBInet device arrangements such as RCFDs. Such secure clocks can be used for respective cargo related events'/activities' times of activity attribute information for respective resource instances' events/activities types. Such EBInet cargo serialization activity (or non-activity, e.g., status) audit information types may include any event/activity handling related characteristics/types specified to be employed in accordance with US regulation and/or regulation as specified by one or more relevant other government and/or other at least in part governing entities (e.g., required by a pharmaceutical entity (and/or other resource provider or other manager) transaction identification information set, such as may be specified in the US Drug Supply Chain Security Act of 2013 (and/or subsequent regulations)).

In some embodiments, at each stage, or multiple (e.g., grouped) stages, of a commercial or affinity group resource distribution/ownership supply, value, other commercial, and/or other, chain's contents' (e.g., products', tangible and/or intangible) transfer "journey," one or more portions of a serialization chain's EBInet related REAIs' IISs (e.g., CIISs) may be stored, for example, internally in an EBInet embedded and/or attached and/or otherwise securely integrated modular component arrangement one or more EBInet device arrangement sets (e.g., NIIPU arrangements), of, for example, one or more EBInet compliant seal (EBISeal) arrangements, and/or on one or more other RD and/or EBInet network administrative (e.g., RUS) arrangements. Such IISs can, for example, be used in response to policy specification(s)' governance rules and controls for rights management (performed locally and/or remotely), for secure authentication and/or other validation, and/or for auditing and/or other administration, of such REAIs' related (1) at least in part biometrically identified stakeholder and/or user human one or more parties' respective associated events/activities, and (2) SVCC and/or other chain of handling and control resource operations (e.g., managing and auditing SVCC resources and/or contents). Such policy specifications can be used for managing anticipated and/or monitored events/activities, such management, for example, in accordance with policies regarding event/activity types, specific stakeholders and/or stakeholder persons and/or other persons (e.g., users, intruders, and/or the like), and/or associated times, dates (and/or time and date windows), and/or locations. Such IISs can comprise, for example, EBInet device arrangement event/activity participating stakeholder associated persons' at least in part nearly existential and/or existential quality biometrically based identification information, one or more event/activity associated EBInet device arrangement information sets (or one or more portions thereof), and/or one or more information sets regarding IIS respective stakeholder persons', and/or EBInet arrangement devices' (e.g., seal arrangements') actions. Such actions may include, in some embodiments, authorized or unauthorized opening of a container set, and/or physical removal of a packaging (e.g., cargo) unit (resource container, carton, pallet, barrel, and/or item and/or multi-item instance) from another packaging unit, and/or from a vehicle and/or storage facility (for example, an identified (e.g., specified) facility's area such as a warehouse section unit), and/or movement of a packaging unit to another geographic location, and/or the like.

In some embodiments, EBInet arrangements can constrain or eliminate the misrepresentation of important SVCC and/or other chain of handling and control "facts" (which may be demonstrated as false representations), such as location of cargo in a supply chain handling sequence. Such management of integrity (e.g., ensuring the accuracy) of SVCC item and/or item container sourcing and handling location/history and/or other pertinent representations can be in part assured by acquiring near-existential or existential quality biometrically based identification information, where such identification information is then checked to see if it corresponds to biometrically identified one or more persons' respective registered physical locations (e.g., during a workday registered to be at a given, specific address supply chain stakeholder's warehouse facility). For example, an EBInet compliant seal managed cargo, container, carton, pallet, and/or other containment instance can be located, and/or its asserted location can at least in part be determined, by using the registered physical location of near-existentially or existentially biometrically identified SVCC stakeholder persons. If a party, for example, is determined to be a Mr. X, a supply chain stakeholder person who is registered as being in Shanghai at location Z for an authorized time period (during time period Y), then if Mr. X is involved in a container opening event during time period Y as demonstrated by contemporaneous and/or operatively simultaneous biometric identification activity information sets, it can be inferred that such container, when opened, was also in Shanghai at location Z. This location information must match (as, for example, specified through registration with an SVCC entity TIIRS arrangement) the person's specific supply chain activity instance (for example, wholesale location, assembly location, shipping distribution location, and/or the like) associated location information. If specified or otherwise desired, such registered location of one or more such persons (e.g., stakeholders, CertPers, and/or users) can be further validated using EBInet device arrangement location identification techniques, such as identifying "local" to activity and/or other cellular network location techniques, registered Wi-Fi router arrangement's location, registered Bluetooth location, and/or using GPS location techniques. Such location identifying process sets may, for example, at least in part be securely performed by a person's (e.g., Mr. X's) EBInet compliant smart device, e.g., smartphone's (and/or smart watch, bracelet, and/or pin/brooch) isolated modular component (e.g., NIIPU) arrangement, where such location identifying information may or may not be accessible (as securely specified and, for example, NIIPU arrangement enforced) to Mr. X (or other one or more parties local to an event/activity), but is readable and/or retrievable by such arrangement's network administrative and/or cloud service supply and/or value chain management one or more arrangements, which can validate an inferred or stipulated location of Mr. X when performing such a supply and/or value chain or other chain of handling and control event/activity.

In some embodiments, RCFD arrangements employed as components of SVCC and/or other chain of handling and control (handling and control may include, for example, auditing and reporting) seal management arrangements, may "carry" at least in part near-existential and/or existential quality biometrically based identification information for respectively enabling EBInet managed activities, such as securely publishing REAI IISs, and/or, for example, authorizing, auditing, reporting, and/or otherwise governing EBInet managed computing events/activities. Such EBInet device arrangements may comprise, for example, a stakeholder person's carried smartphone with an embedded, secure and isolated, EBInet tamper and inspection resistant modular component (e.g., NIIPU) carrying at least in part contemporaneous biometrically based identification information of its owner(s) and/or other user(s) (who, for example, in an SVCC arrangement may function as CertPers), where such identification information is supplied to authorize and/or certify an EBInet event/activity, and/or support producing an REAI IIS (e.g., for an identification information publishing event/activity) using a device arrangement's and/or associated RUS's, device arrangement's stakeholder one or more persons', composite device arrangement's and associated person's, and/or device arrangement's one or more non-stakeholder users', identification information. Such authorization, and/or support, can enable publishing an REAI IIS and/or can otherwise enable a computing event/activity, such as accessing the contents of an EBInet seal managed container or enabling a user to sign onto his/her online bank account.

In some embodiments, an RCFD used for SVCC and/or other chain of control and handling processes may, for example, comprise an EBInet compliant (a) smartphone, tablet, and/or smart watch arrangement, and/or (b) a smartphone and/or smart watch with one or more embedded, inserted, and/or otherwise securely connected to such a smart device arrangement modular component, securely isolated EBInet environments, used for event/activity monitoring/governance purposes, for example used in support of SVCC serialization administration and management. Such an RCFD arrangement can be highly mobile and can be personally, easily carried by its owner/user. Such an arrangement can support pervasive IIS information availability, where, for example, such RCFD can, as situationally appropriate, communicate nearly existential or existential quality at least in part biometrically based identification information with one or more chain of handling and control RUD (e.g., RUFD) seal implementations (i.e., EBISeal device arrangements comprising at least in part respective EBInet receiving and using arrangements) through periodic broadcasting to, and/or in response to a request from, an SVCC arrangement such as an EBInet container seal arrangement and/or local network based EBInet SVCC administrative service.

In some embodiments, such RCFD's SVCC and/or other chain of handling communications can provide RUD seal cargo monitoring and/or management of vehicle, container, storage environment, enclosed/covered pallet, carton/box, product group other packaging, single packaging, and/or the like arrangements. Such seal packaging arrangements can perform identification information monitoring, analysis, and/or governance regarding one or more persons' (e.g., organization personnel's) respective interactions with cargo and/or cargo packages/enclosures. For example, RCFD SVCC participating organization stakeholder personnel (and/or other organization agent, and/or end-product user and/or CertPer) carried at least in part contemporaneous at least in part biometrically based identification information (e.g., CBEIISs) and/or person/device arrangement CIIS information can be forwarded by their respective RCFDs and employed by receiving SVCC EBISeal arrangements. Such IIS information can be carried in RCFDs by such personnel and/or by personnel agents, such as robots that have integrated RCFD arrangements that can carry one or more such personnel persons' respective contemporaneous at least in part near existential or existential quality biometrically based IIS instances. Such seal arrangements can use such information in monitoring and/or governance of in-transit packages/enclosures, and/or such packages'/enclosures' contents' movement and/or storage. Such use can be in response to personnel and/or other relevant event/activity parties providing and/or otherwise making available (e.g., transparently to such personnel and/or other party) their at least in part biometrically based contemporaneous identification information and/or such information's associated RCFD EBInet device arrangement composite identification information, and/or information at least in part derived therefrom.

In some embodiments, RCFD stakeholder person, user, and/or device composite, identification information can be bound with standardized and interoperably interpretable SVCC characterizing information. Such characterizing information may be expressed through the use of an SVCC computing language at least in part comprised of standardized and interoperable expressions for event/activity types, content types, SVCC device arrangement types, SVCC stakeholder and related person types (including identification information, such as person near existential or existential quality biometrically based information), attribute types of the foregoing (including effective fact and/or quality to purpose language expression resources), and related SVCC language lexicon configurations. An SVCC arrangement, such as for EBInet SVCC serialization, can employ such a specialized SVCC language for describing, for example, cargo status (transiting and/or other movement, event/activity auditing, packaging (e.g., containment integrity), and governance, status) and/or stakeholder personnel (e.g., stakeholder person position/role), end-users, and/or other cargo/content handling parties. Using such an EBInet SVCC language, SVCC information sets (e.g., ESAMs) can describe both anticipated E/A instances, including associated rules and controls, and can describe audit information regarding E/A instances. Such a language can describe SVCC REAIs and/or REAI sequences' respective event/activity groupings (e.g., stops along product manufacturing and/or shipping process sets) using standardized terms, for example, for container type and/or location/position instance, and/or the like. Such a language may be used to include personnel status and/or event/activity interacting persons' respective identification information sets within such sets' (e.g., CBEIISs and/or CIISs) respective ESAMs including, for example, SVCC content and/or containment stakeholders' and/or other persons' respective rights management information used in cargo related event/activity governance. For example, such ESAM E/A characterizing and governance information sets may describe anticipated and historical cargo transit and/or storage activity and/or status using standardized types/names/symbols (e.g., for cargo container and/or cargo content instance and/or portion thereof (e.g., for an intermodal steel frame and siding cargo container, or for a standardized crate and/or cardboard box carton)) for opening, closing, adding to, moving, storing, modifying, using, and/or the like, and where such names for activities and/or statuses, cargo types, shipping "stages" (transits and stops in a shipping sequence journey), as well as names for stakeholder types and person types corresponding to such at least in part biometrically based identified persons, may be standardized, such as "person stakeholder", "owner", "executive officer", "manager", "shipper", "warehouse employee", "contractor", "driver", "service provider", "other agent", "retailer", "customer/owner", and/or the like, and where the foregoing may be associated with one or more stakeholder manufacturers, publishers, shipping companies, wholesalers, distributors, retailers, pharmacies and/or other dispensers, maintenance and/or repair and/or other service providers, users, government agencies, and/or the like, where the foregoing may use standardized types and respective names and comprise, at least in part, an SVCC administration standardized language.

In some EBInet embodiments, at least in part biometrically based identification information can, for example, be securely bound to, such as included securely in, a securely maintained SVCC and/or other event/activity (including across time, and/or at a time instance, status) IIS, such secure binding using, for example, cryptographic protection/hashing. Such IIS can further include, and/or be securely associated with, securely acquired and maintained time and location information, and/or identified supply, value, and/or other commercial and/or other handling and control chain participating person and/or person class rights management rules' and controls' specifications (e.g., for SVCC authorization and/or other event/activity governance, where such rules and controls may include rights management rules and controls, and/or other event/activity governance, status, and/or auditing management information).

In some embodiments, SVCC mobile EBInet RCFD and/or the like arrangements can provide at least in part contemporaneous near-existential and/or existential quality biometrically based identification information for use in (e.g., as input for), at least in part, monitoring, provenance auditing, and/or managing, resource related events/activities. Such identification information can be securely bound with SVCC cargo and/or item origination, interim, and/or destination, location, and associated governance, information for storage, transit, handling, and/or use, such as SVCC and facility information (e.g., ESAM information), such as storage location(s) and warehouse identifier and configuration information. Such information may include, for example, internal to warehouse information regarding building and/or shelving location(s), room and/or storage configurations, environmental conditions (e.g., temperature and/or humidity), and/or locations of cargo one or more instances, including, for example, such cargo locations' respective addresses (street addresses, cities, ports, states or provinces, and/or countries), where the foregoing may include building and/or building internal unique location identifying information, such as addresses, room identifiers, and/or shelving/storage arrangement codes. EBInet SVCC arrangements can monitor and/or manage, through the use of respective (1) SVCC EBInet RUD EBISeal arrangements, (2) RCFDs, (3) contemporaneous nearly existential and/or existential quality at least in part biometrically based identification information sets (e.g., as carried by SVCC related personnel's RCFDs), (4) ESAM manifest cargo content information, and/or (5) associated network based administrative arrangements, such as RUSs, SVCC administered goods as they, for example, move from origination and travel through the use of cargo shipping land, sea, and/or air vehicles, and further through SVCC use of storage one or more facilities (as may be employed), and through purchase by end-customers.

In some embodiments, EBInet compliant shipping vehicles (e.g., trucks, vessels, aircraft, trains, and the like) can employ EBInet seal RUD arrangements, which may include and/or be used in conjunction with other RUD and/or RUS EBInet device arrangements (such as warehouse integrated RUDs, for example as affixed to a warehouse structure and/or integrated into warehouse SVCC related devices) for warehouse event/activity monitoring and/or management, including, for example, SVCC RUS item and container and/or cargo assembly and control, auditing, and other management/administration. In some embodiments, shipping vehicles may carry shipping containers, pallets, boxes, barrels, cartons, and/or plural and/or singular product packaging instances. In some embodiments, at least a portion of SVCC goods transit and storage is monitored and managed using EBInet access control capabilities as described herein, and where at least in part contemporaneously and/or operatively simultaneously acquired biometric identification information is securely employed to form at least in part biometrically based and associated secure time-based (using a seal embedded and/or otherwise available secure clock arrangement) and location, and/or movement based, at least in part cryptographically protected identification information sets regarding human and/or device (e.g., robot, forklift, and/or the like) interaction (or absence thereof) with one or more elements of SVCC shipping and/or storage goods. Such information sets can comprise SVCC transit activity and/or status information, such as regarding one or more portions of event/activity sets' cargo origination, shipping, storing, redirecting, removing, modifying, and/or or the like, other administration and/or auditing.

In some embodiments, an EBInet device arrangement, for example a smart device comprising an RCUFD arrangement, can use SVCC event/activity instance at least in part biometrically based nearly existential or existential quality identification information to create at least one SVCC bio provenance audit trail information set (such as at least one cargo provenance information set). Alternatively, or in addition, such device can securely forward (communicate) at least a portion of such SVCC event/activity identification information to, for example, a local to a user (for example, forwarding, and/or auditing (e.g., provenance acquiring) and/or event/activity managing) EBInet smart device information hub arrangement (e.g., one or more smartphones, tablets, laptops, desktop computers, and/or the like) and/or to a remote organization and/or cloud server based service EBInet compliant administrative and/or management arrangement. Such audit, and/or monitoring, information can be securely communicated from, for example, an EBISeal RUFD arrangement (such information regarding, for example, an event/activity at least in part governed by such RUFD) to an RCUFD and/or one or more other RUFD seal administrative and/or communication arrangements, through the use of wireless one or more arrangements, e.g., Bluetooth, Wi-Fi, RFID, cellular communications, and/or satellite (e.g., for use with planes and sea going ships and/or other locations, including, for example, use with ship or other transport containers and/or compartments), and/or the like, and such communication may "hop" from an RUFD to an interim location, e.g., an RCUFD, which may then communicate to one or more local and/or remote administrative RUS arrangements. In some embodiments, such communications can be securely transmitted (e.g., securely communicated using EBIBlocks and/or an EBIBlockChain) from a local seal arrangement to a network device information hub arrangement, where such a hub arrangement can aggregate and/or otherwise process such information, which can then be securely communicated to one or more administrative local, organization, cloud service, and/or other SVCC (such as participating organizations) information management arrangements.

In some embodiments, EBInet biometric identification information acquiring arrangements comprise embedded and/or otherwise affixed and/or securely integrated modular components (e.g., RIIPUS and/or NIIPUs), that can, for example, comprise at least in part, small near-existential and/or existential quality, biometric identification authorization, "crypto anchor" mobile biometric identification information computing arrangements (e.g., EBInet modular components), where such arrangements may be implemented as small, very inexpensive and low power consuming computing system-in-a-chip arrangements. Such arrangements can comprise, for example, tamper and inspection resistant one or more operatively at least in part isolated from parent smart device arrangement security hardened processors that include protected dynamic memory, protected information storage, secure communication, tamper and inspection resistance, and/or other cryptographic and/or security, capabilities, and in some embodiments may include chip arrangements' respective one or more unpredictable (such as pseudo-random) emission instruction generators, batteries, embedded and/or otherwise associated solar (light) power cells, pendulums and/or other movement power generators, and/or dedicated hardware cryptographic engine, arrangements.

In some EBInet embodiments, modular components, such as NIIPUs, can function, at least in part, as SVCC anti-fraud auditing and management device arrangements. For example, in the hands of a user, an RCUFD, for example, using NIIPU modular components embedded or inserted into or otherwise securely integrated with/within respective parent device arrangements, can support parent device/NIIPU arrangement SVCC auditing and/or management. Such native smart devices may support secure virtual enclave and operating sessions using smartphone secure capability set managed processing. In some embodiments, a smartphone may not include a programmable hardware based modular component (e.g., a NIIPU) but relies on VM, capability set, and/or other smartphone native technology to support mobile and distributed SVCC chain use of at least in part AFD arrangement acquired nearly existentially and/or existentially identified persons' identification information for respective events'/activities' auditing and management in a uniquely secure and efficient manner (e.g. performing operations, such as pBIDE IIT broadcasting and/or responding to RUD/RUS polling/requesting), such auditing and management performed automatically and transparently to, or at very low burden to, participating stakeholder/user persons, for example using their RCFD fused-identity person/device identification information sets. Such arrangements can efficiently perform highly secure operations related to such person, and/or person/device fused-identity, entity's secure identification and related event/activity identification, auditing, rights policy enforcement, and communications.

In some embodiments, components of respective parent smart device arrangements can be operated at various times, for example, component functions of a parent (e.g., smartphone) device-native biometric identification information acquisition function set, so that a parent biometric identification information arrangement can be used in combination with the use of a corresponding EBInet AFSD arrangement's contemporaneously acquired biometrically based identification information. Such combined use of parent native biometrically based information and contemporaneous AFSD biometrically based information can be employed as multiple identification information factors by an RCFD using its modular component arrangement, for example, a NIIPU's security and biometric identification and related identity management functions. For example, modular component biometrically based identification information functions can be augmented by additional factor EBInet compliant parent device implementation one or more arrangements. Such biometrically based information analysis functions can be performed on both the parent device and its respective EBInet modular component arrangement, for example, using both a parent smart device arrangement's secure enclave, sandboxing, biometric sensor and/or biometric identification capabilities, and the corresponding isolated, security hardened capabilities of an embedded EBInet modular component, both performing identification information related functions. For example, such parent smart device native security and/or biometric identification functions can provide operatively simultaneous device user identification and alternative factor identification information functions. Such alternative factor function results can be, for example, analyzed for consistency against modular component biometric identification operations (such as against a carried contemporaneous IIS) to assess whether such second factor parent device biometric produced identification information and such modular component biometric identification information comparison results identify the same party. In some embodiments, such analysis can be performed in such modular component (e.g., an RCFD NIIPU arrangement), and/or securely communicated to and performed at an EBInet device arrangement network hub and/or at an EBInet identification information cloud service. Such analysis results can be used, for example, in RCFD identification information provisioning, authentication, and/or event/activity governance operations.

Such modular component devices' capability set instances may, in some embodiments, employ modular component hardware implementations in part comprising very low-cost computer-on-a-chip implementations such as described at IBM's Think 2018 conference. Such computer-on-a-chip implementations may measure, for example, only 1 mm by 1 mm, have the processing power of an x86 processor arrangement, and cost less than 10 cents per instance to manufacture (newspaper article from the Independent, May 20, 2018, and IBM research.ibm.com webpage information (May 2018)). Such chip implementations may at least in part comprise EBInet modular component arrangements that employ one or more of the design arrangements described herein as component capabilities of secure, isolated processing EBInet modular components (respectively supporting at least in part isolated computing environments), including employing hardware and software anti-tampering and anti-inspection, hardening features such as a set of countermeasures features, including those described herein. Such modular components may operate as largely "independent" secure processing, memory, and communications environments embedded in, and designed to support secure EBInet functions that are operatively separate from, their respective parent smart device environments.

In some EBInet embodiments, secure key generator services employ keys based on information associated with their respective embodiments' resource instances, such as resources' (e.g., device arrangements') respective one of more embedded secrets. For example, in some embodiments such key generation may at least in part be performed by EBInet device arrangements' respective secure key generation capabilities, and/or by other EBInet network based (administrative and/or cloud service) resource specific key generation arrangements. For example, an HMAC may be used to validate data using an HMAC tokenization service, such service maintaining EBInet device arrangement keys locally in support of a single point of decryption, and where signed, short-lived tokens can be used in database processes, such as protecting (e.g., encrypting), accessing (e.g., decrypting) and/or authenticating resource identification information sets.

In some embodiments, audited event/activity information may include, for example, commercial chain item and/or item group commercial status, location, transaction event type, date and time, and/or the like, audit information, where such information may be at least in part maintained as secured, encrypted provenance information activity, and/or stakeholder person sets.

In some EBInet embodiments, NIIPU arrangements are embedded and/or otherwise securely affixed using packaging seals on respective resources' SVCC cargo container and/or other packaging arrangements. Such seal arrangements can support, for example, recognition of and/or response (e.g., an alarm and/or electronic message) to one or more of breaking into, opening, closing, pausing, turning off, and/or removing a seal locking and/or monitoring, mechanism(s) and/or altering a seal's packaging, and/or identifying associated shipping container (e.g., sensing (using one or more sensors)) vibration from drilling or cutting into an intermodal or other container's packaging arrangement and/or sensing that such a seal mechanism was, and/or may have been, made temporarily (or permanently) dysfunctional and/or the like. Such seal arrangements can respectively monitor and/or govern access to, for example, shipping cartons' and/or intermodal containers' contents, for example, based upon location and/or time/date of an SVCC seal arrangement's related event/activity, communication network status/availability and/or activity, human performance of an action such as performing biometric identification and/or recording biometric event/activity person event/activity audit information, and/or the like auditing of user's EBInet device arrangement when participating in an SVCC event/activity set.

In some embodiments, an EBInet mobile device arrangement, e.g., an RCFD arrangement, that carries a contemporaneous at least in part biometrically based identification information set interacts with one or more RUDs of a cargo arrangement when such an RCFD user opens, enters, closes, and/or moves (and/or the like) a cargo shipping container, carton, package, and/or the like. Such user's RCFD can automatically forward at least a portion of the user's one or more at least in part contemporaneous and biometrically based nearly existential or existential quality IISs (e.g., comprising respective EBICerts and/or other IITs) to one or more respective RUD cargo seal arrangements (which may respectively include associated network administrative RUS arrangements) for one or more intermodal container, crate, pallet, carton, box, and/or item respective packaging, instances, when, for example, such instances are respectively opened, entered, closed, removed, transferred, has cargo content removed and/or added, observed, and/or otherwise interacted with.

In some embodiments, embedding modular component, e.g., NIIPU, based EBISeal arrangements into, and/or affixed to, respective individual resource items, multi-item packages, cartons, pallets, intermodal containers, and/or other shipping carriage arrangements supports policy-based SVCC governance. Such embedded modular component arrangements can store (and/or have available on a network (e.g., a RUS) connection forward going (e.g., anticipated event/activity) and/or backward looking (e.g., historical audit) stakeholder authenticatable at least in part biometrically based human identification information and associated rights, rules and controls policy information. Such embodiments can enable EBISeal arrangements to determine, or be instructed, that a party has one or more rights to take one or more actions, and to manage such rights. Such seal arrangements can respectively communicate at least in part biometrically based identification information to and/or from one or more corresponding receiving and/or forwarding other EBInet device arrangements (e.g., an SVCC stakeholder person's RFCD and/or a cargo auditing/management RUD and/or RUS). Such information can, in some embodiments, at least in part be used to authenticate persons, audit person and/or person class specific resource packaging related events/actions, and/or limit and/or otherwise control human interactions with shipping packaging, based upon, for example, EBInet at least one SVCC serialization related ESAM specification (e.g., contained in a shipping cargo manifest arrangement). Such validating (e.g., authenticating) of stakeholder persons (e.g., cargo interacting one or more parties satisfying manifest specifications), can employ AFD arrangements' produced respective contemporaneous biometrically based near-existential and/or existential quality identification information, person, person grouping, and/or device arrangement, associated location, and/or date/time, secure information sets.

In some EBInet embodiments, at least in part biometrically based identification information is used, at least in part, in forming and/or enabling REAI identification and auditing information sets, for example each comprising (1) resource specific manufacturer (and/or other SVCC non-end-user and/or owner party) uniquely identifying information (which may be at least in part nearly existential or existential quality, biometrically based), (2) a manufacturer's provided secret information instance used for uniquely identifying its corresponding manufactured item instance, (3) owner, owner agent, and/or user one or more persons' at least in part biometrically based identification information, and (4) serialization and/or other resource and/or event activity auditing and/or management (e.g., authorization) information (e.g., rules and controls policy) sets. Such identification and auditing information may be stored and communicated using information set respective EBIBlocks that comprise EBIBlockChains describing SVCC content events/activities.

In some embodiments, EBInet SVCC environment events'/activities' respective rules and controls may include standardized type of event/activity one or more attributes. Such attributes may include respective device arrangements', stakeholders', stakeholder agents', users', and/or CertPers' (a single person may be one or more of such types) identification information for inter-device arrangement communication and/or management. Such communication and/or management can be based upon, for example, registered stakeholder and/or other person (e.g., members of a stakeholder group (e.g., a grouping comprising a stakeholder's employees' and/or other agents')) respective policy parameters, such as stakeholder person, and/or stakeholder person group, policy specifications for authorized events/activities. Such events/activities can include, for example, respective use of resources, unlocking intermodal container doors, removing container cargo contents (e.g., without triggering an alarm), and/or the like, and such instances could be managed in accordance with usage budgets, authorized information content types, location(s)' of seal device one or more arrangements, and/or dates and/or times of device arrangements' authorized intercommunications, where the foregoing may be, in some embodiments, expressed in standardized, interoperably interpretable form using an SVCC and/or other chain of handling and control governance and other administration language and SVCC lexicon set.

In some embodiments, EBInet composite person/device arrangement and/or stakeholder and/or group (device arrangement, and/or stakeholder, group) and/or other entity attribute and/or policy identification information, including, for example, serialization SVCC event/activity audit and/or management information (including, for example, stakeholder person and/or device arrangement entity rights management information), may be stored locally in secure tamper and inspection resistant information arrangements and/or in secure network accessible storage arrangements. For example, such arrangements can respectively employ one or more types of modular components, such as NIIPUs, operating on EBInet compliant network (e.g., local administrative and/or cloud service) serialization administration and/or other one or more management arrangements. One or more such network arrangements may be used to validate and/or otherwise evaluate, control the communication and/ or use of, and/or at least in part otherwise manage and/or audit, one or more portions of securely communicated such information.

In some embodiments, such network arrangements may securely, cryptographically communicate updated/refreshed rules and/or controls policy information to one or more of such EBInet embodiments' respective device and/or service arrangements, including, for example, rules and/or controls for employing, and/or information for updating, EBInet device arrangement, service arrangement, and/or device and/or service arrangement user specific person and/or group policy, information. Such information may at least in part comprise, for example, SVCC device, service, and/or one or more devices' and/or services' respective stakeholder persons' at least in part biometrically based and/or other identification information associated security and/or other cargo and/or transport vehicle and/or packaging governance policies. Such policies may include, for example, event/activity specific stakeholder and/or stakeholder persons' respective rights management authorizations and REAI auditing cryptographic and authentication (and/or other validation) requirements. Such authorizations may include, for example, information regarding REAI authorized specific times and/or dates, associated specific one or more resource instances, specified one or more SVCC content instances, REAI locations, uses of and/or actions performed by specifically identified one or more EBInet device and/or service arrangements and/or device and/or service arrangement registered groups, and/or auditing and/or communication operations, for example, for and/or regarding, one or more SVCC and/or other EBInet related events/activities.

In some embodiments, one or more tamper and inspection resistant hardware modules and/or other hardware arrangements, including, without limitation, EBInet modular components (e.g., NIIPUs) and/or other resources, such as SVCC serialization hardware cargo management arrangements, can respectively incorporate one or more secure (for example, hardware and software tamper resistant and inspection resistant) processors, secure memory instances, secure emitters and sensors, pseudo-random and/or other unpredictable generators (e.g., input for emitter output), neural network processing arrangements (such as NNU chip arrangements), secure clock arrangements (which may or may not be integrated within and/or with NIIPUs, RIIPUs, emitter/sensor arrangements, and/or RUS instances), dedicated cryptographic engines, HSMs, and/or other secure tamper and inspection resistant hardware and software arrangements. Such arrangements may be respectively employed with, and/or embedded within, one or more Identity Firewalls, Awareness Managers, RIIPUs, NIIPUs and/or one or more other EBInet arrangement compliant modular component implementations (and where, in some embodiments, a RIIPU may comprise an Awareness Manager and a NIIPU may comprise an Identity Firewall).

EBInet security arrangements, in some embodiments, may include techniques for at least in part ensuring the security of EBInet (including PERCos) hardware modular component and/or other hardware device arrangement packaging (e.g., using epoxy and/or tripwires and/or other countermeasure technologies for enhancing tamper resistance and impeding data and/or process inspection). In some embodiments, for example, EBInet arrangements can employ techniques, such as electromagnetic spectrum (and/or other) shielding capabilities, within, and/or as a packaging screen or other layer of, EBInet arrangement hardware. Such arrangements, for example, provide protective arrangements supporting secure EBInet acquiring, carrying, using, forwarding, and/or receiving device arrangements, by using, for example, EBInet Awareness Manager, Identity Firewall, RIIPU, NIIPU, and/or other modular component arrangements. Such security enhancing techniques may employ integrated circuit reverse engineering countermeasure techniques, such as, for example, diffusion programmable device techniques. Countermeasure protection design may, in some embodiments, further, or alternatively, include technologies for managing/preventing decapsulation, optical and/or other imaging, micro-probing, electromagnetic analysis (EMA), fault injection, and/or anti-power analysis countermeasure capabilities (that, for example, protect against simple power, differential power, high-order differential power, and/or the like, analysis techniques), and/or the like anti-tampering and/or anti-unauthorized inspecting, protection techniques.

In some embodiments, secure, tamper resistant storage structure arrangements may be employed for storing, for example, identity-related information sets, and/or audit and/or provenance information sets, and/or activity management policy specifications (e.g., process rights management and/or method information sets (e.g., governance specifications)), within memory sets of respective EBInet device and/or service arrangements, and where device such storage arrangements may at least in part be included within respective PERCos Identity Firewall, Awareness Manager, RIIPU, NIIPU, and/or other modular component, and/or the like, arrangements. Such information may be persistently stored, and employed using, for example, HSM hardware and cryptographic software arrangements, and/or using secure organization (e.g., network based) and/or cloud storage, arrangements. Such information can comprise, for example, EBInet: (1) REAI related identification and/or audit information, including, for example, information regarding stakeholder party(s) (and/or stakeholder person(s) (e.g., CertPers(s)) and/or stakeholder group(s) (e.g., department(s) and/or other grouping(s)) within respective organizations, and/or non-stakeholder users, (2) information identifying owner and/or user devices and/or services, (3) purposeful computing information, e.g., associated with specified one or more purposes and comprising, for example, contextual purpose expressions (e.g., where each has at least one verb and at least one category), and/or (4) and effective facts and/or creds characterizing foregoing information instances.

In some embodiments, EBInet device arrangements may incorporate and/or otherwise comprise one or more PERCos and/or the like AMs and/or IFs, which may comprise RIIPUs, NIIPUs, and/or other tamper resistant modular component instance sets. Such instance sets may, for example, securely, operatively interact and cooperate to enable secure governed and reliable REAI identification information acquisition/receipt, validation, auditing, and/or instance identification information publishing and/or usage suitability evaluation/determination. Such instance sets may enable process and/or event/activity authorization and/or other REAI management including, for example, communication, and governance of use, of identification, policy, and/or audit information sets.

In some embodiments, EBInet device/person identified subject matter arrangement composite resource identification information may securely include EBInet composite subject matter device and person arrangements', respective (a) unique to device identifying information such as one or more public subject matter and/or subject matter component names, and, for example, one or more of such a set's uniquely identifying one or more embedded into device secrets, such as used in authenticating the device component of a composite subject matter device arrangement, and (b) such devices' contextual subject matter stakeholder and/or other related persons' (and/or group of persons') at least in part biometrically based IIS(s) and/or information derived therefrom. Such device/person identified subject matter identification information (e.g., an IIS such as an IIT) may further include one or more of:

1. device arrangements' and/or such persons' respective identification information sets' respective one or more contextual purpose specifications,
2. device arrangement driver and control specifications/instructions,
3. emitter and/or sensor (which may be internal to such device arrangement) control specifications/instructions for acquiring at least in part biometrically based identification information of a device arrangement's one or more persons (e.g., owner, other stakeholder, CertPer, and/or user),
4. emitter and/or sensor control specifications/instructions for acquisition of EBInet physical environment information,
5. absolute and/or relative securely determined time (e.g., time of event/activity stamp) and/or other status and/or event/activity instance related information,
6. security information, including cryptographic keys and/or other security governance related (e.g., security policy) information,
7. Wi-Fi, cellular, satellite, Bluetooth, and/or the like network identification and associated communication parameter information,
8. Wi-Fi, cellular, satellite, GPS, RFI, Bluetooth, and/or the like, device and/or service arrangement physical location information,
9. usage rules and controls parameterization (such as rights management information, and/or the like) information sets,
10. one or more device arrangement's manufacturer and/or other SVCC party unique identifying information sets (e.g., stakeholder SVCC one or more party information sets, identifying device respective distributors, wholesalers, retailers, resellers, value adding integrators, owners/users, government bodies), and where such information sets may further include device arrangements' respective serial numbers and/or the like public identifiers,
11. one or more device arrangement's SVCC (e.g., manufacturer) model number(s), serial number(s), name(s), and/or version identifier(s),
12. one or more device/person arrangements' suitability to purpose informing (e.g., EF and/or Cred) information, and/or the like attribute information characterizing device respective arrangement hardware, firmware, and/or software arrangements, and/or characterizing device associated biometrically identified stakeholder and/or other device associated persons,
13. one or more device/person arrangements' respective provenance information sets, which may respectively include identifying and/or characterizing information regarding provenance relevant REAIs, and
14. device arrangement communication, analysis, management, and/or auditing software application(s)' instance identifier(s) (e.g., serial number(s)), model number(s) and/or name(s), and/or version number(s).

In some embodiments, such information sets may be securely stored in information sets' respective EBInet compliant device arrangement tamper-resistant information storage arrangements. Such information storage arrangements may employ (and/or comprise) arrangements' respective local, and/or network remotely located, Identity Firewall, Awareness Manager, RIIPU, NIIPU, RUS, cloud service, and/or the like, one or more arrangements. Such information storage arrangements may, in some embodiments, store information in distributed, at least in part independent party managed, tamper resistant storage arrangement set(s) (e.g., in different service, administrative, and/or user computing arrangement instances and/or locations). Plural of such services may operate in a cooperative manner (may interact in an intelligent and/or redundant manner (e.g., using, at least in part, A1 technical design implementations to identify performance/malware anomalies)), to mutually support user specified collective information storage and processing (may comprise a virtual distributed among different parties' collective storage arrangement). Such plural party storage, and/or use, of such stored information, for example, can be based on securely pre-established and/or mutually agreed to plural party (a) platform, (b) contextual purpose, (c) affinity group, (d) SVCC (e.g., serialization) group, (e) cryptocurrency (e.g., cryptocurrency blockchain)) group, and/or (f) other, policy and/or audit information sets, such as for supporting distributed multi-party resource sharing.

Mobile devices, such as smartphones, smart watches, tablets, laptop computers, and/or the like, are variously used to authenticate their users' respective biometric identities and perform events/activities, such as paying bills, using social networking interactions, preparing intellectual property, managing commercial operations, sending emails and text messages, and/or the like based, for example, on users' respective rights (e.g., to use a smartphone, access bank account information and perform transactions, participate in a social networking session, and/or the like). Unfortunately, traditional mobile devices are susceptible to, for example, the following vulnerabilities, which may occur in combination and/or overlap:

1. Remote cyber-attacks, the principal source of computing malware and cyber security vulnerability, where attackers use the internet and/or other data distribution means to compromise and/or otherwise misuse devices, device applications, and/or network-based services by, for example, inserting one or more pieces of malware into device respective operating systems, device drivers, application software, and/or the like, and/or
2. Attack/misuse resulting from apparent (by physical possession), or actual, authorized access to applicable computing device arrangements, where attack/misuse may include:

Local agents (e.g., thieves) seizing and/or otherwise physically controlling devices and subsequently tampering with such devices while they are physically under the respective stealing parties' (thieves') control, where such thieves and/or one or more subsequent unauthorized parties, proceed to locally attack, e.g., introduce malware into parties' respective stolen devices' operating systems, device drivers, application software and/or resulting data arrangements, firmware, and/or the like, and suborn device proper functioning through alteration of one or more elements of any such stolen device. Such thieves may steal mobile devices and use them to impersonate the stolen devices' respective stakeholder owners, for example, if they have also stolen a user's device, application, and/or service password and/or have access to effective user biometric spoofing. Such thieves may have only a limited time to exploit such stolen devices, for example, if the owner of a device realizes the device is missing and causes, for example, the device to be disabled and/or declared stolen or no longer useable by a computing service providing device validation information and/or governance.

Imposters borrowing mobile devices and exploiting them for their own personal gains (e.g., by misuse, including, for example, modification). In such cases, the owner of a borrowed device may not realize that their device is under attack and/or has been compromised and the owner may not realize that he or she needs to implement counter-measures.

Insider rogue actors, who are authorized to use respective device and information arrangements, proceeding to misuse such devices and/or at least a portion of any such devices' applications and/or stored information (e.g., acting as an insider "mole" or other bad actor, for example, masquerading as a party who has rightful access to a bank account through possession of its access code, and uses such a device, and associated software and password, to improperly withdraw funds from such party's bank account).

EBInet and associated PERCos technologies provide various, effective solutions to the above modern computing attack threats. Such solutions include using at least in part near existential or existential quality biometrically based identification information sets to help ensure resource and/or event/activity suitability (e.g., using PERCos quality to purpose and/or effective fact person characterizing attributes as securely bound to applicable person at least in part biometrically based identifying information), using contemporaneous networked identification information provisioning, using identity continuity assurance capabilities, using multi-factor identity recognition/assurance capabilities, and/or using one or more other technologies described in this specification.

Generally, smart device, and in particular mobile smart device, consumer biometric processing is largely used to manage local device security and device local and online payment (e.g., providing access to a smartphone's functions, or using a user's credit arrangement through, for example, Apple Pay). Given the considerations in implementing such smart devices, such as size and shape, cost, power consumption, and ease of use, like many other features in modern computing, smart device platform design is subject to many trade-offs and compromises and, from a biometric technology standpoint, smart device arrangements are significantly less than existentially reliable for human identity recognition and validation. Given this reality, as well as the associated technology implementation challenges in achieving existential quality biometric identification performance in practical form factors, and satisfying cost and other considerations, currently, biometric identification technologies in practical, commercially available mobile smart devices are insufficiently reliable, that is, not nearly existentially reliable (therefore also not existentially reliable), and such systems cannot provide unambiguously accurate human identification. To compound the challenge, going forward, as technology capabilities of malicious attackers improve, inexpensive, ubiquitously available biometric capabilities are unlikely to be sufficiently reliable so as to withstand criminal enterprise, anarchistic, rogue, and/or fanatical affinity group, and state, advanced, sophisticated, and well-funded bad actor sponsored cyberattacks, that are the bane of the internet.

In some embodiments, EBInet supports, by contrast with currently available biometric identification arrangements, the acquiring of near-existential and/or existential quality biometric identification information through use of AFDs, including AFSD "stations." EBInet further supports the secure forwarding of at least a portion of an identification instance's acquired biometric identification information and/or information derived therefrom for secure use, carrying, and/or further forwarding by an RD receiving device (which may be, for example, an RCFD receiving, carrying, and forwarding device arrangement), and where EBInet arrangements may provide, in some embodiments, and without limitation, at least a portion of the following capabilities:

Enabling device arrangements that acquire biometric identities of human individuals to be different from device arrangements that carry and forward such information, and further enabling such carrying and forwarding devices to be, at least in some circumstances, separated from devices that both receive and employ for event/activity governance such acquired biometric identity information (and/or information derived therefrom). Such a device configuration arrangement supports highly reliable, efficient, and cost and form factor optimizing, device class types that enable a ubiquitous resource (and event/activity) identification information cosmos. By separating the functionality of devices that acquire near-existential, or existential, quality biometric identification information sets of human individuals (a) from the functionality of devices that carry (and may use) such acquired existential IISs, and (b) from EBInet device arrangements that primarily or solely receive and use such identification information for event/activity governance, EBInet systems can comprise (a) AFD arrangements, such as AFSD RIIPU arrangements, that acquire near-existential, or existential quality, biometric IISs of human individuals, and resources, (b) modular component NIIPU based RCFD arrangements, that carry and forward (and may use) such acquired and then received near existential or existential quality biometrically based identity information sets, (c) RUD arrangements that use such information in authenticating people and devices, and authorizing, otherwise governing, and/or auditing computing related events/activities based at least in part on such received biometrically based nearly existential or existential quality person identification information, and (d) RUS arrangements that respectively perform EBInet functions in network connected server arrangements.

In some embodiments, an EBInet arrangement's AFD biometric identification information acquisition architecture can be designed to (i) be strongly resistant to tampering by, in part, providing smaller attack surfaces (due to more limited sets of operations), and isolated, highly protected process environments; (ii) be housed in secure locations and/or in secure packaging, where such locations and/or packaging provide additional physical and/or surveillance and/or other access control security; (iii) secure one or more clocks (e.g., embedded in sensors, emitters, and/or RIIPUs (and/or other secure processing modular components), for ensuring the monitoring of the precise times of events/activities, and/or (iv) have sensor positioning, and sensor type, performance optimizing qualities (a result of much greater design latitude/flexibility, e.g., using a plurality of sensor, emitter, and/or associated innovative biometric modality sets). Such a design can employ packaging that considerably optimizes biometric recognition performance (for example a 3D arrangement of emitters and sensors in an open sided box arrangement configured for hand insertion), resulting in arrangements that are more rigorous and can provide contemporaneously acquired, assiduous nearly existential and/or existential quality identification information acquisition and authentication. The foregoing quality of biometric information is not practically available when using mobile device acquisition arrangements (such as smartphones, laptops, tablets, smart watches, smart cards, and/or wearables).

In some embodiments, when used with such an AFD architecture, both RCFD device arrangements and RUD arrangements can incorporate highly secure, tamper resistant hardware and software capabilities that are not available, for example, in mobile smart devices, where modular component embedded, inserted, or otherwise securely integrated NIIPU and/or other EBInet isolated processing, modular component arrangements can provide device, role targeted implementations that are optimized for practical commercialization and performance. Using NIIPU and/or comparable modular component designs employed by RCFD and RUD arrangements avoids the necessity of redundantly providing demanding, highly rigorous biometric identification acquisition device implementations and the resulting associated cost, packaging, portability, and other design consideration overheads required when attempting to incorporate nearly existential and/or existential quality human identification acquisition in a typical person's plurality of mobile and fixed, including IoT, computing, and/or computing at least in part managed, arrangements.

Securely acquiring biometric identity information sets of human individuals at differing levels of rigor based on different contextual and/or device design factors, resulting in differing device arrangement security and identification discrimination/reliability capabilities used to satisfy different event/activity securely specified rigor levels. Such differing capabilities can, for example, employ differing sensor/emitter set, pseudo random emission instruction generator, anomaly detection processing, trusted secure clock, small to very small attack surface, isolated protected processing, and tamper and observation resistant packaging, and/or the like, arrangements).

Providing standardized and interoperable contemporaneous identification tokens (e.g., IITs, including, for example, EBICerts), representing at least in part near-existential, and/or existential, quality biometrically based identification information sets of respective human stakeholder, user, CertPer, and/or provenance (e.g., event/activity historically significant) individuals (such tokens can also include one or more non-biometrically based attributes of respective such parties, such as EFs and/or Creds). Such tokens may be valid for a limited time (using secure governance, becomes invalid at some point in time and/or remains valid for a specified period of time) and/or may expire or be deactivated in specific one or more contexts in accordance with one or more respective specification sets. Such tokens may be carried in an RCFD for use on demand, and/or by instruction, and used to perform at least in part near existential or existential quality biometrically based identification of one or more device/person subject matter sets.

Securely associating (e.g., securely binding and/or integrating together) tamper and inspection resistant, near-existential and/or existential quality stakeholder and/or user biometrically based identity information to respective other REAIs' descriptive information instances (e.g., information from and/or comprising one or more such respective REAIs' IISs) in support of, for example (a) operations such as REAI trustworthiness and/or other user and device suitability to purpose assessment, (b) the forwarding and receiving of stakeholder and/or other subject matter person, and subject matter device arrangement, identification information sets and/or composite sets of the foregoing, and (c) various security and/or other event/activity management processes, such as processes respectively for secure communication, mutual authentication, and/or EBInet arrangement compliant functioning of REAIs.

In some embodiments, EBInet arrangements can provide hardware/software resource arrangements that can securely process and store at least a portion of IIS information in tamper-resistant devices' respective, embedded RIIPU and/or NIIPU, modular component hardware arrangements. Such secure processing and storing helps ensure EBInet device arrangements' assiduous validation of the authenticity of REAIs' respective identification information. Such EBInet device arrangements can interact and transfer information for authorization process sets, where such process sets can be based, at least in part, on identification information sets comprising near-existential and/or existential quality human identification information sets, and/or composite person/device arrangement identification information sets, where such information sets may be registered with EBInet respective identification information one or more services, and where such information sets are at least in part based on human stakeholders', such as owners', and/or non-stakeholder CertPers' and/or users', at least in part nearly existential and/or existential quality biometrically based IISs, such as composite information sets comprising device and stakeholder and/or user information securely associated together, for example, for informing device arrangement users regarding respective such device arrangements', and/or other REAIs', identification, certification, evaluation (e.g., suitability and/or relative ranking for use/participation), authorization/authentication, and/or other purposes.

In some embodiments, when a device is manufactured, a manufacturer may cause a secret key associated with a public certificate to be stored in a secure tamper-resistant memory area in the device. Such certificates may be respectively, cryptographically bound to at least in part biometrically based IISs for their respective manufactured devices and/or manufactured device types. In such embodiments, secure communications with the device can be protected by one or more private keys. As a result, communication events can be secured for privacy and communicating parties can know what uniquely identified one or more devices or device/person combinations they are communicating with. Such secure identification information in a receiving or sending device means that a device that forwards or receives a near-existential or existential quality token (e.g., comprising an IIT) can know exactly what device and/or person is correspondingly forwarding or receiving the token. Such IIT's (e.g., EBICert's) creating-EBInet-device arrangement can contain secure, for example RIIPU controlled, one or more clocks that time stamp the time of acquisition of biometric identification data for including in the IIT and/or the time of creation of the IIT, to ensure that only one such biometric information acquisition and/or created IIT was produced and/or used at a given point in time or within a specified time period/interval. Such time stamping information can be used in performing anomaly analysis to identify cyberattack events and/or other hacking threats/activities.

In some embodiments, a purchaser/owner of a device may have (or has had) his/her biometric identification information acquired, for example, at a point of purchase of one or more such devices (e.g., an AFD, RCFD, and/or RUD) as part of the purchase transaction set, and/or when registering (e.g., online and upon receipt of a purchased device) a purchased device with a TIIRS. At least a portion of such biometric identification information and/or information derived therefrom can be securely bound together with the device's one or more secret keys and/or public certificate information to at least in part form an IIS comprising a specific person/device arrangement composite identification information set for use in governing one or more events/activities (e.g., such as registration), and where such an IIS can then serve as a transaction and/or other event/activity operation audit, identification, and/or certification/endorsement information set. One or more parts of intended to be public portions of such a securely person/device bound information set may be registered with a network service and/or published for use by other one or more parties.

In some embodiments, a comparable information binding process may be employed in creating device provenance information, where uniquely identifying biometric identification information and/or identification information at least in part derived therefrom, e.g., for identifying manufacturer, wholesaler, distributor, and/or retailer personnel (e.g., CertPers), and/or former owners and/or users, and/or other SVCC persons, can be securely integrated in and/or otherwise securely associated with, for example, manufacturers' device uniquely identifying secret information, forming composite, unique to a device (or device group) arrangement, specific identification information sets that are securely time stamped (as to their respective creation and/or creation related events/activities) using, for example, a RIIPU and/or NIIPU arrangement secure clock arrangement. Such provenance composite identification information sets may securely further include PERCos attribute information such as effective fact, cred quality to purpose, and/or the like quantized suitability for purpose, information, such as information regarding rigor levels specifying REAI security reliability.

In some embodiments, communication to and/or from an EBInet compliant device using an identification information set can be encrypted so that it may only be received by, and/or only successfully forwarded from, an appropriate, for example, registered paired and/or otherwise grouped, device and/or person (e.g., biometrically identified) instance. Such registered grouping specification information can be securely maintained, for example, at network administrative, and/or cloud, service(s) (e.g., a registration/identification information utility), such registered information, for example, for verification of the eligibility of a given EBInet device and/or service arrangement, and/or person instance(s), to forward securely managed identification information to, and/or receive securely managed identification information from, one or more other EBInet device and/or service arrangements. Such reliable and secure registered IISs for device and/or service arrangements can support parties' independent evaluation of cred purposeful computing assertions (e.g., quality to purpose and/or the like), and/or effective fact stipulations, that are relevant to evaluating/determining the rigor, trustworthiness, and/or other suitability considerations for a given EBInet device, service, and/or person arrangement (e.g., whether a given device, service, and/or person arrangement is contextually suitable based upon user instruction and/or EBInet arrangement specifications), and/or inform control arrangements for managing one or more REAIs related to one or more of such arrangements, e.g., for event activity governance. Such IIS information may inform users and/or stakeholders regarding suitability of communicating with, and/or other event/activity related use of, respective EBInet device and/or service arrangements and/or identified persons. Such informing can support determining whether such respective device arrangements and/or persons are sufficiently trustworthy, and/or can inform regarding other suitability considerations (e.g., quality, applicability, competence, and/or reliability, which may be expressed as respective quantized values) for user(s)' respective purposes, which may be specified using one or more purposes' respective standardized and interoperably interpretable purpose languages.

In some embodiments, AFD and/or RD arrangements' respective stakeholder owner(s) and/or user(s) at least in part biometrically based near-existential or existential quality identification information must, at least where required by one or more such device arrangements' securely specified policy information, correspond in accordance with specifications securely stored on corresponding candidate (for trusted interaction) one or more other EBInet device (e.g., AFD and RD, RFD and RFD or RUD) arrangements (e.g., such information stored within securely managed device arrangement RIIPU and/or NIIPU hardware memory and/or securely stored on one or more such device arrangements' securely associated memory arrangements such as respective network server arrangements). Such corresponding, stored information may be organized and stored as registered identification information regarding one or more groupings of (1) persons (e.g., owner(s) and/or user(s)), (2) EBInet device and/or service arrangements, and/or (3) specific persons' and respective devices' composite arrangements, and/or to one or more combinations of such groupings.

In some embodiments, one or more policy sets may be associated with respective EBInet compliant device and/or service arrangements and/or associated owners and/or users, where such policy sets may cause control actions of respective devices and/or service arrangements and/or govern one or more events/activities (e.g., one or more operations) of device and/or service arrangement usage by device and/or service associated human parties. In some embodiments, such policy information sets may be included as part of respective devices' IISs (for example, as part of a master IIS (e.g., comprehensive and all-inclusive of available subject matter attributes for respective subject matters' IISs), which may be a master composite IIS) at one or more times of respective devices' manufacturing, purchases, registrations, and/or usages. Respective such policies may be associated with one or more respective purposes (e.g., CPEs) and/or REAIs, such as associated with specified purpose associated, that is purposeful, events/activities, for example (1) unlocking one's front door, (2) EBInet arrangement publishing of an IIS, EF, and/or QtP, regarding a resource, (3) sending, receiving, and/or opening/decrypting an EBInet managed email, (4) entering an intermodal container and removing a uniquely identified carton, (5) entering a secure online database portal, (6) using an ATM to access one's account(s), (7) enabling one or more social networking processes; and/or the like.

In some embodiments, an EBInet device arrangement (or other resource set) cannot have its IIS modified without forming a "new" IIS (may be indicated, for example, by a new identifier which may be a new version number/name, added to a baseline model number/name), but, for example in some embodiments, such a device arrangement (or other resource set) can refresh or otherwise alter, or have altered, its identification information set's securely related/associated information such as a device arrangement's activity provenance information, where such provenance information may include, for example, time, date, user identification information, device arrangement and/or device user event/activity instance interaction history, event/activity purpose information, and/or the like. If such an alteration is allowed, policy information may require, for example as directed/authorized/initiated by a remote administrative authority, the maintaining of a high level of security integrity for at least a portion of such securely related information. This allows persistently maintaining unique one or more identifiers for such subject matter's one or more parts, for example, in some embodiments maintaining one or more unique identifiers for an unchanging subject matter's IIS, and supporting one or more securely associated provenance E/A information sets that can accumulate information (e.g., by the aggregating of provenance, unchangeable EBIBlocks, using a uniquely identified, evolving EBIBlockChain).

In some embodiments, RCFD carried EIFF (e.g., IIT) information, for example an EBInet device arrangement's and/or user's IIS information, can be securely maintained in read-only memory, and/or otherwise be made available under specification management requiring securely managed remote authorization to securely modify (and rename) in accordance with specifications. Such information may be cryptographically protected when stored, and can be processed in a tamper and inspection resistant isolated processing/memory arrangement, e.g., within a NIIPU modular component. Such IIS information may, for example, be made available for presentation to other device and/or service arrangements and/or parties strictly in accordance with EBInet arrangement specifications. Securely maintained EIFF IIS information can be provided to another EBInet device and/or network service arrangement for independent evaluation prior to a determination as to whether such an EBInet device arrangement is to be trusted and is situationally specification compliant for a given purpose, such as the purpose of communicating more extensive identification information (e.g., forwarding and/or receiving of further IIS information, such as contemporaneous biometric and other composite identification information) between EBInet device and/or service arrangements. Such determination may also, or alternatively, be made by a device and/or service arrangement's user set regarding interacting with and/or otherwise using another EBInet device and/or service arrangement, given such other device arrangement's expected suitability for one or more purposes. Such suitability, for example, may be learned from an EBInet device's IIS EIFF (e.g., IIT) subject matter characterizing attributes such as one or more PERCos quality to purpose assertion and/or effective fact, information sets.

In some embodiments, when an IIS carrying device and device securely carried one or more IISs, such as a DEV1 and one or more DEV1 IISs, is/are securely registered with an EBInet compliant registration administrative and/or cloud service, one or more identity attributes for DEV1 may be securely stored, for example, within an IIS of DEV1, and/or otherwise securely associated and securely stored as one or more such registered device's attributes. Such DEV1 IIS registered information can specifically identify such registered device as such IIS's subject matter (e.g., primary subject matter). In various EBInet arrangement embodiments, such information can include identification information for at least one at least in part biometrically identified human stakeholder owner, such biometrically based identification information at least in part acquired using an EBInet AFD arrangement. Such identification information may further include, for example, a device embedded secret and/or such secret's securely associated information set, and such secret information can be used, for example, to uniquely identify such device arrangement.

In some embodiments, an EBInet device and/or service arrangement may have one or more policies that specify rule sets for, at least in part, governing such device arrangement's event/activity instances. Such policies may, in some embodiments, specify the governance and/or conditions, such as rules/controls and context, for the following event/activity instances:

- Registering one or more EBInet device and/or service arrangements with one or more trusted EBInet utility and/or organization service arrangements (e.g., TIIRSs), where such EBInet utility and/or organization service arrangements may operate in the cloud, locally, and/or organizationally. A policy set associated with such registration may specify that a registering EBInet device and/or service arrangement can communicate one or more of such EBInet device arrangements' respective composite IISs to such one or more specified trusted EBInet utility and/or organization administrative service arrangements.
- For example, in some embodiments, an AFSD can register an EBInet composite device/person arrangement, such as an RCFD and its owner/user, with a trusted identification information registration service arrangement. A policy set may specify that such AFSD securely forwards and/or registers one or more composite identification information sets (CIISs) securely bound to (e.g., securely references/points to), and/or otherwise securely associated with, such one or more CIISs' "fused-identity" one or more subject matter entities, such one or more entities comprising, for example, such RCFD and such RCFD's relevant one or more stakeholders (for example, such RCFD's owner/user).
- Each such CIIS can comprise at least in part person(s)' (e.g., stakeholder(s)') biometric and device (and/or service) arrangement's specifically identifying, information sets, comprising in some embodiments:
  - The device's function type information (e.g., for an RCFD, the functions of receiving, carrying, and forwarding) and/or such device's model, version, serial number, and/or other relevant device arrangement identifying information, such as time and/or location (e.g., of use and/or manufacturing) and/or other SVCC related information data instances, and/or the like,
  - One or more stakeholder, user, and/or CertPer sets' biometrically based, and may further include organization, identifying information, e.g., provided as RCFD identifying information. Such information can include, for example, stakeholder organizations' respective naming identifier and other stakeholder respective identifying information, including at least in part, near existential and/or existential quality biometrically based identification information of one or more of such a stakeholder's employee(s), other stakeholder agent(s), and/or user(s).
  - Such device's, and/or one or more of such device's owners', stakeholders', and/or CertPers', respective one or more Repute Creds, Effective Facts, such persons' associated respective contextual purpose expressions, and/or other such persons' respective attribute/characterizing information.

In some embodiments, a CIIS being securely forwarded and/or registered has an RCFD (or other RD) as primary subject matter and may have contextual subject matter components, such as such RCFD's owner and/or registered user as one or more portions of such CIIS's subject matter. Such a CIIS may include and/or be securely associated with provenance information that includes identification information regarding such RCFD's one or more manufacturer's device production CertPers, as well as information identifying such CertPers' respective AFSD arrangements, and such AFSDs' respective owners, and respective attributes, such as EFs and/or QtPs thereof.

In some embodiments, an AFSD can support a registration process set through, for example, secure acquisition of an RCFD's owner's/user's and/or other relevant stakeholders' respective near-existential and/or existential quality at least in part biometrically based identity information set, and the acquisition and/or possession of (1) such RCFD's unique, device securely embedded identifying information, and (2) attribute information, such as one or more EFs and/or Creds, for such RCFD and/or stakeholder(s) and/or users.

In some embodiments, a registration process set may have a policy set that specifies which registering EBInet device and/or service arrangement, and/or one or more EBInet utility and/or organization registration service arrangements (such as a TIIRS arrangement) participate in registering an EBInet device and/or service arrangement. Such registering involves such registering device and/or service arrangement certifying a CIIS associated with such EBInet arrangement being registered, where such certification is based, at least in part, on validating (comparing) such CIIS (e.g., of such an RCFD that is being registered) with person/device corresponding in part near existential or existential quality biometrically based composite identification information previously registered with one or more policy specified registration service arrangements.

In addition, for example, a policy set associated with such a registration may specify that an AFD arrangement that is registering with a TIIRS arrangement a CIIS whose primary subject matter comprises an RCFD may require that such AFD arrangement and/or such TIIRS arrangement validate such AFD arrangement by such AFD arrangement providing one or more CIISs whose primary subject matter comprises such AFD arrangement. Such one or more AFD CIISs may then be validated by matching with their corresponding at least in part biometrically based composite identification information registered with a registration service arrangement (such as a TIIRS arrangement).

In some embodiments, EBInet device and/or service arrangements may securely self-register by signing, for example using such devices' and/or services' respective EBICerts, at least a portion of their respective one or more other IISs (e.g., IITs), and/or update registered device identification information sets with respective modified, e.g., refreshed and more current and/or additional, identification information sets. Such sets may identify one or more new users and/or declare such device and/or service arrangements are respectively, for example, newly registered as grouped with one or more further device and/or service arrangements for allowed (e.g., specified) one or more types of, and/or conditions for, arrangement identification information exchanges and/or usage.

In some embodiments, modification of a registered information set may employ registered, embedded, at least in part secure device registration information sets which have been registered by one or more device respective device manufacturers. Registration of an EBInet device and/or service arrangement by another EBInet device and/or service may involve composite identification information of such registering EBInet device and/or service arrangement employed as a securely maintained component of composite identification information of the registered EBInet device and/or service arrangement. Such use of composite identification information of a registering device and/or service arrangement for registering another device and/or service arrangement can involve, for example, the registering device and/or service arrangement functioning as a device and/or service arrangement employed at a retail or other commercial site. For example, when an RCFD arrangement is purchased from a retailer, such retailer's EBInet device and/or service point-of-sale arrangement can serve as a secure arrangement that biometrically identifies, for example, the purchaser of such RCFD arrangement, certifying the purchase of such RCFD arrangement by its purchaser person and using such information as a characterizing component of a purchased RCFD arrangement that becomes an RCFD/owner person composite identification information set for such RCFD arrangement, such newly created set being securely registered by, for example, such retailer's point-of-sale arrangement registering a CIIS for the RCFD/owner person with a TIIRS.

Acquiring existential quality biometric identity information sets for respective human individuals. In some embodiments, when an EBInet device and/or service arrangement, such as an AFD, acquires an existential biometric identity information set of a person, it may employ spatial, temporal, and/or spectral analysis, such as for anomaly analysis biometric information acquisition techniques, which are employed in compliance with degree of rigor policy information regarding biometric acquisition rules and controls. Such rules and controls may specify biometric information acquisition contextual factors, such as such EBInet device and/or service arrangement's type, location, other conditions of use, and/or the like. For example, if such EBInet device and/or service arrangement is housed (e.g., in accordance with such arrangement's specification) in a secure location that has active human (such as a guard) supervision (and for example may require biometric monitoring to ensure such guard presence), then such EBInet device and/or service arrangement can have, in addition to device arrangement design security features, additional strong tamper and inspection resistance which can contribute to the reliability, for example, of such device and/or service arrangement's identification authentication. Such a policy rule set may also, for example, specify that such an EBInet device and/or service arrangement protect acquired nearly existential or existential quality biometric information sets and/or identification information derived at least in part therefrom by cryptographically signing (e.g., using an EBICert identification information) and securely storing such signed information as a composite set (e.g., a CIIS) and/or securely linked (e.g., securely associated) information sets stored within one or more tamper resistant hardware arrangements, such as within respective one or more NIIPU and/or RIIPU modular component arrangements, and/or secure facility RUS arrangements.

Generating contemporaneous IITokens (IITs, which may include EBICerts) representing at least in part nearly existential and/or existential quality identification information sets of such sets' respective stakeholder and/or other user human individuals and/or composite device/persons arrangements. Whenever an EBInet device and/or service arrangement generates a contemporaneous at least in part biometrically based IIT representing a human individual (e.g., P1), or associated composite arrangement, a policy set may specify, for example, that an EBInet device and/or service arrangement must securely include and/or otherwise associate with such IIT an identification information set that, for example, securely contains, references, and/or enables discovery of such IIT attribute information sets, such as:

- Such IIT's rigor (e.g., trustworthiness) level;
- Duration of such IIT's validity, where the determination of the duration may include factors such as the IIT's quantity of usage, such IIT's exposure to (e.g., amount of interaction with) target and/or other devices and/or services such as EBInet arrangements, such IIT elapsed time from its creation and/or the real time of event(s)/activity(s), and/or the time relationship of plural sensitive event/activity types, including, for example, time quantity of plural arrangements' interactions, and/or the like;
- Policies for such IIT's usage, for example, when such IIT is used to authenticate such IIT's human individual's identity/attributes (e.g., P1's identity and/or attributes) and/or determine/validate identity associated authorizations, such human individual needs to be in a specified proximity to an IIT's carrying RCFD's continuity device and/or has to be identified with a sufficient confidence given other contextual factors such as environmental noise affecting sensor acquired information;
- And/or the like.

Such policy set may specify that such an EBInet device and/or service arrangement:

- Cryptographically signs such IIT to enable independent third parties to validate such IIT's authenticity;
- Stores such IIT in a tamper and inspection resistant hardware arrangement such as a NIIPU, RIIPU, and/or other EBInet modular component arrangement;
- And/or the like.

Forwarding IISs (such as CIISs/IITs, and/or other IIS information) to other EBInet device and/or service arrangements, where such IISs can contain near existential and/or existential quality at least in part biometrically based identification information sets of, for example, such sets' respective human individuals (e.g., as respectively included in CBEIISs and/or CIISs). In some embodiments, if an EBInet device and/or service arrangement forwards an IIS to one or more other EBInet device and/or service arrangements, a policy rule set may specify that such forwarding EBInet device and/or service arrangement, and such receiving one or more EBInet device and/or service arrangements, need to have been securely registered as members of a pair and/or other group, and/or such arrangements' respective stakeholders and/or users need to be members of a specific, registered EBInet related stakeholder, user, affinity, device and/or service arrangement, group, and/or otherwise satisfy policy requirements. Such an arrangement may comprise, for example, an SVCC chain of handling and control and/or other rights management arrangement, for example, managing authorized to exchange, device and/or service arrangements' respective human individuals' and/or individuals'/devices' composite, respective at least in part biometrically based identification information sets.

In some embodiments, a policy rule set may specify that forwarding and receiving device and/or service arrangements must be within a specified proximity to each other, which may vary based on one or more device positioning/usage conditions. Such policy rule set may be satisfied by requiring at least certain specified distance and/or other location factor, such as communication signal strength, WiFi and/or Bluetooth arrangement service area, and/or other specified requirements (in compliance with policy specification information). Some embodiments may require a forwarding device and/or service arrangement to use range limited protocols for forwarding IISs to receiving EBInet device and/or service arrangement.

In some embodiments, a forwarding EBInet device and/or service arrangement ensures, for example, through policy enforcement, that any human involved in instructing forwarding of IISs is also demonstrated to be in such forwarding device and/or service arrangement's vicinity through use of an at least in part operatively simultaneous biometrically based IIS. For example, a forwarding EBInet device and/or service arrangement may perform a biometric acquisition process using, at least in part, an RCFD's parent mobile device's native biometric identification arrangement to acquire such forwarding EBInet device and/or service arrangement's human stakeholder's/user's biometric identification information to at least in part validate, e.g., to demonstrate (or further demonstrate), that such stakeholder/user and/or user forwarding device is/are authorized (as may have been previously, securely registered with such device and/or a related service arrangement) to forward such IISs to a receiving device arrangement, and/or that such receiving device and/or service arrangement and/or user are authorized to receive and/or decrypt and/or otherwise interpret such IISs, for example, as registered as a forwarding and receiving group.

Receiving IISs (such as CIISs/IITs, and/or other IIS information) from a forwarding EBInet device and/or other service arrangement, where such IISs can contain near existential and/or existential quality at least in part biometrically based identification information of situationally relevant human individuals and/or an EBInet device arrangement composite device/individual identification information set. For example, in some embodiments, if a receiving EBInet device and/or service arrangement receives one or more IISs from a forwarding device and/or service arrangement, a policy rule set may specify that the receiving EBInet device and/or service arrangement verifies that such forwarding EBInet device and/or service arrangement's trustworthiness/security rigor level, and/or trustworthiness/security rigor level of such one or more IISs being received, is equal to or higher than such receiving EBInet device and/or service arrangement's corresponding rigor levels.

In some embodiments, when a person who has two or more device arrangements, for example, has a personal RCFD device arrangement and a work RCFD device arrangement, such arrangements may comprise embedded different, isolated, PPE (e.g., NIIPU) modular component RCFD arrangements built into a single smartphone (mobile smart device) that, for example, may share resources, such as sharing battery and/or communication arrangements, and where such battery and/or communications arrangements may further comprise the parent device component battery and/or communication arrangements. Such different RCFD modular component arrangements may employ different NIIPUs which support respective at least in part isolated (from each other and from such mobile smart device) processing arrangements that may, for example, operate at (e.g., have) different rigor levels resulting from having different capabilities.

The owner person of such smart device can, for example, use one of such RCFD's modular components to perform EBInet personal event/activity instance governance, such as governing one or more social networking, personal shopping, personal online banking, and/or opening such person's home front door, events/activities. Such person can use his/her work another such NIIPU managed RCFD arrangement to access and/or otherwise govern his/her work-related functions such as entering/accessing a high security location such as a research laboratory and/or retrieving a sensitive information document from a work database, and/or performing one or more other work related and EBInet governed one or more employer related functions.

In some embodiments, at a person's home, such person may have an AFD arrangement that can acquire such person's near-existential or existential identity information set for use with such person's personal RCFD arrangement. Such person's personal device arrangement may have a policy set that permits such arrangement to receive such person's near existential and/or existential quality identity information sets produced by such home located AFD arrangement. Such work device arrangement may have a policy set that does not permit such work arrangement to receive such information from such home located AFD arrangement. Instead, the policy set associated with such work device may specify that such work device can only receive such person's near existential and/or existential quality at least in part biometrically based identity information sets produced by an AFD device arrangement located at such person's employer's facility (and where such AFD work device arrangement is required by securely maintained specifications to have a rigor level equal to or higher than such work RCFD device arrangement's rigor level, and such a rigor level is higher than required for such person's personal EBInet event/activity governance). Furthermore, respective policy sets may specify that such person's RCFD and/or RCFD device/person work arrangement, and AFD and/or AFD device/person work arrangement, must be registered on such person's employer's administrative arrangement as being authorized members of at least one specified employer EBInet device arrangement group, and where such a group may include other one or more persons' respective device and/or device/person arrangements. Such grouping information may be specified by, for example, respective composite device/person CIISs securely stored on an organization's administrative service arrangement, and/or on member device/person, or person associated with a device, arrangements. Comparably, such person's home RCFD arrangement, and such person's home AFD arrangement, may be registered with an administrative arrangement as authorized for specified one or more group events/activities. For example, such an AFD may employ certain securely specified characteristics and/or certain event/activity condition requirement, such as date related, time related, and/or location related event/activity authorization, parameters for acquiring biometrically based identification information, communicating IISs, governing RUD managed IoT functions, and/or the like. Such grouping arrangements may include device/person arrangements of respective family members, specified friends, and/or, as applicable, household service providers (e.g., housekeeper, landscaper, and/or the like, whose authorizations for events/activities may be a subset of, and/or otherwise be different from, for example, a household's one or more primary residents).

Using grouped device arrangements, wherein such grouped device arrangements comprise a higher order single device arrangement comprising a parent (host) device arrangement that includes one or more EBInet component device arrangements (modular component, virtual, and/or other EBInet secure, isolated identity governance arrangements), where, for example, a person has a grouped arrangement comprising:

A parent device arrangement, such person's personal smart mobile device arrangement (e.g., a smartphone, tablet) and A component device arrangement comprising (1) an at least in part EBInet isolated, tamper and inspection resistant, hardware modular component processing arrangement, e.g., a NIIPU or RIIPU, and/or (2) a native tamper and inspection resistant "virtual" isolated EBInet processing and memory arrangement, where such component device arrangement can operate as a virtual component within its parent device arrangement, e.g., such first device (e.g., smartphone, tablet), (for example through use of such a parent device arrangement's secure processing and memory capabilities (e.g., a secure enclave and/or capability arrangement)). Such modular component instance and such virtual component instance, when both are implemented in a parent device arrangement, such as such person's personal smart mobile device arrangement, may be labelled as either an integrated EBInet device arrangement or at least in part separately operating two component EBInet device arrangements.

In some embodiments, identification information management of such component device arrangement is dependent, at least in part, on policy specifications. Such identification information may be used to manage authorization and/or other governance, for example when such person (1) accesses an employer's high security facility when identified by a facility's door entry RUD and/or associated RUS; (2) is authorized to start his/her car (e.g., when RUD governed); (3) is authorized to sign on to a social networking site or participate in a specific multiparty session; (4) is authorized to use a banking ATM for personal banking services, and/or (5) works on sensitive information such as proprietary intellectual property or other confidential information, where such sensitive information is securely governed in accordance with such person's and/or person's organization's policy managed rights management rules and controls. Such person's identification information event/activity policy management can take place as such component device arrangement interacts with one or more applicable RUDs and/or RUSs. Policy information for such component device arrangement may require that an IIS's, such as a CIIS's/IIT's, at least in part nearly existential or existential quality biometrically based identification information was acquired using one or more of registered, and securely grouped with such parent device arrangement and/or such component device arrangement, specifically identified AFD arrangements and such policy information may require such biometric identification information to be acquired from more than one, such as differently owned and/or located, and/or timing of biometric information acquisition, AFDs, and where such acquired information may comprise contemporaneous and operatively simultaneous at least in part biometrically based identification information sets. As stipulated by EBInet device and/or service policy management information, such identification information may, for example, be communicated from a component device arrangement to such one or more RUDs and/or RUSs in the form of at least in part securely encrypted CBEIISs and/or CIISs and/or one or more portions thereof.

In some embodiments, a registered EBInet device set arrangement (e.g., registered and confirmed as authentic by a TIIRS, and, for example, belonging to one or more TIIRS registered EBInet arrangement groupings), can be verified in accordance with a policy set and used with co-registered (registered as members of the same grouping arrangement) RUDs and/or RUSs. Such a policy set may also require its user and/or device/user and/or device/owner nearly existential or existential quality biometrically based identification information (e.g., a person's CBEIIS and/or a person/device arrangement composite identification information set) to have been at least in part securely acquired from such person's home based AFD, its employer located and owned AFD, one or more otherwise specified AFDs, or from a combination thereof. For example, at such person's home, such person can have such a biometric identification information acquiring device arrangement (e.g., an AFD) acquire such person's near-existential or existential quality identification information set to form an IIS (such as CIIS, CBEIIS, and/or other IIS information). In conjunction, for example, with an employment (work) based AFD, such plural different biometric identification information acquisition arrangements can enable such EBInet device and/or service arrangement to receive, carry, and use such person's identification information (e.g., contemporaneous and/or operatively simultaneous) in accordance with arrangement applicable securely governed policies, where such identification information can be used to provide two differently acquired (e.g., using different AFD configurations) identification information sets that are analyzed as to whether they mutually confirm the identity of such EBInet device user and/or device arrangement, such mutual plural AFD biometric identification confirmation providing a two factor security arrangement for identifying the user, and by extension, the user's carried EBInet device (e.g., an RCFD) arrangement. In such an example, such different identification provisioning configurations can employ, for example, at least in part isolated, tamper and inspection resistant, EBInet hardware modular component processing arrangement (e.g., a NIIPU or RIIPU), and a native tamper and inspection resistant "virtual" isolated EBInet processing and memory arrangement, where such components may be required to provide such person's operatively matching identification results, for example, within any tolerances allowed by policies of applicable arrangements.

In some embodiments, policy specifications may contain different policy requirements for EBInet device arrangements' updating of their respective at least in part biometrically based identification information sets. For example, a policy information set (for example specified by a person's employer) for an EBInet work related (used at work) mobile device arrangement may specify that an employment based AFD periodically acquire for updating such person's at least in part biometrically based identification information by acquiring and forwarding such person's near existential or existential quality, at least in part biometrically based IIS, to such EBInet work related device arrangement (an employee's RCFD), such updating occurring, for example, within specified, required one or more time frame(s) (e.g., during the work week versus weekend). Such identification information updating may be a requirement specified by an EBInet device arrangement in order to receive forwarded at least in part biometrically based REAI identification information, e.g., an IIS or one or more portions thereof.

Monitoring and/or authenticity/integrity testing policy managed EBInet components such as NIIPUs supporting, for example, RDs respectively embedded in wearable smart appliances (such as smartwatches, fobs, RUD control arrangements such as SVCC seals, and IoT control arrangements, and/or the like) and/or human bodies, that employ wireless communication means to receive and/or forward at least in part such near-existential and/or existential quality at least in part biometrically based identification information. Such device components, in accordance with respective policy sets, can be respectively monitored for environmental operation and/or electrical, chemical, and/or physical one or more conditions of such device arrangements', and/or such device arrangements' respective EBInet components', and/or respective components' (e.g., RUD components') associated REAIs', environments, status, and/or operations, including, for example, abnormal such device arrangements' and/or associated REAIs' respective performance results, and/or other device, and/or device environment, one or more characteristics.

In some embodiments, continuity monitoring can identify an alteration in the embedded state of a component (may comprise one or more components within a component arrangement), whereby an electrical, thermal, optical, ultrasonic, and/or chemical (including, for example, biochemical) one or more conditions are monitored employing, for example, one or more sensors (may in some embodiments be, for example, packaged within such component (e.g., a secure hardware packaging arrangement) and may further include one or more emitters), such component designed to determine whether such component has been changed in a manner indicative of component removal, moving, and/or modification.

Otherwise securely communicating with other device and/or service arrangements. When an EBInet device and/or service arrangement communicates with another device and/or service arrangement, a policy set may specify that it employs a secure communication protocol.

Ensuring session associated rules and controls for secure digital, and/or at least in part tangible, object and/or associated process rights management. Such rights management may employ rules and controls to enforce inter-party seniority of rights, and/or other rights, management (e.g., enforcing, for example, seniority of rules and controls). Such ensuring may occur when users and/or their computing arrangements are participating in, and/or otherwise using, computing SVCC and/or, for example, computing personal, social, financial, commercial, and/or societal REAIs. In some embodiments, REAI identification information sets that securely bind rules and controls with their associated biometrically based stakeholder identification information and non-biometric identification informing attributes may further contain event/activity related contextual variables, e.g., time, date, location, route, profession, and/or other rights related REAI (e.g., stakeholder, device, and/or event/activity rights management operative) parameters/conditions regarding/governing the application/enforcement of rules and controls. In some further embodiments, a person's rights management can be enforced (for digital processes) by ensuring that a digital contract participant person genuinely agrees to perform (or have performed) an electronic contractual obligation (e.g., obligation specified by a smart contract) and/or other digitally executed obligation, wherein an EBInet arrangement specification requires such a person's express agreement (e.g., answering yes or no, for example, using a trusted path user interface instruction arrangement). Such permission to perform a specific digital process set (or, for example, a declination to proceed with a specified process set) may use rules and controls that require such a person to present to a requesting computing arrangement (e.g., an RUS) his/her carried at least in part near existential or existential quality identification information token (e.g., an EBInet CIIS at least in part biometrically based token), where such presented (e.g., electronically communicated) token information is matched against societally anonymous, or societally identifiable, person's registered biometric identification information (e.g., registered with an EBInet device and/or service group, such as with a TIIRS (trusted identification information service arrangement)). Such person's registered identification information and securely associated rules and controls specifications may be securely stored within an event/activity transaction related identification information set (e.g., an IIS for an event/activity transaction category-based arrangement), a digital currency set's associated currency management digital contract, and/or a TIIRS rights management registered identification information instance.

Registering and/or publishing resource and/or event/activity information sets with/using one or more EBInet administrative and/or platform/utility services. Such registering and/or publishing REAI (for example registered as, and/or published in, the form of a PERCos Formal Resource) identification information sets can include, for example, publishing at least in part IISs comprising at least in part nearly existential or existential quality biometrically based specific stakeholder one or more humans' and/or other tangible items' respective identification information.

In some embodiments, when a user set registers and/or publishes at least a portion of a stakeholder set's REAI identification information set, such as an EBInet device arrangement's, other resource's, and/or event's/activity's IIS, the registering and/or publishing party set may securely include, directly and/or virtually (e.g., having distributed components that are securely associated), one or more REAI associated stakeholder sets' one or more policy sets at least in part to govern respective REAI related one or more operations. Alternatively, or in addition, a stakeholder set arrangement may create and publish policy sets for respective resources and/or events/activities for at least in part controlling (e.g., governing usage of) such resources and/or events/activities according to their respective classifications/types. For example, when an EBInet device arrangement securely receives a freshly acquired IIT required for an event/activity authorization, such device arrangement's stakeholder policy information may stipulate that such a token, in some embodiments, must represent one or more authorized parties, and such token must be authenticable/authenticated, for such receiving device arrangement to perform an event/activity. Such stipulated token information may be required to match, within policy specification parameters, token information registered with/for a correspondingly grouping of participants' device and/or service arrangement, and/or registered with a trusted identification information service, such as a TIIRS. Policy information may further require that such token has been certified using at least in part nearly existential and/or existential quality biometrically based identification information, e.g., an EBICert, of such an EBInet device arrangement's registered/authorized one or more stakeholder and/or administration service respective persons.

In some embodiments, policy sets may be securely, cryptographically included as part of, and/or otherwise securely bound with, an REAI's IIS, where such inclusion or binding may be performed at the time of the publishing of such IIS and/or at the time of such REAI's registration event/activity. For example, in some embodiments, when an EBInet compliant REAI is registered with an EBInet administrative arrangement, one or more instances of such an REAI subject matter's IIS set may include attributes that specify one or more policies for controlling/constraining the subject matter's operations.

In some embodiments, an REAI's policy set may provide instructions for governing use of its IIS information in a manner operatively responsive to an REAI's associated contextual purpose specification (e.g., a CPE)

where, for example, one or more attributes, such as a Cred Quality to Purpose and like assertion information set and/or Effective Fact information set, satisfies a contextual purpose requirement/priority and/or other condition for the performance of one or more subject matter related E/A control processes where such IIS information informs about, and such one or more attributes' presence or absence is used in the determination of the suitability for use (e.g., authorized by specified policy specified rights to perform an event/activity) and/or operative performance, of an REAI.

In some embodiments, a remote attacker may be unable to attack EBInet device arrangements when they find it not possible to circumvent nearly existential or existential quality biometric identification process sets whose policy sets respectively require, and process sets authenticate, the live presence of computing one or more persons as session participants and/or resource stakeholders when the identification information is acquired. A remote attacker, who has no physical access to an EBInet device arrangement will find it very difficult, or not possible, to obtain direct programmatic access to, and infect with malware, an EBInet device arrangement, when such EBInet arrangement employs a tamper and inspection resistant isolated processing and storage arrangement, such as used in arrangements employing one or more NIIPUs, RIIPUs, and/or other EBInet modular components, and/or as may be employed in well rendered parent device virtual isolation implementations. Such component arrangements, in part, can prevent access and malicious subversion due to their hardening against remote tampering and inspection, including employing minimal operative code (and function) for minimal availability of attack surfaces.

For example, in some embodiments EBInet systems can minimize attack vulnerability by providing more practical, rigorous, user-friendly, and cost-effective identification-based attack, theft, and related threat, management solutions. Such arrangements can employ carried CBEIISs and/or CIISs and further employ sophisticated biometric template matching analysis techniques that compare securely carried CBEIISs and/or CIIS person's biometric identification information to respective second factor information sets for matching confirmation determination, such second factor information sets produced by parent native device built-in biometric identification and authentication process sets (as, for example, found in a mobile phone).

Such parent mobile carrying device arrangements can receive and carry unforgeable tokens (e.g., IITs) that are cryptographically signed by the biometric identification information tamper resistant acquiring device arrangements (e.g., AFSD arrangements using respective EBICerts), and where such a token, carried and signed identification information, comprises at least in part biometrically based contemporaneous near existential and/or existential quality identification information that is compared with such parent at least in part native device acquired biometric identification information set. Such less rigorous native biometric identification information can be analyzed to determine whether it presents properties that are shared with, i.e., operatively correspond to, one or more stored and carried CBEIISs' and/or CIISs' respective properties. Such analysis can employ biometric template pattern analysis specific for matching native device biometric identification with such AFSD acquired, biometrically based CBEIIS and/or CIIS information. Such parent native device biometrically acquired identification information, and EBInet arrangement CBEIIS and/or CIIS information, analysis may use different pattern identification interpretation techniques to produce their respective information sets used in identification information matching analysis.

In some embodiments a mobile parent smart device (e.g., a smartphone or smart watch) has one or more embedded EBInet secure modular components that respectively carry contemporaneous at least in part biometrically acquired (e.g., at the beginning of the day) and/or acquired and at least in part derived, user, and/or user/device composite, one or more identification information sets. Such a modular component set can enable, for example, through use of its RCFD operations, communication of one or more portions of such identification information to a network, e.g., cloud service administrative, arrangement. During the specified "life" (e.g., before required refreshing and/or cancellation) of such at least in part biometrically based contemporaneous information, such communication to such a service from such a parent device's EBInet communication and modular component arrangement, such as an RCFD NIIPU arrangement, can comprise communicating such arrangement's EBInet composite and/or stakeholder/user identification information, which can be communicated at the time of, or in anticipation/authorization of, use of such information for an event/activity. Such information can also, or alternatively, be communicated periodically, and/or upon request, in order to satisfy an EBInet arrangement device and/or stakeholder/user and/or administrative specification requirement. Such a cloud service, or other administrative service, arrangement receiving such information can determine that the identification information carried by such an RCFD operatively (in accordance with specification) matches, or fails to match, corresponding one or more current, applicable contemporaneous and/or otherwise stored identification information sets (or specified one or more portions thereof), such sets stored/registered on a securely managed service arrangement, such as a TIIRS. Further, or alternatively, at a point of use and/or communication of an at least in part biometrically based user contemporaneous identification information set, a user's RD and/or RUS arrangement, and/or an interacting/intercommunicating set of devices and/or service(s), policy set can require a receiving device, or both forwarding and receiving devices and/or service, arrangements, to securely provide at least in part nearly existential or existential quality biometrically based user identification information, for example by providing a device arrangement IIT. Such arrangements can also use one or more auxiliary identification factors (such as for pre-IIS communications) where such receiving device arrangement requires, and receiving an IIS results at least in part from, user entry of a user password secret into such one or more EBInet device arrangements (e.g., parent smart device and/or modular component), such password used to at least in part validate any such applicable user.

An attacker may use indirect means in attempting to access EBInet device arrangement tamper and inspection resistant storage, for example, through the use of timing and/or other side channels. In some EBInet embodiments, a device arrangement may block such covert channels by using a tamper and inspection resistant, isolated separate processor that operates algorithms specifically designed to thwart side-channel attack. In some embodiments, such separate processor may be installed on an SD, micro-SD or SIM card, and/or, for example, be embedded in an EBInet modular component such as a NIIPU and/or RIIPU. Cryptographic algorithms operating on such processors may be designed (e.g., modifying standard operation) to disguise measurable differences in timing and/or power use while they operate so as to support anti-inspection, anti-power differential analysis capabilities. Such measures may block a remote attacker's ability to inspect and/or attack identity information stored in an EBInet device. These same measures may ensure that a device, and for example, a device modular component arrangement, used to carry a token, e.g., an IIT, remains a secure location for such token.

In some embodiments, even if an attacker obtains physical access to an EBInet device arrangement, such access may take time (to acquire and transport the device, modify the device, and, for example, return and/or use the device) and such time provides the opportunity to support capabilities for detecting the absence of such device from a network, continuity, and/or other "tethering" arrangement, for example, within one or more specified time periods, and/or at one or more points-in-time, requirements. Depending on the level of threat, a network defender arrangement may defend against such attacks (involving theft and physical compromise of a device) by shortening the interval of time of, and/or between, successive acquiring, forwarding, carrying, using, and/or receiving timing events involving one or more EBInet device arrangements, for example, when a threat is identified, anticipated, or suspected. For example, an EBInet arrangement can carry and/or communicate a token (e.g., a token that may be "revoked" or otherwise timed out), where such token, and/or a non-token control specification, requires that operating a parent device and/or EBInet compliant modular component and/or sub-component, such as a NIIPU, involves identification information device, user, and/or composite, presence testing/validating/authenticating, and/or related information refreshing, for example, within a certain time period and/or limit, and/or in response to event/activity one or more instances and/or related one or more periods/deadlines, and/or requires one or more secure network communications to have occurred within one or more specified time periods and/or event/activity related deadline/time windows. Alternatively, or in addition in some embodiments, EBInet device and/or administrative service arrangements may connect to local area networks to track the location of one or more EBInet device arrangements and/or arrangement groupings (e.g., mutually present device arrangements on a network and/or in a networking arrangement). Such one or more device arrangements may employ, in accordance with policy information, a contextual location analysis and associated requirement set for one or more of such device arrangements regarding being connected to a network, and/or being located in relationship to a specified network (e.g., a relationship determined by WiFi and/or other network "presence" signal strength, location triangulation, and/or networking group participation presence), such analysis to provide information regarding, and/or determine, whether such device is either under authorized physical control or has been stolen or misplaced. Such network presence device arrangement management can improve the security of cryptographically protected token exchanges.

In some embodiments, a device arrangement, such as an EBInet RD arrangement can, from time to time (for example, periodically), receive from an EBInet device arrangement capable of acquiring and forwarding an at least in part nearly existential or existential quality contemporaneous, biometrically based identification information, at least in part, encrypted token (such as from an AFSD arrangement). In some embodiments, an enforced EBInet policy for such RD arrangement may indicate that such device, in order to operate one or more (e.g., can be all) functions, must receive a fresh token within a certain time period and/or other set of conditions (e.g., every 24 or 36 hours when physically located in a certain physical area) where such token is at least in part based on a specified rigor level of an AFD that provides newly acquired biometrically based identification information. In some embodiments, such a policy may have one or more exceptions regarding function operations where, for example, such device is within one or more certain ranges (e.g., regarding determined distance and/or signal strength and/or information, the foregoing based, for example on cellular, Bluetooth or Wi-Fi provided information) and, for example, within a time range (e.g., at least once every 3 hours), and/or at a specific time period or time instance, and/or at one or more certain EBInet device arrangement specified locations, and/or within/along specified regions/routes. The foregoing may apply to, for example, a secure work environment, a home residence, and/or when a carried EBInet device arrangement, such as an RCFD mobile smart device arrangement, communicates with a specific router, a Bluetooth arrangement, and/or one or more cell phone networks (demonstrating its specific or area location), and/or, for example, as the device is carried along a typical route during an acceptable time interval and/or is resident/stored for a period of time contextually appropriate for a registered pathway and/or location. Such a policy arrangement specifying required locations and/or regions/routes may be very effective in preventing device misuse by promptly disabling (or not being enabled) for use, an improperly located EBInet device. Theft, and/or other malicious EBInet device arrangement misuse, mitigation may also employ specifications requiring that if a device is "out of range" for more than a certain specified time and/or for other one or more specified condition sets, such as not in contact with a specified EBInet compliant arrangement, such device, in some embodiments, must perform, and/or receive, a user authentication (e.g., where such receiving provides an authorized user's presence verification, performed, for example, using an auxiliary AFD biometric information acquisition near existential or existential quality arrangement operating in a shared environment, e.g., installed in a hallway such as an organization's secure hallway).

In some embodiments, policy may stipulate that an "out of range" condition must be corrected within a certain time period and/or in accordance with one or more other specified requirements. Such authentication can additionally or alternatively be performed using other one or more methods, such as entering, using a parent device's user interface, a user identity confirming password, and/or performing device-native biometric identification/authentication, such activities performed, for example, within a certain time period, or in response to a disabling or limiting token use/communication instruction set. Such authentication, such as using a device's native biometric authentication capability set, can "buy" an additional time period, such as an additional budget of 6 hours, before requiring performing a further EBInet AFSD and/or the like device arrangement at least in part near existential or existential quality biometric identification information acquisition process set, which may, for example, be forwarded to one or more EBInet RDs.

EBInet arrangements can provide high levels of protection from local attacks. For example, in one embodiment, a carrying and forwarding device (e.g., an RCFD), for example, in an EBInet compliant parent smartphone, may be capable of authenticating its owner, though at less rigor than an AFD. Policy, in some embodiments, may require in an operatively coincidental manner that such a carrying parent device authenticate its owner, for example, before being able to perform forwarding operations. In order to defeat such an embodiment, a potential imposter must not only steal or borrow the carrying device but must also spoof the carrying device's built-in authentication (or otherwise take operational control of the device). If such a potential imposter were to steal such a carrying RCFD device, then such device would not be able to receive an acquired token after the token in such carrying device expired and/or a certain trustworthiness rigor level context required a token refresh and/or in response to other one or more contextual variables/circumstances (e.g., being located within or outside a certain EBInet compliant Wi-Fi and/or other wireless arrangement range or being identified as stolen and being at least in part deactivated by secure remote instruction from an administrative server and/or other client and/or authority arrangement).

In some embodiments, if the owner of such an RCFD arrangement were to notice the absence of such a device, then the owner could perform one or more operations to remotely at least in part disable the device. In some embodiments, information indicating such absence can be communicated to a network service where it is securely associated with such carrying device's (i.e., RCFD's) registered composite and/or other identification information set. Such notice of absence securely associated information set can be (1) stored on such network service, and (2) broadcast to, or be provided upon request to, potential receiving one or more RD arrangements. Such broadcast or otherwise provided information can at least in part instruct any such one or more potential, current, and/or historical receiving devices that interaction with (including, for example, having previously received information from) such RCFD is subject to modified rules and controls (due to being missing or stolen). Such a receiving device can, for example, if and when it communicates with such RCFD, activate one or more of such RCFD's security functions and/or deactivate one or more of its capabilities, in order to prevent user and/or device and/or associated identification information (e.g., at least in part biometrically based such information) misuse and/or to discourage such device type theft or theft continuation. Such features can be augmented by information received from compatible biometric identification acquisition devices located in such an RCFD's one or more environments. Such environment based devices can perform, for example, facial and/or other body part, gate, and/or other biometric information acquisition/analysis and communicate information at least in part based upon such acquired information to such a receiving device arrangement and/or to an administrative arrangement.

Such communication can inform, for example, that received biometrically based identification information provided by the carrying device is inconsistent, or is consistent, with a device arrangement's environmentally observed user identification information.

In some embodiments, EBInet activities can include, for example publishing of a REAL at least in part biometrically based identification information set, wherein such set becomes, when published and registered, non-refutable (a further instance of such information either matches the registered instance or doesn't) and non-modifiable, post such publishing (if modified it becomes a new, e.g., modified or otherwise changed information set). If modified, such modification, in some embodiments, involves further publishing of modified "new", uniquely identified, identification information sets, for example, each time one or more alterations to respective published resource information sets occur. Such information sets are formed when new, for example, secure purposeful computing respective publishing (and, for example, registering) events are used to bind, such as include and/or securely associate, identification instances' respective stakeholder at least in part biometrically based identification information one or more identities to produce updated respective REAI IISs. Such published instances may comprise respective durable, persistent, cryptographically secure packages.

In some embodiments, an AFD near existential and/or existential quality biometric identification information acquiring and forwarding arrangement can comprise, for example, an isolated, secure processing hardware RIIPU modular component one or more arrangements, such one or more arrangements supporting a secure protected processing environment (PPE with secure processor and memory, cryptographic capabilities such as a cryptographic engine, and secure communication i/o hardware), such PPE at least in part isolated from, for example, an AFSD's parent device (e.g., smartphone's charging station), if not packaged as a standalone AFD, and one or more security hardened biometric sensors (hardware co-packaged with such modular component arrangement and/or enabled to securely communicate with such component). Such an arrangement at least in part enables acquisition of nearly existential and/or existential quality biometric identification information of an AFD's one or more users, for example, for use in registering biometrically based identification information of such one or more users. Such biometrically based (e.g., contemporaneous) identification information can, subsequent to such registration, be employed in computing identity related operations, such as for authenticating and/or authorizing and/or auditing such users for and/or during REAIs.

In some embodiments, an RCFD arrangement may comprise an RFID tag arrangement. Such an RFID may be battery-assisted or actively powered and, for example, such tag may have its battery wirelessly charged at night by a contact (physically connected), or non-contact, charging arrangement. Such an arrangement can enable, for example, an RFID with a low power consumption NIIPU, to function as a person's RCFD arrangement for EIFF functions. Such a device may be embedded under such a person's skin as at least a portion of a device RCFD arrangement, and may provide a skin surface attached/worn, battery powered charging arrangement (e.g., an adhering pad, wrap, and/or the like). Such charging arrangement can be, for example, removed and charged using an AFD's, and/or other, charging arrangement when such device may not be performing its EBInet compliant RFID activities (e.g., at night, when device is not being used and its user is sleeping). Such an RFID RCFD arrangement can employ a heat exchange arrangement whereby the temperature difference between the human body and the surrounding air (often 20 degrees Fahrenheit or more) is used to generate electrical current that at least in part charges an RFID's battery arrangement (using, for example, thermoelectric materials such as nano-engineered small grain tin telluride or other topological materials that can generate electricity from temperature differentials).

EBInet smart device arrangements, in some embodiments, may employ a parent arrangement in the form of a smartphone, smartwatch, smart bracelet, tablet, notebook, and/or the like, that includes one or more embedded, inserted, and/or wirelessly communicating, isolated EBInet compliant modular components, such as, as applicable, RIIPU, or NIIPU, secure arrangements. In some embodiments such EBInet device arrangements may perform as primary (e.g., standalone and not for example embedded) device arrangements. An EBInet arrangement, in some embodiments, may use such a smart device's native biometric identification arrangement for one or more EBInet functions, so long as such smart device's identification arrangement (e.g., for biometric identification acquisition) is compliant with EBInet platform, organization, and/or stakeholder set, rigor and/or other specified requirements. When such a smart device has a reasonably robust built-in biometric authentication mechanism (e.g., Apple Face ID, Samsung/Qualcomm 3D ultrasonic fingerprint, or the like), and subject to any EBInet associated policy specified requirements, such smart device may use such a mechanism set to demonstrate that the user actually using the smartphone is likely, or is, in fact, the legitimate owner and/or user of the parent smartphone. Such biometric-capable smartphones may include policy mechanisms which determine one or more circumstances in which a smartphone's biometric authentication mechanism can or must be used. An EBInet modular component arrangement may augment a smart device's policy enforcement capabilities to make the arrangement more robust/reliable (by employing EBInet contemporaneous biometrically based near existential or existential quality identification information and ensuring smart phone usage activities are performed by an authorized user). In some embodiments, some or all EBInet device functions may employ, and associated data can be at least in part protected by, such a smartphone's security capabilities (such as an iPhone's Secure Enclave or an Android phone's TrustZone), as well as its processing and memory resources.

In some embodiments, an EBInet modular component arrangement may improve a smartphone's (or other smart device arrangement's) secure identity related operations by providing resource and/or event/activity highly secure, identity and/or rights management functions. For example, a smart device's secure TrustZone and/or the like set of capabilities may be specifically configured to securely interact with (e.g., with specialized adaptions to securely communicate with, to rely on, and/or to securely share the operative results of) one or more functions of EBInet isolated modular component secure REAI information processing (e.g., a TrustZone invokes calls of one or more NIIPU, and/or the like, modular component functions using a limited set of interface calls managed by secure PPE operations). For example, an EBInet isolated modular component can provide identification and/or related information, including, for example, REAI associated rights management information, that may be used to at least in part control TrustZone one or more operations, such as user and/or device authentication and/or authorization for one or more smartphone operations.

In some embodiments, EBInet modular component arrangements, such as NIIPUs, may be employed, in conjunction with such component arrangements' respective parent smart devices, to provide highly secure, EBInet composite device arrangements. Such composite arrangements employ smart device hardware hardened, tamper-resistant, inspection resistant, and locally operatively isolated EBInet device identification information operating environments (where, for example, a NIIPU's operating system is distinct and at least in part operatively separate from such parent's (e.g., smart device's) operating system and may provide near existentially and/or existentially reliable identification information instances to RD arrangements). For example, locally isolated, at least in part, hardware modular component arrangements can, in some embodiments, manage the communication, provisioning, usage, and/or forwarding of smart device owner and/or user persons' REAI related identification information comprised at least in part of contemporaneous, one or more of such persons' biometrically based near-existential or existential quality identification information.

In some embodiments, EBInet REAI identification information is communicated to registered individually and/or as paired and/or otherwise grouped, RD arrangements. For example, an EBInet arrangement may employ an EBInet modular component (e.g., NIIPU) integrated into a parent smart device to forward at least in part biometrically based, contemporaneous identification information to a receiving door opening lock and/or other at least in part RUD securely managed device arrangement, such managing based at least in part on the required forwarding, receiving, and/or use of secure at least in part biometrically based, contemporaneous identification information, for example provided as information included in a person/device arrangement CIIS. Such receiving device can, for example, comprise a financial transaction terminal, an auto ignition system, a security system device, a homeland security border control "entry" arrangement, a kitchen device, a computer server information management arrangement, a cloud service device arrangement, a home entertainment device arrangement (e.g., a connected television and/or audio arrangement), a personal computing device, and/or any other appropriate device appliance and/or other identification information requiring or requesting (e.g., for auditing) arrangement, for example, for authorizing an event/activity such as opening, communicating, vending, publishing, starting or stopping, retrieving, interacting (e.g., with a service and/or networking group (e.g., social or commercial networking)), participating in (e.g., an event/activity), and/or the like.

In some embodiments, such parent smart device's owner and/or user may be registered as an electronic identification information secure RCFD wallet (e.g., billfold) that characterizes both its owner person and its device arrangement and related rights. Such a wallet may be implemented using a credit or like card form factor and/or be a securely integrated component arrangement of a user's portable device arrangement, such as a smartphone. Such wallet can carry one or more IISs, such as one or more IITs, which contain at least in part nearly existential or existential identification information characterizing such owner person and other owner person/device composite entity's human subject matter. Such arrangement's modular component and/or it's corresponding parent smart device (using associated one or more identifiers), can be registered as, for example, an IIS, such as a CIIS owner/device and/or user/device receiving and using arrangement. Such a wallet can be securely managed by a NIIPU arrangement which provides a secure processing environment for securely managed RCFD functions. Such a wallet can be used to carry any digital identifying and/or rights conveying information, from digital currency, such as EBICoins, to credit "card" arrangements, to driver licenses, to event/activity governing keys such as an electric car starting and/or facility entering electronic keys. Computing devices (e.g., computers, IoT devices, smart communication devices) can communicate at least a portion of, for example, carried composite device arrangement, and/or stakeholder person, at least in part biometrically based near-existential to existential quality identification information to at least in part enable computing event/activity identity related operations such as performing auditing, authenticating, authorizing, communicating, provisioning, governing, and/or other managing functions on a corresponding receiving RUD and/or RUS arrangement set. Such performing can be controlled, and/or monitored/audited, at least in part based on device, service, and/or stakeholder person identification information authentication, other validation, and/or REAI user computing one or more activities' purpose suitability and/or rights management evaluation/determination.

In some embodiments, EBInet-enabled services include services provided by one or more remote entities that securely, respectively communicate with EBInet device arrangements, such as EBInet RCFD arrangements, where such services, such as a service operating on at least one of such RCFDs and/or one or more RUSs, perform, at least in part, as one or more identification information hubs. Such an identification information hub arrangement can forward, for example, EIFF IIS information, to enable a receiving device arrangement and/or associated service to securely associate (for example, by digital signature (e.g., such as provided by an at least in part EBInet biometrically based EBICert)) an EBInet compliant device arrangement's stakeholder's (e.g. owner's and/or user's) unique at least in part biometrically based, authenticated identification information (which may include one or more stakeholders' respective attribute information one or more sets). Such information can be received and used to enable/govern one or more event/activity operations, such operations performed by (and/or one or more candidate operations to be performed by) an EBInet device arrangement and/or EBInet service set (such as a cloud administrative and/or affinity group service set). Such stakeholder identification information may be provided as a component of an EBInet composite device identification information set, such IIS securely, cryptographically associated with such a device arrangement and/or service set.

In some EBInet embodiments, securely managed back-end database, policy, and/or event/activity management services can at least in part be used to securely control storing, and govern the use, of one or more of:

- Stakeholder, user, and/or CertPer, respective persons biometrically acquired and/or derived persons' identifying data, such as persons' respective biometric templates and/or other information derived from such data, where such information may be securely stored and used, for example, in the form of CBEIISs registered with a local and/or cloud (e.g., TIIRS) service,
- person (i.e., human) and EBInet REAI (e.g., using subject matter device, service, and/or other data arrangement) composite (e.g., fused-identity entity's) identification information, wherein such composite REAI identification information at least in part comprises stakeholder, user, and/or CertPer, person biometrically based identification information registered, e.g., as a fused-identity subject matter composite (1) resource, and (2) resource securely associated person characterizing information, made available for REAI identification and use related functions. Such characterizing information may further include REAI person suitability informing attribute information such as QtPs and/or EFs and/or other person information, such as "real-world" (e.g., societally) identifying fact attributes (e.g., social security and/or organization employee/membership numbers/identifiers),
- person, person grouping, organization (government, corporate, affinity, and/or the like) stakeholder, user, and/or platform (broadly or domain specific), policy management information, such as entity (e.g., person) event/activity rights management rules and controls information for securely governing operations.

In some embodiments, such back-end service arrangements can be managed by a platform authority organization such as an identification information and/or purposeful computing services organization, such as a cloud administrative identification information service (e.g., a TIIRS), where governance/administrative activities can include organizing, managing, validating/authenticating, identifying, making available, and/or selecting REAI instances through use of IIS information elements. Such information elements may include, at least in part, IISs respectively comprising biometrically based stakeholder, user/participant, and/or CertPer, identity information instances, suitability attributes, rights management specifications (e.g., platform, group, and/or specific party/person specified rules), utility service and/or other REAI information (e.g., pointers to respective REAI subject matters and/or respective REAIs' IISs, and/or REAI subject matter interfaces, and/or provisioning instructions).

In some such embodiments, service providers supply specifications and/or operational services establishing/maintaining an at least in part standardized EBInet REAI platform. Such service providers can operate and provide EBInet platform wide, domain specific (e.g., science, auto-industry, social networking), and/or named affinity group (e.g., ACLU, WWF, NRA, Boy Scouts, and/or the like), service arrangements in the form of, for example, one or more standards authorities, other platform resource providers, specifications-establishing commercial and/or non-profit entities, and/or coordinated groupings of, for example, commercial organizations functioning as, and/or comprising members of, one or more service consortiums.

In some embodiments, back-end cloud services' one or more databases and associated services can contain digitally/cryptographically-signed (e.g., using EBICerts) identification information sets such as in the form of explicit, discrete published sets, and/or operatively respectively generated IISs from database arrangements such as relational databases and/or other information stores, such IISs generated through the use of user input, artificial intelligence mechanisms, and/or IISs' respective purpose related algorithms. Such information stores can be at least in part created through IIS, IIS grouping (e.g., class) and/or IIS component registration and related other processes. Such digitally-signed identification information sets may include at least in part near-existential or existential quality at least in part biometrically based identification information of REAIs' respective stakeholder, user, and/or CertPer, one or more persons, and where such REAI IISs may include, for example, individually signed PERCos Cred and/or Effective Fact and/or the like identification information component information instances, such as standardized and interoperably interpretable Cred and/or EF specifications, and, for example, where signed identification information instances, and/or one or more portions (e.g., components) thereof, are in part managed through use of a key/certificate hierarchy arrangement, and where such signings may respectively employ EBICerts. Component information instances of IISs, such as EFs, may, in some embodiments, be signed using EBICerts respectively representing different persons/parties and/or person/party composite entities. For example, an IIS may be signed by its creator and/or provider and component portions of such an IIS may be signed by different persons/parties using, for example, respective effective facts signed by, and using respective EBICerts of, EF root fact authorities.

In some embodiments, using an EBInet device arrangement that supports a biometric identification information acquisition arrangement (e.g., an AFD, for example, an AFSD), a user can first have his or her biometrically based identification information acquired and then forwarded, as an at least in part biometrically based identification information set, to an RCFD, such as integrated within an EBInet compliant smartphone that performs natively protected and/or embedded modular component (e.g., NIIPU) protected EBInet operations. Such forwarded information can then be used to establish (near-existentially or existentially), from a cyberattack perspective, the presence of a stakeholder person (owner and/or user) using, for example, contemporaneously acquired at least in part biometrically based identification information. Such information may be securely forwarded from such RCFD to a compliant, e.g., authorized, RD (receiving) and/or RUS arrangement (e.g., any device arrangement authorized to receive such information) for a secure, contemporaneously employed identification information binding operation, where at least a portion of such biometrically based identification information may be securely bound to such RD and/or RUS arrangement identification information, such as to its unique, manufacturer embedded and/or otherwise provided secret, and/or other relevant, securely maintained, device characterizing (e.g., attribute and/or event activity) information instance. Binding may occur at a sending AFD, at a receiving RCFD, and/or related at an administrative service, as an “evolving” bound set that is updated to reflect the provenance journey of the bound information, where such provenance journey’s information sets can include sets’ respective composite stakeholder, user, CertPer, SVCC and/or other antecedent chain of handling and control historical devices’ IISs (which may accumulate audit information using secure blockchain (e.g., EBIBlockChain) methods, for example, for securely acquiring descriptive information for each material SVCC or other chain step). With such binding, a receiving device identification information set can be enhanced to include specific, biometrically based identification information of one or more of its users and/or owners and/or CertPers, where such information can be used in relevant EBInet compliant computing activity evaluation, certification, authentication, other authorization, auditing, and/or rights management operations, such as used in publishing an identification information set for an REAI subject matter instance. AFD acquired identification information and/or information derived at least in part therefrom can also be used by such an RD and/or RUS arrangement for securely binding contemporaneous near-existential or existential quality biometrically based user identification information to an REAI identification information set, such binding occurring during, for example, a user authentication and/or certification process set of an REAI IIS publishing and/or communication and/or event/activity governance set.

In some embodiments, an EBInet device arrangement’s identity (e.g., characterized by an identification information set) may include the attribute of membership in, for example, a specific stakeholder owner’s/user person’s device group, e.g., a group that is registered, and such information is stored, within a forwarding device arrangement (and/or organization and/or cloud service database and//or other secure memory information storage arrangement). Such a user’s RCFD may, for example, be paired with a user’s IoT RD EBInet electronically controlled device arrangement, such as a front door lock. Secure binding of an RCFD’s token identification information (for example of composite person/device identification) with a door lock RUD (or other RUD and/or RUS parent arrangement) may specify the “authorized” device to device arrangement registered relationship, e.g., specify such specified device arrangements are allowed to perform EBInet one or more operations such as forwarding, receiving, and/or governing use of, IIS information.

In some embodiments, securely bound tokens may specify contextually specific conditions for EBInet at least in part biometrically based identification information and/or other EBInet device arrangement usage and/or identification information event/activity authorization, auditing, and/or governance, where such specific conditions may include token representation of device arrangement, and/or stakeholder/user, groupings and carry policy (e.g., control) information for managing EBInet device arrangement one or more operations. For example, composite IISs’ information for respective plural REAI instances, such as plural EBInet RD arrangements, may be employed as secure token information sets that specify information regarding respective groupings of such RD arrangements, where device arrangements (and/or device arrangement stakeholders/users) are grouped to perform together under one or more set of token specified and/or other governance policy specification sets that denote operating conditions for a given grouped device, such as registered as a group, person/device arrangement and/or stakeholder and/or user arrangement. Such tokens can specify policy information that, for example, securely represent that device arrangement (and/or stakeholder and/or user) pairing or otherwise grouping and associated governance specifications stipulate required conditions for respective event/activity instances respectively employing such tokens. Such required conditions, for example, may include requiring the demonstration of presence (using contemporaneously, and/or operatively current, biometrically acquired identification information), participation, and/or usage of one or more specific stakeholders and/or users and/or their respective compliant EBInet device receiving arrangements’ composite and/or stakeholder/user IISs and/or one or more portions thereof.

In some embodiments, device arrangement (such as EBInet device arrangement) composite device arrangement information sets may be respectively employed in identification information sets representing subject matter device arrangements and/or device arrangements’ respective manufacturer, other SVCC, and/or user, persons. Such sets may include information demonstrating near existential or existential quality associated human liveness, where such identification at least in part demonstrates the presence of such a device arrangement’s manufacturer, other stakeholder such as an owner, and/or a user, during a biometric identification acquisition process set, where such presence demonstration (resulting at least in part from the presentation of biometrically identifying information) uses contemporaneous such person(s)’ biometrically based identification information in REAL governance, auditing, and/or IIS publishing. Using securely bound device/person identification information sets, can, for example, support at least one of (a) providing identification information sets and/or one or more portions thereof, for identifying and certifying REAL one or more published, and/or communicated to an EBInet compliant other device arrangement, identification information sets, for example, where one or more humans and/or an EBInet compliant device arrangement at least in part signs an information set (at least in part using nearly existential and/or existential quality biometric identification information) to demonstrate such device arrangement’s and/or one or more persons’ assurance of the integrity of such signed identification information set and/or one or more portions thereof, (b) evaluating such owner’s and/or user’s device arrangement’s and/or other REAI’s suitability for fulfilling and/or otherwise supporting an EBInet compliant device arrangement stakeholder owner’s and/or user’s computing event/activity set one or more purposes, (c) authenticating an REAI, such as a resource comprising a device and/or device associated participant person and/or group, and (d) authenticating/authorizing or otherwise enabling rights and/or consequences regarding use of, and/or participation in, an REAI set, such as authorizing an event/activity instance set.

In some EBInet embodiments, database and/or other secure identification information management arrangements may manage EBInet device arrangement (and/or device group) registration information, where such information includes for example rules and controls policy information for EBInet forwarding and/or receiving device arrangements. Such information can include, for example, device relationships as registered with a cloud service and/or other authority, where such registration includes group information regarding group authorized activities, including, for example, regarding EBInet compliant device arrangements' interoperation activity rules and controls (e.g., permissions and management information regarding the exchange of identity information and/or the performance of specified events/activities). Such information may be securely stored in, for example, an RCFD's or parent smartphone's memory arrangement, in a local EBInet compliant secure server administrative arrangement, and/or in a secure cloud service.

In some embodiments, an IIS (may be a subject matter representative token (e.g., an IIT)) may securely, in encrypted form, contain information about the rigor (e.g., reliability, trustworthiness) specification(s) of, and/or rigor level required by, an AFSD in acquiring and/or verifying, for example, a resource and/or resource user's person identity, such as such a user's nearly existential or existential quality biometric identification information. Such information may comprise a chain of evidence/proof of person and device identity origination background/integrity (provided as a sequence of independently verifiable digitally-signed, e.g., may be biometrically, digitally signed and stored in EBIBlocks) cryptographically protected assertions. Such assertions can be used in calculating and/or demonstrating IIS information rigor, and/or rigor related and/or otherwise user suitability informing information. Such information may comprise a portion of a cryptographically hashed IIT or other IIS maintained, and/or provided to users, at least in part as secure blockchain information. Such IIT/IIS blockchain information may be stored in an identification information database arrangement, where a blockchain (e.g., an EBIBlockChain), or one or more blocks thereof, may be provided to a user to authenticate a subject matter's suitability provenance IIT and/or other IIS information. Such chain of evidence/proof of background may be created and provided in the form of, or otherwise included in, a secure blockchain. Such assertions may, for example, at least in part comprise cryptographically signed cred quality to purpose assertions, and/or cryptographically signed effective fact testable stipulations. Identity related information may then be used to at least in part evaluate the utility, validity, and/or other suitability considerations related to the token and/or subsequent processes and/or events resulting from use of such token (such use may include, for example, use of one or more token components).

In some embodiments, an EBInet device arrangement may contain a set of IIT (or other IIS) frameworks for respective subject matter IIT sets. Such frameworks bind master IITs with master IIT respective subject matter component IITs. Such arrangements enable a master IIT to include and/or reference its respective component primary, contextual, and/or provenance subject matter IITs. In such an IIT framework arrangement, component tokens may specify different subject matters and attribute information, and such tokens may have been created by separate secure information master and component IIT binding events, for example such binding events respectively occurring at separate times/dates and/or performed by different persons/parties. Such securely bound master and component IIT sets respectively include at least in part nearly existential or existential quality, at least in part biometrically based identification information of IIT subject matters' respective stakeholder persons, EBInet arrangement device and/or service users, and/or CertPers, such as certifiers, creators, publishers, and/or the like.

In some embodiments, such an aggregation of tokens can comprise both (1) a "master" IIT for comprising an operatively comprehensive collective REAI subject matter set (e.g., a CIIS that provides a primary, contextual, and provenance, subject matter information), and (2) component IITs informing regarding such master IIT component subject matters (e.g., subject matter primary, contextual, and/or provenance, instance IITs).

In some embodiments, such a master and component group of EBInet tokens are grouped together or otherwise organized, for example, as generated by use of one or more relational algorithms applied to respective database information sets, e.g., generating relational patterns informing regarding component situational usefulness and relationship to a master subject matter and its information set, where component IITs maybe be in part organized as securely associated with event/activity specific one or more categories. Such ITTs' organizing may be performed in part or whole by such a token information arrangement's users and/or service providers who curate the information sets. Such token groups can respectively contain different IITs describing the same and/or different elements of an REAI subject matter set. Such a group of tokens, for example, can comprise a resource's subject matter logically related aggregation of primary, contextual, and provenance EBInet tokens.

Such securely bound EBInet token arrangements can be useful in determining suitability of REAIs to respective user purposes. For example, such bound EBInet token arrangements can be used as IIT frameworks for user and/or user computing arrangements navigation through REAI identification information arrangements, where such information arrangements may include primary, contextual, and provenance subject matter IITs. In some embodiments, use of such component IITs may be controlled by users and/or their respective computing arrangements selecting one or more such component IITs based on their perceived usefulness as information elements, for example, at a given point in an REAI identification information usage process set. Such navigation may involve a user "stepping back in time and event/activity sequence" through a primary and contextual subject matter's one or more provenance IITs to review at least a portion of their provenance IIT information (e.g., to review next-step-back one or more provenance subject matter instances' respective IITs). Such a framework for stepping back to review "earlier" subject matter provenance IITs allows users to inspect/investigate the sources/background of REAIs. Such an arrangement can include the identification of, and the selection of, a current subject matter's source/background REAIs enabling the reviewing of such REAIs' respective provenance-component subject matter IITs that are provenance subject matter historical instances of the current, primary subject matter and are ordered in a framework ranging from "higher" (starter/current) level, back through one or more "previous" provenance levels/ steps. Such a framework can in part be represented by subject matter provenance relationship mapping, which can provide visual representations of a first level subject matter (a starting subject matter, e.g., the user's focus subject matter, such as a composite: document1/author5) set's background by visually representing the names/relationships of background provenance subject matter instances (may, for example, also selectively or generally include certain subject matter related attribute information) and enabling subject matter associated IITs to be selected and reviewed, and/or employed in filtering and/or other arrangement/analysis of first level subject matters.

In some embodiments, an EBInet device arrangement AFSD owner and/or user may initiate their contemporaneous biometric identification process set to create one or more securely maintained and employed IISs that may respectively represent differing sets of such owner and/or user attribute elements, such differing sets of attribute information elements comprising information sets employed for differing purposes, where differing information elements are relevant and/or required for computing activities of one or more RD and/or RUS arrangements.

In some embodiments, one or more of a stakeholder, user, organization, EBInet device arrangement, network service, standards body, and/or specific one or more registered group of device and/or service arrangements, may specify/require that an IIT becomes invalid, for example, if an RCFD device carrying/providing an EBInet IIT composite arrangement (a) leaves a particular geographic area, such as a building, (b) loses GPS, Wi-Fi, Bluetooth, and/or other one or more zones or other area location data/connection type availability, or (c) remains outside such an area for more than a specified time interval. This capability could, for example, allow a user's identity, as represented by such a token, to be considered trustworthy only while inside a particular building, or, for example, trustworthy with respect to particular respective one or more purposes and/or systems. Such specified token may include rules wherein a user and/or user's EBInet device arrangement is securely notified to take further action, such as initiating an RCFD smartphone or other smart device based, biometric identification process set, and/or otherwise performing and/or accessing sufficient to context further identification information one or more sets.

In some embodiments, to maintain minimum attack surface and maximize cyber security defense, EBInet device arrangements may communicate solely with secure other EBInet arrangement components. In some such embodiments, such secure other system components may include components of EBInet compliant network administrative, cloud one or more identification information, and/or purposeful computing, services. In addition, EBInet standards and/or platform one or more bodies can, for example, require compliance with standards' requirements, and/or such bodies may certify and/or provide (and may require use of some or all) EBInet compatible software and/or firmware version updates, security enhancements, and/or other updates and/or patches. In some embodiments, EBInet inter device arrangement communications may use the TLS protocol and/or the like and employ device certificates and an associated computer security certificate hierarchy (to support a chain of trust).

In some EBInet embodiments, an EBInet system can employ both unique to human individual public, and securely maintained (e.g., encrypted) private, identifiers, where a subset of such identifiers may be public and broadcast to, and/or be responsive to, identifier information requests from, EBInet device and/or service arrangements and/or the like. Such broadcasting and/or requesting of identifiers can, for example, enable EBInet forwarding and/or receiving devices to announce their presence and/or respond to the presence of, and/or a request for, (a) device and/or service arrangement, and/or (b) device and/or service arrangement stakeholder person (e.g., stakeholder agent) and/or user, at least in part biometrically based nearly existential or existential quality identification information set. Such broadcasting and/or requesting may be directed, or otherwise constrained, to EBInet compliant device arrangements having one or more certain group unique identifiers and/or specific, descriptive one or more characteristics (e.g., identity attributes), such as a unique group identifier and/or attribute identifier, such as a quality to purpose trustworthiness rating of 9 out of 10 and/or one or more specified testable facts (e.g., PERCos effective facts), such as belonging to a group registered with an administrative service, such as being a doctor belonging to the AMA. Such identification information set may be, at least in part, publicly available, and may be at least in part biometrically based, and employ, for example, near-existential or existential quality authenticated/authenticatable (e.g., against securely stored, registered) identification information, where such information, for example, includes person specific, unique identifiers. Such broadcasting of a unique identifier and associated identification information can publicly establish/stipulate such broadcasting person/device arrangement's presence, for example, by communicating such information to a receiving/listening person/device arrangement. In some embodiments, such person/device receiving/listening (e.g., where such information is received and decrypted) may, for example, only be performed by specifically identified EBInet compliant device arrangements and/or by members of one or more specified uniquely identifiable, groups and/or persons, where such device arrangements can decrypt received such identification information.

Communication related activities, such as broadcasting availability of, forwarding of, requesting of, and/or receiving of, device arrangement and/or device arrangement stakeholder and/or user person at least in part nearly-existential or existential quality biometrically based identification information, in some embodiments, can take place between a device arrangement and one or more groups comprised of member EBInet device/person arrangements, such one or more groups having been registered (including, for example, using biometrically based identification information of group member devices' stakeholder owners and/or users) with a central, for example organization administrative, and/or cloud service and/or EBInet platform authority. In such an arrangement, the broadcasting initiating device arrangement can declare it is, for example, DX123!-#4979237017 representing/identifying device Y/person X entity, an owner and/or user person and corresponding EBInet RCFD comprising a NIIPU modular component arrangement embedded in a parent smartphone, in this example such RCFD having a trustworthiness rigor level of 9 out of 10. The DX123!-#4979237017 identifier may include and/or securely reference a secure token, such as an EBInet IIT, that stores one or more contemporaneous user communication cryptographic keys, where in some embodiments one or more of such keys at least in part are based on and/or securely bound to such RCFD's nearly existential to existential quality stakeholder or user person contemporaneously acquired, carried biometric identification information. Such contemporaneously acquired biometric identification information can be, for example, acquired through the use of an AFD, such as by using an AFSD each morning to acquire a contemporaneous existential biometric identification information set. Such biometrically acquired identification information can then be used during the day for event/activity identification purposes, for example as the person identifying portion of an EBInet fused-identity entity information set. When acquired, and/or when received, by an EBInet arrangement, such biometric information set and/or fused-identity IIS can be communicated to and registered with an administrative authority (such as an organization and/or cloud, service arrangement) for subsequent use in resource and/or event/activity related IIS authentication and/or suitability determination process sets.

In some embodiments, EBInet compliant device and/or service arrangements with which an EBInet compliant device arrangement seeks to communicate can be one or more device and/or service arrangement members of a registered group where members can securely store other member public (and/or in some embodiments, private) identifiers and/or identification information set instances. Such members and/or respective member service arrangements can authenticate such instances, e.g., by having stakeholder persons (e.g., administrators and/or other administrative agents) respectively sign such instances, using, for example, such stakeholder persons respective CBEIISs or, for example, their RCFD/person CIISs. Such an authentication arrangement can use securely stored contemporaneous (and, for example, maintained securely as currently valid for certifying/encrypting for a specified time period and/or other condition using, for example RIIPU and/or NIIPU arrangement secure clocks) such persons' respective near-existential or existential quality at least in part biometrically based identification information. Such identification information can be stored along with associated secure tokens for the purpose of, for example, authorizing process initialization. Such embodiments can support EBInet compliant devices wirelessly broadcasting identification information sets respectively stipulating their presence (and/or responding to broadcast requests for identity information), such information for use by other systems, including, for example, other EBInet compliant device arrangements.

In some embodiments, the identification of an EBInet identification information forwarding device arrangement with which an RD arrangement is attempting to communicate/interact may cause a process set involving encrypted and/or otherwise protected identification information exchanges between such EBInet device arrangements. In such embodiments, such device arrangements' highly securely maintained security key based tokens and any associated current clock information (e.g., for token expiration information) can be used to mutually authenticate such device arrangements, where such authentication may, at least in part, enable such EBInet arrangement interactions. Such exchanges can be based upon EBInet device arrangement registered (e.g., with a network administrator and/or cloud and/or platform service) group membership represented by one or more tokens and/or by appropriate (authorized to communicate) group interaction class one or more tokens. For example, one of a device arrangement's one or more IITs may specify (for example, using a PERCos effective fact) that such device arrangement belongs to a national bank group as registered with the U.S. government, while a user specific device arrangement's secure token may specify that it has a registered bank account at such specific bank (for example, also using a PERCos effective fact). Such device arrangements, based, for example, on the real-time (i.e., current time) of such a device interaction activity, and the group security key one or more attributes specific to each participating such EBInet device arrangement, employ pseudo-random generated specific one or more keys to enable secure, e.g., encrypted, communications between such interacting compliant device arrangements. Further, interaction key pairing may employ changing encryption (e.g., using added, pseudo-randomly, algorithmically generated data sets) for communication among EBInet arrangements to prevent copying and replaying of contemporaneous identification information—that is, shared secret information may continually adjust according to, for example, unfolding current time, so that such copying of one communicated identity information set does not present a risk for misuse at one or more different times. Further, such secure communications may use group identification secret key and/or related (e.g., token) information to uniquely identify communicated information as between, for example, two specific/specified EBInet device and/or service arrangements so that such communicated information may not be replayed or otherwise used in communication between differing (in part or whole) device and/or service arrangements.

In some embodiments, EBInet device arrangements, e.g., acquiring, carrying, using, forwarding, and/or receiving device arrangements, and/or EBInet network (e.g., organization, other grouping, and/or platform administrative) services, may employ different encryption keys for different functions, where a plurality of different cryptographic layers can be employed to protect the same information set in order to increase the protection of associated data and where hardware tamper resistant processing and memory is supported by EBInet compliant secure modular components, such as NIIPUs. For example, communication between EBInet device arrangements and/or EBInet network services may employ a secret information set for encryption, where such information set may be used to communicate distributed EBInet device arrangement shared secret information to generate keys/secret information, such as tokens, using operatively unpredictable (e.g., pseudo random) generation services. Such shared secret information may, in part, be employed to securely, mutually exchange information comprising a temporary shared secret set. Such temporary secret set can be used with:

1. highly secret, one or more time related, securely stored, "vaulted" group shared secrets, and/or
2. one or more vaulted platform shared secrets such secrets providing instructions to a hardened tamper resistant EBInet device arrangement's unpredictable secret information generator (e.g., may be found in a modular component NIIPU) for key production.

Each EBInet device and/or service arrangement, and/or device and/or service arrangement group, may employ unique to such device arrangement and/or group key/secret information/token one or more sets for identification information and/or subject matter encryption and related operations, and may use different keys for different identification information types (e.g., name of person, uniquely expressed (e.g., alphanumerically) identifier, effective fact, time of process and/or event/activity, and/or the like) such that use of more frequently used keys, such as for alphanumerically expressed identifier encryption, do not increase exposure of what might be more sensitive information. For example, in some circumstances an effective fact and/or nearly existential and/or existential quality at least in part biometric identifier, and/or, if acquired by an EBInet system arrangement, for example, a social security and/or bank account number and/or an at least in part associated alphanumeric password, should be encrypted using different respective keys.

In some embodiments, secret cryptographic keys and/or other secure computing secret related information may be securely registered as associated with contextual purpose approximations, where, for example, grouped person, device, and/or service arrangements' respective securely associated grouping secret information (e.g., secret one or more group identifiers), and/or purpose securely associated secret information and/or related information, are used at least in part as input to, for example, pseudorandom number generators to enable unpredictably generated, operatively simultaneous, and/or in compliance with specification, contemporaneous, EBInet inter-device/person arrangement communication keys and/or encryption. Such an implementation can support group and/or purpose unique, temporarily secure, cryptographically protected, communication of REAI identification information. In such an embodiment, if data is "sufficiently" encrypted, a system can employ an "unsecure" channel since the data conveyed through the channel is uninterpretable in encrypted form as it moves through the channel and before it enters a secure processing arrangement that can decrypt one or more portions of such protected data. In addition, or alternatively, such data passing through an unsecure channel may be cryptographically signed, and while it may be interpretable upon inspection, and it may be modifiable, it can be declared to be not genuine (e.g., not to be used and/or trustworthy) upon its receipt by analyzing cryptographic signing information, including, for example, such data's securely bound near existential or existential person(s)' at least in part biometrically based identification information, to assess authenticity of a received information instance.

In some embodiments, an EBInet receiving device is any component that can receive and employ cryptographically-protected person (e.g., person comprising stakeholder owner and/or user, and/or device non-stakeholder user, and/or CertPer) and/or REAI/person composite, identification information, maintained and communicated by an EBInet acquiring and/or carrying device arrangement. Such identification information can be employed by an RUD and/or RUS arrangement for use, for example, in a secure publishing event involving associated (a) at least a portion of such person at least in part biometrically based identification information, and (b) at least in part encrypted, securely bound REAI cryptographically signed other characterizing/identifying information, where such publishing can, for example, produce a composite identification information set (such as a secure PERCos formal resource/person published information set), such set employing contemporaneously acquired near-existential or existential quality person at least in part biometrically based identification information. Such information may be used to support decisions regarding the fitness (e.g., trustworthiness and/or other suitability evaluation) of an REAI as a component set of a computing environment user set's event/activity. Such fitness evaluation can be based, for example, at least in part upon one or more attributes of an assiduously identified REAI associated person, and for example, performed to satisfy (and/or otherwise contribute to satisfying) a user specified purpose. In some embodiments, a fundamental characteristic of each EBInet identification information set carrying device is that it is trusted, not only by its owner and/or user, but by an EBInet system arrangement as a whole and/or in accordance, for example, with an EBInet system's grouping by rigor level specified one or more groups' respective security requirements based upon one or more specification criteria. Groupings' respective associated rights management stipulating/enforcing rules and controls, may be stipulated by one or more affinity groupings, for example, ACLU, UAW, and/or other organization or affinity arrangement such as a corporate grouping (e.g. Boeing's technology development department and/or a project network of parties (suppliers networking with Boeing for a given project, such as a plane's development and/or manufacturing)), and/or government group arrangements such as US Department of Justice internal network one or more arrangements for a given case or other "project". Such grouping arrangements rights management information may, in some embodiments, securely specify EBInet device arrangement project compliance requirements, and/or project participation/rights authorization information, as securely associated with device and/or service arrangement, and/or device and/or service arrangement stakeholder and/or user. Such authorization and/or rights information can securely employ locally and/or network based registered, at least in part nearly existential or existential quality identification information and/or information securely derived therefrom, and where rights and compliance requirements may be expressed through the use of secure (e.g., cryptographically protected) tokens such as IITs.

In some EBInet embodiments, secure modular component implementations may support one or more of:

- Multiple carrying and forwarding device arrangements that can provide different levels of trustworthiness rigor (in general and/or as to contextual purpose and/or other contextual variables (e.g., location, time and/or date, etc.)) and/or operate in a multi-factor mode, such as carrying and affirming the same and/or otherwise operatively equivalent biometrically based stakeholder identification information sets acquired using differently implemented arrangements. An EBInet arrangement, for example, may support a user's set of devices to operate in concert (e.g., separately performing redundant or overlapping one or more operations, and testing to verify that such operations produce the same and/or otherwise logically related results) and provide higher rigor, e.g., multi-factor rigor, than may be available through the use of a smaller set of such devices (e.g., one device). Such a multiple device arrangement can respond to inconsistent device identification information results (e.g., by halting or otherwise restricting one or more operations and/or notifying an administrative arrangement of such an anomalous result set). Operation of multiple IIS carrying devices in concert can reduce the risk of subversion of identity information and/or identity related functions, as all such devices would have to be compromised concurrently for an attack to be successful,
- Independent, secure and carried (e.g., embedded and/or otherwise securely operatively associated) device modular components that respectively rely on electrical power from parent, modular component containing devices, and/or can maintain their own power through local, for example, rechargeable batteries, and/or can rely on power provided by wired or wireless (e.g., NFC, Qi) communication interfaces,
- One or more time limits for authentication tokens (e.g., IITs, which may be in EBICerts), and/or other secure time event/activity functions, such time limits managed through use of, for example, an RCFD's modular component NIIPU (and/or an AFD's RIIPU) arrangement, where timing information is securely provided by an on-board tamper-resistant hardware trusted clock operating within, or operatively securely associated with, a NIIPU's (or RIIPU's) tamper-resistant, protected processing environment arrangement, and where such clock in some embodiments may employ a NIIPU (or RIIPU) based battery arrangement for providing clock (and/or NIIPU or RIIPU) power and/or backup power. Alternatively, and/or in addition, a secure EBInet carrying and forwarding device arrangement can employ secure network-based infrastructure one or more services to at least in part provide, and may also verify against NIIPU (and/or RIIPU) provided time to ensure, secure valid time for use with one or more NIIPU/RCFD (and/or RIIPU/AFD) functions (e.g., identification information related event/activity management, such as IIS communication and/or publishing governance). Such one or more clock related services can be provided independently of other EBInet functions, so as, for example, to provide a tamper resistant, minimal attack surface and communication overhead, and Independently-protected carrying and forwarding device arrangements such as NIIPUs that may have little (a minimal) or no user interface or may at least in part employ a user interface that operates on securely associated one or more smart device arrangements (such as a securely registered and securely paired and/or otherwise grouped/integrated with one or more, EBInet compliant smart device arrangements). Such compliant smart device arrangements can include, for example, a smartphone, smartwatch, tablet, laptop, and/or the like. A carrying and forwarding EBInet device arrangement that is worn, such as an EBInet compliant wristband or a pendant device arrangement, can, in some embodiments, provide a minimal interface for EBInet identification information set related functions. Such a minimal interface can employ, for example, an LED and one or more function control buttons, or such a modular component EBInet device may be integrated into a memory card, or be embedded within a host device, and may not be accessible to a user via a user interface, and may not present any interface except that which may be made available by an EBInet compliant device arrangement. Such an interface can operate on a modular component arrangement that is embedded in a parent carrier device arrangement and may, in some embodiments, use, at least in part, the host (i.e., parent) device's user interface for interacting with a user to present information and receive instructions, such as broadcast an IIT. Such a modular component interface arrangement may use, as appropriate, one or more parent device and/or separate modular component drivers, such as a keyboard, mouse, trackpad, and/or display driver, and may further use parent device interface arrangements such as keyboard and touch screen, and NIIPU interconnecting communication circuit line(s).

11 Technology Components in a Computing Arrangement/Apparatus/Device of an EBInet Device and/or Service Arrangement The following describes technology elements that may be employed in a computing arrangement/apparatus/device of an EBInet device and/or service arrangement in accordance with some embodiments. FIG. 63 is a non-limiting illustrative example of some such technology components of an EBInet device and/or service arrangement.

It is understood by those familiar with the art that the system described herein may be implemented in hardware, firmware, and/or software encoded on a non-transitory computer readable storage medium.

It is understood by those familiar with the art that an embodiment may also be used with non-EBInet devices, a non-EBInet resource, and/or in conjunction with other EBInet embodiments, and any such embodiments may include, but are not limited to: cloud services, web information stores, people (cross edge), plug-ins, networks, and/or the like, including meta-computing arrangements involving diverse independent resource nodes and types (e.g., large number of independently controlled nodes).

EBInet device arrangements may, in different implementations, comprise one or more hardware device component elements, and plural such elements may comprise operatively remote device arrangement respective collections of hardware component elements that cooperatively enable one or more EBInet functions of a given device arrangement's functions, such that in some embodiments, one or more such EBInet device arrangement components may be operatively distributed and at least in part connected by secure network (wired and/or wireless) interfaces. EBInet device and/or service arrangement embodiments may employ one or more processors, processor memory (e.g., random access memory), storage medium(s), and network interfaces, and such device and/or service arrangements may function, for example, as AFDs, RCFDs, RUDs, and/or RUSs. Such embodiments may, as applicable, employ one or more of the following: secure tamper and inspection resistant modular components such as NIIPUs and RIIPUs and/or other PPEs, mobile smart parent devices (e.g., smartphones), displays, SVCC seal arrangements, manual input arrangements, continuity (of presence and/or attachment) devices (bracelets, smart watches, and/or the like), dedicated battery, communication arrangements such as one or more of RFID and Bluetooth and WiFi arrangements, microphones, cameras, data input ports, speakers, secure clocks, pseudo-random generators, sensor and/or emitter biometric/liveness acquisition enclosures, and/or other components, and where the foregoing may operate with IoT device arrangements as monitoring and/or event/activity governing component, such as RUD/IoT, arrangements.

EBInet embodiments, such as EBInet device arrangements, may run, for example, a multi-tasking operating system and include at least one processor or central processing unit, such as, for example, a secure tamper resistant RIIPU and/or NIIPU that contains an identification information central processing unit/microprocessor, micro-controller, computational device, and/or circuit arrangement known in the art. Such at least one processor may be any central processing unit, microprocessor, micro-controller, computational device and/or circuit arrangement known in the art.

An EBInet device and/or service arrangement memory may be any memory (e.g., random access memory) known in the art; its display may comprise one or more visual display arrangements, such as a cathode ray tube (CRT) monitor, a liquid crystal display (LCD) screen, plasma display, projector, light emitting diode (LED) display, organic light emitting diode (OLED) display, touch-sensitive screen, and/or other monitors as are known in the art for visually displaying images, graphics and/or text to a user.

An EBInet device and/or service arrangement manual input device may be a conventional keyboard, trackball, trackpad or other input device (such as voice recognition arrangement) as is known in the art for the manual input of data, and its data input port may be any data port arrangement as is known in the art for interfacing with, and/or otherwise supporting, a user, such as a telephone, instant messaging, World Wide Web, and/or electronic mail, texting, and/or streaming interfaces. In some embodiments, a data input port is an external accessory using a data protocol such as RS-232, Universal Serial Bus (USB), or Institute of Electrical and Electronics Engineers (IEEE) Standard No. 1394 ('Firewire'). Such EBInet arrangement's network interface may be any data port arrangement as is known in the art for interfacing, communicating, and/or transferring data across a computer network, with examples of such networks and network-related technologies, including, for example, Transmission Control Protocol/Internet Protocol (TCP/IP), Fiber Distributed Data Interface (FDDI), token bus, token ring networks, and the like. Such an arrangement's network interface can allow an EBInet arrangement to communicate with other devices, networks, services (e.g., cloud computing arrangements), and/or the like. An EBInet arrangement computer-readable medium may be a conventional memory arrangement such as a magnetic disk drive, floppy disk drive, compact-disk-only-memory (CD-ROM) drive, digital versatile disk (DVD) drive, high-definition digital versatile disk (HD-DVD) drive, Blue-ray drive, magneto-optical drive, optical drive, flash memory, memory stick, non-volatile transistors-based memory and/or other computer-readable memory device arrangement as is known in the art for storing and retrieving data. Significantly, a computer-readable storage medium may be remotely located from a device and/or service processor set, and be connected to a processor arrangement via a network such as a local area network (LAN), a wide area network (WAN), over a cloud service, and/or the Internet. An EBInet device arrangement may comprise a distributed network of component device arrangements that together (for example in various combinations) perform functions described herein.

An EBInet sensor arrangement may include one or more electromagnetic sensors (e.g., photodiodes (e.g., avalanche photodiodes), CCDs, CMOS detectors, infrared detectors, photomultipliers, image intensifiers, and/or cameras) and/or audio, ultrasound sensors, chemical sensors, and/or other one or more sensor arrangement types. Such one or more sensor arrangements can be employed with emitters that, for example, comprise differently positioned emitters projecting applicable (e.g., may comprise different) frequencies, amplitudes, and/or patterns of electromagnetic radiation and/or sound.

The previous description of the embodiments is provided to enable any person skilled in the art to practice the disclosure. The various modifications to these embodiments will be readily apparent to those skilled in the art, and the generic principles defined herein may be applied to other embodiments without the use of inventive faculty. Thus, the present disclosure is not intended to be limited to the embodiments shown herein, but is to be accorded the widest scope consistent with the principles and novel features disclosed herein.

12 Some PERCos Concepts for EBInet Embodiments

12.1 Core Purpose, Contextual Purpose Expressions and Contextual Purpose Specifications In some embodiments, users may declare Contextual Purpose Expressions (CPEs) and/or other contextual purpose specifications to represent, at least in part, their purpose (s) for a given computing activity set and Stakeholders may employ such contextual purpose specifications as purpose specifications associated with resources and resource and purpose classification groupings. CPEs normally describe human purpose concepts in the form of lossy, relationally approximate, notional representations. Such representations are operatively used to identify resources that approximately align with user purpose fulfillment objectives, either generally/comprehensively and/or in the form of use as a component that can contribute to a given purpose fulfillment process. PERCos uses CPEs both to represent user and Stakeholder purpose related conditions/objectives, and also to characterize one or more purpose classes' instances that are associated with such purpose specifications, so as to operatively organize and optimize resource identification efficiency, particularly when dealing with vast and diverse data stores, such as Big Data or more encompassing Big Resource. In such circumstances, purpose classes may contain resource sets as members whose membership, in certain embodiments, are declared by resource Stakeholders and/or experts, with such membership being associated with any such resource and therefore such resource being associated with the one or more of the purpose classes' associated Contextual Purpose Expressions.

In some embodiments, such contextual purpose specifications respectively represent user and Stakeholder purpose concept approximations. In some embodiments, these approximations are specified to approximate user perceptions, user intent, and/or user classes. In certain PERCos embodiments, such contextual purpose specifications have, at minimum, at least one verb or verb equivalent representing user activity perspective and at least one category representing the subject upon which at least one or more verbs is conjoined, the set representing a Core Purpose CPE. Such Core Purpose CPE may be augmented by various other information sets. For example, in some embodiments, Core Purposes may be augmented by Master Dimension Facet conceptual approximation perspectives and/or by auxiliary Dimension information. In some embodiments, CPEs may be particularly useful in characterizing purpose approximation relationships of resources and in identifying purpose corresponding resource neighborhoods that may optimally support user learning, discovery, and/or experience purposeful processes and outcomes, where each such neighborhood is respectively comprised of resource members that share a common relationship with such neighborhood's contextual purpose expression/specification.

12.1.1 Verbs and Domain Categories

In various embodiments, Core Purpose specification capability through combining one or more verbs and one or more Domain categories is particularly useful in purpose approximation for similarity matching with Big Resource purpose classes, resource classes, and/or Big Resource resource instances and/or portions thereof. Users and Stakeholders use such Domain category specifications to focus on one or more verb and/or verb equivalent abstractions, such as learn, teach, purchase, sell, travel, consume, feel, want to swim, want to play, need to eat (and other want to and need to permutations and/or the like), work, design, share, collaborate, communicate, and/or the like, with an operatively appropriate domain category set, such physics, piano, chair, Chinese food, and/or the like. Such domain category specification can be supported by generally known and accepted category organization information arrangements such as Domain category classes, whether inherited and/or relational and/or some combination thereof, and/or alternative information structures such as another ontology design or lexicon set. Such system sets with some embodiments represent expert (and/or authority, such as standards body) logically structured category information structures available for user and/or Stakeholder evaluation and/or selection, such as when proffered as a choice set by a faceting interface for specification of a Core Purpose and/or other CPE.

Domain category selection supports user and Stakeholder expression of interoperably interpretable, standardized Core Purpose and other CPE specification processes, as well as in some embodiments supporting similarity matching operations between user purpose expressions associated with any domain category specification set which may be absent verb sets, that is absent Core Purpose set specification, and where, for example, verb sets are inferred from other context, history of like category user activities, and/or the like.

Verbs and verb equivalents may function as key elements in the specification of purpose, since they express intent generalizations that can be associated with "things," such as PERCos domain categories. In some embodiments, verbs may be organized into lexicons to provide users/Stakeholders with one or more languages to effectively identify and/or express their respective purpose approximations. In some embodiments, such lexicons may be significantly limited in quantity to comprise, for example some tens of verbs such as approximately forty, eighty, or one hundred twenty; in some other embodiments, verbs may be limited to hundreds of verbs as a constrained verb vocabulary. This limitation of available verbs may be implemented in support of approximation learning, standardization, interoperability, efficiency of operation, and/or ease of use of user of at least a portion of a PERCos embodiment interface and/or ease of user understanding and/or use of, and/or relating to, verb specification options. Such limiting of verb choice variety to, for example, optimize standardization, interoperability, simplification, and/or purpose expression approximation may be presented for specification purposes, for example, as a capability of a faceting interface, whereby for example, a finite list of verbs is presented to a user or user group as a faceting scrollable option list, and for example, where such finite list may be visually expanded by, for example, cursor movement over a given verb to display a list of its operative synonyms, where such synonym list may form a verb purpose class perspective simplification associated with such given verb. From such a faceting constrained list, for example, a user may, select one or more verbs and associate these by then using other aspects of such a faceting interface to view domain category list(s), including any subsequent category refinement lists, for noun selection. Since learning and discovery are often concerned with arriving in a resource neighborhood comprising suitable or best practically available resources to support user purposes, constrained verb lists may provide highly effective approximate conceptual perspective positioning when conjoined with domain category information.

In some embodiments, verb set lexicons may comprise verbs that have associated classes with members comprising other associated verbs, for example verb class "Learn" may comprise members "Understand", "Train", "Educate", "Absorb", "Study", "Master", "Familiarize" and/or the like, which may comprise purpose approximation simplification conceptual perspective synonyms, where, for example, the use of the word "Learn" effectively stands in for its approximate synonyms.

12.1.2 PERCos Similarity Matching Processing

PERCos similarity matching processes may in some embodiments support two or more stage similarity matching sequences, where, for example, one or more purpose class and/or other purpose neighborhood sets are first identified, then another similarity matching sequence is started automatically or on instruction of a user set. For example, when PERCos Master Dimension Facets are used by users as a conceptual basis for selecting, and/or for specifying, a CPE set which is then intended to be used in a multi-step matching operation sequence, Master Dimension Facet information can, for example, first be used for similarity (including for example, directly) matching with purpose class sets and/or other calculated neighborhoods containing resources declared as members by Stakeholders such as publishers and/or Repute Cred assertions. In some embodiments, this may be followed by further identification, prioritization, evaluation, selection, combination, and/or provisioning applied to all, or a selected germane subset of, members of such identified purpose class and/or neighborhood set. For example, further purpose expression and/or related information, for example from auxiliary Dimension and/or other embodiment Dimension information and/or from user, user group, and/or crowd related purpose expression related profile, preference, historical behavior, and/or the like information, may be employed so as to identify, filter, prioritize, evaluate, compound, and/or otherwise process all or a portion of information regarding members of a purpose class and/or neighborhood set, where such second or more stage similarity matching involves matching against metadata and/or constituent data of such resources, for example in the form of indexed and/or relational database stored information. The foregoing may, in some embodiments, enable users to perform more detailed and/or nuanced characterization of their purpose set which may be performed efficiently on the constrained set of resources comprised of, for example, first stage purpose class and/or other neighborhood results. This means that such auxiliary Dimension information employed with user purpose expressions may provide, for example with some PERCos embodiments and under some circumstances, unstructured, non-standardized Dimension information that would be impractical or inefficient to employ with Big Resource (or other large, distributed information stores), but with the highly constrained interim result set following determining a purpose class or other neighborhood set, would now provide practical, efficient further parameters for use in evaluating, for example, metadata indexes and/or the like, to arrive at a more precise, less approximate, result set. Such two (or more) phase processing may be performed in a manner transparent to users, but provide users with the powerful benefits of purpose related standardized approximation processing followed by further evaluation using unstandardized (that is not PERCos standardized expression elements) and/or partially standardized, for example, auxiliary Dimension information. That is, some PERCos embodiments, for example, may employ a segmentation of user set CPE and/or Purpose Statement, for example, a set of Master Dimension information, for a first matching set, followed by auxiliary Dimension and/or related information (such as preferences, profiles, crowd, and/or history related) for a second matching process (and which second set matching in some embodiments may be augmented by Master Dimension information in contributing to calculating the evaluation, such as for a prioritization, of a member set that may result, at least in part, from such first matching process). In such embodiments, this further matching, when using, for example, auxiliary Dimension information, may employ non-standardized elements, but since the group of resources to be analyzed is now a greatly constrained set resulting from, for example, a first matching process, in contrast to Big Resource or other large, diverse information stores, such further matching process, for example involving Boolean open text expression, can now be practical and efficient since the focus is on a specific resource neighborhood set calculated to appropriately correspond to a user set purpose approximation specification set.

12.1.3 Dimensions

An REAI arrangement may be organized according to a set of purpose characterizing, simplification structures, called Dimensions. Each Dimension comprises a set of values, which in some cases, may be ordered.

In one or more PERCos/EBInet embodiments, Master Dimensions and/or their associated Facets can be used to generate subspaces of an REAI identification information cosmos, each of which can have its own set of structures as well as the structures inherited from its parent space.

A Dimension is an expression structure representing an organizational subset of purpose expression contextual specification and approximation. In some embodiments, Dimensions may have standardized, interoperable expression Facets (e.g., subclasses of Master Dimensions) for efficiency, understandability, interpretability, and/or interoperational consistency. Such Facet set and selectable options may be limited to a set that has been pre-defined for the embodiment by a utility and/or other standards body set, and might in some embodiments be augmented, for example, by a Facet set that has been declared and published by experts or others independent of the standards body set, such as parties associated with a domain specific affinity group, such as a professional association.

In some embodiments, a relatively small number of Dimensions representing basic general forms of standardized specification groupings can be distinguished as Master Dimensions, which are logical major groupings of characteristics that may significantly influence, for example, user resource identification, similarity assessment, prioritization and/or other organization, navigation, filtering, provisioning, and evaluation. These basic specification types can function as key simplification concepts for user purpose expression understanding and organization, facilitating user and Stakeholder input and comprising basic high level expression types used in user and Stakeholder input specification.

Dimensions represent conceptually logical groupings of differing contextual perspectives and each Master Dimension has a limited number of standardized, easily interoperable and interpretable Facets. Dimensions in certain embodiments comprise a small set of conceptual familiar to user groupings, enabling users to easily "relate" to user purpose enhancing key Dimension characteristics. In one embodiment, PERCos supports five primary Dimensions: Core Purposes, user, resource, Repute (assertions, et al.) and symbols.

Dimensions beyond Core Purpose may be used to great effect, for example, in Contextual Purpose Expressions as further specification of user purpose(s) beyond that initially specified by one or more Core Purposes. Dimensions have a wide and flexible applicability, and can help reduce user expression and navigation complexities by providing logical grouping values for similarity/matching, prioritization, and navigation and normally providing approximate contextual summary attributes that contribute to relational computing and help users relate and translate user classes and concepts to computing declared classes. These features are widely applicable and can serve both to orient users within an REAI arrangement cosmos and to assist them in retrieval, learning and edification, and navigation and exploration.

Master Dimensions are comprised of Facets and any associated specified values. In some embodiments, these Core Purpose logically complementing Master Dimension groupings may be comprised of, for example, the categories of users; resources; Reputes knowledge/expertise/opinions assertions and Effective and Faith Facts regarding resources; and special Facets (e.g., icons and/or other symbolic or short-hand notions representing any Master Dimension and associated values expression set). Such Master Dimension Core Purpose and Dimension Facets are used to express purpose approximation components that, when combined with Core Purpose specifications, can be used for identifying, evaluating, determining, prioritizing, combining, and/or provisioning resource instances and/or neighborhoods and/or their members, such as, for example, identifying and provisioning for user inspection, for example through similarity matching and prioritizing, most relevant one or more purpose classes, resource members sets, and/or resource instances (when not calculated after determination of class, neighborhood, or other grouping membership).

Core Purpose and Dimension Facet generalizing features may function, for example, as concept simplification vectors or axes corresponding to human conceptual purpose factors, such as, in an example, a verb representing a dynamic orienting user perspective factor such as "learn", a category representing a thing, type, and/or place such as "biochemistry", a user characteristic relative to a Contextual Purpose Expression describing user expertise/sophistication, such as "moderate" (versus beginner or expert), and a resource characteristic relative to a Contextual Purpose Expression describing a resource, for example, as "complex" (versus simple or medium, and for example, describing the complexity of material relative to a sophistication level). Together, these approximation simplifications may be treated as axes used for similarity matching with, for example, comparable purpose expression information associated with purpose expressions and/or class index sets, resource sets and/or resource class index sets, and/or the like.

12.2 PERCos Resources

PERCos resources may be provided in some embodiments, for example, in several different forms, for example: Formal resources, Implied resources, Ephemeral resources, and Compound resources (multiple of these forms may apply to a given resource instance and/or resource class, either as to one or more parts and/or as to the whole).

A Formal resource is, at minimum, comprised of (a) a persistent, operatively unique identity (e.g., should not be ephemeral or intentionally temporary and unreliable as an identifier, along with any enforcement of this criteria depending upon the embodiment), (b) a subject matter that is the processing and/or processable material (including, for example, a human's descriptive information, and which may, for example, include how to initiate contact, or use, such a human, for example, as a resource), (c) a formal publisher set (named, or otherwise identified as may satisfy a rule set, including having a persistent, operatively unique, identifier, for example, as above) for such resource, and (d) at least one associated and context providing purpose expression such as a CPE, except in embodiments employing at least in part Core Focus instead of a purpose expression set. Such Formal resources may contain or otherwise reference other descriptive metadata, such as author, provider, language, interface, user and/or other relevant person set usage history (for example generally and/or as associated to one or more purpose expression, participant, association with other resources/resources, sets), and/or any Repute information as described as a capability of a PERCos embodiment, or, for example of publisher, creator, provider and/or the like sets, for example, including associated use of Effective Fact and/or Faith Fact sets. Formal resources are published, including registered, through use of an identity schema arrangement supporting plural, independent parties as publishers, wherein such schema arrangement provides information constituting and/or is otherwise employed as at least a portion of a persistent, operatively unique identity for such resource. Such registration schema may be at least in part managed, hosted, and/or otherwise controlled by one or more cloud services and/or standards organizations.

Formal PERCos resources are persistently associated with at least one identity, where an identity is operatively associated with at least one resource interface arrangement. A resource interface arrangement can provide sufficient information to validly invoke operatively associated methods of a resource instance. Common kinds of values that may be named include data/contents, and/or specifications for such data/contents, hardware, devices, processes, software/applications, and/or networks. PERCos resources are identifiable elements within, or accessible to, a PERCos system that may directly participate in computer processing operations, including data, software, a service, firmware, hardware, a device, a person, and/or a combination of the foregoing resources in PERCos arrangements. PERCos resources may be organized, managed, and/or deployed through the use of purpose, resource element (e.g., purpose class applications and other Frameworks, Foundations, Domain related and/or the like), and relevant human ontologies and class structures, facilitated by other information, such as metadata and/or purpose expressions that may be associated with PERCos elements.

12.3 Creds and Effective Facts

Repute has three main specification groupings, Effective Facts, Faith Facts, and Creds. EF specifications contain "ascertained" and/or otherwise contributed factual assertions regarding a subject, such as the date a person was born or an institution's assertion that an individual is an employee.

Creds are Repute expressions that comprise, at a minimum, assertions/opinions about a subject (i.e., an item) regarding such subject's value (e.g., by quantification) in fulfilling, or otherwise contributing to fulfilling, a purpose specified as a contextual purpose expression.

Some PERCos embodiments treat an expression of a subject characteristic as a fact, not an assertion, when such expression was made by a party having specific and convincing authority to declare a fact, such as an EF or FF, regarding a subject. Such interpretation of topic and/or other assertion characteristic(s). By contrast, Creds represent assertions that may be generally recognized, or for example, disputed, and are expressed opinions regarding subjects and such assertions are not demonstrable as facts by reasonable testing. EFs, FFs, and Creds may be deployed according to reliability levels. Reliability levels can inform user(s) and/or associated computing resources (such as an operating PERCos session) as to whether a given degree of specified reliability satisfies either preset and/or current session rules and/or other criteria as to specified reliability. For example, in some embodiments, a user may be presented with the option to select from levels 1-10 reflecting the underlying level of EF or FF fact testing, such as related security procedures and/or the representing assessed (for example by a PERCos utility or other administering body) authorities' reliability in authenticating such facts. By contrast Creds contain and represent assertions, rather than settled or settleable facts; such assertions are made by one or more parties that have respectively, at least one persistent, operatively unique identity, and where such assertions do not rise to the level of a factual attribute set that was stipulated by a reliable, recognized unbiased fact related "authority" of sufficient reliability as to the fact, at least under certain conditions.

Creds and Effective Facts, in some embodiments, can form, for example, filtering "vectors" that complement PERCos Core Purpose and other purpose expressions. They provide further, and in certain embodiments and/or circumstances primary, filtering and/or prioritizing input. In part as a result of the use of standardized purpose Repute expression specifications and related values reflecting factual and/or assertion characteristics of Repute subjects, Repute variables provide input for the calculation of results that can most closely correspond to, and/or otherwise implement and/or optimize, results related to the objectives/purposes of CPEs and any associated preferences, rules, relevant historical information, and/or the like.

EFs and Creds and associated PERCos processing arrangements, in some embodiments, employ security tamper resistance technology, such as encryption encoding, secure digital rights management for secure rules governance, hardware tamper resistant processing and memory space for decryption and/or rules processing, and/or the like, the foregoing to help ensure that their respective fact verification and assertion information reliably represents their original published states.

Cred and EF subject matter, in some embodiments, have unique identities. Such identities can be important in ensuring that assertions and fact declarations are associated with the proper locater subject identities in order to facilitate proper, explicit, unique identification of a subject matter instance so that Cred assertions and EF fact declarations can be appropriately organized, aggregated, analyzed, and are properly associated, as may be desired for example, with CPE, purpose, Domain category, and/or resource, instances and/or classes and/or the like. Such unique identities help ensure that parties may, as desired, comment reliably on the intended subject matter and that it appropriately corresponds to the subject matter specification of the corresponding Repute Cred or EF.

Some PERCos Cred embodiments may be organized as:

1. A Cred may have one primary operatively unique, identified subject matter regarding which an asserter is making an assertion, such as "Oxford Shorter English Dictionary" "Microsoft PowerPoint for Mac", "Wild Caught Salmon", or "President Bill Clinton". Many such instances can readily be identified more specifically by providing a unique naming identity for specific resource product, or for example, a PERCos disambiguation web service, for example, could provide assistance to a user set, such as providing a drop down suggestion list or other faceting list interface providing context specific appropriate specific options and/or clarifying category instances for users to select, for example, "Microsoft 365 PowerPoint for Mac, Version 16.60", with the service providing the explicit Microsoft (or other party) unique identity for such specific product by inserting it into an appropriate Cred item information space in, for example, a PERCos compliant form.
2. A Cred has one asserter, an aggregate Cred has a plurality of asserters, a compound Cred has a plurality of Creds (at least information wise, but may not be stored as discrete, individual items) and may or may not have a plurality of asserters. An asserter may be an individual person, a group of persons acting as a named group such as a club, or another form of organization such as a corporation, government, or the like.

3. A Cred, or aggregate Cred, or compound Cred, has a Stakeholder publisher set, but in some embodiments if publisher set is the same as the asserter set, it may not need to be separately stored or indicated as such.
4. A Cred, or aggregate or compound Cred, may have a provider set as well as a publisher set, but in some embodiments if the provider set is the same as the publisher set or asserter set, it may not need to be separately stored or indicated as such
5. A Cred has as its subject a resource section including at least one identified resource that is persistently identifiable (may be a PERCos or non-PERCos resource), and further it has a resource set associated at least one CPE and at minimum, at least one Quality to Purpose, Quality to Value, or like standardized Repute assertion type, with the association of an interoperable interpretable value, for example, a user definable value, for example a 17 on a scale of 1 to 20. For convenience, in some embodiments a Cred may have multiple resources as subject contents, but only one CPE by which each resource is assessed as to its Quality to (that) Purpose. Plural Creds may be published in a compound Cred, which may be organized by a purpose class arrangement and/or other ontology set.
6. A Cred may have one or more validation rule sets validating that such assertion set was made by such asserter set, such validation rule set employed to perform a Cred information validation unless, under some circumstances and embodiments, the Cred has a trust certificate, and/or the like, issued by such asserter set for each assertion and/or for each aggregation of such assertions, and/or such Cred has a certificate issued by a trusted party, all the foregoing in accordance with Cred rules for the embodiment and/or circumstance of embodiment use. Such same validation sets may be, in some circumstances and/or embodiments, applied to Cred publishers, providers, and/or other associated parties. Such use may include, for example, the selection by user and/or Stakeholder sets of a trust level associated with such Cred type and/or circumstance of use in PERCos processes, such as a Cred type level 5, in a 1-5 schema where 5 is the highest level of trust, and where such schemas may require either or both of a secure, encrypted hash certificate set for such Cred stipulation information issued by such publisher set and/or asserter set and/or provider set supporting a secured fact test procedure employing, for example, encrypted communications between a user PERCos arrangement and a trusted server operated by such respective one or more members of publisher, asserter, and/or provider set, whereby such fact or fact set and/or related information may be securely confirmed by such one or more Cred value chain participants.
7. A counterpoint Cred may include and/or reference a Cred where such counterpoint Cred was specifically formulated to correspond to such referenced Cred, wherein both such counterpoint Cred and such referenced Cred have said same subject matter set, either directly or approximately and where such counterpoint Cred employs the CPE set, either directly or approximately, of such referenced Cred, and further provides differing one or more assertions comprising a differing assertion set, and further providing information directly indicating, including some form of referencing, that such counterpoint Cred provides an alternative assessment of such referenced Cred. For example, in some embodiments, a counterpoint Cred will employ the same assertion Facet set, such as Quality to Purpose, but with a different associated ranking value, such as 2 out of 10 versus, in such an embodiment, a more positive 8 out of 10. Plural counterpoint Creds satisfying the conditions of an aggregated may be provided in counterpoint aggregated Cred form. Counterpoint Creds may be combined with their associated Creds in compound Creds.
8. A Compound Cred is comprised of multiple asserters collectively providing their assertions regarding the same Cred subject matter, but employing, for at least in part for a subset of such assertions, differing Facet sets and/or the same Facet sets but differing assertion sets regarding such assessment sets.
9. An Aggregate Cred provides one or more aggregate values for shared Repute Facet values such as combined assertion ratings (e.g., an average value such as 7 out of 10 for a Quality to Purpose Facet for "'Learning' 'General Reference Encyclopedia'" for Wikipedia).

A Cred may reference and/or include one or more other Creds that employ such Cred, and/or such Cred's asserter, publisher set, and/or provider set, as the subject matter of such other Creds. Further, a Cred may reference and/or include one or more EFs.

Some PERCos EF embodiments may be organized as:

1. An EF may have one primary operatively unique identified subject matter content that is stated as true or false based on its stipulation as a settled fact (e.g., John Doe is (or is not) a tenured professor at MIT). The subject matter can comprise a person or other item for which the subject matter content stipulates one or more attributes; in this example, it is stipulated that John Doe has an attribute of being an MIT tenured professor. An EF set may stipulate plural subject matter attributes of a uniquely at least in part biometrically based identified, e.g., at least in part near existentially or existentially identified subject matter item, such as a person named John Doe.
2. An EF may have plural subsidiary operatively unique identified subject matters that are individually stated as true or false based on their respective stipulations as settled facts, but each such subject matter comprises a subclass of the primary subject matter.
3. An EF may have one or plural, individually, at least in part biometrically identified stipulators, but such stipulator set is the same for each and every such EF subject matter stipulation. A stipulator may be an individual person, a group of persons acting as a named group such as a club, or another form of organization such as a corporation, government which may be identified by one or more organization human agents, or the like.
4. An EF has a publisher set, which in some embodiments may not need to be separately stored or indicated if the publisher set is the same as the stipulator set or not otherwise required.
5. An EF has a provider set, which in some embodiments may not need to be separately stored or indicated if the provider set is the same as the stipulator and/or publisher set(s) or not otherwise required.
6. An EF may have one or more validation rule sets validating that such assertion was made by such stipulator set, such validation rule set employed to perform an EF information validation unless, under some circumstances and embodiments the EF has a trust certificate (e.g., an EBICert) issued by such stipulator and/or stipulator set (e.g., issued using a CIIS identified person/device arrangement) for each assertion and/or for each aggregation of such assertions, and/or such Cred EF has a certificate (e.g., an EBICert) issued by a trusted party, all the foregoing in accordance with EF rules for the embodiment and/or circumstance of embodiment use. Such use may include, for example, the selection by user and/or Stakeholder set of a trust level associated with such EF type and/or circumstance of use in PERCos/EBInet one or more processes, such as an EF type level 5, in a 1-5 schema where 5 is the highest level of trust. Such schemas may require, for example, a secure, encrypted hash certificate set for such EF stipulation information issued by such validator and/or publisher set and/or a trusted agent and/or stipulator set and/or provider set supporting a secured fact test procedure employing, for example and as may be required in an embodiment, encrypted communications between a user PERCos arrangement and a trusted server operated by such respective one or more members of publisher, stipulator, provider, and/or associated agent set, whereby such fact or fact set and/or related information may be securely confirmed by such one or more EF value chain participants and/or an authorized, trusted agent.

7. An EF may describe an attribute of an EF subject wherein, for example, such EF attribute may describe a characteristic resource such as a resource's Stakeholder, for example, "John Doe (he is the subject) is a professor of physics at MIT", where such statement is a verifiable EF (e.g., securely testable subject matter fact statement testable using a specified, for example, standardized test/verification method).

12.4 Identity Firewalls and Awareness Managers

In various embodiments, PERCos Identity Firewall arrangements (IFs), comprise one or more tamper resistant, hardened hardware (e.g., a secure identification information chip or chipset arrangement) and/or software capability sets, for securely performing assiduous identification information resource authentication, governance, and/or auditing services. Such services include use of near existential and/or existential quality, biometrically based computing resource related attribute determination testing, and/or usage governance. Such Identity Firewalls employ external, security hardened biometric sensors and/or emitters to acquire near existential and/or existential quality biometrically based identification information data of human parties. Such Identity Firewalls and their associated, security hardened sensors and emitters ensure that one or more of their process arrangement functions are not inappropriately influenced and/or inspected/misappropriated as a result of instructions and/or other data introduced to produce inaccurate, unreliable, mislabeled, malicious, expropriated, and/or otherwise misusable, resource attribute information and/or such attribute information usage consequences. IF secure services can include, for example, IF biometric identification information sensor and/emitter data and process management using sensors and emitters packaged external to their respective IFs, resource identification information encryption and communication capabilities, identification information process and information misdirection and/or obfuscation capabilities, received identification information data and/or instruction inspection/authentication and/or management capabilities, identity-related information storage, identity-information similarity matching capabilities, for example, for pattern matching (e.g., using biometric templates), malware prevention, and/or resource suitability management, and/or the like.

PERCos Awareness Manager arrangements comprise PERCos Identity Firewall arrangements and further include one or more of electromagnetic and/or ultrasound emitter and sensor sets used to obtain near existential and/or existential quality biometric identification information, where biometric identification information acquisition enables identity and liveness determination regarding physically present, tangible persons.

In some embodiments, Identity Firewalls (IFs) and Awareness Managers (AMs) (e.g., NIIPUs and RIIPUs), comprise and/or are securely associated with one or more hardened hardware and/or software capability sets (for example, security hardened sensor/emitter sets, trusted clocks, secure communication capabilities, authentication and other identification associated processing arrangements, pseudo random emission instruction generators, and/or the like). Such IFs and AMs support assiduous identity characterization and/or recognition including, for example, existential biometric and environment attribute determination and/or testing.

Some EBInet systems may employ one or more techniques for at least in part ensuring the security of hardware packaging (e.g., using epoxy and/or tripwires), as well as countermeasure technologies for enhancing tamper resistance. For example, EBInet device arrangements (including EBInet arrangement compliant Identity Firewalls and Awareness Managers) can employ techniques embedding electromagnetic spectrum and/or other shielding capabilities into, and/or as a layer of, the hardware packaging of, for example, a secure Awareness Manager or Identity Firewall component and/or appliance set and employing integrated circuit reverse engineering countermeasure techniques, such as employing diffusion programmable device techniques. Countermeasures may include technologies for managing/preventing decapsulation, optical imaging, microprobing, electromagnetic analysis (EMA), and fault injection, and/or the like, as well as anti-power analysis countermeasure capabilities for simple power, differential power, high-order differential power analysis, and/or the like analysis techniques.

EBInet embodiments may provide one or more Identity Firewall and/or Awareness Manager sets that may be used in supporting sufficient to contextual purpose related specification, rigorous registration- and/or authentication-related operations regarding identities, such as, human participant identities, in a PERCos cosmos embodiment, in pursuit of one or more situationally relevant target purpose sets.

Some embodiments of IF and AM sets may provide a minimal set of capabilities comprising time-related operations and secure communication capabilities to securely transmit and/or receive, correlated, including, for example, time stamped, biometric and/or other user computing arrangement sensor and/or related emitter information sets (e.g., regarding when such emitting and/or sensing occurred). In some embodiments IF and AM sets may provide a set of capabilities, in addition to, for example, supporting identity acquisition, time stamping, and secure communication service, where such further capabilities may include at least in part analyzing such acquired identity information, such as performing timing anomaly analysis and/or performing authentication services involving matching acquired identity information with stored identity information to determine validity of identity assertions, and/or to otherwise recognize the "name" and/or other identity information corresponding to such acquired identity information. Such hardened IF and AM sets may further provide control arrangements for providing instruction sets to their respective emitter sets regarding initiating, including otherwise describing, situationally specific emitter activity sets, where such instructions may be, for example, at least in part produced by an emitter instruction generator arrangement, such as a pseudo-random emitter pattern generation set, and where such pseudo-random arrangement may employ pseudo-random generation techniques at least in part comparable to techniques employed by pseudo-random number generators.

12.5 Anomaly Analysis of at Least in Part Biometrically Based Identification Information In some embodiments, EBInet systems may employ one or more secure clock arrangements to time stamp sensor and emitter related information for biometric identification liveness testing involving anomaly analysis of at least one of at least one of reflection, refraction, diffraction, reemission, scattering, and absorption; timing discontinuity; and timing overhead delay. Such secure clock arrangements can securely associate identity-related information acquired from one or more biometric and/or environmental sensor and emitter arrangement sets with time stamp information for timing anomaly analysis for reality integrity evaluation regarding the integrity of correspondence of at least a portion of sensor acquired information with such unpredictable emitter output corresponding information. Such timing analysis can comprise correlating time-stamped emitter event information and sensor event information, and performing timing anomaly analysis of the emitter event information and the sensor event information, to evaluate liveness of a human subject.

In some embodiments, EBInet systems may employ one or more security hardened identity device arrangements to support timing anomaly analysis, wherein emitter emission output, and sensor input, biometric related information is employed in supporting timing anomaly analysis for determining liveness of an REAI publishing process associated stakeholder and/or certifying person, wherein such stakeholder person's presence (e.g., a CertPer's presence) is used to authenticate/certify a published resource identification information set that characterizes its resource subject matter (a resource and/or such a resource's IIS, may, for example, be signed using an EBICert and/or stakeholder biometric identification information may be used to identify a CertPer and/or stakeholder subject matter component).

In some embodiments, EBInet systems may perform timing anomaly analysis, wherein such analysis involves analyzing sensor biometric information acquisition delay caused by the time overhead resulting from, at least in part, the acquisition by a malicious party of emitter emission information, and the time overhead required to construct a spoofing composition and outputting such composition for at least one of receipt by such security hardened identity device related sensor arrangement, and insertion into a sensor data stream communication pathway.

Some embodiments may employ a hardened enclosure, secure chip or chipset arrangement configured to manage operations within such hardened identity device arrangement (e.g., a RIIPU), wherein such operations can include operatively producing a timing anomaly determination result regarding the relationship of an unpredictable (e.g., pseudo-random) electromagnetic radiation emission event timing and corresponding electromagnetic radiation sensor event timing, such result used in determining the liveness status of a sensor received representation of a human subject. Such relationship can be monitored by such hardened enclosure, secure chip or chipset arrangement's monitoring service, and wherein detection of an event information set that varies from timing requirements produces an exception handling instance resulting in one or more actions. The foregoing one or more actions are at least in part based upon the determination of liveness status, i.e., actual presence or absence, of a monitored human subject, such human subject represented as having been electromagnetically painted by at least a portion of such emitted electromagnetic radiation.

12.6 Contextual Purpose Firewall Framework

A Contextual Purpose Firewall Framework (CPFF) is a form of PERCos framework specification set that specifies operating variables for user contextual purpose fulfillment computing sessions, such that such sessions may be provisioned with resource sets that comply with specification requirements of such a framework, such as resource sets that correspond to those one or more resource sets enumerated on a specified target contextual purpose framework resource set manifest and/or where resource one or more sets' respective attributes are compliant with specified resource minimalism, isolation, impact on session process set efficiency, and/or other CPFF specification set (which may include resource combinatorial and/or role) specifications. The general purpose of a CPFF is to support the provisioning of user target purpose computing arrangement sessions such that it minimizes or eliminates unintended consequences, for example, those resulting from the use of resource sets that provision or enable malware, and/or those that impact operational efficiency for the specified purpose of one or more portions of such sessions.

In some embodiments, PERCos CPFF capabilities enable the explicit delineation and/or other relevant identification of what resource compositions may be applied towards fulfilling given purposeful activities involving sensitive information and/or process sets. Such target purpose specification may be employed by one or more PERCos services—as such information may be complemented by certain situational purpose input information such as historical behavioral, profile, preference, applicable Foundation, and/or the like information—to, at least in part, identify, evaluate, select, prioritize, provision, manage, and/or the like, one or more resource sets. For example, such CPFF capabilities can enable user set specification of a purpose class appropriate computing arrangement resource set as a result of such user set specifying a target purpose objective set. Such objective set can be used by a PERCos service set to identify a corresponding CPFF set, for example, that is associated with a highly recommended aggregate Cred set from experts. Such CPFF user contextual purpose fulfillment resource sets may be automatically selected and/or otherwise identified and evaluated, when their contextual purpose related specification information sufficiently corresponds to such user set contextual purpose related information. Such resource one or more sets may be identified by their membership in a purpose class and/or other resource purpose neighborhood having a corresponding contextual purpose specification set to a user target contextual purpose specification set, and/or by a resource set, such as a resource framework, having a directly corresponding contextual purpose specification set as an attribute set (and/or in some other resource characterizing information form). Further, constituent resource sets of any such framework, as identified by their specification in such a framework, can be provisioned in satisfaction of such user target contextual purpose due to such framework relationship to such user contextual purpose specification set, but such provisioning (e.g., to a CPFF governed session) may be subject to associated framework, such as resource set specific, and/or other user set purpose related, specifications, as may be relevant to such resource set and such situation.

PERCos frameworks provide specifications identifying resource set arrangements to be employed in satisfying associated, specified target contextual purposes, and CPFFs provide framework instances with a further capability set enabling, at least in part, the control of operating environments based upon their respective resource arrangements' specified associations with their contextual purposes, and which, in some embodiments, may also, at least in part, control the operating performance of such specifically enumerated purpose specification satisfying target purpose resource sets. As a result, CPFFs can, in some embodiments, through their specification information and instantiation mechanisms, constrain a contextual purpose computing session to only employ resource sets authorized by, and as specified by, any such contextual purpose specification sufficiently corresponding, framework. Such constraining of the operating resources authorized for a given contextual purpose fulfillment session can substantially constrain the presence of, and/or unintended consequences resulting from, malware and/or the like. In combination with other PERCos, including other CPFF, capabilities, such specification driven contextual purpose sessions can be substantially more secure and reliable when compared to today's typical user computing arrangement sessions.

CPFF constraining capabilities can be, in some embodiments, achieved in part through the use of virtual machine capabilities wherein target contextual purpose computing environments can operate in virtual machine sets that, for example, at least substantially (as set by specification) isolate approved resource sets and related processes and information stores from a computing environment's user primary, for example open, operating system platform. Such an open computing system platform may be operated as, for example, an underlying platform that supports operating a CPFF more secure session, or alternatively can be operated in a separate virtual machine. Such virtual target purpose operating sessions, such as in the form of contextual purpose fulfillment virtual machine environments, can employ, for example, Type 1 or Type 2 hypervisor implementations.

12.7 Biometrics and Cryptography

In some embodiments, cryptographic services are a necessary aspect of an organized resource cosmos and such services are operatively complemented/improved by use of existential identities. An identity manager—which may in some embodiments also be a certificate authority—may securely associate/incorporate certificates with near existential or existential quality identities. In this disclosure, such certificates are called biometric certificates (such as EBICert near existential or existential quality at least in part biometrically based identification information certificates). A user who creates a resource may sign the resource with a biometric certificate (an EBICert or other near existential or existential quality biometric certificate) to ensure, and communicate regarding, the integrity/suitability of a resource and/or resource related event activity. A user may use such biometric certificates to set up secure communication channels, and/or process set arrangements, with other users, resources, and/or events/activities. Biometric certificates such as EBICerts make it easier and more reliable for end users to utilize public key cryptography to ensure the integrity of resources in a manner that current systems, dominated by corporate certificates and signatures, fail to provide.

Some EBInet embodiments employ links between cryptography and existential identification. For example, and without limitation, such embodiments may use existential services to augment cryptography to perform the following operations:

- Associate cryptographic certificates and/or private keys with existential identities. This association may enhance many applications. For example, most email clients can interpret X.509 certificates and will allow a user with such a certificate to protect his/her email messages for integrity and privacy and allow the user to receive encrypted mail from other users. By integrating the PKI infrastructure with an existential identification system, a user could validate that a digital certificate belongs to, and was used by, the expected or otherwise involved, identified person. Such an arrangement can also inform a user, such as a certificate receiver (e.g., the user and/or such user's EBInet arrangement), regarding one or more significant attributes of such identified person (e.g., a creator or sender of a document or communication), by reviewing assertions and/or stipulations (e.g., respectively, Creds and/or EFs) made about the holder of the certificate, and making usage/participation determinations based, at least in part, upon such assertions and/or stipulations.
- Protect a peer-to-peer communication channel for privacy and/or integrity. The integrity requirement may include assertions that the respective contents passing through the channels in each of the directions are generated by such peers' respective digital proxies for existentially demonstrated identities of such peers (persons, such as person 1 and person 2 as established, for example, by such persons' IITs (e.g., EBICerts)). Such IITs can provide, for example, existential quality proof of such persons' respective presences, and demonstrate that content passing through the channel has not been tampered with.
- Sign a resource to ensure that the resource remains unchanged, i.e., comprises identically the same resource, from the time it was signed. In some embodiments, this mechanism enables a process or user that is examining an assertion and/or stipulation to determine that such assertion and/or stipulation made by a particular person has not been modified after it was asserted and/or stipulated. Some embodiments ensure the reliability of such signing through the use of an EBICert certificate that securely contains an at least in part nearly existential or existential quality biometrically based identification information set.
- Encrypt an object (a resource) using cryptographic services that require near existential or existential quality identification information of such encrypted object's one or more specified (e.g., intended) recipients, thus ensuring that the encrypted object can only be decrypted by the one or more specified recipients.
- Create a personal/private certificate authority where the root certificate contains securely provided one or more near existential or existential quality, at least in part biometrically based identification information sets of an authority one or more persons, and where the root certificate may comprise an EBICert.
- Improve current certificate arrangements, such as web of trust arrangements, by providing certificates that contain respective existential biometric identification information sets.

In addition, the ability to implement reliable communications and the ability of cloud services to perform operations on behalf of a particular identity/person require the use of existential quality biometric identities and such identities' related cryptography. For example, in some embodiments, a user represented by a biometric identity may use cryptographic services to make a secure connection to a cloud service identified by an EBICert, such as a CIIS EBICert, to identify the cloud service and one or more cloud service CertPers. Having made this connection, the user may allow the cloud service to validate his/her biometric identity and other identification information authentication data. As a result of this protocol, the user can know that he/she has a direct connection to the appropriate cloud service through the use of such certificate's (EBICert's) usage cryptographic protocols. The cloud service in turn knows that it is communicating with a proxy for a particular user because of the existential identification authentication results.

There are several considerations that can distinguish the trustworthiness and performance of an embodiment of the above operations. For example, embodiments may differ in how they store and protect certificate private cryptographic keys. Depending on how they are stored and protected, private keys may be compromised and the ability to compromise a private key may affect the ability to trust the explicit or implicit assertions associated with the private key. An EBInet embodiment may approach this concern by ensuring that the platform implementation takes responsibility for the protection of private keys by, for example and without limitation, storing the keys on a tamper-proof device and/or on a highly protected cloud server, and where, for example, access to one or more keys may require the near existential or existential quality biometrically demonstrated presence, and/or direct (e.g., trusted path) authorization, of one or more persons who provide, as may be securely policy specified, their contemporaneous and/or operatively simultaneous at least in part near existential or existential quality biometrically based, identification information, (e.g., requiring such an IIS to decrypt such one or more keys). An embodiment may provide a service that will generate a private key that is specifically, securely bound to an at least in part biometrically based identification information set of a user, and/or other person (e.g., a CertPer), and provide such private key to such person and/or such a person's associated service in response to a request for such key and upon presentation of such biometrically based identification information set.

A variation on these example cases above can occur when private keys are not persistently stored anywhere because the private keys are generated on demand. In this case the persistent storage of the private key no longer presents an attack possibility, though there may be exposure while the key is in use and it is important such exposure be minimized or eliminated through, for example, a NIIPU or other modular component's anti-inspection/decomposition design.

In some embodiments, the registration authority of a public key infrastructure verifies a user through existential techniques by, for example, generating one or more keys associated with such a near existential or existential information set.

12.7.1 Biometric Protection of Private Keys

In some embodiments, private keys for certificates, such as EBICerts, may be protected by a biometric secret that is only known by and can only be obtained through biometric measurements of the holder of the private key, such as near existential or existential quality biometric identification measurements. There is a class of mechanisms, known to those familiar with the art, for creating digital secrets from biometric measurements of a user performing some action, for example and without limitation, a voice command or a gesture. Some embodiments of such mechanisms may produce digital secrets for a user, $u_1$, with one or more of the following properties:

- The digital secret is reproducible meaning that each time the user performs the action, the same digital secret is obtained.
- The digital secret is unguessable where this characteristic may include one or more of the following requirements:
  - A user other than the user u1 may not be able to perform an action that generates the same digital secret.
  - A user other than the user u1 who knows u1's secret action may not be able to perform the action in a manner that generates the same digital secret.
  - A digital process with access to u1's existential and/or other biometric reference set is unable to generate the digital secret.
  - A digital process with access to u1's existential and/or other biometric reference set and with access to a description of u1's action is unable to generate the digital secret.

Some embodiments may use mechanisms that use existential quality biometrically based information to generate digital secrets for the purpose of protecting the symmetric or private keys used with cryptography. In particular some embodiments may support one or more of the following capabilities:

- Private encryption keys that may only be accessed by the authorized user when he performs the appropriate secret action.
- Encryption where the encryption key is not stored on the device except when an authorized user performs the appropriate action.
- Private keys for an EBICert and/or other biometric certificate that may be generated on any device by an authorized user who performs the secret action without the need for these private keys to be exchanged between devices.

For example, some embodiments may encrypt the private key (pk1) of an EBICert or the symmetric encryption key protecting a resource by executing the following steps:

1. A reproducible but unguessable private digital secret may be obtained by gathering biometric measurements of a user (u1) performing some secret action. This digital secret may then be converted into a symmetric key, pk2.
2. The symmetric key pk2 is used to encrypt the private key pk1 and the encrypted key is stored with the certificate.
3. The symmetric key pk2 can be deleted since it can be recovered any time that it is required. The private key pk1 is also thrown away as it can be recovered by recovering the symmetric key, pk2, and using that key to decrypt the encrypted copy of pk1 associated with the certificate.

In some embodiments, the private key pk1 can be recovered at any time by decrypting the encrypted key information with a symmetric key, pk2, obtained by using contemporaneous near existential or existential quality biometrically based measurements of the user, for example augmented by the user performing some secret action such as holding up, for a camera, a forward-facing right hand. In some embodiments this technique may be used to safely encrypt other sensitive resources such as a keychain or a private document. Alternatively, performance of a secret action may be considered not necessary (or useful) if the near existential or existential quality biometrically base measurements are obtained operatively simultaneously to such key generation.

Alternatively, some embodiments may allow for the generation of an EBICert where the private key does not need to be saved in any form, encrypted or otherwise. For example, in some embodiments, the private key for an EBICert can be generated directly through near existential or existential quality biometric measurements of the user, which may be augmented by the user performing some secret action or using operatively simultaneously acquired near existential or existential quality biometrically based identification information. Such an embodiment may create a biometric certificate for a user identity through the following steps:

1. The user performs near existential or existential quality biometric one or more measurements, and if such measurements are performed contemporaneously, the user can perform some secret action to demonstrate liveness (where such a secret action may include providing an instruction using a trusted path interface as described herein) and generate a digital secret, where such secret may or may not be generated at least in part based on at least a portion of such biometric measurements. This digital secret is converted into a private/public key pair. This private/public key pair is then used to create an EBICert along with the associated private key.
2. The user then securely communicates an EBICert and/or EBICert IIS to a TIIRS and registers such EBICert and/or EBICert IIS as representing the user and/or the user and a device and/or service arrangement.
3. The private key associated with the EBICert can be deleted. At this point, the private key can only be recovered when the user submits to near existential or existential quality biometric measurements, which may be augmented by the performance of a securely specified secret action that may have been used to create the EBICert.

In some embodiments, when a private key is deleted, such key does not exist anywhere on the system when the EBICert is not in use.

In some embodiments, the steps above may be performed by trusted code that has operating access to its own EBICert (or other digital certificate), and the EBICert may be signed to demonstrate that the private key for such EBICert is protected by a tamper resistant/proof key regeneration mechanism.

In some embodiments, a key regeneration arrangement, such as described above, may support the sharing of biometrically based and related identification information, such as the sharing of an EBICert certificate and its associated private key among several distinct devices. For example, a purpose class application, pca1, may support the creation of a biometric certificate, where a secret action (and/or other second factor biometric information acquisition) can be used in the absence of operatively simultaneous near existential or existential quality biometric information acquisition, which includes the regeneration of the private key whenever the user requires the biometric certificate and performs the secret key regeneration action again. Once the certificate has been created, the user may be able to use the certificate on any device that can run the pca1 application, where such application requests a user to perform one or more actions that produce the private key for use in encrypting, for example, an EBICert signed digital object. Among other advantages, this private key regeneration process allows the user to utilize the private key on any EBInet compliant device and/or service arrangement that can securely operate the pca1 application.

12.8 Integrity of Data/Software/Firmware/Hardware Components

In some embodiments, integrity of data/software/firmware/hardware (d/s/f/h) components is assured through governing of d/s/f/h creation, modification, and usage/operation, where such governing can be performed at each stage of a component's and/or component group's process towards completion and subsequent usage/operation.

Data/software/firmware and/or information regarding hardware, along with time and date stamping, and location information, can be cryptographically hashed. Moreover, hashing E/A information can also be time, date and location stamped. One or more of such hashed information sets can be securely bound to at least one CertPer's and/or other parties' respective near existential and/or existential quality at least in part biometrically based identification information. For d/s/f/h integrity, when a person and/or a person/device fused-identity entity, attempts to subsequently modify an EBInet governed resource (such as an d/s/f/h component and/or component group), and/or provide an operating instruction to such EBInet governed resource, such modification and/or providing is allowed as an authorized event/activity only if such person and/or person/device is TIIRS registered as authorized to perform such modification and/or providing.

In some embodiments, if one or more unauthorized and/or unknown persons attempts to perform, is performing, or has performed, a d/s/f/h modification and/or providing, one or more pertinent EBInet device and/or service arrangements can decline to: (a) perform, (b) complete performing, or (c) use such, modification and/or provided operating instructions, and if applicable, report to an administrative party that such modification and/or providing comprises a malware effort.

In some embodiments, cryptographic hashing functions, and associated time/date stamping and location identifying information, can enable secure creation of a component identifying state-information collection. Such component can only be modified and/or provided if such subsequent modification and/or providing is performed in accordance with applicable modification and/or providing rules and/or controls. Such modification and/or providing must be performed by at least in part biometrically identified, authorized one or more persons whose respective CBEIISs and/or CIISs are registered with a TIIRS arrangement and are authenticatable, where modified such components are then again cryptographically hashed, time and date stamped, and location identified to maintain data integrity.

Such hashed information sets, when securely bound with one or more certifying persons' respective near existential and/or existential quality biometrically based identification information, can support an EBInet framework that employs contextual attributes, such as EFs and/or Creds, where such EBInet framework combination of capabilities can securely ensure computing arrangement component integrity/trustworthiness and other suitability considerations.

In some embodiments, such d/s/f/h governing can be performed by RUS and/or RUD monitoring and governance functions, where such governing includes ensuring that s/f/h components have and maintain required integrity.

12.8.1 Reliability of IIPUs

In some embodiments, when a fault identifying plural-IIPU computing component arrangement (i.e., comprising at least two IIPU modular components, e.g., NIIPUs and/or RIIPUs) fails to provide an identification information EBInet arrangement specification compliant, matching result set, such IIPU arrangement may cease to perform one or more identity related functions, or its identification information output may not be accepted or used by one or more receiving EBInet components, until such failure, for example, is corrected (or understood).

In some embodiments, when such plural-IIPU arrangement is used, such arrangement can be configured to have, in addition to such plural-IIPU component arrangement, one or more further RIIPUs, and/or NIIPUs (and/or other PPEs), where such additional components may be maintained in an off-line sleep mode to be activated upon such an arrangement's recognition of such a component arrangement failure, and where one or more such activated components can operate in substitution for one or more components that failed in performing one or more such identification information functions.

12.9 EBICerts

Some EBInet embodiments enable parties (e.g., fused-identity entities, human users, and/or other arrangements) who do not know, or otherwise are unfamiliar with, each other to participate in events/activities by employing EBICerts that provide near existential and/or existential quality, at least in part biometrically based, contextually responsive, and secure, identification information. Such EBICerts use the strengths of EBICert public and private key signing and encryption of information to support exchanging near existential and/or existential quality at least in part biometrically based identification information between such parties, where such identification information can include one or more E/A relevant Repute EFs and/or Creds.

In some embodiments, an EBInet EBICert arrangement may employ a group-based symmetric encryption key arrangement enabling secure communication and storage of sensitive information. Such a symmetric key arrangement may be employed in addition to EBICert private and public key pairs, where such symmetric key arrangement is possessed and can be used only by biometrically authenticated group members.

EBICerts support cryptographic protection of information interaction between parties, and may be particularly valuable when such parties who are unfamiliar with or otherwise uncertain about each other, to enable such parties to initially, reliably exchange EBICert private key signed and/or integrity assured initial event/activity identification information. Such providing of private key signed and/or integrity assured identification information can selectively be followed by revealing identity data of greater sensitivity provided as a result of user instruction and/or event/activity specification. Such providing can include a providing party using group symmetric key encryption followed by information decryption by one or more receiving parties, wherein such decrypted information may comprise more sensitive data. Generation of such symmetric key set can, for example, be performed by a trusted cloud service arrangement (such as, for example, a social network service arrangement) for such situationally specific interactions between parties unknown and/or otherwise unfamiliar to each other (such as, P1, P2, and P4 in the example illustrated by FIG. 43C). Such symmetric keys may be issued by such a trusted cloud service arrangement (e.g., SCNSA1) to biometrically authenticated person fused-identity entities respectively participating in event/activity fused-identity groupings and such one or more keys may be used to encrypt such sensitive data. Such use of symmetric keys enables parties who participate in an EBInet communication to directly encrypt and/or decrypt identification information and/or other sensitive information, as appropriate, using such temporarily or persistently, securely available, user group, symmetric key set (e.g., in accordance with specification, such as identification information (biometric or other attribute) requirements).

Alternative to, or augmenting, the use of EBICerts to sign (may be operatively anonymous) initial identification information instances/sets, EBInet sending and receiving device and/or service arrangements may employ nearly existential or existential quality at least in part biometric identification information demonstration/validation of sender(s) and/or receiver(s) to establish presence of registered persons or group members (who satisfy specified presence requirements, e.g., presence of a contemporaneous CBEIIS and/or CIIS or operatively simultaneous generation of native parent device biometric identification information set) as a requirement for decrypting sensitive data.

12.10 Identification Information Tokens

In some EBInet embodiments, Identification information tokens ("IITs"), are IISs used as identification tokens, where such IITs include respective person identifying near existential and/or existential quality at least in part biometrically based identification information. Such IITs are different from conventional computer tokens that are primarily used as "tickets" to authorize, and/or otherwise govern, activities. Traditional token implementations do not provide near existentially or existentially reliable at least in part biometrically based identification information, and further do not provide identification information arrangements enabling suitability evaluation/determination based on such arrangements' respective subject matter attributes. They do not provide information that computing arrangements and/or their respective users can meaningfully and securely use to determine such traditional tokens' respective associated persons' (and/or their computing arrangements') suitability.

In contrast with such traditional tokens, IITs are enabled through the use of an EBInet identity informing infrastructure that supports highly rigorous, near existential or existential quality, at least in part biometrically based identification of REAIs. IITs are created, forwarded, carried and/or otherwise maintained, in support of the proffering of such highly rigorous identity relevant information, which is used in the governing/auditing of, and/or informing regarding, including enabling, respective REAI instances.

In some embodiments, such enabling, governing/auditing, and/or informing, using an IIT, for example IIT1 representing a fused identity entity, P1/RCFD1 (where P1 is a person and RCFD1 is P1's EBInet device arrangement), may, for example, comprise one or more portions of such a fused identity entity's master CIIS information appropriate for the use of IIT1 as a computing token. IIT1 may, for example, include IIT1 associated subject matter(s)' one or more attribute information (e.g., stakeholder(s)' attribute, signed data set's (e.g., document(s)') attribute, E/A(s)' associated provenance, information and/or one or more relevant policy information sets, where the foregoing IIT1 information includes and/or securely references, and/or otherwise securely employs, for example:

CIIS1(P1/(AFD1/O1, #CertPer1)) comprising P1's nearly existential or existential quality at least in part biometrically acquired, and/or otherwise biometrically derived from such biometrically acquired, person specific identification information and AFD1's identification information, where AFD1 is an AFD that acquired P1's biometrically based identification data to generate CIIS1(P1/(AFD1/O1, #CertPer1))'s person information one or more portions, and O1 is AFD1's O-Per.

RCFD1's identification information, such as cryptographically protected unique identifiers and/or associated public keys for respective private keys that are securely and respectively bound to, and/or included within, RCFD1. Such device information can represent unique and securely maintained and communicated device identity information that can be used, for example, to authenticate RCFD1's identity, such authenticity stipulated, for example, by signing P1/RCFD1 CIIS(s) by a TIIRS's RUS/TIIRSPersonAgent using an RUS/TIIRSPersonAgent EBICert.

One or more EFs, Creds and/or other asserted or stipulated attribute information instances regarding P1/RCFD1, and/or regarding one or more attributes of one or more P1/RCFD1 attributes. For example, certain provenance information can comprise an attribute of P1/RCFD1, such as the CertPer is an authenticating party of P1/RCFD1 and the CertPer constitutes a P1/RCFD1 IIS attribute. Such attribute itself has an attribute comprising an EF stipulating such CertPer's employment by such CertPer's employer organization, such EF establishing such CertPer's role in certifying RCFD1's authenticity.

In some embodiments, an IIT (for a fused-identity entity subject matter) characterizes its subject matter set and incorporates and/or otherwise securely employs, for example, one or more of:

- An IIT's specified subject matter suitability to purpose informing attribute information instance(s), such as Cred quantized assertion(s) and/or Effective Fact verifiable fact stipulation(s).
- Provenance identification information, for example, securely included in and/or associated with one or more CIISs of a fused-identity entity, representing a person and such person's one or more device arrangements, where such information is used in certifying the completion of and/or other manufacturing/creation event/activity instances that characterize the manufacturing and/or other completion of an EBInet device carrying and/or forwarding such fused-identity entity IIT information.
- Resource rights and associated rules and controls for event/activity instance authorization and/or other governance, including, for example, securely maintained policy information, where an identification information set of a person/device fused-identity entity IIT subject matter has associated one or more conditions/rights effecting E/A subject matter related processing control, such as subject matter location, subject matter rights, IIT issuance time and date, and/or if applicable, IIT copying location, and/or E/A related time and date. An IIT may provide operative "active" (i.e., currently applicable/operable, to be enforced) policy one or more control instructions that, for example, can stipulate if policy condition set X occurs, then perform a control set, Y, and/or, for example, output a result, Z, that causes performance of a further control instruction set.

Such an IIT subject matter characterizing information set, and/or information set derived therefrom, is registered with one or more trusted identification information registration service (TIIRS) arrangements, so that such information can be independently authenticated/verified as registered and authentic.

In some embodiments, an organization and/or other grouping of people may establish an EBInet network connected E/A governance arrangement, where different standards of security/reliability are employed in managing differently located RD and/or RUS instances. Such EBInet instances may collectively or individually be required to have different standards of security/reliability given one or more conditions. Such different standards may, for example, be specified as component information of respective E/A standardized and interoperably interpretable contextual purpose expressions.

12.10.1 IIT Rigor Levels Employed to Govern E/A Instances

A subject matter, such as a fused-identity entity, may satisfy one or more purpose specifications by satisfying one or more security/reliability specified variables required by an E/A or associated RUD or RUS IIS's context specified security/reliability rigor level. Such rigor level requirements may vary based on context, varying across a sequence of unfolding time-corresponding different E/As. For example, a fused-identity entity (representing a person and associated RCFD device combination) entering a front door of an organization's facility may be required to provide such entity's IIS or one or more portions thereof (such as: (i) such person's identity information such as name, age, sex, and EF email address, securely bound to biometrically identifying nearly existential or existential quality identification information, and (ii) a device unique identifier identification information). However, if such person attempts to enter a secure research lab within such facility, such information provided at the front door must be supplemented with one or more specified EFs establishing security authorization of such fused-identity entity to enter a higher order security-protected lab of such organization. Entering a front door (e.g., at Corp1) may, for example, require a general person/device identification IIT having a rigor level of at least 5 out of 10, while entering a restricted access lab (LAB X) may require an IIT having a rigor level of at least 8 out of 10, signed by a Corp1 executive using an executive/device EBICert IIT. Further, using Workstation 2 at LAB X requires an IIT that has an even greater computer security rigor level (e.g., at least 9 out of 10). One or more such IITs can comprise field completed, specification compliant, securely managed EBInet templates that are securely associated with respective purpose characterizing contextual purpose expression specifications.

In some embodiments, the rigor level of an IIT (or other IIS) may at least in part depend on the rigor level of one or more operatively current and/or antecedent/provenance EBInet device and/or service arrangements. In such embodiments, the rigor level of a current person/device carried IIT can be at least in part dependent upon one or more generally applicable, or contextually related, rigor levels of the person or person/device and/or one or more rigor levels of such IIT's antecedent/provenance E/A EBInet devices and/or services.

In some embodiments, IITs may be prepared by employing templates structured for respectively enabling and/or otherwise governing specific event/activity categories (e.g., banking, social networking, opening a home's front door, securely publishing confidential documents, and/or the like) based upon, for example, irrefutable, identifying information of a person and/or other subject matter (device and/or service), where such irrefutable, identifying information may be combined with other subject matter one or more attributes (such as EFs and/or QtPs).

At least a portion of such subject matter and/or subject matter characterizing attributes may take the form of contextual purpose specifications, where, for example, an IIT authorized to open a research lab (e.g., LAB X) security door at a person's employer facility can include an event/ activity contextual purpose specification (for opening door to securely managed LAB X), such as when such an IIT is communicated (e.g., pBIDE broadcast) to such research lab's door access governing RUD, and/or associated RUS, entry control arrangement, such door automatically unlocks to allow such person/device entity to enter into such research lab.

12.10.2 Registration of IIT and other IIS

In some embodiments, IITs, and other IISs, can be registered with one or more TIIRSs and/or other trusted services. Such registered IITs (IISs) may be signed by respective registering parties, and/or such TIIRSs and/or other trusted services, using respective one or more parties' EBICerts.

12.11 Generating Contextually Appropriate, at Least in Part Biometrically Based IISs/IITs 12.11.1 Examples of Generation Contextually Appropriate IISs/IITs FIG. 33 is a non-limiting example of RCUFD1 generating an operatively near existential or existential quality at least in part biometrically based IIS for P1 using near existential or existential quality biometric information forwarded by AFD1/O1.

FIG. 40 is a non-limiting example embodiment illustrating generation of contextually appropriate, at least in part biometrically based IISs/IITs relating to a human user, P1. One or more such IISs/IITs can comprise child IISs/IITs derived from a P1, or P1/RCUFD1, master IIS.

FIG. 41 is a non-limiting example EBInet embodiment that illustrates generation of both societally and non-societally specific at least in part biometrically based identification information sets (SS-IITs and SAnony-IITs) using contextual attribute field based templates for pursuing event/activity instances.

FIG. 42 is a non-limiting example of an EBInet system that provides a cloud service arrangement that generates contextually appropriate, societally specific, or societally anonymous, at least in part biometrically based IIS sets (such as IITs, for example, EBICerts) for users.

12.11.2 Societally Anonymous CIISs

In some embodiments, a SAnony-CIIS (such as EBICert) of a fused-identity entity, representing a user and such user's EBInet device arrangement, comprises a societally anonymous CIIS that may be signed by such entity's EBICert at the time of its registration, where such entity represents such SAnony-CIIS's creator/user and such creator's/user's EBInet device and/or service arrangement (such as an AFD, RFD, RUD, and/or RUS, arrangement). Such SAnony-CIISs can further, or alternatively, be certified and signed by one or more trusted EBICert certificate, local or cloud based, authorities (e.g., signed by one or more TIIRS agents using their respective EBICerts, including EF stipulations regarding their respective authority agent/employment roles). Such authorities may, for example, respectively manage registration and at least in part govern use of such respective SAnony-CIISs.

FIG. 43A-43C is a non-limiting example of pBIDE, a pervasive biometric Identification environment that includes mobile identity presentation capabilities, where such embodiment enables a user, P1, employing an anonymous, situationally suitable, at least in part biometrically based IIT, SAnony-IIT2, to form an affinity group comprising people carrying their respective EBInet compliant RCUFDs that share P1's interest in attending the next Super Bowl game.

12.12 Identity Certification

In some embodiments, contextual identity certification can comprise near existential or existential quality at least in part biometrically based identification information of a CertPer, time and date (based on a secure clock arrangement) of the certification (i.e., signing), and characterization of a device arrangement employed by such CertPer used to perform certification, where such characterization can include network location of such device arrangement at the time of the certification. In some embodiments, Router ID/signal can be used to determine such device arrangement's location.

12.13 Supply, Value, and/or Other Commercial Chain (SVCC) Framework

In some embodiments, an SVCC Intermodal Container (SIMC) and/or such SIMC's content entities (such as crates, cartons, multiple product packages, individual product packages, and/or the like) may have securely bound and/or securely associated respective tamper and inspection resistant EBISeal, and/or networked, administrative RUS, arrangements that monitor, govern and/or report such SIMC and/or such SIMC's content entities regarding violation of conditions and/or other status (where, for example, when a person who is authorized under certain time conditions tries to initiate alteration of container and/or container content and/or environment outside the permissible time parameters and without proper authorization). Such EBISeal, and/or RUS, arrangements can detect tampering and/or other violations of such arrangements' respective conditions, where such violations may include physical and/or other intrusion into, and/or other operational interference with, such electronically at least in part managed entities.

In some embodiments, determination of anomalous activity may be at least in part dependent on whether a carried contemporaneous at least in part nearly existential or existential quality biometrically based IIS, and/or operatively simultaneous identification information set, at least in part matches registered, and/or otherwise securely stored, identification information (e.g., securely included in one or more NIIPU managed ESAMs) regarding such identified E/A participating one or more persons. Failure to match, in accordance with EBInet SVCC arrangement specifications, can activate appropriate EBISeal-based SIMC, and/or other EBISeal managed cargo instances' respective, specified responses, such as producing alarms, communicating notifications, and/or producing other contextually specified actions.

In some SVCC embodiments, EBISeal, and/or RUS, arrangements are provided with respective ESAMs for SVCC transportation and storage lifecycle governance. Such ESAMs can comprise respective evolving and/or fixed specifications and audits of anticipated and/or completed E/A instances, such as additions and removals of content. For example, an SIMC may "migrate" (e.g., shipped) in fixed or evolving E/A, including status, sequences, for example, crate and/or carton additions and/or removals.

In some embodiments, an ESAM for a higher order container instance that contains other EBISeal managed packaging may have the identification information, such as IISs and/or portions thereof, for EBISeals and/or RUSs contained within, in the vicinity of, and/or otherwise related to, such higher order container (a higher order container can comprise, for example, an SIMC that contains EBISeal governed lower order cartons and/or other lower order packaging). Such lower order identification information can be used by such higher order (e.g., SIMC) EBISeal and/or RUS arrangement in monitoring and/or governing such higher order container's content/environment.

In some embodiments, such ESAM for a higher order container instance may be considered to be "higher" order than an ESAM for a container contained in such higher order container. For example, an ESAM for an SIMC may be considered to be higher order than ESAMs associated with ESAM/EBISeal managed crates contained in such SIMC. As such, unless explicitly specified otherwise, a higher order ESAM may have seniority of rules and controls over another ESAM of a lower order container, where such specification may be provided by authorized one or more management personnel and/or authorized administrative one or more device and/or service arrangements.

In some embodiments an SVCC administrative network based service arrangement, SANSA1, can comprise an administrative center arrangement having plural administrative persons where biometrically based identification information of an administrative operator and such operator's physically present supervisor is employed as securely certified, and/or fused, provisioned identification information, such provisioned identification information used at least in part for authenticating an SIMC event/activity authorization.

In some SVCC embodiments, a sequence of steps enables acquisition, monitoring, communication, and/or recordation of a container arrangement's content information. Such steps may be automated, and at least in part performed employing a pBIDE and/or other transparent to human user automated process set, such process set being contextually activated (e.g., in accordance with presence of broadcasted and/or otherwise communicated EBISeal, RUS, EBInet device, person and/or service identification information, and/or other identification information contextual variable(s), such as time, location, temperature, humidity, presence of authorized and/or unauthorized parties, instruction provided by one or more EBInet device and/or service arrangements, and/or the like) communication of container's content related E/A information. Such SVCC embodiment process steps, at least in part, comprise the acquisition of container arrangement content descriptive information when such content is being placed, and/or has been placed, in a higher order container, where such information is communicated by an EBInet modular component arrangement securely located in, attached to, and/or otherwise associated with, such content receiving/carrying higher order container arrangement.

In some embodiments, when a crate is loaded with content cartons, such carton's secure modular components (that are respectively carrying local content (resource subject matter and/or E/A) descriptive tag information) can respectively securely communicate such descriptive tag information to one or more higher order container arrangements. Such carton's secure modular components can communicate such information to such (anticipated and/or current) crate's EBISeal (and/or other one or more local EBInet secure SVCC administrative arrangements, such as an administrative RUS), in which such cartons are placed. Such crate's secure modular components, alternatively and/or in addition, can securely communicate such content information to such crate's SIMC EBISeal and/or associated RUS. This communicated information can be securely associated with, and/or included within, one or more corresponding ESAMs that describe such carton and/or other containment arrangement SVCC E/A anticipated, completed, not completed (e.g., failed), and/or in progress, process sets. Such containment arrangement presence and content monitoring and communication (and associated governance) may limit the inclusion of, and/or access to, certain descriptive detail regarding containment arrangement content identification information in order to contextually preserve/maintain specified content partial or full anonymity (e.g., ensure the confidentiality of one or more types, and/or instances, of specific content presence). Such management regarding the privacy of such one or more types, and/or instances, of content descriptive information can be selectively enforced, wherein, for example, a stakeholder agent and/or agent RCUFD can access one or more types (fields) of content descriptive information from one or more levels of containment and/or administrative services depending upon such agents' and/or devices', and/or agent and/or device classes', respective information access specified rights.

In some embodiments, an EBISeal and/or RUS arrangement associated with a container arrangement may create one or more SVCC EBIBlocks to provide E/A provenance information. Each EBIBlock can contain hashed transaction related identification information regarding one or more E/A instances, where such information includes such E/A instances' respective participants'/CertPers' respective one or more portions of near existential and/or existential quality at least in part biometrically based identification information, time, date, location, and/or other such E/A instances' respective transaction related identification information. For example, a crate (or other containment) arrangement that has its own EBISeal that monitors and/or governs access to, removal from, loading such arrangement into an SIMC may create one or more EBIBlocks containing such arrangement related E/A transaction identification information, and may communicate such EBIBlock information to its, potentially overtime, one or more current SIMC and/or other higher order containment arrangement EBISeal and/or RUS arrangements.

In some embodiments, EBIBlocks containing transaction identification information of SVCC E/A instances specified by a containment arrangement's (SIMC, crate, carton, enclosed pallet, and/or other packaging) ESAM can form an EBIBlockChain that provides irrefutable provenance information that such containment arrangement has been securely transported, stored, and/or otherwise governed, in accordance with such containment arrangement's ESAM.

In some embodiments, SVCC E/A instances can include:

- Activating an EBISeal securely associated with an IMC that instantiates such IMC as an SIMC
- Providing an SIMC with ESAM (location, state)
- Applicable SVCC container management arrangements (e.g., EBISeal and/or RUS arrangements for SIMCs, crates, cartons, items, and/or the like), securely interact to mutually identify and exchange compliant with ESAM specification EBInet identification information of persons and/or other REAIs.
- Creating/initiating EBIBlockChains comprising one or more EBIBlocks, where each such EBIBlocks can contain hashed transaction related identification information of an E/A instance that includes such E/A instance's one or more CertPers' respective one or more portions of near existential and/or existential quality at least in part biometrically based identification information, time, date, location, and/or other such E/A instance transaction related identification information. For example, a crate that has its own Seal that monitors and/or governs access to, removal from, loading such crate into an SIMC may create its own EBIBlockChain.
- Loading and/or unloading cargo container arrangements in accordance with applicable ESAMS, including for example, loading and/or removing one or more crates, cartons, and/or other packages from their respective EBISeal managed containment arrangements, where such loading and/or removing includes unsealing and resealing an SIMC to unlock and subsequently relock EBISeal managed containment arrangements.

Transporting an SIMC from one location to another location and monitoring and/or reporting compliance with one or more applicable containment arrangement ESAMs (e.g., SIMC, crate, carton, and/or the like securely governed ESAM). For example, using GPS or cellular to determine whether such SIMC is traveling in accordance with its ESAM—monitoring that SIMC is securely sealed.

Reading states of container arrangements. For example, an EBISeal and/or RUS may periodically read an SIMC's location, temperature, humidity, vibration/impact, presence of authorized and/or unauthorized parties, and/or the like), where such reading may be based on instruction provided by one or more EBInet device and/or service arrangements, and/or the like). Such EBISeal/RUS arrangement may interact with other EBISeals/RUSs, in compliance with EBISeal's ESAM containment arrangement. For example, an EBISeal may securely poll, and/or securely receive broadcast from, one or more its cargo instances and/or such SIMC may securely poll and/or securely receive broadcast from one or more cargo components, to determine if a crate is in such crate's ESAM specified SIMC and such SIMC's ESAM specifies such crate and/or such crate content as approved/authorized such SIMC's ESAM, specified cargo. When a crate is removed from an SIMC, the crate's Seal can determine if the crate is in the specified location.

FIG. 34 is a non-limiting example of SVCC REAI process administration.

FIG. 35A-35B is a table for components described in FIGS. 36A-39.

FIG. 36A is a non-limiting example of activating SIMC1 by activating its RUS1/O3 & EBISeal1/O3, where SIMC1 is an EBInet compliant intermodal container, such EBISeal & RUS (RUS may be integrated into an EBISeal) integrated into IMC1 during, &/or after, completion of IMC1 manufacturing, to enable monitoring &/or managing the access to, other interaction with, &/or other monitoring and/or governance of IMC1, now SIMC1.

FIG. 36B is a non-limiting example of an EBISeal arrangement of an SIMC providing irrefutable transaction history regarding such SIMC and related event/activity instances using an EBIBlockChain comprising securely generated and forwarded one or more EBIBlocks containing relevant E/A instance transaction information regarding such SIMC.

FIG. 37A is a non-limiting example of a supply, value, and/or other commercial chain (SVCC) Stakeholder providing an existentially signed anticipatory manifest (ESAM) to EBISeal1 that EBISeal1 may use to governing SIMC1's E/A instances.

FIG. 37B is a non-limiting example of an SVCC administrative network based service arrangement providing irrefutable transaction history regarding an SIMC in an EBIBlockChain comprising securely generated and forwarded EBIBlocks containing relevant E/A instance transaction information regarding such SIMC.

FIG. 38A is a non-limiting example of loading container arrangements and their contents into an operating SIMC, SIMC1.

FIG. 38B is a non-limiting example of loading container arrangements and their content into an operating SIMC, SIMC1.

FIG. 38C is a non-limiting example of SIMC1 after the completion of E/A2, in which Crate 1 and Crate2 have been loaded into SIMC1, and EBISeals and/or RUSs have created situationally relevant EBIBlocks and added them to respective EBIBlockChains.

FIG. 38D is a non-limiting example of SIMC1's EBISeal and/or RUS1 creating an EBIBlock containing an E/A transaction information regarding moving/loading crates Crate1 and Crate2 into SIMC1.

FIG. 39 is a non-limiting example of an SVCC stakeholder human and/or a robot agent removing one or more crates from an SVCC intermodal container.

12.14 EBIBlockChains for SVCC and Digital Currency

In some embodiments, an EBISeal and/or RUS arrangement may create SVCC EBIBlocks comprising one or more E/A CIISs for providing EBInet arrangement event/activity provenance information history, where such providing involves publishing such EBIBlocks, including securely storing such SVCC EBIBlocks in respective SVCC EBIBlockChains.

In some embodiments, a sequence of EBIBlocks, for a given digital coin can form an EBIBlockChain, where each EBIBlock contains E/A transaction identification information associated with such given digital coin, such as transfer of ownership of such given digital coin. For example, when the owner of an EBICoin containing such given digital coin authorizes the transfer of such digital coin's ownership, a financial institution servicing such transfer of ownership: (i) confirms the authenticity of such EBICoin's ownership, including validating such ownership against registered such EBICoin's ownership information; (ii) validates and/or identifies the identity of such given digital coin's receiving party (e.g., registered, or operatively simultaneous acquired, identification information); (iii) operatively simultaneously cancels such EBICoin and creates a new EBICoin containing such given digital coin; and (iv) creates an EBIBlock for such EBIBlockChain, such EBIBlock recording such transfer of ownership.

Such EBIBlockChain can provide irrefutable provenance information of such given digital coin, where such provenance information comprises transaction information, including near existential and/or existential quality biometrically based identification information of human parties involved in one or more E/A transactions related to such given digital coin. Such EBIBlockChain information can be used to eliminate digital currency loss from fraud, and/or loss of device and/or password, by providing irrefutable biometric identification ownership information.

FIG. 59A-59C is a non-limiting example showing a private SVCC EBIBlockChain network for auditing and governing manufacturing, distribution, retailing and ownership of EBInet devices.

FIG. 60A-60C is a non-limiting example showing a private SVCC EBIBlockChain network for auditing and governing device (such as an RFD) manufacturing, distribution, and retailing.

12.14.1 an Example of Building and Managing SVCC Provenance BlockChain

FIG. 47A-47E illustrates a non-limiting example of one or more TIIRS, and/or EBICert device, arrangements building and managing an SVCC provenance EBIBlockChain comprising EBIBlocks whose primary subject matters are RCUFD2 & RCUFD2 associated E/As. Such EBIBlockChain comprises an aggregation of secure provenance information & rules governing SVCC objects, as they move through a secured commercial chain of handling & control.

12.15 Event/Activity Instances

An event/activity instance, in some embodiments, comprises what may be perceived as a resource, but is defined herein as incomplete until its process set has been completed. An event/activity differs from a resource in that it comprises both one or more process functions and one or more resource objects, while a resource is a tangible and/or intangible object set that is defined herein as complete. Unlike a resource, an event/activity anticipates an algorithmically produced, input based outcome, such as producing an email, performing online banking, conducting a self-authentication, or participating in a social networking session, wherein such event/activity is incomplete until, for example, an anticipated outcome is produced.

An event/activity instance, in some EBInet embodiments, is a set comprising one or more component process sets and one or more resources, initiated for one or more purposes by a human person set (may be on behalf of an organization), and/or by an agent thereof (e.g., a computing arrangement), for example, acting on behalf of a human person set (may be on behalf of such an organization), where a process set can comprise a framework that anticipates input, such as, instructions, governance rules, and/or other data. For example, an email event/activity instance can comprise one or more component resources of an email server arrangement and associated one or more processes, and may, in some circumstances, produce one or more email messages (further one or more resources).

FIG. 9 is a non-limiting example of an AFD creating contemporaneous at least in part biometrically based identification information sets for different family members (parents P1 and P2, and a child, C1) RCUFDs, for their respective identity purposes, using respective CIISs and/or CBEIISs.

FIG. 10 is a non-limiting example of a corporation employing a plurality of AFDs to enable its employees to acquire near existential, and/or existential biometric information sets that third parties may use to authenticate them at higher rigor levels.

FIG. 11 is a non-limiting example of personal devices of a person providing such person's personal & work-related identification information sets for E/A governance, where such personal devices participate in both home & employer EBInet subnetwork activities in accordance with such subnetworks' and/or other services', and/or devices', respective policies.

12.15.1 Examples of Event/Activity Instances for Securely Sending and Receiving Email Messages In some embodiments, EBICerts can enable a party sending an email to reliably and securely: (i) inform the receiver of such email regarding the identity of such sending party, including one or more of such sending party's attributes (such as EFs (such as provided as a unique, or otherwise contextually reliable, identifier), Creds, and/or the like) through use of such sending party's EBICert; (ii) know that only the intended receiving party can unpack (e.g., decrypt) at least a portion of communicated content through the use of such receiving party's EBICert.

Such use of EBICerts ensures that communicated information comes from an authenticatable person and such communicated information can only be accessed by the intended authenticable person.

For example, as illustrated by FIG. 31, a fused-identity entity, U1/RCUFD1, can securely and reliably send an email, email1 to P2/RCUFD2 by:

1. retrieving an EBICert, EBICert2 representing P2/RCUFD2 from a TIIRS, TIIRS1.
2. generating a symmetric key, K1.
3. encrypting email1 and/or one or more attachments using K1.
4. securely binding encrypted email1 with an IIT, IIT1, representing U1/RCUFD1. U2/RCUFD2 can evaluate/validate IIT1 to determine email1's suitability to U2's purpose(s), where IIT1 can include: (i) U1's near existential or existential quality at least in part biometrically based identification information, such information may include one or more Repute EFs, Creds and/or other attribute information, such as an EF stipulating U1's employer; (ii) identification information characterizing RCUFD1; (iii) identification information regarding email1 and/or email1's one or more attachments.
5. encrypting K1 using EBICert2's public key.
6. creating a secure EBIbox package, EBIbox1, comprising IIT1 and encrypted email1 and K1.
7. signing EBIbox1 with EBICert1, an EBICert representing U1/RCUFD1
8. sending signed EBIbox1 to U2/RCUFD2 using an email server.

By encrypting K1 with EBICert2's public key, U1/RCUFD1 ensures that only P2/RCUFD2 can decrypt email1 by using EBICert2's private key, which only U2/RCUFD2 has in its secure repository (such as a secure storage within and/or available to an RCUFD2 NIIPU).

For example, U2/RCUFD2, receiving EBIbox1, can perform the following:

1. Authenticate/validate EBIbox1 by performing a validating process regarding EBICert1 that U1/RCUFD1 used to sign EBIbox1. Such validation process can be performed by (a) U2/RCUFD2 obtaining from TIIRS1 a registered copy of EBICert1 and then performing the validation; and/or (ii) U2/RCUFD2 employing TIIRS1 to perform such validation, which provides the results to U2/RCUFD2.
2. If the signature is valid, then evaluate/validate IIT1, where such evaluation/validation may include interacting with TIIRS1 to compare IIT1 with an IIT registered with TIIRS1. If the signature is invalid, then U2/RCUFD2 is informed of such validation failure and can securely delete/isolate EBIbox1 and notify a TIIRS and/or other administrative utility service arrangement regarding such failure to validate related information.
3. If the signature is valid, then obtain K1 by decrypting EBICert2's public key-encrypted-K1 with EBICert2's private key.
4. Use K1 to decrypt email1 and/or email1 one or more attachments.

When a receiver of an email knows contextually relevant securely provided identification information of a sending party, such receiver may not require further attribute information regarding such sending party and the sourcing/trustworthiness of such an email and/or other communication sent data object. On the other hand, if such receiver is unfamiliar or uncertain regarding identification information of a purported sending party, PERCos and/or like attribute information securely bound to such purported sending party's specifically identifying biometrically based information may be essential in reliably determining data object's authenticity and/or other suitability to such receiver's purpose(s).

FIG. 29 is a non-limiting example of a system that assures authenticity of the identity of messaging senders and receivers, informs regarding identity related facts and/or other attributes, and assures reliability of certain key attribute types.

FIG. 30 is a non-limiting example of an EBInet compliant email system that authenticates sending and receiving persons' respective presence and attributes.

12.16 Provenance Information

In some embodiments, composite identification information of an REAI subject matter, such as an EBInet device arrangement, includes provenance information sets associated with such REAI subject matter, where such provenance information can include IISs of event/activities involving such device arrangements, such as event/activities associated with such arrangement's manufacturing, distribution, retailing, ownership, and/or the like.

FIGS. 27-28 illustrate a non-limiting example of a CIIS of an EBInet device arrangement, RCFD1, that includes provenance information that includes event/activity IISs and/or information extracted from, comparable to, and/or at least in part based upon, such IISs, where:

- FIG. 26 illustrates a non-limiting example of a provenance/validation authority chain of IISs that supports identification authorization sequence for certifying an EBInet device arrangement, RCFD1.
- FIGS. 27-28 illustrate the retailer identification information for RCFD1, where such retailer identification information includes information regarding:
  - RetailPer1 who was the retailer who participated in E/A instances related to selling RCFD1 to O1;
  - AFD2, an AFD device arrangement that acquired ReailerPer1's near existential or existential quality at least in part biometric identification information. Such retailer identification information is used in E/A retail transaction information acquisition and related E/A identity validation/authentication, other evaluation, and/or monitoring/recordation.
  - RCFD2, an RCFD device arrangement RetailPer1 used to participate in E/A instances related to selling RCFD1 to O1.

In this example, each E/A instance has one or more persons securely identified using at least in part near existential and/or existential quality biometrically based identification information and each instance securely references at least one RCFD for such person to carry such person's identification information as well as one AFD is used to establish such biometrically based person identification information.

FIG. 25A-25B provides a table comprising a list of device arrangements illustrated in FIGS. 26-27, including such device arrangements' respective owners and users.

CIIS1(RCFD1/(O1/AFD1), #ManPer2) comprises:

- Near existential and/or existential quality at least in part biometrically based IIS information regarding O1, such IIS information generated by AFD1/O1 and AFD2/O3.
- identification information regarding RCFD1 and AFD1, where such identification information: (i) characterizes RCFD1 and AFD1, such as respective identifiers, capabilities, trustworthiness and/or other attributes; and (ii) provides RCFD1's and AFD1's respective provenance information, where such provenance information can include near existential and/or existential quality at least in part biometrically based IIS information of respective one or more CertPers. Such provenance information can include event/activity IISs and/or information extracted from, comparable to, and/or at least in part based upon, such IISs. Such event/activity IIS information can include:
  - E/A1 IIS information regarding: (i) (ManPer2/(RCFD4/O6)) certifying RetailPer1/RCFD2 as a retailer of RCFD1 and RCFD1 identification information using EBICert3((ManPer1/(AFD4/O8))/(RCFD4/O7)); and (ii) securely registering such information with one or more TIIRS arrangements (organization specific and/or a platform service), where ManPer2 is an RCFD1 manufacturing CertPer.
  - E/A2 IIS information regarding: (i) acquisition of ManPer1's biometric info, (ii) secure generation of a CIIS of a fused-identity entity, (ManPer1/(AFD3/O5))/(RCFD3/O4), where such CIIS includes ManPer1's (AFD1 CertPer's) near existential or existential quality at least in part biometrically based identification information and (iii) secure communication of such CIIS to both RCFD3's NIIPU and a TIIRS arrangement (for registration of such CIIS).
  - E/A3 IIS information regarding (ManPer1/(RCFD3/O4)) certifying AFD1 identification information using EBICert2((ManPer1/(AFD3/O5)/(RCFD3/O4)) and securely registering such information with one or more TIIRS arrangements (organization specific and/or a platform service).
  - E/A4 IIS information regarding (i) acquisition of RetailPer1's biometric info using AFD2/O3, (ii) secure generation of a CIIS of a fused-identity entity, (RetailPer1/(AFD1/O3))/(RCFD2/O2), where such CIIS includes RetailPer1's near existential or existential quality at least in part biometrically based identification information, and identification information attributes characterizing AFD2 and RCFD2, and (iii) secure communication of such CIIS to both RCFD2's NIIPU and a TIIRS arrangement (for registration of such CIIS).
  - E/A5 IIS information regarding (i) acquisition of O1's biometric info using AFD2/O3 at the time of O1's purchase of RCFD1, (ii) secure generation of CIIS1 (O1/(AFD2/O4)), and CIIS1(RCFD1/O1, #RetailPer1), where such CIISs include O1's near existential or existential quality at least in part biometrically based identification information and identification information attributes characterizing AFD2, RCFD1, and RetailerCertPer1, and (iii) secure communication such CIISs to both RCFD1's NIIPU and a TIIRS arrangement (for registration of such CIISs).
  - E/A6 IIS information regarding certification of O1's purchase of RCFD1, where such certification includes: (i) generating E/A3 IIS, where such E/A3 IIS includes O1 biometrically identifying information (from E/A2) and RCFD1 identifying information, wherein such IIS is securely certified by (RetailPer1/(AFD2/O3))/(RCFD2/O2) using EBICert1 ((RetailPer1/(AFD2/O4)/(RCFD2/O3)) and (ii) securely registering such information with one or more TIIRS arrangements (organization specific and/or a platform service).
  - E/A7 IIS information regarding (i) acquisition, for example, at O1's home, of O1's biometric information using AFD1/O1 at the time of O1's registration of RCFD1 with one or more TIIRS arrangements, (ii) secure generation of CIIS1(RCFD1/(O1/AFD1), #ManPer1) and CIIS1(O1/AFD1), where such CIISs include O1's near existential or existential quality at least in part biometrically based identification information and identification information attributes characterizing RCUFD1 and AFD1, (iii) secure communication of CIIS1(O1/AFD1) to both RCFD1's NIIPU and one or more TIIRS arrangements (for registration of such CIIS).

E/A8 IIS information regarding: (i) (ManPer2/(RCFD4/O6)) certifying RetailPer1/RCFD2 as a retailer of RCFD1 and RCFD1 identification information using EBICert3((ManPer1/(AFD4/O8))/(RCFD4/O7)); and (ii) securely registering such information with one or more TIIRS arrangements (organization specific and/or a platform service), where ManPer2 is an RCFD1 manufacturing CertPer.

E/A9 IIS information regarding (ManPer3/(RCFD5/O9)): (i) certifying RCFD2 identification information using EBICert4(ManPer3/(AFD5/O10)/(RCFD5/O9) and (ii) securely registering such information with one or more TIIRS arrangements (organization specific and/or a platform service). ManPer3 is an RCFD2 manufacturing CertPer.

E/A10 IIS information regarding (ManPer4/(RCFD6/O11)): (i) certifying AFD2 identification information using EBICert5 (ManPer4/(AFD6/O12)/(RCFD6/O11) and (ii) securely registering such information with one or more TIIRS arrangements (organization specific and/or a platform service). ManPer4 is an AFD2 manufacturing CertPer E/A11 IIS information regarding (ManPer5/(RCFD7/O13) (i) certifying RCFD3 identification information using EBICert6(ManPer5/(AFD7/O14)/(RCFD7/O13)) and (ii) securely registering such information with one or more TIIRS arrangements (organization specific and/or a platform service).

E/A12 IIS information regarding (ManPer6/(RCFD8/O15)): (i) certifying AFD3 identification information using EBICert7((ManPer6/(AFD8/O16)/(RCFD8/O15)) and (ii) securely registering such information with one or more TIIRS arrangements (organization specific and/or a platform service).

12.17 pBIDE

In some embodiments, a pervasive biometric Identification environment (pBIDE) can be established, where such pBIDE enables EBInet entities, such as EBInet device and/or service arrangements, to broadcast continuously, or based on contextual one or more variables (e.g., caused by fused-identity entities' respective locations, time, date, receipt of other entity EBInet arrangement identification information, and/or the like), respective one or more portions of their CBEIIS, CIIS, and/or other IIS, information and further may specify one or more rules and controls specifications for accessing at least a portion of such broadcasted identification information. Such broadcasting arrangement can enable an EBInet user to declare/inform "I am here", and "I have one or more attributes" that have been broadcasted.

FIG. 12 is a non-limiting example of pBIDE environment that enables a person to employ a local TIIRS to transparently govern the use of IISs/IITs for controlling home located appliances, where such governing includes forwarding situationally appropriate IISs/IITs for different event/activity instances, such as IIT1 for social networking, IIT2 for accessing streaming services (such as Netflix, Disney+ and/or the like), and IIT3 for on-line banking and interacting with P1's employer computing environment.

In some embodiments, a pervasive biometric Identification environment, as illustrated by FIG. 12, enables home owners to configure their home EBInet ID routers to operate as their local trusted identification information and E/A management service (LTIIRS) arrangement for providing operational governance, including event/activity management, of such owners' respective one or more arrangements (such as data/entertainment devices, security systems, lights, shades, thermostats, communication devices, computers, refrigerators, ovens, &/or the like) that have associated RUDs.

Such owners' home occupants can register one or more portions of their near existential and/or existential quality at least in part biometrically based IIS (such as portions and/or all of CBEIISs and/or CIISs (e.g., EBICerts, and/or other IITs)) with owners' respective LTIIRS arrangements. When a home occupant (e.g., owners, children, housekeepers, and/or other relevant persons) wish to participate in an E/A (such as social networking by logging into a social networking blog comprising other football fans, using a computing device, such as a tablet), such occupant carrying and/or locally possessing an RCFD device and/or other identification information wallet can present an appropriate IIT in response to a request from a device and/or service arrangement participating in such E/A and/or such device and/or other wallet can present an appropriate IIT that is broadcasted in response to a request from a device and/or service arrangement participating in such E/A.

In some embodiments, an LTIIRS can store E/A instances' respective registered IIT information, and provide an IIT or one or more portions thereof that situationally may be requested by, and subsequently used by, for example, one or more EBInet device and/or service arrangements participating in an E/A, where such IIT provides persistent contemporaneous authorizing E/A IIS information that such LTIIRS, in accordance with its policy set, can employ to provide authorizing authentication information for one or more device and/or service arrangement operations. For example, such policy set may specify that the LTIIRS can satisfy a request from an EBInet device and/or service arrangement participating in such E/A by providing such person's appropriate IIT, provided that such person carried and/or locally possessed one or more RCFD devices and/or other identification information wallets are determined to be within a home network, such as Wi-Fi, range (e.g., such one or more RCFD devices and/or other identification information wallets that are associated with one or more devices and/or services periodically broadcast (affirm) their respective presence by broadcasting such IITs (e.g., representing such persons as physically present at home, where such representation's accuracy can be ensured by the use of EBInet partner carried/worn tether confirmation device arrangement)).

In response to the receipt of such IIT, such device and/or service arrangement matches/validates such IIT against such person's internally registered and/or LTIIRS registered IIT. If determined, in accordance with specification, that such IIT is authentic and authorized to perform a requested E/A, then such E/A can be processed and, for example, E/A provenance IIS information may be created and securely stored in an EBIBlock of such E/A's (e.g., a device's and/or service's E/A) EBIBlockChain arrangement.

IITs can be controlled by EBInet policy sets. Such policy sets may be, at least in part, included within their respective IITs, respectively stored within, and/or otherwise network available to, IIT sending and/or receiving, device and/or service arrangements. EBInet receiving arrangements, such as RUDs and/or RUSs, can employ such policy sets at least in part based upon received IIT subject matter identification information (e.g., an existentially identified subject matter), e.g., party X can do Y but not Z. Such policy set may state, for example, how such IIT information may be used (such as securely governing one or more conditions for IITs' respective subject matters' use in respective associated event/activity instances).

An ID governance/filter operating as part of such LTIIRS, in accordance with the absence of a specified person, governs the use of EBInet controlled one or more devices and/or services, such as placing, as policy specified, any one or more of such devices and/or services in an off or limited operations mode.

In some embodiments, a policy set for an IIT may include rules and control specification for using such IIT, such as, for example, providing such IIT to EBInet device and service arrangements participating in E/A instances during the day time in absence of an authorizing person and such person's RCFD and/or other identification information wallet.

In some embodiments, a person/RCFD (and/or other arrangement) authorization can time out if such person does not return within specified time. For example, when a person exits his/her house and the person's mobile IoT devices (such as smartphone, smartwatch, and/or the like being carried or worn by the person) moves out of WI-FI range, his/her home security system notifies the person's LTIIRS that he/she is away from home.

In some embodiments, an person's LTIIRS can forward such person's one or more IITs, each such IIT containing authentication and authorization information for anticipated, associated E/A instances. For example, as such person leaves his/house, such LTIIRS can forward an IIT that enables the person to enter his car; another IIT to the person's favorite coffee shop to pick up his/her favorite coffee drink. Finally, such LTIIRS can forward an IIT that enables the occupant to enter his/her employer's building.

FIG. 32 illustrates a non-limiting example of a pervasively available, biometric identity, environment (pBIDE) that enables EBInet device &/or service arrangements to interact with TIIRS1 to obtain and/or employ near existential and/or existential quality, contemporaneous, at least in part biometrically based, IISs (such as IITs in a form of EBICerts, CIISs, or CBEIISs) for authenticating, and/or otherwise evaluating, proffered IISs for E/A instances.

E/A1 is an event/activity instance initiated by P1/RCUFD1 to perform a banking transaction, where such performing comprises the following steps:

E/A1 step 1:

1. P1/RCUFD1 and RUS1 establish a mutually secure identification connection path. They perform the following by:
   - i. P1/RCUFD1 and RUS1 exchange their respective EBICerts (P1/RCUFD1 forwards EBICert1 to RUS1 and RUS1 forwards EBICert6 to P1/RCUFD1.
   - ii. P1/RCUFD1 and RUS1 respectively validate/evaluate received EBICerts, where such validation/evaluation can include interacting with TIIRS1 to retrieve registered EBICerts and comparing received EBICerts with respective registered EBICerts. Alternatively, P1/RCUFD1 and/or RUS1 may employ TIIRS1 services to evaluate and/or validate received EBICerts.
   - iii. If EBICerts are valid and sufficient for E/A1 processing, P1/RCUFD1 and RUS1 establish a secure communication path.
2. P1/RCUFD1 forwarding IIT1, to RUS1.

E/A1 step 2:

RUS1, receiving IIT1 from P1/RCUFD1, validates/evaluates IIT1 by interacting with TIIRS1, where such interaction may comprise comparing IIT1 received from P1/RCUFD1 with TIIRS1 registered IIT1. If the comparison is successful, RUS1 authorizes Bank1 to service (P1/RCUFD1)'s transaction requests, where such servicing can include BAgt1 signing a receipt of the requested transaction using EBICert6 and sending such signed receipt to P1/RCUFD1.

E/A1 step 3:

P1/RCUFD1 receives the signed receipt.

E/A2 is an event/activity instance initiated by P2/RCUFD2 to send an email to P3/RCUFD3 that requires P3/RCUFD3 to confirm that it is carrying P3's contemporaneously acquired near existential or existential quality at least in part biometrically based IIS information to open the email. E/A2 comprises the following steps:

E/A2 step 1:

P2/RCUFD2 (e.g., using a NIIPU arrangement) retrieves EBICert3 from pBIDE1.

E/A2 step 2:

P2/RCUFD2 performs the following:

1. generates a symmetric key, K1.
2. encrypts email1 using K1 and securely binds encrypted email1 with IIT2.
3. encrypts K1 using EBICert3's public key.
4. creates a package. EBIbox1, comprising encrypted email1, IIT2, and K1.
5. signs EBIbox1 with EBICert2.
6. sends signed EBIbox1 to P3/RCUFD3 using EmailServer1.

E/A2 step 3:

P3/RCUFD3, receiving EBIbox1, performs the following 1. evaluates EBICert2's signature and any relevant EBICert2, P2 and/or RCUFD2 identification information and determines whether to proceed.
2. upon presentation of its IIT3 (which matches information RCUFD2 received from TIIRS1), receives authorization from (P3/RCUFD3)'s NIIPI to decrypt email1 and IIT2 and K1.
3. obtains K1 by decrypting EBICert3's public key-encrypted-K1 (step 3 of E/A step 2) with EBICert3's private key.
4. uses K1 to decrypt email1 and/or IIT2.

P3 can then proceed to read email1 and/or evaluate, verify, one or more portions of IIT2.

E/A3 is an event/activity instance initiated by P4/RCUFD4 to interact with RUS2, an RUS operating as part of, P4's employer's computing arrangement. O1 corporate computing environment to perform one or more operations such as accessing O1 corporate email server, document store (to, for example, obtain copies of documents, publish documents, and/or the like), and/or the like. E/A3 comprises the following steps:

E/A3 step 1:

P4/RCUFD4 and RUS4 establish a mutually secure communication path. They perform the following:

1. P4/RCUFD4 and RUS2 exchange their respective EBICerts (P4/RCUFD4 forwards EBICert4 to RUS2 and RUS2 forwards EBICert7 to P4/RCUFD4.
2. P4/RCUFD4 and RUS2 respectively validate/evaluate received EBICerts, where such validation/evaluation can include interacting with TIIRS1 to retrieve registered EBICerts and comparing received EBICerts with respective registered EBICerts. Alternatively, P4/RCUFD4 and/or RUS2 may employ TIIRS1 services to evaluate and/or validate received EBICerts.

3. If validation/evaluation is successful, and sufficient for E/A3 processing, P4/RCUFD4 and RUS2 establish a secure communication path.

P4/RCUFD4 then forwards IIT4, to RUS2.

E/A3 step 2:

RUS2, receiving IIT4 from P4/RCUFD4, validates/evaluates IIT4 by interacting with TIIRS1, where such interaction may comprise comparing IIT4 received from P4/RCUFD4 with TIIRS1 registered IIT4. If the comparison is successful, RUS2 governs (P4/RCUFD4) transaction requests and authorizes only those requests that are authorized by IIT4, such as accessing O1 email server.

E/A4 is an event/activity instance initiated by P3/RCUFD3, P4/RCUFD4, and P5/RCUFD5 to use a social networking service, SNS1, to social network. E/A4 comprises the following steps:

E/A4 step 1:

P3/RCUFD3, P4/RCUFD4, and P5/RCUFD5 respectively establish a secure communication path with SNS1.

P4/RCUFD4 and RUS4 establish a mutually secure communication path. They perform the following:

1. P3/RCUFD3, P4/RCUFD4, and P5/RCUFD5 forwards their respective EBICerts to SNS1; SNS1 in return forwards its EBICert, EBICert8, to P3/RCUFD3, P4/RCUFD4, and P5/RCUFD5.
2. P3/RCUFD3, P4/RCUFD4, P5/RCUFD5, and SNS1 respectively validate/evaluate received EBICerts, where such validation/evaluation can include interacting with TIIRS1 to retrieve registered EBICerts and comparing received EBICerts with respective registered EBICerts.

E/A4 step 2:

If validation/evaluation is successful, SNS1 provides P3, P4, P5 sufficient information to know with near existential and/or existential quality reliability that other proposed participants are who they claim to be.

In some embodiments, SNS1 may then enable P3/RCUFD3, P4/RCUFD4, and P5/RCUFD5 to establish communication paths between themselves. In other embodiments, SNS1 acts as a conduit to support P3/RCUFD3, P4/RCUFD4, and P5/RCUFD5 communicate with each other.

E/A5 is an event/activity instance initiated by P5/RCUFD5 to manage P5's home IoT instance(s), such as a controller(s) for a home security system, home entertainment system, and/or the like) by interacting with RUD1, an RUD that operates as part of such instance(s) controller(s). E/A5 comprises the following steps:

1. P5/RCUFD5 and RUD1 establish a secure communication path by exchanging respective EBICerts and validating each other's EBICert.
2. If validation is successful, P5/RCUFD5 forwards IIT5 to RUD1.
3. RUD1 evaluates IIT5 and if it has sufficient authorization, it allows P5/RCUFD5 to perform the requested operations. For example, RUD1 for a home security system may permit P5/RCUFD5 to review the information such system may have collected during a specified period of time.

FIG. 31 is a non-limiting example of a pervasively available biometric identification environment (pBIDE) embodiment that enables: (i) an email sender to obtain personal biometrically based and/or composite IITs and/or EBICerts of intended recipients of an email message to ensure that the email message is presented in clear text only in presence of the email's intended recipients' respective appropriate, such as, contemporaneous, at least in part biometrically based IISs; and (ii) email receivers to authenticate (and/or otherwise inform regarding) the sender's identity.

FIG. 44 is an outline of a non-limiting example, illustrated by FIG. 46A-46E, of a trusted pBIDE arrangement that enables CertPers, Stakeholders and/or users, &/or their device &/or service arrangements, to (i) register REAIs' IISs (e.g., REAI CertPers', Stakeholders', users', &/or person/device fused-identity entities' IISs); (ii) authenticate/validate such REAIs' IISs; &/or (iii) identify/evaluate one or more suitable REAIs for fulfilling users' respective purposes.

FIG. 45 is a table describing human roles and EBInet devices in FIG. 46A-46E.

FIG. 46A is a non-limiting example of a TIIRS, an established pBIDE trusted identification information resource registration/evaluation/management service arrangement that enables CertPers, Stakeholders, &/or users, & their EBInet device &/or service arrangements, to securely: (i) register such CertPers', Stakeholders', &/or users' respective person, device, service, instances &/or associated other REAIs, using instances' respective IISs, (ii) authenticate/validate such instances; &/or (iii) identify/evaluate/manage one or more suitable resources &/or events/activities in fulfillment of users' respective purposes.

FIG. 46B (FIG. 46A continued) is a non-limiting example of an established trusted pBIDE arrangement enabling a user (CertPer1) to certify and register/publish a resource set, RS1, with a third party publishing service using a CIIS of a fused identity entity, comprising such user and such user's RCUFD, such CIIS carried by such user's RCUFD that is securely integrated into a parent smartphone device arrangement, PD1.

FIG. 46C (FIG. 46B continued) is a non-limiting example of RCUFD3/U1 retrieving from Pub1, a copy of a resource set, RS1(2), & associated CIIS set that are registered with TIIRS1 & published by Pub1.

FIG. 46D (FIG. 46C continued) is a non-limiting example of RCUFD3/U2 interacting with TIIRS1(and/or other relevant service(s)) to determine TIIRS1's authenticity and/or suitability for certifying, authenticating and/or providing attribute information regarding registered resources.

FIG. 46E (FIG. 46D continued) is a non-limiting example of RCUFD4/U2 causing &/or performing a suitability evaluation & determination of authenticity of RS1 as received from RCUFD3/U1 (e.g., authenticity regarding whether RS1 was modified (e.g., maliciously)).

12.18 Identity Governed Fabric

In some embodiments, an at least in part biometrically based identification information governed fabric (IGF) comprises: (i) a product development event/activity manifest (e.g., comprising an ESAM) for securely supervising/governing subject matter products (such as software, hardware, information) preparation, development, manufacturing, and/or such activities' respective use of IGF components; (ii) one or more EBISeals that monitor and/or govern identification information event/activity rights management; (iii) subject matter products comprising hardware, firmware, and/or software, components provided by one or more registered IGF arrangement instance member companies. An IGF can comprise an event/activity process framework that can employ such components as, for example, provided by one or more registered IGF arrangement instance member companies. Such a framework can be used to integrity manage the creation of, and may further control the delivery of, subject matter products. In some embodiments, such IGFs may be registered as EBInet resource instances with one or more TIIRS arrangements, for example, to respectively ensure their authenticity/integrity.

FIG. 21 is a non-limiting example of an identity governed EBISeal fabric for providing supply chain and operational integrity assurance framework that avoids and/or repels unauthorized entities' (e.g., persons'/parties') attacks on computing environments by securely creating, and limiting modifications to, software/firmware/hardware (s/f/h), and where the types of authorized creations and modifications are performed only by registered and/or expressly authorized, existentially biometrically identified persons in accordance with EBISeal/IGF specification sets.

FIG. 22 is a non-limiting example of an identity governed fabric (IGF) for providing supply chain, and operational integrity, computer identity/security framework for resisting and repelling unauthorized persons' attacks on computing software and hardware environments.

FIGS. 21 and 22 illustrate a non-limiting example of an identity governed EBISeal fabric for providing supply chain and operational integrity assurance framework for avoiding and/or repelling attacks by unauthorized entities (e.g., persons/parties) on computing environments and/or their products and services by securely creating, and limiting/governing modifications to, software/firmware, and where the types of authorized creations and modifications are: (i) performed only by registered and/or expressly authorized, existentially biometrically identified persons in accordance with EBInet arrangement, such as EBISeal arrangement, specification sets, and (ii) governed through the use of EBISeal hardware and software arrangements.

In this example, fused-identity entities (e.g., AFD1/O2, AFD2/O4) can: (i) create identification information for identified fused-identity entities (e.g., E1/(AFD1/O2), E2/(AFD1/O2), E3/(AFD2/O4)), where:

- E1, E2, and E3 respectively use RCFUD1/O1, RCUFD2/O3, and RCUFD3/O5 to perform their event/activity instances, where O1 (who may be the same person as E1), O3 (who may be the same person as E2), and O5 (who may be the same person as E3) are owners of RCUFD1, RCUFD2, and RCUFD3, respectively; and
- O2 and O4, who are owner agents of Company 1 and Company 2, respectively and are owners of AFD1 and AFD2 respectively.

In this example, AFD1/O2 and AFD2/O4 respectively: (i) acquire at least in part near existential and/or existential quality biometrically based identification data of E1, E2, and E3; (ii) create fused-identity entities' (E1/(AFD1/O2)'s, E2/(AFD1/O2)'s, and E3/(AFD2/O4)'s) respective near existential and/or existential quality biometrically based identification information sets (and/or optionally for non-fused identity information regarding user persons (e.g., their CBEIISs)); and (iii) forward one or more portions of such created biometrically based identification information sets to (e.g., register with) TIIRS1 and (iii) forward such created biometrically based identification information sets to fused-identity entities RCUFD1/O1, RCUFD2/O3, and RCUFD3/O5.

Fused entities RCUFD1/O1, RCUFD2/O3, RCUFD3/O5, receiving such created biometrically based identification information sets, can use such IIS information to create one or more EBICert IITs for fused entities, E1/(AFD1/O2), E2/(AFD1/O2), and E3/(AFD2/O4), where such an EBICert IIT can:

- Contain such fused entities' respective identification information, comprising:
  - Such users' respective near existential and/or existential quality at least in part biometrically based identification information derived from received IIS information (e.g., CIIS1(E1/(AFD1/O1))),
  - Such users' respective other identification information further characterizing such users, such as such users' EFs, Creds, CPEs, and/or other data, where such data may be contained and/or securely referenced in IISs forwarded from respective such AFDs (e.g., AFD1 and AFD2) and/or stored in respective RCFDs,
  - Such users' RCFD and/or AFD arrangements' identification information characterizing such arrangements, such as respective location information and other attributes (such as CPEs, EFs, Creds (such as trustworthiness for performing respective event/activity instances), identification information regarding their CertPers, and/or other data).
- Contain and/or otherwise be securely associated with a public key of a private/public key pair. A fused-identity entity carrying such EBICert's private key can use the private key to cryptographically sign resource information. Resource information receiving parties can then authenticate such signed resource information by authenticating the signature using such EBICert's public key.

In some embodiments, such EBICert IITs can further contain and/or otherwise be securely associated with:

- One or more specified entity purposes (e.g., organization's purposes), for example, expressed as CPEs, that can respectively be associated with such purposes' respective E/A instances (such as creating a new source code version, Res3-2, comprising a modification of a source code version, Res3-1, such modification is governed by EBISeal1 (IGF1's EBISeal),
- Authorization for performing such purposes' respective E/A instances, where such authorization is at least in part based on matching such users' respective near existential and/or existential quality, at least in part biometrically based identification information sets with organization's, affinity group's, and/or platform utility's users' respective registered identification and/or authorization information (e.g., conditions for authorizing such respective E/A instances), and/or
- Policy information stipulating requirements for performing E/A instances associated with such purposes' respective specifications. For example, a fused-identity entity can carry an EBICert containing a purpose characterizing one or more signing/certifying E/A instances. In some embodiments, such EBICerts can include policy specification information specifying conditions for performing such signing/certifying E/A instances, where such conditions may include verifying physical presence (existential biometric demonstration) of the entity's human user in order to invoke one or more such E/A instances.

In this example,

- A fused identity entity, E1/(RCUFD1/O1, #CertPer1), receiving CIIS1(E1/(AFD1/O2)), creates EBICert IITs, IIT11 and IIT12;
- A fused identity entity, E2/(RCUFD2/O3, #CertPer2), receiving CIIS1(E2/(AFD1/O2)), creates EBICert IITs, IIT21, and IIT22; and
- A fused identity entity, E3/(RCUFD3/O5, #CertPer3), receiving CIIS1(E3/(AFD2/O4)), creates EBICert IITs, IIT31, IIT32, and IIT33.

E1, using RCUFD1/O1, invokes E/A1, an event/activity instance for accessing and modifying Res3-1, a resource version managed by IGF1, such E/A1 used to create an updated resource version, Res3-2, a modified version of Res3-1. For E1 to satisfy requirements to modify Res-1, E1/(RCUFD1/O1) forwards IIT11 to RUS1. IIT11 is an EBICert IIToken that both securely specifies a purpose that is associated with E/A1 and securely includes biometrically based acquired identification information that satisfies the specification requirement for authorizing E1/(RCUFD1/O1) to perform such modification. Information comprising such authorization specification may be securely stored in an organization location network, such as memory location within a EBIMasterSeal arrangement and/or stored in RCUFD1 (RCUFD1/O1).

RUS1, an instance of receiving and using services, operating as part of MasterIGF1, includes an EBIMasterSeal and four subordinate EBISeals that monitor and govern respective IGFs' managed resources. In some embodiments, RUS1 can securely perform non MasterIGF1 services as well as participate in a higher order RUS arrangement.

RUS1, in response to the invocation of E/A1, can perform two levels of monitoring and governance:

- the top level of monitoring and governance, performed by MasterIGF1's EBIMasterSeal, EBIMasterSeal1, can comprise IGF based EBIMasterSeal event/activity identity integrity and identity related rights governance, such as:
  - Evaluating/validating/authenticating IIT11, where such validation/authentication may include communicating with TIIRS1 to determine if IIT11 is registered with TIIRS1, and if so, retrieving the registered copy of IIT11 and comparing the presented IIT11 with the retrieved IIT11 information to determine if they operatively match in accordance with MasterEBISeal arrangement specification (and/or such matching operations can be performed at least in part by TIIRS1, where RUS1 forwards to TIIRS1 all or relevant portions of presented IIT11).
  - Validating that E1/(RCUFD1/O1) is authorized to perform E/A1 processing (such as accessing Res3-1 and creating Res3-2 by modifying Res3-1).
  - Employing securely associated E/A1 target IGF, IGF1. For example, IGF1 enables E1/(RCUFD1/O1) to perform a modification of resource Res3-1.
  - Monitoring and governing interactions between E1/(RCUFD1/O1) and IGF1 to ensure such interactions comply with MasterEBISeal and/or EBISeal arrangement specification.
  - And/or the like.
- the second level of monitoring and governance, performed by EBISeal1, an EBISeal for IGF1, comprises EBISeal event/activity identity integrity and identity related rights governance, such as:
  - Evaluating/validating/authenticating IIT11 to determine if it provides E1/(RCUFD1/O1) with sufficient authorization to modify Res3-1.
  - Monitoring and governing E1/(RCUFD1/O1)'s actions to ensure that E1/(RCUFD1/O1) properly accesses Res3-1 in accordance with a policy set and only creates a new resource version, Res3-2. In particular, EBISeal1 monitors and governs E1/(RCUFD/O1)'s actions to ensure that it does not access any other IGF1 resources.
  - At the completion of E/A1, ensuring that E1/(RCUFD1/O1) signs Res4-1 with IIT11's private key.

12.19 Secure Communication

Currently, connected computing communication technology do not provide:

1. Adequate and reliable information regarding communication provenance associated parties, and
2. Adequate governance regarding unintended parties accessing and/or otherwise using communications.

Current certificate technology does not ensure adequate and reliable information regarding communication source and other provenance. When using a securely implemented identification information framework, EBICert binding of near existential and/or existential quality at least in part biometrically based IISs with communication instances can ensure that communication instance origination and modification is revealed (e.g., exposing legitimacy of source and/or such source's intentions, credentials and/or reputation) to candidate recipients for such recipients' suitability evaluation. When employing EFs and/or QtP securely provided communication providing party attributes, such combination of attributes and existential quality identity support informed use of communication instances.

Current communication security requires awkward and theft vulnerable encryption protection to prevent unauthorized parties having access to sensitive communication information. EBInet EBICerts can provide a superior alternative to passwords by providing mechanisms that ensure that only authorized one or more persons or party types who present near existential and/or existential quality at least in part biometrically based IISs that match respective registered such instances can access such sensitive communicated information, such as email contents.

Moreover, currently sensitive information may pass through communication components that are shared with respective parent arrangements. EBInet device and/or service components sharing such communication components encrypt sensitive information traversing through such shared communication components to obviate needing to secure parent arrangement components. For example, a communication antenna employed by a parent smartphone does not need to have a special tamper resistant design so long as sensitive communicated information is appropriately encrypted.

12.20 Secure Clocks

In some embodiments, EBInet arrangements employ one or more secure clock arrangements, where each clock has securely stored, and otherwise maintained, unique identification information. Such unique information may, for example, be an embedded secret (such as a private key, stored in EBInet secure memory) and/or an O-Per/secure clock fused-identity CIIS. In some embodiments, an EBInet secure clock arrangement comprises: (i) one or more EBInet device arrangement functional components of NIIPU, RIIPU, IF, and/or AM arrangements, and/or (ii) one or more components of an EBInet emitter and/or sensor arrangement. EBInet device and/or service arrangements may, operatively simultaneously with forwarding sensitive IIS information to other EBInet device and/or service arrangements, respectively employ one or more of such clock arrangements to time stamp such sensitive identification information. Such secure clock arrangements may, for example, respectively employ identification information regarding their respective modular components (e.g., NIIPU, RIIPU, IF, and/or AM arrangements), and/or their sensor and/or emitter arrangements, as at least a portion of such clock identification attribute information, where such identification information may comprise respective fused-identity clock device/owner CIISs.

In some embodiments, an EBInet secure clock arrangement may comprise a modular component (NIIPU, RIIPU, IF, and/or AM, arrangement) and parent device, shared secure clock arrangement used by one or more EBInet modular component, and/or sensor and/or emitter, arrangements for event/activity time stamping functions.

At least a portion of such secure clock identification information is, in some embodiments, used in encrypting, and/or is contained in, EBInet securely forwarded IIS information provided by one or more EBInet secure clock arrangements' respective modular EBInet component and/or service arrangements. In some embodiments, such provided IIS information is deemed by a receiving EBInet arrangement to be invalid if such information does not contain securely provided, operatively real-time time stamped information regarding secure forwarding of such IIS information, and where a receiving EBInet device and/or service arrangement reads such time stamp and determines that such IIS information was forwarded in real-time.

A receiving EBInet device and/or service arrangement validates such proffered time stamped information as operatively real-time by matching such received information time stamp with current time provided by a secure clock arrangement employed by such receiving EBInet arrangement (such receiving arrangement secure clock arrangement may be embedded in such receiving arrangement and/or may be provided by a secure time service). Further, such operatively real-time forwarding information, such as sending and receiving timing information (comprising and/or otherwise representing time stamp information) may be employed as contributing information for encrypting and subsequently decrypting such forwarded information. In such an arrangement, operatively real-time sending and receiving event/activity time information can be securely employed by a sender and corresponding receiver to generate operatively unpredictable matching symmetric keys, where such symmetric keys are used by the sender to encrypt and the receiver to decrypt communicated sensitive information. The sender and receiver can use a corresponding protocol for generating such matching symmetric keys.

12.20.1 Secure Clocks and IITs

In some embodiments, EBInet secure clocks, such as respective clocks in AFD RIIPUs and/or RIIPUs' respective associated sensors and/or emitters, can identify respective times of near existential and/or existential quality at least in part biometrically based identification information acquisition, and use such time of acquisition as a time of acquisition time stamp component in the formulation of an EBInet IIS, e.g., in the formulation of a fused-identity entity composite identification information set that is used as a contemporaneous IIT for example, for pBIDE IIS broadcasting. Such implementations can provide IITs used for identification purposes in a wide variety of E/A instances for processing by E/A RUD/RUS rules and controls, such as for enforcing E/A related rights management.

An EBInet arrangement time-stamped biometrically acquired person identifying information set can supply biometric identification information acquisition timing information for an IIT, where such timing information is used, in combination with current time, to describe elapsed time since the secure EBInet AFD acquisition of biometric person identifying information. Such time information combination can inform regarding how contemporaneous (how old) such acquired information is. Such time of acquisition provides information informing regarding the exposure to reliability/integrity problems due to the opportunity for misuse such elapsed time may provide, since as time elapses there is generally an increase in exposure to theft of an RCFD and possible identity substitution/misuse by a malicious party (e.g., exposure to misuse by an imposter).

For example, a RIIPU can time-stamp an IIT, where such time-stamp information is assessed by a receiving RUD or RUS arrangement to determine if elapsed time since acquisition of an IIT's human person's biometric identifying information is within such receiving arrangement's required elapsed time (contemporaneous time boundary) one or more specified parameters. RUD and/or RUS event/activity applicable governance specifications regarding required elapsed time limits may have more than one specified elapsed time parameter/boundary depending upon context of use, such as different parameters for performing different operations and/or event/activity category instances.

12.20.2 Secure Clocks and IIT Examples

In some embodiments, a person, or a person/device fused-identity, entity may open such a person's on-line bank's website. Such website can then require presentation of such person's or such other entity's IIT, where an RFD presents/communicates an authorized EBInet identified person or fused-identity person/device entity's IIT. Such a website's RUS, and/or a banking RUD, arrangement, can then analyze whether such IIT information elements match with identification information elements stored/registered within a banking E/A associated TIIRS's, and/or such bank's, identification information registration arrangement. Using such secure clock arrangement's biometric identification acquisition (and/or IIT formulation) time stamp information and secure clock current time information of such RUS and/or RUD, such RUS and/or RUD arrangement can analyze and determine whether such person and/or fused-identity entity one or more IITs' contemporaneous biometric identification information sets' respective elapsed times from acquisition are within one or more respective required time boundaries, e.g., such IIT timing information satisfies an RUS and/or RUD specified maximum elapsed time requirement, such maximum elapsed time requirement reflecting the relative sensitivity of the relevant E/A. For example, in an online banking model (e.g., when using EBInet arrangement pBIDE), the high level of sensitivity of on-line banking might call for an IIS time-limit boundary to be a short period, for example, 15 minutes. Alternatively, a maximum elapsed time boundary for a lower sensitivity E/A, such as when an IIT is used to enter one's place of employment, might be 8 hours, and for entering a secure research lab within such place of employment, due to the lab's greater security sensitivity, might be one hour. By contrast, a time boundary for a social networking session, being physically present and using EBInet for paying at checkout while shopping at the supermarket, for starting one's car or for opening one's front door, or for entering a media website, might be 24 hours, due to lower E/A security sensitivity.

Using an EBInet arrangement secure clock time stamp can, when using crypto currency during an online transaction, provide substantial improvement in transaction integrity/reliability, where a participating RUS might require an RCFD that is securely carrying an EBICoin (e.g., in an EBInet wallet) to perform an operatively real-time biometrically based identification information acquisition to ensure that such real-time identification information operatively matches its registered ownership (registered, for example, with a TIIRS). Such registered ownership can be demonstrated through a transaction's digital coin set being securely bound to its owner's at least in part biometrically based (e.g., rigorous or existential) identification information, forming an EBICoin set and assuring the root ownership of the EBICoin's digital coin/coin set by the digital coin's transferer. Such EBICoin can securely contain time and location information of acquisition of an owner person's securely time-stamped, contextually sufficient (such as rigorous, or near existential or existential quality) at least in part biometrically based identification data. Use of the EBICoin's coin set may be governed by such a digital receiving party and/or a TIIRS authority, who may determine based upon elapsed time from acquisition whether a digital coin set is eligible for a commercial and/or other transaction involving coin set ownership transfer (creation of a new EBICoin set) and transaction settlement. Employing an EBInet secure clock arrangement for creating biometric acquisition time-stamped, operatively currently acquired, and/or contemporaneously acquired, time limited (e.g., unexpired), information sets can reduce or eliminate, depending upon implementation, successful replay attacks involving false claims of ownership of a digital coin set proffered in a financial transaction, for example, an on-line transaction settlement.

In some embodiments, contextual identity certification can comprise near existential or existential quality at least in part biometrically based identification information of a CertPer, time and date (based on a secure clock arrangement) of the certification (i.e., signing), and characterization of a device arrangement employed by such CertPer used to perform certification, where such characterization can include network location of such device arrangement at the time of the certification. In some embodiments, Router ID/signal can be used to determine such device arrangement's location.

13 A Non-Limiting Example of EBICoin Framework

In some embodiments, an EBICoin framework enables authorized entities to securely create, use, transfer possession and/or ownership of, an/or otherwise manage digital coins and/or EBICoins. Such framework enables Central Banks of countries and/or other monetary minting and/or governing authorities to securely create/mint digital coins and lend, sell, and/or otherwise provide minted coins and/or EBICoins containing such minted coins to financial institutions and/or other parties.

In some embodiments, each EBICoin securely contains one or more uniquely identified, persistent digital coins, where each digital coin is securely bound to its associated identification information, where such identification information: (i) contains near existential or existential quality at least in part biometrically based identification information of signing one or more persons, declaring authenticity of such digital coin and (ii) may contain provenance identification information of one or more previous owners, minting, and/or other transaction (e.g., provenance) E/A information.

An EBICoin framework may enable:

The Central Bank (e.g., Cen1) of a country and/or other monetary minting and/or governing authority (e.g., a crypto-currency authority) to securely perform one or more monetary and/or other financial transaction functions, such as:

1. Minting (creates) digital coins-signed by a near existential or existential quality at least in part biometric identification information set representing a CertPer of a Central Bank or other monetary governing authority, where such minting may be followed by exchanging and/or backing such digital coins for traditional currency (such as US dollar, euro, and/or the like) and/or other value.
2. Pledging conventional currency and/or other asset value (Central Bank), and/or retains currency and/or other value payments (other monetary governing authority, such as cryptocurrency authority), for respective digital coins for redemption purposes.
3. Creating EBICoins upon/for respective transactions and/or other distribution of digital coins, such EBICoins' respective subject matters identified, at least in part, by respective, near existential or existential quality biometrically identified such digital coins' acquiring new owners', and corresponding such digital coins', composite fused (securely bound) identification information (digital coin identifier and digital coin authenticity signer using an EBICert).
4. Replacing stolen and/or otherwise lost digital coins by cancelling/withdrawing stolen and/or lost digital coin instances and replacing such digital coins with newly, securely time/date EBICert signed digital coins, where signing stipulates the authenticity of such digital coins, wherein each such digital coin replacement represents the same digital coin in the form of a replica of the original digital coin. Replacement can employ digital coin registration records to ensure no redundancy of digital coins.
5. Maintaining provenance information of at least a portion of replaced, cancelled, lost, stolen, restricted (i.e., encumbered), and/or current, EBICoins and/or digital coins and maintaining a global digital coin identifier registry that includes identification information regarding respective EBICoins and their respective one or more digital coins. Such maintenance ensures that no two current EBICoins contain the same uniquely identified digital coin.

TIIRS and/or other financial one or more institutions, to securely perform one or more digital currency related activities, such as:

1. Approving REAI at least in part biometrically based Identification information authenticity; e.g., function as a validation/registration authority for authenticity of monetary governing authority signed digital coins, EBICoins, and/or EBICoin transaction persons' respective related identification information.
2. Inspecting/ensuring that no two currently valid EBICoins contain the same uniquely identified digital coin.
3. Maintaining provenance information of replaced, cancelled, lost, stolen, restricted (i.e., encumbered), and/or current EBICoins and/or digital coins, including maintaining a secure EBICoin and/or digital coin identifier registry.

TIIRS may securely interoperate with other financial entities (e.g., TIIRSs, decentralized blockchain organizations, and/or monetary governing authority (such as Central Bank of a country), ensuring EBIcoin validity and uniqueness.
4. Insuring and replacing stolen and/or lost EBICoins by cancelling/withdrawing such stolen, and/or lost, instances and replacing such EBICoins with new securely time/date time-stamped and signed EBICoins, wherein each such replacement EBICoin contains the same digital coin, but EBICoin replacement time, date, location information.

A financial institution, such as a commercial bank (or a TIIRS that performs financial transaction functions on behalf of users), to securely:

1. Maintain EBICoin bank accounts for near existentially and/or existentially identified bank customers.
2. Pay interest to customers on one or more such accounts.

3. Perform/support exchange of value transactions, including cancelling existing EBICoins and creating and securely signing new EBICoins for new owners, where exchange of value transactions may be, at least in part, governed by secure digital contracts.
4. Use/encumber EBICoin's digital coins to guarantee value to bank loan customers, while retaining sufficient aggregate value to satisfy any Central Bank reserve requirements.
5. Release/transfer EBICoins from EBICoin accounts to corresponding account owners' secure digital coin wallets and/or securely authorized locations (e.g., in accordance with accounts' respective digital contracts).
6. Transfer ownership of EBICoins' respective one or more digital coins to new EBICoin owners (digital wallet and/or currency account of, and/or through use of digital checks) based on validation of the new owner's at least in part near existential or existential quality biometrically base identification information signed (e.g., securely and cryptographically signed) transaction approval.

Customers of a financial institution to securely:

1. Perform transactions, such as making purchases using their valid EBICoins, authorizing transfer of ownership of one or more digital coins contained in their valid EBICoins, and/or authorizing transfer possession of valid EBICoins without transferring their ownership.
2. Manage respective digital wallets and/or store one or more EBICoins for network and/or mobile on-demand use by digital wallets' respective owners.

In some embodiments, persistently and uniquely identified digital coins are minted by Central Banks of countries (e.g., US Central Bank) and/or other monetary governing authorities (e.g., a crypto-currency authority digital currency authorities). Such digital coins can have, as their respective subject matters, uniquely fused (securely bound) identification information, unique digital coin identifiers that are securely bound to respective minter (currency creator) organizations' (e.g., Central Banks' and/or other monetary governing authorities') respective unique at least in part near existential and/or existential quality biometrically based identifiers, authenticated/authenticatable based on the biometric identification information of such digital coins' respective organizations' one or more digital coin minting process CertPers (one or more organization's agents) and, for example, time, date, and/or location of such digital coins' respective minting, provisioning, and/or other use.

In some embodiments, at least in part, near existential or existential quality, biometrically based identification information of such organizations' respective one or more digital coin minting process CertPers is employed as a portion of, and/or as a secure addition to, such digital coins' respective fused identification organization subject matters, since such CertPers' respective one or more identities are securely bound to, and therefore can be used to provide, such CertPers' respective organizations' identities, such identification information authenticatable by matching against CertPer registration identification information maintained, for example, by one or more Trusted Identification Information Registration Service (TIIRS) arrangements and/or by such digital coins' minting entities.

In some embodiments, digital coins are not valid EBINet digital currency instances unless they are signed using an EBICert of a minting (e.g., mining) authority's CertPer, and where such digital currency instances are components of respective current EBICoins. In some embodiments, such EBICoins and contained digital currencies must be registered with one or more authorized TIIRS arrangements (and/or, in some embodiments, with one or more monetary governing authorities) in order for EBICoins to be valid and/or otherwise usable currency instances, including for example, assuring the unique presence of a specific digital coin in a given EBICoin.

In some embodiments, a securely governed CIIS provides an identification information set for a securely associated fused-identity digital currency entity, an EBICoin that comprises one or more digital coins and its current owner(s)' and/or one or more agents' of current owner(s) at least in part near existential or existential quality, biometrically based identification information.

Moreover, EBICoin, EBICoin1, comprising a digital coin, CoinA, and its owner's, O1's, identification information, is certified using an EBICert by Cen1CertPer1, a certifying person representing Cen1—where such CIIS can include one or more of:

- EBICoin1's and/or CoinA's respective one or more relevant CIISs, such CIISs securely comprising (1) nearly existential or existential quality at least in part biometrically based CIISs of EBICoin1's one or more digital coins' personnel of one or more minting and/or other financial institution authorities; and (2) other identification information characterizing such EBICoin, such as, when applicable, its bank account number and/or other banking information, digital wallet ID, location, time of creation, included digital coin information, cryptographic and/or other security/token information, and/or other relevant information.
- Appropriate AFD and/or RCFD CIISs, and/or one or more portions thereof, such as (1) CIISs for one or more AFDs that respectively acquired biometrically based identification information of for example, EBICoin1's current owner(s) and/or agents thereof, bank agents that created EBICoin1, Central Bank and/or other monetary governing authority agents that supervised and/or certified minting of digital coins contained in EBICoin1, and/or the like, and/or (2) a CIIS for an RCFD and/or a secure digital wallet that may be currently carrying EBICoin1, and/or the like.
- EBICoin1's applicable provenance information, including:
  - at least in part near existential and/or existential quality biometrically based identification information of EBICoin1's and/or CoinA's one or more CertPers and/or CoinA's previous one or more owners; and/or
  - relevant information characterizing device arrangement instances, such as their associated personnel (e.g., IISs for relevant antecedent one or more provenance devices, or certifying persons).

In some embodiments, EBICoins are used in a distributed network comprised of EBINet compliant acquiring, receiving, carrying, using, and forwarding device, and RUS, arrangements.

In some embodiments, non-Central Banks can use protocols such as proof-of-work, proof-of-stake, and/or the like to create digital coins, such as Bitcoins, Ethers, Tethers, and/or the like. Such non-Central Bank created digital coins can be employed as EBICoins' respective digital coins. An EBICoin containing such a non-Central Bank created digital coin can have some or all of the attributes of an EBICoin that contains one or more Central Bank minted digital coins.

In some embodiments, a sequence of EBIBlocks for a given digital coin can form a secure EBIBlockChain, where each EBIBlock contains, in addition to CIIS of a valid EBICoin containing such a digital coin, Event/Activity transaction identification information associated with such a digital coin, such as transfer of ownership of such a digital coin. For example, when the owner of an EBICoin containing a digital coin transfers ownership of such digital coin, a financial institution servicing such transfer of ownership can simultaneously cancel such transferer's EBICoin and create a new EBICoin containing such digital coin, including recording such transfer of ownership and new owner identification information. Such EBIBlock may contain such digital coin, and relevant other EBICoin, information authenticated, for example, through a transferer's, and receiver's/new owner's, biometric EBIsigning(s) using their respective EBICerts.

In some embodiments, EBIBlockChain can provide irrefutable provenance information of such digital coin, where such provenance information comprises digital coin transaction information, including near existential and/or existential quality biometrically based identification information of human parties involved in one or more event/activity digital currency transactions. Such EBIBlockChain information can be used to impede or eliminate digital currency loss from fraud, and/or the consequence of loss of, and/or inaccessibility to (such as loss of encryption private key), a device's carried digital currency, by providing irrefutable, securely bound to an associated digital coin set, biometric identification ownership information, and, for example, including biometric certification/signing information (e.g. EBICert information) provided by transaction authenticating one or more parties. Such a system can establish the identity of a digital currency set's current owner, where such current owner can recover such digital currency by employing a restoration/recovery process, that, for example, is (1) governed at least in part by a cloud service, such as a TIIRS, that at least in part biometrically validates the identity of the current EBICoin owner by matching currently or contemporaneously acquired near existential or existential quality, at least in part biometrically based identity information with identification information registered with such a TIIRS or like service arrangement, and/or (2) governed by an EBInet local (e.g., one or more EBInet device (e.g., RCFD) arrangements) currency backup/restoration arrangement.

In some embodiments, digital coins and/or EBICoins are securely bound to their respective identification information, such as information regarding their location, current owner, and/or the like. Such digital coins may be securely bound to their associated respective EBIBlockChains, where each EBIBlockChain contains an EBIBlock that contains identification information of a currently valid EBICoin containing a digital coin that is securely associated with such EBIBlock.

Some EBInet embodiments may employ digital currency Information Wallet-EBIBlockChains to optimize providing irrefutable provenance information regarding a party's one or more digital coins. Such digital currency Information Wallet-EBIBlockChains can enable a party, such as financial institutions and/or organizations (such as Central Banks, commercial banks, TIIRSs, and/or the like) to group digital coins into a virtual digital coin wallet and treating such digital coin wallet as a single functional digital coin group instead of, or in addition to, maintaining a separate EBIBlockChain for each such digital coins. For example, suppose a Central Bank mints/creates one million digital coins. Rather than creating an EBIBlockChain for each digital coin, such Central Bank can group the minted digital coins into a virtual digital coin wallet and create an E/A Information Wall EBIBlockChain securely bound to the virtual digital coin wallet as a single functional digital coin group. A digital currency Information Wallet-EBIBlockChain can accumulate provenance identification information of such virtual digital coin wallet as such wallet undergoes transformation as digital coins are added to and/or deleted from such wallet.

In some embodiments, such digital currency Information Wallet-EBIBlockChains can have a digital currency Information Wallet-EBIBlockChains and/or EBIBlockChains. For example, a Central Bank can create a component virtual digital wallet comprising a subset of digital coins contained in a virtual digital wallet, in preparation to providing such virtual digital subwallet to, for example, a financial institution.

In some embodiments, a trusted identification information registration service (TIIRS) arrangement can comprise one or more trusted identification information services (for registration, authentication/verification analysis/determination, and/or the like), where each trusted identification information service may maintain its own copy of some or all digital coin EBIBlockchain sets. Such TIIRSs can have differing implementations, and/or be otherwise differently configured, to make a simultaneous compromising attack of the security of differing TIIRS instances more difficult/infeasible. Such differing implementations and/or configurations can substantially enhance such a TIIRS arrangement's ability to detect faults (such as identity misrepresentation) and take corrective actions (such as notifying authorized administrative services). For example, a bank and bank customer, in accordance with one or more specification sets, can validate each other's identification information by employing EBIBlockchain information received from such one or more TIIRSs. For example, a bank customer, receiving an EBICoin, EBICoin1, from a commercial bank can interact directly with one or more TIIRSs and/or other securely maintained EBICoin registration repositories and/or other EBICoin data management and governance services, to verify EBICoin1's validity (e.g., there is no other EBICoin containing one or more digital coins contained in EBICoin1). When a customer requests a commercial bank to transfer a digital coin from EBICoin1 to another bank customer, where such transfer includes creating a new EBICoin, such process can include the bank interacting with one or more TIIRSs to validate EBICoin1 before authorizing and/or the servicing of the customer's request. Such validation include demonstrating the authenticity/unique occurrence of such EBICoin and as well as demonstrating the digital coin's owner's participation in, and digital signed approval of, such transaction.

In some embodiments, TIIRSs and/or other organizations can register, govern, and/or otherwise maintain and/or manage a digital currency Information Wallet-EBIBlockChains and EBIBlockChains. As monetary governing and/or minting authorities, and/or other financial institutions employ digital coin sets in financial transactions (such as partitioning a digital coin set into digital coin sets and/or individual digital coins; creating digital coin sets comprising one or more digital coins and/or digital coin sets; and/or the like), TIIRSs and/or other organizations may, in some embodiments, create and/or modify digital currency Information Wallet-EBIBlockChains and/or EBIBlockChains, for example, in accordance with contextually appropriate information privacy specifications.

When a monetary governing authority and/or other financial institution: (i) partitions a virtual digital coin wallet (i.e., parent wallet) into two or more virtual digital coin subwallets (i.e., such digital coin wallets are mutually disjoint operative groupings), (ii) selects a digital coin from a digital coin set (for example, for a financial transaction such as selling the digital coin to a consumer), and/or (iii) combine digital coins and/or virtual digital coin wallets into a new virtual digital coin wallet. TIIRSs and/or other organizations may, in some embodiments, create Component digital currency Information Wallet-EBIBlockChains to represent respective digital coin subwallets partitioned from a parent digital wallet, where such created Wallet-EBIBlockChains acquire one or more relevant portions (relevant to subwallets' respective digital coins) of the provenance information regarding respective partitioned digital coin sets from parent digital currency Information Wallet-EBIBlockChain, where such parent digital currency Information Wallet-EBIBlockChain is securely bound to its digital wallet (which is the parent digital wallet of such subwallets). For example, when a financial institution partitions a parent digital coin wallet, WalletA, into digital coin subwallets, SubWallet1 and SubWallet2, such financial institution and/or other organizations (such as one or more TIIRSs arrangements that register, govern, and/or otherwise maintain and/or otherwise manage digital currency Information Wallet-EBIBlockChains) create two component digital currency Information SubWallet-EBIBlockChains that are respectively securely bound to SubWallet1 and SubWallet2, where a digital currency Information SubWallet-EBIBlockChain, securely bound to SubWallet1, comprises relevant provenance information for digital coins contained in SubWallet1 and any relevant E/A transaction related information associated with partitioning of WalletA's digital coins into SubWallet1 and SubWallet2; and a digital currency Information SubWallet-EBIBlockChain securely bound to SubWallet2 comprises relevant provenance information for digital coins contained in SubWallet2. Such provenance information acquired from the digital currency information Wallet-EBIBlockChain securely bound to the parent digital wallet, WalletA.

An EBIBlockChain to represent a digital coin separated from a virtual digital wallet, where such EBIBlockChain inherits provenance information regarding such digital coin from the digital coin Wallet-EBIBlockChain securely bound to such digital coin set. For example, when a financial institution removes a digital coin from a digital coin set, an EBIBlockChain is created or extracted to represent such digital coin, where such EBIBlockChain contains EBIBlocks that contain provenance information regarding such digital coin. Henceforth, such digital currency Information Wallet-EBIBlockChain may no longer contain some or all provenance information related to one or more E/A transaction related information sets involving such digital coin.

A digital currency Information Wallet-EBIBlockChain securely bound to a combined virtual digital wallet comprising digital coins and/or virtual digital coin wallets. Such a digital currency Information Wallet-EBIBlockChain may include one or more portions of relevant E/A transaction related provenance information from:

a. such digital coins' securely bound respective EBIBlockChains and/or b. such virtual digital coin wallets' securely bound respective digital currency Information Wallet-EBIBlockChains.

For example, when a digital coin, CoinA, and a virtual digital coin wallet, WalletA, are combined to create a new virtual digital coin wallet, WalletB, a digital currency Information Wallet-EBIBlockChain is created and securely bound to WalletB, where such a new digital currency Information Wallet-EBIBlockChain comprises CoinA's EBIBlockChain and WalletA's digital currency Information Wallet-EBIBlockChain. Such new Wallet-EBIBlockChain may contain provenance information respectively regarding CoinA and WalletA's digital coins obtained from CoinA's EBIBlockChain and WalletA's digital currency Information Wallet-EBIBlockChain.

In some embodiments, an EBICoin is a form of a policy governed secure EBIBox containing an EBIsigned one or more digital coins and associated CIIS information. An EBIBox can function as a secure, policy governed container that comprises one or more securely managed information resources, such as (1) identification information regarding/comprising such EBIBox's digital subject matter, for example, currency related document set, software program set, digital coin set, and/or the like, (2) near existential and/or existential quality at least in part biometrically based identification information of such EBIBox's or EBICoin's owner(s), and (3) may further include one or more relevant (e.g., digital coin(s)' and/or person(s)' and/or EBICoin(s)') EBICerts, and/or the like IITs. Such an EBICoin and/or EBIBox can further include transaction identification information of E/A instances involving such an EBICoin, where such identification information of E/A instances can be conveyed using an EBIBlockChain. Such digital coin, EBICoin, and/or EBIBox, and/or such EBIBlockChain's one or more EBIBlocks, can be signed by one or more CertPers using respective EBICerts to enable independent parties to validate/evaluate the authenticity and/or suitability/trustworthiness of such an instance's contents (e.g., digital coins, EBICoins, and/or EBIBoxes and/or, for example, one or more of their stakeholder human(s)' at least in part biometrically based identification information sets).

In some embodiments, when a Central Bank and/or other monetary governing authority mints digital coins, such authority can:

Keep minted digital coins as non-EBICoin digital coins until commercial banks and/or other financial institutions make E/A transaction requests, and/or otherwise agree, to buy, borrow, and/or otherwise acquire digital currencies (which can be either digital coins or EBICoins) (and as exhibited in FIG. 50).

Create EBICoins, each EBICoin containing one or more digital coins such monetary governing authority has minted, where such monetary governing authority specifies itself as the first owner of each of its minted digital coins by using the EBICoin instances' respective subject matter owner fields for such minted digital coins (as exhibited in FIG. 53).

When a commercial bank and/or other financial institution makes a digital currency transaction request to a monetary governing and/or minting/creating authority, such authority can fulfill such transaction request by, for example:

Transferring one or more digital coins in the amount specified by a requesting commercial bank and/or other financial institution (such as a commercial investment brokerage house). A financial institution (such as Bank1), receiving such digital coin(s), can fulfill its customer's (such as Bank1 customer's) request to buy or borrow one or more EBICoins of specified value(s) by securely creating one or more EBICoins containing one or more monetary governing authority minted digital coins, such customer requested one or more EBICoins having an aggregated value that is the same as the value specified by the customer. Such EBICoin creation by such financial institution can designate the customer as the owner of such one or more digital coins' first or subsequent EBICoin (such as such a digital coin's first EBICoin as exhibited in FIG. 51A-51C).

Creating one or more EBICoins whose value (singularly or aggregated) is the same as the value specified by such transaction request. Such monetary governing authority can securely, for example (a) as applicable, choose one or more digital coins from its store of digital coins, and/or mint one or more digital coins; (b) create one or more EBICoins to contain such chosen digital coins, where each such EBICoin's subject matter information includes its owner and/or owner agent person identifying information and such EBICoin's digital coin identifying information; (c) for each created EBICoin, create and include a CIIS for a fused-identity coin/person entity representing each such created EBICoin, and securely associating bank identification information; and (d) register each such created EBICoin, including registering each such EBICoin's' one or more digital coins, such as with one or more TIIRS arrangements, and/or Selecting one or more EBICoins (or non EBICoin digital coins) in such monetary governing authority's repository whose collective value is the same as the value specified by such transaction request. Such monetary governing authority can then transfer the ownership of the digital coins, for example from one or more selected EBICoins, to such financial (and/or other transaction service) institution by: (i) (a) simultaneously cancelling any selected EBICoins and creating new one or more EBICoins respectively containing such selected EBICoins' respective digital coins, and/or (b) otherwise selecting and transferring digital coins; (ii) stipulating that the requesting financial institution is the owner of newly created EBIcCoins; and (iii) registering newly created EBICoins, for example with a TIIRS, such as TIIRS1, where registration information includes information stipulating the ownership of such newly created one or more EBICoins and the identity of such EBICoins' digital coins. For example, such monetary governing authority can securely select an EBICoin, EBICoin1, and create a new EBICoin, EBICoin2, containing EBICoin1's one or more digital coins to be forwarded to, and owned by, such financial institution, in accordance with relevant one or more transaction specifications, wherein EBICoin2's subject matter's identification information is securely bound to one or more person owners', and/or owner agents', respective biometrically based identification information (as exhibited in FIG. 54A-54C).

13.1 the Transfer of Digital Coin Ownership

Ownership of a digital coin set contained in a currently valid EBICoin (such as EBICoin1 in FIG. 52A) can, in some embodiments, be transferred from such EBICoin's current owner(s) e.g., a current owner(s), O1, to one or more new owners, O2, by a bank or other financial institution, where given the uniqueness of such EBICoin, such institution governs the transfer of the ownership by:

Interacting with a TIIRS arrangement to ensure the unique use of such EBICoin's digital coin set;

Simultaneously canceling such valid EBICoin and creating a new EBICoin that is a fused-identity entity comprising a digital coin set from the canceled EBICoin, and its new owner(s); who are to receive and become owner(s) of the newly created EBICoin;

Concurrent to such creation of a new EBICoin creating one or more CIISs for the new EBICoin, where such one or more CIISs can include: (i) such newly created EBICoin's one or more digital coins' respective IISs, (ii) such newly created EBICoin's new owner's near existential or existential quality, at least in part biometrically based identification information, (iii) one or more portions of such newly created EBICoin's and/or such new owner related provenance information, and/or (iv) the like;

Forwarding such newly created EBICoin and associated CIISs to the EBInet device arrangement EBICoin wallet of such newly created EBICoin's new owner(s); and Registering such newly created EBICoin with one or more TIIRS arrangements, where such registration includes informing TIIRS arrangements of a change in the ownership of the digital coins that are now contained in EBICoin2, where such registration may be performed before or concurrent to such registration's associated digital coin transfer transaction (for example, simultaneous with, or upon, forwarding and/or receiving), where, for example, such registration occurs upon the explicit EBISigning (existential biometric, cryptographic signing) of the registration information (e.g., identifying the owners of the initiating and/or culminating EBICoins and related transaction information, such signing by initiator and/or receiver functioning as proof of authenticity of an EBICoin transaction information set).

In some embodiments, an EBICoin can have one or more CIISs that include such EBICoin's digital coins' respective provenance information, where each such digital coin's provenance information can comprise, for example:

Such digital coin information and/or historically related other EBICoin information, such as identification information of EBICoins that previously contained such digital coin.

Such digital coin's one or more previous owners and such owners' near existential and/or existential at least in part biometrically based identification information.

13.2 Transfer of Possession of EBICoins without Transferring their Ownership

EBICoins are digital objects that are controlled by their respective associated and/or included digital contracts. Such EBICoin objects can be stored and/or communicated by any appropriate specified corresponding digital contracts. In some embodiments, an EBICoin can be possessed by a party other than such EBICoin's digital coin set and/or EBICoin owner. Transferring possession of an EBICoin does not in itself change the ownership of such EBICoin's one or more digital coins. Enabling EBICoins to be employed as financial asset objects, such as escrowed assets, held by a party that has made a conventional potential commitment to facilitate financial transactions, such as lending conventional funds, cosigning to secure a conventional transaction, purchasing real estates and/or the like. Such commitments may or may not involve, depending on embodiments, encumbering EBICoins by enforcing underlying EBICoin digital contracts, which may or may not involve one or more transaction parties passing EBICoins for which they are not current owners.

In some embodiments, an owner of an EBICoin can request to transfer (i.e., digitally communicate), using an EBInet device, such as an RCFD employing one or more NIIPUs, the possession of such EBICoin to a commercial bank and/or other financial institution without transferring the ownership of such EBICoin and such EBICoin's one or more digital coins. NIIPUs employed by such RCFD can respectively securely process transactions and/or be employed in securely governing of such request to transfer possession of such EBICoin from E1, an entity such as such EBICoin's owner(s) to E2, an entity, such as a financial institution, by securely:

- Interacting with one or more TIIRSs to validate: (i) the requestor is a valid owner of such EBICoin and is authorized to request the transfer of such EBICoin's possession; and (ii) E1 is the current valid possessor of such EBICoin;
- Validating/authenticating E2's identification information, where such validation/authentication can include validating near existential or existential quality at least in part biometrically based identification information of E2 and/or E2's one or more CertPer human agents;
- Timestamping and EBIsigning, using an EBICert of a fused-identity entity comprising such EBIcoin's owner(s) and such owner's RCFD, a transaction information set containing a record of such transfer/possession operations, including validating the authorization of retainment/transfer of such EBICoin to the receiving party retainment/transfer operations;
- Registering such transfer and possession of such EBICoin by securely communicating such timestamped and EBIsigned transaction information set to one or more TIIRSs; and
- Transferring the possession of such EBICoin to E2.

In some embodiments, commercial banks and/or other financial institutions being entrusted to safeguard their customers respective EBICoins, may devolve the received EBICoins to their respective monetary governing authority minted digital coin instances and securely store such minted digital coins on behalf of their customers. Such financial institutions can subsequently enter into one or more transactions with one or more parties, wherein such institutions can create one or more EBICoins containing such respective digital coins, and specify that financial institutions and/or other relevant transaction one or more parties are owner(s) of such created EBICoins' respective monetary governing authority minted digital coins.

In some embodiments, as part of performing a transfer of digital coin ownership transaction, a financial institution can, in accordance with such transaction's specification, create an EBIBlock containing one or more portions of transfer transaction identification information describing such financial institution's activities, such as such financial institution simultaneously cancelling a currently valid EBICoin and creating a new EBICoin to be provided to the digital coin's new owner(s) and/or owner agent(s). Such EBIBlock can contain a CIIS of such newly created EBICoin and other relevant transaction related identification information, including one or more portions of such newly created EBICoin's provenance information.

In some embodiments, TIIRSs ensure that an EBICoin is possessed by only one entity at a given time by securely maintaining and/or otherwise managing securely timestamped, EBISigned, transfer of possession transaction information sets, where TIIRSs can, in some embodiments, provide such management by using EBIBlockChains comprising one or more EBIBlocks, each EBIBlock containing one or more securely timestamped, EBISigned, transfer of possession transaction information sets, where such transfer and/or associated EBICoin governance is managed, at least in part through, the use of secure EBInet digital contracts, which may involve secure EBInet hardware arrangements such as NIIPUs, and/or RUSs.

In some embodiments, TIIRSs, receiving a timestamped and EBIsigned transfer of possession transaction information set, timestamp the received information set and order such EBICoin's transfer of possession transaction information sets based on TIIRS timestamps. In cases of possible dispute of an EBICoin's current possessor, a TIIRS identifies the entity specified by the latest transfer of possession transaction information set that has latest TIIRS timestamp.

For example, a customer of Bank1, as part of initiating an E/A transaction (such as a transaction where a Bank1 customer is making a purchase using valid EBICoins), can transfer possession of such customer's one or more EBICoins to Bank1, where Bank1 is a commercial bank or other financial institution that is a party to such E/A transaction.

For example, a customer of Bank1, a commercial bank or other financial institution, as part of an E/A transaction (such as a transaction where such customer is making a purchase using valid EBICoins), can transfer possession of one or more EBICoins, and/or send transaction information regarding such EBICoins, to Bank1. Bank1, in turn, can, in accordance with such transaction and/or such EBICoins' respective digital contracts, simultaneously (i) cancel such EBICoins and (ii) create one or more new EBICoins to be owned by transaction specified one or more parties (such as sellers who may or may not be Bank1's customers).

In some embodiments, Bank1 can, in accordance with EBICoins' respective digital contracts, create one or more EBIBlocks containing such E/A transaction identification information comprising newly created EBICoins' respective E/A CIISs information, and/or other relevant E/A transaction related identification information.

In some embodiments, EBICoins are EBIsigned using EBICerts comprising near existential or existential quality, biometrically based identification information of such EBICoins' respective one or more owners. Further, EBICoins may be signed by respective fused-identity entities, where entities represent their respective financial organization creators/agents and their EBInet devices and/or IIPU creating arrangements and their CertPers.

Further, EBICoins may be signed by respective fused-identity entities, where such entities are declaring that such created EBICoins, in each instance, were authentic, and/or explicitly authorized by respective one or more signing entities.

13.3 Ensuring EBICoin Authenticity

In some embodiments, relevant E/A transaction identification information contained in an EBIBlock representing an EBICoin can include:

- One or more CIISs of a fused-identity entity (an EBICoin), such entity comprising such EBICoin's digital coin(s) and such EBICoin's owner(s) and/or owner agent(s); and
- Other relevant E/A transaction information, such as:
  - near existential and/or existential quality, at least in part biometrically based identification information of other human parties (such as human agent at a financial institution that is servicing such E/A transaction, previous one or more owners of the EBICoin's digital coin(s), and/or the like), and/or
  - Other relevant provenance information.

In some embodiments Central Banks and/or other monetary governing authorities may employ EBIBlockChains to support secure determination of authenticity of EBICoins (i.e., a given digital coin is contained in only one currently "valid/authentic" EBICoin). Monetary governing authorities that service digital currency related E/A instances (such as minting digital coins, concurrently cancelling and creating corresponding transaction EBICoins, forwarding created EBICoins to other parties, and/or the like) can create one or more EBIBlocks representing respective EBICoins and corresponding any specified, other E/A transaction and/or provenance related information.

In some embodiments, a digital coin can be securely bound to an EBIBlockChain comprising EBIBlocks that include historical transaction identification information, such as EBIBlocks containing relevant identification information related to: (i) the minting of such digital coin, (ii) transferring of ownerships; and/or (iii) the like.

In some embodiments, financial institutions, digital currency platforms, and/or one or more transaction instances may specify that an EBICoin containing one or more digital coins, includes one of more portions (e.g., EBIBlocks) of such one or more digital coins' respective EBIBlockChains. A bank employee/agent and/or such employee's/agent's RCFD and/or RUS can assess the integrity of a digital coin's historical transactions, by, for example, evaluating/validating Effective Facts and/or QtPs regarding one or more such historical transactions' respective one or more persons and/or other parties (e.g., historical CertPers), for example, looking for anomaly/and/or suitability to purpose attribute information. Alternatively, or in addition, while a bank performs a financial transaction involving an EBICoin, EBIBlockChain information may be retrieved by an authorized party, such as an authorized party participating in a transaction involving one or more EBICoins, from, and/or authenticated using, one or more TIIRS arrangements.

In some embodiments, such EBIBlockchains may be managed by one or more TIIRS arrangements.

In some embodiments, financial institutions, such as commercial banks, and/or TIIRSs, can prevent, and/or at least substantially mitigate risk of, the creation of multiple EBICoins that include the same digital coin (e.g., CoinA), by requiring:

- EBICoin owners to maintain EBICoins' respective identification information in owners' respective NIIPUs/wallets and/or EBICoin accounts (e.g., bank accounts); and
- antecedent to the time of registration of a digital coin set ownership transfer, financial organizations, such as commercial banks, and/or respective transaction participating fused-identity related entities, use their respective personnel/device CertPer EBICerts to securely certify/sign the transfer of ownership of one or more monetary governing authority minted digital coins from their current owners (such owners represented by their EBICoins) to new one or more digital coin owners by:
  - determining the authenticity of transaction initiating one or more respective fused-identity person/device entity persons who are such one or more EBIcoins' digital coin respective current owners, where such determination includes validating one or more EBICoins' respective CIIS information provided respectively by such parties for compliance with registered identification information requirements;
  - concurrently cancelling such one or more EBICoins and creating one or more new EBICoins respectively containing such cancelled EBICoins' respective one or more monetary governing authority digital coins, and respective CIISs. Such CIISs may be signed by respective transaction participating one or more financial institutions, such as by commercial banks and/or TIIRSs, where such signing may be followed by registering such new EBICoins and/or EBICoin transaction information with one or more TIIRS arrangements;
  - certifying proof of live (current), and/or otherwise contemporaneous (such as previously, recently acquired, existential), presence, as may be appropriate given the transaction type, of the transaction requesting/starting EBICoin's human owner set, and/or receiving human owner set, who securely approves, such as by cryptographically signing, (a) the transaction for creating one or more new EBICoins that stipulate a digital coin set's new one or more owners, and/or (b) such transaction and/or EBICoin securely related CIIS(s),
  - where such processes are followed by such bank and/or other financial institution certifying/registering transfer event/activity instance identification information using banks' such organizations' persons'/devices' respective fused identity EBICerts.
  - proof of EBICoin owner and/or other transaction party authenticity of presence may employ similarity matching: (i) current and/or contemporaneous at least in part near existential or existential biometrically based identification information acquired by, for example, an AFD, against (ii) registered at least in part biometrically based identification information, such matching performed at least in part using a TIIRS.

In some embodiments, independent parties, such as commercial banks, users, and/or the like, can validate EBICoins' respective CIIS information by:

- comparing such CIIS information provided by such initiating parties with such CIIS information that was registered and stored in a TIIRS information management arrangement;
- determining that only one valid EBICoin containing a given digital coin exists at any given time (such determination made using securely maintained digital coin unique identification information). If an independent party, such as a TIIRS, determines that more than one EBICoin contains a given digital coin, such EBICoins are blocked from further use (e.g., marked as cancelled), or if one of such plural EBICoins is determined to be valid, the remaining one or more EBICoins are marked as cancelled/invalid. Determination of the validity of a given EBICoin ownership relies upon a given minted digital coin being contained within a unique (only one) EBICoin. A TIIRS, a transaction bank, and/or an initiator's secure EBInet modular component (e.g., NIIPU and/or wallet account) can cross (mutually) authenticate an EBICoin's identification information to ensure that such separately operated EBInet arrangements determine that the requested transaction employs the same unique, authentic EBICoin(s).

When combined with the hardware and software security mechanisms of EBInet arrangements, including near existential and/or existential quality, at least in part biometrically based identification information, multi-factor confirming/authenticating design implementations (may be separately implemented designs) of EBInet arrangements (transaction initiating arrangement, intermediary exchange managing commercial financial organization (such as a bank) arrangement, currency receiving party arrangement, and TIIRS arrangement) would need to be compromised at securely managed time of transaction event for a successful misappropriation of funds to occur.

13.4 Digital Coin Recovery and Protection from Digital Currency Loss and Fraud

In some embodiments, an EBInet arrangement may be used for digital coin recovery and protection from digital currency loss and fraud, including misappropriation. With EBInet, for example, a user can manage loss of, or loss of access to, digital coins, by solving the persistent problem of owners forgetting and/or losing access to their respective wallets' private keys. An article published by The New York Times on Jan. 13, 2021, reported that 20% of all bitcoins outstanding in 2021 (3.7 million bitcoins of 18.5 million bitcoins outstanding, whose value, at the time of publishing, was $1 trillion US dollars) are lost or otherwise inaccessible, as stipulated by Chainalysis. For example, a German born programmer forgot the password to a small hard drive, IronKey, that contains the private keys to a digital wallet that holds 7002 bitcoins, whose value, as of Mar. 22, 2023, was approximately $196 million. As another example, a British man mistakenly put a hard drive with 7500 bitcoins in the trash while clearing out his home. The value of 7500 bitcoin, in Mar. 22, 2023, was $210 million.

In some EBInet embodiments, digital coin/EBICoin owners do not need to store private keys. Instead, such owners can use their existential biometric identification information that was acquired by their respective AFDs and forwarded to their respective RCFDs, to operatively generate (and subsequently regenerate) and employ generated private keys to open wallets. If digital coin owners have EBICoins, they can regenerate their private keys for EBICoins and/or digital coins, thereby avoiding the vulnerability of storing and potentially having private keys exposed or lost.

Such operative generation of private keys that secure digital coins and/or EBICoins can make it significantly more difficult for hackers to mount attacks to steal private keys and misappropriate digital coins. Such operative generation is particularly useful for hot wallets, a cryptocurrency wallet that is connected to the internet and cryptocurrency network. Hot wallets provide an interface for accessing and storing digital currencies for use in transactions, such as sending and receiving cryptocurrency; they allow wallets' respective owners to view and control the wallets' digital currency contents. Hot wallets, as well as digital currency exchanges, are notoriously vulnerable to cyber attacks, such as phishing attacks, where malicious parties steal digital currency. In some instances, such theft of digital currency involves the stealing of private keys stored in such exchanges and/or wallets, and has resulted in stealing of very large amounts, at times rising to a half billion or more US dollar value. For example, thefts involving the compromising of digital currency exchange security include:

(a) on Feb. 2, 2022, Wormhole reported that attackers found a vulnerability in Wormhole Network protocol's smart contract and stole 120K tokens worth $321 million.

(b) on Mar. 23, 2022, according to Chainalysis, attackers gained access to an internal validator system of Ronin Network to steal over $600 million by hacking private keys and forging transactions.

(c) on Oct. 6, 2022, according to The New York Times, Binance confirmed that attackers hacked its blockchain and stole at least $100 million.

EBInet's use of on-demand generation of private keys and other identification information rights management Event/Activity governance is based upon authorized party biometrically demonstrated presence. Such use can greatly reduce such individual and/or organization based digital currency losses.

In some embodiments, an EBICoin digital currency transaction can require (through the use of a secure digital contract) biometrically based signatures from each of participating plural parties to authorize the performance of financial transactions involving, for example, a purchaser and a seller of an object, and/or a service user and a service provider, where such parties use digital wallets and/or other currency accounts. A plural party signature requirement adds another dimension of security to transactions by ensuring that transaction participating and/or supervising plural key holders remain accountable for their transaction commitments to one another wherein each explicitly and irrefutably authorizes a transaction involving digital currency transfer.

Because wallet owners can respectively hold private keys on more than one device (e.g., exchange server and/or other financial service device arrangements, such as TIIRS computing arrangements, wallet owner's private devices, and/or the like), secure operative on-demand generation of private keys and determination of participant physical presence can result in substantial reduction or elimination of losing private keys through damage or theft.

For example, a buyer purchasing an object can send digital currency to an escrow- and when the buyer receives the object, the buyer can inform the escrow to release the digital currency. In a two-factor this arrangement, transfer can only take place when both the buyer and escrow approve the transfer as is stipulated by a transaction digital contract.

Generally speaking, a securely enforced (e.g., by a hardware NIIPU and/or a financial institution) near existential or existential quality biometric identification acquisition process set is required to prove the actual, physical presence (performed contemporaneously and/or operatively simultaneously) of a digital currency owner and/or receiver as a required condition of a digital currency transaction transfer.

13.5 Non-Limiting EBICoin Framework Use Cases

Non-limiting use cases of an EBICoin framework presented in this section illustrate:

- A monetary governing and/or minting/creating authority, such as a Central Bank of a country, securely,
  - Minting digital coins and maintaining such minted digital coins, where such digital coins are EBIsigned by one or more minting authority CertPer. Such authority's one or more CertPers EBIsign minted digital coins and associated IISs using their respective EBICerts, where such EBIsigned digital coins are then maintained: (i) as digital coins (FIG. 50); or (ii) by creating EBICoins that contain and/or otherwise securely reference such minted digital coins (FIG. 53), where such EBICoins and their contained digital coins are specified as being owned by such Central Bank.
  - Fulfilling requests from a commercial bank to buy, borrow, and/or otherwise acquire digital coins in a specified value by:
    - transferring ownership of minted digital coins whose aggregate values and denomination compositions are the same as specified by the request and creating and EBIsigning such digital coins' respective CIISs, where such CIISs stipulate that such financial institution is the current owner of such digital coins. Both such financial institution and such Central Bank may securely maintain copies of such EBISigned CIISs. Such CIISs may be registered with one or more TIIRSs. (FIG. 51A-51C);

creating one or more EBICoins and associated CIISs, where such EBICoins respectively contain one or more digital coins, and transferring the ownership of such digital coins by stipulating that the commercial bank is the owner of EBICoins containing such digital coins. (FIG. 52A-52C);

selecting one or more EBICoins to fulfill a financial institution's requests, where such fulfillment includes transferring the ownership of selected EBICoins' respective minted digital coins to such financial institution by, for each selected EBICoin:

1. Concurrently canceling such selected EBICoin and creating a new EBICoin containing the selected and cancelled EBICoin's one or more digital coins for such financial institution;
2. Creating a CIIS for such new EBICoin, specifying that the financial institution is the new owner of the transaction's initial EBICoin's one or more digital coins; and
3. Creating an EBIBlock containing E/A transaction information for the new EBICoin's digital coin. (FIG. 54A-54C).

If such Central Bank creates new EBICoins, then the Central Bank: (i) registers newly created EBICoins with one or more TIIRS arrangements; and (ii) forwards such newly created one or more EBICoins and associated CIIS(s) and EBIBlock(s) to such financial institution. Such financial institution, receiving such newly created one or more EBICoins and associated CIISs and EBIBlocks, can sign EBIBlocks using financial institution one or more EBICerts and forwards such signed EBIBlocks to one or more TIIRSs.

A commercial bank servicing a customer's request to purchase EBICoins. In some embodiments, an EBICoin framework enables financial institutions to maintain their digital currencies in digital coins, and/or in EBICoins respectively containing one or more digital coins.

FIGS. 55A-55C and FIGS. 56A-56C illustrate two use case examples of a commercial bank maintaining digital currencies in digital coins. These two use case examples illustrate such commercial bank servicing its customers' requests to purchase two EBICoins of specified denominations.

The use case example illustrated by FIGS. 55A-55C shows the commercial bank servicing a customer's (e.g., Customer 1) request by securely creating:

Two EBICoins, EBICoin2 containing a single digital coin, CoinB, and EBICoin3, containing a single digital coin, CoinC;

CIISs for EBICoin2 and EBICoin3, such CIISs stipulating that such customer is the owner of EBICoin2 and EBICoin3; and EBIBlocks, EBIBlock2 and EBIBlock3, for CoinB and CoinC, respectively, where such EBIBlocks respectively reference EBICoin2 and EBICoin3, and corresponding E/A transaction related identification information. Such commercial bank then signs created EBIBlocks and have them registered with one or more TIIRS.

The use case example illustrated by FIG. 56A-56C shows the commercial bank servicing a customer's (e.g., customer 2) request by securely creating:

Two EBICoins, EBICoin2 containing a digital coin set, CoinSet2, and EBICoin3, containing a digital coin set, CoinSet3; where each such digital coin sets contains one or more digital coins;

CIISs for EBICoin2 and EBICoin3, such CIISs stipulating that such customer is the owner of EBICoin2 and EBICoin3; and An EBIBlock, for each digital coin in CoinSet2 and CoinSet3, where such EBIBlock references the EBICoin that contains the digital coin, and corresponding E/A transaction related identification information. Such commercial bank then signs created EBIBlocks and have them registered with one or more TIIRS1.

FIG. 57A-57B illustrates a commercial bank maintaining its digital currencies in EBICoins respectively containing one or more digital coins. When a customer requests to purchase two EBICoins of specified denominations, such commercial securely:

selects two EBICoins, EBICoin2 and EBICoin3, respectively containing digital coins, CoinB and CoinC; and simultaneously creates new EBICoins, EBICoin4 and EBICoin5, respectively containing CoinB and CoinC, and cancels EBICoin2 and EBICoin3, creates CIISs for EBICoin4 and EBICoin5, where such CIISs stipulate that the consumer is the owner of EBICoin3 and EBICoin4.

creates two EBIBlocks, EBIBlockB3 and EBIBlockC3 for CoinB and CoinC, respectively and signs them, where EBIBlockB3 and EBIBlockC3 respectively reference EBIBlockB2 and EBIBlockC2 that respectively contain information regarding EBICoin2 and EBICoin3. In particular, EBIBlockB3 and EBIBlockC3 respectively contain hashes of EBIBlockB2 and EBIBlockC2.

Such commercial bank then registers such created EBIBlocks with one or more TIIRSs, which in turn adds them respectively to CoinB's and CoinC's EBIBlockChains.

A commercial bank, Bank1, services a customer to participate in an E/A transaction by securely:

As a component of the transaction, simultaneously canceling EBICoin1 containing a digital coin, CoinA, that the customer owned, and creating an EBICoin, EBICoin4, containing CoinA and associated CIISs;

forwarding EBICoin4 to a new owner, U2/RCFD5;

creating an EBIBlock recording the transfer of ownership;

registering EBICoin4 and associated CIIS1 with one or more TIIRSs, such as TIIRS1; and forwarding EBICoin4 to U2/RCFD5. (FIG. 58A-58C).

A group of SVCC Stakeholders of an EBInet device, such as an AFSD, to creating and maintaining a private SVCC EBIBlockChain comprising event/activity transaction related information regarding such EBInet device.

The identifiers used to represent the participants in the above use case examples may identify the same person, or may, in some examples, represent different people. For example, the three use case examples respectively illustrated by FIGS. 50, 51A-51C, and 52A-52C use three different identifiers, Cen1Agt1, Cen1Agt2, and Cen1Agt3 to identify context based Cen1 agents, where such agents may be the same person or in some use cases, different people and/or labeled consistent with the context of the activity (e.g., the role of a party in a given context, such as an agent, CertPer, owner, and/or the like). Similarly, the use case examples use the three identifiers, Cen1CertPer1, Cen1CertPer2, and CenCertPer3 to identify Cen1 CertPers, where these CertPers may be the same person or different people. For example, depending on the context of the activity, Cen1Agt1 may identify the same person as Cen1CertPer1.

FIG. 48A-48B is a list of human parties and their device arrangements and EBICerts described in this section, and FIG. 49 is a list of human parties and description of their functions in this section.

14 FIG. 63 is a Non-Limiting Example of Certain EBInet Device Arrangement Components FIG. 63 illustrates computing arrangement/apparatus/device of a PERCos environment in accordance with some embodiments. It is understood by those familiar with the art that an embodiment may also be used with non-PERCos devices, a PERCos resource, and/or in conjunction with other PERCos embodiments, and any such embodiments may include, but are not limited to: cloud services, web information stores, people (cross edge), plug-ins, networks, and/or the like and/or any combination thereof, including meta-computing arrangements involving diverse independent resource nodes and types (e.g., large number of "independent" nodes).

This PERCos embodiment environment 2000 comprises a processor 3100, memory 2070, storage medium 3200, and network interface 2060. PERCos environment 2000 may also contain one or more of the following: display 2010, manual input 2020, microphone 2030, data input port 2040, speaker 2050, and/or other components.

PERCos environment 2000 may run, for example, a multi-tasking PERCos operating system and include at least one processor or central processing unit (CPU) 3100. Processor 3100 may be any central processing unit, microprocessor, micro-controller, computational device or circuit arrangement known in the art.

Memory 2070 may be any memory (e.g., random access memory) known in the art.

Display 2010 may be a visual display arrangement such as a cathode ray tube (CRT) monitor, a liquid crystal display (LCD) screen, plasma display, projector, light emitting diode (LED) display, organic light emitting diode (OLED) display, touch-sensitive screen, and/or other monitors as are known the art for visually display images, graphics and/or text to a user.

Manual input device 2020 may be a conventional keyboard, mouse, trackball, or other input device as is known in the art for the manual input of data.

Data input port 2040 may be any data port arrangement as is known in the art for interfacing with, and/or otherwise supporting, a user, such as a telephone, instant messaging, World-Wide-Web, or electronic-mail interface. In some embodiments, data input port 2040 is an external accessory using a data protocol such as RS-232, Universal Serial Bus (USB), or Institute of Electrical and Electronics Engineers (IEEE) Standard No. 1394 ('Firewire').

Network interface 2060 may be any data port arrangement as is known in the art for interfacing, communicating, and/or transferring data across a computer network, with examples of such networks and network-related technologies, including, for example, Transmission Control Protocol/Internet Protocol (TCP/IP), Fiber Distributed Data Interface (FDDI), token bus, token ring networks, and the like. Network interface 2060 allows PERCos environment 2000 to communicate with other devices, networks, cloud computing arrangements, and/or the like.

Computer-readable medium 3200 may be conventional read/write memory arrangement such as a magnetic disk drive, floppy disk drive, compact-disk-only-memory (CD-ROM) drive, digital versatile disk (DVD) drive, high definition digital versatile disk (HD-DVD) drive, Blue-ray drive, magneto-optical drive, optical drive, flash memory, memory stick, non-volatile transistor-based memory and/or other computer-readable memory device arrangement as is known in the art for storing and retrieving data. Significantly, computer-readable storage medium 3200 may be remotely located from processor 3100, and be connected to processor 3100 via a network such as a local area network (LAN), a wide area network (WAN), over a cloud service, and/or the Internet.

The previous description of the embodiments is provided to enable any person skilled in the art to practice the disclosure. The various modifications to these embodiments will be readily apparent to those skilled in the art, and the generic principles defined herein may be applied to other embodiments without the use of inventive faculty. Thus, the present disclosure is not intended to be limited to the embodiments shown herein, but is to be accorded the widest scope consistent with the principles and novel features disclosed herein.

What is claimed is:

1. A system for connected computing secure identification information acquisition, authentication, and management, such system including a hardware and software arrangement set comprising one or more processors and one or more memories comprising:

one or more secure tamper-resistant computing hardware and software human biometric identification information and liveness information acquisition arrangements that include at least one sensor arrangement and at least one emitter arrangement configured for human biometric identification information acquisition and liveness testing, one or more secure, human biometric identification, and associated attribute, information cloud service registration and management arrangements, one or more secure receiving, carrying and forwarding computing hardware and software mobile device arrangements configured to receive, carry and forward human biometric identification information and/or information derived at least in part therefrom, and one or more secure tamper-resistant computing hardware and software receiving and using arrangements configured to receive and use human biometric identification information and/or information derived at least in part therefrom, wherein the hardware and software arrangement set is configured to enable:

acquiring, contemporaneous to their use, a human's biometric identification information and liveness information by the one or more secure, tamper-resistant computing hardware and software human biometric identification information and liveness information acquisition arrangements;

securely registering such human's acquired biometric identification information, and/or information derived at least in part therefrom, with the one or more cloud service registration and management arrangements;

receiving, by the one or more secure receiving, carrying and forwarding mobile device arrangements, such human biometric identification information, and/or information derived at least in part therefrom, from the one or more cloud service registration and management arrangements, wherein the one or more secure receiving, carrying and forwarding mobile device arrangements then carry, for a contemporaneous time period, such received human biometric identification information, and/or information derived at least in part therefrom;

receiving, by the one or more secure tamper-resistant receiving and using arrangements, the human biometric identification information, and/or information derived at least in part therefrom, from the one or more receiving, carrying and forwarding mobile device arrangements;

performing similarity matching evaluation comparing such acquired human biometric identification information, and/or information derived at least in part therefrom, with a previously registered biometric identification information set of such human to authenticate the identity of such human; and determining, based at least in part on such similarity matching evaluation's outcomes, whether to authorize one or more operations to be performed by at least one of (a) such one or more secure receiving, carrying and forwarding computing hardware and software mobile device arrangements, (b) one or more such tamper-resistant receiving and using arrangements, and/or (c) one or more receiving and using cloud service arrangements.

2. The system as in claim 1, wherein such hardware and software arrangement is configured to enable acquisition, by the one or more secure receiving, carrying and forwarding mobile device arrangements, of second factor human biometric identification information, where such second factor human biometric identification information and/or information at least in part derived therefrom is evaluated to determine whether such second factor human biometric identification information and/or information derived therefrom identifies the same human as such carried human biometric identification information and/or information derived at least in part therefrom.

3. The system as in claim 1, wherein such hardware and software arrangement set is configured to perform identification information sensitive operations using trusted computing isolation and cryptographic techniques, wherein (1) acquisition, (2) carrying and forwarding, and (3) receiving and using, arrangements respectively employ tamper resistant hardware identification information processing arrangements that support secure processing and storage of identification information.

4. The system as in claim 1 further including a human biometric identification information acquisition arrangement comprising an open on at least one side tangible container, wherein one or more biometric sensor and/or emitter arrangements are integrated within and/or upon plural walls of the container.

5. The system as in claim 1 further including a human biometric identification information acquisition arrangement comprising an open on at least one side tangible container, wherein one or more biometric sensor and/or emitter arrangements are integrated within and/or upon a wall of the container.

6. The system as in claim 1, wherein such human's biometric identification information is securely bound to person suitability informing attribute information.

7. The system as in claim 5, wherein employing such container's one or more sensor arrangements enables acquiring signal information that can be used to detect a timing anomaly associated with virtual and/or augmented reality object representation spoofing.

8. The system as in claim 5, wherein such container employs one or more emitter and sensor arrangements used, at least in part, to survey the internal environment of the container for presence of one or more tangible objects to determine at least one of (a) a presented human tangible component and/or (b) an inappropriate presence of one or more non-human tangible component spoofing elements.

9. The system as in claim 5, wherein such one or more biometric sensor and/or emitter arrangements employ electromagnetic radiation and/or sound wave radiation.

10. The system as in claim 6, wherein the attribute information at least in part includes one or more verifiable credentials characterizing respective one or more person stakeholders in digital and/or physical entities to determine suitability of entity use.

11. The system as in claim 6, wherein the attribute information at least in part includes one or more effective facts characterizing respective one or more person stakeholders in digital and/or physical entities to determine suitability of entity use.

12. The system as in claim 1, wherein suitability informing information regarding an entity's stakeholder person includes attribute information specified as a quantized contextual purpose expression securely associated with such stakeholder person's biometric identification information.

13. The system as in claim 1, wherein securely registering such human biometric identification information and/or information at least in part derived therefrom is performed operatively simultaneously to such biometric identification information acquisition by the one or more secure, tamper-resistant human biometric identification information and liveness information acquisition arrangements, and where such registration employs, and registered information is securely stored within, at least one of such (a) acquiring arrangements, (b) receiving, carrying and forwarding arrangements, and/or (c) one or more cloud service registration and management arrangements.

14. The system as in claim 13, wherein authenticating such person's acquired human biometric identification information and/or information at least in part derived therefrom is performed by similarity matching such person's acquired human biometric identification information and/or information at least in part derived therefrom with previously acquired, registered such person identification information, and/or information at least in part derived therefrom, that is stored within such one or more acquisition arrangements, mobile device arrangements, and/or cloud service registration and management arrangements.

15. The system as in claim 1, wherein such human biometric identification information, and/or information derived at least in part therefrom, includes and/or otherwise is securely bound to device identifying information to form a fused or otherwise securely combined device/human identifying information set.

16. The system as in claim 15, wherein such fused or otherwise securely combined device/human identifying information set includes an at least one of stakeholder and/or device, fact authority stipulated fact verifiable information set.

17. The system as in claim 1, wherein such one or more human biometric identification information and liveness information acquisition arrangements includes a hardware-based acquisition and forwarding device arrangement securely employing one or more RIIPU root identification information processing units.

18. The system as in claim 1, wherein such one or more human biometric identification information and liveness information acquisition arrangements include such one or more secure receiving, carrying and forwarding computing hardware and software mobile device arrangements employing one or more NIIPU network identification information processing units for securely carrying and forwarding human biometric identification information and/or information derived at least in part therefrom.

19. The system as in claim 1, wherein such one or more secure tamper-resistant computing hardware and software receiving and using arrangements configured to receive and use human biometric identification information and/or information derived at least in part therefrom includes one or more NIIPU network identification information processing units.

20. The system as in claim 1, wherein one or more secure clocks within such one or more human biometric identification information and liveness information acquisition arrangements are used for time and/or date stamping of one or more acquisition and/or authentication process set information sets.

21. The system as in claim 1, wherein such contemporaneously acquired human biometric identification information and/or information derived therefrom is usable in an operation authorization process set for a period of up to one day from its acquisition time.

22. The system as in claim 1, wherein such contemporaneously acquired human biometric identification information and/or information derived therefrom is usable in an operation authorization process set only for a specified period from its acquisition time.

23. The system as in claim 1, wherein the second factor biometric identification information is acquired operatively simultaneous-to-use of such second factor biometric identification information and/or information derived therefrom.

* * * * *